US011468460B2

(12) United States Patent
Hammerstrom et al.

(10) Patent No.: US 11,468,460 B2
(45) Date of Patent: Oct. 11, 2022

(54) TRANSACTIVE CONTROL FRAMEWORK AND TOOLKIT FUNCTIONS

(71) Applicant: Battelle Memorial Institute, Richland, WA (US)

(72) Inventors: Donald J. Hammerstrom, West Richland, WA (US); Ronald B. Melton, Richland, WA (US); Trishan Esram, Fairfax, VA (US); John E. Hathaway, Richland, WA (US)

(73) Assignee: Battelle Memorial Institute, Richland, WA (US)

(*) Notice: Subject to any disclaimer, the term of this patent is extended or adjusted under 35 U.S.C. 154(b) by 294 days.

(21) Appl. No.: 16/795,118

(22) Filed: Feb. 19, 2020

(65) Prior Publication Data

US 2021/0097560 A1 Apr. 1, 2021

Related U.S. Application Data

(62) Division of application No. 14/108,078, filed on Dec. 16, 2013, now Pat. No. 10,740,775.

(60) Provisional application No. 61/737,726, filed on Dec. 14, 2012.

(51) Int. Cl.

| | |
|---|---|
| ***G05B 15/02*** | (2006.01) |
| ***G06Q 30/02*** | (2012.01) |
| ***G06Q 50/06*** | (2012.01) |

(52) U.S. Cl.

CPC ......... *G06Q 30/0206* (2013.01); *G05B 15/02* (2013.01); *G06Q 50/06* (2013.01); *Y04S 50/14* (2013.01)

(58) Field of Classification Search

CPC ..... G06Q 30/0206; G06Q 50/06; Y04S 50/14

See application file for complete search history.

(56) References Cited

U.S. PATENT DOCUMENTS

| | | | |
|---|---|---|---|
| 2,042,187 | A | 5/1936 | Powers et al. |
| 4,010,614 | A | 3/1977 | Arthur |
| 4,482,814 | A | 11/1984 | Daniels |
| 5,572,438 | A | 11/1996 | Ehlers et al. |

(Continued)

FOREIGN PATENT DOCUMENTS

| | | |
|---|---|---|
| CA | 2678828 | 3/2010 |
| EP | 1242932 A1 | 9/2002 |

(Continued)

OTHER PUBLICATIONS

Colson, C.M. and Nehrir, M.H., "Algorithms for Distributed Decision-Making for Multi-Agent Microgrid Power Management", Jul. 24-28, 2011, IEEE Power and Energy Society General Meeting, DOI: 10.1109/PES.2011.6039764. (Year: 2011).

(Continued)

*Primary Examiner* — Yuhui R Pan

(74) *Attorney, Agent, or Firm* — Klarquist Sparkman, LLP

(57) ABSTRACT

Disclosed herein are representative embodiments of methods, apparatus, and systems for facilitating operation and control of a resource distribution system (such as a power grid). For example, embodiments of the disclosed technology can be used to improve the resiliency of a power grid and to allow for improved consumption of renewable resources. Further, certain implementations facilitate a degree of decentralized operations not available elsewhere.

32 Claims, 86 Drawing Sheets

(56) References Cited

U.S. PATENT DOCUMENTS 5,684,710 A 11/1997 Ehlers et al.
5,696,695 A 12/1997 Ehlers et al.
5,924,486 A 7/1999 Ehlers et al.
6,021,402 A 2/2000 Takriti
6,047,274 A 4/2000 Johnson et al.
6,216,956 B1 4/2001 Ehlers et al.
6,343,277 B1 1/2002 Gaus et al.
6,633,823 B2 10/2003 Bartone et al.
6,681,156 B1 1/2004 Weiss
6,895,325 B1 5/2005 Munson, Jr.
6,963,854 B1 11/2005 Boyd et al.
6,970,714 B2 11/2005 D'Souza et al.
7,043,380 B2 5/2006 Rodenberg et al.
7,085,739 B1 8/2006 Winter et al.
7,130,719 B2 10/2006 Ehlers et al.
7,135,956 B2 11/2006 Bartone et al.
7,141,321 B2 11/2006 McArthur et al.
7,243,044 B2 7/2007 McCalla
7,249,169 B2 7/2007 Blouin et al.
7,343,226 B2 3/2008 Ehlers et al.
7,343,360 B1 3/2008 Ristanovic et al.
7,379,997 B2 5/2008 Ehlers et al.
7,395,252 B2 7/2008 Anderson et al.
7,418,428 B2 8/2008 Ehlers et al.
7,516,106 B2 4/2009 Ehlers et al.
7,587,330 B1 9/2009 Shan
7,599,866 B2 10/2009 Yan et al.
7,716,101 B2 5/2010 Sandholm et al.
7,953,519 B2 5/2011 Hamilton, II et al.
7,996,296 B2 8/2011 Lange
8,126,794 B2 2/2012 Lange et al.
8,271,345 B1 9/2012 Milgrom et al.
8,504,463 B2 8/2013 Johnson et al.
8,527,389 B2 9/2013 Johnson et al.
8,577,778 B2 11/2013 Lange et al.
8,639,392 B2 1/2014 Chassin
9,395,707 B2 7/2016 Anderson et al.
2001/0032029 A1 10/2001 Kauffman
2002/0002414 A1* 1/2002 Hsiung .............. G05B 23/0243 700/47
2002/0038279 A1 3/2002 Samuelson et al.
2002/0091626 A1 7/2002 Johnson et al.
2002/0103745 A1 8/2002 Lof et al.
2002/0128747 A1 9/2002 Mima
2002/0132144 A1 9/2002 McArthur et al.
2002/0178047 A1 11/2002 Or et al.
2003/0014379 A1 1/2003 Saias et al.
2003/0023540 A2 1/2003 Johnson et al.
2003/0036820 A1* 2/2003 Yellepeddy ............ G05B 15/02 700/36
2003/0040844 A1 2/2003 Spool et al.
2003/0040845 A1 2/2003 Spool et al.
2003/0041002 A1 2/2003 Hao et al.
2003/0041016 A1 2/2003 Spool et al.
2003/0041017 A1 2/2003 Spool et al.
2003/0055774 A1 3/2003 Ginsberg
2003/0078797 A1 4/2003 Kanbara et al.
2003/0093332 A1 5/2003 Spool et al.
2003/0093357 A1 5/2003 Guler et al.
2003/0139939 A1 7/2003 Spool et al.
2003/0144864 A1 7/2003 Mazzarella
2003/0149672 A1 8/2003 Laskoski
2003/0171851 A1 9/2003 Brickfield et al.
2003/0210658 A1 11/2003 Hernandez et al.
2003/0216971 A1 11/2003 Sick et al.
2004/0010478 A1 1/2004 Peljto et al.
2004/0015428 A2 1/2004 Johnson et al.
2004/0024483 A1 2/2004 Holcombe
2004/0128266 A1 7/2004 Yellepeddy et al.
2004/0133529 A1 7/2004 Munster
2004/0140908 A1 7/2004 Gladwin et al.
2004/0153330 A1 8/2004 Miller et al.
2004/0225649 A1 11/2004 Yeo et al.
2004/0254688 A1 12/2004 Chassin et al.
2005/0015283 A1 1/2005 Iino et al.
2005/0027636 A1 2/2005 Gilbert et al.
2005/0065867 A1 3/2005 Aisu et al.
2005/0114255 A1 5/2005 Shields et al.
2005/0125243 A1 6/2005 Villalobos
2005/0137959 A1 6/2005 Yan et al.
2005/0197875 A1 9/2005 Kauffman
2005/0228553 A1 10/2005 Tryon
2006/0036357 A1 2/2006 Isono et al.
2006/0195229 A1 8/2006 Bell et al.
2006/0241951 A1 10/2006 Cynamom et al.
2006/0259199 A1 11/2006 Gjerde et al.
2006/0293980 A1 12/2006 Corby et al.
2007/0005192 A1 1/2007 Schoettle et al.
2007/0011080 A1 1/2007 Jain et al.
2007/0038335 A1 2/2007 McIntyre et al.
2007/0061248 A1 3/2007 Shavit et al.
2007/0087756 A1 4/2007 Hoffberg
2007/0124026 A1 5/2007 Troxell et al.
2008/0021628 A1 1/2008 Tryon
2008/0027639 A1 1/2008 Tryon
2008/0039980 A1 2/2008 Pollack et al.
2008/0046387 A1 2/2008 Gopal et al.
2008/0051977 A1 2/2008 Tryon
2008/0243664 A1 10/2008 Shavit et al.
2008/0243682 A1 10/2008 Shavit et al.
2008/0243719 A1 10/2008 Shavit et al.
2008/0281663 A1 11/2008 Hakim
2008/0297113 A1 12/2008 Saeki et al.
2008/0300907 A1 12/2008 Musier et al.
2008/0300935 A1 12/2008 Musier et al.
2008/0306801 A1 12/2008 Musier et al.
2008/0307399 A1 12/2008 Zhou et al.
2008/0319893 A1 12/2008 Mashinsky et al.
2009/0063228 A1 3/2009 Forbes
2009/0132360 A1 5/2009 Arfin et al.
2009/0177591 A1 7/2009 Thorpe et al.
2009/0195349 A1 8/2009 Frader-Thompson et al.
2009/0228151 A1 9/2009 Wang et al.
2009/0292402 A1* 11/2009 Cruickshank, III ... G06Q 10/00 700/287
2009/0307059 A1 12/2009 Young et al.
2009/0313174 A1 12/2009 Hafner et al.
2010/0010939 A1 1/2010 Arfin et al.
2010/0049371 A1 2/2010 Martin
2010/0057625 A1 3/2010 Boss et al.
2010/0106332 A1 4/2010 Chassin et al.
2010/0106641 A1 4/2010 Chassin et al.
2010/0107173 A1* 4/2010 Chassin .............. G06Q 20/102 718/104
2010/0114387 A1 5/2010 Chassin
2010/0121700 A1 5/2010 Wigder et al.
2010/0138363 A1 6/2010 Batterberry et al.
2010/0179704 A1 7/2010 Ozog
2010/0179862 A1 7/2010 Pratt et al.
2010/0216545 A1 8/2010 Lange et al.
2010/0217550 A1 8/2010 Crabtree et al.
2010/0218108 A1 8/2010 Crabtree et al.
2010/0256999 A1 10/2010 Ghani et al.
2010/0332373 A1 12/2010 Crabtree et al.
2011/0015801 A1 1/2011 Mazzarella
2011/0016055 A1 1/2011 Mazzarella
2011/0018704 A1 1/2011 Burrows
2011/0029465 A1 2/2011 Ito et al.
2011/0081955 A1 4/2011 Lange et al.
2011/0137835 A1 6/2011 Ito et al.
2011/0301964 A1 12/2011 Conwell
2011/0316480 A1 12/2011 Mills-Price et al.
2012/0022700 A1 1/2012 Drees et al.
2012/0022995 A1 1/2012 Lange
2012/0053011 A1 3/2012 Onomura et al.
2012/0072039 A1 3/2012 Anderson et al.
2012/0072141 A1 3/2012 Hidai et al.
2012/0083930 A1 4/2012 Ilic et al.
2012/0143385 A1 6/2012 Goldsmith
2012/0278220 A1 11/2012 Chassin et al.
2013/0110304 A1 5/2013 Shiga et al.
2013/0268131 A1 10/2013 Venayagamoorthy et al.
2013/0325691 A1 12/2013 Chassin et al.
2013/0325692 A1 12/2013 Chassin et al.

(56) References Cited

U.S. PATENT DOCUMENTS

| | | | |
|---|---|---|---|
| 2014/0188689 | A1 | 7/2014 | Kalsi et al. |
| 2015/0111591 | A1 | 4/2015 | Hoffberg |
| 2015/0214738 | A1 | 7/2015 | Covic et al. |
| 2015/0379542 | A1 | 12/2015 | Lian et al. |
| 2016/0141873 | A1 | 5/2016 | Ellice-Flint et al. |
| 2016/0195866 | A1 | 7/2016 | Turney et al. |
| 2016/0248260 | A1 | 8/2016 | Kulyk et al. |
| 2018/0196456 | A1 | 7/2018 | ElBsat |
| 2018/0314220 | A1 | 11/2018 | Kumar |
| 2018/0356770 | A1 | 12/2018 | ElBsat et al. |
| 2018/0356782 | A1 | 12/2018 | ElBsat et al. |
| 2018/0357577 | A1 | 12/2018 | ElBsat et al. |
| 2019/0206000 | A1 | 7/2019 | ElBsat et al. |
| 2020/0139842 | A1 | 5/2020 | Logvinov et al. |

FOREIGN PATENT DOCUMENTS

| | | |
|---|---|---|
| EP | 2911098 A1 | 8/2015 |
| JP | 2008-204073 | 9/2008 |
| WO | WO 99/01822 | 1/1999 |
| WO | WO 02/23693 | 3/2002 |
| WO | WO 2007/065135 | 6/2007 |

OTHER PUBLICATIONS

Zheng et al., "Stochastic Optimization for Unit Commitment: A Review," *IEEE Trans. on Power Systems*, 30(4):1913-1924 (Jul. 2015).
Chua Liang Su, "Optimal Demand-Side Participation in Day-Ahead Electricity Markets," The University of Manchester for the degree of Doctor of Philosophy in the Faculty of Engineering and Physical Sciences (Jul. 2007).
Jiankang Wang, "A Demand Responsive Bidding Mechanism with Price Elasticity Matrix in Wholesale Electricity Pools," MIT Department of Electrical Engineering and Computer Science in partial fulfillment of the requirements for the degree of Master of Science (May 21, 2009).
Larsen et al., "The Cobweb Effect in Balancing Markets with Demand Response," European Commission through the project EcoGrid EU (grant ENER/FP7/268199) and by Mogens Balslev's Foundation (Jan. 29, 2016).
Richard Cowart, "Efficient Reliability, the Critical Role of Demand-Side Resources in Power Systems and Markets," The National Association of Regulatory Utility Commissioners (Jun. 2001).
AEP gridSmart demonstration project, Available: http://www.gridsmartohio.com/, Aug. 2013, 1 page. (Feb. 2013).
AEP Ohio power company standard tariff, available at: https://www.aepohio.com/account/bills/rates/AEPOhioRatesTariffsOH.aspx, Issued: Aug. 28, 2015, 187 pages. (Feb. 2013).
Allcott, "Real Time Pricing and Electricity Markets," Harvard University, Feb. 5, 2009, 77 pages. (Feb. 2013).
ANSI/CEA Standard, "Modular Communications Interface for Energy Management," ANSI/CEA-2045, ISO/IEC JTC 1/SC 25 N2152, 98 pp. (Feb. 2013).
Basso, "IEEE 1547 and 2030 Standards for Distributed Energy Resources Interconnection and Interoperability with the Electricity Grid," a Technical Report published by the National Renewable Energy Laboratory Dec. 2014, 22 pp.
Bergen et al., "A Structure Preserving Model for Power System Stability Analysis," *IEEE Trans. on Power Apparatus and Systems*, pp. 25-35 (Jan. 1981).
Boch, "PJM Interconnection OPENADR 2.0 Advanced Technology Resource Pilot," 5 pp. (Dec. 2014).
Borenstein et al., "Diagnosing Market Power in California's Deregulated Wholesale Electricity Market," University of California Energy Institute, Power, PWP-064, 54 pp. (Aug. 2000).
Borenstein et al., "Diagnosing Market Power in California's Deregulated Wholesale Electricity Market," University of California Energy Institute, Power, PWP-064, 52 pp. (Mar. 2000).
Boyd et al., "Load Reduction, Demand Response, and Energy Efficient Technologies and Strategies," Pacific Northwest National Laboratory PNNL-18111, 44 pp. (Nov. 2008).
Brambley, "Thinking Ahead: Autonomic Buildings," *ACEEE Summer Study on the Energy Efficiency in Buildings*, vol. 7, pp. 73-86 (2002).
Brooks et al., "Demand Dispatch," *IEEE Power and Energy Magazine*, vol. 8, No. 3, pp. 20-29 (May 2010).
Callaway et al., "Achieving Controllability of Electric Loads," *Proc. IEEE*, vol. 99, No. 1, pp. 184-199 (Jan. 2011).
Callaway, "Tapping the Energy Storage Potential in Electric Loads to Deliver Load Following and Regulation, with Application to Wind Energy," *Energy Conversion and Management*, vol. 50, No. 5, pp. 1389-1400 (May 2009).
Chandley, "How RTOs Set Spot Market Prices (And How It Helps Keep the Lights On)," *PJM Interconnection*, 23 pp. (Sep. 2007).
Chao, "Price-Responsive Demand Management for a Smart Grid World," *Electr. J.*, vol. 23, No. 1, pp. 7-20 (2010).
Chassin et al., "Decentralized Coordination through Digital Technology, Dynamic Pricing, and Customer-Driven Control: The GridWise Testbed Demonstration Project," *The Electricity Journal*, vol. 21, pp. 51-59 (Oct. 2008).
Chassin et al., "Gauss-Seidel Accelerated: Implementing Flow Solvers on Field Programmable Gate Arrays," *IEEE Power Engineering Society General Meeting*, 5 pp. (Jun. 2006).
Chassin et al., "GridLAB-D: An open-source power systems modeling and simulation environment," *IEEE*, 5 pp. (Apr. 2008).
Chassin, "GridLAB-D Technical Support Document: Tape Modules Version 1.0," Pacific Northwest National Laboratory PNNL-17614, 8 pp. (May 2008).
Chassin, "GridLAB-D Technical Support Document: Commercial Modules Version 1.0," Pacific Northwest National Laboratory PNNL-17615, 8 pp. (May 2008).
Chassin, "GridLAB-D Technical Support Document: Network Module Version 1.0," Pacific Northwest National Laboratory PNNL-17616, 10 pp. (May 2008).
Chassin et al., "Load Modeling and Calibration Techniques for Power System Studies," *North American Power Symp.*, 7 pp. (Aug. 2011).
Chassin et al., "Modeling Power Systems as Complex Adaptive Systems," Pacific Northwest National Laboratory PNNL-14987, 151 pp. (Dec. 2004).
Chassin et al., "Project 2.6—Enhancement of the Whole-Building Diagnostician," Pacific Northwest National Laboratory PNNL-14383, 17 pp. (Aug. 2003).
Chassin, "The Abstract Machine Model for Transaction-based System Control," Pacific Northwest National Laboratory PNNL-14082, 28 pp. (Nov. 2002).
Chassin, "Statistical Mechanics: A Possible Model for Market-based Electric Power Control", *Proc. of the 37th Hawaii Int'l Conf. on System Sciences*, 10 pp. (Jan. 2004).
Chassin et al., "The pacific northwest demand response market demonstration," *IEEE*, 6 pp. (Jul. 2008).
Chen et al., "The Influence of Topology Changes on Inter-area Oscillation Modes and Mode Shapes," *IEEE Power and Energy Society General Meeting*, 7 pp. (Jul. 2011).
Chow et al., "A Toolbox for Power System Dynamics and Control Engineering Education and Research," *IEEE Trans. on Power Systems*, vol. 7, No. 4, pp. 1559-1564 (Nov. 1992).
Chow et al., "Power System Toolbox, Version 3.0," 123 pp. (2008).
Clearwater et al., "Thermal Markets for Controlling Building Environments," *Energy Engineering*, vol. 91, No. 3, pp. 26-56 (1994).
Daily et al., "Framework for Network Co-Simulation," *Workshop on Next-Generation Analytics for the Future Power Grid*, PowerPoint presentation, 20 pp. (Jul. 2014).
Denholm et al., "An Evaluation of Utility System Impacts and Benefits of Optimally Dispatched Plug-In Hybrid Electric Vehicles," NREL Technical Report NREL/TP-620-40293, 30 pp. (Oct. 2006).
Denton et al., "Spot Market Mechanism Design and Competitivity Issues in Electric Power", *Proc. of the 31st Hawaii International Conference on System Sciences*, vol. 3, pp. 48-56 (Jan. 1998).
Diao et al., "Deriving Optimal Operational Rules for Mitigating Inter-area Oscillations," *IEEE/PES Power Systems Conference & Exposition*, 8 pp. (Mar. 2011).

(56) References Cited

OTHER PUBLICATIONS

Diao et al., "Electric Water Heater Modeling and Control Strategies for Demand Response," *Power and Energy Society General Meeting*, 8 pp. (Jul. 2012).
Donnelly et al., "Autonomous Demand Response for Primary Frequency Regulation," PNNL-21152, 69 pp. (Jan. 2012).
Dorfler et al., "Synchronization in Complex Oscillator Networks: A Survey," *Automatica*, vol. 50, No. 6, pp. 1539-1564 (Jun. 2014).
Electric Power Research Institute, "IntelliGrid—Program 161," 2014 Research Portfolio, 23 pp. (downloaded Dec. 2014).
Electric Reliability Council of Texas, Inc., "Glossary," 59 pp. (document not dated—downloaded on Jul. 10, 2015).
Ellison et al., "Project Report: A Survey of Operating Reserve Markets in U.S. ISO/RTO-managed Electric Energy Regions," SAND2012-1000, Sandia National Laboratories, 44 pp. (Sep. 2012).
Energy Star, "Energy Star® Program Requirements—Product Specification for Residential Refrigerators and Freezers, Eligibility Criteria," Version 5.0, 10 pp. (Sep. 2014).
Fernandez et al., "Self Correcting HVAC Controls: Algorithms for Sensors and Dampers in Air-Handling Units," Pacific Northwest Laboratory PNNL-19104, 49 pp. (Dec. 2009).
Fuller et al., "Analysis of Residential Demand Response and Double-Auction Markets," *IEEE Power and Energy Society General Meeting*, 7 pp. (Jul. 2011).
Fuller et al., "Communication Simulations for Power System Applications," Modeling and Simulation of Cyber-Physical Energy Systems Workshop, 6 pp. (May 2013).
Fuller et al., "Evaluation of Representative Smart Grid Investment Grant Project Technologies: Demand Response," Pacific Northwest National Laboratory PNNL-20772, 349 pp. (Feb. 2012).
Fuller et al., "Modeling of GE Appliances: Cost Benefit Study of Smart Appliances in Wholesale Energy, Frequency Regulation, and Spinning Reserve Markets," PNNL-22128, 64 pp. (Dec. 2012).
Fuller et al., "Modeling of GE Appliances in GridLAB-D: Peak Demand Reduction," Pacific Northwest National Laboratory PNNL-21358, 157 pp. (Apr. 2012).
Gatterbauer, "Interdependencies of Electricity Market Characteristics and Bidding Strategies of Power Producers," Master's Thesis, Massachusetts Institute of Technology, 33 pp. (May 2002).
GE Energy Consulting, "PSLF—Get It Done Faster with PSLF!," downloaded from the World Wide Web, 2 pp. (2013).
Georgilakis, "Market Clearing Price Forecasting in Deregulated Electricity Markets Using Adaptively Trained Neural Networks," *Hellenic Conference on Artificial Intelligence*, vol. 3955, pp. 56-66 (2006).
Gjerstad et al., "Price Formation in Double Auctions," *Games and Economic Behavior*, vol. 22, article No. GA970576, pp. 1-29 (1998). (Document marked as Received Nov. 30, 1995).
Goldberg et al., "Measurement and Verification for Demand Response," 123 pp. (Feb. 2013).
Green Car Congress, "PG&E and Tesla to Research Smart Recharging Vehicle-to-Grid Technology," downloaded from http://www.greencarcongress.com/2007/09/pge-and-tesla-t.html, 3 pp. (Sep. 12, 2007).
Gridwise Architecture Council, "Transactive Energy Workshop Proceedings," PNNL-SA-86105, 24 pp. (May 2011).
Guttromson et al., "Residential energy resource models for distribution feeder simulation," IEEE, vol. 1, pp. 108-113 (Jul. 2003).
Hammerstrom et al., "Pacific Northwest GridWise Testbed Demonstration Projects: Part I. Olympic Peninsula Project," Pacific Northwest National Laboratory PNNL-17167, 157 pp. (Oct. 2007).
Hammerstrom et al., "Pacific Northwest GridWise Testbed demonstration Projects: Part II. Grid Friendly Appliance Project," Pacific Northwest National Laboratory PNNL-17079, 123 pp. (Oct. 2007).
Hammerstrom et al., "Standardization of a Hierarchical Transactive Control System," *Grid Interop Conf.*, 7 pp. (Nov. 2009).
Hammerstrom et al., "Standardization of a Hierarchical Transactive Control System," Grid Interop Conf., PowerPoint presentation slides, 19 pp. (Nov. 2009).
Hao et al., "How Demand Response from Commercial Buildings Will Provide the Regulation Needs of the Grid," *50th Annual Allerton Conf.*, 6 pp. (Oct. 2012).
Hatley et al., "Energy Management and Control System: Desired Capabilities and Functionality," Pacific Northwest National Laboratory PNNL-15074, 46 pp. (Apr. 2005).
Hill et al., "Stability Analysis of Multimachine Power Networks with Linear Frequency Dependent Loads," *IEEE Trans. on Circuits and Systems*, vol. 29, No. 12, pp. 840-848 (Dec. 1982).
Hô et al., "Econophysical Dynamics of Market-Based Electric Power Distribution Systems," *IEEE*, pp. 1-6 (Jan. 2006).
Holmes, "Using AMI Data for DR M&V Webcast," EPRI Powerpoint presentation, 21 pp. (May 2013).
Huang et al., "Analytics and Transactive Control Design for the Pacific Northwest Smart Grid Demonstration Project," *IEEE Int'l Conf. on Smart Grid Communications*, pp. 449-454 (Oct. 2010).
Huang et al., "MANGO—Modal Analysis for Grid Operation: A Method for Damping Improvement through Operating Point Adjustment," Pacific Northwest National Laboratory PNNL-19890, 92 pp. (Oct. 2010).
Huang et al., "Transforming Power Grid Operations," *Scientific Computing*, vol. 45, No. 5, pp. 22-27 (Apr. 2007).
"IEEE P1547.8 Recommended Practice for Establishing Methods and Procedures that Provide Supplemental Support for Implementation Strategies for Expanded Use of IEEE Standard 1547," retrieved Feb. 11, 2019 from http://grouper.ieee.org/groups/scc21/1547.8/1547.8_index.html, 1 p.
Kalsi et al., "Distributed Smart Grid Asset Control Strategies for Providing Ancillary Services," PNNL-22875, 46 pp. (Sep. 2013).
Kalsi et al., "Loads as a Resource: Frequency Responsive Demand," PNNL SA-23764, 49 pp. (Sep. 2014).
Kannberg et al., "GridWise: The Benefits of a Transformed Energy System," Pacific Northwest National Laboratory PNNL-14396, 48 pp. (Sep. 2003).
Katipamula et al., "Evaluation of Residential HVAC Control Strategies for Demand Response Programs," *ASHRAE Trans., Symp. on Demand Response Strategies for Building Systems*, 12 pp (Jan. 2006).
Katipamula et al., "Transactive Controls: A Market-Based GridWise Controls for Building Systems," Pacific Northwest National Laboratory PNNL-15921, 14 pp. (Jul. 2006).
Kiesling, "Retail Electricity Deregulation: Prospects and Challenges for Dynamic Pricing and Enabling Technologies," The Searle Center Annual Review of Regulation, 44 pp. (May 2007).
Kintner-Meyer et al., "Final Report for the Energy Efficient and Affordable Small Commercial and Residential Buildings Research Program—Project 3.3—Smart Load Control and Grid Friendly Appliances," Pacific Northwest National Laboratory PNNL-14342, 147 pp. (Jul. 2003).
Koch et al., "Modeling and Control of Aggregated Heterogeneous Thermostatically Controlled Loads for Ancillary Services," Proc. Power Systems Computation Conference, 8 pp. (Aug. 2011).
Kok et al., "Agent-based Electricity Balancing with Distributed Energy Resources, A Multiperspective Case Study," *Proc. Hawaii Int'l Conf. on System Sciences*, 10 pp. (Jan. 2008).
Kok et al., "PowerMatcher: Multiagent Control in the Electricity Infrastructure," *AAMAS*, 8 pp. (Jul. 2005).
Kundu et al., "Modeling and Control of Thermostatically Controlled Loads," Power Systems Computation Conference, 7 pp. (Aug. 2011).
LeMay et al., "An Integrated Architecture for Demand Response Communications and Control," *Hawaii Int'l Conf. on System Sciences*, 10 pp. (Jan. 2008).
Lian et al., "Distributed Hierarchical Control of Multi-area Power Systems with Improved Primary Frequency Regulation," *IEEE Annual Conf. on Decision and Control*, pp. 444-449 (Dec. 2012).
Lu et al., "A State-Queueing Model of Thermostatically Controlled Appliances," *IEEE Trans. on Power Systems*, vol. 19, No. 3, pp. 1666-1673 (Aug. 2004).
Lu et al., "Control Strategies of Thermostatically Controlled Appliances in a Competitive Electricity Market," *IEEE Proc. Power Engineering Society General Meeting*, pp. 202-207 (Jun. 2005).

(56) References Cited

OTHER PUBLICATIONS

Lu et al., "Design Considerations for Frequency Responsive Grid Friendly Appliances," *IEEE PES Trans. and Distribution Conference and Exhibition*, 6 pp. (May 2006).
Lu et al., "Grid Friendly Device Model Development and Simulation," Pacific Northwest National Laboratory PNNL-18998, 52 pp. (Nov. 2009).
Lu et al., "Modeling Uncertainties in Aggregated Thermostatically Controlled Loads Using a State Queueing Model," *IEEE Trans. on Power Systems*, vol. 20, No. 2, pp. 725-733 (May 2005).
Lu et al., "Reputation-Aware Transaction Mechanisms in Grid Resource Market," *IEEE Sixth Int'l Conf. on Grid and Cooperative Computing*, 6 pp. (Aug. 2007).
Lu et al., "Simulating Price Responsive Distributed Resources," *IEEE*, vol. 3, pp. 1538-1543 (Oct. 2004).
Lundstrom "An Advanced Platform for Development and Evaluation of Grid Interconnection Systems Using Hardware-In-The-Loop", © Blake R. Lundstrom, 2013, 149 pp.
Ma, et al., "Dynamics of electricity markets with unknown utility functions: An extremum seeking control approach," in 2014 11th IEEE International Conference on Control & Automation (ICCA), 2014, pp. 302-307.
Marinovici et al., "Distributed Hierarchical Control Architecture for Transient Dynamics Improvement in Power Systems," *IEEE Trans. on Power Systems*, vol. 28, No. 3, pp. 3065-3074 (2013).
Mathieu et al., "State Estimation and Control of Electric Loads to Manage Real-Time Energy Imbalance," *IEEE Trans. on Power Systems*, vol. 28, No. 1, pp. 430-440 (Feb. 2013).
Melton, "A Transactive Control Approach to Engaging Responsive Assets," Connectivity Week, PowerPoint presentation slides, 14 pp. (May 2010).
Melton et al., "Transactive Control: An Approach for Widespread Coordination of Responsive Smart Grid Assets," Pacitic Northwest Smart Grid Demonstration Project PowerPoint presentation slides, 19 pp. (May 2010).
Melton, "Transactive Control in Electricity Delivery," Grid-Interop 2010, Pacific Northwest Smart Grid Demonstration Project, PowerPoint presentation slides, 15 pp. (Nov. 2010).
Melton, "Using Transactive Control to Engage Distributed Energy Resources," Connectivity Week, PowerPoint presentation slides, 10 pp. (May 2011).
Molina-Garcia et al., "Decentralized Demand-side Contribution to Primary Frequency Control," *IEEE Trans. on Power Systems*, vol. 26, No. 1, pp. 411-419 (2011).
Moya et al., "A Hierarchical Framework for Demand-Side Frequency Control," *American Control Conference*, pp. 52-57 (Jun. 2014).
Moya et al., "A Hierarchical Framework for Demand-Side Frequency Control," *American Control Conference*, PowerPoint presentation, 65 pp. (Jun. 2014).
Nanduri et al., "A Methodology for Evaluating Auction Based Pricing Strategies in Deregulated Energy Markets," Working Paper, 12 pp. (2005).
Nanduri, et al., "A Reinforcement Learning Model to Assess Market Power Under Auction-Based Energy Pricing," *IEEE Trans. on Power Systems*, vol. 22, No. 1, pp. 85-95 (Feb. 2007).
Narang et al., "IEEE Smart Grid Tutorial", an IEEE Presentation dated Jan. 18, 2018, 31 pp.
Nicolaisen et al., "Market Power and Efficiency in a Computational Electricity Market With Discriminatory Double-Auction Pricing," ISU Economic Report No. 52, 26 pp. (Aug. 27, 2000; revised Aug. 24, 2001).
Ns-3 Network Simulator, ns-3 Manual, Release ns-3.16, 126 pp. (Dec. 2012).
Pacific Northwest National Laboratory, "GridLAB-D—A Unique Tool to Design the Smart Grid," PNNL-SA-92325, 4 pp. (Nov. 2012).
PJM Interconnection, "Description of Regulation Signals," downloaded from the World Wide Web, 1 p. (document not dated—downloaded on Jul. 14, 2015).
PJM Interconnection, "Markets & Operations," downloaded from the World Wide Web, 3 pp. (document not dated—downloaded on Jul. 14, 2015).
PJM Interconnection, Regulation Performance Senior Task Force, "Performance Based Regulation: Year One Analysis," 22 pp. (Oct. 2013).
Plott et al., "Instability of Equilibria in Experimental Markets: Upward-sloping Demands, Externalities, and Fad-like Incentives," *Southern Economic Journal*, vol. 65 (3), 23 pp. (Jan. 1999).
Pourebrahimi et al., "Market-based Resource Allocation in Grids," *IEEE Int'l Conf. on e-Science and Grid Computing*, 8 pp. (2006).
Power World Corporation, "Simulator Version 14, User's Guide," 1517 pp. (2009).
Pratt et al., "Potential Impacts of High Penetration of Plug-in Hybrid Vehicles on the U.S. Power Grid," DOE/EERE PHEV Stakeholder Workshop, 14 pp. (Jun. 2007).
Satayapiwat et al., "A Utility-based Double Auction Mechanism for Efficient Grid Resource Allocation," *Int'l Symp. on Parallel and Distributed Processing with Applications* (ISPA '08), pp. 252-260 (Dec. 10-12, 2008).
Schneider et al., "A Taxonomy of North American Radial Distribution Feeders," *IEEE Power & Energy Society General Meeting*, 6 pp. (Jul. 2009).
Schneider et al., "Analysis of Distribution Level Residential Demand Response," *IEEE/PES Power System Conference and Exposition*, 6 pp. (Mar. 2011).
Schneider et al., "Detailed End Use Load Modeling for Distribution System Analysis," *IEEE Power and Energy Society General Meeting*, 7 pp. (Jul. 2010).
Schneider et al., "Distribution Power Flow for Smart Grid Technologies," *IEEE/PES Power System Conference and Exhibition*, 7 pp. (Mar. 2009).
Schneider et al., "Evaluation of Conservation Voltage Reduction (CVR) on a National Level," Pacific Northwest National Laboratory PNNL-19596, 114 pp. (Jul. 2010).
Schneider et al., "Modern Grid Strategy: Enhanced GridLAB-D Capabilities Final Report," Pacific Northwest National Laboratory PNNL-18864, 30 pp. (Sep. 2009).
Schneider et al., "Multi-State Load Models for Distribution System Analysis," IEEE Trans. on Power Systems, vol. 26, No. 4, pp. 2425-2433 (Nov. 2011).
Schneider et al., "Voltage Control Devices on the IEEE 8500 Node Test Feeder," *IEEE PES Transmission & Distribution Conference & Exposition*, 6 pp. (Apr. 2010).
Shu et al., "Dynamic Incentive Strategy for Voluntary Demand Response Based on TDP Scheme," *Proc. IEEE Asia-Pacific Signal & Information Processing Association Annual Summit Conf.*, 6 pp. (Dec. 2012).
Siemens, "Power Transmission System Planning Software," downloaded from the World Wide Web, 8 pp. (downloaded on Oct. 27, 2016).
Siljak et al., "Robust Decentralized Turbine/Govemor Control Using Linear Matrix Inequalities," *IEEE Trans. on Power Systems*, vol. 17, No. 3, pp. 715-722 (Aug. 2002).
Siljak et al., "Robust Stabilization of Nonlinear Systems: The Lmi Approach," *Mathematical Problems in Engineering*, vol. 6, No. 5, pp. 461-493 (Jun. 2000).
Singh et al., "Effects of Distributed Energy Resources on Conservation Voltage Reduction (CVR)," *IEEE Power and Energy Society General Meeting*, 7 pp. (Jul. 2011).
Subbarao et al., "Transactive Control and Coordination of Distributed Assets for Ancillary Services," PNNL-22942, 56 pp. (Sep. 2013).
Taylor et al., "GridLAB-D Technical Support Document: Residential End-Use Module Version 1.0," Pacific Northwest National Laboratory PNNL-17694, 30 pp. (Jul. 2008).
Trudnowski et al., "Overview of Algorithms for Estimating Swing Modes from Measured Responses," *Power Energy Society General Meeting*, 8 pp. (Jul. 2009).
Varaiya et al., "Direct Methods for Transient Stability Analysis of Power Systems: Recent Results," *Proc. IEEE*, vol. 73, No. 12, pp. 1703-1715 (1985).

(56) References Cited

OTHER PUBLICATIONS

Widergren et al., "AEP Ohio gridSMART® Demonstration Project: Real-Time Pricing Demonstration Analysis," PNNL-23192, 92 pp. (Feb. 2014).
Widergren et al., "Residential Real-time Price Response Simulation," *IEEE Power and Energy Society General Meeting*, pp. 3074-3078 (Jul. 2011).
Wikipedia, "Spec:Market—Market Module Overview," downloaded from the World Wide Web, 19 pp. (last modified Jan. 2013).
Yin et al., "A Novel Double Auction Mechanism for Electronic Commerce: Theory and Implementation," *IEEE Proc. of the Third Int'l Conf. on Machine Learning and Cybernetics*, pp. 53-58 (Aug. 2004).
Zhang et al., "Aggregated Modeling and Control of Air Conditioning Loads for Demand Response," *IEEE Trans. on Power Systems*, vol. 28, No. 4, pp. 4655-4664 (Nov. 2013).
Zhao et al., "Fast Load Control with Stochastic Frequency Measurement," *IEEE Power and Energy Society General Meeting*, 8 pp. (2012).
Zhao et al., "Frequency-based Load Control in Power Systems," *American Control Conf.*, pp. 4423-4430 (2012).
Zhao et al., "Swing Dynamics as Primal-dual Algorithm for Optimal Load Control," *IEEE Int'l Conf. on Smart Grid Comm.*, pp. 570-575 (2012).
Zimmerman et al., "A 'SuperOPF' Framework," *FERC Technical Conf. on Enhanced Optimal Power Flow Models*, PowerPoint presentation, 39 pp. (Jun. 2010).

* cited by examiner

200

400

700

800

900

1000

1400

4400

4700

4800

5000

5300

5400

5600

5700

Dow Jones MID-C Hourly Index

| | Price | Volume | High | Low |
|---|---|---|---|---|
| Hour 1 | $20.83 | 369 | 25 | 13 |
| Hour 2 | $23.30 | 169 | 25 | 13 |
| Hour 3 | $22.31 | 317 | 25 | 10 |
| Hour 4 | $22.72 | 346 | 28 | 10 |
| Hour 5 | $27.73 | 294 | 38 | 23 |
| Hour 6 | $34.43 | 140 | 35 | 33 |
| Hour 7 | $33.58 | 347 | 40 | 30 |
| Hour 8 | $34.89 | 332 | 40 | 32 |
| Hour 9 | $34.93 | 200 | 40 | 30 |
| Hour 10 | $35.83 | 240 | 40 | 30 |
| Hour 11 | $32.76 | 170 | 38 | 30 |
| Hour 12 | $32.76 | 170 | 38 | 30 |
| Hour 13 | $28.59 | 71 | 38 | 25 |
| Hour 14 | $28.59 | 71 | 38 | 25 |
| Hour 15 | $30.10 | 50 | 38 | 25 |
| Hour 16 | $25.07 | 70 | 38 | 15 |
| Hour 17 | $22.26 | 167 | 38 | 15 |
| Hour 18 | $27.62 | 226 | 38 | 18 |
| Hour 19 | $28.98 | 307 | 38 | 18 |
| Hour 20 | $30.47 | 154 | 38 | 25 |
| Hour 21 | $26.03 | 310 | 32 | 20 |
| Hour 22 | $20.71 | 175 | 25 | 20 |
| Hour 23 | $29.45 | 55 | 32 | 25 |
| Hour 24 | $20.97 | 62 | 25 | 15 |

On-Peak Average (7-22)
$29.57
Off-Peak Average (1-6, 23-24)
$25.22

For Additional information contact. The Transaction Based Index Team (609) 520-7374

Dow Jones Indexes

5800

6100

6200

6300

6400

6500

6600

6700

6800

6900

7000

7100

7200

7300

7400

7500

7600

7700

7800

7900

8000

8100

8200

8300

8400

8700

8800

9200

9400

9500

| | Signal | Byte | Binary Levels | Three Levels | Four Levels | ... | Continuum |
|---|---|---|---|---|---|---|---|
| ➔ Increase Generation / Decrease Consumption ➔ | 127 | 0111 \| 1111 | Level #2 of 2 (Generate / Curtail Load) | Level #3 of 3 | Level #4 / 4 | ... | 100.0% |
| | 126 | 0111 \| 1110 | | | | | 99.2% |
| | ... | ... | | | | | ... |
| | 96 | 0110 \| 0000 | | | | | 75.6% |
| | 95 | 0101 \| 1111 | | | Level #3 of 4 | | 74.8% |
| | ... | ... | | | | | ... |
| | 85 | 0101 \| 0101 | | | | | 66.9% |
| | 84 | 0101 \| 0100 | | Level #2 of 3 | | | 66.1% |
| | ... | ... | | | | | ... |
| | 64 | 0100 \| 0000 | | | | | 50.4% |
| | 63 | 0011 \| 1111 | Level #1 of 2 (Normal) | | Level #2 of 4 | | 49.6% |
| | ... | ... | | | | | ... |
| | 43 | 0010 \| 1011 | | | | | 33.9% |
| | 42 | 0010 \| 1010 | | Level #1 of 3 | | | 33.1% |
| | ... | ... | | | | | ... |
| | 32 | 0010 \| 0000 | | | | | 25.2% |
| | 31 | 0001 \| 1111 | | | Level #1 / 4 | | 24.4% |
| | ... | ... | | | | | ... |
| | 1 | 0000 0001 | | | | | 0.8% |
| | 0 | 0000 \| 0000 | | | | | 0.0% |
| ➔ Decrease Generation / Increase Consumption ➔ | -0 | 1111 \| 1111 | Level #1 of 2 (Normal) | Level #1 of 3 | Level #1 / 4 | ... | -0.0% |
| | -1 | 1111 \| 1110 | | | | | -0.8% |
| | ... | ... | | | | | ... |
| | -31 | 1110 \| 0000 | | | | | -24.4% |
| | -32 | 1101 \| 1111 | | | Level #2 of 4 | | -25.2% |
| | ... | ... | | | | | ... |
| | -42 | 1101 \| 0101 | | | | | -33.1% |
| | -43 | 1101 \| 0100 | | Level #2 of 3 | | | -33.9% |
| | ... | ... | | | | | ... |
| | -63 | 1100 \| 0000 | | | | | -49.6% |
| | -64 | 1011 \| 1111 | Level #2 of 2 (Curtail Generation / Add Load) | | Level #3 of 4 | | -50.4% |
| | ... | ... | | | | | ... |
| | -84 | 1010 \| 1011 | | | | | -66.1% |
| | -85 | 1010 \| 1010 | | Level #3 of 3 | | | -66.9% |
| | ... | ... | | | | | ... |
| | -95 | 1010 \| 0000 | | | | | -74.8% |
| | -96 | 1001 \| 1111 | | | Level #4 / 4 | | -75.6% |
| | ... | ... | | | | | ... |
| | -126 | 1000 \| 0001 | | | | | -99.2% |
| | -127 | 1000 \| 0000 | | | | | -100.0% |

FIG. 101

TRANSACTIVE CONTROL FRAMEWORK AND TOOLKIT FUNCTIONS

CROSS REFERENCE TO RELATED APPLICATION

This application is a divisional of U.S. application Ser. No. 14/108,078, filed on Dec. 16, 2013, now U.S. Pat. No. 10,740,775, which claims the benefit of U.S. Provisional Application 61/737,726 filed on Dec. 14, 2012, and entitled "TRANSACTIVE CONTROL FRAMEWORK AND TOOLKIT FUNCTIONS", both of which are hereby incorporated herein by reference.

ACKNOWLEDGMENT OF GOVERNMENT SUPPORT

This invention was made with government support under DE-OE0000190 awarded by the Department of Energy. The government has certain rights in the invention.

FIELD

This application relates generally to the field of power grid management and control.

SUMMARY

Disclosed below are representative embodiments of methods, apparatus, and systems for facilitating operation and control of a resource distribution system (such as a power grid). For example, embodiments of the disclosed technology can be used to improve the resiliency of a power grid and to allow for improved consumption of renewable resources. Further, certain implementations facilitate a degree of decentralized operations not available elsewhere.

"Transactive control and coordination" features market-like mechanisms for the selection of resources and demand-side assets in an electric power grid. The disclosed technology concerns new embodiments of transactive control and coordination. Such embodiments allow for transactive control and coordination where: (1) the system is implemented over large geographic areas; (2) the system is implemented across multiple grid regulation and/or business boundaries; (3) a large diversity of participating resources and loads are to be coordinated; and/or (4) the system desirably functions at multiple scales (e.g., both large areas of the transmission region and at individual devices).

Locations on the electric power grid that perform one or more of the disclosed techniques of are sometimes referred to herein as "transactive nodes." Further, embodiments of the disclosed technology are described in terms of an "algorithmic framework," where the highest-level responsibilities that are to be conducted at a transactive node are discussed. In certain embodiments, two functional blocks within the algorithmic framework allow for the further incorporation of (1) "toolkit resource functions" and/or (2) "toolkit load functions." For example, depending on the unique features extant at a given transactive node (e.g., certain types of generation resources, inelastic electrical loads, other loads that might be responsive to a price-like signal in a demand-responsive way), one or more toolkit functions and their unique functionality may be incorporated. These toolkit functions can respectively modify the formulation of the price-like signal by the framework, or modify the amount of load that is to be generated or consumed by assets at this grid location. The functions can also advise the control of responsive assets.

Embodiments of the disclosed technology can be used to realize the fully distributed coordination of electrical power grids. In certain embodiments, such coordination can be accomplished by having nearest circuit neighbors exchange transactive signals. Desirably, these signals include not only price and quantity signals for an imminent time interval, but also predicted signals for future time intervals. In certain implementations, at least two subclasses of transactive signal are used—one price-like and the other representing power. The transactive signal that represents power (the TFS) is usefully aggregated where the power is also combined in a circuit and represents the power flow between circuit neighbors; a price-like signal (the TIS) may fairly represent costs of multiple resources and incentives if such costs are proportionately added where the resources are injected into and where the incentives occur in the electrical circuit.

In certain implementations, and in contrast to system utilizing explicit bilateral markets, some of the disclosed systems use planned energy consumption as the feedback.

Also disclosed herein are tools and techniques for computing distributed relative power flow. For example, a distributed relative power flow method is formulated for electrical power systems. In certain embodiments, a node is allowed to allocate its generation or load changes among the power flows with its neighbors without the global knowledge of the power system. Further, in some embodiments, decisions are made independently at distributed locations to respond to incentive signals from distributed transactive control. The impacts of these decisions on power flow are desirably predicted, which is presently challenging to do with conventional power flow formulations. In certain embodiments, parallel computation is an inherent feature of the disclosed formulation.

Conventional power flow solvers, usually located at a central location, rely on the global knowledge of the power system to predict the impacts of generation or load changes on the power flow. However, it is challenging to predict the power flow by using such solvers at distributed locations, where only information from neighbor nodes may be available. This is not the case with embodiments of the disclosed distributed relative power flow formulations.

Embodiments of the disclosed power flow formulation can be used in a variety of environments. For example, such implementations can be used as part of a "smart grid" system, which heavily relies on two-way communication and transactive control.

Decisions to respond to incentive signals from transactive control cause power flow changes, which can be predicted in parallel at distributed locations, without knowledge of the entire power system.

Details of exemplary non-limiting embodiments of the disclosed technology are disclosed and illustrated in the sections below. Any one or more of the features, aspects, and/or functions described in any of the sections below or above can be used alone or in any combination or sub-combination with one another.

Embodiments of the disclosed methods can be performed using computing hardware, such as a computer processor or an integrated circuit. For example, embodiments of the disclosed methods can be performed by software stored on one or more non-transitory computer-readable media (e.g., one or more optical media discs, volatile memory components (such as DRAM or SRAM), or nonvolatile memory or storage components (such as hard drives)). Such software can be executed on a single computer or on a networked computer (e.g., via the Internet, a wide-area network, a local-area network, a client-server network, a cloud-based network, or other such network). Embodiments of the disclosed methods can also be performed by specialized computing hardware (e.g., one or more application specific integrated circuits ("ASICs") or programmable logic devices (such as field programmable gate arrays ("FPGAs")) configured to perform any of the disclosed methods). Additionally, any intermediate or final result created or modified using any of the disclosed methods can be stored on a non-transitory storage medium (e.g., one or more optical media discs, volatile memory or storage components (such as DRAM or SRAM), or nonvolatile memory or storage components (such as hard drives)) and are considered to be within the scope of this disclosure. Furthermore, any of the software embodiments (comprising, for example, computer-executable instructions which when executed by a computer cause the computer to perform any of the disclosed methods), intermediate results, or final results created or modified by the disclosed methods can be transmitted, received, or accessed through a suitable communication means.

The foregoing and other objects, features, and advantages of the invention will become more apparent from the following detailed description, which proceeds with reference to the accompanying figures.

BRIEF DESCRIPTION OF THE DRAWINGS

FIG. 101 is table illustrating an interpretation of a recommended advisory signal.

DETAILED DESCRIPTION

1 General Considerations

Figure 1:
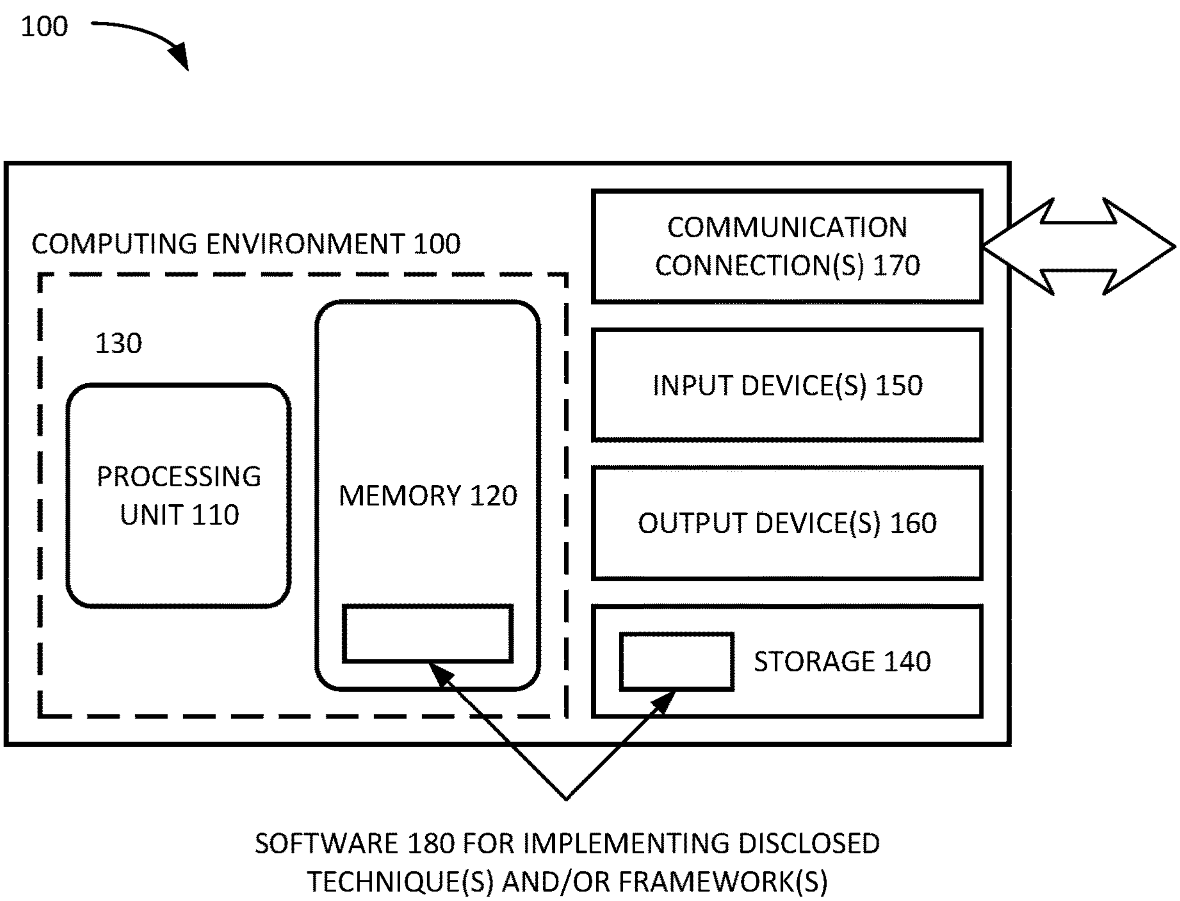
FIG. 1 is a generalized example of a suitable computing hardware environment for a computing device with which several of the described embodiments can be implemented.

Disclosed below are representative embodiments of methods, apparatus, and systems for facilitating operation and control of a resource distribution system (such as a power grid). The disclosed methods, apparatus, and systems should not be construed as limiting in any way. Instead, the present disclosure is directed toward all novel and nonobvious features and aspects of the various disclosed embodiments, alone and in various combinations and subcombinations with one another. Furthermore, any one or more features or aspects of the disclosed embodiments can be used in various combinations and subcombinations with one another. The disclosed methods, apparatus, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "determine" and "generate" to describe the disclosed methods. These terms are high-level abstractions of the actual operations that are performed. The actual operations that correspond to these terms may vary depending on the particular implementation and are readily discernible by one of ordinary skill in the art. Furthermore, as used herein, the term "and/or" means any one item or combination of items in the phrase.

Any of the disclosed methods can be implemented using computer-executable instructions stored on one or more computer-readable media (e.g., non-transitory computer-readable media, such as one or more optical media discs, volatile memory components (such as DRAM or SRAM), or nonvolatile memory components (such as hard drives)) and executed by a processor in a computing device (e.g., a computer, such as any commercially available computer). Any of the computer-executable instructions for implementing the disclosed techniques as well as any intermediate or final data created and used during implementation of the disclosed systems can be stored on one or more computer-readable media (e.g., non-transitory computer-readable media). The computer-executable instructions can be part of, for example, a dedicated software application or as part of a software agent's transport payload that is accessed or downloaded via a network (e.g., a local-area network, a wide-area network, a client-server network, or other such network).

Such software can be executed on a single computer (e.g., a computer embedded in or electrically coupled to a sensor, controller, or other device in the power grid) or in a network environment. For example, the software can be executed by a computer embedded in or communicatively coupled to a sensor for measuring electrical parameters of a power line or electrical device, a synchrophasor sensor, a smart meter, a control unit for a home or household appliance or system (e.g., an air-conditioning unit; heating unit; heating, ventilation, and air conditioning ("HVAC") system; hot water heater; refrigerator; dish washer; washing machine; dryer; oven; microwave oven; pump; home lighting system; electrical charger; electric vehicle charger; home electrical system; or any other electrical system having variable performance states), a control unit for a distributed generator (e.g., photovoltaic arrays, wind turbines, or electric battery charging systems), a control unit for controlling the distribution or generation of power along the power grid (e.g., a transformer, switch, circuit breaker, generator, resource provider, or any other device on the power grid configured to perform a control action), and the like. Further, any of the control units can also include or receive information from one or more sensors. Any of the transactive nodes described herein can be formed by such sensors, meters, control units, and/or other such units.

For clarity, only certain selected aspects of the software-based embodiments are described. Other details that are well known in the art are omitted. For example, it should be understood that the software-based embodiments are not limited to any specific computer language or program. For instance, embodiments of the disclosed technology can be implemented by software written in C++, Java, Perl, JavaScript, Adobe Flash, Python, JINI, .NET, Lua or any other suitable programming language. Likewise, embodiments of the disclosed technology are not limited to any particular computer or type of hardware. Details of suitable computers and hardware are well known and need not be set forth in detail in this disclosure. Furthermore, any of the software-based embodiments (comprising, for example, computer-executable instructions which when executed by a computer cause the computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods can also be implemented by specialized computing hardware that is configured to perform any of the disclosed methods. For example, the disclosed methods can be implemented by a computing device comprising an integrated circuit (e.g., an application specific integrated circuit ("ASIC") or programmable logic device ("PLD"), such as a field programmable gate array ("FPGA")). The integrated circuit or specialized computing hardware can be embedded in or directly coupled to a sensor, control unit, or other device in the power grid. For example, the integrated circuit can be embedded in or otherwise coupled to a synchrophasor sensor, smart meter, control unit for a home or household appliance or system, a control unit for a distributed generator, a control unit for controlling power distribution on the grid, or other such device.

FIG. 1 illustrates a generalized example of a suitable computing hardware environment 100 for a computing device with which several of the described embodiments can be implemented. For example, any of the transactive nodes disclosed herein can be implemented by a computing hardware environment, such computing environment 100. The computing environment 100 is not intended to suggest any limitation as to the scope of use or functionality of the disclosed technology, as the techniques and tools described herein can be implemented in diverse general-purpose or special-purpose environments that have computing hardware.

With reference to FIG. 1, the computing environment 100 includes at least one processing unit 110 and memory 120. In FIG. 1, this most basic configuration 130 is included within a dashed line. The processing unit 110 executes computer-executable instructions. In a multi-processing system, multiple processing units execute computer-executable instructions to increase processing power. The memory 120 may be volatile memory (e.g., registers, cache, RAM), non-volatile memory (e.g., ROM, EEPROM, flash memory), or some combination of the two. The memory 120 stores software 180 for implementing one or more of the described techniques for operating or using the disclosed systems. For example, the memory 120 can store software 180 for implementing any of the disclosed techniques.

The computing environment can have additional features. For example, the computing environment 100 includes storage 140, one or more input devices 150, one or more output devices 160, and one or more communication connections 170. An interconnection mechanism (not shown) such as a bus, controller, or network interconnects the components of the computing environment 100. Typically, operating system software (not shown) provides an operating environment for other software executing in the computing environment 100, and coordinates activities of the components of the computing environment 100.

The storage 140 can be removable or non-removable, and includes magnetic disks, magnetic tapes or cassettes, CD-ROMs, DVDs, or any other tangible storage medium which can be used to store information in a non-transitory manner and which can be accessed within the computing environment 100. The storage 140 can also store instructions for the software 180 implementing any of the described techniques, systems, or environments. The input device(s) 150 can be a touch input device such as a keyboard, mouse, touch screen, pen, or trackball, a voice input device, a scanning device, or another device that provides input to the computing environment 100. The output device(s) 160 can be a display, touch screen, printer, speaker, or another device that provides output from the computing environment 100.

The communication connection(s) 170 enable communication over a communication medium to another computing entity. The communication medium conveys information such as computer-executable instructions, an agent transport payload, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The various methods, systems, and interfaces disclosed herein can be described in the general context of computer-executable instructions stored on one or more computer-readable media. Computer-readable media are any available media that can be accessed within or by a computing environment but do not encompass transitory signals or carrier waves. By way of example, and not limitation, with the computing environment 100, computer-readable media include tangible non-transitory computer-readable media, such as memory 120 and storage 140.

The various methods, systems, and interfaces disclosed herein can also be described in the general context of computer-executable instructions, such as those included in program modules, being executed in a computing environment on a target processor. Generally, program modules include routines, programs, libraries, objects, classes, components, data structures, and the like that perform particular tasks or implement particular abstract data types. The functionality of the program modules may be combined or split between program modules as desired in various embodiments.

Computer-executable instructions for program modules may be executed within a local or distributed computing environment. As noted, the disclosed technology is implemented at least part using a network of computing devices (e.g., any of the computing device examples described above). The network can be implemented at least in part as a Local Area Network ("LAN") using wired networking (e.g., the Ethernet IEEE standard 802.3 or other appropriate standard) or wireless networking (e.g. one of the IEEE standards 802.11a, 802.11b, 802.11g, or 802.11n or other appropriate standard). Furthermore, at least part of the network can be the Internet or a similar public network.

1.1 Acronyms and Abbreviations

This disclosure sometimes makes reference to the following acronyms:

HVAC heating, ventilating and air conditioning
IST interval start time
LMP locational marginal price
RMS root mean square
TCS transactive coordination system
TFS transactive feedback signal
TIS transactive incentive signal
UTC Coordinated Universal Time

1.2 Terms

This disclosure will sometimes make reference to the following terms, whose non-limiting definitions are provided below. These definitions do not necessarily apply in all instances and may vary depending on the context.

| | |
|---|---|
| advisory control signal | A signal that is transmitted by a transactive node to its local responsive asset systems advising these systems to change their energy consumption or generation |
| asset model | A usually dynamic model of an asset system (e.g., a population of electric water heaters) that can predict its change in load or change in supply in light of an event (e.g., a curtailment of the asset system). |
| locational marginal price | A unit price of energy that represents the spatial and temporal price of the marginal supply resource. Today, locational marginal price is calculated centrally. |
| non-transactive energy | Refers to energy that can be exchanged between transactive nodes of a transactive coordination system and entities that reside outside the boundaries of the transactive coordination system |
| relaxation criterion | A criterion against which changes in subsequent transactive signals are compared. If changes are significant based on this criterion, then new transactive signals are calculated and published. |
| transactive coordination system | A distributed system-of-systems in which transactive nodes coordinate the balance between energy resources and loads by communicating transactive signals |
| toolkit function | A function that is invoked by the transactive node object model to represent the unique set of incentives, resources, and loads that are managed at the transactive node. Includes two subclasses-toolkit resource and incentive functions and toolkit load functions. |
| toolkit load function | One type of a plurality of toolkit functions that calculates load, change in elastic load, and control signals for the specific demand-side assets at a transactive node |

-continued

| | |
|---|---|
| toolkit resource and incentive function | One type of a plurality of toolkit functions that calculates incentive costs, supply energy, and energy costs for the specific incentives and supply resources at a transactive node. Includes toolkit resource functions and toolkit incentive functions. |
| transactive energy | Energy that is exchanged between transactive nodes of a transactive coordination system |
| transactive feedback signal | One of a plurality of subclasses of transactive signals. Represents predicted aggregate power flow between two neighboring transactive nodes. |
| transactive incentive signal | One of a plurality of subclasses of transactive signal. Represents the delivered unit cost of energy at a system location. |
| transactive neighbors | Adjacent transactive nodes that exchange energy and are therefore obligated to exchange transactive signals with one another. This term may be equivalently stated as neighboring transactive nodes or circuit neighbors. |
| transactive node | A node that participates in a transactive coordination system to send and receive transactive signals |
| transactive node object model | The formal state model that resides at a transactive node and defines its behaviors, interactions, and interfaces. This term usually refers to the common responsibilities of transactive nodes that are interoperable, standardized. |
| transactive signal | A class of signal shared between transactive neighbors |

2 Introduction

Figure 2:
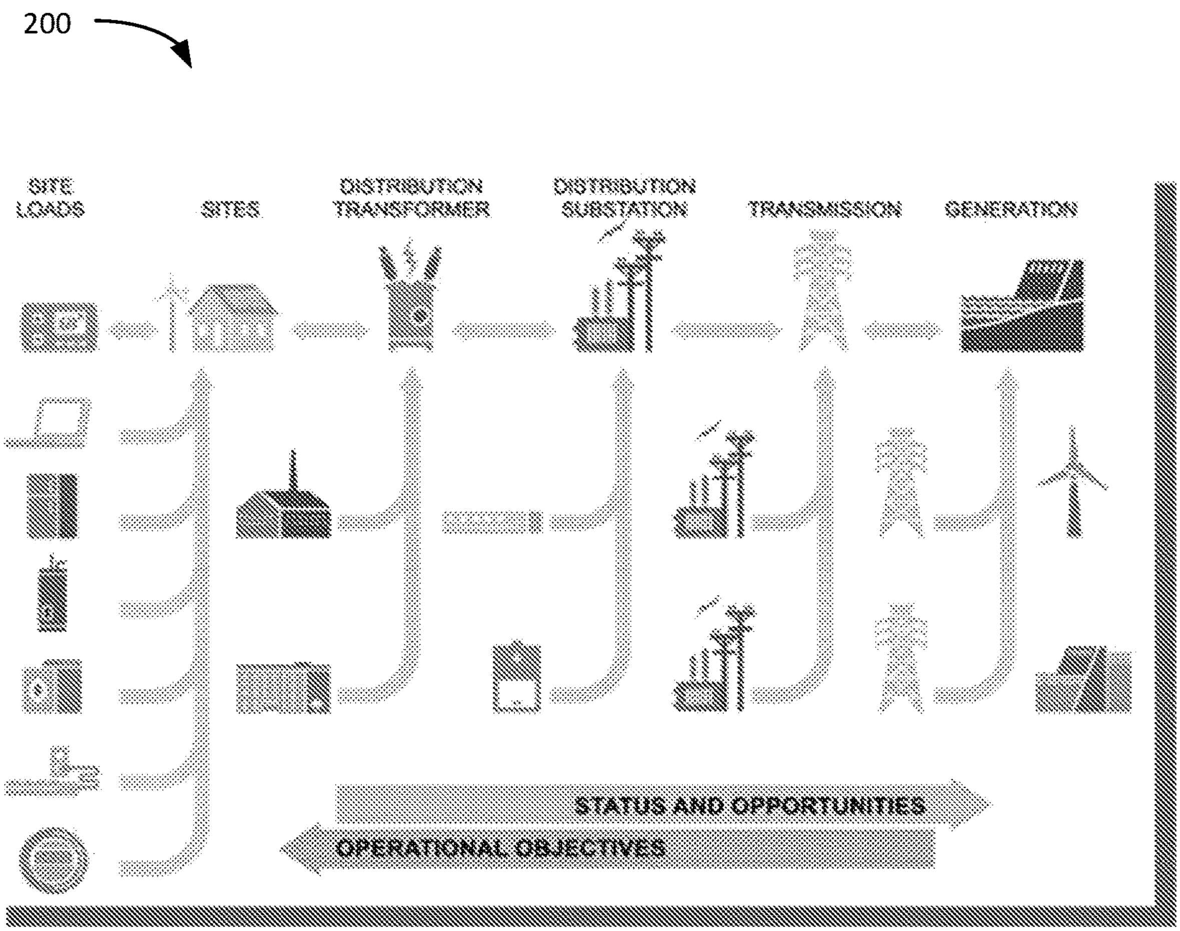
FIG. 2 is a block diagram illustrating the transactive control concept.

This section introduces some of the basic concepts of the disclosed transactive control and coordination technology. FIG. 2 is a block diagram illustrating a general system 200 for implementing transactive control. The figure represents a simple electric power system topology 200 with power flowing from generation resources on the right through the components of the system to loads on the left.

At any point in the topology where one can affect the flow of power, operational objectives may be taken into account. In the transactive control technique of the disclosed technology, these objectives can be monetized and included in a signal referred to as the "transactive incentive signal" (TIS). If at a given point, one should reduce load below that point, then the monetization computations will result in altering (e.g., raising) the value of the TIS. If, on the other hand, it is beneficial to add load below that point, then the computations will alter (e.g., lower) the value of the TIS in the opposite direction. In other words, by using embodiments of the disclosed transactive system, one can represent operational objectives to responsive elements of the system and incentivize them to change their behavior in response to the monetized objectives. In FIG. 2, this is represented by the arrow from right-to-left labeled "operational objectives."

The responsive elements of the system also play an active role through making information available about their planned consumption of electric power. This is represented by the arrow from left-to-right labeled "status and opportunities." In embodiments of the disclosed technology, information about the future forecast of the plans for generation resources and constraints associated with the flow of power through the system interact with temporally aligned information about the planned behavior or loads or other responsive resources. Local storage systems are an example of another type of responsive resource that may be thought of as being a positive, neutral (not consuming), or negative load.

With this general background, the following additional features of the transactive control and coordination system will now be introduced.

Transactive Control: A single, integrated, smart grid incentive signaling approach utilizing an economic signal as the primary basis for communicating the desire to change the operational state of responsive assets.

Transactive Incentive Signal (TIS): A representation of the actual delivered cost of electric energy at a specific system location (e.g., at a transactive node). Includes both the current value and a forecast of future values. In certain embodiments, the current incentive signal value refers to the value for the imminent (or next-to-occur) interval.

Transactive Feedback Signal (TFS): A representation of the net electric load at a specific system location (e.g., between neighboring transactive nodes). Includes both the current value and a forecast of future values. In certain embodiments, the current value refers to the feedback signal value for the imminent (or next-to-occur) interval.

2.1 What is a Transactive Control Node?

The basic operational unit of embodiments of the illustrated transactive control technique is the transactive control node. In certain implementations, the transactive control node responds to system conditions as represented by incoming Transactive Incentive Signals and Transactive Feedback Signals through (a) incorporation of local asset status and other local information; (b) decisions about behavior of local assets; and/or (c) updating both transactive incentive and feedback signals. Inputs are used by the node to compute incentive and feedback signals. Further, in some embodiments, each signal is a sequence of forecasts for a time-series, so inputs will also be sequences of future (forecast/planned) values Transactive control nodes may be implemented any place in the power system topology, preferably where it is possible to affect the flow of power in the system. This is true in both the bulk power system and carries through into the distribution system down to the end-use level. For example, embodiments of the disclosed technology can be used in a large region of the power grid (e.g., a large interconnected region of the transmission grid, sometimes referred to as a transmission zone), a distribution utility service territory, or for any other sized region, area, or space (e.g., at the substation level, at the feeder level, at a building level, or even at the household level. Transactive control nodes may be implemented down to the level of individual devices. One may also implement transactive control nodes that manage a collection of devices as an aggregated responsive asset or asset system.

2.2 An End-to-End View

Figure 3:
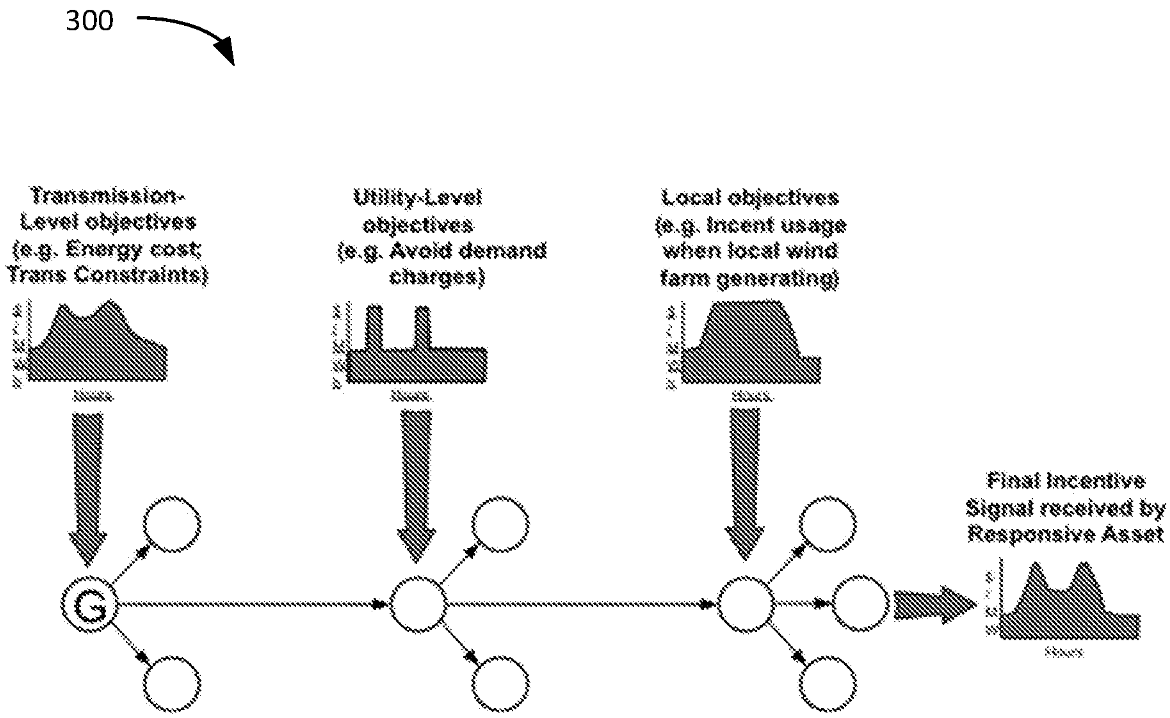
FIG. 3 is an illustration of the node-by-node changes to a transactive incentive signal as it flows from generation to end-use.

FIG. 3 is an illustration 300 of the node-by-node changes to a transactive incentive signal (TIS) as it flows from generation to end-use. In particular, FIG. 3 provides a high level end-to-end view of the flow of transactive incentive signals through a transactive control and coordination system. In the figure, the TIS begins at a generation resource with the TIS values representing the generation cost. To simplify the example, transmission costs are also included so that when the signal is received at the utility-level, it represents the full cost of power delivered to the utility.

At the utility level, the utility has the opportunity to introduce local information and operational objectives. For example, the utility may wish to avoid demand charges associated with peak loads. The financial impact of peak loads can be used in calculating TIS values to incentivize load shifting.

In the example, there are also renewable generation assets local to the utility. The utility may also incentivize consumption of energy from these assets through the TIS. On the right hand side of FIG. 3, one can see the TIS presented to responsive assets as an aggregation of the costs to delivery power to the end-uses including generation costs, constraints, and operational objectives.

Missing from this example is the transactive feedback signal representing the behavior of the responsive assets. A feature of certain embodiments of the transactive control technique is that this signal and the transactive incentive signal are both used at a transactive control node to make decisions about the behavior of responsive assets controlled at that node or to be incentivized by that node. This interaction between the TIS and TFS takes place based on the forecast of cost of power delivered and the behavior of responsive assets. Through this interaction, a form of closed loop control is achieved. The decision logic and algorithmic functions of the transactive control node are desirably constructed in such a manner as to have convergence and to avoid oscillation.

2.3 An End-to-End View Via an Illustrative Example

One can better understand this interaction between the TIS and TFS through a simple qualitative example. Consider the following scenario. On a distribution feeder, imagine a pole top transformer feeding three houses. Each home has an electric vehicle. For this example, assume that each of the vehicle owners will want to fast charge their vehicle. With the normal base load for the three houses, all three vehicles fast charging will overload the pole top transformer.

In this example, the pole top transformer is receiving a TIS from upstream (presumably from the substation) and a TFS from each of the houses. The TFS from each house includes information about the planned charging activity for the corresponding electric vehicle. The transformer desirably makes decisions about whether to change the value of the TIS based on the current and future load as represented by aggregating the TFS from each house. It also may take into account other information, such as the ambient air temperature, weather forecasts, operating history, and so forth.

The three electric vehicles in this example, EV1, EV2, and EV3, each have different charging strategies. EV1 is capable of flexible charging, meaning that the rate of charge can be varied. EV2 charges at any cost. EV3 is a bargain hunter and will schedule charging when cost is low.

For this example, assume the following: EV1 desires to charge at 5 PM, EV2 wishes to charge at 6 PM and EV3 wishes to charge at 7 PM. Assume as well that there is a typical diurnal load curve for the three houses seen in this example as the combined load at the transformer. The pole-top transformer has a load rating of 40 kW. As long as the load is below 40 kW, the service life of the transformer is not being degraded. If the load is above 40 kW, then the service life of the transformer is reduced depending on factors including the load, the duration of load above the 40-kW limit, ambient air temperature and possibly other factors. The operating principle for the transformer's update to the TIS is a computation in which the monetary impact of load is computed based on the forecasted duration above the limit and the other factors mentioned. This computation can be performed with information about the cost to replace the transformer, the rated service life, and if desired, economic factors such as the cost of money. The point is that the impact of overloading the transformer is monetized and the result used to change the forecast value of the TIS.

The electric vehicle smart chargers may then respond to the change in TIS value (e.g., increased for overloading) and adjust their plans accordingly. A back and forth exchange, a negotiation if you will, takes place through the exchange of TIS and TFS updates. When the negotiation settles, then the "agreed" solution to consumption should be stable barring other perturbations.

A key challenge in this negotiation is to avoid oscillation. The algorithms and decision logic for both the smart charger and the transformer desirably have appropriate damping factors to drive the negotiation to a stable, non-oscillatory result. In this simple example, a qualitative result is presented to illustrate the nature of the interaction.

Figure 4:
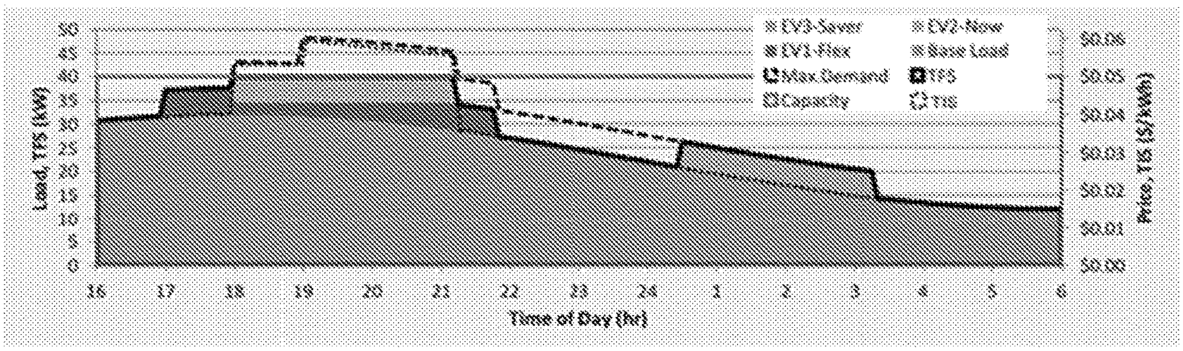
FIG. 4 illustrates the dynamics of an electric vehicle charging example of the disclosed technology.

FIG. 4 illustrates the dynamics of the electric vehicle charging example. As described above, EV1 forecasts that it will start charging at 5 pm (hour 17), EV2 forecasts that it will start charging at 6 pm (hour 18) and EV3 forecasts that it will start charging at 7 pm (hour 19). None of the EV smart chargers have knowledge of the plans of the other. Information is communicated via their forecasts sent to the pole-top transformer and the resulting changes in the forecast TIS value.

In the figure, the broad dashed line represents the forecast total load. Notice that between hours 16 and 17, it simply tracks the normal diurnal load pattern. When the charging plans of the EV's are revealed through the TFS sent to the pole-top tranformer's transactive control node the forecast total load remains below the transformer's load limit until the time that EV2 proposes to start charging. Note that, in this example, all vehicles are proposing a level-2 fast charge initially.

When EV2 proposes to begin charging at hour 18, the forecast total load goes above the load limit. The TIS correspondingly increases above the TIS that is associated with the normal diurnal load. EV3's proposal to begin charging at hour 19 pushes the forecast load even higher. If all three vehicles are level-2 charging, the load approaches 10 kW above the load limit. With the three proposed charging times revealed, the TIS is adjusted and the vehicles respond. For this example, the result is simplified by showing the final result. In practice several iterations would typically be used to achieve the final, stable result.

The final result, as illustrated in FIG. 4, shows that EV1 adapts its plans based on its flexible charging strategy. EV2 does not modify its plan. Remember this is the vehicle that will charge at any price. EV3, the bargain hunter, chooses to shift charging to a night time hour when prices are even lower than its original proposal to begin charging at hour 19. As seen in the figure, EV1's flexible charging strategy offsets EV2's charge at any price to maintain the total load just at the transformer's load limit.

This simple example illustrated the basic principle of the transactive control technique. The technique can be applied at any point in the power system and can coordinate monetized energy impacts and the behaviors of responsive loads where such devices and opportunities exist. Consider, for example, a battery storage system at a distribution substation. The associated transactive control node would be making decisions about whether to charge, discharge, or do nothing with the battery system based on the incoming TISs, the incoming TFSs, local conditions such as the state of the battery system, and updating the TIS and TFS it sends to neighboring transactive control nodes accordingly. Transactive control nodes can be deployed throughout the power system from generation resources, through the transmission system, and in the distribution system down to end uses. The technique can be applied within end use points including residential, commercial and industrial uses to manage the behavior of responsive systems and devices.

2.4 Extended Example

The example above showed the use of the transactive control technique at end-use points within a distribution system. In this section, a further example of the transactive control and coordination system is considered. This example further illustrates the use of the technique to use local responsive assets to help facilitate the integration of intermittent renewable energy resources.

In order to facilitate discussion of this example, first consider the formalization of the transactive control technique. This allows the use of standard way of referring to the functional elements of an implemented transactive control and coordination system.

For embodiments of the disclosed technology, consider a formal model of the functionality of transactive control nodes. A transactive control node object state model has been defined and is the basis for implementing a transactive node object model (TNOM). This approach is scalable, algorithmic and supports explicit consideration of interoperability through the formal specification of both the syntax and semantics of the transactive incentive signal and transactive feedback signal. The "responsibilities" of a transactive control node summarized earlier are formally represented in the object model.

For embodiments of the disclosed technology, a standardized approach to implementation is made possible through the design and implementation of a "toolkit." The toolkit includes well-defined interfaces to utility responsive asset systems and simple, common algorithms for updating transactive signals and determining "control" signals to responsive asset systems.

In designing the toolkit, functions for resources and loads can be defined. The resource functions are primarily defined for the bulk power system and represent systems that supply power. At the utility level, functions associated with local resources or utility concerns such as avoiding demand charges are defined. Load functions can be defined that are associated with the different classes of loads or with local resources such as battery storage systems that may have load or resource behaviors (which are treated as negative loads.)

In embodiments of the disclosed technology, the resource functions include functions from a wide variety of categories. For example, in certain embodiments, the resource functions include one or more of:

1. Imported Electrical Energy
   - 1.1. Non-transactive imported energy
   - 1.2. Transactive imported energy
2. Renewable energy resource
   - 2.1. Wind energy
   - 2.2. Solar energy
   - 2.3. Hydropower
3. Thermal generation
4. General infrastructure cost
5. System constraints
   - 5.1. Transmission constraints
   - 5.2. Equipment and line constraints
6. System energy losses
   - 6.1. Transmission losses
   - 6.2. Distribution losses
   - 6.3. Device/component losses
7. Demand charges
8. Market impacts In embodiments of the disclosed technology, the load functions include one or more functions from the following categories: (1) inelastic, (2) elastic with limited numbers of discrete events available, (3) elastic with daily events available, or (4) elastic with a continuum or near continuum of responses available. There can then exist a matrix of these four categories, with specific loads that fit into one or more of these categories. For example purposes only, the following is a list of example load functions that should not be construed as limiting in any manner. For instance, load functions can be created for a wide variety of assets or asset systems that that can be used in embodiments of the disclosed technology (e.g., for a residence, there may be functions for a variety of different assets and/or asset systems, such as responsive water heaters, thermostats, clothes dryers, web portals, in-home displays, or other such assets and asset systems).

1. Bulk inelastic load
   - 1.1. Bulk commercial load
   - 1.2. Bulk industrial load
   - 1.3. Bulk residential load
   - 1.4. Small wind generator negative load
   - 1.5. small-scale distributed generator negative load
   - 1.6. Small-scale solar generator negative load
2. General event-driven demand response
   - 2.1. Commercial
   - 2.2. Distribution system voltage control
   - 2.3. Residential behavior
     - 2.3.1. Portals
3. General time-of-use demand response
   - 3.1. Battery storage
   - 3.2. Commercial
   - 3.3. Residential behavioral
     - 3.3.1. Portals
   - 3.4. Residential
   - 3.5. Distribution system voltage control
4. General real-time continuum demand response
   - 4.1. Battery storage
   - 4.2. Commercial
   - 4.3. Residential behavioral
     - 4.3.1. Portals
   - 4.4. Residential It should be understood that in embodiments of the disclosed technology, a transactive node may host multiple toolkit functions, including any combination of multiple resource and incentive functions, multiple load functions, or combinations of both resource and incentive and load functions. For instance, the resource and/or incentive functions used at a transactive node will typically depend on the location of the transactive node in a power grid topology, and on the one or more resources and/or loads for which the transactive node is responsible. This ability to "mix and match" resource and incentive functions while still maintaining a common transactive signal communication structure gives embodiments of the disclosed technology wide flexibility and scalability for implementing a transactive control system.

2.4.1 An Example Using Wind Resources

For this example, consider the following general conditions and objectives: (a) the predicted transactive incentive signal increases when wind energy decreases and visa versa; (b) the transactive incentive signal is communicated and mixed between transactive nodes; and/or (c) assets respond to improve consumption of wind when wind energy is available or near where wind is available.

Figure 5:
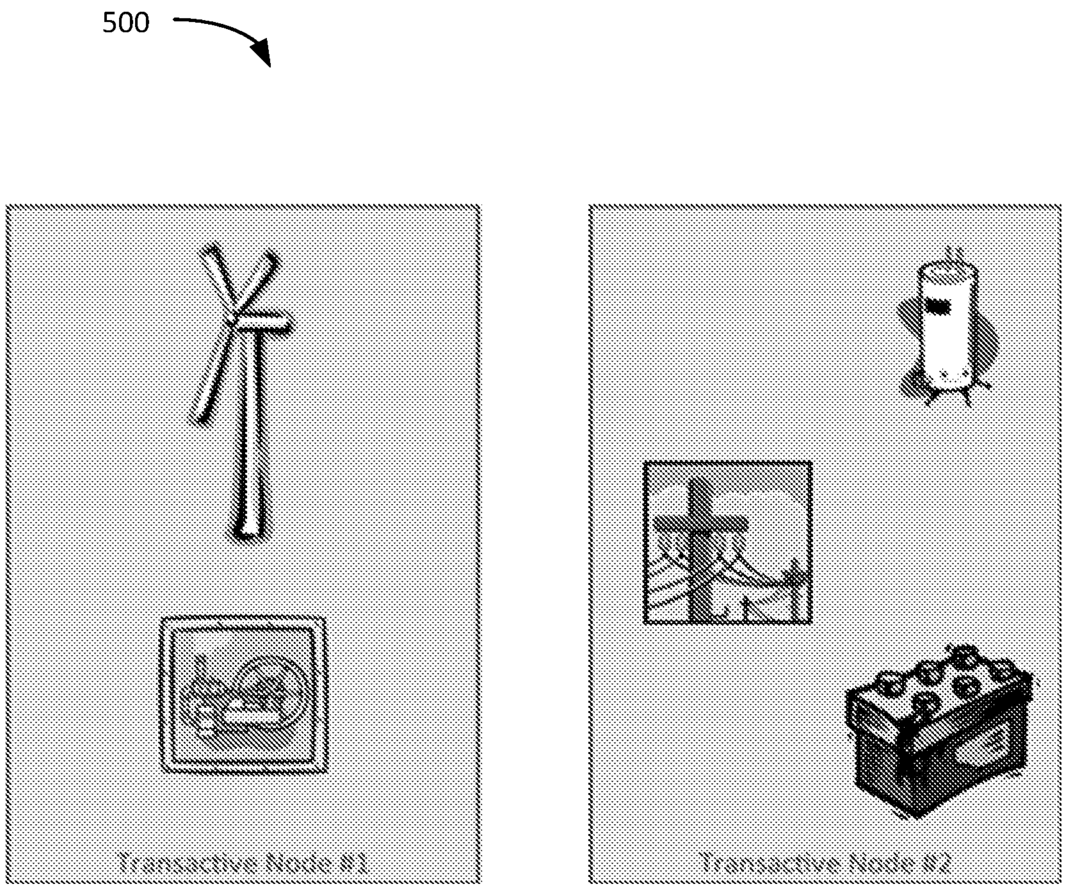
FIG. 5 illustrates a simple topology for wind availability as will be used to illustrate an embodiment of the disclosed technology.

For purposes of this example, also consider the simple topology 500 illustrated in FIG. 5. In the left hand side of the figure, a transactive control node can be observed with two generation resources. The lower illustration in the figure represents conventional generation such as a coal fired power plant. The upper illustration represents wind turbines. On the right hand side of the figure, one can see a transactive control node with three types of assets: conventional resistive load in the form of a water heater, a distributed energy resource in the form of battery storage, and a distribution system voltage control system represented by the cartoon with wires and power poles. For this example, the two transactive control nodes are communicating with each other through the exchange of transactive incentive signals and transactive feedback signals. Note that the transactive control node on the left is associated with features of the bulk power system—bulk generation resources—while the transactive control and coordination system on the right is associated with assets in the distribution system.

Figure 6:
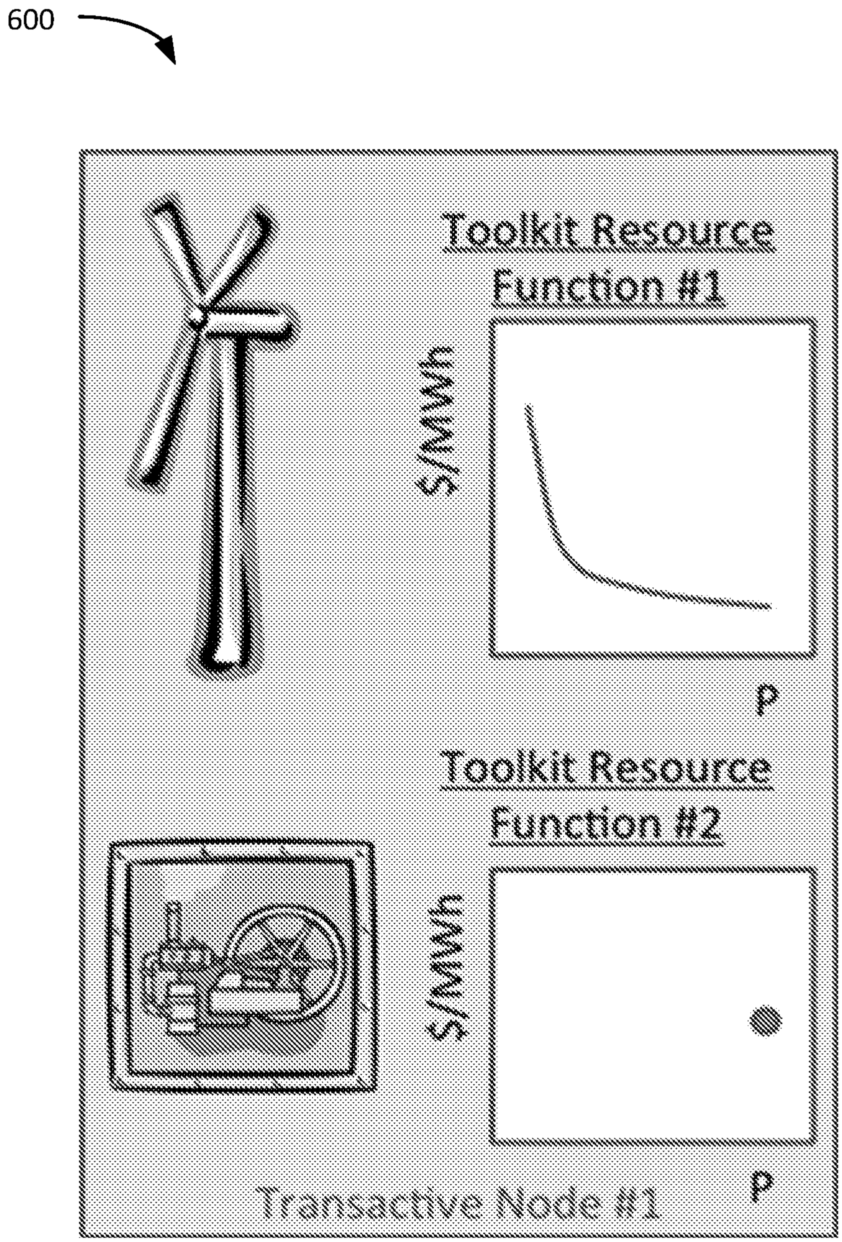
FIG. 6 is a representation of toolkit functions for bulk power resources

Consider now the toolkit load functions associated with the resources shown in the left hand side of illustration 600 in FIG. 6, which shows representations of toolkit functions for bulk power resources. A graphical representation of these toolkit functions is also shown in FIG. 6.

For conventional generation, toolkit resource function #2 shown in FIG. 6, the function is a single point representing a fixed cost of production. The vertical access represents cost in $/MWh and the horizontal axis the power produced. For purposes of this example, assume that this resource operates at a fixed point ignoring for this example ramping and any other factors that would cause the power output to vary.

The other example of wind power, toolkit resource function #1, is more complicated. In this case, assume a cost of power that is inversely proportional to the power output of the system. Thus, when there is low wind and low production the cost per unit of power is high. On the other hand, when there is high wind and corresponding high power output the cost is low. It should be noted that there are many possible ways to construct the resource functions. The underlying question is how to assign cost—to monetize the activity of the resource asset. In embodiments of the disclosed technology, one should assign cost in a way that incentivizes desired outcomes. In this example, the resource function defined for the wind resource has lowest cost when there is an abundance of wind power thus incentivizing consumption of wind power when it is available. Another consideration when evaluating potential resource functions is that candidate resource functions for a given asset should ensure the same total cost over relatively long periods of time.

Figure 7:
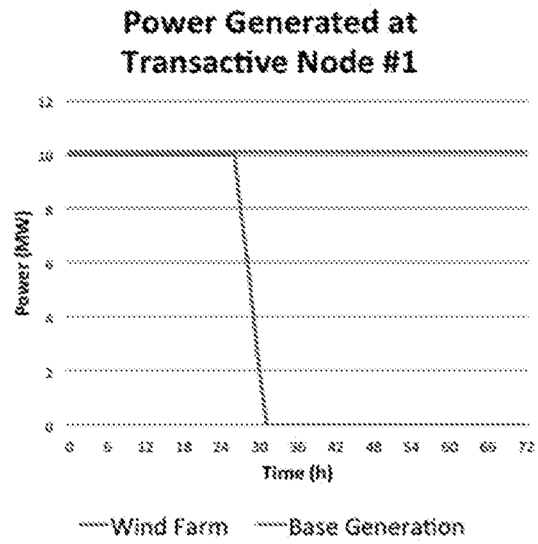
FIG. 7 is a graph showing the power generated at the transactive node represented by FIG. 5 over time.

Having defined resource functions allows one to look at their behavior over time. FIG. 7 is a graph 700 that depicts the power generated at transactive node #1. Base generation is shown as constant at 10 MW. Wind generation varies from 10 MW for the first 30 hours dropping to zero (0) thereafter.

With this forecast of power production in mind, consider the forecast of cost of power from these two resources both with current approaches and with the transactive control approach using embodiments of the resources functions disclosed herein.

In this example, short-term power trading on spot or even day-ahead markets is ignored. In this case, the cost of power will be an aggregated value based on the fixed rate associated with each of the two resources. From the point of view of today's consumer, the cost of power is at a fixed rate—thus there is no incentive to change consumption behavior associated with the cost of power.

Figure 8:
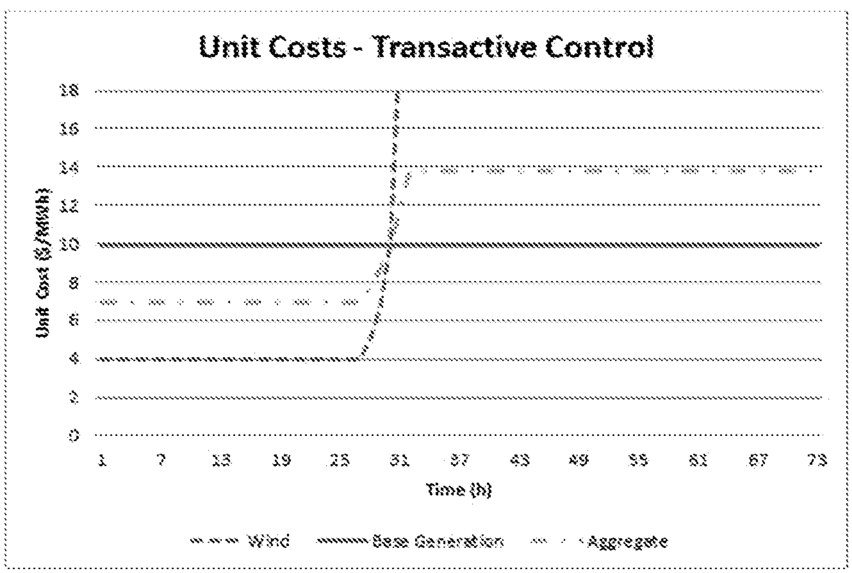
FIG. 8 is a graph illustrating the unit costs of power for the current transactive control example.

FIG. 8 is a graph 800 illustrating the unit costs of power for the current transactive control example. In this case, the base generation is still provided at a fixed cost as previously shown. The unit cost of wind power is at a relatively lower cost while the wind is blowing and rises when the wind dies—eventually becoming infinite when wind power is unavailable. The aggregate cost, that seen by consumers, is an average (possibly weighted) of the two representing the incentive to consume when wind is available at a cost below normal base generation cost and to not consume when wind is unavailable at a cost above normal base generation cost.

Figure 9:
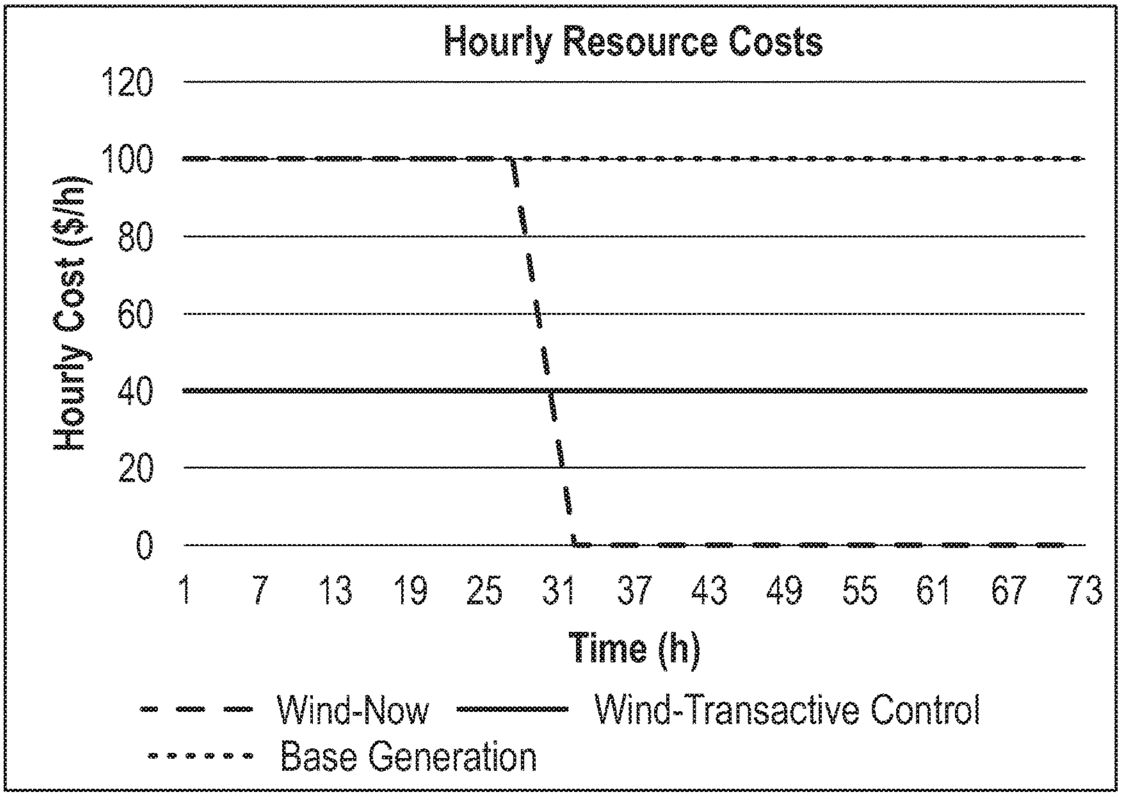
FIG. 9 is a graph that presents the hourly resource costs for wind power according to a conventional approach versus a transactive control approach.

Embodiments of the disclosed technology provide a scheme that incentivizes the desired behavior—preferentially to consume wind power. But what about the long-term cost objective? Let us compare how costs accumulate over time. FIG. 9 is a graph 900 that presents a comparison of hourly resource costs with or without transactive control. Given the examples, the resource function for base generation, the hour cost for that resource is the same in either case. For the wind resource, however, the hourly cost is quite different. As the system and economics are currently formulated, the wind resource is only compensated when it is producing power. The rate is fixed and costs should be recovered based on an estimate over the long term of the percentage of time the resource will be available. This is represented by the line in FIG. 9 that starts at the hourly cost of 100 and then drops to zero (0) at hour 31. In contrast, the hourly cost for the wind resource is constant at 40 using transactive control. This is because during the period of time when wind power is available, loads are incentivized to consume via a lower cost (e.g., using the transactive incentive signal) and incentivized to not consume via a higher cost when wind is not available. The cost of wind production still should be recovered. So over the excess cost recovery when wind is not available (as compared to base generation cost) is used to make the wind producer whole resulting in an apparent fixed hourly cost.

Figure 10:
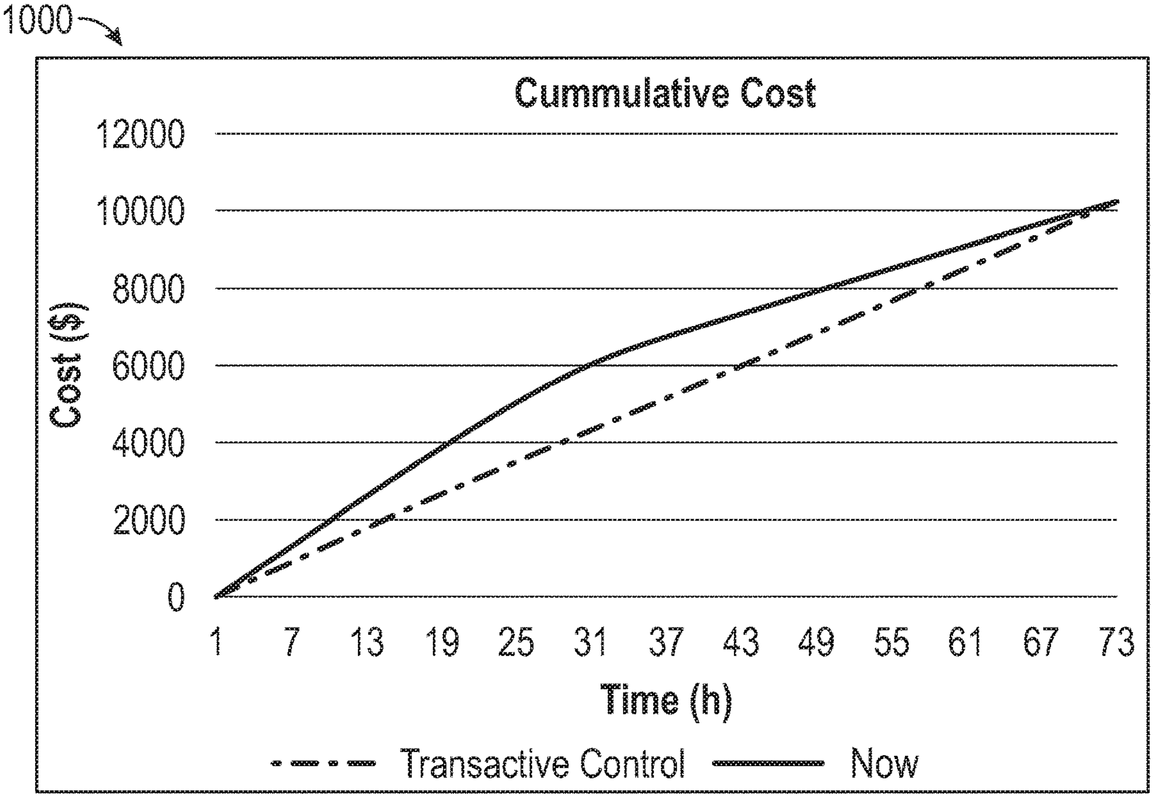
FIG. 10 is a graph that shows the cumulative cost comparison for a transactive control approach versus a conventional approach.

Integrating the hourly costs allows one to check the long-term criteria—that costs should be the same over the long term for transactive versus the non-transactive approaches. FIG. 10 is a graph 1000 that shows this cumulative cost comparison and shows that the transactive control technique can be formulated in such a manner as to achieve this objective.

Figure 11:
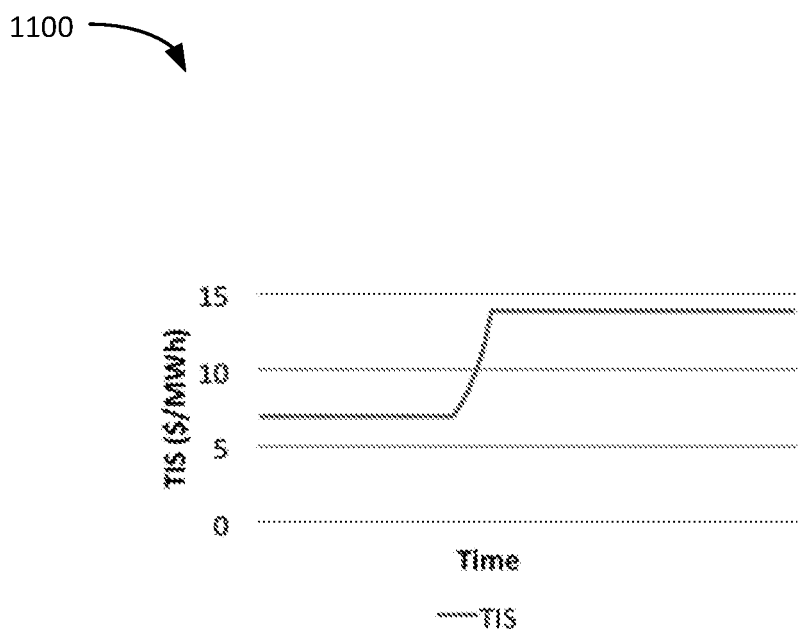
FIG. 11 is a graph illustrating an example transactive incentive signal as it is affected by a wind power resource.

Now that the formulation of toolkit resource functions have been considered, example differences between conventional approaches and embodiments of the transactive approach can be summarized. For instance, the resource functions for generation assets of the disclosed technology create a transactive incentive signal as depicted in graph 1100 of FIG. 11. The dynamics of the signal are as described above in the discussion of unit costs.

Attention can be shifted to the consumption, or load, side of the computation. From a behavioral or responsiveness point of view, loads will be mixed. Some will be controllable; in other words, the loads will have the potential to respond to an incentive signal. Still further, in some instances, some loads will also be capable of acting as a load or a generation resource. For example, a battery system may have either behavior, and decisions about the battery may be made about when to charge, discharge, and/or at what rates. In this respect, a battery load may be highly responsive. For any given class of load assets, one may construct one or more load toolkit functions. These functions desirably take into account the load functions for other distribution system assets, and are discussed in more detail below.

Embodiments of the disclosed technology implement a distributed system for engaging responsive assets within the power system to manage constraints and support the integration of elastic energy resource (e.g., wind power and/or other intermittent renewable energy resources).

In particular implementations, the technique primarily uses two signals—the transactive incentive signal and the transactive feedback signal—representing the cost of power delivered to a given point in the system and the load at a given point in the system respectively. In particular embodiments, both signals are forward forecasts. The use of these representations reduces communications capacity requirements but relies on the development of algorithms for monetizing operational objectives. This was illustrated through a simple electric vehicle charging example and an extended example for wind power integration.

3 Exemplary Embodiments of the Disclosed Transactive Control Signals

3.1 Introduction

The transactive control and coordination system (TCS) of the disclosed technology can be implemented primarily using two classes of transactive signals: transactive incentive signals (TIS) and transactive feedback signals (TFS). These signals are exchanged between distributed system sites. The purpose of these signals is to coordinate supply and load in the near future, from a few minutes to several days out.

Some might compare the TCS with locational marginal pricing (LMP), in which energy prices are differentiated by time and by circuit location to address the economics of resource availability and to help mitigate transmission system congestion. A TCS shares certain goals with LMP. Like an LMP price signal, a TIS is a price-like signal that may represent the value of energy resources while taking into account the location, the time, transmission congestion, and transmission losses. Unlike an LMP signal, however, a transactive signal has been generalized to represent other additional impacts that can be monetized. Furthermore, a TCS facilitates fully distributed, not centralized, formulations of transactive signals. Because the calculations may be fully distributed, a TCS system is scalable throughout transmission systems, distribution systems, customer premises, and/or device levels.

An LMP represents the cost of the marginal energy resource and is therefore useful for coordinating the dispatch of energy resources. An implication is that dispatch decisions for supply-side or demand-side resources are based solely on comparison against the current marginal resource. By contrast, embodiments of the TIS are preferably formulated to represent energy cost as a function of time and location so that it may coordinate multiple supply-side and demand-side resources, not just the marginal ones. (This distinction is increasingly of interest as must-run renewable resources become a significant fraction of system resources. Economic dispatch and marginal energy price are currently based largely on fuel expenses. Renewable resources, which consume no fuel, displace fueled resources. Therefore, the marginal price, which is determined by the marginal fueled resource, incurs downward pressure. If the resulting marginal price is used to calculate revenues, then revenues also experience downward pressure, even though the must-run renewable resources may have generated relatively expensive energy.) The economic usefulness of many resources is determined during planning stages, not as they operate. Once the resource has been built, it should be called upon anytime it is useful, not only when it competes well with the current marginal resource.

A TCS and its transactive signals, in principle, may thereby unify some decision processes that are conventionally addressed separately or sequentially—the using the dispatch of must-run resources and economic dispatch, for example, or the testing of economic power flow against permissible constrained power flow.

While quantity of energy is most certainly used during the calculations of LMP signals, there is seldom a need for those signals to be communicated outside the location of the central solver. In embodiments of the disclosed technology, however, the TFS, which represents a quantity of power, accompanies the price-like TIS. For example, distributed formulations can be used with signals that represent both the paired price and the quantity of power for time intervals. In particular, transactive signals can enable the coordination of the TCS, where each transactive node has a responsibility to perform its share of what is presently a very centralized calculation. The standardization of a TCS and its transactive signals can permit new implementers to join a TCS.

Now that some general characteristics of a TCS have been introduced, largely through a comparison between TCS and LMP systems (see, e.g., Table 1), further details and qualities of the TCS will be introduced. For example, the sections below describe the component parts of a TCS, including its transactive signals, and how each of the two subclasses of transactive signal are influenced and formulated.

TABLE 1

Comparison Summary between LMP and TCS

| LMP | TCS |
|---|---|
| Calculation is performed centrally | Calculation may be distributed |
| Signal represents unit price of marginal resource | Signals preferably represent inclusive unit cost of energy and quantity of energy |

TABLE 1-continued

| Comparison Summary between LMP and TCS | |
|---|---|
| LMP | TCS |
| Somewhat scalable to disaggregated regions of generation, transmission, maybe into distribution | Very scalable, in principle, throughout generation, transmission, distribution, customer, and end-use devices |
| Usually relevant only to perspective of one single system operator | May represent perspectives of any and many system component owners |
| Contractually engages large blocks of firm resources | May engage many small, flexible resources and large blocks of firm resources alike through the normal course of energy pricing or through alternative and diverse incentive mechanisms |
| May include forecasted future intervals | Includes forecasted future intervals |

3.2 An Example Transactive Coordination and Control System

An exemplary embodiment of the TCS may be understood by its components and their behaviors. In particular implementations, its principal components comprise one or more of the following:

- transactive node—system sites that are active participants in a TCS. A transactive node hosts a transactive node object model and exchanges transactive signals with its transactive neighbors.
- transactive signal—comprises one or more subclasses of signals that are exchanged by transactive nodes. For instance, in particular implementations, the transactive signal comprises two subclasses that include the TIS and TFS.
- transactive node object model—the state model of the actions and responsibilities that are managed by a transactive node
- toolkit functions—one or more functions that may be called upon by the transactive node object model to customize it for the unique set of inelastic and elastic supply and demand-side resources that are managed at a respective transactive node. The functions can belong, for example, to a plurality of subclasses. The subclasses can include, for instance, toolkit resource and incentive functions and toolkit load functions.

3.3 Example Transactive Node

In embodiments of the disclosed technology, transactive nodes are points in the topology of a TCS. In particular embodiments, transactive nodes periodically exchange transactive signals with their neighbors (e.g., their nearest neighbors) with which they can exchange electrical energy. For instance, transactive signals are exchanged between neighboring transactive nodes that share an electrical conductor. (This is true in the sense that two transactive nodes that exchange power also communicate. The actual pathway and communication media between transactive nodes can vary from implementation to implementation.) The resulting interconnection topology can, in some embodiments, be hierarchical. Transactive nodes can be established at any hierarchical point in the topology (e.g., at any point of the utility-side topology, such as a sub-station, feeder, transformer, or the loke) or at any point of the load-side topology, a feeder, transformer, household control unit, electric vehicle charger, or any control unit at the household or other load control unit).

3.4 Example Transactive Signals

Transactive signals can be represented as a series of data. For instance, in particular implementations, the transactive signals are a series of triplets. Each triplet is comprised of a time interval, a value, and a confidence level that qualifies the value. In other implementations, the transactive signals comprise a series of value pairs, where each value pair comprises any combination of a time interval, a value, or a confidence level. In still other implementations, the transactive signals comprise one or more of a time interval, a value, and/or a confidence level. In particular implementations, there are two subclasses of transactive signals:

- the TIS—a representation of preferably the delivered unit cost of the energy that is stated in the corresponding TFS. There is a TIS representation at each transactive node and for each time interval.
- the TFS—the power flowing between two transactive nodes during a given time interval. The unit cost of the energy that is being exchanged is the corresponding TIS of the given time interval and for the given transactive node that supplies the energy. There is a TFS representation for each transactive neighbor at each transactive node and for each time interval.
- The examples herein were simplified to address real power and real energy. However, the reader skilled in the art of electrical power will understand that the examples could be extended to refer to real energy (meaning the product of real power and elapsed time), reactive energy (meaning the product of reactive power and elapsed time), or both real and reactive energy components. That is, a TIS may separately or jointly monetize real energy, reactive energy, or both real and reactive energies, and a TFS may represent real, reactive, or both the real and reactive power components of the power flowing between two transactive nodes.

3.4.1 Predictive Signal Intervals

In particular embodiments, the transactive signals are forecasts. The forecasts refer to an imminent time interval (e.g., the time interval that will start next) and a number of additional future intervals thereafter. The future intervals are defined by their starting times and durations. Once stated, an interval remains fixed in time, and a future interval moves closer with the passing of time. The intervals in a transactive signal are successive in one particular embodiment of the disclosed technology (e.g., they do not overlap).

A subsequent transactive signal updates the values and confidence levels for many or all of the previous transactive signal's time intervals. New intervals may also be created to push the forecast even farther into the future.

In one particular embodiment of the disclosed technology, termed "the demonstration", 56 successive intervals ranging in duration from 5 minutes to 1 day were elected. Refer, for instance, to Table 2. It should be understood, however, that any number of intervals of any duration can be used to implement embodiments of the disclosed technology. In Table 2, the term "$IST_n$," refers to the time at which the $n^{th}$ interval begins—the interval start time. The durations of the thirteenth, thirty-third, fifty-first, and fifty-fifth interval may change from one transactive signal to the next; this was done in the illustrated embodiment to make sure that the intervals remain aligned with major 15-minute, 1-hour, 6-hour, and 1-day transitions.

The shortest interval could be any duration. For instance, the duration might be limited by the sum of the system's calculation and communication latencies. If the system were to use relatively short intervals (e.g., five minutes or less), it could respond to many dynamic issues, even area control errors, which are typically managed on 4-second intervals.

In one embodiment, intervals were defined with increasingly longer durations into the future because more distant future values may only be meaningfully and accurately forecasted in a statistical, averaged sense. For example, if one knows the accurate status of a thermostat and the building temperature that the thermostat manages, one may accurately predict quite precisely when this system will begin or end its current heating or cooling cycle. For tomorrow, however, one cannot predict precisely when each cycle will begin and end, but one can quite accurately predict the fraction of time that the system will be actively cooling or heating. (In other embodiments, longer intervals (such as over 1 hour) are avoided. It has been observed, for example, that intervals longer than 1 hour tend to destroy important boundaries that have been defined at the boundaries between hours. For example, some utility billing practices presently distinguish "heavy load hours" that occur from 6:00 a.m. to 10:00 p.m. Pacific.)

The 56 intervals used in the example embodiment discussed herein extend more than 3 days into the future, but could extend to any desired time period. The total number of intervals and durations of the longest intervals in the example embodiment were influenced by the desire to allow the system to be unattended for at least three days—the duration of a long holiday weekend.

TABLE 2

Example Intervals

| Duration | No. Intervals | Interval Start Times |
|---|---|---|
| 5 minutes | 12 | $IST_0$, $IST_0$ + 0:05, . . . , $IST_{10}$ + 0:05 |
| 15 minutes | 20 | Round($IST_{11}$ + 0:15)*, $IST_{12}$ + 0:15, . . . , $IST_{30}$ + 0:15 |
| 1 hour | 18 | Round($IST_{31}$ + 1:00)*, $IST_{32}$ + 1:00, . . . , $IST_{48}$ + 1:00 |
| 6 hours | 4 | Round($IST_{49}$ + 6:00)*, $IST_{50}$ + 6:00, . . . , $IST_{52}$ + 6:00 |
| 1 day | 2 | Round($IST_{53}$ + 1:00:00)*, $IST_{54}$ + 1:00:00, $IST_{55}$ + 1:00:00 |
| >3 days | 56 intervals | 57 interval start times (IST) |

*The function "Round" indicates rounding down to the next 15-minute, 1-hour, 6-hour, or 1-day interval start time. Times are indicated as dd:hh:mm (days, hours, and minutes).

In Table 2, the $57^{th}$ IST was used to define the end of the $56^{th}$ interval, which is the final interval in a transactive signal of the example embodiment.

Published future intervals remain valid and may be used, in principle, until they are overcome by time. This means that a transactive signal's Friday forecast for a Monday morning interval can be used even if the system fails to calculate any new transactive signals through the weekend. In this capability, the system is resilient to temporary failures of individual system components. If, however, a part of the system fails, the signals that had been predicted much earlier become increasingly dated and inaccurate. The system also loses its ability to recognize and respond to change while new signals are absent. Also, because later intervals have longer duration, signal dynamics diminish as the system relies on progressively longer prior predictions. In one embodiment, the confidence attribute is degraded (e.g., indicates diminished confidence) over time as signals become stale, unupdated.

Although any suitable time standard can be used, embodiments of the disclosed technology use the Coordinated Universal Time (UTC) standard (ISO/IEC 2004). The UTC can be used, for example, to enforce a consistent and standardized representation of time across time zones. UTC times are unchanged across time zones and across transitions into and out of daylight savings periods. In certain embodiments, and in order to avoid problems with aligning time zones ad contractual obligations that may exist, the use of intervals longer than one hour is avoided.

3.4.2 Confidence Attribute of a Transactive Signal

In some embodiments, transactive signals also include a confidence attribute that is specified to qualify the values in the transactive signals. In particular implementations, the confidence attribute estimates the relative positive root-mean-square (RMS) accuracy of each value that is published in a transactive signal. In many cases, this interpretation is quite naturally incorporated. For example, forecasts for renewable energy resources are already qualified in a way comparable to an RMS error.

Some events or conditions are not as naturally represented using the metric relative RMS error. For example, one might have diminished confidence if a signal has been delayed or if some component information to be used in a calculation has become stale. Other examples might include startup conditions while only limited information has been received, suspect status of computational equipment that hosts a calculation, or calculated values that are simply outside a normally accepted range for unknown reasons. Nevertheless, these conditions can be functionally represented by relative RMS error.

The recipient of a value that is accompanied by a high relative RMS error may use such information in many ways. The local practices and policies may differ at each transactive node. The possible responses include, for example, the publication of error or warning flags, performing alternative calculations that are more conservative, resorting to safe default values, using statistical algorithms that optimize outcomes or minimize risk, or no action at all.

3.4.3 Transactive Incentive Signal

In particular embodiments, a transactive node has one TIS for any given time interval and any given calculation result. No differentiation of TIS value is allowed across a transactive node. If for any reason electrical energy should be valued differently across a transactive node, the transactive node should be divided into more than one node at the feature that causes different valuation.

In one particular implementation, the TIS is calculated by summing the incurred costs and dividing the sum by the energy to which the costs refer. The total energy may be thought of as either entire load (including exported energy), or as the entire supply (including imported energy), at the transactive node. The transactive node can assume that total supply is equal to total load. It has been found that it is more natural to work from the supply side during the formulation of TIS. It is the costs of the various mixes of supply resources that directly affect the TIS.

The input parameters of the TIS formula in Table 3 create a useful interoperability boundary. The parameters represent various costs ("C") and power ("P"), where the subscripts refer to terms for energy ("E"), generation ("G"), capacity ("C"), infrastructure ("I"), or other ("O"). Further, subscript n is the interval number and $\Delta t_n$ is that interval's duration. Members of a TCS may be invited to generate their own functional algorithms that in turn influence the TIS by simply designing algorithms that assign values to these various parameters. The parameters are distinguished by their units. Implementers may select and use the parameters that most naturally represent the forecasted cost impacts. It should be understood that these parameters are not limiting or even required for a particular component. In certain embodiments of the disclosed technology, the functions that generate these parameters are called toolkit resource and incentive functions. Resource functions model energy supply resources. Incentive functions affect the TIS, but they do not represent any energy resource. Example resource and incentive functions are described in more detail below, including Appendices B and C.

TABLE 3

| Example formula by which the TIS is to be updated |
| --- |
| $$TIS_n = \frac{\sum_{a=1}^{A} C_{E,a,n} \cdot \hat{P}_{G,a,n} \cdot \Delta t_n + \sum_{b=1}^{B} C_{C,b,n} \cdot \hat{P}_{C,b,n} + \sum_{d=1}^{D} C_{O,d,n}}{\sum_{a=1}^{A} \hat{P}_{G,a,n} \cdot \Delta t_n} + \sum_{c=1}^{C} C_{os,c},$$ |
| Or |
| $$TIS = \left(\frac{\text{energy cost} + \text{capacity cost} + \text{other costs}}{\text{energy resources}}\right) + \text{offset costs}$$ |

In other embodiments, infrastructure costs are among the numerator terms. However, in such embodiments, an undesirable inverse relationship between TIS and total power demand may result. In Table 3, infrastructure costs can be included among the "offset costs".

3.4.4 Transactive Feedback Signal

The TFS is calculated readily for a radial distribution circuit branch. The transactive node on a radial distribution branch simply sums its predicted inelastic and elastic loads. The upstream transactive node is the only resource available to supply the load at this system location, so the TFS is identical to the predicted load for the branch.

The TFS is not as easily predicted between transactive nodes that are not on a radial distribution branch and have more than one transactive neighbor. Their network system connections may be meshed. Desirably, power flow is allocated among multiple TFS in a way that would be fully consistent with a proper power flow calculation.

In a fully deployed TCS, economic dispatch decisions would be made at each transactive node to balance load. To the degree that energy can be imported from the transactive node's neighbors, the neighbors' energy competes with local resources. Any mismatch is desirably allocated among the TFSs.

In certain embodiments, each member of a pair of transactive neighbors estimates a TFS for the interface that they share. (The general case of meshed networks and bidirectional power flow desirably uses each transactive neighbor to publish and receive paired cost (TIS) and quantity (TFS) signals.) The convergence of the two estimates is a metric that can be used to determine whether the two neighbors have concluded their negotiated solution or not.

3.5 Transactive Node Object Model

In certain embodiments, the formal model of the transactive node class and its behavior has been specified by the transactive node object model.

3.5.1 Algorithmic Framework

An example model of the algorithmic responsibilities of a transactive node is introduced below in Appendix B. The details of this model can be used to implement exemplary transactive nodes (e.g., using Standard ISO/IEC 18012 (ISO/IEC 2004) or using a unified object-oriented modeling language such as UML-2 (OMG 2013)). The algorithmic framework has proven to be applicable across many different types of transactive nodes.

Figure 12:
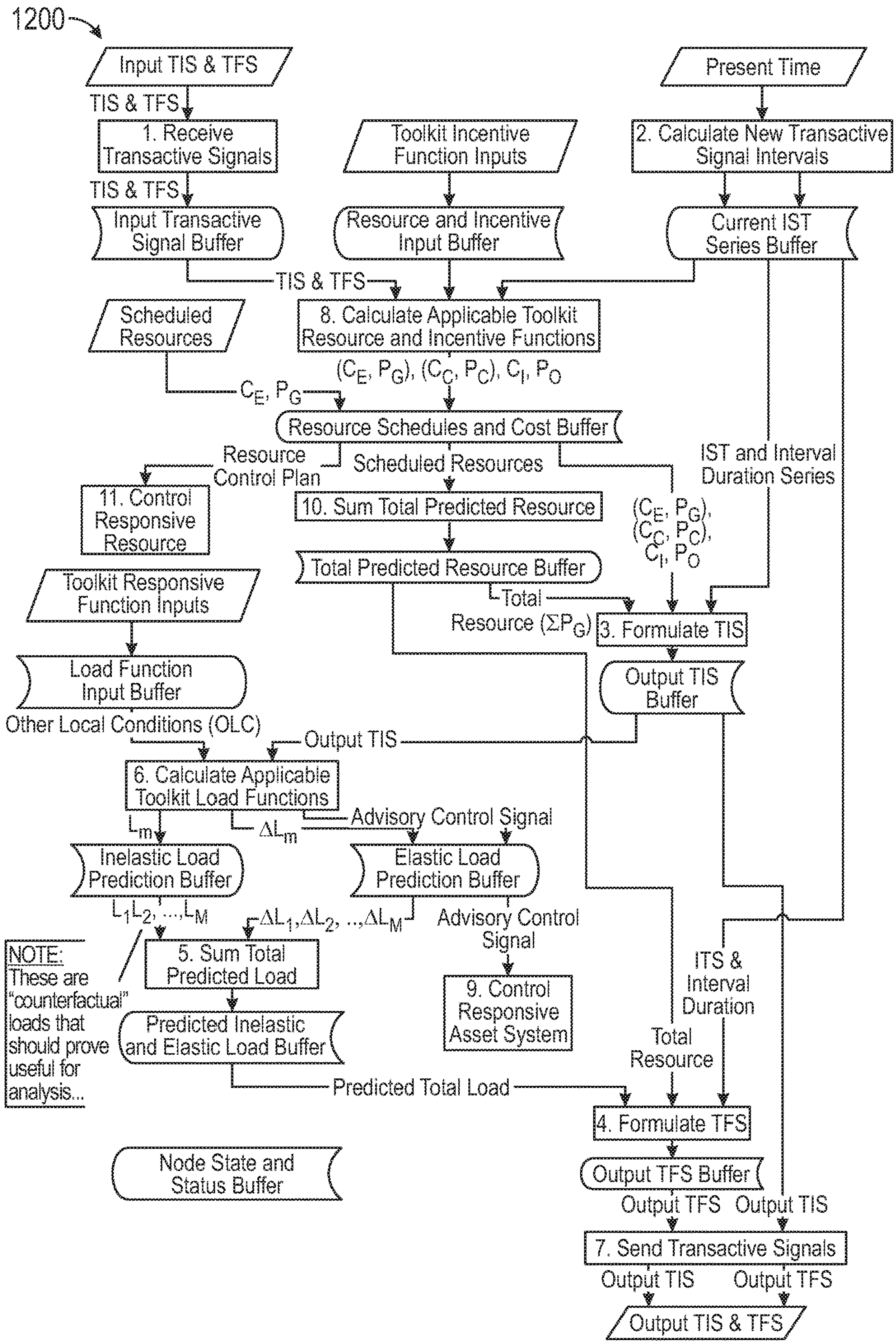
FIG. 12 is a skeleton diagram of the algorithmic framework at a transactive node.

FIG. 12 is a skeleton diagram 1200 of the algorithmic framework at a transactive node. The diagram addresses two main objectives: First, it provides that the TIS may be calculated. Second, it provides that the TFS may be calculated.

A particular implementation of the function "3. Formulate TIS" is disclosed in Appendix B. This function receives information about intervals, costs of various resources and incentives, and the sum of imported and generated energy to which the cost information is relevant.

The model states that both the input information and resulting TIS values are stored in a data buffer. These buffer contents may be mined for data by those who have permission to do so. But the greater importance of the buffered data is that such stored information makes the system resilient to imperfect communications: the input values from a prior series of forecast intervals remain this transactive node's best prediction of the input interval values until updated information can be received. This is especially useful when the information is delayed or when a communication link becomes temporarily severed.

The impacts of energy supply and incentives (or disincentives) at a given transactive node are received through toolkit resource and incentive functions, a modular library of functions that model the costs and energy supplied by energy resources and other cost incentives or disincentives at a given transactive node. An example implementation of the function "8. Calculate Applicable Toolkit Resources and Incentives" (near the top center of FIG. 12) is disclosed in Appendix B. In certain embodiments, these toolkit functions are not themselves inside the algorithmic framework, but they inject their influences into the updating of the TIS via a standardized set of parameters.

A particular implementation of the function "4. Formulate TFS" (at the bottom right of FIG. 12) is disclosed in Appendix B. The objective of this algorithmic framework function is to forecast the flow of energy between it and its transactive neighbors. It therefore receives information about the set of future intervals. It also receives information about forecasted supply and load so that the balance may be allocated to the TFS between this transactive node and its transactive neighbors.

In certain embodiments, the load forecast has two threads. The first forecasts the inelastic load. This is the base case that is unaffected by the TIS. The second thread is the elastic load—the change in load that may be attributed to the TIS and events that are generated in light of the TIS. The separation of these threads is practical and it helps measure and verify system responses. The sum of the inelastic and elastic load forecast components accurately forecasts the actual load.

TABLE 4

| Formula for total load used for TFS |
| --- |
| Total load = Inelastic load + Change in elastic load |

The model of a single asset system may forecast both inelastic and elastic load components. For example, the thermostatic building asset model forecasts both its normal building load and the changes in load caused by temperature setback events. In certain embodiments of the disclosed technology, a single feeder model forecasted bulk inelastic load that in effect included many inelastic components of responsive assets. Provided that the components are properly summed for the given transactive node and not double-counted, it will not matter that the thermostat model did not model its own inelastic load component.

More information about the toolkit resource and incentive and toolkit load functions are discussed below as well as in Appendices B and C.

3.5.2 Signal Timing

In certain embodiments, the transactive node object model includes functionality and attributes that control the times at which transactive signals are transmitted to transactive neighbors. An exemplary timing model is discussed in this section, but is not to be construed as limiting, as any number of intervals having other durations can be used. The example timing model was designed to allow propagation of information about disturbances (e.g., of the electric transmission grid) across the TCS system while reducing unfruitful chatter and calculations. As noted, the example timing model is not necessarily one that should be standardized or used in implementations of the systems.

A transactive node should normally not publish transactive signals for which any interval starting time has already passed. This expectation creates a useful framework for the calibration of system clocks. The error between clocks at different system locations should desirably be small compared to the shortest intervals-5 minutes for the example timing model. Tight tolerances are, in principle, achievable for transactive nodes that are internet connected.

In the example timing model, each transactive node, at the beginning of a 5-minute interval, publishes transactive signals that address the interval that begins 5 minutes from now and into the future.

Figure 13:
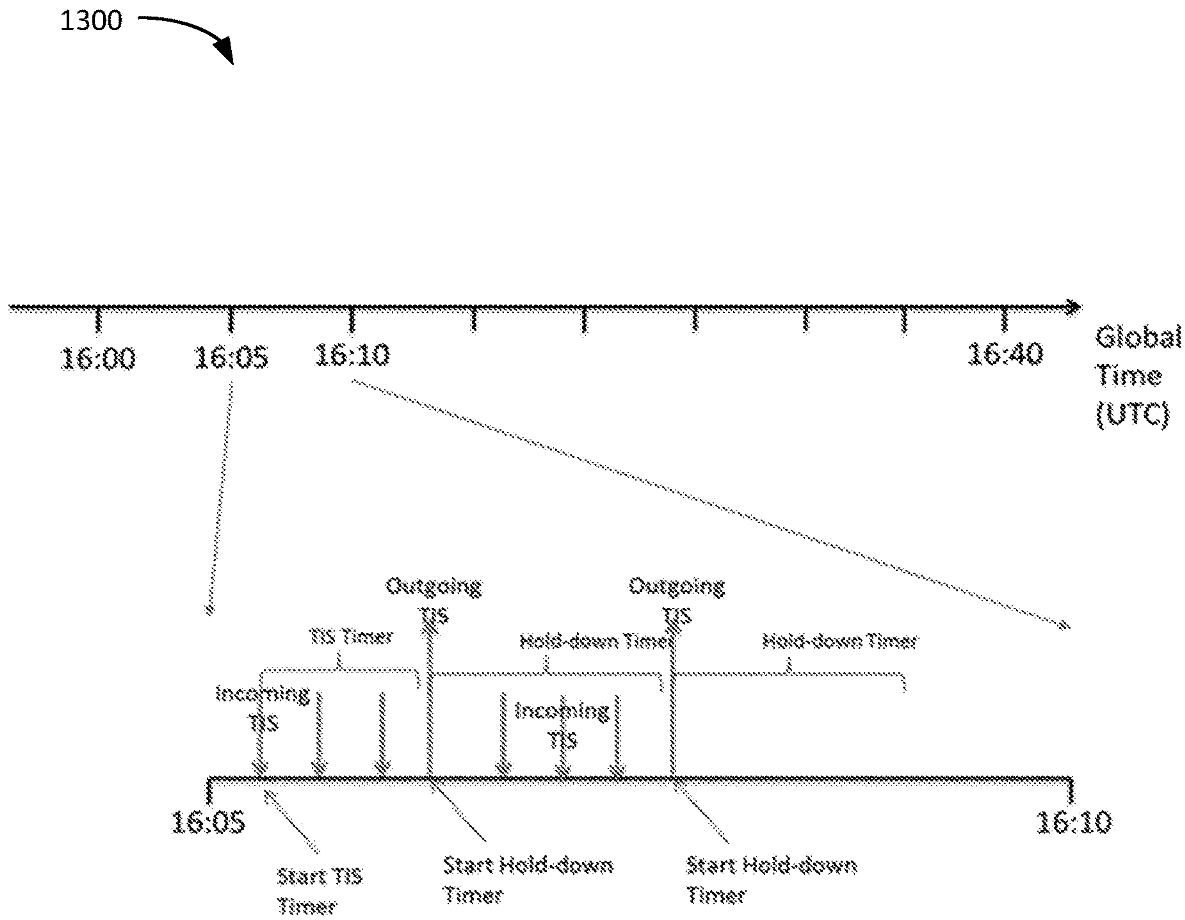
FIG. 13 is a block diagram illustrating the example timing model.

Various timers were implemented to avoid unnecessary chatter. One timer begins when a transactive signal is received. Another timer begins after a transactive signal is transmitted. No transactive signal of the same type may be transmitted again until after these timers expire. FIG. 13 is a block diagram 1300 illustrating the example timing model.

In one embodiment, the time model is event-based. For example, the timing model can be adapted to become more responsive to status or condition events and less reliant upon clock-based events (e.g., hold-down timers, interval timers). New signals and additional calculations can be generated only after significant changes occur to schedules and forecasts, either locally or at remote system locations. As long as forecasts remain accurate, the system should be unperturbed.

Further, sets of prediction intervals that are nested rather than sequential can be used. That is, an understanding that the next 5 minutes are a subset of an hour-long interval that is a subset of the day that is a subset of a month, and so on, can be adopted.

Still further, in some instances, a relaxation criterion against which forecast changes may be compared can be used. The criterion can state a weighting of errors for each interval. For example, if the sum of the errors exceeds the overall threshold for a transactive signal, then the signal is updated and republished; otherwise, no signals should be transmitted because the changes are deemed to be insignificant. This criterion can be used in an event-based model wherein imminent and future intervals are rapidly iterated (e.g., on an asynchronous basis) until they resolve according to this criterion.

3.6 Transactive Data Collection Layer

In some embodiments, a transactive data collection system layer is also defined and used in implementations of the transactive nodes. For example, this system layer automatically retrieves toolkit function outputs from resource, incentive, and toolkit load functions; gathers resulting TIS and TFS signals that are generated at each node from its toolkit function inputs; and records various system management events and statuses. Because the system is distributed both in time and space, it is desirable to keep track of data provenance, including locations of nodes from which the data originates, times at which signals are generated, and time intervals to which predictive signals refer.

One advantage of a TCS is that the transactive signals, while revealing an aggregated cost and quantity of energy, do not necessarily reveal any sensitive or private data. The model used to store and collect information about local resources and loads at a transactive node can be useful, but such information would normally be shared only with the owner of a set of transactive nodes, who is entitled to receive such privileged information. Desirably, little or no sensitive information is shared by neighboring transactive nodes.

"Non-transactive" data can also be defined and collected. Non-transactive data is factual data that is collected from system meters and which can be used during analysis to assess the success with which the predictive TCS has influenced system loads and its consumption of various energy resources. Non-transactive data can also include weather data at each distributed site.

3.7 Influences on the TIS

This section addresses the formulation and interpretation of the TIS.

3.7.1 The TIS is an Aggregate of Multiple Resource and Incentive Costs

Figure 14:
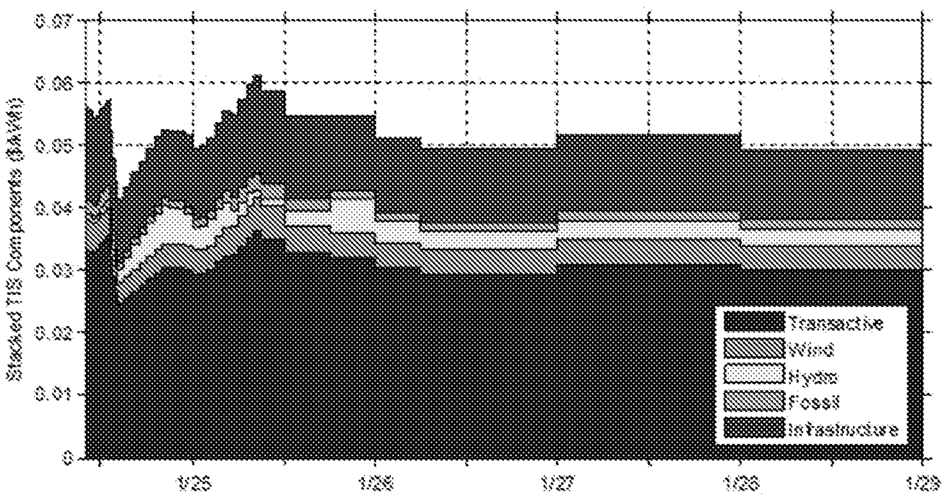
FIG. 14 is a diagram exemplifying the stacked component resource and incentive costs that compose a transactive signal.

In some embodiments, while each TIS states a value for each future interval, each said value may be composed of a plurality of various resource and incentive cost components. This concept is demonstrated by diagram 1400 in FIG. 14, which shows multiple stacked component costs, the sum of which is the published TIS value. The biggest cost component, in this example, is the unit cost of the energy that is received by this transactive node from its transactive neighbors (the transactive component). The remaining components are ranked as the cost of infrastructure and the unit costs of wind, hydroelectric, and fossil-fueled resources.

Observe that influences are inherited from neighboring transactive nodes that supply this transactive node. For example, if 8% of a TIS value is from the costs of fossil energy resources, and if this transactive node is supplied another 10% of its resources by a neighbor for which 10% of this neighbor's TIS value is from fossil resources, then the total impact of fossil energy on the TIS at this transactive node would be 8%+10%×10%=9%. Therefore, one can look to propagated resource mixes one, two, or even more neighbors distant to accurately assess the resource supply mix at this transactive node.

3.7.2 TIS Calibration Measurements Identified

As discussed, in certain embodiments, delivered cost of energy is used as the metric for TIS magnitude. This metric is useful because (1) it provides a straight path to using the signal for revenue, if other implementations choose to do so, and (2) comparable calibration standards exist at some locations within a TCS for this metric.

In a distributed system, checks and balances are desirable to make sure that the TIS, which is collaboratively formulated, is meaningful and fair. The first step toward accomplishing this was to establish a common semantic understanding of the TIS as, for one embodiment, the delivered cost of energy at a location. The second step is the comparison of the TIS and its components against comparable calibration standards. For example, existing and historical contracts define the average unit cost of energy among many suppliers and recipients of electrical energy. Distribution utilities can accurately state how much they paid for a unit of energy during the past year. Therefore, the TIS and any other valid representation of the delivered cost of energy at a system location should be comparable over long periods of time.

3.7.3 Resource Toolkit Functions

Adequate energy resources are desirably received into or dispatched at a transactive node to balance system load. The mix of dispatched energy resources can be determined in a distributed manner (though it is also possible to use a central determination for smaller scale implementations).

In certain embodiments, resource toolkit functions from a library of functions are the functions that calculate the quantity of energy and its cost impacts toward the formulation of the TIS at a transactive node. The resource toolkit functions can reside at any of the transactive nodes (e.g., transmission zone nodes, which each represent large regions of a region's generation and transmission systems). One or more of the following functions can be used to represent groups of (or individual) energy resources:

- Non-transactive energy function—represents energy imported into the system from entities that are not transactive nodes.
- Transactive energy function—represents energy imported from a neighboring transactive node.
- Wind energy function—represents energy from wind farms in this transactive node.
- Hydropower generation energy function—represents energy from hydropower at this transactive node.
- Fossil generation energy function—represents energy from fossil (more generally, "thermal") resources at this transactive node.
- Solar energy resource function—represents energy from solar resources at this transactive node.

3.7.4 Incentive Toolkit Functions

Incentive functions are similar to resource functions, but they are not tied to energy supply. One or more of the following exemplary incentive functions can be used in implementations of the disclosed technology:

- Transmission congestion management function—if the power flowing through electricity transmission lines between two transactive nodes ever approaches the capacity limit on the transmission lines, this function adds cost disincentives to the downstream transactive node to reduce load on the line.
- Cost of general infrastructure function—a cost that is amortized over time to represent the cost impacts of built infrastructure that has not otherwise been captured in the system. The offset from this function calibrates the TIS over time, pulling it gradually toward a reasonable TIS at each transactive node.
- Demand charges function—this is an incentive toolkit function that can be applied at utility-site transactive nodes. Wholesale electricity suppliers charge their utility customers according to quite complex cost structures. This function attempts to represent the cost impacts of demand charges and, to a lesser degree, time-of-use charges. Functions have been drafted to represent the cost structures of, for example, regional power administrations.

3.8 Influences on the TFS

A TFS represents the power flowing between a transactive node and its transactive neighbor during the imminent and future intervals. The majority of the power flow is usually inelastic: it is unaffected by the predicted unit cost of the energy—the TIS. If the transactive node hosts responsive asset systems, these systems might observe the TIS and change their forecast of how much energy they will consume during a future interval—they are elastic. The transactive node state model keeps track of the changes in load that are anticipated from these elastic asset systems.

Responsive asset systems that curtail load reduce load at a transactive node and therefore tend to reduce the energy that is generated at or imported into the transactive node.

Demand-side generators have the same impact when they generate energy and displace load at the transactive node.

Even more useful are responsive asset systems that can increase their energy consumption (or equivalently, reduce their demand-side generation). These asset systems thereby increase system load at their transactive nodes and increase the energy that is either generated at or imported into the transactive node. This response is increasingly useful in power grids that experience excessive generation, as now occurs in regions that have high wind-power penetration.

3.8.1 TFS Calibration Measurements Identified

A straightforward comparison standard exists for TFS values at many system locations. Because the TFS represents forecasted power flow, the accuracy of the forecasted power-flow values in a TFS may be compared against actual metered power at that point in the power grid. For example, the electricity supplied to a distribution by its electricity supplier is accurately metered.

3.8.2 Inelastic Load Prediction Functions

Inelastic load functions forecast baseline load that is unaffected by the TIS. Inelastic load functions can be defined for each residential, commercial, and industrial load type. The load from these models can be scaled by the numbers of each customer type. Alternatively, a parametric model can be used that can be trained by historical data. The model appears to perform similarly for all of the different load types. The forecast model creates a correlation to forecasted weather information—including at least ambient temperature. If available, the model can also incorporate recent measurement data to improve the forecast.

3.8.3 Elastic Load Functions

Elastic toolkit load functions in conjunction with asset models model how responsive asset systems are influenced by the TIS. In certain embodiments, these functions have two principal responsibilities: First, the toolkit load function predicts when events may occur and how long they will last. Second, an asset model forecasts the change in load that will occur during an event for the given asset system.

Elastic toolkit load functions can be categorized as follows based on the nature of their forecasted events:

- Event-driven—several events may be called each month. The principal challenge is to allocate a limited number of allowed yearly, monthly, and daily events (e.g., curtailment events) based on the forecasted TIS. Additional restrictions may apply to the minimum and maximum durations of the events for a given asset system.
- Daily events (sometimes referred to herein as "time-of-use" events)—events are expected to occur almost daily. The events might be specified differently for weekdays, weekend days, and holidays. The principal challenge is to place an event at the best time of day based on the TIS. Additional restrictions may apply to the minimum and maximum durations of the events for each day type.
- Continuous—in some embodiments, dynamic responses are being made every interval. The challenge is not so much to specify events as to state a functional relationship between each TIS value and a system response.

An asset model then models the change in load during the above event types. It has been found that many possible pairings exist between event types and asset model types. For example, a water heater asset model may be used with either event-driven or daily event types. In principle, water heaters could be manufactured to have continuous responses.

By way of example, one or more of the following exemplary asset models can be applied in an implementation of the disclosed technology:

- water heater population—for instance, the population of residential 40-gallon water heaters controlled by in-line switches (e.g., demand-response units). (Models for other sizes of water heater can also be used.) After the timing of events has been predicted, the challenge is to predict the power and energy that will be curtailed by the systems response.
- thermostatic space conditioning with temperature setback—in one implementation, a first-order thermal model of a building is simulated. The model is scaled by numbers of building types and their thermal properties, parameters which are desirably configured by the implementer of this elastic toolkit load function. Dynamic inputs include ambient temperature, solar insolation, and modeled target interior temperatures that represent occupancy temperature settings. During events, the modeled target temperature is raised or lowered, depending on whether it is cooling or heating season. An advantage of using this thermal model is that it predicts thermal rebound if buildings that have had their thermostat load set back return to normal operation.
- thermostatic space conditioning with cycling of the heating, ventilating and air-conditioning (HVAC) unit—uses the same first-order thermal model and simulation as for temperature setback, but events cause a reduction in modeled power of the space conditioning equipment to represent the cycling of HVAC equipment.
- stationary battery storage systems—the TIS is an input to a simulation model that attempts to maximize the cost of energy discharged into the grid and minimize the cost of energy used to charge the batteries. The exchange of energy is scaled by and limited by the modeled useable energy capacity of the batteries and by the capacity of the bidirectional power converter that charges and discharges power into and out from the batteries. The responsiveness of the system may also be modified depending on how frequently the system's owner will permit it to become alternately charged and discharged.
- controlled distribution voltage systems—estimate the change in load that will accompany a change in distribution voltage during an event. In one simplified implementation, the asset model uses a static factor to represent the change in load as a function of change in a feeder's voltage.
- distributed generators—models a change in generation during events. In most cases, the generator becomes activated during events, and the generator supplies its nameplate rated power or another prescribed power level during the event.
- in-home display and portal notifications—in one implementation, event periods are presumed to be indicated to in-home displays or portals as a small number of discrete states (e.g., a high-price event). The change in load is, of course, dependent upon the election of a population of energy customers to voluntarily turn their devices on or off. A typical change in power is forecasted by time of day that may be scaled by the numbers of in-home displays or portals in the population.
- a suite of smart appliances, including washer, dryer, and dishwasher—These appliances are similar to in-home displays in that they notify customers of events during which the smart appliance owners may elect to defer electrical load. In another exemplary implementation, these appliances have additional features by which customers may better automate decisions to delay the appliance loads, and some energy reduction is also achieved automatically when the appliances are in their conservation mode. The change in load is modeled simply as a fraction of typical appliance load by time of day and by appliance type.

Table 5 summarizes the potential pairings of the listed exemplary asset models with appropriate event types. Examples for some of these pairings are described in the appendices below. Implementations for other pairings can be developed by those skilled in the art in view of this disclosure.

TABLE 5

Pairing of Response Characteristics with Asset Models

| Asset models | Event-Driven | Daily Events | Real-Time |
|---|---|---|---|
| Water heaters | Y | Y | Y |
| Thermostat setback | Y | Y | Y |

TABLE 5-continued

| Pairing of Response Characteristics with Asset Models | | | |
|---|---|---|---|
| Asset models | Event-Driven | Daily Events | Real-Time |
| HVAC cycling | Y | Y | Y |
| Battery storage | Y | Y | Y |
| Distribution voltage control | Y | Y | Y |
| Distributed generators | Y | Y | Y |
| In-home displays/portals | Y | Y | Y |
| Other smart appliances | Y | Y | Y |

3.9 Additional Observations

In a fully deployed TCS, regional transmission and generation owners formulate TIS signals by stating the temporal and locational value of resources at many transmission and generation sites in the region, and the TFS, a feedback signal, influences their resource dispatch decisions at these distributed locations.

Further, as household devices become more intelligent, there will eventually exist vast populations of flexible, responsive assets that would be active in a TCS. These assets will be available to modify their consumption at each update interval. A TCS invites the demand side to participate in the system objectives on equal footing with supply.

3.10 Interoperability

Figure 15:
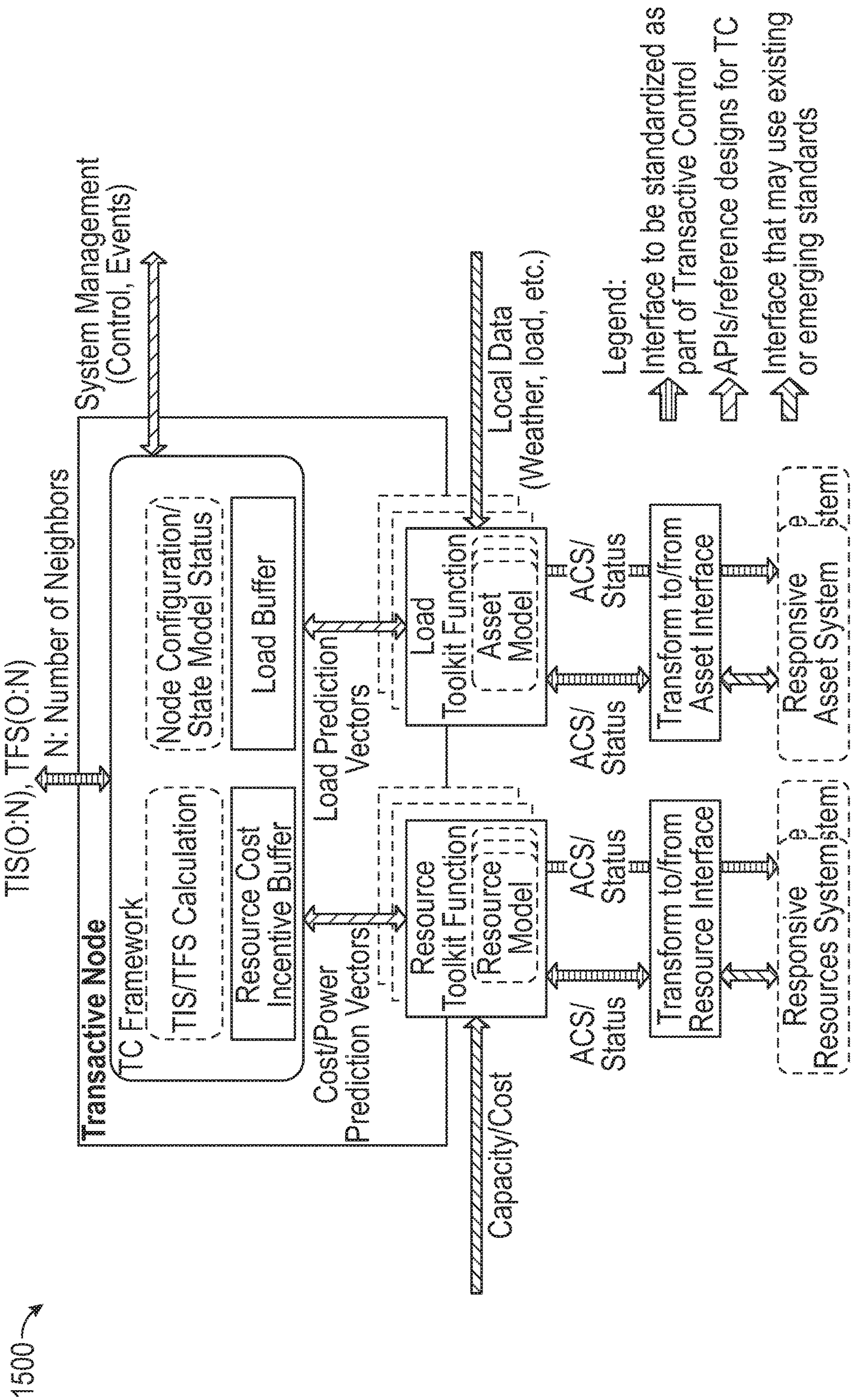
FIG. 15 is another diagram showing an example skeleton model of a standard transactive node that emphasizes the relationship between an exemplary overall methodology and the toolkit functions.

Implementations of the disclosed technology can be standardized, if desired. Standardization efforts may be at a variety of different levels. For instance, the TCS can be defined at the organization and informational level. In this regard, FIG. 15 is a diagram 1500 showing an example skeleton model of a standard transactive node and the signals that it communicates with other transactive nodes and with modules and systems, some of which can be outside the boundary of a standardized system. Typically, neighboring transactive nodes will have to agree between themselves concerning an Interoperability Framework, including the remaining interoperability levels ("Technical/Syntactical" levels). Between unrelated sites, this negotiation is unique. However, if neighbor nodes share the same owner, a common technology may be applied to all the owner's transactive nodes. The TCS standard should desirably be agnostic of the technologies by which it may be implemented.

Certain implementers can choose to define additional implementation details beyond those in the standard. The implementations might, for example, further specify the syntactical levels of interoperability. These implementations should abide by and make reference to the main standard. However, the new implementations may themselves become standards, or they may be recognized as reference implementations of TCS.

Further, implementers may desire to keep their particular code (e.g., code for a toolkit function) confidential. Such a scenario is feasible so long as the resulting signals are conformant.

Embodiments of the disclosed technology can be integrated with academic distributed control approaches. For instance, the specification of transactive signals can be harmonized with signal characteristics specified in simulation studies. An outcome of such harmonization will be that the transactive signal that represents power flow will be a complex representation. (This use of complex here is mathematical. A complex number has real and imaginary components. The real component represents real power; the imaginary component represents the flow of reactive electrical power.)

Embodiments of the disclosed technology can be harmonized with LMP approaches. For instance, the practices of LMP and TCS can be harmonized, potentially allowing the TCS approach to compete with, supplement, or gain equal footing with LMP practices.

Embodiments of the disclosed technology can also be harmonized with other TCS approaches. For example, the price-like signal used in embodiments of the TCS approach may be modeled after cost, price, or competitive bids.

4 Overall Design for Embodiments of the Disclosed Transactive Control and Coordination System In this section, additional details concerning the overall design for embodiments of a transactive control and coordination system according to the disclosed technology will be introduced. The discussion below also provides a supplemental discussion of the transactive control signals themselves. This discussion may, in some instances, be repetitive to the discussion above but is included herein for the sake of completeness.

4.1 Architecture of an Installed System Design

The architecture of an installed system is more diverse than for typical computer network designs. For instance, an installed system comprises generation, responsive assets, the electricity transmission and distribution systems, and digital communication and intelligence. The system therefore should consider:

Physical, geographical location

Electrical connectivity

Information flow.

These components are interdependent, and a close correlation will typically exist and be maintained between them.

4.1.1 Physical, Geographical Architecture

The physical, geographical system architecture captures the physical locations of each piece of the installed system. Physical location can be influential to transactive control because local attributes (e.g., weather) affect the behaviors of equipment, end users, and responsive assets. One tenet of transactive control is that the value of supplied electrical energy is location-dependent. Physical, geographical architecture is easily captured on a conventional map.

4.1.2 Electrical Connectivity Architecture—the Nodal Hierarchy

The electrical connectivity system architecture captures the flow of electrical energy through the installed system. One tenet of transactive control is that the communication of value and operational opportunities (e.g., the transactive signals) in a transactive control and coordination system should logically follow the pathways of electrical energy flow. Existing and future power capacity constraints are highly path-dependent.

In certain embodiments, the electrical connectivity within an installed transactive control and coordination system forms a hierarchy of nodes. Here, the word hierarchy refers to a flow direction of electrical power and is not necessarily a static assignment. Electrical transmission systems are typically mesh (not radial) systems, meaning that parallel paths in the transmission system compete to supply load. The direction of electrical power in the transmission system may change. Some of this complexity will not be discussed in detail herein because embodiments of the disclosed technology can be adapted for such complexities using software tools that properly model meshed transmission power flow.

4.1.3 Information Flow in the Transactive Control and Coordination System

The information flow design captures the flow of data and information within an installed system. An information flow architecture also indicates where manual and automated decisions are made. The information flow architecture can include, for example,

- The communication channels used to transport transactive control signals
- The communication channels used to transport asset control signals
- The communication channels used for other data that supports local, regional, and client-run experiments
- Meter data channels through which meter data flows
- Locations within the information flow where functional calculations, like the estimation of future electrical load, take place
- Any other communication channels necessary to employ the installed transactive control and coordination system.

The information flow architecture can also capture details about the communication channels and signals, including communication media, protocols, bandwidth, formats, software tools, exemplary functional computations, and security attributes and practices.

4.2 A Generalized Transactive Control and Coordination System

This section introduces embodiments of hierarchical transactive control that can be used in an installed system. Prior to recent efforts to build a smarter grid, most all opportunities to manage and control electrical power have been managed quite centrally from the supply side—bulk electrical generation and transmission. The role of the power grid has been simply to satisfy electrical demand—the energy consumption patterns of all the end users. Embodiments of the smart grid according to the disclosed technology will engage end users and responsive assets throughout the grid, resulting in a cooperative, more distributed approach. Transactive control can facilitate this migration to a smarter grid.

4.3 Review of Transactive Control

Transactive control is a bidirectionally negotiated system behavior. Market-like principles facilitate the negotiation; however, the signals need not be used to account for any monetary or revenue exchanges. In theory, the "winning" behaviors are optimal in some sense, having competed successfully in a "market" against alternative actions that could have been taken.

One or more of the following are characteristics that can be exhibited in embodiments of a transactive control and coordination system according to the disclosed technology:

- Bidirectional communication—transactive control differs from the similar practice of real-time nodal pricing in that it uses dynamic feedback from its end uses.
- Incentives and feedback are communicated via one nodal signal—at a node, a single incentive time series is transported downstream, and a single feedback time series is transported upstream. Components of the incentive and feedback signals are additively combined into one incentive and one feedback time series. Using a single signal facilitates interoperability between multiple operational objectives and multiple responsive asset systems.
- Multiple operational objectives and responsive assets are simultaneously engaged—unlike present programmatic approaches that create unique engineered couplings between one operational objective and one or more responsive assets. Because operational objectives can be integrated into a single incentive time series, transactive control enables each responsive asset to respond to the integrated set of operational objectives. As a corollary, each operational objective may be acted upon by many responsive assets.
- The signal in a transactive control and coordination system can be dynamic on multiple time scales—transactive control signals are dynamic. In principle, the time intervals may be made infinitesimally small. A transactive control and coordination system could respond to a need for fast grid regulation, for example, if its time intervals were made short compared to the dynamic performance of fast regulation services. Regardless, the responsive assets may respond according to each asset's own dynamic capabilities and limitations. Not all parts of the system need to agree on and use the same interval if dissimilar interval signals can be added or interpolated to create valid comparisons between signals that have dissimilar intervals.
- Interoperability is facilitated—transactive control facilitates interoperability at the organizational and informational levels, and it allows technical layers of interoperability to become satisfied by any, or many, appropriate standards. This attribute helps make transactive control a worthy candidate for interoperable, regional smart grid communications.
- Responds 24/7—transactive control can be always active. Small improvements and responses can be made throughout a day, not only during the worst several hours of the year.
- End-user friendly—by taking advantage of numerous short intervals and distributed digital intelligence, impacts on end users can be reduced, if not entirely eliminated. For instance, end users should have a final say concerning their comfort and should be provided options to temporarily opt out of responses.
- Facilitates distributed control—transactive control facilitates distributed intelligence and control. Centralized control is reduced or eliminated.
- Uses low bandwidth—the elimination of unique signals and the distribution of control should reduce communication bandwidth.

The transactive control technique of this disclosure can be compared to other approaches to transactive control, specifically the GridWise® Olympic Peninsula Project. Table 6 summarizes the major differences between the transactive control approach used during the Olympic Peninsula Project and embodiments of the disclosed transactive control approach.

TABLE 6

Comparison between the GridWise Olympic Peninsula Project and Embodiments of the Disclosed Technology

| | GridWise Olympic Peninsula Project | Embodiments of the Disclosed Technology |
|---|---|---|
| Electricity customer incentives | Combinations of fixed and various dynamic price accounts. The project maintained a shadow market and customer accounts that were separate from utility billing. | Various approaches, as will be determined individually by participating utilities. Incentive practices should be sustainable. |
| Feedback signal | A bid was received from every responsive asset every five minutes ($/MWhr). | Each transactive node reports feedback that consists of a time series of expected energy consumption during each time interval into the future (kWhr/interval). |
| Operational objectives addressed | One single transmission line constraint was addressed. | Multiple constraints, regional renewable energy availability, economic dispatch of resources, hydrogeneration, peak load mitigation, balancing resources, spot-market purchase mitigation, . . . |
| Future time horizon | Not more than five minutes. | To be determined (probably from one to two days). |
| Approach for resolution of the "market" | Explicit clearing of the two-way "market" conducted every five minutes. | Uses iterative resolution of the "market" future intervals over time. |
| Shortest time intervals supported | Five minutes for real-time price customers. | To be determined (perhaps five minutes). |
| Architecture | Centralized. Information flow was managed from a central operations center and included the aggregator's communication servers. | Enforces a nodal hierarchy, including plans for standardization and extensibility of the hierarchy. Launched at multiple initial transactive node sites. |

Exemplary components of embodiments of the transactive control and coordination system include one or more of:

- Transactive nodes—a physical point within an electrical connectivity map of the system. Electrical energy flows through a transactive node. A transactive node is not to be confused with locations within the information flow map that might also be called "nodes."
- Transactive signals—each node location receives an incentive signal from upstream and generates a corresponding feedback signal to be sent back upstream. These two signals—the transactive incentive signal and its feedback—together are the transactive signals.
- Responsive assets—the "prime movers" of the transactive control and coordination system that can modify consumption of electrical energy (e.g., in response to the current values of the transactive signals).
- Enabling assets—assets like communication infrastructure and metering that cannot by themselves modify energy consumption. Cost-benefit analysis typically cannot be properly assessed for an enabling asset alone because it represents only costs but no measureable smart grid benefits. The expenses of enabling assets are desirably allocated among and borne by truly responsive assets.

Responsive and enabling assets are more thoroughly discussed below.

4.4 Transactive Signals

This section describes example transactive signals and their use by the demonstration.

4.4.1 Introduction to Transactive Signals

In certain embodiments of the disclosed technology, there are two transactive signals at each transactive node:

- A transactive incentive signal (TIS) time series comprising the aggregated present and future values of the electricity supplied to and through each transactive node; and
- The transactive load feedback signal (TFS) comprising the sum of an estimate of the future quantity unresponsive and responsive electrical load to be consumed by the entire load downstream from the transactive node.

Each of the two signals is a time series, meaning that each is a vector of numbers, one for the present time interval and others for each future time interval (e.g., at least a day into the future). The time interval and horizon into the future can vary from embodiment to embodiment. In some embodiments, the time interval is five minutes. Shorter intervals than this would permit the demonstration system to provide additional ancillary services. Further, in some embodiments, shorter intervals are used for the near term and longer intervals into the signals' future. The signals' time horizon desirably extends at least to the future time when resource dispatch decisions are being made for the region.

The transactive signals at time $t_0$ can have the forms:

$$TIS=\{TIS(t_0),TIS(t_0+\Delta t),TIS(t_0+2\Delta t),TIS(t_0+3\Delta t), \ldots ,TIS(t_f-\Delta t)\}$$

$$TFS=\{TFS(t_0),TFS(t_0+\Delta t),TFS(t_0+2\Delta t),TFS(t_0+3\Delta t), \ldots ,TFS(t_f-\Delta t)\},$$

where TIS and TFS are the transactive incentive and feedback signals, respectively, $\Delta t$ is the selected time interval, and $t_f$ is the end of the prediction time horizon. The given time signal series can be updated next at time $t_0+\Delta t$.

Figure 16:
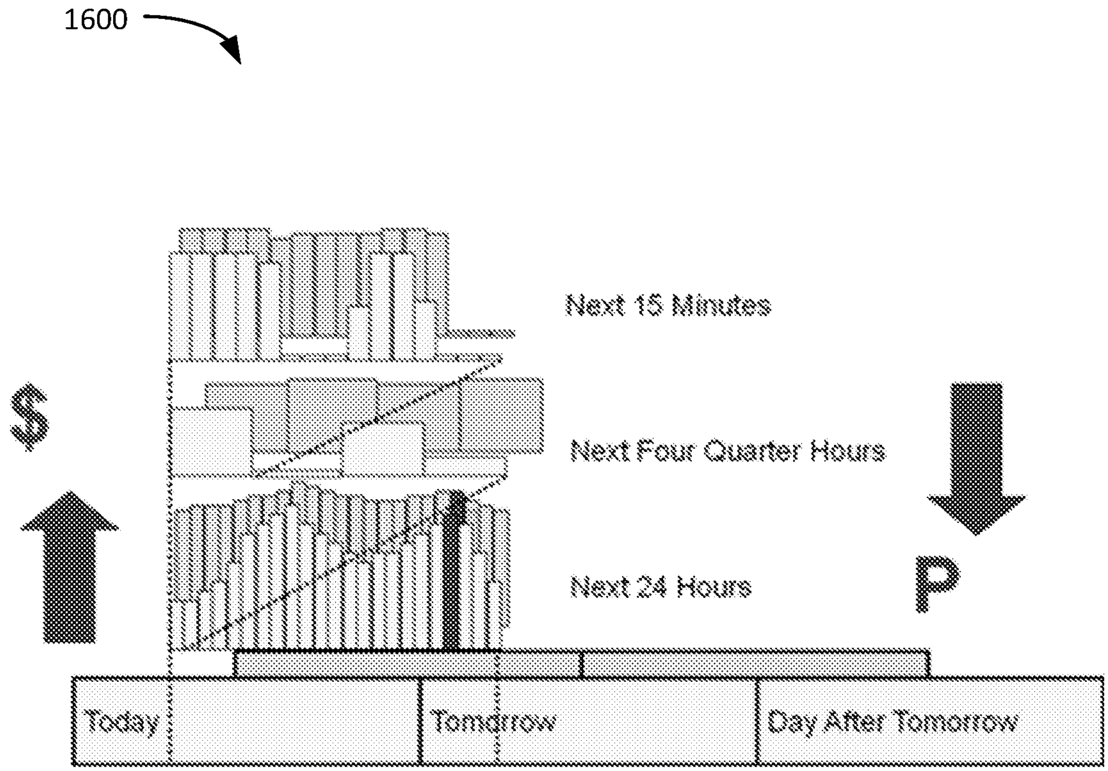
FIG. 16 is a diagram illustrating one view of how multiscale intervals could be addressed by embodiments of the transactive system.

The time-series elements of these two transactive signals are paired for each future time interval. This pairing between transactive incentive signal and transactive feedback signal is illustrated in block diagram 1600 of FIG. 16, which also portrays how an upward trend in the transactive incentive signal for any future time interval should result in a corresponding downward trend in load supplied through the transactive node for that time interval. If the transactive node supplies any responsive electrical load (e.g., responsive assets that are responsive to the transactive incentive signal), the responsive electrical load should respond to changes in the transactive incentive signal. FIG. 16 indicates further that the granularity of the intervals for these signals could be relatively fine in the near term and courser into the distant future.

During the application of transactive signals, sensibility checks and default behaviors are desirably planned. For example, the nodes can be provided some independence to recognize and discount nonsensical signals that are believed to be erroneous. When no signals are received by transactive nodes, as may be the case when there has been a problem or equipment failure somewhere in the system, the nodes should again have the independence to revert to safe, bounded behaviors.

4.4.2 Transactive Incentive Signal

In particular embodiments of the disclosed technology, the transactive incentive time series is the main transactive signal. Each transactive node will typically have a unique blend of energy suppliers, upstream transmission pathways and distances, operational practices, local infrastructure, and/or downstream customers. Therefore, the values of the transactive incentive signal can be unique at a transactive node in the system.

In certain implementations, the basis for the transactive signal series at any node is a weighted sum of the transactive incentive signals received by that transactive node from immediately upstream transactive nodes that supply it electrical energy. The default approach, for example, can be to weigh the transactive signals according to the relative fraction of the node's power that is supplied from each upstream source as described below.

Each transactive node can also modify the transactive incentive signal that it relays downstream. At each transactive node, local conditions are analyzed and the incentive signal modified (or left unchanged) based on the local conditions. Modification of the incentive signal is for the purpose of influencing the behavior of responsive assets downstream from the node. The basic action at any node can be simply represented as:

$$TIS_{output}(t)=\text{Weighted average}(TIS_{input}(t))+\text{New incentives}(t)$$

$$TIS_{output}(t)=\text{Weighted average}(TIS_{input}(t))+\text{New incentives}(t).$$

Examples of how and why a transactive node will modify its transactive incentive signal include:

The expense of energy supplied at the node—those transactive nodes that host generation have the opportunity and responsibility to insert the initial incentive signal values for that resource. For example, the incentive signal may reflect fuel expenses, infrastructure expenses, and/or all other expenses that are incurred to operate the resource. Ideally, the sum of incentives inserted for a generator over a year or longer should approach the sum of its true operational expenses.

Infrastructure constraints or congestion avoidance imposed by the node—if the node itself becomes electrically constrained, it should modify the transactive incentive signal to incentivize downstream behavior that will alleviate the constraint. For example, the modification might be set equivalent to the incremental expense that would be incurred from the consequent shortening of a piece of equipment's lifetime, plus the likelihood that expenses will be incurred from outages after exceeding equipment ratings.

Amortization and other expenses of installed equipment—even idle equipment can be argued to incur expenses. One should insert an expense for maintaining necessary infrastructure of the node. This incentive component, for example, is part of a natural disincentive for consuming energy far from where it is generated and thus using transmission infrastructure.

Energy losses—modifications of the transactive incentive signal may account for line, transformation, and equipment energy losses.

Operational objectives that occur at business entity boundaries—especially at business entity boundaries, the system shall encounter new operational objectives and values that should be respected. For example, certain utilities manage spot market purchases that are not influential in the regional hierarchy but become important at the boundaries of that utility.

The formulation of the transactive incentive signal can, but need not directly, incorporate actual allocations and financial metrics used by utilities and other business entities; the transactive incentive signal can instead be formulated to allocate expenses in a way that will induce useful responses for the entity that owns a transactive node. However, a faithful transactive incentive signal formulation should approach the same overall value as for actual expense reporting over long periods of time. There is nothing that would prevent the transactive control and coordination system from supporting markets and revenue accounting in other formulations.

The incentive signal can have a variety of forms or units, but in some embodiments uses units of $/MWhr (or other equivalent, such as a number or value that is proportional (linearly or otherwise) to this unit). Thus, the signal need not be an actual price, but can be representative of a price or economic unit. One tenet of embodiments of the disclosed transactive control scheme is that items that are valued at a location in the system should be combined into one shared signal, and that can be achieved only after there is consensus about a common metric unit to be used by the signal. This principle will help enforce that business entities' operational objectives should fairly compete.

4.4.3 Transactive Load Feedback Signal

Corresponding to a transactive incentive signal time interval is a transactive load feedback signal (e.g., in the kW or other equivalent or representative unit). This transactive feedback signal time series includes the present and future electrical load that is predicted to be supplied through the transactive node during each time interval. In some embodiments, the signal is the sum of the unresponsive electric load that is not affected by the transactive signal and the responsive electric load that can monitor and respond to the transactive incentive signal.

$$TFS_{output}(t)=\Sigma TFS_{unresponsive,input}(t)+\Sigma TFS_{responsive,input}(t,TIS_{output}(t))$$

The transactive feedback signal is not a "load forecast" of the type that some utilities prepare as they plan resource commitments. There are no direct penalties to be incurred by subprojects when their transactive feedback signals prove inaccurate. The transactive control approach might diminish the importance of load forecasts in the future if the flexibility provided by transactive control can be shown to displace some of the need for predictive accuracy. Interestingly, the accuracy of a node's transactive feedback signal prediction may always be tested against the true consumption that is measured eventually at the transactive node. In some embodiments, the intelligence at a transactive node can "learn" over time to improve its own predictions. Neighboring transactive nodes learn also from an adjacent transactive node's inaccuracies and may choose to alter or suspect that transactive node's outputs.

In some embodiments, the inputs to the transactive feedback signal at a transactive node include any one or more of the following types of inputs:

- Transactive feedback signals generated from transactive nodes that are immediately downstream;
- Transactive feedback signals generated from smart responsive assets that are controlled from the present transactive node's position in the hierarchy;
- Raw unresponsive load measurements that may be subjected to further computation or modeling to predict the remaining future time intervals; and/or
- Raw responsive load measurements from responsive assets that do not themselves predict and provide transactive feedback signals but instead rely on the transactive node to perform predictions.

4.4.4 Implications for Customer and Utility Incentives

As has been stated, the transactive incentive signal is not intended to account for monetary exchanges or revenue between regional entities. However, the transactive incentive signal could become the foundation for regional exchanges or revenues. The transactive incentive signal may also be used as a basis for customer incentives if the subprojects can establish workable shadow accounts for these customers.

4.5 Transactive Nodes

Any of the physical locations in the electrical connectivity architecture of a power system can be transactive nodes. A node is a location or piece of equipment that electrical power flows through. The term "hierarchy" is used to describe a set of transactive nodes that may extend all the way upstream to bulk generators and all the way downstream to electrical loads.

4.5.1 Responsibilities of a Transactive Node

In certain embodiments, a location or piece of equipment in the electrical connectivity architecture is described as a transactive node if it performs one or both of the following:

- Accepts at least one transactive incentive signal time series from upstream and sends a transactive incentive signal time series downstream. If multiple transactive incentive signals are received from upstream, a transactive node blends these incentives into a single transactive incentive signal to be sent downstream.
- Accepts at least one transactive feedback time series from downstream and sends at least one transactive feedback time series upstream. A transactive node can further predict electrical load and can thereby convert raw electrical load meter readings, as necessary, into transactive feedback time series.

A transactive node can also: modify the output transactive incentive signal to address any local operational objective that exists at the transactive node; and/or predict the responsive electric load from any responsive assets that are being controlled from the location of the transactive node.

Figure 17:
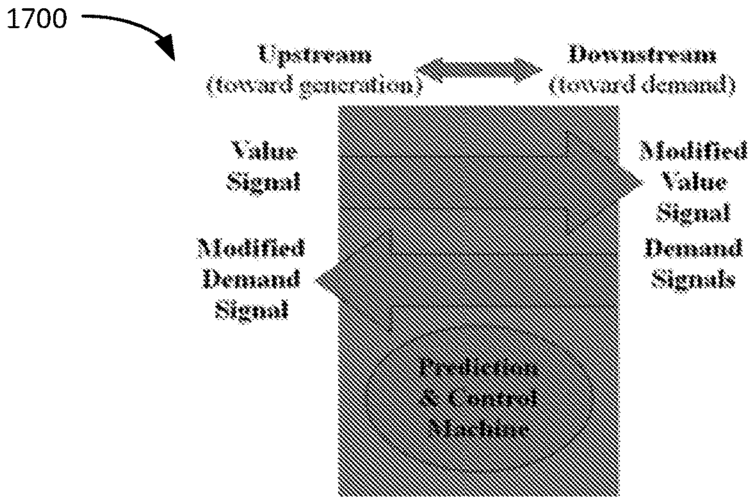
FIG. 17 is a simple view of the responsibilities of a transactive node.

These responsibilities of a transactive node are summarized by block diagram 1700 of FIG. 17, where the "prediction and control machine" is the intelligence (typically implemented as software executed by computing hardware associated with a transactive node) that modifies the output transactive incentive signal, predicts the behaviors of downstream electrical load, and controls responsive assets at the transactive node.

Any one or more of the following functional behaviors can be carried out by transactive nodes:

- Basic transactive node functions
- Management of electrical constraints
- Management of electrical supply
- Management of responsive assets.

These general functional behaviors help form the basis for a basic building-block model of a transactive node, whose models may be linked together to model the behaviors of the transactive nodes in a completed nodal hierarchy. Each of these functional behaviors is discussed in more detail below.

4.5.2 Basic Transactive Node

Figure 18:
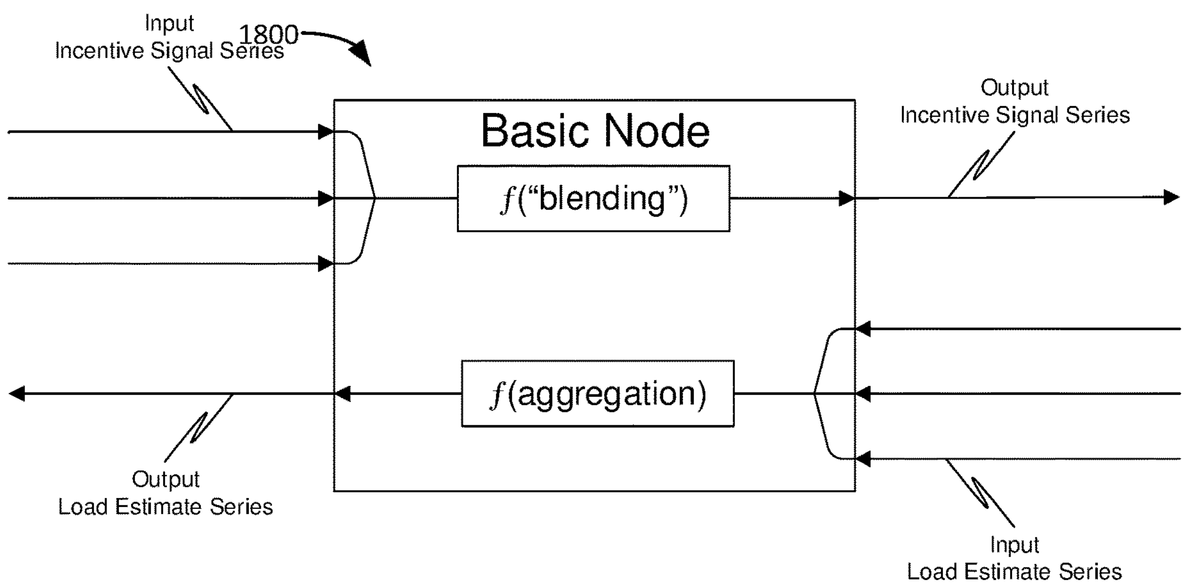
FIG. 18 illustrates a basic transactive node model.

This section addresses the most basic functions that a point in the electrical connectivity architecture (hierarchy) performs as part of its role as a transactive node. First, a transactive node desirably is able to receive at least one transactive signal and "blend" the signals into a single transactive signal output to be sent downstream through the hierarchy. For purposes of this discussion, this basic function is termed the incentive blending function and is illustrated in block diagram 1800 in FIG. 18. Secondly, a transactive node desirably is able to receive or meter the downstream electric load that it supplies and aggregate this information and these measurements into a complete transactive feedback signal to be sent upstream through the hierarchy. For purposes of this discussion, this basic function is termed load aggregation, and is also illustrated in FIG. 18.

As a starting point for the design, the default incentive blending function can be assigned as a weighted average of the transactive incentive signals that are received at the transactive node from upstream, where the weighting is performed according to the energy received from each source during the interval. For instance, this weighted average can be formulated as:

$$TSF_{output}(t) = \frac{TSF_{input\,1}(t) \cdot TIS_{input\,1}(t) + TFS_{input\,2}(t) \cdot TIS_{input\,2}(t) + \ldots}{TSF_{input\,1}(t) + TFS_{input\,2}(t) + \ldots}.$$

It is noteworthy that the relative electrical energy to be received from multiple source inputs to a transactive node during a time interval cannot be directly controlled by the transactive node and may only be predicted imperfectly from the transactive node's limited view of the system. This might not be problematic (or even evident) for transactive nodes that exist within largely radial distribution systems, but may become more evident for transactive nodes within highly redundant transmission pathways and near dispatchable generators. This observation results from the more distributed nature of the disclosed transactive control and coordination system and can be contrasted with systems where transmission system conditions are predicted by load flow calculation methods that assume nearly complete system visibility and use simultaneous solution of the entire system's status.

The load aggregation function is conceptually simple, but complexities potentially arise from the breadth of downstream electrical load types and conditions. In principle, the purpose of the load aggregation function is simply to receive or measure electrical load that is supplied through the transactive node and to convert these measurements and this information into the transactive feedback signal, including a prediction of the entire electrical load to be supplied through the transactive node for each time interval. The transactive node can implement this functionality according to one or more of the following cases:

Case 1.

If there are transactive nodes immediately downstream from the given transactive node, then the transactive feedback signals that are received from them is already in the right format and should simply be added.

Case 2.

The electric load that is not from responsive assets and is not supplied by another downstream node is predicted and converted into the format of the transactive feedback signal. This prediction might rely on an active model of the behaviors of the supplied load or its components. These unresponsive asset behaviors might be influenced by weather, day of week, customer habits, and/or many other conditions, but they are not affected by the transactive incentive signal.

Case 3.

A third case is similar to case 2 above but further includes responsiveness to the transactive node's transactive incentive output signal.

4.5.3 Constraint Transactive Node

Figure 19:
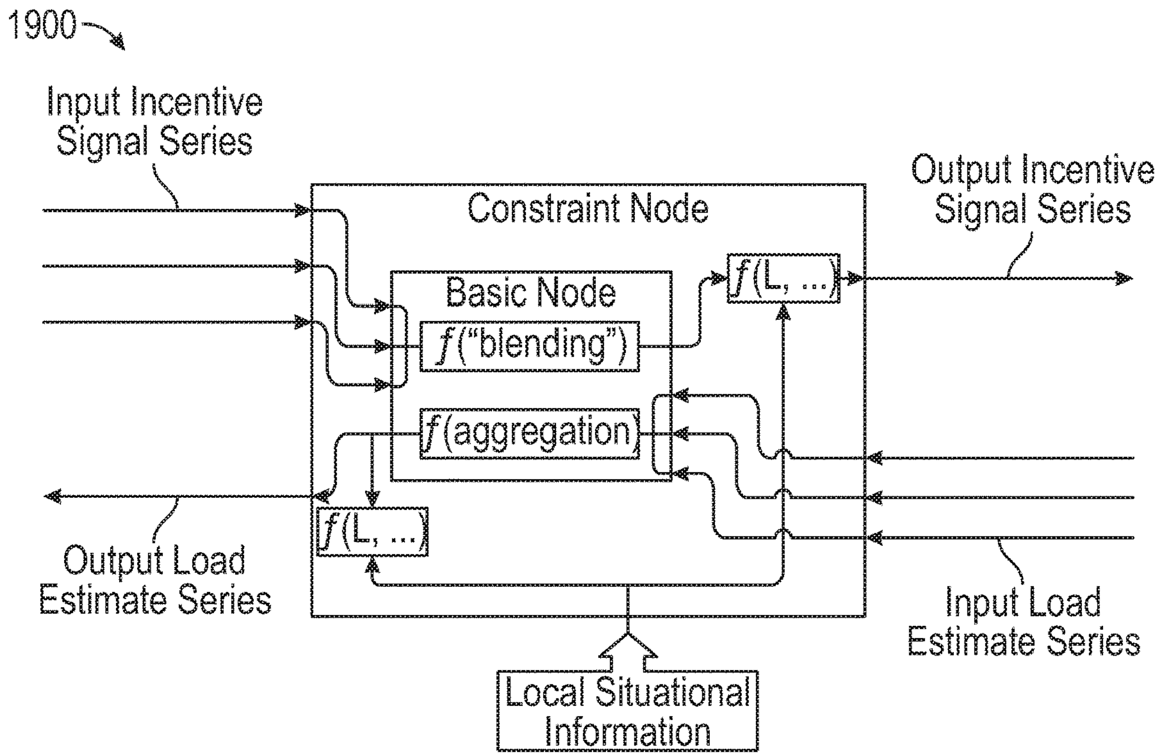
FIG. 19 illustrates the constraint function transactive node component.

A transactive node that manages an electrically constrained piece of equipment at the transactive node additionally may modify its output transactive incentive signal to manage this constraint. This additional function is shown in diagram 1900 of FIG. 19 in line with the downstream output of the transactive node's transactive incentive signal. This function draws upon predicted electrical load and other local information, including the knowledge of the electrical constraint magnitude.

In summary, the transactive incentive signal can be made responsive to the constraint, and the downstream responsive assets can be made to reduce or curtail their consumption when the transactive incentive signal becomes high.

In contrast to a transactive approach where price is determined by a two-way clearing of a market, embodiments of the disclosed technology base the magnitude of the transactive incentive signal on actual risks and expenses. The transactive incentive signal is therefore not a marginal price but is instead a transparent accumulation of incurred expenses. This approach responds to the criticism received by marginal pricing that it results in more, not less, expense to customers.

If a constraint is to be addressed, the transactive node can be associated with the constrained piece of equipment. This practice can help in situations where it is desirable to have only one output transactive incentive signal be necessary from the perspective of the transactive node.

In some instances, local situation information can also be received from this function, which may generate useful alerts, for example, for system operators. That is, the prediction of constrained operation at a transactive node is reflected in both the transactive incentive and feedback signals at that node, and useful notifications may be generated if thresholds are exceeded in these signals.

4.5.4 Load Transactive Node

Figure 20:
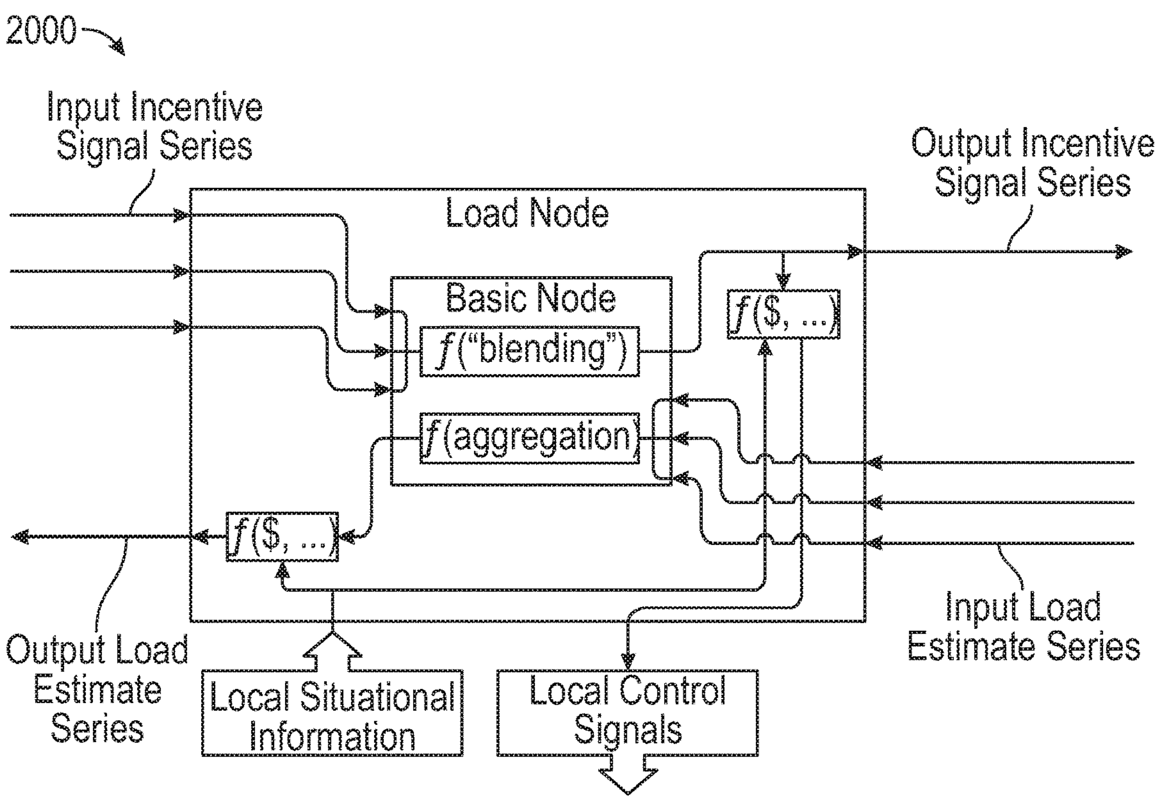
FIG. 20 illustrates the load function transactive node component.

This transactive node function addresses a node associated with a load asset and builds on the structure of a basic node. In diagram 2000 of FIG. 20, a function is shown to reside on the path of the output transactive feedback signal. This function allows local situational information to affect prediction of future electric load, but it also includes the effect of the transactive incentive signal toward predicting energy consumption by responsive load. The responsive load is the load consumption of those responsive assets that are controlled at the transactive node. (Responsive assets that are controlled at downstream nodes are also responsive, but their behaviors are already captured in the basic transactive node's summing of signals from downstream transactive nodes.)

Smaller distributed generation can be addressed by using the load transactive node functions. Distributed generators can make their decisions to run or not based on the transactive incentive signal which is provided by the load transactive node functions. When the small generator operates, it effectively reduces downstream electrical load.

The transactive node further uses its version of the transactive incentive signal to functionally control its responsive assets via a toolkit load function selected from a library of such available functions. The output of this function to the responsive assets can depend upon the control method the utility has established for that responsive asset:

- Direct demand response—an event-type of response is initiated by the responsive asset system when the transactive incentive signal exceeds a rather extreme threshold. Events occur infrequently.
- Time-of-use—an event is initiated by the responsive asset system while the transactive incentive signal is within defined boundaries that are exceeded most days. Often used to address system peak load. Includes peak responses where more extreme events are recognized.
- Real-time—a continuum of responses is provided by the responsive asset to the transactive incentive signal. This use case is active most, if not all, days and hours.

Figure 21:
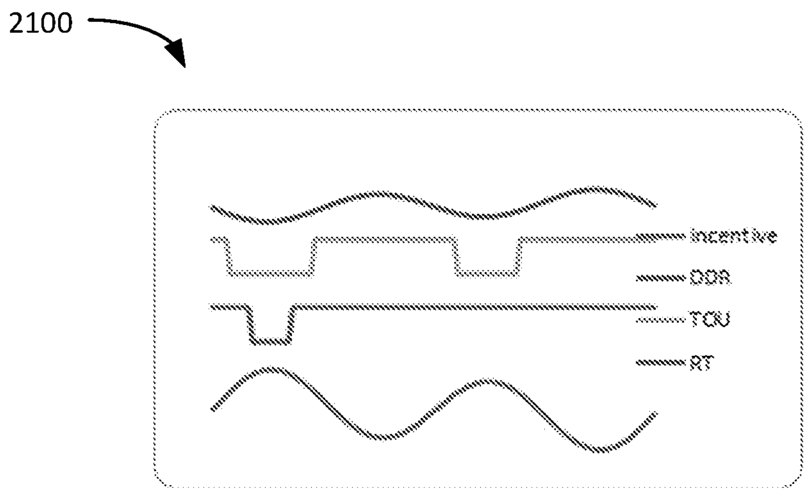
FIG. 21 is a graph showing conceptual responses of methods to variation of an incentive signal.

These responses are shown conceptually in graph 2100 of FIG. 21. Relative variations in the transactive incentive signal are shown to result in direct demand response, time-of-use (TOU), and real-time response options.

4.5.5 Supply Transactive Node

Figure 22:
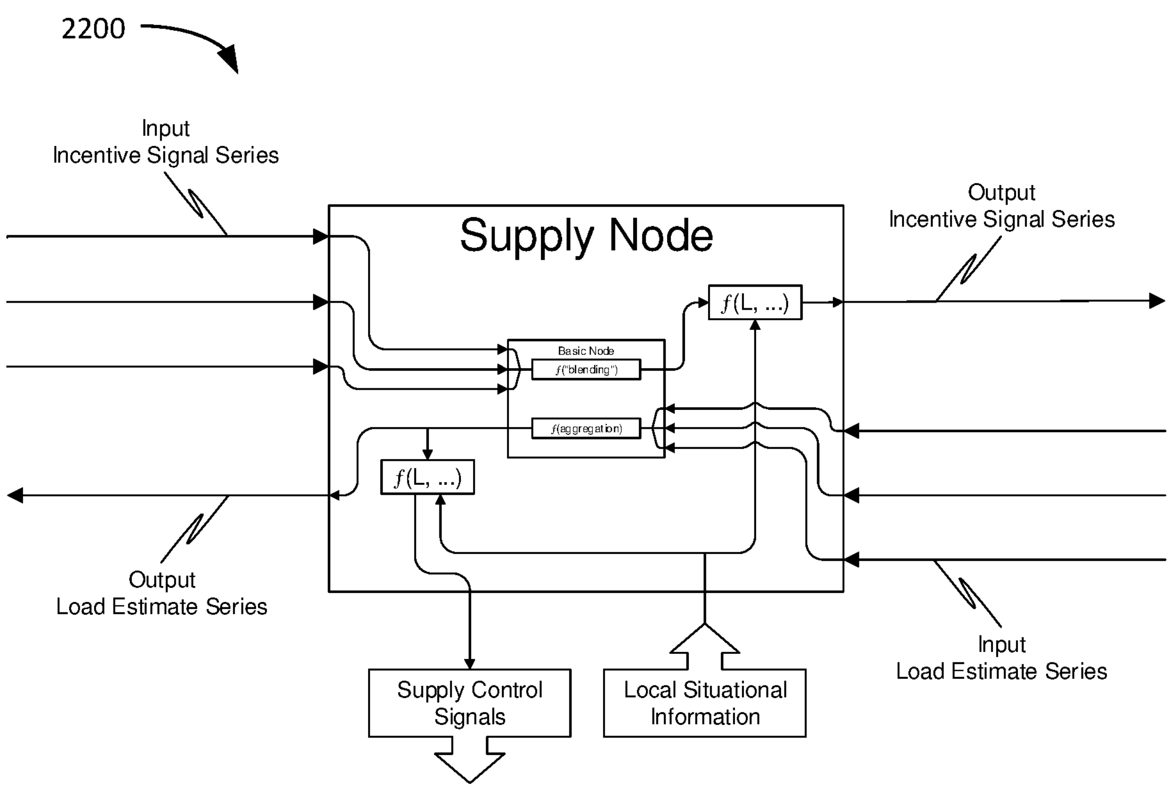
FIG. 22 illustrates a supply function node component.

A supply transactive node function is shown in diagram 2200 of FIG. 22 and is similar to a load transactive node function. Both function types attempt to mitigate an imbalance between electrical supply and load, so it is reasonable that their forms would be similar.

This transactive node function is targeted mostly to bulk generation nodes. At these transactive nodes, the base foundation for transactive incentive signals is established. At a supply node, there may be no upstream nodes from which input transactive incentive signals could be received. The function in the path of the output transactive incentive signal is then the initial formulation of the base transactive incentive signal.

Local situational information can be generated or received by this transactive node. The supply transactive node can apply supply control (or a recommendation) if such supply generation is provided at this transactive node. Local information can also be used to inform what fuel expense and other operational expenses should be included into the initial transactive incentive signal at this location.

The incentive signal and the actual expenses of the supply desirably agree over long periods of time, but the function can (while adhering to this stated guideline) address the value of electrical generation in a way that instills useful responses by the region's responsive assets. For example, when this supply transactive node function is applied at wind farms, the created transactive incentive signal can induce the region's responsive assets to consume more of its energy while and near where the wind energy is produced.

Figure 23:
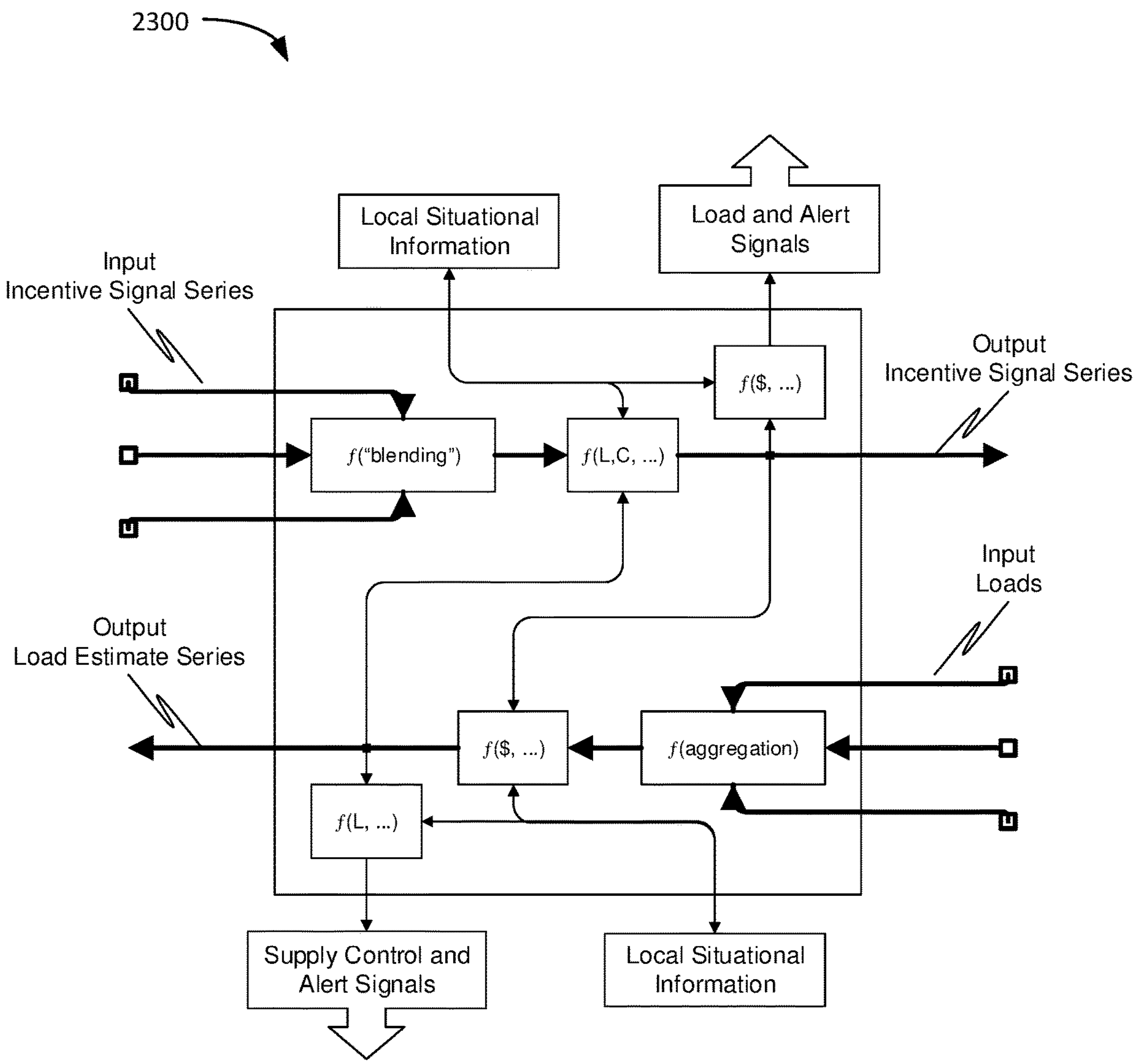
FIG. 23 illustrates a general transactive node.

4.6 Understanding Generalized Transactive Nodes as Combinations of the Functional Component Types A set of transactive node functions has been introduced. These functions can be generalized as shown in diagram 2300 of FIG. 23. In particular, diagram 2300 illustrates a single model of a transactive node and its functions. Any one or more aspects of this model can be replicated throughout a transactive control and coordination system to represent a variety of types and instantiations of the system's transactive nodes.

In particular implementations of the transactive system, the output transactive incentive signal becomes an input transactive incentive signal to a transactive node that is immediately downstream; the output transactive feedback signal from a transactive node becomes the input for a transactive node immediately upstream.

4.7 Hierarchy

Block diagram 200 in FIG. 2 shows examples of significant transactive node locations that exist within a typical electric power grid. Embodiments of the transactive control technique are unique in that it addresses the power system from bulk generation to end use and back again. Ideally, and in certain embodiments, a complete hierarchy of transactive nodes is defined throughout the power system. In reality, there are parts of the electrical connectivity pathways without transactive nodes. In such cases, some nodes will perform more prediction and do so for more of a distribution system than they would do in a complete hierarchy. Further, in some cases, local constraints and other local operation objectives that might be mitigated by transactive nodes will remain unobserved.

5 Generalized Methods and Systems for Implementing Aspects of the Disclosed Technology Having introduced the disclosed technology in the sections, this section presents general methods and systems for performing aspects of the disclosed transactive control approach. The embodiments below should not be construed as limiting and can be performed alone or in combination with any other feature or aspect disclosed herein.

Figure 24:
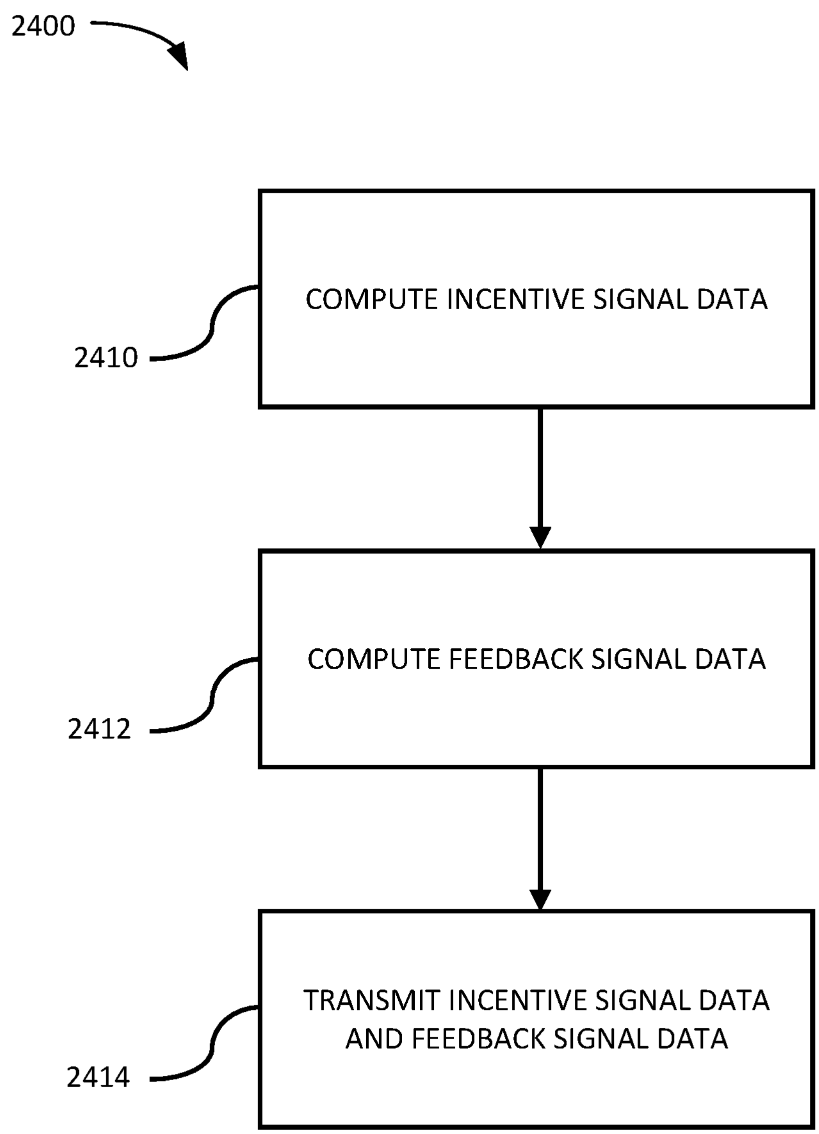
FIG. 24 is a flowchart illustrating an exemplary method for operating a transactive node according to certain embodiments of the disclosed technology.

FIG. 24 is a flowchart 2400 showing a generalized method for operating a transactive node in a transactive control electrical-energy-allocation system as can be used in any of the disclosed embodiments. The method can be performed using computing hardware (e.g., a computer processor or a specialized integrated circuit). For instance, the method can be performed by computing hardware associated with a transactive node where electrical energy is distributed, generated, and/or consumed.

At 2410, incentive signal data is computed. The incentive signal data can comprise data indicative of a cost of electric energy at the transactive node at a current time interval and data indicative of a forecasted cost of electric energy at the transactive node at one or more future time intervals. In certain embodiments, the current time interval refers to the imminent (or next-to-occur) interval in which the transactive node will operate.

At 2412, feedback signal data is computed. The feedback signal data can comprise data indicative of an electric load at the transactive node at the current time interval and data indicative of a forecasted load for electric energy at the transactive node at the one or more future time intervals. In certain embodiments, the current time interval refers to the imminent (or next-to-occur) interval in which the transactive node will operate At 2414, the incentive signal data and the feedback signal data is transmitted. For example, the incentive signal data and feedback signal can be transmitted separately or together from one transactive node to each of its neighboring transactive nodes.

In certain embodiments, the data indicative of the cost of electric energy comprises data indicative of a cost of real electrical energy, reactive electrical energy, or a combination of both real and reactive electrical energies at the transactive node at the current time interval. Further, the data indicative of the forecasted cost of electric energy can comprise data indicative of a forecasted cost of real electrical energy, reactive electrical energy, or a combination of both real and reactive electrical energies at the transactive node at the one or more future time intervals. In some embodiments, the data indicative of the electric load comprises data indicative of a real electrical load, reactive electrical load, or a combination of both real and reactive electrical loads at the transactive node at the current time interval. Further, the data indicative of the forecasted load for electric energy can comprise data indicative of a forecasted load of real electrical load, reactive electrical load, or a combination of both real and reactive electrical loads at the transactive node at the one or more future time intervals.

In some embodiments, the incentive signal data further comprises data indicating a confidence level that the data indicative of the cost of electric energy at the transactive node at the current time interval is reliable (e.g., a confidence level for each time interval), and data indicating a confidence level that the data indicative of the forecasted cost of electric energy at the transactive node at the one or more future time intervals is accurate (e.g., a confidence level for each time interval). Further, in certain embodiments, the feedback signal data further comprises data indicating a confidence level that the data indicative of the electric load at the transactive node at the current time interval is accurate, and data indicating a confidence level that the data indicative of the forecasted load for electric energy at the transactive node at the one or more future time intervals is accurate.

In certain embodiments, the method further comprises receiving incentive signal data and feedback signal data from one or more neighboring transactive nodes. In such embodiments, the computation of the incentive signal data can be based at least in part on the received incentive signal data, and/or the computation of the feedback signal data can be based at least in part on the received feedback signal data.

Figure 25:
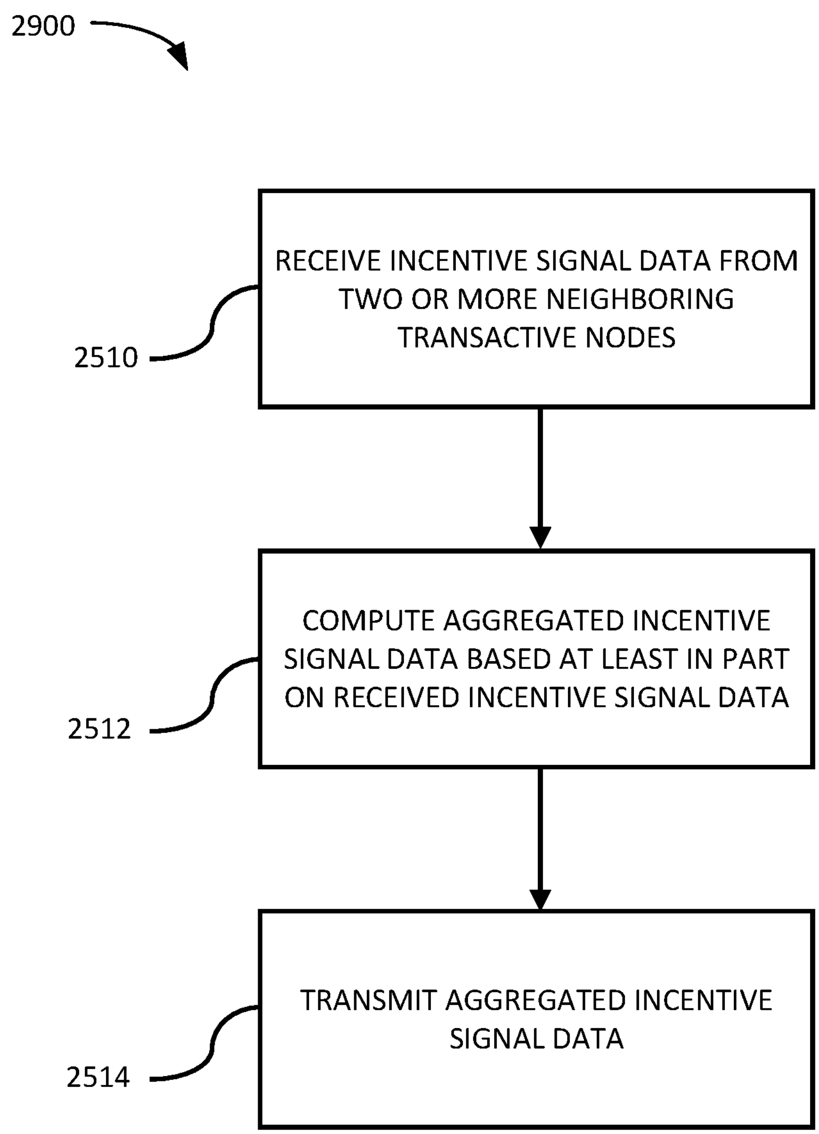
FIG. 25 is another flowchart illustrating an exemplary method for operating a transactive node according to certain embodiments of the disclosed technology.

FIG. 25 is a flowchart 2500 showing another generalized method for operating a transactive node in a transactive control electrical-energy-allocation system as can be used in any of the disclosed embodiments. The method can be performed using computing hardware (e.g., a computer processor or a specialized integrated circuit). For instance, the method can be performed by computing hardware associated with a transactive node where electrical energy is distributed, generated, and/or consumed.

At 2510, incentive signal data is received at the transactive node from two or more neighboring transactive nodes. The incentive signal data from the two or more neighboring transactive nodes can comprise data indicative of at least a cost of electric energy at a current time interval. In certain embodiments, the incentive signal data comprises data indicative of the cost of electric energy at the current time interval (e.g., the delivered unit cost of the energy at that node) and data indicative of a forecasted cost of electric energy at one or more future time intervals. In certain embodiments, the current time interval refers to the imminent (or next-to-occur) interval in which the transactive node will operate At 2512, aggregated incentive signal data is computed based at least in part on the incentive signal data from the two or more neighboring transactive nodes. In some embodiments, the aggregated incentive signal data comprises data indicative of the aggregated cost of electric energy at the current time interval and data indicative of a forecasted aggregated cost of electric energy at one or more future time intervals. Further, in some embodiments, the aggregated incentive signal data comprises a weighted sum of the incentive signal data from the two or more neighboring transactive nodes. In certain embodiments, the aggregated incentive signal data is further modified to provide an incentive or disincentive to the further transactive node based on local conditions at the transactive node. In certain embodiments, the current time interval refers to the imminent (or next-to-occur) interval in which the transactive node will operate At 2514, the aggregated incentive signal data is transmitted to a further transactive node (e.g., a neighboring transactive node).

In some embodiments, the received incentive signal data and the transmitted aggregated incentive signal data comprise data indicative of a cost of real electrical energy, reactive electrical energy, or a combination of both real and reactive electrical energies. In certain embodiments, the received incentive signal data further includes data indicating a confidence level of the received incentive signal data (e.g., a confidence level for each time interval). And in some embodiments, the transmitted incentive signal data further includes data indicating a confidence level of the transmitted incentive signal data (e.g., a confidence level for each time interval).

In some embodiments, the method further comprises receiving feedback signal data at the transactive node from the two or more neighboring transactive nodes, the feedback signal data from the two or more neighboring transactive nodes comprising data indicative of at least an electric load for electric energy at a current time interval; computing aggregated feedback signal data based at least in part on the feedback signal data from the two or more neighboring transactive nodes; and transmitting the aggregated feedback signal data to the further transactive node. In such embodiments, the received feedback signal data can comprise data indicative of the electric load for electric energy at the current time interval and data indicative of a forecasted load of electric energy at the one or more future time intervals, and the aggregated feedback signal data can comprise data indicative of the aggregated load of electric energy at the current time interval and data indicative of a forecasted aggregated load of electric energy at one or more future time intervals.

Figure 26:
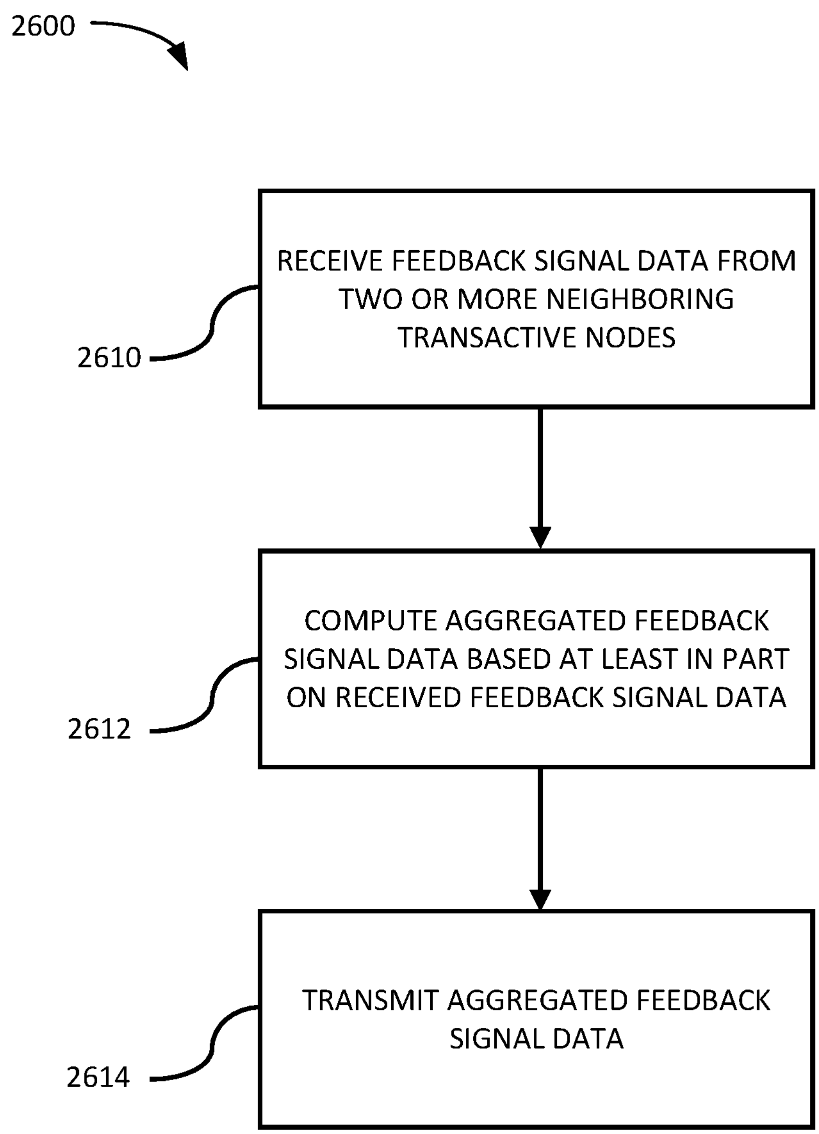
FIG. 26 is another flowchart illustrating an exemplary method for operating a transactive node according to certain embodiments of the disclosed technology.

FIG. 26 is a flowchart 2600 showing another generalized method for operating a transactive node in a transactive control electrical-energy-allocation system as can be used in any of the disclosed embodiments. The method can be performed using computing hardware (e.g., a computer processor or a specialized integrated circuit). For instance, the method can be performed by computing hardware associated with a transactive node where electrical energy is distributed, generated, and/or consumed.

At 2610, feedback signal data is received at a transactive node from two or more neighboring transactive nodes. The feedback signal data from the two or more neighboring transactive nodes can comprise data indicative of at least an electric load for electric energy at a current time interval. In certain embodiments, the received feedback signal data comprises data indicative of the electric load of electric energy at the current time interval and data indicative of a forecasted load of electric energy at one or more future time intervals. In certain embodiments, the current time interval refers to the imminent (or next-to-occur) interval in which the transactive node will operate At 2612, aggregated feedback signal data is computed based at least in part on the feedback signal data from the two or more neighboring transactive nodes. In certain embodiments, the aggregated feedback signal data comprises data indicative of the aggregated load of electric energy at the current time interval and data indicative of a forecasted aggregated load of electric energy at the one or more future time intervals.

At 2614, the aggregated feedback signal data is transmitted to a further transactive node.

In certain embodiments, the received feedback signal data and the transmitted aggregated feedback signal data comprise data indicative of a real electrical load, reactive electrical load, or a combination of both real and reactive electrical loads. In some embodiments, the received feedback signal data further includes data indicating a confidence level of the received feedback signal data (e.g., a confidence level for each time interval). And in certain embodiments, the transmitted feedback signal data further includes data indicating a confidence level of the transmitted feedback signal data (e.g., a confidence level for each time interval).

In some embodiments, the method further comprises receiving incentive signal data at the transactive node from the two or more neighboring transactive nodes, the incentive signal data from the two or more neighboring transactive nodes comprising data indicative of at least a cost of electric energy at the current time interval; computing aggregated incentive signal data based at least in part on the incentive signal data from the two or more neighboring transactive nodes; and transmitting the aggregated incentive signal data to the further transactive node. In such embodiments, the received incentive signal data can comprise data indicative of the cost of electric energy at the current time interval and data indicative of a forecasted cost of electric energy at the one or more future time intervals, and the aggregated incentive signal data can comprise data indicative of the aggregated cost of electric energy at the current time interval and data indicative of a forecasted aggregated cost of electric energy at one or more future time intervals.

Figure 27:
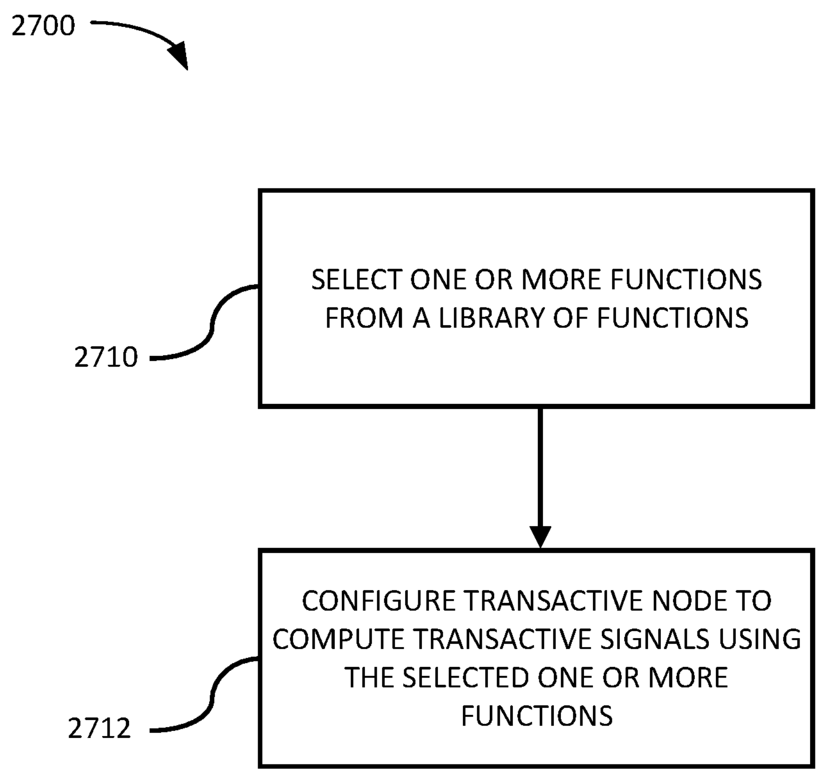
FIG. 27 is another flowchart illustrating an exemplary method for selecting a specific toolkit function from among a library of such toolkit functions.

FIG. 27 is a flowchart 2700 showing another generalized method for operating a transactive node in a transactive control electrical-energy-allocation system as can be used in any of the disclosed embodiments. The method can be performed using computing hardware (e.g., a computer processor or a specialized integrated circuit). For instance, the method can be performed by computing hardware associated with a transactive node where electrical energy is distributed, generated, and/or consumed. The method can be performed for a transactive node associated with one or more electric resources, one or more electric loads, or a combination of both electric resources and loads.

At 2710, one or more functions from a library of functions are selected. The selection can be based at least in part on the type of one or more electric resources or electric loads associated with the transactive node. In certain embodiments, the selected one or more functions are adapted for the type of electrical load or electrical supply associated with the transactive node. In some embodiments, the configuring comprises causing computing hardware used to implement the transactive node to execute a software program for performing computations using the selected one or more functions. In certain embodiments, the selected one or more functions include a function that computes data representing one or more of energy, an energy cost, or an incentive for one or more electric resources associated with the transactive node. In some embodiments, the selected one or more functions include a function that computes data representing one or more of a predicted inelastic load or changes in elastic load for one or more electric loads associated with the transactive node At 2712, the transactive node is configured to compute transactive signals using the selected one or more functions.

In some embodiments, the method can comprise accessing a database storing the library of functions (e.g., a locally stored database or a database remotely located from the transactive node).

Further, the library of functions can be an extensible library. For example, the library can be expanded to include newly formulated functions. Further, in some implementations, existing functions may be selected from the library, edited by a relevant party (e.g., a utility or system administrator), and returned to the library as a newly available function with modified features and capabilities. The parties that have access to editing and adding library functions can vary from implementation to implementation, and can encompass a wide variety of parties involved in the power transmission infrastructure. In some instances, the parties who can edit and/or add functions is limited to some selected group (e.g., system regulators or to a single utility).

Also disclosed herein are several embodiments for systems for distributing electricity. One of the disclosed systems is a system for distributing electricity, comprising: a plurality of transactive nodes, each transactive node being associated with one or more electric resources, one or more electric loads, or a combination of one or more electric resources and loads; and a network connected to the transactive nodes to facilitate communication between the transactive nodes. In these embodiments, the transactive nodes are configured to exchange incentive and feedback signals with one another in order to determine an electrical demand in the system for a current time interval and to provide an electrical supply sufficient to meet the electrical demand for the current time interval. In certain embodiments, the current time interval refers to the imminent (or next-to-occur) interval in which the transactive nodes will operate In certain embodiments, the transactive nodes are further configured to exchange incentive and feedback signals for two or more future time intervals in addition to the incentive and feedback signals for the current time interval. In some embodiments, the two or more future time intervals have increasingly coarser granularity. In certain embodiments, at least one of the transactive nodes modifies one or both of its incentive or feedback signals in response to previously received incentive and feedback signals. In some embodiments, the at least one of the transactive nodes is associated with an elastic load, and wherein the modified incentive or feedback signals corresponds to a predicted change in the elastic load. In certain embodiments, the at least one of the transactive nodes is associated with an electrical resource, and the modified incentive or feedback signals corresponds to a change in the electrical resource. In further embodiments, the at least one of the transactive nodes is associated with an electrical resource, and the modified incentive signals correspond to a change in local conditions.

In certain embodiments, one or more of the transactive nodes compute their respective incentive and feedback signals using functions selected from a library of functions. Still further, in some embodiments, the incentive and feedback signals further include confidence level data indicating a respective reliability of the incentive and feedback signals.

Another system disclosed herein is a system for distributing electricity, comprising: a plurality of transactive nodes, each transactive node being associated with one or more electric resources, one or more electric loads, or a combination of one or more electric resources and loads; and a network connected to the transactive nodes and facilitating communication between the transactive nodes. In these embodiments, the transactive nodes are configured to exchange sets of signals with one another in order to determine an electrical demand in the system for a current time interval and to provide an electrical supply sufficient to meet the electrical demand for the current time interval. Each set of signals includes signals for determining the electric loads and supplies for the current time interval as well as signals for determining the electric loads and supplies for two or more future time intervals. In certain embodiments, the current time interval refers to the imminent (or next-to-occur) interval in which the transactive nodes will operate In some embodiments, the future time intervals have increasingly longer durations as the time intervals are farther into the future relative to the current time interval. In other embodiments, the transactive nodes are configured to update the values of the sets of signals at an update frequency, the update frequency corresponding to a duration of the current time interval. In some embodiments, the transactive nodes are configured to exchange the set of signals with one another iteratively over time such that the signals for a respective time interval stabilize as the respective time interval approaches the current time interval.

In certain embodiments, the transactive nodes are configured to exchange the set of signals with one another on an asynchronous event-driven basis or a clock-driven basis. In some embodiments, a respective set of the transactive nodes are configured to iteratively exchange a set of signals with one another until the exchanged set of signals converges to within an acceptable degree of tolerance. In certain embodiments, a transactive node in the respective set of the transactive nodes is further configured to transmit an updated set of signals when local conditions at the transactive node cause the updated set of signals to deviate from a previously transmitted set of signals beyond a relaxation criterion. In some embodiments, the sets of signals further include confidence level data indicating a respective reliability of the exchanged signals (e.g., a confidence level for each time interval).

Another system disclosed herein is a system for distributing electricity, comprising: a plurality of transactive nodes, each transactive node being associated with one or more electric supplies, one or more electric loads, or a combination of one or more electric supplies and loads; and a network connected to the transactive nodes and facilitating communication between the transactive nodes. In these embodiments, the transactive nodes are configured to exchange sets of signals with one another in order to determine an electrical demand in the system for a current time interval and to provide an electrical supply sufficient to meet the electrical demand for the current time interval, a respective one of the transactive nodes being configured to compute its incentive and feedback signals using one or more functions selected from a library of functions. In certain embodiments, the current time interval refers to the imminent (or next-to-occur) interval in which the transactive nodes will operate In certain embodiments, the one or more functions selected from the library of functions are selected based on the type and number of electrical supplies and electrical loads with which the respective transactive node is associated. The one or more functions can be selected from a group of resource functions comprising one or more of: (a) a resource function adapted to account for imported electrical energy, (b) a resource function adapted to account for a renewable energy resource, (c) a resource function adapted to account for fossil fuel generation, (d) a resource function adapted to account for general infrastructure cost, (e) a resource function adapted to account for system constraints, (f) a resource function adapted to account for system energy losses, (g) a resource function adapted to account for demand charges, and (h) a resource function adapted to account for market impacts. The one or more functions can also be selected from a group of load functions comprising one or more of: (a) a load function adapted to account for a bulk inelastic load, (b) a load function adapted to account for an event-driven demand response, (c) a load function adapted to account for a time-of-use demand response, and (d) a load function adapted to account for a real-time continuum demand response.

In some embodiments, the respective one of the transactive nodes controls one or more elastic loads and adjusts the one or more elastic loads in response to the feedback and incentive signals received at the respective one of the transactive nodes. In certain embodiments, the one or more functions are implemented by individual software modules that can be combined with one another to implement the desired transactor behavior for the respective one of the transactive nodes.

In certain embodiments, through the use of the one or more functions, the respective one of the transactive nodes computes a control signal selected from a set of signed whole numbers and communicates the computed control signal to one or more loads, resources, or loads and resources associated with the respective one of the transactive nodes. The computed control signal can be interpreted by an electrical generator or set of electrical generators as a fraction of the generator's or generators' rated generation capacity. The computed control signal is interpreted by an electrical load or set of electrical loads as a fraction of the load's or loads' rated power.

It should be understood that in embodiments of the disclosed technology, a transactive node may host multiple toolkit functions, including any combination of multiple resource and incentive functions, multiple load functions, or combinations of both resource and incentive and load functions. For instance, the resource and/or incentive functions used at a transactive node will typically depend on the location of the transactive node in a power grid topology, and on the one or more resources and/or loads for which the transactive node is responsible. This ability to "mix and match" resource and incentive functions while still maintaining a common transactive signal communication structure gives embodiments of the disclosed technology wide flexibility and scalability for implementing a transactive control system.

6 Further Details and Embodiments

Having introduced the disclosed technology, this section includes four supplemental Appendices that provide additional details and configurations that can be used in implementations of the technology. The specific implementations disclosed below should not be construed as limiting. Further, any one or more of the features or aspects disclosed below can be used alone or in conjunction with any other feature or aspect of the disclosed technology discussed herein. Some portions of the appendices may, in some instances, be repetitive to other portions of this application, but such portions are included for the sake of completeness.

6.1 Appendix A—Transactive State Model

6.1.1 Purpose

A transactive control and coordination system is a network of loosely connected, interacting transactive nodes. This appendix states a high-level state model for a transactive node and types of connections that a transactive node desirably manages. This appendix should provide valuable guidance to system designers who are implementing a transactive control and coordination system from the perspective of a transactive node.

This appendix defines and discusses

- example attributes of a transactive node and four example types of connections
- the organization of these attributes into groups—transactive node, general connection, transactive neighbor, system manager, asset, and local information
- example allowed states within the high-level transactive node state model
- example functions and events by which attributes become changed and by which the states are navigated in this state model
- example state transition tables and diagrams for the respective transactive node and its connections.

6.1.2 Structure

Figure 28:
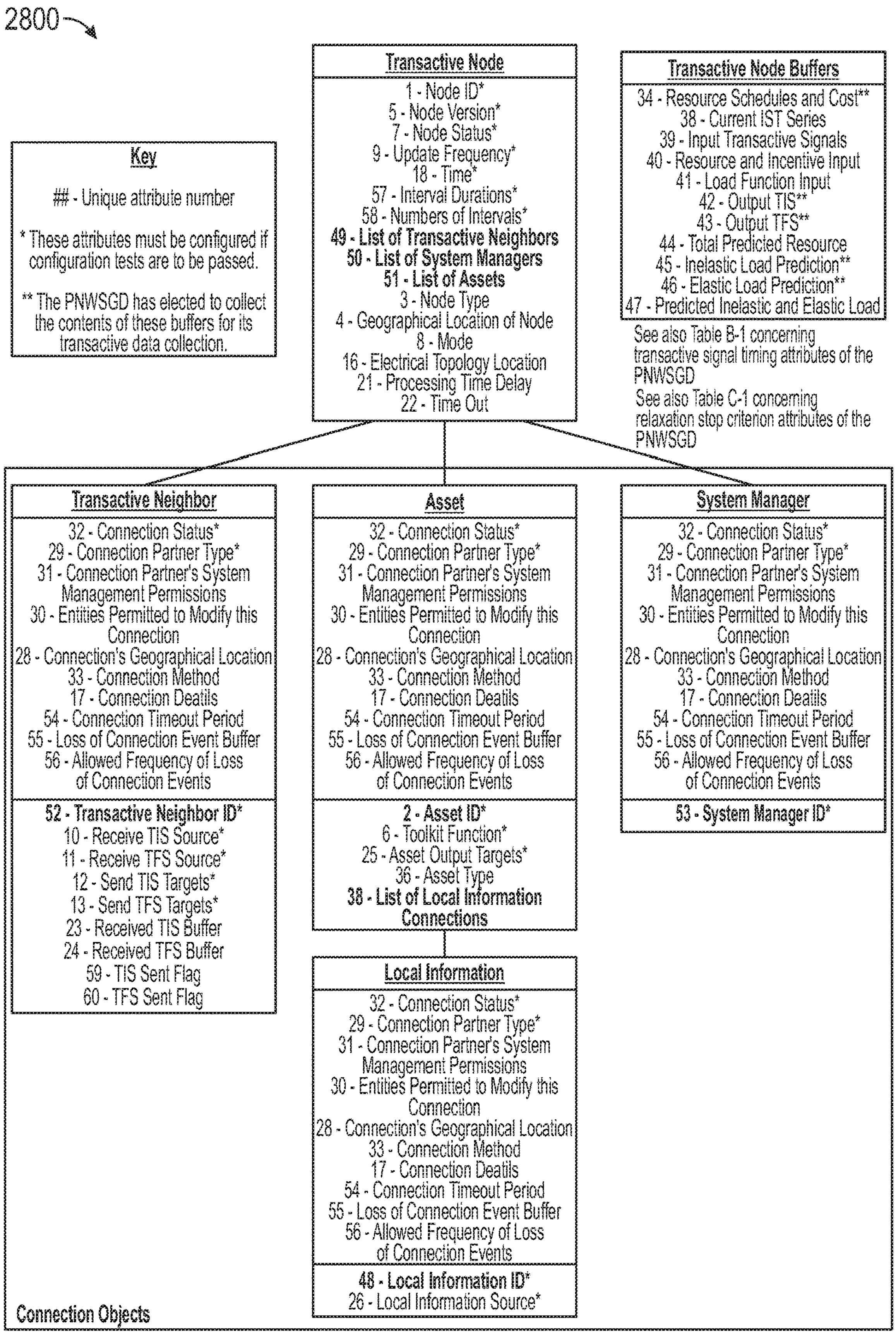
FIG. 28 illustrates the structure of numbered attributes at an exemplary transactive node.

In some embodiments, a transactive node manages its own set of attributes and additionally manages additional types of connection. In certain implementations the transactive node manages four types of connections—connections to transactive neighbors, system managers, assets, and local input information. All four connection types can share a set of connection attributes in common in order to manage connections between this transactive node and each transactive neighbor, system manager, asset, or local input information. An example of this structure has been laid out in diagram 2800 in FIG. 28.

6.1.3 Transactive Node States and State Diagram

Figure 29:
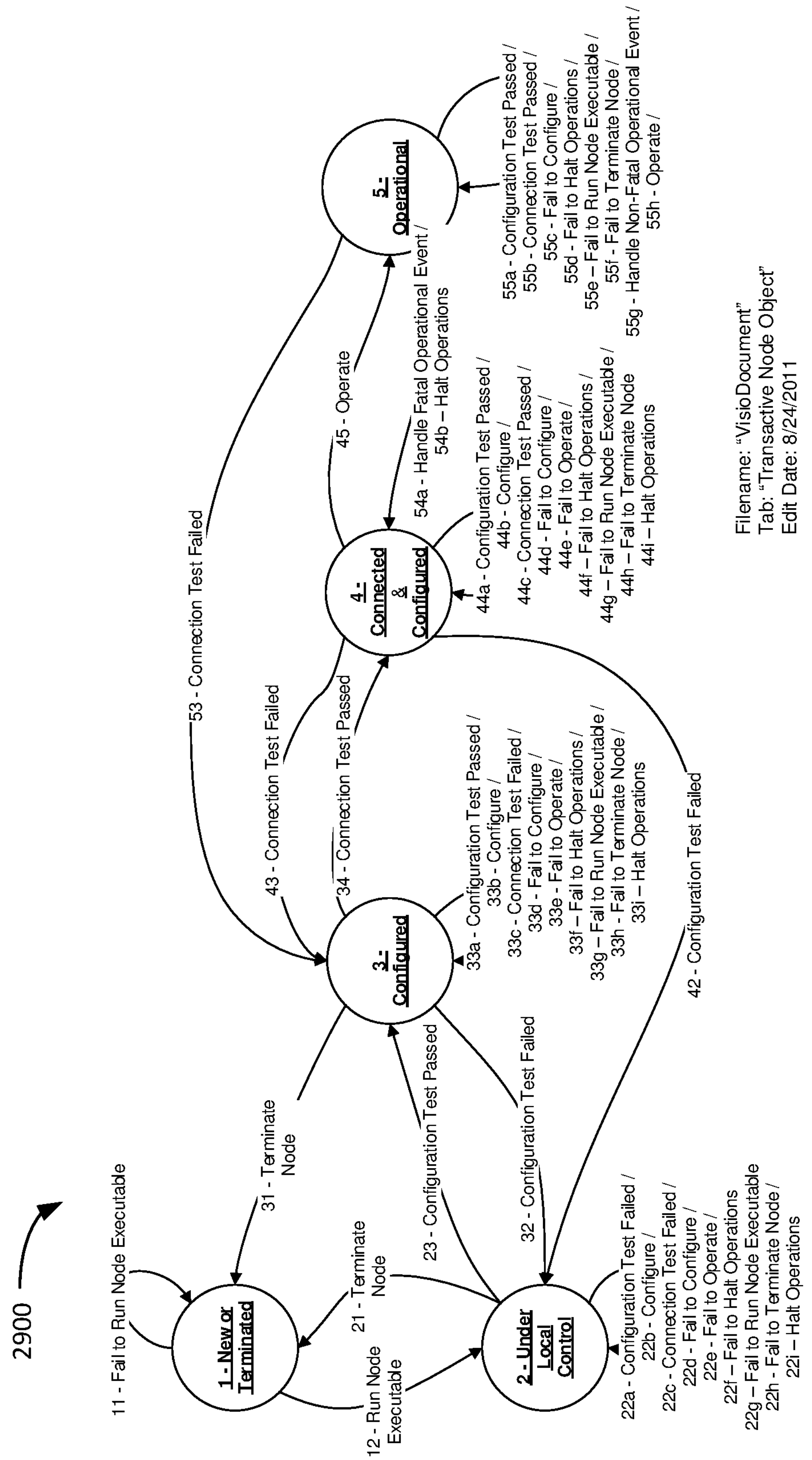
FIG. 29 shows an example state diagram for a transactive node.

In certain embodiments, a transactive node has five states available to it as shown in the state transition diagram 2900 of FIG. 29:

1—New or Terminated—initial and terminal state where the transactive node attributes are not defined. The transactive node leaves and returns to this state by running or terminating an executable program.

2—Under Local Control—intermediate state where the transactive node executable process is up and running, but the transactive node and its connections are not adequately configured. Few, if any, of this transactive node's connections have been completed between this transactive node and its transactive neighbors, system managers, assets, or local information sources, which collectively will be referred to as the transactive node's "connection partners." A transactive node enters this state when a transactive node executable program is run or when a Configuration Test fails.

3—Configured—intermediate state where certain transactive node attributes (those transactive node attributes having asterisks in FIG. 28) have been defined and each of the connections that this transactive node manages is also in its Configured state. A transactive node enters this state by passing a Configuration Test or by failing a Connection Test.

4—Connected & Configured—a transactive node state that has been Configured and now each of the connections that this transactive node manages is in its Connected (or temporarily in its Lost Connection) state. A transactive node enters this state by passing a Connection Test, by receiving and accepting a Halt Operations command, or by encountering a Fatal Operational Event.

5—Operational—a transactive node that has been Connected & Configured and which now interacts with its connection partners according to its algorithmic responsibilities of membership in a transactive control and coordination system. The algorithmic responsibilities are addressed elsewhere as a "toolkit framework" of computational algorithms and a suite of "toolkit library functions" that may be incorporated to represent the more unique and individual algorithmic responsibilities of transactive nodes. The toolkit framework and the toolkit library functions are described in more detail in Appendices B and C. A transactive node enters this state by receiving and accepting an Operate command.

The identifying numbers that have been applied to the functions and events in FIG. 29 are derived from the prior and end states. A letter is appended wherever multiple functions or events achieve the same state transition. For example, the function numbered "54b" (e.g., a Halt Operations command in FIG. 29), is the second state transition that has been defined from state "5" to state "4." These same function and event numbers will be used in corresponding state transition table.

6.1.4 Connection States and State Diagram

Figure 30:
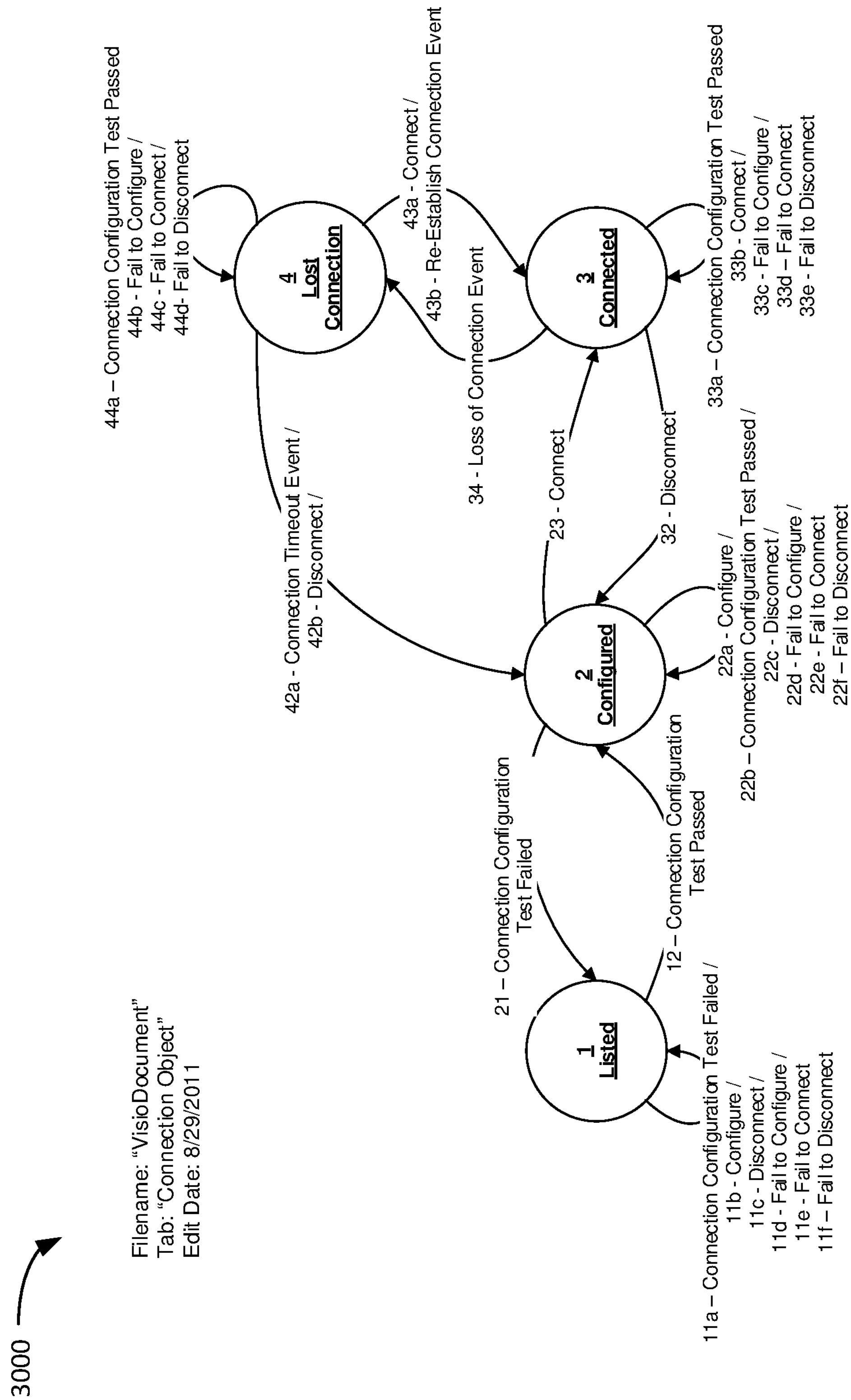
FIG. 30 is an exemplary connection state diagram that applies to transactive neighbors, system managers, assets, and local information.

Each connection has four allowed states as shown in diagram 3000 of FIG. 30. The only details that really change between the four types of connections are those attributes that are tested if a Connection Configuration Testis to be passed for a given connection. These are the connection states and their descriptions:

1—Listed—a connection has been listed when its identifier appears among those in any of these corresponding connection attribute lists:

- 49—List of Transactive Neighbors (a transactive node attribute)
- 50—List of System Managers (a transactive node attribute)
- 51—List of Assets (a transactive node attribute)
- 38—List of Local Information Connections (an asset connection attribute)

There is no expectation that any of the corresponding attributes have been configured in this state. A connection reaches this state by becoming listed in one of the attributes above, which may occur as a transactive node executable program is being run or thereafter using the Configure command. This is an initial and terminal state of any connection.

2—Configured—certain attributes (see asterisks in FIG. 28) of this connection have been configured and are not empty. This connection enters this state by passing a Connection Configuration Test, by accepting a Disconnect command that has been directed to this connection, or when a Terminate Connection Event occurs after this connection has been in its Lost Connection state, which event indicates that either a timeout duration has expired or that too many Loss of Connection Events have occurred in the past hour or day. This is an intermediate state.

3—Connected—a communication link (a "connection") has become successfully established between this transactive node and one of its connection partners via this connection. A connection enters this state by receiving and accepting a Connect command or by having the connection re-established from a Lost Connection state by a Connect command or a Re-Establish Connection Event. This is an intermediate state, but a connection should be expected to remain in this state most of the time.

4—Lost Connection—the state of a connection while the connection between this transactive node and one of its connection partners via this connection has become broken or severed. This temporary intermediate state may be entered by a connection only by a Loss of Connection Event. The connection should thereafter be either re-established by a Connect command or Re-Establish Connection Event, or the connection should become disconnected by a Disconnect command or by a Terminate Connection Event.

Again, the identifying numbers and letters that prepend the functions and events in FIG. 30 are derived from prior and end states and will be used also to identify these same transitions in state transition tables.

6.1.5 The Meaning of Attribute Dictionary Columns

Table 7 is a dictionary of example attributes that can be used to define the state of a transactive node. Later in this appendix, attribute dictionaries will be presented to address attributes of the four types of connections. The meanings of the columns in these dictionary tables are as follows.

Attribute—structured list of attributes (properties, characteristics) defines the pertinent properties of a class of objects. Assigning specific values to the full set of attributes, creates a specific instance or member of the class. Grouping certain attributes into subsets defines the states of an object, including a single start state, one or more intermediate states, and one or more final states.

Attribute Name—a string of alphanumeric (alphabetic, numeric) and possibly special characters given to the attribute for reference.

Description—an easy-to-read narrative about the attribute, clearly distinguishing it from other attributes.

Role—the reason the attribute is important for: 1) the definition of an object, and 2) the application of an attribute in the process that directs actions to instantiate a specific object.

Type—the attribute may represent a type of number, character string, a pointer to a procedure, set of algorithms, names of other classes, an address, or an array of types.

Format—the specific arrangement of the characters or the parts of the assigned attribute value(s).

Range of Values—the specific set of values a process may assign to an attribute, such as least value and greatest value for numbers.

Security—the level of security assigned to an attribute, the identification of the entities (people, systems) authorized to access an attribute, and whether the entities have the right only to read the value of the attribute or to both read and write the attribute value(s).

6.1.6 Transactive Node Attribute Dictionary

The transactive node attribute group contains those attributes that stand alone and refer to one transactive node and its transactive node state model. An example attribute dictionary is shown in Table 7.

Table 8 that follows is a summary of which of these attributes can be added, checked, or modified by the set of commands and events that occur within the state transition table (Table 7), as were introduced in the state transition diagram 2900 of FIG. 29.

TABLE 7

Dictionary of the Transactive Node Attributes

| No. | Attribute Name | Description | Role | Type | Format | Range of values |
|---|---|---|---|---|---|---|
| 1 | Node ID | Unique ID of this transactive node. | This transactive node's name that may be used to refer to it. This is a attribute that is desirably found to have been configured during Configuration Tests. | Character string | 0-9, A-Z Example: "UT-01" | See topology for the transactive control and coordination system where transmission zone, balancing authority, utility, and site names have been stated. |
| 3 | Node Type | The type of transactive control node. Four types have been identified: Transmission Zone (TZ) Balancing Authority (BA), Utility (UT), Site (ST) | | Character string | | TZ, BA, UT, ST |
| 4 | Geographical Location of Node | The representative physical location of this transactive node. | Perhaps useful for future global information system (GIS) representations. | | (latitude, longitude) | (−90 to 90, 0-360) degrees (-pi to pi, 0-2 * pi) radians Default value: (null, null) |
| 5 | Node Version* | The implementation version for the instantiated transactive node at the time the Run Node Executable command is issued. | To keep track of successions of software during incremental improvements, troubleshooting, testing. This is an attribute that is desirably | Two alphanumeric items | "Filename, ##.##", where ##.## are the major and minor version numbers of this file, respectively. | "Filename" should be an allowable executable filename. "##.##" major and minor versions anticipated from "0.00" to "99.99". |

TABLE 7-continued

| Dictionary of the Transactive Node Attributes | | | | | | |
|---|---|---|---|---|---|---|
| No. | Attribute Name | Description | Role | Type | Format | Range of values |
| | | This executable file represents a "version" for the transactive node overall. | found to have been configured during Configuration Tests. | | | |
| 7 | Node Status* | The state of this transactive node within this state model. | Unambiguous representation of the state of this transactive node within this state model. This is an attribute that is desirably found to have been configured during Configuration Tests. | Single integer | Example: "1" | "1" - New or Terminated, "2" - Under Local Control, "3" - Configured, "4" - Connected & Configured, "5" - Operational |
| 8 | Mode | The current mode of operation. | | Single character string | | "Experimental", "Production", "Test" |
| 9 | Update Frequency* | The frequency used to update TIS and TFS. Units are "updates per hour". | The update frequency may change between testing and operation. This is an attribute that is desirably found to have been configured during Configuration Tests. | Single integer | Integer Example: "12" | From 1 to 3600. The Demonstration will most often use "12", meaning one update is performed every 5 minutes. |
| 16 | Electrical Topology Location | The logical location of a transactive node in an electrical system | | Character string | Varied | Varied |
| 18 | Time* | Present time in UTC Format. Time is coordinated across the system of transactive nodes to within 500 milliseconds, or so. | Time is used to mark when node state transitions occur and also to support timing of events related to 9 - Update Frequency. Each transactive node calculates transactive signal interval start times starting from this, the present time. | See UTC standard. | See UTC standard | |

TABLE 7-continued

| Dictionary of the Transactive Node Attributes | | | | | | |
|---|---|---|---|---|---|---|
| No. | Attribute Name | Description | Role | Type | Format | Range of values |
| | | | This is an attribute that is desirably found to have been configured during Configuration Tests. | | | |
| 21 | Processing Time Delay | The time delay for this node within the processing time interval for the system of transactive control nodes | The time delay is used to manage the time sequence relationships | Varied | Varied | Varied |
| 22 | Time Out | The time to wait for receipt of TIS and TFS from adjacent nodes | If expected TIS/TFS are not received before the time out then the node proceeds with available information and reports an associated change in data quality values | Varied | Varied | Varied |
| 34 | Resource Schedules and Cost Buffer | A storage location described in the toolkit framework. Records of this storage location possess information about resources and incentives, most of which are being applied via toolkit functions. | See toolkit framework. This storage location has data that is relevant to the formulation of both the TIS and TFS. | List of series. The individual records will probably resemble TIS and TFS. See toolkit framework. | Expected to be very similar to TIS and TFS. See the toolkit framework. | Reasonable ranges may be asserted. |
| 38 | Current IST Series Buffer | The series of interval start times (IST) that have been calculated and will be used to define the intervals of transactive signals that are being formulated. | A storage location described in the toolkit framework. An interim data storage location within the toolkit framework. Refer to the toolkit framework. | One series of times using UTC standard. See toolkit framework. | See the toolkit framework. Series of times in UTC standard format. | See toolkit framework. The Demonstration has defined 56 intervals. The intervals can align with one of the 12 major division of an hour. |
| 39 | Input Transactive Signals Buffer | A storage location described in the toolkit | Holding place for most recent transactive | List of TIS and TFS (e.g., a list of series). | See transactive signal formats and | Refer to range attributes of TIS and TFS. |

TABLE 7-continued

Dictionary of the Transactive Node Attributes

| No. | Attribute Name | Description | Role | Type | Format | Range of values |
|---|---|---|---|---|---|---|
| | | framework. Records include at least the most recently received transactive signals. | signals that have been received. Holds at least attributes 23 - Receive TIS Buffer and 24 - Receive TFS Buffer, but may also retain records of prior examples. An interim data storage location within the toolkit framework. Refer to the toolkit framework. | See toolkit framework. | XML schema. | |
| 40 | Resource and Incentive Input Buffer | A storage location described in the toolkit framework. | Place where the input "other local conditions" that will be invoked by resource and incentive toolkit functions should be held and managed. Attribute 25 - Local Information Source states the sources that should supply the contents of this storage location. An interim data storage location within the toolkit framework. Refer to the toolkit framework. | List of various items and series data as should be defined for each toolkit resource and incentive function. Refer to toolkit resource and incentive functions that are used at this transactive node where these specifications should be made. | Various. See the toolkit framework. See individual toolkit resource and incentive functions, where the contents and formats should be specified. | Various for records that should be defined in toolkit functions. |
| 41 | Load Function Input Buffer | A storage location described in the toolkit framework. | Place where the input "other local conditions" that will be invoked by load toolkit functions should be held and managed. Attribute 25 - Other Local Conditions Source states the | List of various items and series data as should be defined for each toolkit load function. Refer to toolkit load functions that are used at this transactive node | Various. See the toolkit framework. See individual toolkit load functions, where the contents and formats should be specified. | Various for records that should be defined in toolkit functions. |

TABLE 7-continued

| Dictionary of the Transactive Node Attributes | | | | | | |
|---|---|---|---|---|---|---|
| No. | Attribute Name | Description | Role | Type | Format | Range of values |
| | | | sources that should supply the contents of this storage location. An interim data storage location within the toolkit framework. Refer to the toolkit framework. | where these specifications should be made. | | |
| 42 | Output TIS Buffer | A storage location described in the toolkit framework. Place where updated TIS is held until it can be distributed. | The formulated TIS is held here and may be replaced and further updated until it is finally distributed to transactive neighbors (and maybe other entities). See attribute 12 - Send TIS Targets. An interim data storage location within the toolkit framework. Refer to the toolkit framework. | One TIS | See TIS | See range attributes of TIS |
| 43 | Output TFS Buffer | A storage location described in the toolkit framework. Place where updated TIS is held until it can be distributed. | The formulated TFS is held here and may be replaced and further updated until it is finally distributed to transactive neighbors (and maybe other entities). See attribute 13 - Send TFS Targets. An interim data storage location within the toolkit framework. Refer to the toolkit framework. | One TFS. | See TFS | See range attributes of TFS |
| 44 | Total Predicted Resource Buffer | A storage location described in the toolkit framework. | Sum of average power that is generated within or imported into | List of series. Contents should be similar to TFS with | Modeled after, or identical to, a TFS format. | Represents total average generated power and imported power during |

TABLE 7-continued

| Dictionary of the Transactive Node Attributes | | | | | | |
|---|---|---|---|---|---|---|
| No. | Attribute Name | Description | Role | Type | Format | Range of values |
| | | | a transactive node during future intervals. Compared against total load during the formulation of TFS series. An interim data storage location within the toolkit framework. Refer to the toolkit framework. | same format. | | an interval. Reasonable ranges can be stated, but there is no such test in the present model. |
| 45 | Inelastic Load Prediction Buffer | A storage location described in the toolkit framework. | Records are the inelastic load predicted from one toolkit load function for future intervals. Used to predict total load at future intervals. An interim data storage location within the toolkit framework. Refer to the toolkit framework. | List of series. Contents should be similar to TFS with same format. | Modeled after, or identical to, a TFS format. | Records of this list represent the load being modeled by a toolkit load function. Reasonable ranges can be stated, but there is no such test in the present model. |
| 46 | Elastic Load Prediction Buffer | A storage location described in the toolkit framework. | Records are the changes to elastic load that are predicted from one toolkit load function for future intervals. Used to predict total load at future intervals. An interim data storage location within the toolkit framework. Refer to the toolkit framework. | List of series. Contents should be similar to TFS with same format. | Modeled after, or identical to, a TFS format. | Records of this list represent the change in elastic component of a load that is being modeled by a toolkit load function. Reasonable ranges can be stated, but there is no such test in the present model. |
| 47 | Predicted Inelastic and Elastic Load Buffer | A storage location described in the toolkit framework. An interim data storage location within the | An interim data storage location within the toolkit framework. Refer to the toolkit framework. An interim | List of series. Contents should be similar to TFS with same format. | Modeled after, or identical to, a TFS format. | Records of this list represent total load of a transactive node. Reasonable ranges can be stated, but there is |

TABLE 7-continued

| Dictionary of the Transactive Node Attributes | | | | | | |
|---|---|---|---|---|---|---|
| No. | Attribute Name | Description | Role | Type | Format | Range of values |
| | | toolkit framework. Refer to the toolkit framework. | data storage location within the toolkit framework. Refer to the toolkit framework. | | | no such test in the present model. |
| 49 | List of Transactive Neighbors | List of transactive nodes with which this transactive node exchanges electrical energy and will therefore exchange transactive signals. | This transactive node declares transactive neighbors that it plans to interact with. A transactive neighbor that appears on this list is eligible to enter its Listed state after its 52 - Transactive Neighbor ID has become configured. This attribute is checked during Configuration Tests and Connection Tests to see if expected transactive neighbors have become Configured and Connected. | Comma-separated list of character strings | Example #1: "UT06", which is the Demonstration's identifier for an demonstration utility. | See system topology. List should include nearby transactive nodes with which this transactive node expects to exchange energy. Naming practice should be the same here and for attribute 52 - Transactive Neighbor ID, a Transactive Neighbor attribute. |
| 50 | List of System Managers | List of entities of a transactive control and coordination system that will be granted at least limited permission to make system management commands to this transactive node. A system manager may be, but is not necessarily, also a transactive neighbor. | This is the attribute by which this transactive node declares which entities it will allow to make system management commands. The system managers instantiate a connection, and this transactive node accepts a responsibility to maintain the connection to each system manager. A system manager in this list is | Comma-separated list of character strings | Example #1: "EI01" to represent the system manager, from which system management command will likely be received. Example #2: "UT06", which is the Demonstration's identifier for a demonstration utility, which may be both a system manager to the transactive nodes that it owns and a transactive neighbor, too. | See system topology. Naming practice should be the same here and for attribute 53 - System Manager ID, a System Manager attribute. |

TABLE 7-continued

| Dictionary of the Transactive Node Attributes | | | | | | |
|---|---|---|---|---|---|---|
| No. | Attribute Name | Description | Role | Type | Format | Range of values |
| | | | eligible to enter its Listed state. For each Listed system manager, this transactive node should manage and monitor its state to enter either the 3 - Configured or 4 - Configured & Connected transactive node states, and for which Configuration Tests and Connection Tests are conducted. | | | |
| 51 | List of Assets | List of generation resources, incentives, and loads that are engaged and used by this transactive node. | This is the attribute in which a transactive node declares its assets. Each asset should be accompanied by a toolkit function that defines its predicted participation in ways that affect transactive signals that are formulated at this transactive node. The assets listed here are eligible to enter their Listed states after attribute 2 - Asset ID has been configured. This attribute is checked during Configuration Tests and Connection Tests to see if expected assets have become Configured and Connected. | Comma-separated list of character strings | Example #1: "AV01" to represent an asset system of Avista Utilities. | See toolkit framework. See respective toolkit function for a given asset. Naming practice should be the same here and for attribute 2 - Asset ID, an Asset attribute. |

TABLE 7-continued

Dictionary of the Transactive Node Attributes

| No. | Attribute Name | Description | Role | Type | Format | Range of values |
|---|---|---|---|---|---|---|
| 57 | Interval Durations* | An ordered list of interval durations in minutes that will be used by this transactive node as it formulates its transactive signals. Order is from first to most distant into the future. | This attribute along with 58 - Numbers of Intervals states the durations of the intervals that this transactive node will represent in each of the transactive signals that it calculates. The number of series elements in this attribute and in 58 - Numbers of Intervals should be identical at the times transactive signals are being calculated. This attribute creates no expectation that transactive neighbors will have used the same interval durations. This transactive node should be quite flexible in its ability to receive and interpret diverse time series information. | Comma-separated list of integers that represent interval durations in minutes | Demonstration example: {5, 15, 60, 360, 1440}, representing 5 minutes, 15 minutes, 1 hour, 6 hours, and 1 day. The 1-day intervals are most distant into the future. In the above example, the last sample of each duration has a flexible duration that may vary between the present and the following durations. This is done to keep intervals aligned with hourly market data. | Integer values between 1 and 1440. An allowed number of series elements may be specified in the future but will not be an issue for the Demonstration that will use only 5 different interval durations. Note that this approach that uses integer minutes will limit the practice of intervals that are shorter than 1 minute in the future. The number of series elements in this attribute and in 58 - Numbers of Intervals should be identical at the times transactive signals are being calculated. |
| 58 | Numbers of Intervals* | An ordered list of the number of each of the 57 - Interval Durations that will be used by this transactive node as it formulates its transactive signals. Order is from first to most distant into the future. | This attribute along with 57 - Interval Durations states the number of the intervals of each duration that this transactive node will represent in each of the transactive signals that it calculates. The number of series elements in this attribute and in 57 - Interval | Comma-separated list of integers that represent the number of each corresponding interval duration that is listed in 57 - Interval Durations. | Demonstration example: {12, 20, 18, 4, 2}, representing that there will be 12 5-minute, 20 15-minute, 18 1-hour, 4 6-hour, and 2 1-day intervals. The last member of each interval duration (e.g., the $12^{th}$, $32^{nd}$, $50^{th}$, and $54^{th}$ intervals) varies in | No explicit limit has been placed on the magnitude of each element; however, an element would unlikely be greater than 10,080 - the number of minutes in a week. An allowed number of series elements may be specified in the future but |

TABLE 7-continued

| Dictionary of the Transactive Node Attributes | | | | | | |
|---|---|---|---|---|---|---|
| No. | Attribute Name | Description | Role | Type | Format | Range of values |
| | | | Durations should be identical at the times transactive signals are being calculated. This attribute creates no expectation that transactive neighbors will have used the same intervals. This transactive node should be quite flexible in its ability to receive and interpret diverse time series information. | | duration between the durations of the present and next intervals. | will not be an issue for the Demonstration that will use only 5 different interval durations. The number of series elements in this attribute and in 57 - Interval Durations should be identical at the times transactive signals are being calculated. |

TABLE 8

| Ways in Which Transactive Node Attributes may be affected by this State Model's Commands and Events | | | | | | | | | | |
|---|---|---|---|---|---|---|---|---|---|---|
| Attribute # | Attribute Name | Run Node Executable Command | Configure Command | Operate Command | Halt Operations Command | Terminate Node Command | Con-figuration Test** | Con-nection Test** | Handle Fatal Operational Event | Handle Non-Fatal Operational Event |
| 1 | Node ID* | ++ | | | | – | C | | | |
| 5 | Node Version* | ++ | | | | – | C | | | |
| 7 | Node Status* | (C)++ | C0 | C0 | C0 | C– | C0 | C0 | C00 | C |
| 9 | Update Frequency* | + | +0 | | | – | C | | (C) | (C) |
| 18 | Time* | + | +0 | | | – | C | | (C) | (C) |
| 57 | Interval Durations* | + | +0 | | | – | C | | | |
| 58 | Numbers of Intervals* | + | +0 | | | – | C | | | |
| 49 | List of Transactive Neighbors | + | +0 | | | – | C | C | | |
| 50 | List of System Managers | + | +0 | | | – | C | C | | |
| 51 | List of Assets | + | +0 | | | – | C | C | | |
| 34 | Resource Schedules and Cost Buffer | + | +0 | | | – | | | | |
| 38 | Current IST Series Buffer | + | +0 | | | – | | | | |
| 39 | Input Transactive Signals Buffer | + | +0 | | | – | | | | |
| 40 | Resource and Incentive Input Buffer | + | +0 | | | – | | | | |
| 41 | Load Function Input Buffer | + | +0 | | | – | | | | |
| 42 | Output TIS Buffer | + | +0 | | | – | | | | |
| 43 | Output TFS Buffer | + | +0 | | | – | | | | |
| 44 | Total Predicted Resource Buffer | + | +0 | | | – | | | | |
| 45 | Inelastic Load Prediction Buffer | + | +0 | | | – | | | | |
| 46 | Elastic Load Prediction Buffer | + | +0 | | | – | | | | |
| 47 | Predicted Inelastic and Elastic Load Buffer | + | +0 | | | – | | | | |

TABLE 8-continued

Ways in Which Transactive Node Attributes may be affected by this State Model's Commands and Events

| Attribute # | Attribute Name | Run Node Executable Command | Configure Command | Operate Command | Halt Operations Command | Terminate Node Command | Con-figuration Test** | Con-nection Test** | Handle Fatal Operational Event | Handle Non-Fatal Operational Event |
|---|---|---|---|---|---|---|---|---|---|---|
| 4 | Geographical Location of Node | + | +0 | | | – | | | | |
| 3 | Node Type | + | +0 | | | – | | | | |
| 8 | Mode | + | +0 | +0 | +0 | – | | | +0 | +0 |
| 16 | Electrical Topology Location | + | +0 | | | – | | | | |
| 21 | Processing Time Delay | + | +0 | | | – | | | | |
| 22 | Time Out | + | +0 | | | – | | | (C) | (C) |

*These Node attributes will be checked and should be configured (not empty) during a Configuration Test.
**The Configuration and Connection Tests will additionally check the Asset attribute 38 - List of Local Information and the statuses of connections.
"C" = condition checked;
"(C)" = condition possibly checked;
"++" = "should establish new attribute content";
"+" = "may establish new attribute content";
"––" = "should remove existing attribute content;
"–" = "may remove existing attribute content";
"00 = "should modify existing attribute content";
"0" = "may modify existing attribute content"

6.1.7 Functions and Events of the Transactive Node State Model

Run Node Executable(Filename) Command

Command Parameters

Filename—Filename that should be found in and run from a known file directory. If Filename cannot be found, fail in condition F1.

Command Logic

If Filename cannot be recognized or located, then reply "Command failed—(F1) File could not be found"

If this transactive node is already running an executable file, as can be determined by transactive node attribute 7—Node Status being in a valid, defined state or other evidence that the executable is running, then reply "Command failed—(F2) Node executable is already running."

If the entity that made this command is not the local system manager and is not found to have been granted permission to make this command by attribute 31—Connection Partner's System Management Permissions, then reply "Command failed—(F3) Lacking permission to make this command"

If after running Filename the attributes 1—Node ID, 5—Node Version, 7—Node Status, and 18—Time have not become configured, then do not run the node executable. Reply "Command failed—(F4) Critical transactive node attributes were not configured"

If the node executable fails to run for any other reason, reply

"Command failed—(F5) Unknown reason"

Otherwise,

The node executable runs to completion and its process remains active, including the management present time 18—Time in UTC format.

Set attribute 7—Node Status="2" (state 2—Under Local Control).

Populate attributes 1—Node ID, 5—Node Version, and 18—Time with the contents supplied by Filename. These attributes may not be empty at the successful conclusion of this command.

Additionally, any other attribute may be populated at the time the node executable is run.

Reply, "Command succeeded—(S1)"

Configure( )(Node Attributes) Command—a flexible command that is applicable to the transactive node as well as to the other connections that a transactive node manages. An important concept in the use of this command is that the connection's identifier should be stated before any of its attributes may be modified. Because this section is addressing only the transactive node state model, the only attributes that will be addressed in this section are transactive node attributes for this transactive node.

Command Parameters

ConfigureFile=(Filename)—If a file is named using this parameter, a command script will be read from Filename found in a known file directory. It is recommended that Filename should contain scripted parameters as would be used in line with the command.

Any combination of the following comma-separated, in-line command parameters may be used and in any order:

Node=(1—Node ID)—(Optional) Should match the identity of this transactive node.

NodeAttribute=attribute #, attribute value 1[[, attribute value 2], . . . ]—This parameter may be used to initialize or change the contents of any Node group attribute except attribute 1—Node ID, 5—Node Version, 7—Node Status, or 18—Time.

Command Logic

If the entity that made this command is not the local system manager and if the entity has not been explicitly given permission to make this system management command among the commands in its 31—Connection Partner's System Management Permissions, then reply "Command failed—(F1) Permissions do not include this command"

If attribute 7—Node Status="5" (state 5—Operational), then reply

"Command failed—(F2) Configure command not allowed from Operational state."

If Filename cannot be found, reply

"Command failed—(F3) File cannot be found or opened"

If the Node ID does not match the presently configured Node ID, then reply

"Command failed—(F4) Incorrect node ID"

If the node attribute number does not match a known Node attribute number (e.g., is not a member of {3, 4, 8, 9, 16, 21, 22, 34, 38, 39, 40, 41, 42, 43, 44, 45, 46, 47, 49, 50 or 51}), then reply "Command failed—(F5) Command did not address known node attributes"

If the command cannot be completed for any other reason, reply

"Command failed—(F6) Unknown reason"

Otherwise,

Reply, "Command succeeded—(S1)"

Finalize any changes to transactive node attributes that were specified in the file or on the command line.

Run a Configuration Test.

Run a Connection Test.

Configuration Test( )—this is neither a system management command nor an event, but it is a test of the present configuration that should be conducted automatically by a transactive node after a successful Configure( ) command. It is permissible that the test may be run more often, but the outcome should not be expected to change unless a successful Configure( ) command occurs.

Parameters—None.

Test Logic

If upon checking attribute 7—Node Status, this transactive node is found to be in state "5" (5—Operational), then Test passed—(S1) The Operational state is necessarily Configured.

No further tests are required. No state transition occurs. No attributes are changed.

If any of the attributes 1—Node ID, 5—Node Version, 7—Node Status, 9—Update Frequency, 18—Time, 57—Interval Durations, or 58—Numbers of Intervals have not yet been configured and are therefore empty, then Test failed—(F1) The transactive node is not configured.

Attribute 7—Node Status="2" (state 2—Under Local Control).

If for any transactive neighbor connection listed in 49—List of Transactive Neighbors a corresponding 52—Transactive Neighbor ID has not been established, then Test failed—(F2) Not all transactive neighbors have been Listed.

Attribute 7—Node Status="2" (state 2—Under Local Control).

If for any system manager connection listed in 50—List of System Managers a corresponding 53—System Manager ID has not been established, then Test failed—(F3) Not all system managers have been Listed.

Attribute 7—Node Status="2" (state 2—Under Local Control).

If for any asset connection listed in 51—List of Assets a corresponding 2—Asset ID has not been established, then Test failed—(F4) Not all assets have been Listed.

Attribute 7—Node Status="2" (state 2—Under Local Control).

If for any Listed transactive neighbor (e.g., one for which a 52—Transactive Neighbor ID has become established) its 32—Connection Status is either undefined or "1" (connection state 1—Listed), then Test failed—(F5) Not all transactive neighbors have become configured.

Attribute 7—Node Status="2" (state 2—Under Local Control).

If for any Listed system manager (e.g., one for which a 53—System Manager ID has become established) its 32—Connection Status is either undefined or "1" (connection state 1—Listed), then Test failed—(F6) Not all system managers have become configured.

Attribute 7—Node Status="2" (state 2—Under Local Control).

If for any Listed asset (e.g., one for which a 2—Asset ID has become established) its 32—Connection Status is either undefined or "1" (connection state 1—Listed), then Test failed—(F7) Not all assets have become configured.

Attribute 7—Node Status="2" (state 2—Under Local Control).

If for any asset connection that has local information connections listed in its 38—List of Local Information a corresponding 52—Transactive Neighbor ID has not been established, then Test failed—(F8) Not all local information sources have been Listed.

Attribute 7—Node Status="2" (state 2—Under Local Control).

If for any Listed local information connection (e.g., one for which a 48—Local Information ID has become established) its 32—Connection Status is either undefined or "1" (connection state 1—Listed), then Test failed—(F9) Not all local information connections have become configured.

Attribute 7—Node Status="2" (state 2—Under Local Control).

If the Configuration Test fails to run to completion for any other reason, then

Test failed—(F10) Unknown reasons.

Attribute 7—Node Status="2" (state 2—Under Local Control)

Otherwise,

Test passed—(S2).

If prior 7—Node Status="2" (state 2—Under Local Control), then Node Status="3" (state 3—Configured).

Otherwise, Node Status should remain unchanged in the prior state.

Connection Test( )—this is neither a system management command nor an event, but it is a test of the completeness of the connections that should be completed between this transactive node and its connections. A Connection Test should be conducted automatically by a transactive node after a successful Configure( ) command and after any connection changes its connection state. A transactive node should have passed a Configuration Test before a Connection Test may be passed.

Parameters—None.

Test Logic

If upon checking attribute 7—Node Status this transactive node is found to be in state "2" (2—Under Local Control), then Test failed—(F1) A transactive node should be Configured prior to a Connection Test.

No further tests are required.

If for any 52—Transactive Neighbor ID its 32—Connection Status is other than "3" (connection state 3—Connected) or "4" (connection state 4—Lost Connection), then Test failed—(F2) Not all transactive neighbors are Connected.

Attribute 7—Node Status="3" (state 3—Configured).

If for any 53—System Manager ID its 32—Connection Status is other than "3" (connection state 3—Connected) or "4" (connection state 4—Lost Connection), then Test failed—(F3) Not all system managers are Connected.

Attribute 7—Node Status="3" (state 3—Configured).

If for any 2—Asset ID its 32—Connection Status is other than "3" (connection state 3—Connected) or "4" (connection state 4—Lost Connection), then Test failed—(F4) Not all assets are Connected.

Attribute 7—Node Status="3" (state 3—Configured).

If for any 26—Local Information ID its 32—Connection Status is other than "3" (connection state 3—Connected) or "4" (connection state 4—Lost Connection), then Test failed—(F5) Not all local information connections are Connected.

Attribute 7—Node Status="3" (state 3—Configured).

If the Connection Test fails to run to completion for any other reason, then

Test failed—(F6) Unknown reason.

Attribute 7—Node Status="3" (state 3—Configured).

Otherwise,

Test passed—(S1).

If prior 7—Node Status="3" (state 3—Configured), then Node Status="4" (state 4—Connected & Configured).

Otherwise, Node Status should remain unchanged in its prior state.

Operate( ) Command

Command Parameters—None.

Command Logic

The entity making the command should be found to be this transactive node or one of its connections. If the entity making this system management command is not the local system manager and does not explicitly have this command listed among the commands in its 31—Connection Partner's System Management Permissions, then reply "Command failed—(F1) Permissions do not include this command."

If upon reviewing 7—Node Status the transactive node is found to be in a state other than "4" (state 4—Connected & Configured) or "5" (state 5—Operational), then reply "Command failed—(F2) This command is not allowed from current state."

If upon receiving this command this transactive node is not able to enter or remain in state 5—Operational for any reason, then reply "Command failed—(F3) Unknown reason"

Otherwise,

Reply, "Command succeeded—(S1)."

Set 7—Node Status="5" (state 5—Operational).

Begin interacting with transactive neighbor connections and other connections that are managed at this transactive node according to the algorithms of the toolkit framework and functions.

Handle Fatal Operational Event/Handle Non-Fatal Operational Event

The following error categories have been identified:

Application errors—an application error occurs within the transactive control toolkit and may be due to faulty software, logic or algorithms Security and signal validation errors:—security and signal validation errors are primarily associated with the incoming TIS and TFS signals Network errors—network errors are related to communications network connectivity between transactive nodes.

Each error in these categories can further be classified as transient ("Non-Fatal") or permanent ("Fatal").

A non-fatal error is an error where the system can recover from the error without significant degradation of system functionality and can therefore remain in the Operational state. For example, if a transactive node does not receive a TIS signal within the update interval (5 minutes for the Demonstration), the TIS signal can be still be generated with minimal loss of functionality (refer to the toolkit framework for how this is accomplished). But if the TIS signal is not received for a number of hours, then the transactive node may consider this a fatal error and exit an Operational state. The function Handle Non-Fatal Operational Event( ) has been provided within this state model for the diagnostic recognition of and response to non-fatal errors that will occur while the transactive node is in an Operational state.

If a transient error happens often enough or lasts a long time it will turn into a fatal error. Fatal errors are, by definition, not recoverable and cause a transactive node to exit an Operational state. One of the two categories of fatal errors is due to a severe security, application, or network failure. A second category occurs when a non-fatal error is repeated "N" times in a row, or "K" times in an "M" minute interval depending on local policies. The function Handle Fatal Operational Event( ) has been provided within this state model for the diagnostic recognition of and response to fatal errors that may occur while the transactive node is in an Operational state.

The logic and details for these events remain to be worked out, but at this point the logic and details should be made to work within the state model that is being described here.

Halt Operations( ) Command

Command Parameters—None.

Command Logic

The entity making the command should be found to be this transactive node or one of its connections. If the entity making this system management command is not the local system manager and does not explicitly have this command listed among the commands in its 31—Connection Partner's System Management Permissions, then reply "Command failed—(F1) Permissions do not include this command."

If upon reviewing 7—Node Status the transactive node is found to be in a state other than "5" (state 5—Operational), then reply "Command succeeded—(S1) Operations already halted."

Otherwise,

Reply, "Command succeeded—(S2)."

Set 7—Node Status="4" (state 4—Connected & Configured).

Halt interacting with transactive neighbor connections and other connections that are managed at this transactive node according to the algorithms of the toolkit framework and functions.

Terminate Node( ) Command

Command Parameters—None.

Command Logic

If the entity that made this command is not the local system manager and is not found to have been granted permission to make this command by attribute 31—Connection Partner's System Management Permissions, then reply "Command failed—(F1) Lacking permission to make this command"

If upon checking 7—Node Status, this transactive node is found to be in a state other than "2" (state 2—Under Local Control) or "3" (state 3—Connected), then reply "Command failed—(F2) Command not accepted in present transactive node state"

If the node executable fails to run for any other reason, reply

"Command failed—(F3) Unknown reason"

Otherwise, (Optional) Save a copy of the prior configuration. This configuration may be reloaded the next time a node executable is run to jump start the maturity of its configuration. This is the condition of the final state of this transactive node 1—New or Terminated.

Stop the node executable process from running. Attributes may become undefined by this action.

Reply, "Command succeeded—(S1)".

6.1.8 Transactive Node State Transition Table

In the table below, the numbering convention used for these functions and events are concatenations of the prior and end states. Where multiple functions and events have identical prior and end states, letters have been appended. For example, "54b" is the number applied to the second of two transitions from state number 5 to state number 4.

TABLE 9

State Transition Table for a Transactive Node

| | | Acts Upon | | | Producing | | | Info. |
|---|---|---|---|---|---|---|---|---|
| Row | Internal Function | Current State | Using Input | To Set Attributes | Next State | Output | On the Condition | Gathered & Recorded |
| 11 | Fail to Run Node Executable | 1 - New/ Terminated | Filename parameter Source of command Attributes 7 - Node Status and 31 - Connection Partner's System Management Permissions | | 1 - New Terminated | Reply: "Command failed - [(F1) File could not be found/ (F3) Lacking Permission to make this command/ (F4) Critical transactive node attributes were not configured/ (F5) Unknown reasons]" Command log entry | Failure - [(F1) File could not be found/ (F3) Lacking permission to make this command/ (F4) Critical transactive node attributes were not configured/ (F5) Unknown reasons] | Command log entry |
| 12 | Run Node Executable | 1 - New/ Terminated (starting state) | Filename parameter Source of command Attributes 7 - Node Status and 31 - Connection | 1 - Node ID, 5 - Node Version, 7 - Node Status = "2" (state 2 - Under | 2 - Under Local Control | Reply: "Command succeeded - (S1)" Action: Node executable runs | Success - (S1). Node executable runs. | Command log entry |

TABLE 9-continued

State Transition Table for a Transactive Node

| Row | Internal Function | Acts Upon<br>Current State | Using Input | To Set Attributes | Producing<br>Next State | Output | On the Condition | Info.<br>Gathered & Recorded |
|---|---|---|---|---|---|---|---|---|
| | | | Partner's System Management Permissions | Local Control), and 18 - Time should be configured. Any and all remaining attributes may be set. | | Command log entry | | |
| 21 | Terminate Node | 2 - Under Local Control | Source of command Attributes 7 - Node Status and 31 - Connection Partner's System Management Permissions | All attributes revert to an undefined state and are lost when the node executable is terminated. | 1 - New/ Terminated (final state) | Reply: "Command succeeded - (S1)" Action: Node executable terminated Command log entry | Success - (S1) Node executable successfully terminated | Command log entry |
| 22a | Configuration Test Failed | 2 - Under Local Control | 7 - Node Status, 49 - List of Transactive Neighbors, 50 - List of System Managers, 51 - List of Assets, 38 - List of Local Information, 52 - Transactive Neighbor ID, 2 - Asset ID, 53 - System Manager ID, 48 - Local Information ID, 32 - Connection Status | | 2 - Under Local Control | Test log entry | Failure - [(F1) The transactive node is not configured/ (F2) Not all transactive neighbors have been Listed/ (F3) Not all system managers have been listed/ (F4) Not all assets have been listed/ (F5) Not all transactive neighbors have become configured/ (F6) Not all system managers have become configured/ (F7) Not all assets have become configured/ (F8) Not all local information connections have been Listed/ (F9) Not all informations have become configured/ (F10) Unknown reasons] | Test log entry |

TABLE 9-continued

| State Transition Table for a Transactive Node | | | | | | | | |
|---|---|---|---|---|---|---|---|---|
| | | Acts Upon | | | Producing | | | Info. |
| Row | Internal Function | Current State | Using Input | To Set Attributes | Next State | Output | On the Condition | Gathered & Recorded |
| 22b | Configure (Node Attributes) | 2. Under Local Control | Source of command; Command-line parameters; List of node attributes that may be configured; Attributes 7 - Node Status and 31 - Connection Partner's System Management Permissions; referenced configuration file | Node attributes in the following set may be set or modified (e.g., "configured"): {3, 4, 8, 9, 16, 21, 22, 34, 38, 39, 40, 41, 42, 43, 44, 45, 46, 47, 49, 50 or 51} | 2. Under Local Control | Reply: "Command succeeded - (S1)" Command log entry | Success - (S1) | Command log entry |
| 22c | Connection Test Failed | 2 - Under Local Control | 7 - Node Status, 52 - Transactive Neighbor ID, 53 - System Manager ID, 2 - Asset ID, 48 - Local Information ID, 32 - Connection Status | | 2 - Under Local Control | Test log entry | Test failed - (F1) A transactive node should be Configured prior to a Connection Test | Test log entry |
| 22d | Fail to Configure (Node Attributes) | 2 - Under Local Control | Source of command; Command-line parameters; List of node attributes that may be configured; Attributes 7 - Node Status and 31 - Connection Partner's System Management Permissions; Referenced Filename. | | 2 - Under Local Control | Reply: "Command failed - [(F1) Permissions do not include this command/ (F3) File cannot be found or opened/ (F4) Incorrect node ID/ (F5) Command did not address known node attributes/ (F6) Unknown reason]" Command log entry | Failure - [(F1) Permissions do not include this command/ (F3) File cannot be found or opened/ (F4) Incorrect node ID/ (F5) Command did not address known node attributes/ (F6) Unknown reason] | Command log entry |

TABLE 9-continued

State Transition Table for a Transactive Node

| Row | Internal Function | Acts Upon Current State | Using Input | To Set Attributes | Producing Next State | Output | On the Condition | Info. Gathered & Recorded |
|---|---|---|---|---|---|---|---|---|
| 22e | Fail to Operate | 2 - Under Local Control | Source of command; Attributes 7 - Node Status and 31 - Connection Partner's System Management Permissions | | 2 - Under Local Control | Reply: "Command failed - [(F1) Permissions do not include this command/ (F2) This command is not allowed from current state]" Command log entry | Failure - [(F1) Permissions do not include this command/ (F2) This command is not allowed from current state] | Command log entry |
| 22f | Fail to Halt Operations | 2 - Under Local Control | Source of command, Attributes 7 - Node Status and 31 - Connection Partner's System Management Permissions | | 2 - Under Local Control | Reply: "Command failed - (F1) Permissions do not include this command" Command log entry | Failure - (F1) Permissions do not include this commands | Command log entry |
| 22g | Fail to Run Node Executable | 2 - Under Local Control | Filename parameter; Source of command; Attributes 7 - Node Status and 31 - Connection Partner's System Management Permissions | | 2 - Under Local Control | Reply: "Command failed - [(F1) File could not be found/ (F2) Node executable is already running]" Command log entry | Failure - [(F1) File could not be found/ (F2) Node executable is already running] | Command log entry |
| 22h | Fail to Terminate Node | 2 - Under Local Control | Source of command; Attributes 7 - Node Status and 31 - Connection Partner's System Management Permissions | | 2 - Under Local Control | Reply: "Command failed - [(F1) Lacking permission to make this command/ (F3) Unknown reason]" Command log entry | Failure - [(F1) Lacking permission to make this command/ (F3) Unknown reason] | Command log entry |
| 22i | Halt Operations | 2 - Under Local Control | Source of command; Attributes 7 - Node Status and 31 - Connection Partner's System Management Permissions | | 2 - Under Local Control | Reply: "Command succeeded - (S1)" Command log entry | Success - (S1) | Command log entry |

TABLE 9-continued

State Transition Table for a Transactive Node

| Row | Internal Function | Acts Upon: Current State | Using Input | To Set Attributes | Producing: Next State | Output | On the Condition | Info. Gathered & Recorded |
|---|---|---|---|---|---|---|---|---|
| 23 | Configuration on Test Passed (condition (S2)) | 2 - Under Local Control | Attributes 7 - Node Status, 49 - List of Transactive Neighbors, 50 - List of System Managers, 51 - List of Assets, 38 - List of Local Information, 52 - Transactive Neighbor ID, 2 - Asset ID, 53 - System Manager ID, 48 - Local Information ID, 32 - Connection Status | 7 - Node Status = "3" (state 3 - Configured) | 3 - Configured | Test log entry | Pass condition (S2). See test logic. Transactive node configuration is complete and internally consistent. | Test log entry |
| 31 | Terminate Node | 3 - Configured | Source of command; Attributes 7 - Node Status and 31 - Connection Partner's System Management Permissions | All attributes revert to an undefined state and are lost when the node executable is terminated. | 1 - New/ Terminated (final state) | Reply: "Command succeeded - (S1)" Action: Node executable stops Command log entry | Success - (S1) Node executable is terminated. | Command log entry |
| 32 | Configuration Test Failed | 3 - Configured | Attributes 7 - Node Status, 49 - List of Transactive Neighbors, 50 - List of System Managers, 51 - List of Assets, 38 - List of Local Information, 52 - Transactive Neighbor ID, 2 - Asset ID, 53 - System Manager ID, 48 - Local Information ID, 32 - Connection Status | 7 - Node Status = "2" (state 2 - Under Local Control) | 2 - Under Local Control | Test log entry | Failure - [(F1) The transactive node is not configured/ (F2) Not all transactive neighbors have been Listed/ (F3) Not all system managers have been Listed/ (F4) Not all assets have been Listed/ (F5) Not all transactive neighbors have become configured/ (F6) Not all system managers have become configured/ (F7) Not all assets have become configured/ | Test log entry |

TABLE 9-continued

State Transition Table for a Transactive Node

| Row | Internal Function | Acts Upon Current State | Using Input | To Set Attributes | Producing Next State | Producing Output | On the Condition | Info. Gathered & Recorded |
|---|---|---|---|---|---|---|---|---|
| | | | | | | | (F8) Not all local information connections have been Listed/ (F9) Not all information connections have become configured/ (F10) Unknown reasons] | |
| 33a | Configuration Test Passed (condition (S2) | 3 - Configured | Attributes 7 - Node Status, 49 - List of Transactive Neighbors, 50 - List of System Managers, 51 - List of Assets, 38 - List of Local Information, 52 - Transactive Neighbor ID, 2 - Asset ID, 53 - System Manager ID, 48 - Local Information ID, 32 - Connection Status | | 3 - Configured | Test log entry | Pass condition (S2). See test logic. Transactive node configuration is complete and internally consistent. | Test log entry |
| 33b | Configure (Node Attributes) | 3 - Configured | Source of command; Command-line parameters; List of node attributes that may be configured; Attributes 7 - Node Status and 31 - Connection Partner's System Management Permissions; Referenced configuration file Filename | Node attributes in the following set may be set or modified (e.g., "configured"): {3, 4, 8, 9, 16, 21, 22, 34, 38, 39, 40, 41, 42, 43, 44, 45, 46, 47, 49, 50 or 51} | 3 - Configured | Reply: "Command succeeded - (S1)" Command log entry | Success - (S1) | Command log entry |
| 33c | Connection Test Failed | 3 - Configured | Attributes 7 - Node Status, 52 - Transactive Neighbor ID, 53 - System Manager ID, 2 - | | 3 - Configured | Test log entry | Test failed - [(F2) Not all transactive neighbors are Connected/ (F3) Not all system managers are Connected/ | Test log entry |

TABLE 9-continued

State Transition Table for a Transactive Node

| Row | Internal Function | Acts Upon Current State | Using Input | To Set Attributes | Producing Next State | Producing Output | Producing On the Condition | Info. Gathered & Recorded |
|---|---|---|---|---|---|---|---|---|
| | | | Asset ID, 48 - Local Information ID, 32 - Connection Status | | | | (F4) Not all assets are Connected/ (F5) Not all local information connections are Connected/ (F6) Unknown reason] | |
| 33d | Fail to Configure (Node Attributes) | 3 - Configured | Source of command; Command-line parameters; List of node attributes that may be configured; Attributes 7 - Node Status and 31 - Connection Partner's System Management Permissions; referenced configuration file | | 3 - Configured | Reply: "Command failed - [(F1) Permissions do not include this command/ (F3) File cannot be found or opened/ (F4) Incorrect node ID/ (F5) Command did not address known node attributes/ (F6) Unknown reason]" Command log entry | Failure - [(F1) Permissions do not include this command/ (F3) File cannot be found or opened/ (F4) Incorrect node ID/ (F5) Command did not address known node attributes/ (F6) Unknown reason] | Command log entry |
| 33e | Fail to Operate | 3 - Configured | Source of command; Attributes 7 - Node Status and 31 - Connection Partner's System Management Permissions | | 3 - Configured | Reply: "Command failed - [(F1) Permissions do not include this command/ (F2) This command is not allowed from current state]" Command log entry | Failure - [(F1) Permissions do not include this command/ (F2) This command is not allowed from current state] | Command log entry |
| 33f | Fail to Halt Operations | 3 - Configured | Source of command, Attributes 7 - Node Status and 31 - Connection Partner's System Management Permissions | | 3 - Configured | Reply: "Command failed - (F1) Permissions do not include this command" Command log entry | Failure - (F1) Permissions do not include this command | Command log entry |
| 33g | Fail to Run Node Executable | 3 - Configured | Filename parameter; Source of command; Attributes 7 - Node Status and 31 - Connection Partner's | | 3 - Configured | Reply: "Command failed - [(F1)) File could not be found/ (F2) Node executable is already running]" | Failure - [(F1)) File could not be found/(F2) Node executable is already running] | Command log entry |

TABLE 9-continued

State Transition Table for a Transactive Node

| Row | Internal Function | Acts Upon<br>Current State | Using Input | To Set Attributes | Producing<br>Next State | Output | On the Condition | Info. Gathered & Recorded |
|---|---|---|---|---|---|---|---|---|
| | | | System Management Permissions | | | Command log entry | | |
| 33h | Fail to Terminate Node | 3 - Configured | Source of command; Attributes 7 - Node Status and 31 - Connection Partner's System Management Permissions | | 3 - Configured | Reply: "Command failed - [(F1) Lacking permission to make this command/ (F3) Unknown reason]" Command log entry | Failure - [(F1) Lacking permission to make this command/ (F3) Unknown reason] | Command log entry |
| 33i | Halt Operations | 3 - Configured | Source of command; Attributes 7 - Node Status and 31 - Connection Partner's System Management Permissions | | 3 - Configured | Reply: "Command succeeded - (S1)" Command log entry | Success - (S1) | Command log entry |
| 34 | Connection Test Passed | 3 - Configured | Attributes 7 - Node Status, 52 - Transactive Neighbor ID, 53 - System Manager ID, 2 - Asset ID, 48 - Local Information ID, 32 - Connection Status | 7 - Node Status = "4" (state 4 - Connected & Configured) | 4 - Connected & Configured | Test log entry | Success - (S1). Set of connections is complete and connected | Test log entry |
| 42 | Configuration Test Failed | 4 - Connected & Configured | Attributes 7 - Node Status, 49 - List of Transactive Neighbors, 50 - List of System Managers, 51 - List of Assets, 38 - List of Local Information, 52 - Transactive Neighbor ID, 2 - Asset ID, 53 - System Manager ID, 48 - Local Information ID, 32 - Connection Status | 7 - Node Status = "2" (state 2 - Under Local Control) | 2 - Under Local Control | Test log entry | Failure - [(F1) The transactive node is not configured/ (F2) Not all transactive neighbors have been Listed/ (F3) Not all system managers have been Listed/ (F4) Not all assets have been Listed/ (F5) Not all transactive neighbors have become configured/ (F6) Not all system managers have become configured/ (F7) Not all assets have become | Test log entry |

TABLE 9-continued

State Transition Table for a Transactive Node

| | | Acts Upon | | | Producing | | | Info. |
|---|---|---|---|---|---|---|---|---|
| Row | Internal Function | Current State | Using Input | To Set Attributes | Next State | Output | On the Condition | Gathered & Recorded |
| | | | | | | | configured/ (F8) Not all local information sources have been Listed/ (F9) Not all information sourcess have become configured/ (F10) Unknown reasons] | |
| 43 | Connection Test Failed | 4 - Connected & Configured | Attributes 7 - Node Status, 52 - Transactive Neighbor ID, 53 - System Manager ID, 2 - Asset ID, 48 - Local Information ID, 32 - Connection Status | 7 - Node Status = “3” (state 3 - Configured) | 3 - Configured | Test log entry | Test failed - [(F2) Not all transactive neighbors are connected/ (F3) Not all system managers are connected/ (F4) Not all assets are connected/ (F5) Not all local information sources are Connected/ (F6) Unknown reason] | Test log entry |
| 44a | Configuration Test Passed (condition (S2) | 4 - Connected & Configured | Attributes 7 - Node Status, 49 - List of Transactive Neighbors, 50 - List of System Managers, 51 - List of Assets, 38 - List of Local Information, 52 - Transactive Neighbor ID, 2 - Asset ID, 53 - System Manager ID, 48 - Local Information ID, 32 - Connection Status | | 4 - Connected & Configured | Test log entry | Pass condition (S2). See test logic. Transactive node configuration is complete and internally consistent. | Test log entry |
| 44b | Configure (Node Attributes) | 4 - Connected & Configured | Source of command; Command-line parameters; List of node attributes that may be configured; Attributes 7 - Node | Node attributes in the following set may be set or modified (e.g., “configured”): {3, 4, 8, 9, 16, 21, 22, 34, | 4 - Connected & Configured | Reply: “Command succeeded - (S1)” Command log entry | Success - (S1) See command logic | Command log entry |

TABLE 9-continued

State Transition Table for a Transactive Node

| Row | Internal Function | Acts Upon<br>Current State | Using Input | To Set Attributes | Producing<br>Next State | Output | On the Condition | Info. Gathered & Recorded |
|---|---|---|---|---|---|---|---|---|
| | | | Status and 31 - Connection Partner's System Management Permissions; Referenced configuration file Filename | 38, 39, 40, 41, 42, 43, 44, 45, 46, 47, 49, 50 or 51} | | | | |
| 44c | Connection Test Passed | 4 - Connected & Configured | Attributes 7 - Node Status, 52 - Transactive Neighbor ID, 53 - System Manager ID, 2 - Asset ID, 48 - Local Information ID, 32 - Connection Status | | 4 - Connected & Configured | Test log entry | Success - (S1) All connections are complete and connected. | Test log entry |
| 44d | Fail to Configure (Node Attributes) | 4 - Connected & Configured | Source of command; Command-line parameters; List of node attributes that may be configured; Attributes 7 - Node Status and 31 - Connection Partner's System Management Permissions; referenced configuration file | | 4 - Connected & Configured | Reply: "Command failed - [(F1) Permissions do not include this command/ (F3) File cannot be found or opened/ (F4) Incorrect node ID/ (F5) Command did not address known node attributes/ (F6) Unknown reason]" Command log entry | Failure - [(F1) Permissions do not include this command/ (F3) File cannot be found or opened/ (F4) Incorrect node ID/ (F5) Command did not address known node attributes/ (F6) Unknown reason] | Command log entry |
| 44e | Fail to Operate | 4 - Connected & Configured | Source of command; Attributes 7 - Node Status and 31 - Connection Partner's System Management Permissions | | 4 - Connected & Configured | Reply: "Command failed - [(F1) Permissions do not include this command/ (F3) Unknown reason]" Command log entry | Failure - [(F1) Permissions do not include this command/ (F3) Unknown reason] | Command log entry |
| 44f | Fail to Halt Operations | 4 - Connected & Configured | Source of command, Attributes 7 - Node Status and 31 - Connection Partner's System Management Permissions | | 4 - Connected & Configured | Reply: "Command failed - (F1) Permissions do not include this command." Command log entry | Failure - (F1) Permissions do not include this command | Command log entry |

TABLE 9-continued

State Transition Table for a Transactive Node

| Row | Internal Function | Acts Upon<br>Current State | Using Input | To Set Attributes | Producing<br>Next State | Output | On the Condition | Info.<br>Gathered & Recorded |
|---|---|---|---|---|---|---|---|---|
| 44g | Fail to Run Node Executable | 4 - Connected & Configured | Filename parameter; Source of command; Attributes 7 - Node Status and 31 - Connection Partner's System Management Permissions | | 4 - Connected & Configured | Reply: "Command failed - [(F1) File could not be found/ (F2) Node executable is already running]" Command log entry | Failure - [(F1) File could not be found/ (F2) Node executable is already running] | Command log entry |
| 44h | Fail to Terminate Node | 4 - Connected & Configured | Source of command; Attributes 7 - Node Status and 31 - Connection Partner's System Management Permissions | | 4 - Connected & Configured | Reply: "Command failed - [(F1) Lacking permission to make this command/ (F2) Command not accepted in present transactive node state]" Command log entry | Failure - [(F1) Lacking permission to make this command/ (F2) Command not accepted in present transactive node state]" | Command log entry |
| 44i | Halt Operations | 4 - Connected & Configured | Source of command, Attributes 7 - Node Status and 31 - Connection Partner's System Management Permissions | | 4 - Connected & Configured | Reply: "Command succeeded - (S1)" Command log entry | Success - (S1) | Command log entry |
| 45 | Operate | 4 - Connected & Configured | Source of command; Attributes 7 - Node Status and 31 - Connection Partner's System Management Permissions | 7 - Node Status = "5" (state 5 - Operational) | 5 - Operational | Reply: "Command succeeded - (S1)" Action: Transactive node begins interacting with transactive control and coordination system Command log entry | Success - (S1) | Command log entry |
| 53 | Connection Test Failed | 5 - Operational | Attributes 7 - Node Status, 52 - Transactive Neighbor ID, 53 - System Manager ID, 2 - Asset ID, 48 - Local Information ID, 32 - Connection Status | 7 - Node Status = "3" (state 3 - Configured) | 3 - Configured | Test log entry | Test failed - [(F2) Not all transactive neighbors are Connected/ (F3) Not all system managers are Connected/ (F4) Not all assets are Connected/ (F5) Not all local information | Test log entry |

TABLE 9-continued

State Transition Table for a Transactive Node

| Row | Internal Function | Acts Upon Current State | Using Input | To Set Attributes | Producing Next State | Output | On the Condition | Info. Gathered & Recorded |
|---|---|---|---|---|---|---|---|---|
| | | | | | | | sources are Connected/ (F6) Unknown reason] | |
| 54a | Handle Fatal Operational Event | 5 - Operational | Diagnostic recognition of Fatal Operational Event Details TBD | 7 - Node Status = "4" (state 4 - Connected & Configured) | 4 - Connected & Configured | Notifications TBD Event log entry | Non-recoverable error during transactive node operations | Event log entry |
| 54b | Halt Operations | 5 - Operational | Source of command; Attributes 7 - Node Status and 31 - Connection Partner's System Management Permissions | 7 - Node Status = "4" (state 4 - Connected & Configured) | 4 - Connected & Configured | Reply: "Command succeeded - (S2)" Action: The transactive node halts its interactions with the transactive control and coordination system Command log entry | Success - (S2) | Command log entry |
| 55a | Configuration Test Passed (condition (S1) | 5 - Operational | Attributes 7 - Node Status, 49 - List of Transactive Neighbors, 50 - List of System Managers, 51 - List of Assets, 38 - List of Local Information, 52 - Transactive Neighbor ID, 2 - Asset ID, 53 - System Manager ID, 48 - Local Information ID, 32 - Connection Status | | 5 - Operational | Test log entry | Pass condition (S1). See test logic. Transactive node configuration is complete and internally consistent | Test log entry |
| 55b | Connection Test Passed | 5 - Operational | Attributes 7 - Node Status, 52 - Transactive Neighbor ID, 53 - System Manager ID, 2 - Asset ID, 48 - Local Information ID, 32 - Connection Status | | 5 - Operational | Test log entry | Success - (S1) All connections are complete and connected. | Test log entry |

TABLE 9-continued

State Transition Table for a Transactive Node

| Row | Internal Function | Acts Upon Current State | Using Input | To Set Attributes | Producing Next State | Output | On the Condition | Info. Gathered & Recorded |
|---|---|---|---|---|---|---|---|---|
| 55c | Fail to Configure (Node Attributes) | 5 - Operational | Source of command; Command-line parameters; List of node attributes that may be configured; Attributes 7 - Node Status and 31 - Connection Partner's System Management Permissions; Referenced configuration file Filename | | 5 - Operational | Reply: "Command failed - [(F1) Permissions do not include this command/ (F2) Configure command not allowed from Operational state]" Command log entry | Failure - [(F1) Permissions do not include this command/ (F2) Configure command not allowed from Operational state] | Command log entry |
| 55d | Fail to Halt Operations | 5 - Operational | Source of command, Attributes 7 - Node Status and 31 - Connection Partner's System Management Permissions | | 5 - Operational | Reply: "Command failed - (F1) Permissions do not include this command" Command log entry | Failure - (F1) Permissions do not include this command | Command log entry |
| 55e | Fail to Run Node Executable | 5 - Operational | Filename parameter; Source of command; Attributes 7 - Node Status and 31 - Connection Partner's System Management Permissions | | 5 - Operational | Reply: "Command failed - [(F1) File could not be found/ (F2) Node executable is already running]" Command log entry | Failure - [(F1) File could not be found/ (F2) Node executable is already running] | Command log entry |
| 55f | Fail to Terminate Node | 5 - Operational | Source of command; Attributes 7 - Node Status and 31 - Connection Partner's System Management Permissions | | 5 - Operational | Reply: "Command failed - [(F1) Lacking permission to make this command/ (F2) Command not accepted in present transactive node state]" Command log entry | Failure - [(F1) Lacking permission to make this command/ (F2) Command not accepted in present transactive node state] | Command log entry |
| 55h | Operate | 5 - Operational | Source of command; Attributes 7 - Node | | 5 - Operational | Reply: "Command succeeded - (S1)" | Success - (S1) | Command log entry |

TABLE 9-continued

State Transition Table for a Transactive Node

| Row | Internal Function | Acts Upon Current State | Using Input | To Set Attributes | Producing Next State | Output | On the Condition | Info. Gathered & Recorded |
|---|---|---|---|---|---|---|---|---|
| | | | Status and 31 - Connection Partner's System Management Permissions | | | Command log entry | | |

6.1.9 Connection Attributes

Connection attributes have been identified and are ascribable in common to the four types of connections. This set of attributes refers to a single connection between this transactive node and a transactive neighbor, system manager, asset system, or source of local information. The connection attributes are indispensible for keeping track of the state of any type of connection. It is never adequate to reference these attributes apart from a specific example of attribute 27—Connection ID.

Connection attributes are important for navigating the connection state transition diagram 3000 in FIG. 30. The attribute 32—Connection Status should be known and managed for each connection. Attribute 7—Node Status has been shown to be a logical combination of multiple individual Connection Statuses.

Refer to Table 11 for the anticipated ways in which the connection attributes may be affected by the commands and events of the connection state model.

In the connection state model (see FIG. 30), a connection moves between its states by undergoing Configuration Tests, accepting Connect and Disconnect commands, and experiencing some events like Loss of Connection. Important connection attribute 32—Connection Status keeps track of these state changes. For example, a local information connection transitions into state Connection Status "2" (connection state 2—Configured) if connection attribute 32—Connection Status and the local information attribute 48—Connection Status have been configured. (The sets of attributes that should be configured before a connection may enter connection state 2—Configured are indicated conveniently by asterisks in FIG. 28.)

TABLE 10

Dictionary of Connection Attributes that should be applied to each Connection

| No. | Attribute Name | Description | Role | Type | Format | Range of values |
|---|---|---|---|---|---|---|
| 32 | Connection Status* | Indicates the state of the connection between this transactive node and a connection. | Affected by Connect( ) command. A transactive node conducts a Connection Test based on the Connection Statuses of its connections. | Integer | Example: "2" | 1 - Listed,<br>2 - Configured,<br>3 - Connected,<br>4 - Lost Connection |
| 29 | Connection Partner Type* | An indicator of type of connection partner from a list of allowed partner types to include at least transactive neighbors, owner. | May be used to indicate applicable interactions and permissions. For example, transactive neighbors expect to receive and supply transactive signals. System managers should be granted some system management permissions. | Character string | Example: "SM" | "RL"—Responsive Load<br><br>"OL"—Other Local Condition Input<br>"OS"—Owner or Subsystem<br>"RR"—Responsive Rsource<br><br>"SM"—System Manager<br>"TN"—Transactive Neighbor |

TABLE 10-continued

| Dictionary of Connection Attributes that should be applied to each Connection | | | | | | |
|---|---|---|---|---|---|---|
| No. | Attribute Name | Description | Role | Type | Format | Range of values |
| 17 | Connection Details | Optional additional details about the connection method stated in attribute 33 - Connection on Method for a connection. | Each connection method used in attribute 33 - Connection on Method should prescribe a set of details that should be provided by this attribute. | List of alphanumeric is strings | Detail1, detail2, . . . | A list of necessary details should be created for each connection method of attribute 33. For example, Internet (IP address of this transactive node, IP address of connection partner, encryption level, . . . ) |
| 28 | Connection's Geographical Location | The locations of connection partners should be provided to identify map locations to which this transactive node has established connections. This attribute is optional for each connection. | Support future GIS system representations | Most likely a pair of real numbers representing angular latitude and longitude. | (latitude, longitude) As for attribute #4. Geographical Location, angular latitude and longitude are the default units. Standard GIS representation formats should be adapted if such standards can be identified. | 0-360 degrees; 0-2 * pi radians |
| 30 | Entities Permitted to Modify this Connection | For each specified connection, a list of those entities that are permitted to initiate, modify, or disconnect the connection and its attributes. This list may narrow the permissions granted to a connection partner by attribute 31 - Connection Partner Permissions. | Eventually, the transactive nodes will operate with considerable autonomy and should clearly specify which, if any connection partners may modify connections. The Demonstration has many instances where a utility owner should be granted permissions to modify a transactive node's connections. | List of alphanumeric identifiers, one for each entity that will be granted this permission for this connection. | Use guidance provided with 1 - Node ID and 28 - Connection ID. Use formats found in transactive control and coordination system topology maps. | If null, only the local transactive node system manager may modify the specified connection. |
| 31 | Connection Partner's System Management Permissions | The general permissions granted to connection partners to issue system management commands at | This attribute allows system management responsibilities to be assigned to one or more | List of system management commands that will be accepted from a connection | List of allowed system management commands {command1, command2, . . . }. If the list | Entries selected from {Configure([All, 1, 2, . . . ]), Connect, Disconnect, Operate, Run Node |

TABLE 10-continued

Dictionary of Connection Attributes that should be applied to each Connection

| No. | Attribute Name | Description | Role | Type | Format | Range of values |
|---|---|---|---|---|---|---|
| | | this transactive node, plus the transactive node attributes that may be modified by the connection partner during configuration. These permissions may be restricted further by attribute 30 - Entities Permitted to Modify this Connection. | of the connection partners at this transactive node. Assigned among Connection Table attributes. See Connection Table. | partner at this transactive node, plus list of transactive node attributes that may be modified by this connection partner. | includes command Configure( ), the list of modifiable attributes should be listed as parameters of this command by number. | Executable, Stop, Terminate Node} If null, then only this transactive node's system manager may issue system management commands. |
| 33 | Connection Method | Optional indication of the media and protocol used in a connection. | Specify the method of connection. Each such method may then have specific details to be listed in attribute 34 - Connection Details. | Single character string | Example: "Internet" | Ethernet, Internet, Wireless Zigbee ®, Wireless other, Power Line Carrier |
| 54 | Connection Timeout Period | The period of time that a given connection will remain in its Lost Connection state before it will terminate the connection, which could threaten the Operational status of this transactive node. | This is the amount of time that should elapse before a connection in its Lost Connection state will automatically transition back into its Configured state. This duration may be quite long if this transactive node and its algorithms have been designed tolerant of poor connectivity. This timeout period is to be individually configured for each connection. | Character string representation of a single time duration | Recommend "dd:hh:mm". Should emulate UTC standard format that is used frequently in state model. | The Demonstration should use values longer than 5 minutes "00:00:05" or shorter than 4 days "04:00:00". Default value: 1 hour: "00:01:00". |
| 55 | Loss of Connection on Event Buffer | A list of times at which Loss of Connection Events have occurred for | By keeping track of when Loss of Connection Events occur, a transactive | List of UTC times. | See UTC standard | Allow for cyclic buffer of 64 values. Need not be initialized. |

TABLE 10-continued

Dictionary of Connection Attributes that should be applied to each Connection

| No. | Attribute Name | Description | Role | Type | Format | Range of values |
|---|---|---|---|---|---|---|
| | | a given connection. | node can take exceptional actions based on the frequency with which the events have occurred. | | | |
| 56 | Allowed Frequency of Loss of Connection Events | The frequency with which Loss of Connection Events will be tolerated before the connection will be severed. There is a criterion for events per hour and another for events per day. | Criteria placed on the members of 55 - Loss of Connection Event Buffer. The connection should be severed if these frequencies are exceeded, which would indicate a problem with the connection. | Two integers. | Example: (5, 24), meaning 5 times in an hour, or 24 times in a day | Default (6, 48), meaning six times in an hour, or 48 times in during a day. Integers should be less than the buffer length of 55 - Loss of Connection Event Buffer. |

TABLE 11

The Ways Connection Attributes May be Affected by Connection State Model Commands and Events

| Attribute # | Attribute Name | Configure Command | Configuration Test** | Connect Command | Disconnect Command | Loss of Connection Event | Re-Establish Connection Event | Terminate Connection Event |
|---|---|---|---|---|---|---|---|---|
| 32 | Connection Status* | +0 | C + 0 | C0 | C0 | C00 | C00 | C00 |
| 29 | Connection Partner Type* | +0 | | C | | (C) | | |
| 30 | Entities Permitted to Modify this Connection | C + 0 | | C | | | | |
| 31 | Connection Partner's System Management Permissions | C + 0 | | C | C | | | |
| 17 | Connection Details | +0 | | (C) | | (C) | (C) | (C) |
| 28 | Connection's Geographical Location | +0 | | | | | | |
| 33 | Connection Method | +0 | | (C) | (C) | (C) | (C) | (C) |
| 54 | Connection Timeout Period | +0 | | | | C | C | C |
| 55 | Loss of Connection Event Buffer | +0 | | | | C + 0 | | |
| 56 | Allowed Frequency of Loss of Connection Events | +0 | | | | C | | |

*The Connection Status should be configured before a connection can enter its 2 - Configured state.
**The connection Configuration Test additionally should check one or more attributes of the connection partner type.

6.1.10 Transactive Neighbor Connection Attributes

In certain embodiments, transactive node define at least one connection to a transactive neighbor. The connection may be observed and maintained using the union of connection attributes and transactive node attributes (see FIG. 28).

At least for some of the connections that are being made to transactive neighbors, it may be desired that experimenters and testing entities have the means to redirect the inputs received from the transactive neighbors so that these inputs may be received instead from selected alternative sources of such information. It is likewise important that one may redirect the output from these connection partners to one or more alternative locations. For the special type of connection partners called transactive neighbors, the means to redirect inputs and outputs has been accomplished with attributes 10-13, which attributes define the sources and targets of transactive signals. The sources and targets are not necessarily the transactive neighbor itself. Using these attributes, simulations and "what-if" scenarios may be designed and tested in the production or test system environments. (So far, attributes #10-13 only apply to transactive neighbors and their connections. It is conceivable that the attributes could be generalized and renamed to apply to any connection type, not only transactive neighbors.)

TABLE 12

Dictionary of Transactive Neighbor Attributes

| No. | Attribute Name | Description | Role | Type | Format | Range of values |
|---|---|---|---|---|---|---|
| 52 | Transactive Neighbor ID* | The identifier to be used for one transactive neighbor with which this transactive node will exchange electrical energy and therefore will exchange transactive signals. | This asset should be repeated for each member of 49 - List of Transactive Neighbors to instantiate the transactive neighbors that this transactive node expects to interact with. This transactive neighbor enters its Listed state after this attribute has been configured. | Single character string | Example #1: "UT06", which is the Demonstration's identifier for the Avista utility. | See system topology. Naming practice should be the same here and for attribute 49 - List of Transactive Neighbors. |
| 10 | Receive TIS Source* | The Connection ID of a source from which a transactive neighbor's TIS should be received. The source is not necessarily the transactive neighbor itself. | This attribute permits alternative TIS examples to be received at this transactive node from alternative sources to facilitate testing and simulation. | Single, short alphanumeric identifier for each transactive neighbor. | Use guidance provided with 1 - Node ID and 28 - Connection ID. Use formats found in transactive control and coordination system topology maps. | Source should be a known source within present transactive control and coordination system. |
| 11 | Receive TFS Source* | The Connection ID of a source from which a transactive neighbor's TFS should be received. The source is not the transactive neighbor itself. | This attribute permits alternative TFS examples to be received at this transactive node to facilitate testing and simulation. | Single, short alphanumeric identifier for each transactive neighbor | Use guidance provided with 1 - Node ID and 28 - Connection ID. Use formats found in transactive control and coordination system topology maps. | Source should be a known source within present transactive control and coordination system. |
| 12 | Send TIS Targets* | The Connection ID of at least one target location to which this transactive | This attribute permits this transactive node's TIS to be sent to one or more places to | List of one or many single short alphanumeric identifiers for each transactive neighbor | Use guidance provided with 1 - Node ID and 28 - Connection ID. Use formats found in transactive control and coordination system | Target should be known location within present transactive control and coordination system. |

TABLE 12-continued

| Dictionary of Transactive Neighbor Attributes | | | | | | |
|---|---|---|---|---|---|---|
| No. | Attribute Name | Description | Role | Type | Format | Range of values |
| | | node's TIS should be sent. The target location is not necessarily that of the transactive neighbor itself. | facilitate testing and simulation. | | topology maps. | |
| 13 | Send TFS Targets* | The Connection ID of at least one target location to which this transactive node's calculated TFS with this transactive neighbor should be sent. The target location is not necessarily that of the transactive neighbor itself. | This attribute permits this transactive node's TFS for this transactive neighbor to be sent to one or more places to facilitate testing and simulation. | List of one or many single short alphanumeric identifiers for each transactive neighbor | Use guidance provided with 1 - Node ID and 28 - Connection ID. Use formats found in transactive control and coordination system topology maps. | Target should be known location within present transactive control and coordination system. |
| 23 | Received TIS Buffer | Contains at least the most recent TIS messages received from each transactive neighbor. | Each transactive neighbor's TIS is used within the toolkit framework algorithms. To be stored to the Input Transactive Signal Buffer of the toolkit framework. | List of TIS | According to transactive signal format as defined by approved XML schema for the TIS. | See range attributes of TIS |
| 24 | Received TFS Buffer | Contains at least the most recent TFS messages received from each transactive neighbor. | Each transactive neighbor's TFS is used within the toolkit framework algorithms. To be stored to the Input Transactive Signal Buffer of the toolkit framework. | List of TFS | According to transactive signal format as defined by approved XML schema for the TFS. | See range attributes of the TFS |
| 59 | TIS Sent Flag | Flag that is set if a TIS has been transmitted to this transactive neighbor connection | This flag may be used in conjunction with the watchdog timer. The actions | Boolean condition flag: 0 - cleared 1 - set | Boolean logic. | 0 - default value - cleared - no TIS has been transmitted to this transactive neighbor yet during the current update interval. |

TABLE 12-continued

| Dictionary of Transactive Neighbor Attributes | | | | | | |
|---|---|---|---|---|---|---|
| No. | Attribute Name | Description | Role | Type | Format | Range of values |
| | | by this transactive node during the current update interval. The flag is cleared at the beginning of each update interval. | taken upon a watchdog timer event may desirably have the transactive node keep track of to which transactive neighbor transactive signals have been transmitted and not. | | | 1 - set - a TIS has been transmitted to this transactive neighbor during the current update interval. |
| 60 | TFS Sent Flag | Flag that is set if a TFS has been transmitted to this transactive neighbor by this transactive node during the current update interval. The flag is cleared at the beginning of each update interval. | This flag may be used in conjunction with the watchdog timer. The actions taken upon a watchdog timer event may desirably have the transactive node keep track of to which transactive neighbor transactive signals have been transmitted and not. | Boolean condition flag: set/cleared. | Boolean logic. | 0 - default value - cleared - no TFS has been transmitted to this transactive neighbor yet during the current update interval. 1 - set - a TFS has been transmitted to this transactive neighbor during the current update interval. |

*This attributes should be configured to pass a connection Configuration Test.

TABLE 13

| The Ways Transactive Neighbor Attributes May be Affected by Connection State Model Commands and Events | | | | | | | | |
|---|---|---|---|---|---|---|---|---|
| Attribute # | Attribute Name | Configure Command | Configuration Test** | Connect Command | Disconnect Command | Loss of Connection Event | Re-Establish Connection Event | Terminate Connection Event |
| 52 | Transactive Neighbor ID* | (C) + 0 | C | (C) | (C) | (C) | (C) | (C) |
| 10 | Receive TIS Source* | +0 | C | (C) | (C) | (C) | (C) | (C) |
| 11 | Receive TFS Source* | +0 | C | (C) | C) | (C) | (C) | (C) |
| 12 | Sent TIS Targets* | +0 | C | (C) | (C) | (C) | (C) | (C) |
| 13 | Send TFS Targets* | +0 | C | (C) | (C) | (C) | (C) | (C) |
| 23 | Received TIS Buffer | +0 | | | | | | |
| 24 | Received TFS Buffer | +0 | | | | | | |

*These attributes should be configured before a transactive neighbor connection can enter its 2 - Configured state.

**The connection Configuration Test additionally should check that 32 - Connection Status has been configured.

6.1.11 System Manager Connection Attributes

In certain embodiments, a single attribute can define a connection to a system manager.

TABLE 14

Ways in which System Manager Connection Attributes may be affected by Connection Commands and Events

| Attribute # | Attribute Name | Configure Command | Configuration Test** | Connect Command | Disconnect Command | Loss of Connection Event | Re-Establish Connection Event | Terminate Connection Event |
|---|---|---|---|---|---|---|---|---|
| 52 | System Manager ID* | (C) + 0 | C | (C) | (C) | (C) | (C) | (C) |

*The Connection Status should be configured before a connection can enter its 2 - Configured state.
**The connection Configuration Test additionally should check one or more attributes of the connection partner type.

Note that in certain implementations, transactive nodes establish and maintain a connection to the global system manager. Therefore, attribute 52 System Manager ID includes the ID of this global system manager for the transactive nodes.

TABLE 15

Dictionary of System Manager Connection Attributes

| No. | Attribute Name | Description | Role | Type | Format | Range of values |
|---|---|---|---|---|---|---|
| 52 | System Manager ID* | The identifier for one system manager. This entity will be granted permissions by this transactive node to make some system management commands. | This attribute instantiates a system manager from those that appear in 50 - List of System Managers. A system manager for which this attribute has been configured will enter its Listed state. A system manager is not a transactive neighbor, but a transactive neighbor may be granted permissions to act as a system manager. This transactive node may instantiate multiple connections to system managers. The Demonstration, for example, will have some central system management ("EI01"), but this transactive node may also grant system administration rights to the utility that "owns" this transactive node. | Single character strings | Example #1: "EI01" to represent the system manager, from which system management command will likely be received. | See system topology. Naming practice should be the same here and for attribute 50 - List of System Managers. |

6.1.12 Asset Connection Attributes

This group of Asset attributes are meaningful only in respect to a given connection to an asset, which can be an energy resource, an incentive, or a load. Each resource or incentive has a corresponding toolkit resource and incentive function that defines how its behavior and effects may be modeled or predicted for the formulation of the transactive signals according to the toolkit framework. Each load similarly should have a corresponding toolkit load function that describes its effect on the formulation of the TFS. Often these "assets" will, in fact, be rather complex systems of assets.

An asset connection may list a set of local information connections that should be established via its 38—List of Local Information. Each member of this list creates an expectation that a local information connection will become established.

An asset connection should have its 2—Asset ID, 6—Toolkit Function, and 6—Asset Type configured before it is able to enter into the connection state 2—Configured

TABLE 16

Dictionary of Asset Connection Attributes

| No. | Attribute Name | Description | Role | Type | Format | Range of values |
|---|---|---|---|---|---|---|
| 2 | Asset ID* | This attribute identifies the resources, incentives, and loads associated with this transactive control node. | Each resource, incentive, or load should be identified along with its toolkit function, status, predicted/ scheduled engagement, etc. | Character string | Recommend format "XX-#" for each asset, where "XX" is a 2-letter acronym for the owner of this transactive node, and "#' is an integer number that ensures that the identifier is unique. | The Demonstration has already specified identifiers for responsive asset systems (most of which are loads) according to this convention. Loads = [0-999] Resources = [1000-1999] Incentives = [2000-2999] |
| 6 | Toolkit Function ID* | An identification of the specific toolkit function and version-the functional algorithms used at this transactive node to process the TIS, TFS, local information, and to control associated assets. | States the specific toolkit function and version that is being applied at this transactive node for each resource, incentive, or load. A toolkit function should be named for each resource, incentive, and load for which predictive behavior is being modeled by a toolkit function. | List of Alphanumeric modules or filenames and the present version of these modules. | {filename1, #.##; filename2, #.##, . . . } | Valid filenames are to be used. "#.##" is major and minor version numbers using digits 0-9. |
| 25 | Asset Output Targets* | Enables a control output to a resource or load to become redirected to one or more target locations. The target locations do not necessarily include the resource or load itself. | This feature may facilitate using the installed transactive control and coordination system for simulation of asset responses under alternative scenarios and during testing. If targets do not include the asset system, the asset should not respond. Should be configured for a successful connection Configuration Test. | List of alphanumeric identifiers | See 2 - Asset ID. | Should refer to valid resource or load entity ID from the 2 - Asset IDs that are being used. |
| 36 | Asset Type | Declaration of asset type at least from among "Resource," "Incentive," and "Load." | May be useful for categorization of asset connections. Range of values may be | Single alphanumeric string | Example: "Resource" | "Resource"—describes a generator resource at this transactive node. "Incentive"—describes |

TABLE 16-continued

| Dictionary of Asset Connection Attributes | | | | | | |
|---|---|---|---|---|---|---|
| No. | Attribute Name | Description | Role | Type | Format | Range of values |
| | | | expanded. See the toolkit framework to understand the roles of toolkit functions. | | | an incentive that is not a resource. "Load"—describes an elastic or inelastic load at this transactive node. |
| 38 | List of Local Information Connections | A list of the sources of local information that will be called upon to help predict the behavior of this asset. | An asset's predicted behavior is modeled by a toolkit function, which in turn may call upon sources of local information. A connection listed in this attribute creates an expectation that this transactive node will establish and manage the connection. | List of character strings | See 48 - Local Information ID. | Should correspond to valid 48 - Local Information ID. |

To support future simulations and testing, the connection state model includes an ability to redirect the output of these asset connections. Some of the assets will be responsive to the transactive control and coordination system and an output "control" signal is sent to these asset systems by this transactive node. Attribute 25—Asset Output Targets allows the targets of these "control" signals to be sent to the asset system, to another entity, or to both the asset system the other entity.

List the local information inputs that are anticipated by an asset system and the toolkit function that predicts its behaviors. These streams of input information that are at time referred to as "other local conditions" should additionally become listed as attributes 48—Local Information ID so that the continuity of the data stream may be monitored and so the input can become redirected, thus allowing alternative scenarios to be simulated with alternative input information.

Table 17 lists the asset attributes and indicates how these attributes may be affected by the system management commands and events that are part of the connection state model.

TABLE 17

| The Ways Asset Attributes May be Affected by Connection State Model Commands and Events | | | | | | | | |
|---|---|---|---|---|---|---|---|---|
| Attribute # | Attribute Name | Configure Command | Configuration Test** | Connect Command | Disconnect Command | Loss of Connection Event | Re-Establish Connection Event | Terminate Connection Event |
| 2 | Asset ID* | C + 0 | C | (C) | (C) | (C) | (C) | (C) |
| 6 | Toolkit Function* | +0 | C | | | | | |
| 25 | Asset Output Targets* | (C) + 0 | C | (C) | (C) | (C) | (C) | (C) |
| 36 | Asset Type | +0 | (C) | | | | | |
| 38 | List of Local Information Connections | (C) + 0 | C | (C) | (C) | (C) | (C) | (C) |

*These attributes should be configured before an asset connection can enter its 2 - Configured state.
**The connection Configuration Test additionally should check that 32 - Connection Status has been configured.

The Assets in the Asset Table of Table 16 are closely aligned with several of the interim data storage areas ("buffers") that have been defined in the toolkit framework and with appear also in the state mode. For an asset connection there should be corresponding entries in one or more of the buffer (storage) areas that have been defined in the toolkit framework:

Resource entries necessitate updating one record in attribute 34—Resource Schedule and Cost Buffer during each iteration at the update frequency. (An exception may occur because an option has been provided for resource schedules to be entered without corresponding toolkit functions. This might be selected for some resources that are dispatched entirely unaffected by transactive control.) For a resource, this entry will state at least an energy parameter and average power produced by the corresponding resource for each interval start time.

Incentive entries, like resources, also necessitate updating one record in attribute 34—Resource Schedule and Cost Buffer during each iteration at the update frequency. That entry will include entries from among a paired set of capacity factor and capacity, an infrastructure parameter, and another costs parameter.

Load entries necessitate one record be made in each attribute 45—Inelastic Load Prediction Buffer and 46—Elastic Load Prediction Buffer each iteration. The entries in those buffer (storage) locations predict load and, for responsive assets, the predicted level of engagement of responsive asset systems.

6.1.13 Local Information Connection Attributes

TABLE 18

Dictionary of Local Information Connection Attributes

| No. | Attribute Name | Description | Role | Type | Format | Range of values |
|---|---|---|---|---|---|---|
| 48 | Local Information ID* | Unique identifier to keep track of the local information that are used by this transactive node. "Local Information" has been referred to as "Other Local Conditions" in the toolkit framework and in other sections. | This ID should be listed in a record of the Connections Table. Once clearly identified, this input may then be supplied by alternative sources via the attribute 26 - Local Information Source. | Single character string. | Recommend "XX-OLC-3###", where XX is an acronym for the node owner, "3###" is a number from 3000 to 3999. Example: "AV-OLC-3001" | Should match formats and entries in 38 - List of Local Information Connections |
| 26 | Local Information Source* | One source of Local Information will normally be the actual source of the data. This attribute allows that the input data may be received from alternative sources. | Enables an alternative source of other local conditions to be used to facilitate testing and simulation. | Character string. | Example 1: "AV3015" Example 2: "EI01" Example 3: "OLCFile01.exe" | Alternative 1: ID of other local condition provider from Other Local Condition Table. Alternative 2: Valid ID from among Connection Table records Alternative 3: Valid filename in known directory. |

A transactive node may possess many assets, and each asset may invoke multiple input information streams. Therefore, the local information connections should be carefully defined in the connection state model, and two attributes have been grouped as local information connection attributes.

A local information connection is an input that is invoked by and used by a toolkit function. Experimenters and testing personnel may wish to intentionally insert other alternative input information into the toolkit functions via this local information to simulate alternative scenarios that would be unlikely to occur under normal operations. Attribute 48 has been provided for this purpose, with which the source of the local information may be received from either the normal information provider or from an alternative source like an input file.

Table 19 lists which of the state model's commands and events are expected to modify the two Other Local Condition Attributes.

TABLE 19

| Ways in Which Local Information Connection Attributes May be Affected by Commands and Events in this State Model | | | | | | | | |
|---|---|---|---|---|---|---|---|---|
| Attribute # | Attribute Name | Configure Command | Configuration Test** | Connect Command | Disconnect Command | Loss of Connection Event | Re-Establish Connection Event | Terminate Connection Event |
| 48 | Local Information ID* | C + 0 | C | (C) | (C) | (C) | (C) | (C) |
| 26 | Local Information Source* | +0 | C | (C) | (C) | (C) | (C) | (C) |

*These attributes should be configured before a local information connection can enter its 2 - Configured state.
**The connection Configuration Test additionally should check that 32 - Connection Status has been configured.

6.1.14 Functions and Events of the Connection State Model

Configure( ) (Connection Attributes) Command—the same flexible command that was applied to the transactive node may also be used for configuring the connections that a transactive node manages. Only the new parameters that should be used for connections will be presented; most parameters that were used for the transactive node state model will not be repeated. This command is used with connection attributes by first referring to the respective connection identifier (e.g., contents of attributes 52, 2, 53, or 48) and setting or modifying that connection's remaining attributes.

Command Parameters

ConfigureFile=(Filename)—If a file is named using this parameter, a command script will be read from Filename found in a known file directory. It is recommended that the Filename should contain scripted parameters as would be used an in-line command.

Any combination of the following comma-separated, in-line command parameters may be used and in any order:

TransactiveNeighbor=(52—Transactive Neighbor ID)—If the Transactive Neighbor ID does not match an existing one, configure a new Transactive NeighborID. The commands that follow this command in the sequence of command parameters are assumed to refer to this transactive neighbor connection. This command parameter may be used again to reference another transactive neighbor connection.

TransactiveNeighborDelete—Remove the record for the most recently referenced Transactive Neighbor ID.

TransactiveNeighborAttribute=attribute #, attribute value 1[[, attribute value 2], . . . ]—This parameter may be used to initialize or change the contents of any transactive neighbor connection attribute except attributes 52—Transactive Neighbor ID and 32—Connection Status.

SystemManager=(53—System Manager ID)—If the System Manager ID does not match an existing one, configure a new System Manager ID. The commands that follow this command in the sequence of command parameters are assumed to refer to this system manager connection. This command parameter may be used again to reference another system manager connection.

SystemManagerDelete—Remove the record for the most recently referenced System Manager ID.

SystemManagerAttribute=attribute #, attribute value 1[[, attribute value 2], . . . ]—This parameter may be used to initialize or change the contents of any system manager connection attribute except attributes 53—System Manager ID and 32—Connection Status.

Asset=(2—Asset ID)—If the Asset ID does not match an existing one, configure a new Asset ID. the commands that follow this command in the sequence of command parameters are assumed to refer to this asset connection. This command parameter may be used again to reference another asset connection.

AssetDelete—Remove the record for the most recently referenced Asset ID.

AssetAttribute=attribute #, attribute value 1[[, attribute value 2], . . . ]—This parameter may be used to initialize or change the contents of any asset connection attribute except attributes 2—Asset ID and 32—Connection Status.

LocalInformation=(48—Local Information ID)—If the Local Information ID does not match an existing one, configure a new Local Information ID. The commands that follow this command in the sequence of command parameters are assumed to refer to this local information connection. This command parameter may be used again to reference another local information connection.

LocalInformationDelete—Remove the record for the most recently referenced Local Information ID.

LocalInformationAttribute=attribute #, attribute value 1 [[, attribute value 2], . . . ]—This parameter may be used to initialize or change the contents of any local information connection attribute except attributes 48—Local Information ID and 32—Connection Status.

Command Logic

If the entity that made this command is not the local system manager and if the entity has not been explicitly given permission to make this system management command among the commands in its 31—Connection Partner's System Management Permissions, then reply "Command failed—(F1) Permissions do not include this command"

From transactive node part of state model, which addressed the Configure function, if attribute 7—Node Status="5" (state 5—Operational), then reply "Command failed—(F2) Configure command not allowed from Operational state."

If 32—Connection Status is "3" (connection state 3—Connected) or "4" (connection state 4—Lost Connection), from which configuration of a connection is not be permitted, then reply "Command failed—(F12) Configure command not allowed from connected connection states."

If Filename cannot be found, reply

"Command failed—(F3) File cannot be found or opened"

Failure conditions F4 (Incorrect node ID) and F5 (Command did not address known node attributes) do not apply during configuration of connections but should be reserved nonetheless.

If the entity making this system management command attempts to change a given connection's attributes, but the entity is not listed among this connection's 30—Entities Permitted to Modify this Connection (applies to any of the types of connections), then reply "Command failed—(F7) Entity making command does not have permission to configure this connection."

If the transactive neighbor connection attribute number does not match a known transactive neighbor connection attribute number (e.g., is not a member of {10, 11, 12, 13, 17, 23, 24, 28, 29, 30, 31, 33}), or if no 52—Transactive Neighbor ID has been stated as a parameter before this command attempts to configure its attributes, then reply "Command failed—(F8) Command did not address known transactive neighbor connection attributes"

If the system manager connection attribute number does not match a known system manager connection attribute number (e.g., is not a member of {17, 28, 29, 30, 31, and 33}), or if no 53—System Manager ID has been stated as a parameter before this command attempts to configure its attributes, then reply "Command failed—(F9) Command did not address known system manager connection attributes"

If the asset connection attribute number does not match a known asset connection attribute number (e.g., is not a member of {6, 17, 25, 28, 29, 30, 31, 33, 36, and 38}), or if no 2—Asset ID has been stated as a parameter before this command attempts to configure its attributes, then reply "Command failed—(F10) Command did not address known asset connection attributes"

If the local information connection attribute number does not match a known local information connection attribute number (e.g., is not a member of {17, 26, 28, 29, 30, 31, and 33}), or if no 48—Local Information ID has been stated as a parameter before a command attempts to configure its attributes, then reply "Command failed—(F11) Command did not address known local information connection attributes"

If the command cannot be completed for any other reason, reply

"Command failed—(F6) Unknown reason"

Otherwise,

Reply, "Command succeeded—(S1)"

Finalize any changes to connection attributes that were specified in the file or in-line command.

Run a Connection Configuration Test on this connection.

Run a transactive node Configuration Test on this transactive node.

Connection Configuration Test( )—a simple test of a given connection's attributes to determine if the connection may transition into or remain in its 2—Configured state. A connection in either its 3—Connected or 4—Lost Connection state has, by definition passed its Connection Configuration Test. If a connection passes its Connection Configuration Test, it should be in state 2—Configured; if it fails, it should be in state 1—Listed.

A Connection Configuration Test is not a system command. It should be initiated by the logic of the transactive node and by the transactive node itself. It should be run for a given connection anytime that the Configure( ) command has run successfully and might have therefore modified the configuration of the connection.

Test Parameters

All=test each connection according to its connection type

TransactiveNeighbor=(52—Transactive NeighborID)—conduct the test on this transactive neighbor connection.

SystemManager=(53—System ManagerID)—conduct the test on this system manager connection.

Asset=(2—AssetID)—conduct the test on this asset connection.

LocalInformation=(48—Local InformationID)—conduct the test on this local information connection.

Test Logic

If upon checking attribute 32—Connection Status for a connection, this connection is found to be in either state "3" (3—Connected) or "4" (4—Lost Connection), then Test passed—(S1) The Connected and Lost Connection states, by definition, pass the Connection Configuration Test For each configured 52—Transactive Neighbor ID, if any of the attributes 10—Receive TIS Source, 11—Receive TFS Source, 12—Send TIS Targets, 13—Send TFS Targets, 32—Connection Status, or 29—Connection Partner Type have not been configured, then Test failed—(F1) Transactive neighbor connection is not configured Set attribute 32—Connection Status="1" (connection state 1—Listed) for this connection.

For each configured 53—System Manager ID, if either of the attributes 32—Connection Status or 29—Connection Partner Type have not been configured, then Test failed—(F2) System manager connection is not configured Set attribute 32—Connection Status="1" (connection state 1—Listed) for this connection.

For each configured 2—Asset ID, if any of the attributes 6—Toolkit Function, 25—Asset Output Targets, 32—Connection Status, or 29—Connection Partner Type have not been configured, then Test failed—(F3) Asset connection is not configured Set 32—Connection Status="1" (connection state 1—Listed) for this connection.

For each configured 48—Local Information ID, if any of the attributes 26—Local Information Source, 32—Connection Status, or 29—Connection Partner Type have not been configured, then Test failed—(F4) Local information connection is not configured Set 32—Connection Status="1" (connection state 1—Listed) for this connection.

Otherwise

Test passed—(S2)

Set 32—Connection Status="2" (connection state 2—Configured) for this connection.

Connect( ) Command—directs a configured connections to be completed between this transactive node and one of its connection partners.

Command Parameters

Connection=([All/Connection ID])—identifies one connection that is to be completed from this transactive node to a configured connection with a transactive neighbor, system manager, asset, or local information source. If the parameter "All" is used, the transactive node should attempt to apply the command logic sequentially to every configured connection (e.g., every connection for which a 52—Transactive Neighbor ID, 53—System Manger ID, 2—Asset ID, or 48—Local Information ID has been configured).

Command Logic

If the entity that made this command is not the local system manager and if the entity has not been explicitly given permission to make this system management command among the commands in its 31—Connection Partner's System Management Permissions, then reply "Command failed—(F1) Permissions do not include this command."

If the Connection ID parameter of this command cannot be recognized from among the sets of configured 52—Transactive Neighbor ID, 52—System Manager ID, 2—Asset ID, or 48—Local Information ID at this transactive node, then reply "Command failed—(F2) Connection ID was not recognized from configured connections."

If the entity making this command is not among the 30—Entities Permitted to modify this Connection for the referenced connection, then reply "Command failed—(F3) Entity does not have permission to change this connection."

If upon review of its 32—Connection Status, the referenced connection is determined to be in its 3—Connected state, then reply "Command succeeded—(S1) Connection was already completed."

If upon review of its 32—Connection Status, the referenced connection is determined to be in its 1—Listed state, then reply "Command failed—(F4) Connection cannot be completed from present connection state."

If the given connection cannot be completed for any other reason, reply

"Command failed—(F5) Unknown reason"

If 32—Connection Status="3" (connection status 3—Connected), then set 32—Connection Status="2" (connection state 2—Configured) for the referenced connection.

Otherwise,

Reply, "Command succeeded—(S2)"

Complete the referenced connection

Set 32—Connection Status="3" (connection state 3—Connected) for the referenced connection.

Disconnect( ) Command—system management command by which a transactive node is asked to disconnect a connection between this transactive node and one of its connection partners.

Command Parameters

Connection=([All/Connection ID])—identifies one connection that is to be disconnected between this transactive node and a transactive neighbor, system manager, asset, or local information source. If the parameter "All" is used, the transactive node should attempt to apply the command logic sequentially to every configured connection (e.g., every connection for which a 52—Transactive Neighbor ID, 53—System Manger ID, 2—Asset ID, or 48—Local Information ID has been configured).

Command Logic

If the entity that made this command is not the local system manager and if the entity has not been explicitly given permission to make this system management command among the commands in its 31—Connection Partner's System Management Permissions, then reply "Command failed—(F1) Permissions do not include this command."

If the Connection ID parameter of this command cannot be recognized from among the sets of configured 52—Transactive Neighbor ID, 52—System Manager ID, 2—Asset ID, or 48—Local Information ID at this transactive node, then reply "Command failed—(F2) Connection ID was not recognized from configured connections."

If the entity making this command is not among the 30—Entities Permitted to modify this Connection for the referenced connection, then reply "Command failed—(F3) Entity does not have permission to change this connection."

If upon review of its 32—Connection Status, the referenced connection is determined to be in either its 2—Configured or 1—Listed state, then reply "Command succeeded—(S1) Connection was already disconnected."

If the given connection cannot be completed for any other reason, reply

"Command failed—(F4) Unknown reason"

Otherwise,

Reply, "Command succeeded—(S2)"

Disconnect the referenced connection

Set 32—Connection Status="2" (connection state 2—Configured) for the referenced connection.

Loss of Connection Event( )—a diagnostic process at this transactive node observes the health and activity of each connection. If the connection should fail, the diagnostic process initiates a Loss of Connection Event. This event transitions the respective connection into a temporary Lost Connection state, from which the ramifications of the event may be addressed and handled. This transactive node is permitted to remain in its Operational state in the meantime, according to the logic of the present state model.

Event Parameters—None.

Said "diagnostic process" should apply to a connection that is in either its 3—Connected or 4—Lost Connection states. The means by which a connection may be monitored may involve one or more of these suggested mechanisms:

Observation of interactions with connection partners that occur or fail to occur at times that such interactions were anticipated Occasional "pings" of connection partners to determine whether they remain communicative A "heartbeat" mechanism that ensures connection partners that a connection remains active. (A "heartbeat" between transactive neighbors should be bidirectional because both transactive neighbors will share this to monitor the connection. Other connection partners may not be transactive nodes, in which case the heartbeat may be unidirectional to satisfy the transactive node)

Event Handler Logic

This logic applies to a connection that is in its 3—Connected state.

If a connection is no longer working based on findings from the diagnostic process, Set 32—Connection Status="4" (connection state 4—Lost Connection) for this connection.

Add a record of the UTC standard time at which the event occurred into the 55—Lost Connection Event Buffer.

Start a timer to keep track of how long this connection remains in its Lost Connection state.

Re-Establish Connection Event( )—a diagnostic process recognizes that a connection has become restored for a connection that was in its Lost Connection state. The connection reverts to its Connected state.

Event Parameters—None.

This event handler should use the same diagnostic process that was described above for the Loss of Connection Event.

Event Handler Logic

This logic applies only to a connection that is in its temporary Lost Connection state.

If prior to the occurrence of a Terminate Connection Event( ), this transactive node recognizes that a lost connection has become restored, then Set 32—Connection Status="3" (connection state 3—Connected) for the respective connection Stop the Loss of Connection Event timer.

Re-commence interactions with the respective connection partner via this connection.

Terminate Connection Event( )

Event Parameters—None.

This event handler should use the same diagnostic process that was described above for the Loss of Connection Event and Re-Establish Connection Event.

Event Handler Logic

This logic applies to a connection that is in its Lost Connection state.

If the Loss of Connection Event timer exceeds 54—Connection Timeout Period for this connection, then Set 32—Connection Status="2" (connection state 2—Configured) for this connection Issue alert, "(A1)—Terminate Connection Event occurred by timeout for connection [Connection ID]."

If upon reviewing the contents of the 55—Loss of Connection Event Buffer it is observed that the numbers of Loss of Connection Events in the last hour has exceeded the criteria in 56—Allowed Frequency of Loss of Connection Events, then Set 32—Connection Status="2" (connection state 2—Configured) for this connection Issue alert, "(A2)—Terminate Connection Event—Too many hourly events for connection [Connection ID]."

If upon reviewing the contents of the 55—Loss of Connection Event Buffer the numbers of Loss of Connection Events in the last 24 hours has exceeded the criteria in 56—Allowed Frequency of Loss of Connection Events, then Set 32—Connection Status="2" (connection state 2—Configured) for this connection Issue alert, "(A3)—Terminate Connection Event—Too many daily events for connection [Connection ID]."

6.1.15 Connection State Transition Table

Table 20 is the state transition table for the four types of connections that are to be managed by a transactive node. Refer to the diagrammatic representation of the connection state transitions in FIG. 30 that should represent these same state transitions.

TABLE 20

State Transition Table for Connections of Four Types

| | | Acts Upon | | | Producing | | | Info. |
|---|---|---|---|---|---|---|---|---|
| Row | Internal Function | Current State | Using Input | To Set Attributes | Next State | Output | On the Condition | Gathered & Recorded |
| 11a | Connection Configuration Test Failed | 1 - Listed | Connection attributes 2 - Asset ID, 10 - Receive TIS Source, 11 - Receive TFS Source, 12 - Sent TIS Targets, 13 - Send TFS Targets, 25 - Asset Output Targets, 26 - Local Information Source, 32 - Connection Status, 29 - | | 1 - Listed | Connection event log entry | Test failed - [(F1) Transactive neighbor connection is not configured/ (F2) System manager connection is not configured/ (F3) Asset connection is not configured/ (F4) Local information connection is not configured] | Connection event log entry |

TABLE 20-continued

| State Transition Table for Connections of Four Types | | | | | | | | |
|---|---|---|---|---|---|---|---|---|
| | | Acts Upon | | | Producing | | | Info. |
| Row | Internal Function | Current State | Using Input | To Set Attributes | Next State | Output | On the Condition | Gathered & Recorded |
| | | | Connection Partner Type, 48 - Local Information ID, 52 - Transactive Neighbor ID, and 53 - System Manager ID | | | | | |
| 11b | Configure | 1 - Listed | Source of command; command parameters; Filename; lists of configurable attributes (see command definition), connection attributes 2 - Asset ID, 30 - Entities Permitted to Modify this Connection, 31 - Connection Partner's System Management Permissions, 32 - Connection Status, 48 - Local Information ID, 52 - Transactive Neighbor ID, 53 - System Manager ID | Nearly any connection attribute may be configured. See the command definition for details. Lists of configurable attributes may be found in the command definition. | 1 - Listed | Reply: "Command Succeeded - (S1)" Action: Run Connection Configuration Test Action: Run Configuration Test Connection command log entry | Success - (S1) | Connection command log entry |
| 11c | Disconnect | 1 - Listed | Source of command; command parameters; connection attributes 2 - Asset ID, 30 - Entities Permitted to Modify this Connection, 31 - Connection Partner's System Management Permissions, 32 - Connection Status, 48 - Local Information ID, | | 1 - Listed | Reply: "Command succeeded - (S1) Connection already disconnected" Connection command log entry | Success - (S1) Connection already disconnected | Connection command log entry |

TABLE 20-continued

| State Transition Table for Connections of Four Types | | | | | | | | | |
|---|---|---|---|---|---|---|---|---|---|
| | | Acts Upon | | | Producing | | | Info. |
| Row | Internal Function | Current State | Using Input | To Set Attributes | Next State | Output | On the Condition | Gathered & Recorded |
| | | | 52 - Transactive Neighbor ID, 53 - System Manager ID | | | | | |
| 11d | Fail to Configure | 1 - Listed | Source of command; command parameters; Filename; lists of configurable attributes (see command definition), connection attributes 2 - Asset ID, 30 - Entities Permitted to Modify this Connection, 31 - Connection Partner's System Management Permissions, 32 - Connection Status, 48 - Local Information ID, 52 - Transactive Neighbor ID, 53 - System Manager ID | | 1 - Listed | Reply: "Command failed - [(F1) Permissions do not include this command/ (F2) Configure command not allowed from Operational state/ (F3) File cannot be found or opened/ (F7) Entity making command does not have permission to configure this connection/ (F8) Command did not address known transactive neighbor connection attributes/ (F9) Command did not address known system manager connection attributes/ (F10) Command did not address known asset connection attributes/ (F11) Command did not address known local information connection attributes/ (F6) Unknown reason]" Connection command log entry | Command failed - [(F1) Permissions do not include this command/ (F2) Configure command not allowed from Operational state/ (F3) File cannot be found or opened/ (F7) Entity making command does not have permission to configure this connection/ (F8) Command did not address known transactive neighbor connection attributes/ (F9) Command did not address known system manager connection attributes/ (F10) Command did not address known asset connection attributes/ (F11) Command did not address known local information connection attributes/ (F6) Unknown reason] | Connection command log entry |

TABLE 20-continued

State Transition Table for Connections of Four Types

| Row | Internal Function | Acts Upon Current State | Using Input | To Set Attributes | Producing Next State | Output | On the Condition | Info. Gathered & Recorded |
|---|---|---|---|---|---|---|---|---|
| 11e | Fail to Connect | 1 - Listed | Source of command; command parameters; connection attributes 2 - Asset ID, 30 - Entities Permitted to Modify this Connection, 31 - Connection Partner's System Management Permissions, 32 - Connection Status, 48 - Local Information ID, 52 - Transactive Neighbor ID, 53 - System Manager ID | | 1 - Listed | Reply: "Command failed - [(F1) Permissions do not include this command/ (F2) Connection ID was not recognized from configured connections/ (F3) Entity does not have permission to change this connection/ (F4) Connection cannot be completed from present connection state]" Connection command log entry | Failure - [(F1) Permissions do not include this command/ (F2) Connection ID was not recognized from configured connections/ (F3) Entity does not have permission to change this connection/ (F4) Connection cannot be completed from present connection state] | Connection command log entry |
| 11f | Fail to Disconnect | 1 - Listed | Source of command; command parameters; connection attributes 2 - Asset ID, 30 - Entities Permitted to Modify this Connection, 31 - Connection Partner's System Management Permissions, 32 - Connection Status, 48 - Local Information ID, 52 - Transactive Neighbor ID, 53 - System Manager ID | | 1 - Listed | Reply: "Command failed - [(F1) Permissions do not include this command/ (F2) Connection ID was not recognized from configured connections/ (F3) Entity does not have permission to change this connection/ (F4) Unknown reason]" Connection command log entry | Failure - [(F1) Permissions do not include this command/ (F2) Connection ID was not recognized from configured connections/ (F3) Entity does not have permission to change this connection/ (F4) Unknown reason] | Connection command log entry |
| 12 | Connection Configuration Test Passed | 1 - Listed | Connection attributes 2 - Asset ID, 10 - Receive TIS Source, 11 - Receive TFS Source, 12 - Sent TIS | 32 - Connection Status = "2" (connection state 2 - Configured) | 2 - Configured | Connection event log entry | Test passed - (S2) Normal pass condition | Connection event log entry |

TABLE 20-continued

State Transition Table for Connections of Four Types

| Row | Internal Function | Acts Upon Current State | Using Input | To Set Attributes | Producing Next State | Output | On the Condition | Info. Gathered & Recorded |
|---|---|---|---|---|---|---|---|---|
| | | | Targets, 13 - Send TFS Targets, 25 - Asset Output Targets, 26 - Local Information Source, 32 - Connection Status, 29 - Connection Partner Type, 48 - Local Information ID, 52 - Transactive Neighbor ID, and 53 - System Manager ID | | | | | |
| 21 | Connection Configuration Test Failed | 2 - Configured | Connection attributes 2 - Asset ID, 10 - Receive TIS Source, 11 - Receive TFS Source, 12 - Sent TIS Targets, 13 - Send TFS Targets, 25 - Asset Output Targets, 26 - Local Information Source, 32 - Connection Status, 29 - Connection Partner Type, 48 - Local Information ID, 52 - Transactive Neighbor ID, and 53 - System Manager ID | | 1 - Listed | Connection event log entry | Test failed - [(F1) Transactive neighbor connection is not configured/ (F2) System manager connection is not configured/ (F3) Asset connection is not configured/ (F4) Local information connection is not configured] | Connection event log entry |
| 22a | Configure | 2 - Configured | Source of command; command parameters; Filename; lists of configurable attributes (see command definition), connection attributes | Nearly any connection attribute may be configured. See the command definition for details. Lists of | 2 - Configured | Reply: "Command Succeeded - (S1)" Action: Run Connection Configuration Test Action: Run Configuration Test Connection command | Success - (S1) | Connection command log entry |

TABLE 20-continued

| State Transition Table for Connections of Four Types | | | | | | | | |
|---|---|---|---|---|---|---|---|---|
| | | Acts Upon | | | Producing | | | Info. |
| Row | Internal Function | Current State | Using Input | To Set Attributes | Next State | Output | On the Condition | Gathered & Recorded |
| | | | 2 - Asset ID, 30 - Entities Permitted to Modify this Connection, 31 - Connection Partner's System Management Permissions, 32 - Connection Status, 48 - Local Information ID, 52 - Transactive Neighbor ID, 53 - System Manager ID | configurable attributes may be found in the command definition. | | log entry | | |
| 22b | Connection Configuration Test Passed | 2 - Configured | Connection attributes 2 - Asset ID, 10 - Receive TIS Source, 11 - Receive TFS Source, 12 - Sent TIS Targets, 13 - Send TFS Targets, 25 - Asset Output Targets, 26 - Local Information Source, 32 - Connection Status, 29 - Connection Partner Type, 48 - Local Information ID, 52 - Transactive Neighbor ID, and 53 - System Manager ID | | 2 - Configured | Connection event log entry | Test passed - (S2) Normal pass condition | Connection event log entry |
| 22c | Disconnect | 2 - Configured | Source of command; command parameters; connection attributes 2 - Asset ID, 30 - Entities Permitted to Modify this Connection, 31 - Connection Partner's | | 2 - Configured | Reply: "Command succeeded - (S1) Connection already disconnected" Connection command log entry | Success - (S1) Connection already disconnected | Connection command log entry |

TABLE 20-continued

| State Transition Table for Connections of Four Types | | | | | | | | | |
|---|---|---|---|---|---|---|---|---|---|
| | | Acts Upon | | | Producing | | | Info. |
| Row | Internal Function | Current State | Using Input | To Set Attributes | Next State | Output | On the Condition | Gathered & Recorded |
| | | | System Management Permissions, 32 - Connection Status, 48 - Local Information ID, 52 - Transactive Neighbor ID, 53 - System Manager ID | | | | | |
| 22d | Fail to Configure | 2 - Configured | Source of command; command parameters; Filename; lists of configurable attributes (see command definition), connection attributes 2 - Asset ID, 30 - Entities Permitted to Modify this Connection, 31 - Connection Partner's System Management Permissions, 32 - Connection Status, 48 - Local Information ID, 52 - Transactive Neighbor ID, 53 - System Manager ID | | 2 - Configured | Reply: "Command failed - [(F1) Permissions do not include this command/ (F2) Configure command not allowed from Operational state/ (F3) File cannot be found or opened/ (F7) Entity making command does not have permission to configure this connection/ (F8) Command did not address known transactive neighbor connection attributes/ (F9) Command did not address known system manager connection attributes/ (F10) Command did not address known asset connection attributes/ (F11) Command did not address known local information connection attributes/ | Command failed - [(F1) Permissions do not include this command/ (F2) Configure command not allowed from Operational state/ (F3) File cannot be found or opened/ (F7) Entity making command does not have permission to configure this connection/ (F8) Command did not address known transactive neighbor connection attributes/ (F9) Command did not address known system manager connection attributes/ (F10) Command did not address known asset connection attributes/ (F11) Command did not address known local information connection attributes/ (F6) | Connection command log entry |

TABLE 20-continued

State Transition Table for Connections of Four Types

| Row | Internal Function | Acts Upon Current State | Using Input | To Set Attributes | Producing Next State | Output | On the Condition | Info. Gathered & Recorded |
|---|---|---|---|---|---|---|---|---|
| | | | | | | (F6) Unknown reason]" Connection command log entry | Unknown reason] | |
| 22e | Fail to Connect | 2 - Configured | Source of command; command parameters; connection attributes 2 - Asset ID, 30 - Entities Permitted to Modify this Connection, 31 - Connection Partner's System Management Permissions, 32 - Connection Status, 48 - Local Information ID, 52 - Transactive Neighbor ID, 53 - System Manager ID | | 2 - Configured | Reply: "Command failed - [(F1) Permissions do not include this command/ (F2) Connection ID was not recognized from configured connections/ (F3) Entity does not have permission to change this connection/ (F5) Unknown reason]" Connection command log entry | Failure - [(F1) Permissions do not include this command/ (F2) Connection ID was not recognized from configured connections/ (F3) Entity does not have permission to change this connection/ (F5) Unknown reason] | Connection command log entry |
| 22f | Fail to Disconnect | 2 - Configured | Source of command; command parameters; connection attributes 2 - Asset ID, 30 - Entities Permitted to Modify this Connection, 31 - Connection Partner's System Management Permissions, 32 - Connection Status, 48 - Local Information ID, 52 - Transactive Neighbor ID, 53 - System Manager ID | | 2 - Configured | Reply: "Command failed - [(F1) Permissions do not include this command/ (F2) Connection ID was not recognized from configured connections/ (F3) Entity does not have permission to change this connection/ (F4) Unknown reason]" Connection command log entry | Failure - [(F1) Permissions do not include this command/ (F2) Connection ID was not recognized from configured connections/ (F3) Entity does not have permission to change this connection/ (F4) Unknown reason] | Connection command log entry |

TABLE 20-continued

State Transition Table for Connections of Four Types

| | | Acts Upon | | | Producing | | | Info. |
|---|---|---|---|---|---|---|---|---|
| Row | Internal Function | Current State | Using Input | To Set Attributes | Next State | Output | On the Condition | Gathered & Recorded |
| 23 | Connect | 2 - Configured | Source of command; command parameters; connection attributes 2 - Asset ID, 30 - Entities Permitted to Modify this Connection, 31 - Connection Partner's System Management Permissions, 32 - Connection Status, 48 - Local Information ID, 52 - Transactive Neighbor ID, 53 - System Manager ID | 32 - Connection Status = "3" (connection state 3 - Connected) | 3 - Connected | Reply: "Command succeeded - (S2)" Connection command log entry | Command succeeded - (S2) Normal completion | Connection command log entry |
| 32 | Disconnect | 3 - Connected | Source of command; command parameters; connection attributes 2 - Asset ID, 30 - Entities Permitted to Modify this Connection, 31 - Connection Partner's System Management Permissions, 32 - Connection Status, 48 - Local Information ID, 52 - Transactive Neighbor ID, 53 - System Manager ID | 32 - Connection Status = "2" (connection state 2 - Configured) | 2 - Configured | Reply: "Command succeeded - (S2)" Action: Sever connection to this communication partner Connection command log entry | Success - (S2) Normal completion | Connection command log entry |
| 33a | Connection Configuration Test Passed | 3 - Connected | Connection attributes 2 - Asset ID, 10 - Receive TIS Source, 11 - Receive TFS Source, 12 - Sent TIS Targets, 13 - Send TFS | | 3 - Connected | Connection event log entry | Test passed - (S1) Connection already completed | Connection event log entry |

TABLE 20-continued

State Transition Table for Connections of Four Types

| Row | Internal Function | Acts Upon Current State | Using Input | To Set Attributes | Producing Next State | Producing Output | On the Condition | Info. Gathered & Recorded |
|---|---|---|---|---|---|---|---|---|
| | | | Targets, 25 - Asset Output Targets, 26 - Local Information Source, 32 - Connection Status, 29 - Connection Partner Type, 48 - Local Information ID, 52 - Transactive Neighbor ID, and 53 - System Manager ID | | | | | |
| 33b | Connect | 3 - Connected | Source of command; command parameters; connection attributes 2 - Asset ID, 30 - Entities Permitted to Modify this Connection, 31 - Connection Partner's System Management Permissions, 32 - Connection Status, 48 - Local Information ID, 52 - Transactive Neighbor ID, 53 - System Manager ID | | 3 - Connected | Reply: "Command succeeded - (S1) Connection already made" Connection command log entry | Command succeeded - (S1) Connection already made | Connection command log entry |
| 33c | Fail to Configure | 3 - Connected | Source of command; command parameters; Filename; lists of configurable attributes (see command definition), connection attributes 2 - Asset ID, 30 - Entities Permitted to Modify this Connection, 31 - Connection Partner's System | | 3 - Connected | Reply: "Command failed - [(F1) Permissions do not include this command/ (F2) Configure command not allowed from Operational state/ (F12) Configure command not allowed from connected connection states]" Connection | Command failed - [(F1) Permissions do not include this command/ (F2) Configure command not allowed from Operational state/ (F12) Configure command not allowed from connected connection states] | Connection command log entry |

TABLE 20-continued

State Transition Table for Connections of Four Types

| Row | Internal Function | Acts Upon<br>Current State | Using Input | To Set Attributes | Producing<br>Next State | Output | On the Condition | Info. Gathered & Recorded |
|---|---|---|---|---|---|---|---|---|
| | | | Management Permissions, 32 - Connection Status, 48 - Local Information ID, 52 - Transactive Neighbor ID, 53 - System Manager ID | | | command log entry | | |
| 33d | Fail to Connect | 3 - Connected | Source of command; command parameters; connection attributes 2 - Asset ID, 30 - Entities Permitted to Modify this Connection, 31 - Connection Partner's System Management Permissions, 32 - Connection Status, 48 - Local Information ID, 52 - Transactive Neighbor ID, 53 - System Manager ID | | 3 - Connected | Reply: "Command failed - [(F1) Permissions do not include this command/ (F2) Connection ID was not recognized from configured connections/ (F3) Entity does not have permission to change this connection/ (F5) Unknown reason]" Connection command log entry | Failure - [(F1) Permissions do not include this command/ (F2) Connection ID was not recognized from configured connections/ (F3) Entity does not have permission to change this connection/ (F5) Unknown reason] | Connection command log entry |
| 33e | Fail to Disconnect | 3 - Connected | Source of command; command parameters; connection attributes 2 - Asset ID, 30 - Entities Permitted to Modify this Connection, 31 - Connection Partner's System Management Permissions, 32 - Connection Status, 48 - Local Information ID, 52 - Transactive Neighbor ID, 53 - System Manager ID | | 3 - Connected | Reply: "Command failed - [(F1) Permissions do not include this command/ (F2) Connection ID was not recognized from configured connections/ (F3) Entity does not have permission to change this connection/ (F4) Unknown reason]" Connection command log entry | Failure - [(F1) Permissions do not include this command/ (F2) Connection ID was not recognized from configured connections/ (F3) Entity does not have permission to change this connection/ (F4) Unknown reason] | Connection command log entry |

TABLE 20-continued

State Transition Table for Connections of Four Types

| Row | Internal Function | Acts Upon Current State | Using Input | To Set Attributes | Producing Next State | Output | On the Condition | Info. Gathered & Recorded |
|---|---|---|---|---|---|---|---|---|
| 34 | Loss of Connection Event | 3 - Connected | Diagnostic system information from the system that oversees connections; identity of affected connection; and connection attributes 18 - Time, 32 - Connection Status | 32 - Connection Status = "4" (connection state 4 - Lost Connection), and 55 - Loss of Connection Event Buffer | 4 - Lost Connection | Connection event log entry | Diagnostic system detects that a connection to a connection partner is dead while that connection is in its Connected state | Connection event log entry |
| 42a | Terminate Connection Event | 4 - Lost Connection | Diagnostic system information from the system that oversees connections; identity of affected connection; and connection attributes 18 - Time, 32 - Connection Status, 54 - Connection Timeout Period, 55 - Loss of Connection Event Buffer, 56 - Allowed Frequency of Loss of Connection Events | 32 - Connection Status = "2" (connection state 2 - Configured) | 2 - Configured | "Alert - [(A1) Terminate Connection Event occurred by timeout for connection [Connection ID]/ (A2) Terminate Connection Event - Too many hourly events for connection [Connection ID]/ (A3) Terminate Connection Event - Too many daily events for connection [Connection ID]]" Connection event log entry | [(A1) Terminate Connection Event occurred by timeout for connection [Connection ID]/ (A2) Terminate Connection Event - Too many hourly events for connection [Connection ID]/ (A3) Terminate Connection Event - Too many daily events for connection [Connection ID]] | Connection event log entry |
| 42b | Disconnect | 4 - Lost Connection | Source of command; command parameters; connection attributes 2 - Asset ID, 30 - Entities Permitted to Modify this Connection, 31 - Connection Partner's System Management Permissions, 32 - Connection Status, 48 - Local Information ID, 52 - Transactive Neighbor ID, | 32 - Connection Status = "2" (connection state 2 - Configured) | 2 - Configured | Reply: "Command succeeded - (S2)" Action: Sever connection to this communication partner Connection command log entry | Success - (S2) Normal completion | Connection command log entry |

TABLE 20-continued

State Transition Table for Connections of Four Types

| Row | Internal Function | Acts Upon Current State | Using Input | To Set Attributes | Producing Next State | Output | On the Condition | Info. Gathered & Recorded |
|---|---|---|---|---|---|---|---|---|
| | | | 53 - System Manager ID | | | | | |
| 43a | Connect | 4 - Lost Connection | Source of command; command parameters; connection attributes 2 - Asset ID, 30 - Entities Permitted to Modify this Connection, 31 - Connection Partner's System Management Permissions, 32 - Connection Status, 48 - Local Information ID, 52 - Transactive Neighbor ID, 53 - System Manager ID | 32 - Connection Status = "3" (connection state 3 - Connected) | 3 - Connected | Reply: "Command succeeded - (S2)" Connection command log entry | Command succeeded - (S2) Normal completion | Connection command log entry |
| 43b | Re-Establish Connection Event | 4 - Lost Connection | Diagnostic system information from the system that oversees connections; identity of affected connection; and connection attributes 18 - Time, 32 - Connection Status, and 54 - Connection Timeout Period | 32 - Connection Status = "3" (connection state 3 - Connected) | 3 - Connected | Action: Re-establish interface to respective connection partner. Connection event log entry | Diagnostic system detects that a broken connection to a connection partner has become re-established while that connection is in its Lost Connection state | Connection event log entry |
| 44a | Connection Configuration Test Passed | 4 - Lost Connection | Connection attributes 2 - Asset ID, 10 - Receive TIS Source, 11 - Receive TFS Source, 12 - Sent TIS Targets, 13 - Send TFS Targets, 25 - Asset Output Targets, 26 - Local Information Source, 32 - Connection | | 4 - Lost Connection | Connection event log entry | Test passed - (S1) Connection already completed | Connection event log entry |

TABLE 20-continued

| State Transition Table for Connections of Four Types | | | | | | | | |
|---|---|---|---|---|---|---|---|---|
| | | Acts Upon | | | Producing | | | Info. |
| Row | Internal Function | Current State | Using Input | To Set Attributes | Next State | Output | On the Condition | Gathered & Recorded |
| | | | Status, 29 - Connection Partner Type, 48 - Local Information ID, 52 - Transactive Neighbor ID, and 53 - System Manager ID | | | | | |
| 44b | Fail to Configure | 4 - Lost Connection | Source of command; command parameters; Filename; lists of configurable attributes (see command definition), connection attributes 2 - Asset ID, 30 - Entities Permitted to Modify this Connection, 31 - Connection Partner's System Management Permissions, 32 - Connection Status, 48 - Local Information ID, 52 - Transactive Neighbor ID, 53 - System Manager ID | | 4 - Lost Connection | Reply: "Command failed - [(F1) Permissions do not include this command/ (F2) Configure command not allowed from Operational state/ (F12) Configure command not allowed from connected connection states]" Connection command log entry | Command failed - [(F1) Permissions do not include this command/ (F2) Configure command not allowed from Operational state/ (F12) Configure command not allowed from connected connection states] | Connection command log entry |
| 44c | Fail to Connect | 4 - Lost Connection | Source of command; command parameters; connection attributes 2 - Asset ID, 30 - Entities Permitted to Modify this Connection, 31 - Connection Partner's System Management Permissions, 32 - Connection Status, | | 4 - Lost Connection | Reply: "Command failed - [(F1) Permissions do not include this command/ (F2) Connection ID was not recognized from configured connections/ (F3) Entity does not have permission to change | Failure - [(F1) Permissions do not include this command/ (F2) Connection ID was not recognized from configured connections/ (F3) Entity does not have permission to change this connection/ | Connection command log entry |

TABLE 20-continued

State Transition Table for Connections of Four Types

| Row | Internal Function | Acts Upon Current State | Using Input | To Set Attributes | Producing Next State | Output | On the Condition | Info. Gathered & Recorded |
|---|---|---|---|---|---|---|---|---|
| | | | 48 - Local Information ID, 52 - Transactive Neighbor ID, 53 - System Manager ID | | | this connection/ (F5) Unknown reason]" Connection command log entry | (F5) Unknown reason] | |
| 44d | Fail to Disconnect | 4 - Lost Connection | Source of command; command parameters; connection attributes 2 - Asset ID, 30 - Entities Permitted to Modify this Connection, 31 - Connection Partner's System Management Permissions, 32 - Connection Status, 48 - Local Information ID, 52 - Transactive Neighbor ID, 53 - System Manager ID | | 4 - Lost Connection | Reply: "Command failed - [(F1) Permissions do not include this command/ (F2) Connection ID was not recognized from configured connections/ (F3) Entity does not have permission to change this connection/ (F4) Unknown reason]" Connection command log entry | Failure - [(F1) Permissions do not include this command/ (F2) Connection ID was not recognized from configured connections/ (F3) Entity does not have permission to change this connection/ (F4) Unknown reason] | Connection command log entry |

6.1.16 Log Entries

The state transition tables in this section have consistently indicated outputs to a log table. It will be good practice to create a log entry record for each command and event that is encountered by the transactive node and its connections. Instead of defining each log entry at the point that it was introduced in the state transition tables, it may be preferred to establish practices for the contents of these records based on their types and by whether they affect the transactive state model or that of the transactive node's connections:

1. Command log entry—to be recorded each time a transactive node system management command is received and responded.

{Source of the command, time received, command ID, command parameters, 5—Node Version, 7—Node Status after the command, completion condition}

2. Connection command log entry—to be recorded each time a connection system management command is received and responded.

{Source of the command, time received, command ID, target connection ID, 32—Connection Status after the command, completion condition}

3. Event log entry—to be recorded each time a transactive node event occurs and is responded to.

{Event time, event ID, 5—Node Version, 7—Node Status after the event, completion condition}

4. Connection event log entry—to be recorded each time a connection event occurs and is responded to.

{Event time, event ID, target connection ID, 32—Connection Status after the event, completion condition}

5. Test log entry—to be recorded each time a transactive node test occurs and is responded to.

{Test time, test ID, 5—Node Version, 7—Node Status after the test, completion condition}

6. Connection test log entry—to be recorded each time a connection test occurs and is responded to.

{Test time, test ID, target connection ID, 32—Connection Status after the test, completion condition

6.1.17 Operational Sub-States Table

The table below represents that state transitions of a transactive node that has been configured, connected and is now in the overall operational state and status. Note that there is no start or final state in this table. All states may be intermediary. Refer to the toolkit framework for the algorithmic framework facilitated by this part of the state model.

TABLE 21

State Transition Model for Transactive Nodes within an Operational State

| Row | Internal Function | Acts Upon Current State | By Setting Attributes | Using Inputs | Producing Next State | Producing Output | On the Condition | Info. Gathered and Recorded |
|---|---|---|---|---|---|---|---|---|
| A1 | Receive TIS | Operational (Listening) | 7 | TIS Message | TIS Received | | U | 1, 7. 18, Received TIS message |
| A2 | Formula te TIS | Operational (Listening) | 7 | Attribute 23 (TIS Buffer) | TIS Processed | Stop TIS Timer, Outgoing TIS Message(s) | TIS Timer > TIS Timer Max or TIS received from all inputs | 1, 7, 18, Processed TIS message |
| A3 | Receive TFS | Operational (Listening) | 7 | TFS Message | TFS Received | | U | 1, 7, 18 |
| A4 | TFS | Operational (Listening) | 7 | Attribute 24 (TFS Buffer) | TFS Processed | Stop TFS Timer, Outgoing TFS Messages | TFS Timer > TFS Timer Max or TFS received from all inputs. | (1), (7), (18), Processed TFS message |
| A5 | Update TIS Buffer | TIS Received | 7, 23 | TIS Message | Operational (Listening) | Start TIS Timer | No TIS Receive Error, and Start TIS Timer if it is not already running. | (1), (7), (18), 23 |
| A6 | Handle Non-fatal TIS Receive Error | TIS Received | 7 | TIS Message | Operational (Listening) | Non-fatal TIS Receive Error | TIS Receive Error | (1), (7), (18) |
| A6a | Handle Fatal TIS Receive Error | TIS Received | 7 | TIS Message | Stopped | Fatal TIS Receive Error | Fatal TIS Receive Error | (1), (7), (18) |
| A7 | Send TIS | TIS Processed | 7 | Outgoing TIS Messages | Operational (Listening) | TIS Message(s) to each neighbor | Send TIS if and only if a TIS has not already been sent within the Time Interval | (1), (7), (18), Sent TIS messages |
| A7a | Send TIS | Operational (Listening) | 7 | Outgoing TIS Messages | Operational (Listening) | TIS Receive Error, TIS Message(s) to each neighbor | Send TIS if and only if any inputs from neighbors have not been received within the time interval | (1), (7), (18), Sent TIS messages |

TABLE 21-continued

State Transition Model for Transactive Nodes within an Operational State

| Row | Internal Function | Acts Upon Current State | By Setting Attributes | Using Inputs | Producing Next State | Producing Output | On the Condition | Info. Gathered and Recorded |
|---|---|---|---|---|---|---|---|---|
| A7b | Handle non-fatal TIS processing error | TIS Processed | 7 | TIS Processing Error | TIS Processed | Recovery | Non-fatal TIS Processing error | (1), (7), (18) Received TIS Message, Generated error |
| A7c | Handle fatal TIS processing error | TIS Processed | 7 | TIS Processing Error | Stopped | | Fatal TIS Processing Error | (1), (7), (18) Received TIS Message, Generated error |
| A8 | Update TFS Buffer | TFS Received | 7, 24 | TFS Message | Operational (Listening) | Start TFS Timer | No TFS Receive Error, and Start TFS timer if it is not already running | (1), (7), (18), 24 |
| A9 | Handle Non-fatal TFS Receive Error | TFS Received | 7 | TFS Message | Operational (Listening) | Non-fatal TFS Receive Error | TFS Receive Error | (1), (7), (18) |
| A9a | Handle Fatal TFS Receive Error | TFS Received | 7 | TFS Message | Stopped | Fatal TFS Receive Error | Fatal TFS Receive Error | (1), (7), (18) |
| A10 | Send TFS | TFS Processed | 7 | Outgoing TFS Messages | Operational (Listening) | TFS Message(s) to each neighbor | Send TFS if and only if a TFS has not already been sent within the time interval. | (1), (7), (18), Sent TFS messages |
| A10a | Send TFS | Operational (Listening) | 7 | Outgoing TFS Messages | Operational (Listening) | TFS Receive Error, TFS Message(s) to each neighbor | Send TFS if and only if any inputs from our neighbors have not been received within the time interval. | (1), (7), (18), Sent TFS messages |
| A11 | Handle non-fatal TFS processing error | TFS Processed | 7 | TFS Processing Error | TFS Processed | Recovery | Non-fatal TFS Processing error | (1), (7), (18) Received TFS Message, Generated error |

TABLE 21-continued

| State Transition Model for Transactive Nodes within an Operational State | | | | | | | | |
|---|---|---|---|---|---|---|---|---|
| | | Acts Upon | By | | Producing | | | Info. Gathered |
| Row | Internal Function | Current State | Setting Attributes | Using Inputs | Next State | Output | On the Condition | and Recorded |
| A11a | Handle fatal TFS processing error | TFS Processed | 7 | TFS Processing Error | Stopped | | Fatal TFS Processing Error | (1), (7), (18) Received TFS Message, Generated error |

("U" = unconditional)

6.1.18 Transactive Control Signal Propagation

6.1.18.1 Problem Statement

Transactive control signals (transactive incentive signal and transactive feedback signal) carry information related to electrical power supply and demand over a wide area network. The signals traverse a network of transactive control nodes to elicit a desired control action from responsive assets in a timely manner. The end-to-end (from generation to end-user customer) transmission time should be less than 3 minutes assuming a transactive control hierarchy of 15 levels spanning a 1000 mile radius. This translates to roughly 12 seconds (180/15) per hop time budget including the link transit time. Note that the transactive incentive signals will start at the bulk generators and continue to end-user customers. The transactive feedback signal will start at the end-use customer and will travel through the transactive control hierarchy towards bulk generation. While the TIS and the TFS are decoupled temporally and loosely coupled functionally in the sense that a TFS generation does not have to get triggered by the arrival of a TIS, the two signals still influence each other since the computation of TIS and TFS considers the forecasted values for each signal.

The timing model can be purely clock-driven or more asynchronously event-driven. For example, in some embodiments, a set of neighboring transactive nodes are configured to exchange transactive values with one another until the transactive values converge with one another to an acceptable degree (e.g., within a designated percentage of one another (such as 5%, 2%, 1%, or any other desired degree of tolerance)). Further, in such even-driven systems, when a change occurs within a transactive node (e.g., due to a change in local conditions), the transactive node can be configured to transmit an updated set of transactive signals when its local transactive signals deviate from the previously transmitted signals by more than a relaxation criterion.

If the system becomes highly synchronized, bursts of signals might tax the system infrastructure. If the system becomes too loosely event-driven and asynchronous, it becomes more difficult to confirm that signals will have been conveyed. There is probably some flexibility allowable between these extremes, and the design in this appendix facilitates some flexibility. Regardless, the timing model should recognize that the "conversation" of these signals necessarily changes during the transition from one update interval to the next because the set of future intervals change during this transition.

Figure 31:
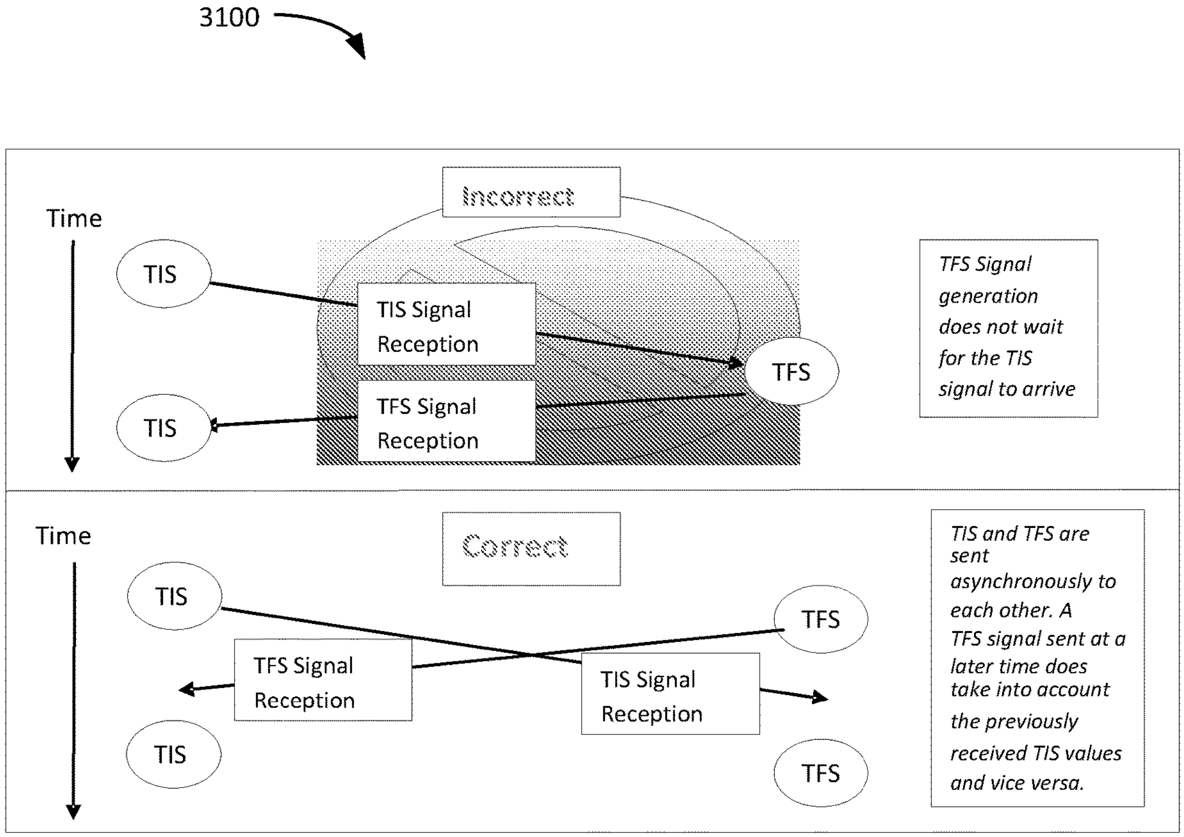
FIG. 31 is a diagram that illustrates TIS and TFS generation being decoupled.

FIG. 31 is a diagram 3100 showing TIS and TFS generation being decoupled. The processing of TIS and TFS inputs is performed in reference to the basic 5-minute interval structure that is UTC referenced.

6.1.18.2 Transactive Node Object Model Attributes Summary

A set of ten (and in some embodiments, mandatory), configurable attributes B1-B10 are defined below in Table 22.

6.1.18.3 One exemplary Approach

1. Transactive control nodes of the Demonstration use time synchronization with a tolerance of 200 ms. This is readily achievable using either NTP or SNTP. The synchronization is useful to align transactive signal intervals as well as ease of correlation of data collection and event logs.
2. Each transactive control node has two transactive signal timers: TIS_TIMER and TFS_TIMER. These timers are started upon receipt of a TIS or TFS respectively and impose a delay to allow for arrival of more signals before processing occurs (12 second default value).
3. Each transactive control node has two "hold-down" timers: TIS_HOLD_DOWN_TIMER and TFS_HOLD_DOWN_TIMER. These timers lock out additional processing to prevent race conditions in the mesh segment of a network of transactive control nodes. (30 second default value). The value should be >=TIS_TIMER and TFS_TIMER respectively.
4. Each transactive control node has a transactive signal watchdog timer (WATCHDOG_TIMER), which is configured to fire off every T_period (300 default value) seconds. It is desirable that the WATCHDOG_TIMER be less than or equal to the value of the smallest interval (currently 300 seconds) used in the communication of the transactive signals.
5. Upon startup, a transactive control node starts the transactive signal watchdog timer. It is recommended that the watchdog timer be aligned with the transactive signal update intervals. For example, if the transactive signal intervals are {6:00, 6:05, 6:10, . . . } then the watchdog timer is recommended to also be started at 6:00 and fire-off every 300 seconds.
6. When the transactive signal watchdog timer expires, if WATCHDOG_TIMER_SIGNAL_GEN_ALWAYS_ON configuration variable is set to TRUE then the node will send TIS and TFS packets to neighboring transactive control nodes. If WATCHDOG_TIM- ER_SIGNAL_GEN_ALWAYS_ON is set to FALSE and if no signal driven events have taken place in the last interval then the node sends TIS and TFS packets to neighboring transactive control nodes connected to this node. Then, the node restarts the global timer.

7. When the node receives a TIS packet, it starts the TIS_TIMER (if it is not already started), and stores the TIS packet in the local TIS store. The TIS_TIMER represents a transactive signal collection period to allow the transactive control node to receive all possible signals from its neighbors. (Each transactive node typically knows how many transactive neighbors it has and therefore how many transactive signals it should expect to receive. In deeper topologies, the TIS_TIMER and TFS_TIMER will unlikely achieve the desired effect of collecting all signals prior to calculation because signal path lengths will be dissimilar for various signals that are to be received.)
8. When the node receives a TFS packet, it starts the TFS_TIMER (if it is not already started), stores the TFS packet in the local TFS store. The TFS_TIMER represents a transactive signal collection period to allow the transactive control node to receive all possible signals from its neighbors.
9. When the TIS_TIMER expires, the node performs the transactive control computation using the most recent TIS and TFS information stored in its TIS and TFS stores. (Received TIS and TFS signals will often contribute only a small influence to the newly calculated TIS and TFS at a transactive node.)
10. When TFS_TIMER expires, the node starts performs the transactive control computation using the most recent TIS and TFS information stored in its TIS and TFS stores.
11. When the node finishes TIS signal computation, it clears the store and sends a TIS packet to its neighbors (In simulations, the processing is represented with a delay of 12 seconds). The TIS_HOLD_DOWN_TIMER is started. No TIS may be sent again until it expires.
12. When the node finishes the TFS signal computation, it clears the cache and sends a TFS packet to its neighbors (In simulations, the processing is represented with a delay of 12 seconds). The TFS_HOLD_DOWN_TIMER is started. No TFS may be sent again until it expires.
13. Since the transactive control is a distributed system, there will be times when transactive control signals arrive during the hold-down timer or outside the TIS/TFS timer data collection periods. TIS and TFS signals also may arrive at different parts of the time interval. When a new transactive control signal is received and the corresponding transactive control signal computation is performed, one may find that the resulting TIS/TFS values show no significant changes to the previously sent values in the same "interval." In this case, the transactive control node is recommended to omit or delay the transmission of a new TIS/TFS value. This added feature allows further reductions of both communications chatter and computational cycles. This behavior is controlled by means of two configuration variables:
TIS_SIGNAL_SUPPRESS_IF_NO_CHANGE and TFS_SIGNAL_SUPPRESS_IF_NO_CHANGE. If either one of these variables are set to TRUE, then the node will be perform the check for no change of the corresponding TIS or TFS signals and suppress transmission.
14. One of the primary inputs to the transactive control node is the local conditions input. This section encourages inclusion of triggers for computation and transmission of TIS/TFS based on changes in the local conditions. The criteria for incorporation of local conditions will be decided at a later time.

Figure 32:
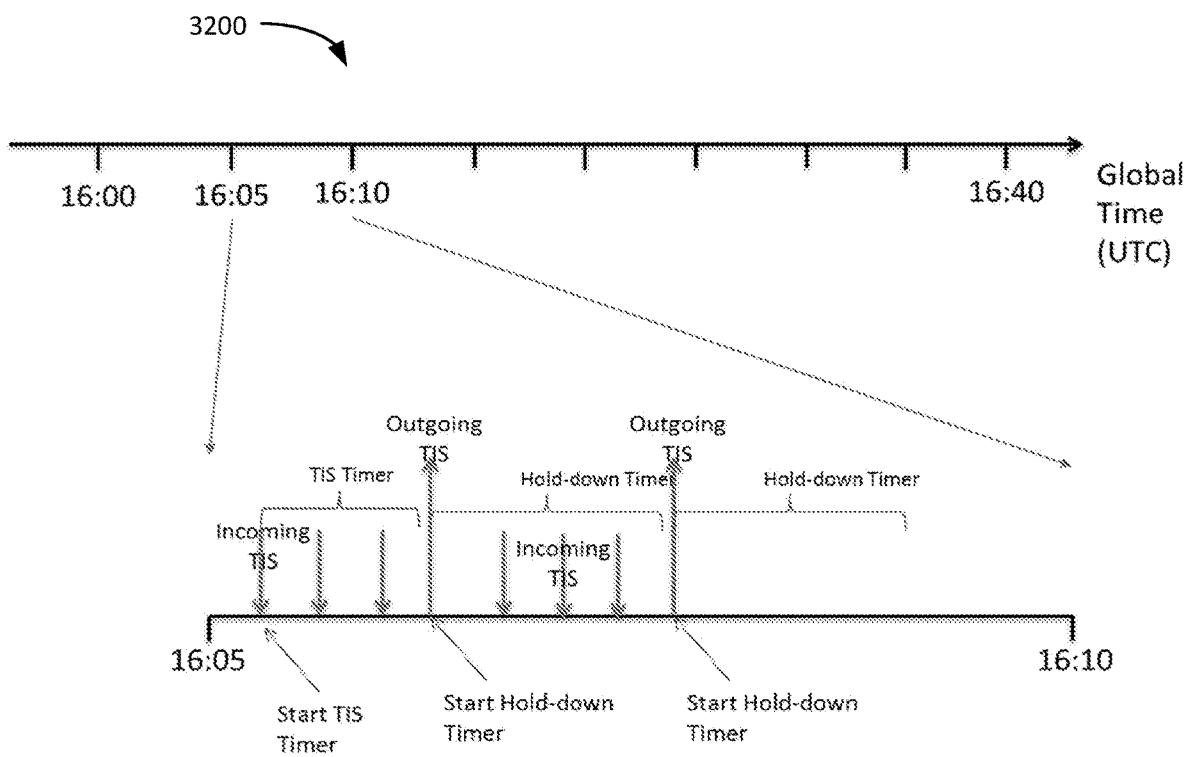
FIG. 32 is a diagram that illustrates TIS processing as may occur for some embodiments.

The timers and the operation for an example TIS embodiment are illustrated in diagram 3200 of FIG. 32. The TFS is handled in a similar manner.

In summary, the following desired behavior is expressed in pseudo code format.

```
Upon node startup:
Start WATCHDOG_TIMER
Upon receiving a TIS:
if (TIS_TIMER is not running) && (TIS_HOLD_DOWN_TIMER is not running) && (!TIS_IN_CALCULATION) {Start TIS_TIMER}
Store received TIS
Upon receiving a TFS:
if (TFS_TIMER is not running) && (TFS_HOLD_DOWN_TIMER is not running) && (!TIS_IN_CALCULATION) {Start TFS_TIMER}
Store received TFS
Upon expiration of TIS_TIMER:
Stop and clear TIS_TIMER
Set TIS_IN_CALCULATION==true)
Compute TIS using most recent stored TIS and TFS.
If (TIS_SIGNAL_SUPPRESS_IF_NO_CHANGE==FALSE) {Send TIS} else {check for change in values of computed TIS with the previously sent TIS. If change {Send TIS} else {do nothing}
Set TIS_IN_CALCULATION==false)
If (TIS is sent) {Start TIS_HOLD_DOWN_TIMER}
Upon expiration of TFS_TIMER:
Stop and clear TFS_TIMER
Set TFS_IN_CALCULATION==true)
Compute TFS using most recent stored TIS and TFS.
If (TFS_SIGNAL_SUPPRESS_IF_NO_CHANGE==FALSE) {Send TFS} else {check for change in values of computed TFS with the previously sent TFS. If change {Send TFS} else {do nothing}}
Set TFS_IN_CALCULATION==false)
If (TFS is sent) {Start TFS_HOLD_DOWN_TIMER}
Upon expiration of TIS_HOLD_DOWN_TIMER:
Stop and clear TIS_HOLD_DOWN_TIMER
If (no new TIS) {do nothing}
If (new TIS)
  Set TIS_IN_CALCULATION==true)
  Compute TIS using most recent stored TIS and TFS.
  If (TIS_SIGNAL_SUPPRESS_IF_NO_CHANGE==FALSE) {Send TIS} else {check for change in values of computed TIS with the previously sent TIS. If change {Send TIS} else {do nothing} }
  Set TIS_IN_CALCULATION==false)
  If (TIS is sent) {Start TIS_HOLD_DOWN_TIMER}
```

Figure 33:
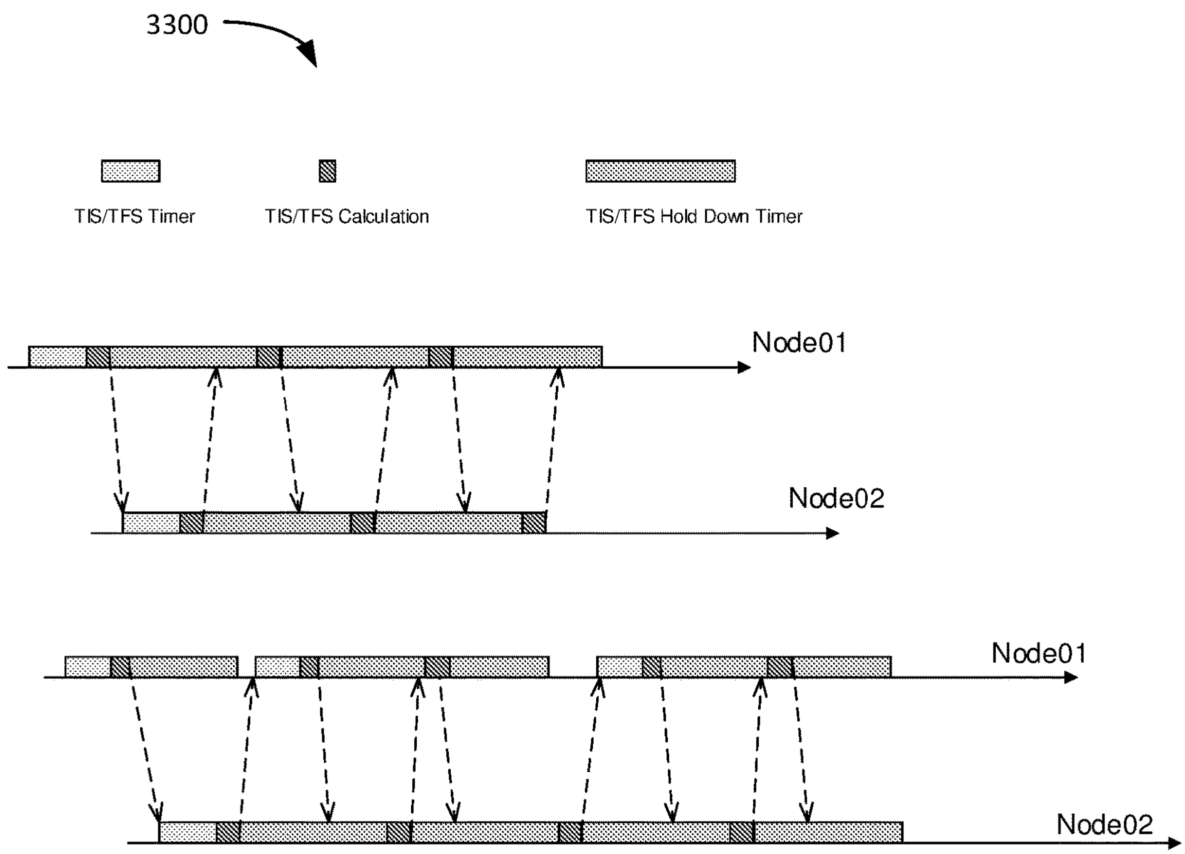
FIG. 33 is a diagram illustrating an example where a perpetual exchange of signals might become sustained between two transactive node neighbors

FIG. 33 is a diagram 3300 illustrating an example where a perpetual exchange of signals might become sustained between two transactive node neighbors.

```
Upon expiration of TFS_HOLD_DOWN_TIMER:
Stop and clear TFS_HOLD_DOWN_TIMER
If (no new TFS) {do nothing}
```

If (new TFS)
Set TFS_IN_CALCULATION==true)
Compute TFS using most recent stored TIS and TFS.
If (TFS_SIGNAL_SUPPRESS_IF_NO_CHANGE==FALSE) {Send TFS} else {check for change in values of computed TIS with the previously sent TFS}
Set TFS_IN_CALCULATION==false)
If change {Send TFS} else {do nothing}
If (TFS is sent) {Start TFS_HOLD_DOWN_TIMER}
Upon expiration of the WATCHDOG_TIMER:
If (WATCHDOG_TIMER_SIGNAL_GEN_ALWAYS_ON==TRUE) {
If (local_conditions_change==TRUE)||(TIS/TFS is not computed in this period) {
Recompute TIS/TFS}
Send TIS; Send TFS; Start TIS_HOLD_DOWN_TIMER; Start TFS_HOLD_DOWN_TIMER}
If (WATCHDOG_TIMER_SIGNAL_GEN_ALWAYS_ON==FALSE) {
If (local_conditions_change==FALSE) && (we sent TIS/TFS in the last transactive signal interval) {
Do nothing}
Else {
Recompute TIS/TFS
Send TIS; Send TFS; Start TIS_HOLD_DOWN_TIMER; Start TFS_HOLD_DOWN_TIMER}}

TABLE 22

Dictionary of Exemplary Timing Attributes Recommended at a Transactive Node to Facilitate Exchange of Transactive Signals between Transactive Neighbors

| No. | Attribute Name | Description | Role | Type | Format | Range of values |
|---|---|---|---|---|---|---|
| B1 | TIS_TIMER | Started upon receipt of the first TIS in the current update interval (See 9-Update Frequency). | Allows for arrival of more TIS signals before processing occurs. Helps retard successive transmissions of TIS signals. | Single real number. | — | The value 0 (zero) disables the TIS_TIMER. Default value: 12 s. |
| B2 | TFS_TIMER | Started upon receipt of the first TFS in the current update interval (See 9-Update Frequency). | Allows for arrival of more TFS signals before processing occurs. Helps retard successive transmissions of TFS signals. | Single real number. | — | The value 0 (zero) disables the TFS_TIMER. Default value: 12 s. |
| B3 | TIS_IN_CALCULATION | If set, indicates that the transactive node is engaged in recalculating its TIS value. | Certain actions are to be prevented during this time to avoid corrupting calculated signals. | Binary condition flag. Dimensionless. | — | 0-Not busy calculating TIS. 1-Busy calculating TIS. |
| B4 | TFS_IN_CALCULATION | If set, indicates that the transactive node is engaged in recalculating its TFS values. | Certain actions are to be prevented during this time to avoid corrupting calculated signals. | Binary condition flag. Dimensionless. | — | 0-Not busy calculating TFS. 1-Busy calculating TFS. |
| B5 | TIS_HOLD_DOWN_TIMER | Started upon sending a TIS. Successive TIS may not be transmitted by this transactive node until after this timer has expired. | Used to suppress transmission of excessive TIS messages. | Single real number. Units: s. | — | Use of 0 (zero) as the value disables this timer. Default: 30 s. Timer duration should be shorter than the update interval indicated by 9-Update Frequency attribute. |

TABLE 22-continued

Dictionary of Exemplary Timing Attributes Recommended at a Transactive Node to Facilitate Exchange of Transactive Signals between Transactive Neighbors

| No. | Attribute Name | Description | Role | Type | Format | Range of values |
|---|---|---|---|---|---|---|
| B6 | TFS_HOLD_DOWN_TIMER | Started upon sending a TFS. Successive TFS may not be transmitted by this transactive node until after this timer has expired. | Used to suppress transmission of excessive TFS messages. | Single real number. Units: s. | — | Use of 0 (zero) as the value disables this timer. Default: 30 s. Timer duration should be shorter than the update interval indicated by 9-Update Frequency attribute. |
| B7 | WATCHDOG_TIMER | An event occurs at this interval duration and is aligned with the transitions from one update interval into the next. (In some embodiments, the watchdog time is aligned with the update interval, but that need not be the case in general. If the watchdog timer is further specified to occur n seconds (e.g., 15 seconds) prior to the start of the next update interval, it can be more useful to induce transmission of transactive signals and asset control actions that are relevant for the pending update interval.) | Actions, like the transmission of transactive signals and the sending of asset control recommendations to asset systems, may be configured to occur each time the watchdog timer expires. During testing, the watchdog timer duration may be shortened to speed the rate at which observations may be taken and thereby facilitate testing of a transactive node. | Single real number. Units: s. | — | Use of 0 (zero) as the value disables this timer (e.g., no action may be induced by a watchdog-timer event. If assigned a non-zero value, this duration should be longer than any of the attributes B1-TIS Timer, B2-TFS Timer, B5-TIS Hold Down Timer, or B6-TFS Hold Down Timer. (If this is not the case, then watchdog timer events will occur prior to calculating and transmitting transactive signals, and watchdog event induced actions may accumulate.) Default value: Set equal to the duration of the update interval, which is 300 s for the Demonstration. |
| B8 | WATCHDOG_TIMER_SIGNAL_GEN_ALWAYS_ON | This attribute specifies whether transactive signals are to be transmitted | If set true, this attribute will cause transactive signals to be transmitted upon the occurrence | Logical condition flag: true/false. | Logic | 0-False-transactive signals are sent when the watchdog timer duration |

TABLE 22-continued

Dictionary of Exemplary Timing Attributes Recommended at a Transactive Node to Facilitate Exchange of Transactive Signals between Transactive Neighbors

| No. | Attribute Name | Description | Role | Type | Format | Range of values |
|---|---|---|---|---|---|---|
| | | or not when a watchdog timer event occurs. | of a watchdog timer event; if set false, only the corresponding transactive signals that were not sent by this transactive node during the expiring watchdog time interval are to be transmitted. See transactive neighbor connection attributes 59-TIS Sent Flag and 60-TFS Sent Flag attributes. | | | expires only if corresponding type of transactive signal was not sent during the expiring watchdog timer duration. 1-True-the default condition-transmit TIS and TFS transactive signals upon the expiration of the watchdog timer regardless of whether any transactive signals were transmitted during the watchdog timer duration that is expiring. |
| B9 | TIS_SIGNAL_SUPPRESS_IF_NO_CHANGE | This attribute controls TIS generation. If this attribute is set true, the transactive control node will compare computed signal values to the respective previous corresponding transactive signal sent and will not send another TIS if the values show no significant changes. Default value is true. | This attribute and the related attribute B10 can reduce the numbers of redundant transactive signals transmitted by this transactive node. There is little value in sending transactive signals that are virtually identical to ones that have already been sent. This attribute works in conjunction with attributes C1-C4 (see Appendix C concerning the relaxation stop criterion) and attribute B8. (In some embodiments, if B9 or B10 are true, the respective transactive signals will not be sent unless they are significantly different from the last ones | Logical condition flag: true/false. | Logic. | 0-False-the differences between newly calculated and prior transmitted TIS signals are not relevant. 1-True-default value-the difference between a newly calculated and prior transmitted TIS should be compared, and the newly calculated TIS will be transmitted only if the difference was found to be significant. See Appendix C and attributes C1-C4 for a metric of significance. |

TABLE 22-continued

Dictionary of Exemplary Timing Attributes Recommended at a Transactive Node to Facilitate Exchange of Transactive Signals between Transactive Neighbors

| No. | Attribute Name | Description | Role | Type | Format | Range of values |
|---|---|---|---|---|---|---|
| | | | sent, regardless of the condition of flag B8.) | | | |
| B10 | TFS_SIGNAL_SUPPRESS_IF_NO_CHANGE | This attribute controls TFS generation. If this attribute is set true, the transactive control node will compare computed signal values to the respective previous corresponding transactive signal sent and will not send another TFS if the values show no significant changes. Default value is true. | This attribute and the related attribute B9 can reduce the numbers of redundant transactive signals transmitted by this transactive node. There is little value in sending transactive signals that are virtually identical to ones that have already been sent. This attribute works in conjunction with attributes C1-C4 (see Appendix C concerning the relaxation stop criterion) and attribute B8. | Logical condition flag: true/false. | Logic. | 0-False-the differences between newly calculated and prior transmitted TFS signals are not relevant. 1-True-default value-the difference between a newly calculated and prior transmitted TFS should be compared, and the newly calculated TFS will be transmitted only if the difference was found to be significant. See Appendix C and attributes C1-C4 for a metric of significance. |

6.1.19 Transactive Signal Relaxation Stop Criterion 6.1.19.1 Purpose

In certain embodiments, transactive nodes periodically send their transactive signals to their neighbors. The timing of this responsibility has recently been specified and will become included in reference code implementations of the transactive node model algorithm (TNMA). The timing specification references a relaxation stop criterion based upon changes observed between the present signal and the most recent prior signal that has been calculated and sent by this transactive node. If the signals are found to have not changed much, this transactive node should not send its calculated signal again during the present update interval.

The purpose of this section is to state the criterion by which a transactive node may discern whether it should continue to send out its calculated transactive signals or not during the present update interval.

6.1.19.2 Relaxation Stop Criterion

A relaxation stop criterion can be used under the following assumptions:

1. Near-term predictions should be known with accuracy. Prediction inaccuracies and perturbations are somewhat more acceptable far into the future because one will have many opportunities to iterate and improve those distant predictions. Near-term predicted inaccuracies and events may necessitate additional iterations until the system relaxes to a steady, negotiated solution.
2. A prediction error decreases inversely proportional to some constant to the power of the number of iterations. The constant represents the improvement expected from each iteration and will usually range from [1,2+). If the constant is set to the conservative value 1, one expects the error not at all to be improved by iteration. If the number is set to 2, one expects that each successive iteration should halve the error. It is conceivable that over-relaxation solutions could allow for constants larger than 2.
3. The impact of an inaccurate prediction is roughly proportional to the predicted interval's duration.

For each future interval s, define error $\varepsilon_s$ as the absolute difference between the present estimate of the value $V_s(k)$ and the prior estimate of the value $V_s(k-1)$.

$$\varepsilon_s = |V_s(k) - V_s(k-1)| \quad \text{(Eq. C1)}$$

The criterion should be applied consistently to either the value itself or to a relative representation of the value, which further results in dividing the result in Eq. C1 by the absolute value of $V_s(k)$.

Each error $\varepsilon_s$ should be factored by a corresponding weighting factor $W_s$ to account for the impacts of the duration of each future interval s and the number of iterations that may be reasonably performed on the prediction.

$$W_s = \frac{D_s}{\gamma^{(t_s - t_0)/D}} \quad \text{(Eq. C2)}$$

In Eq. C2, $D_s$ is the time duration of interval s, and γ is a constant [1,2+) that represents the effectiveness of each iteration, as was described in bullet #2 above. The term $(t_s - t_0)/D$ represents the number of iterations that could reasonably be completed if iterations are conducted after every D constant time interval between the start of the predicted interval $t_s$ and the present time $t_0$. For example, the system can update its calculations every 5 minutes, so one might naturally expect over 12 opportunities for the solution to iteratively converge every hour.

The overall relaxation stop criterion may then be stated as a constant E that is proportional to the sum of all the weighting factors. The proportionality constant K represents a conservative "typical" error $\varepsilon_s$ that would be deemed acceptable. Some trial and error may occur to select the proportionality constant K that will result in an acceptable number of iterations.

The time series has been iterated adequately when the weighted sum of errors are less than the constant E, in which case iterations should be halted. If, however, the weighted sum of errors is greater than or equal to the constant E, then additional iteration should be conducted until errors satisfy the criterion.

$$E = K \sum_{S} W_s >^{?} \sum_{S} W_s \cdot \varepsilon_s \quad \text{(Eq. C3)}$$

The complete criterion is stated in Eq. C4.

$$E = K \cdot \sum_{s=0}^{S} \frac{D_s}{\gamma^{(t_s - t_0)/D}} \overset{?}{>} \sum_{s=0}^{S} \frac{D_s \cdot \varepsilon_s}{\gamma^{(t_s - t_0)/D}} \quad \text{(Eq. C4)}$$

An example has been worked through in Appendix A using three different values of constant γ. The example uses a set of intervals from the Demonstration of the type that will be used for its transactive signals. The weighting factors for the series of intervals and at the three example values of constant γ have been plotted in graph 3400 of FIG. 34.

Large gamma (e.g. γ=2.0) is shown to discount the importance of error in future predictions more than small values of gamma (e.g., γ=1.0625). The jagged curve reflects that long interval durations are weighted more than short ones, which is relevant for the Demonstrations intervals that become successively longer after the $12^{th}$, $32^{nd}$, $50^{th}$, and $54^{th}$ intervals. The impact of distant future weightings may become negligibly small.

Figure 34:
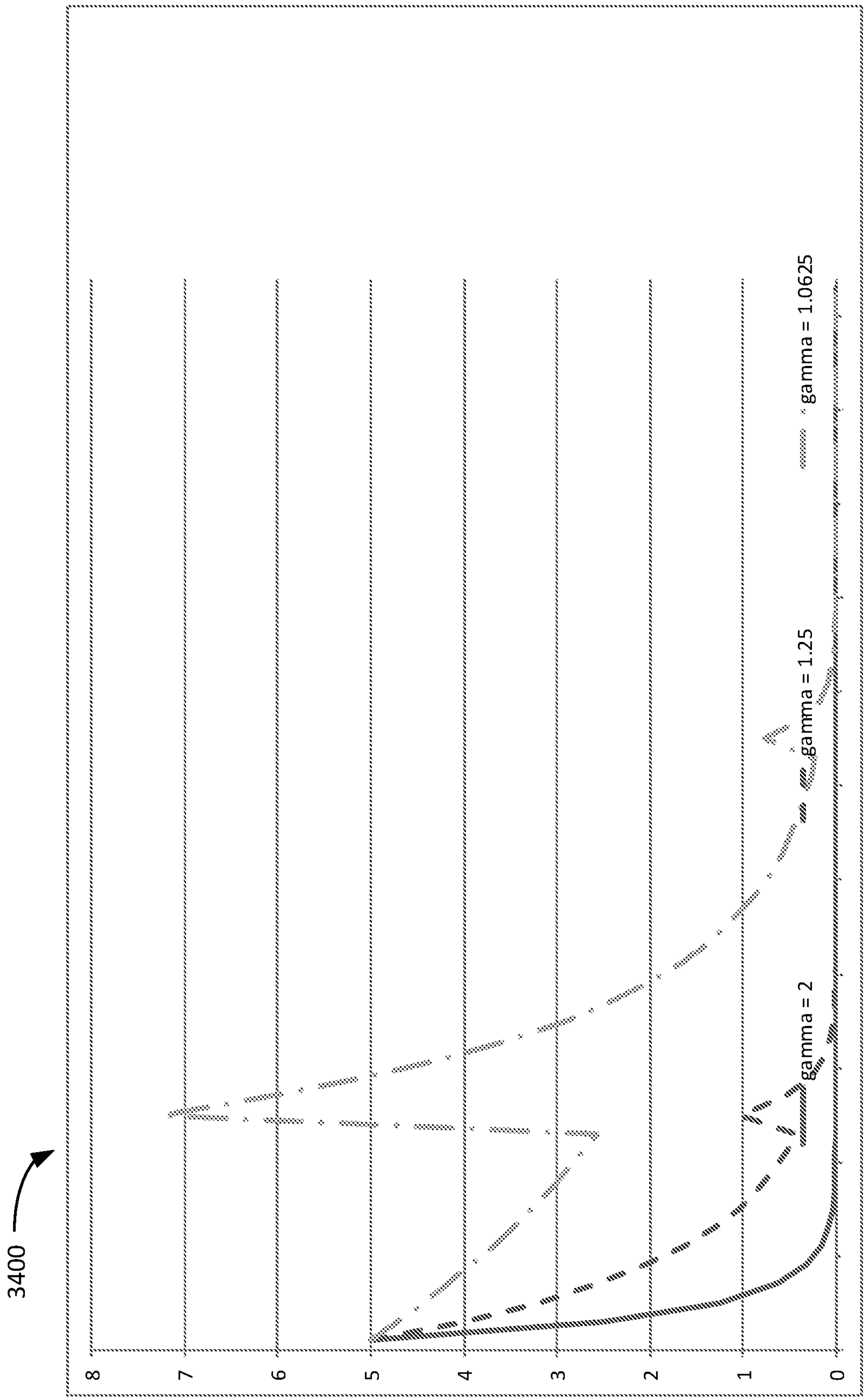
FIG. 34 is a graph showing weighting factors for a set of demonstration intervals ($IST_0$=0:00) using three different values of constant $\gamma$

FIG. 34 is a graph 3400 showing weighting factors for a set of Demonstration intervals ($IST_0$=0:00) using three different values of constant γ.

TABLE 23

Example Weighting Factors $W_s$ for a Sample Series of Intervals and for Three Different Gamma Values

| Sample (#) | $D_s$ (minutes) | | $t_s$-$t_o$ (minutes) | $W_s$ γ = 2 | $W_s$ γ = 1.25 | $W_s$ γ = 1.0625 |
|---|---|---|---|---|---|---|
| 0 | 5 | 1/0/00 0:00 | 0 | 5.00E+00 | 5.00E+00 | 5.00E+00 |
| 1 | 5 | 1/0/00 0:05 | 5 | 2.50E+00 | 4.00E+00 | 4.71E+00 |
| 2 | 5 | 1/0/00 0:10 | 10 | 1.25E+00 | 3.20E+00 | 4.43E+00 |
| 3 | 5 | 1/0/00 0:15 | 15 | 6.25E−01 | 2.56E+00 | 4.17E+00 |
| 4 | 5 | 1/0/00 0:20 | 20 | 3.13E−01 | 2.05E+00 | 3.92E+00 |
| 5 | 5 | 1/0/00 0:25 | 25 | 1.56E−01 | 1.64E+00 | 3.69E+00 |
| 6 | 5 | 1/0/00 0:30 | 30 | 7.81E−02 | 1.31E+00 | 3.48E+00 |
| 7 | 5 | 1/0/00 0:35 | 35 | 3.91E−02 | 1.05E+00 | 3.27E+00 |
| 8 | 5 | 1/0/00 0:40 | 40 | 1.95E−02 | 8.39E−01 | 3.08E+00 |
| 9 | 5 | 1/0/00 0:45 | 45 | 9.77E−03 | 6.71E−01 | 2.90E+00 |
| 10 | 5 | 1/0/00 0:50 | 50 | 4.88E−03 | 5.37E−01 | 2.73E+00 |
| 11 | 5 | 1/0/00 0:55 | 55 | 2.44E−03 | 4.29E−01 | 2.57E+00 |
| 12 | 15 | 1/0/00 1:00 | 60 | 3.66E−03 | 1.03E+00 | 7.25E+00 |
| 13 | 15 | 1/0/00 1:15 | 75 | 4.58E−04 | 5.28E−01 | 6.04E+00 |
| 14 | 15 | 1/0/00 1:30 | 90 | 5.72E−05 | 2.70E−01 | 5.04E+00 |
| 15 | 15 | 1/0/00 1:45 | 105 | 7.15E−06 | 1.38E−01 | 4.20E+00 |
| 16 | 15 | 1/0/00 2:00 | 120 | 8.94E−07 | 7.08E−02 | 3.50E+00 |
| 17 | 15 | 1/0/00 2:15 | 135 | 1.12E−07 | 3.63E−02 | 2.92E+00 |
| 18 | 15 | 1/0/00 2:30 | 150 | 1.40E−08 | 1.86E−02 | 2.43E+00 |
| 19 | 15 | 1/0/00 2:45 | 165 | 1.75E−09 | 9.51E−03 | 2.03E+00 |
| 20 | 15 | 1/0/00 3:00 | 180 | 2.18E−10 | 4.87E−03 | 1.69E+00 |
| 21 | 15 | 1/0/00 3:15 | 195 | 2.73E−11 | 2.49E−03 | 1.41E+00 |
| 22 | 15 | 1/0/00 3:30 | 210 | 3.41E−12 | 1.28E−03 | 1.18E+00 |
| 23 | 15 | 1/0/00 3:45 | 225 | 4.26E−13 | 6.53E−04 | 9.80E−01 |
| 24 | 15 | 1/0/00 4:00 | 240 | 5.33E−14 | 3.35E−04 | 8.17E−01 |
| 25 | 15 | 1/0/00 4:15 | 255 | 6.66E−15 | 1.71E−04 | 6.81E−01 |
| 26 | 15 | 1/0/00 4:30 | 270 | 8.33E−16 | 8.77E−05 | 5.68E−01 |
| 27 | 15 | 1/0/00 4:45 | 285 | 1.04E−16 | 4.49E−05 | 4.74E−01 |
| 28 | 15 | 1/0/00 5:00 | 300 | 1.30E−17 | 2.30E−05 | 3.95E−01 |
| 29 | 15 | 1/0/00 5:15 | 315 | 1.63E−18 | 1.18E−05 | 3.29E−01 |
| 30 | 15 | 1/0/00 5:30 | 330 | 2.03E−19 | 6.03E−06 | 2.74E−01 |
| 31 | 15 | 1/0/00 5:45 | 345 | 2.54E−20 | 3.09E−06 | 2.29E−01 |
| 32 | 60 | 1/0/00 6:00 | 360 | 1.27E−20 | 6.32E−06 | 7.63E−01 |
| 33 | 60 | 1/0/00 7:00 | 420 | 3.10E−24 | 4.34E−07 | 3.69E−01 |
| 34 | 60 | 1/0/00 8:00 | 480 | 7.57E−28 | 2.98E−08 | 1.78E−01 |
| 35 | 60 | 1/0/00 9:00 | 540 | 1.85E−31 | 2.05E−09 | 8.60E−02 |
| 36 | 60 | 1/0/00 10:00 | 600 | 4.51E−35 | 1.41E−10 | 4.16E−02 |
| 37 | 60 | 1/0/00 11:00 | 660 | 1.10E−38 | 9.68E−12 | 2.01E−02 |
| 38 | 60 | 1/0/00 12:00 | 720 | 2.69E−42 | 6.65E−13 | 9.70E−03 |
| 39 | 60 | 1/0/00 13:00 | 780 | 6.57E−46 | 4.57E−14 | 4.69E−03 |
| 40 | 60 | 1/0/00 14:00 | 840 | 1.60E−49 | 3.14E−15 | 2.26E−03 |
| 41 | 60 | 1/0/00 15:00 | 900 | 3.92E−53 | 2.16E−16 | 1.09E−03 |
| 42 | 60 | 1/0/00 16:00 | 960 | 9.56E−57 | 1.48E−17 | 5.28E−04 |
| 43 | 60 | 1/0/00 17:00 | 1020 | 2.33E−60 | 1.02E−18 | 2.55E−04 |
| 44 | 60 | 1/0/00 18:00 | 1080 | 5.70E−64 | 7.01E−20 | 1.23E−04 |
| 45 | 60 | 1/0/00 19:00 | 1140 | 1.39E−67 | 4.82E−21 | 5.96E−05 |
| 46 | 60 | 1/0/00 20:00 | 1200 | 3.40E−71 | 3.31E−22 | 2.88E−05 |
| 47 | 60 | 1/0/00 21:00 | 1260 | 8.29E−75 | 2.27E−23 | 1.39E−05 |
| 48 | 60 | 1/0/00 22:00 | 1320 | 2.02E−78 | 1.56E−24 | 6.72E−06 |
| 49 | 60 | 1/0/00 23:00 | 1380 | 4.94E−82 | 1.07E−25 | 3.25E−06 |
| 50 | 360 | 1/1/00 0:00 | 1440 | 7.24E−85 | 4.43E−26 | 9.41E−06 |
| 51 | 360 | 1/1/00 6:00 | 1800 | 1.53E−106 | 4.66E−33 | 1.20E−07 |
| 52 | 360 | 1/1/00 12:00 | 2160 | 3.25E−128 | 4.91E−40 | 1.52E−09 |
| 53 | 360 | 1/1/00 18:00 | 2520 | 6.87E−150 | 5.17E−47 | 1.93E−11 |
| 54 | 1440 | 1/2/00 0:00 | 2880 | 5.82E−171 | 2.18E−53 | 9.84E−13 |
| 55 | 1440 | 1/3/00 0:00 | 4320 | 1.17E−257 | 2.68E−81 | 2.57E−20 |
| 56 | 1440 | 1/4/00 0:00 | 5760 | — | 3.30E−109 | 6.72E−28 |

6.1.19.3 Additional Transactive Node Attributes where a Relaxation Stop Criterion is Employed Table 24 specifies four additional transactive node attributes that can be used if a transactive node is to employ the relaxation stop criterion as it has been introduced in this appendix. These attributes can be assumed to be assignable at the transactive-node level. It is conceivable that this criterion (or another) and its attributes may in the future be configured differently for each transactive neighbor connection.

TABLE 24

Dictionary of the Relaxation Stop Criterion Attributes that may be Configured at a Transactive Node

| No. | Attribute Name | Description | Role | Type | Format | Range of values |
| --- | --- | --- | --- | --- | --- | --- |
| C1 | Relaxation Stop Criterion Proportionality Threshold-TIS | This is one of the two parameters that determine whether a calculated Output TIS time series has adequately relaxed to a steady solution at this transactive node. This parameter is the proportionality constant K that is shown in Eq. C4. | This parameter represents a maximum allowed average absolute difference between consecutively calculated Output TIS members $TIS_n$. The magnitudes of attributes C1 and C3 together affect how similar Output TIS time series should be for us to stop iterating and again transmitting the Output TIS. The magnitude of this parameter affects how many times an Output TIS will be sent to transactive neighbors by this transactive node. | Single real number. This parameter's units of measure are effectively the same as for the Output TIS: $/kWh. | — | Typically, [0, 1). Default value: 0.0005. Set to 0.0 for maximum iterations. Set to 1 to practically eliminate iterations altogether. Empirically set this parameter's value to achieve the desired numbers of Output TIS being transmitted from this transactive node. |
| C2 | Relaxation Stop Criterion Proportionality Threshold-TFS | This is one of the two parameters that determine whether a calculated Output TFS time series has adequately relaxed to a steady solution at this transactive node. This parameter is the proportionality constant K that is shown in Eq. C4. | This parameter represents a maximum allowed average absolute difference between consecutively calculated Output TFS members $TFS_n$. The magnitudes of attributes C2 and C4 together affect how similar Output TFS time series should be for us to stop iterating and again transmitting the Output TFS. The magnitude of this parameter affects how | Single real number. This parameter's units of measure are effectively the same as for an Output TFS: Average kW. | — | Typically, [0, 100,000). Default value: 100. Set to 0.0 for maximum iterations. Set to 100,000 to practically eliminate iterations altogether. Empirically set this parameter's value to achieve the desired numbers of Output TFS being transmitted from this transactive node. |

TABLE 24-continued

Dictionary of the Relaxation Stop Criterion Attributes that may be Configured at a Transactive Node

| No. | Attribute Name | Description | Role | Type | Format | Range of values |
|---|---|---|---|---|---|---|
| | | | many times an Output TFS will be sent to transactive neighbors by this transactive node. | | | |
| C3 | Relaxation Stop Criterion Gamma Parameter-TIS | This is one of the two parameters that determine whether a calculated Output TIS time series has adequately relaxed to a steady solution at this transactive node. This parameter is the constant Y that is shown in Eq. C4. | This parameter represents the relative impact of a sample's duration and a sample's distance into the future as successive Output TIS values are being compared. The magnitudes of attributes C1 and C3 together affect how similar Output TIS time series should be for us to stop iterating and again transmitting the Output TIS. The magnitude of this parameter affects how many times an Output TIS will be sent to transactive neighbors by this transactive node. | Single real number. This parameter is dimensionless. | — | Range: [1, 2). Default: 1.0 Empirically set this parameter's value to achieve the desired numbers of Output TIS being transmitted from this transactive node. |
| C4 | Relaxation Stop Criterion Gamma Parameter-TFS | This is one of the two parameters that determine whether a calculated Output TFS time series has adequately relaxed to a steady solution at this transactive node. This parameter is the constant Y that is shown in Eq. C4. | This parameter represents the relative impact of a sample's duration and a sample's distance into the future as successive Output TFS values are being compared. The magnitudes of attributes C2 and C4 together affect how similar Output TIS time | Single real number. This parameter is dimensionless. | — | Range: [1, 2). Default: 1.0 Empirically set this parameter's value to achieve the desired numbers of Output TIS being transmitted from this transactive node. |

TABLE 24-continued

| Dictionary of the Relaxation Stop Criterion Attributes that may be Configured at a Transactive Node | | | | | | |
|---|---|---|---|---|---|---|
| No. | Attribute Name | Description | Role | Type | Format | Range of values |
| | | | series should be for us to stop iterating and again transmitting the Output TIS. The magnitude of this parameter affects how many times an Output TIS will be sent to transactive neighbors by this transactive node. | | | |

6.2 Appendix B—Transactive Node Toolkit Framework

6.2.1 Terms

This section will sometimes make reference to the following terms, whose nonlimiting definitions are also given below. These definitions do not necessarily apply in all instances and may vary depending on the context.

| | | |
|---|---|---|
| elastic load | | Within the toolkit framework, the change in electrical load that is expected as responsive asset systems respond to the transactive incentive signal (TIS). Within the toolkit framework, information about elastic load will be stored into and available from the Toolkit Response Function Output Parameter Buffer. |
| inelastic load | | Electrical load that is not responsive to the transactive incentive signal (TIS) at a transactive node. In certain implementations, it is recommended that inelastic load should also include the predicted load from responsive asset systems if they were to not respond to the TIS. Within the toolkit framework, information about inelastic load will be stored into and available from the Inelastic Load Prediction Buffer. |
| input transactive feedback signal | input TFS | A transactive feedback signal (TFS) that has been received from a transactive neighbor as an input to the set of calculations that is to be conducted at a transactive node at the updated frequency. |
| input transactive incentive signal | input TIS | A transactive incentive signal (TIS) that has been received from a transactive neighbor as in input to the set of calculations that is to be conducted at a transactive node at the update frequency. |
| interval start time | IST | An attribute of transactive signals. The series of future times that define the starting times of members of set of future time intervals. The duration of each interval is defined by the time between two consecutive interval start times. |
| other local conditions | OLC | A broad set of information and data that will be inputs into the many functions and processes that is to be performed at transactive nodes. This set excludes transactive signals. |
| output transactive feedback signal | output TFS | A transactive feedback signal (TFS) object output from the calculations that are to be conducted at a transactive node at the update interval. A transactive node prepares an output TFS that predicts the average power to be exchanged with a transactive neighbor into the future. |

-continued

| | | |
|---|---|---|
| output transactive incentive signal | output TIS | A transactive incentive signal (TIS) object output from the calculations that are to be conducted at a transactive node at the update interval. |
| responsive asset system | | A system within the control of a transactive node that will change its consumption or generation in response to the transactive node's transactive incentive signal (TIS) and other local conditions. |
| toolkit | | The toolkit framework, toolkit function libraries, the set of toolkit functions, and/or associated documentation. |
| toolkit framework | | The general functionality and responsibilities at any transactive node. The flow in which high-level and more specific toolkit functions are coordinated and accomplished. |
| toolkit function | | An individual functional capability that may be implemented at a transactive node. There are two main types of toolkit functions-incentive and response. |
| toolkit function library | | A set of toolkit functions available to implementers. Implementers select toolkit functions from this library that can be instantiated and interoperably applied at their transactive node. |
| toolkit load function | | A toolkit function inserted into the toolkit framework process 8. Calculate Toolkit Resource and Incentive Function that calculates energy and energy cost for a resource and other cost components and incentives that will be used in the formulation of the transactive incentive signal. |
| toolkit resource and incentive function | | A toolkit function inserted into the toolkit framework process 6. Calculate Toolkit Load Function that calculates the predicted inelastic load and changes in elastic load components of the entire load at a transactive node. |
| transactive control | TC | A negotiated form of power grid control that uses price-like incentive and feedback signals. |
| transactive control and coordination system | TCS | A distributed system that employs transactive control and coordination. |
| transactive feedback signal | TFS | One of the major transactive signals employed by embodiments of a transactive control and coordination system. A transactive node's reporting of the expected average power to be transferred between two transactive neighbors during intervals over the next several days. |
| transactive incentive signal | TIS | One of the major transactive signals employed by embodiments of a transactive control and coordination system. A transactive node's reporting of the anticipated delivered cost of electrical power at its location at intervals over the next several days. |
| transactive signal | TS | Either the transactive incentive signal (TIS) or transactive feedback signal (TFS). |
| transactive neighbors | | Transactive nodes that exchange electrical energy between them and therefore also exchange transactive signals. |
| transactive node | TN | A defined location of the transactive control and coordination system that has agreed to exchange transactive incentive signals (TIS) and transactive feedback signals (TFS) with its transactive neighbors. |
| transactive node model algorithm | TNMA | A module of software where the functionality of transactive control is created for a transactive node. The Demonstration chooses to apply this term to software modules that serve this function. |
| transactive node object | | A formal construct possessing attributes that may be used to define the state of a transactive node and the transition between those states. |
| Transactive node object model | TNOM | The model of the states of the transactive node object and the functions by which it moves from one state to another. The TNOM includes the model of a transactive node object's configuration. |
| update frequency | | Reciprocal of the update interval. The update frequency should be made configurable to support future implementations and testing. |
| update interval | | Relatively short time interval between consecutive updates of the TIS and TFS at each transactive node. |

6.2.2 Introduction

A transactive node represents a predetermined component or region within an electric power grid at which electrical energy may be generated, consumed, imported, or exported. In principle, the transactive node construct will be scalable and similarly applicable to from small, end-use equipment (e.g., a distribution transformer, residential thermostats) to large regions (e.g., the boundary of an electric utility). A transactive node includes an agent of sorts (e.g., a computer and its software applications) that orchestrates each transactive node's responsibilities to:

1. economically balance energy
2. incentivize energy consumption or generation
3. activate its own responsive generation and load resources 4. exchange both transactive incentive signals (TIS) and transactive feedback signals (TFS) with each of its neighboring transactive nodes.

The two transactive signals—the transactive incentive signal (TIS) and transactive feedback signal (TFS)—reveal the predicted local delivered cost of electric energy and the predicted use of a TN to exchange electrical energy with its neighbors, given the value of the TIS and other predicted local conditions. (While this document refers often to pairs of TIS and TFS signals, the two signals need not necessarily always be received and sent together and simultaneously. Instead, the signals can be decoupled so that they may be sent and received separately.)

These functional behaviors should be designed into the transactive control and coordination system. Depending on its complexity, memberships, and location in its power grid, a transactive node may assume all, some, or practically none of the responsibilities to be described in this document. The toolkit function library construct is one way to organize and teach the responsibilities of a TN to those who would wish to define a transactive node and have their transactive node enter into an existing transactive control and coordination system. The toolkit library should not only hasten the adoption and implementation of transactive control, but it should also standardize implementations of transactive control so that the building blocks components will be more interoperable. The toolkit library should be available to implementers who may choose from and learn from others' experiences and practices. The template for toolkit library functions anticipates providing reference implementation code with which implementers may jump start their instantiation of similar functions.

The functional responsibilities of a transactive node will be described at two levels of the toolkit:

1. Toolkit framework—the high-level computational structure that provides basic transactive control functionality of transactive nodes and that calls upon specific toolkit library functions to enact the functionality of specific incentives and assets.

2. Toolkit library functions—the specific functions that account for resource, enact incentives and plan asset responses at transactive nodes where these specific functions have been implemented and are relevant. Applicable toolkit library functions are called upon and acted upon within the toolkit framework.

6.2.3 Toolkit Framework

The toolkit framework is a high-level structure for the inputs, functions, processes, and outputs that define transactive control functionality at a transactive node. The toolkit framework will probably be found to encompass the high-level functional responsibilities of the transactive node model algorithm (TNMA) module.

(This document primarily addresses the algorithmic functionality of a transactive node and its responsibilities toward management of electrical energy. This document may facilitate, but does not intend to specify, functionality toward system management, timing, and data collection that are better addressed within the transactive node's object model.)

Figure 35:
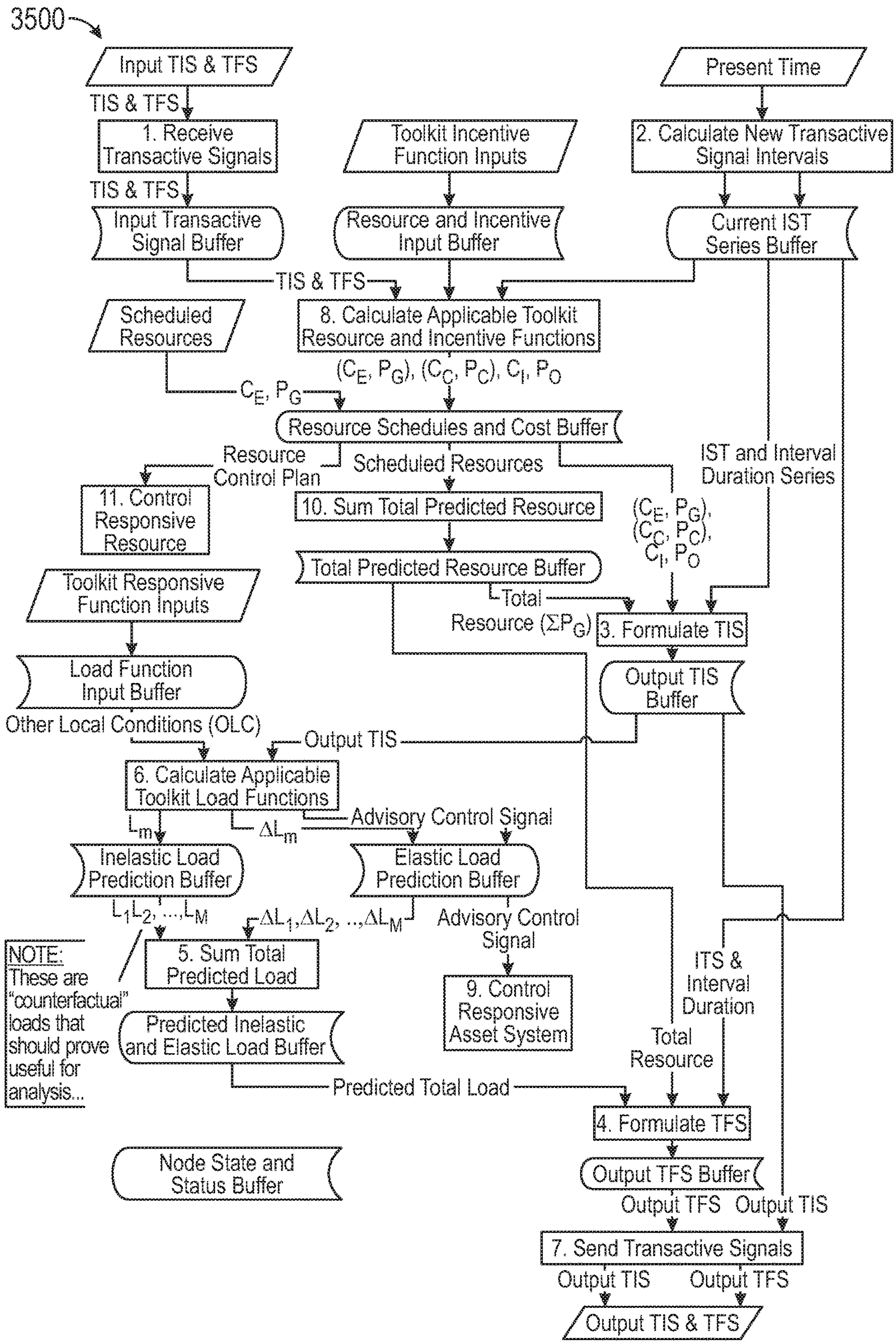
FIG. 35 is a flowchart showing an example toolkit framework of functions and processes at a transactive node.

FIG. 35 is a flowchart 3500 that shows the flow of information during each update interval (e.g., 5-minute update interval) at the rate of the update frequency. This is a functional flow, not necessarily a recommendation for how a developer will construct the software program. The blocks in this diagram represent functions and processes. The distinction between "functions" and "processes" may be somewhat subjective, but a process will have been defined to have multiple sub-functions and/or sub-processes. Blocks of FIG. 35 shown with bold outlines are processes, known to be composed of at least two sub-functions or processes.

The flow of information in FIG. 35 is indicated by solid arrows. Information is processed predominantly downward through the diagram, which makes the diagram useful for understanding functional, sequential interdependencies. Other logical flow control and dependencies are shown by dashed arrows.

Information buffers appear in several of the information flow paths. These buffers are available to be mined by data collection processes and might be made accessible to the system management level. (These buffers, if defined as part of a standard transactive node definition, can be used as a point of observability for testing. In addition, the option of preloading the buffers may be useful for testing (especially if only the 5-minute update frequency is available).) The buffers also provide recent information that may be used if any prior function or process should fail to promptly complete its responsibilities or provide its output information. The flow in this diagram has been greatly simplified by the assumption that any buffered historical information is available to be used by any other function or process at this transactive node.

As part of its data collection design for transactive data, a number of buffers can be used. For example, in the illustrated embodiment in FIG. 35, five buffers are identified, the contents of which compose a sufficient snapshot of the calculations that have been completed by the toolkit framework and its toolkit functions at a transactive node. The five buffers are those into which calculation products are to be sent: Resource Schedule and Cost Buffer, Output TIS Buffer, Output TFS Buffer, Inelastic Load Prediction Buffer, and Elastic Load Prediction Buffer. The freshest, unique buffer records from these five buffers are specified to be collected after any transactive signal has been calculated and sent to a transactive neighbor. The sampling of these five buffers is sufficient in the sense that the outputs from each toolkit resource and incentive function and each toolkit load function are revealed, the TIS and TFS transactive signals that have been transmitted from this transactive node are revealed, and the magnitudes of transactive signals that have been received may be inferred, if not perfectly known. Alternatively, signal timing and data collection can be initiated by changes that have been detected, not by rigid timers.

The following processes and functions are referenced in FIG. 35 and will be described in the next sections. Defined functions, processes, and specially defined inputs and outputs of the functions and processes will be shown in bold font in this document.

1. Receive Transactive Signals
1.1. Read TIS and TFS from Transactive neighbor
1.2. Check Authentication and Security
1.2.1. Interact with System Management (Security)
1.3. Check Validity of Transactive Signals
1.3.1. Interact with System Management (Validity)
1.4. Update Input Transactive Signal Buffer for this Transactive neighbor
2. Calculate New Transactive Signal Intervals
2.1. Read Present Time
2.2. Calculate First Interval Start Time $IST_0$
2.3. Calculate 5-Minute Interval Start Times
2.4. Calculate 15-Minute Interval Start Times
2.5. Calculate 1-Hour Interval Start Times
2.6. Calculate 6-Hour Interval Start Times 2.7. Calculate 1-Day Interval Start Times 2.8. Calculate Interval Durations from Interval Start Times 3. Formulate TIS 3.1. Refresh Default Output TIS 3.2. Calculate Total Costs of Non-Transactive Energy Generation and Imports 3.3. Calculate Total Cost of Energy Imported from Transactive nodes 3.4. Calculate Total Capacity Cost/Incentives 3.5. Calculate Total Infrastructure Cost/Incentive 3.6. Calculate Total Other Cost/Incentive 3.7. Calculate Output TIS 3.8. Calibrate/Normalize TIS 3.9. Interpolate Intervals Service Functions 4. Formulate TFS 4.1. Interpolate Intervals Service Functions 4.2. Predict Net Resource Surplus or Shortage 4.3. Disaggregate Net Resource Surplus or Shortage 4.4. Refresh Default Output TFS 5. Sum Total Predicted Load 5.1. Interpolate Intervals Service Functions 5.2. Sum Inelastic Load 5.3. Sum Change in Elastic Load 5.4. Sum Total Inelastic and Change in Elastic Load 5.5. Refresh Predicted Total Inelastic and Elastic Load 6. Calculate Applicable Toolkit Load Functions 6.1. Interpolate Intervals Service Functions 6.2m Toolkit Load Function 6.3 Refresh Predicted Inelastic and Elastic Loads 7. Send Transactive Signals (Defined only functionally at a high level)

8. Calculate Applicable Toolkit Resource and Incentive Functions

9. Control Responsive Asset Systems (Defined only functionally at a high level)

10. Sum Total Predicted Resources 10.1. Interpolate Intervals Service Functions 10.2. Sum Total Predicted Resource 10.3. Refresh Predicted Total Resource 11. Control Responsive Resource The next sections will describe examples of the functions in the above list. The sections below are demarcated by the function numbers set forth in the list above, and are not to be confused with the section numbering used outside of this appendix.

1. Receive Transactive Signals

Purpose:—

Transactive signals are signals to be communicated between transactive nodes in a transactive control and coordination system. It is through transactive signals that transactive nodes share their temporal and locational costs and thirsts for electrical energy. Transactive incentive signals (TIS) and transactive feedback signals (TFS) should be received from the transactive node neighbors at the update frequency, which happens to be once every 5 minutes for the Demonstration.

This function includes technical validation of received signals to ensure that they were properly formed and that their values are within acceptable norms. Validation is not yet a high priority, and validation processes probably do not need to be standardized across all transactive nodes. If an invalid signal is detected, it should be flagged. Additional actions may be taken to notify or alert targeted system operators and reduce the impacts from potentially misleading signals.

Applicability:

This function should be completed by a transactive node at least once during an update interval. If this function fails, functions and processes of the toolkit framework that use an input transactive signal should revert to buffered historical signals.

Sub-Functions and Sub-Processes:

The following sub-functions are iteratively completed until the input transactive signals from transactive neighbors have been received.

1.1 Read TIS and TFS from a Transactive neighbor—Function by which the TIS and TFS from a transactive neighbor is to be received. Most generally, the implementation details by which this sub-function is to be accomplished should be negotiated by pairs of transactive neighbors that will exchange transactive signals.

1.2 Check Authentication and Security—Functional block (or blocks) for signals like transactive signals that are to be conveyed through the transactive control and coordination system. The actual functional implementation details for security functions may differ from one implementation to another, but general descriptions for this block should be documented if they are applicable to any transactive node.

1.2.1 Interact with System Management (Security)—Actions that are to be taken if Check Authentication and Security function fails to authenticate a transactive signal or detects an insecurity. The input transactive signals are terminated if they cannot be authenticated or if security violations are suspected. Actions may include notifications and alerts that are to be conveyed by the system management layer. Specific actions of this function may differ by implementation.

1.3 Check Validity of Transactive Signals—Functional block (or blocks) by which the structure or contents of a transactive signal may be tested against expected and reasonable structure and content. Examples of checks on the structure of the signals could include verification of adherence to an XML schema, an expected number of future intervals, or the ordering of a series within the signal. An example of a content check would be verification that a signal's values are between stated maximum and minimum values.

1.3.1 Interact with System Management (Validity)—Actions that are to be taken if the Check Validity function fails validate transactive signals. The input transactive signals are terminated and not used or stored if they cannot be validated. Actions may include notifications and alerts that are to be conveyed by the system management layer. Specific actions of this function may differ by implementation. General functional aspects for this function that should apply to transactive nodes should be documented and implemented. More sophisticated actions may be taken, including reducing the Quality attribute of signals that have questionable validity.

1.4 Update Input Transactive Signal Buffer for this Transactive neighbor—Received transactive signals are saved into the Input Transactive Signal Buffer. The buffer may be as simple as a running (or circular) list of transactive signal pairs that have been received from transactive neighbors. The most recently received pairs or transactive signals from each transactive neighbor are most relevant within this buffered data. A much longer buffered history may be used at transactive nodes that use trending to predict transactive neighbors' responses (e.g., elasticity) or to improve the accuracy of their transactive signal predictions over time.

Inputs:

Input TIS from a transactive neighbor

Input TFS from a transactive neighbor

List of transactive neighbors from which transactive signals are expected to be received as should be known by the transactive node object and available from the Node State and Status Buffer. This information in the Node State and Status Buffer can be part of the transactive node configuration and state available within the transactive node object model, not temporary "buffer" information as the name might imply.

Outputs:

Buffered copies of Input TIS and TFS.

Copies of Input TIS and TFS pairs conveyed to a data archive by the data collection system layer.

System management notifications and alerts upon failed security or validation checks, if such system management functions have been defined and if this transactive node is obligated to interact with a system manager.

Dependencies:

Outputs of this function are used by Resource Schedules and Cost Buffer.

Outputs of this function are used by Formulate TIS.

Times at which this transactive node is eligible to receive transactive signals may be managed or limited by the current state of the transactive node object, which status is assumed to be known and available from a Node State and Status Buffer.

A set of transactive neighbors should be available from attributes of the transactive node object, which are assumed to be known and available from a Node State and Status Buffer.

Notes:

The TIS and TFS are state objects of the Project-Level Infrastructure (PLI) transactive control and coordination system. This process expects and checks that transactive signals are being received with the specified content and structure, which may be further enforced through the use of, for example, accepted XML schema.

Considerable tolerance should be built into this function to coordinate with neighboring transactive nodes and their readiness to release their transactive signals. The function should be tolerant for when transactive signals are not received, or are not received early enough to influence the present update iteration.

When an incomplete set of transactive signals is received by a transactive node, the transactive node should rely upon buffered historical information from previous iterations. Unless the power grid's predicted future has changed dramatically, the buffered signals will remain good predictions until input transactive signals are received.

A Node State and Status Buffer has been established within the toolkit framework to ensure that it has information it may used concerning timing, transactive neighbors, and other status information concerning activities of the transactive node object.

This function interacts with cyber security subsystems. It is assumed here that authentication and other cybersecurity tests have been conducted during signal transport or upon signal receipt.

This function potentially interacts with system management if invalid signals are detected or if notifications or alerts should be conveyed through the system for any reason concerning signals that have been, or should have been, received.

This function potentially depends upon assumptions and functionality within the state transition diagrams of the transactive node state, which design is presently incomplete. It has been assumed that the transactive node state diagram has provided states where toolkit framework functionality may (or may not) be conducted. Otherwise, it has been assumed that that design of the transactive node state transitions does not encroach on the functional responsibilities of the toolkit framework.

Figure 36:
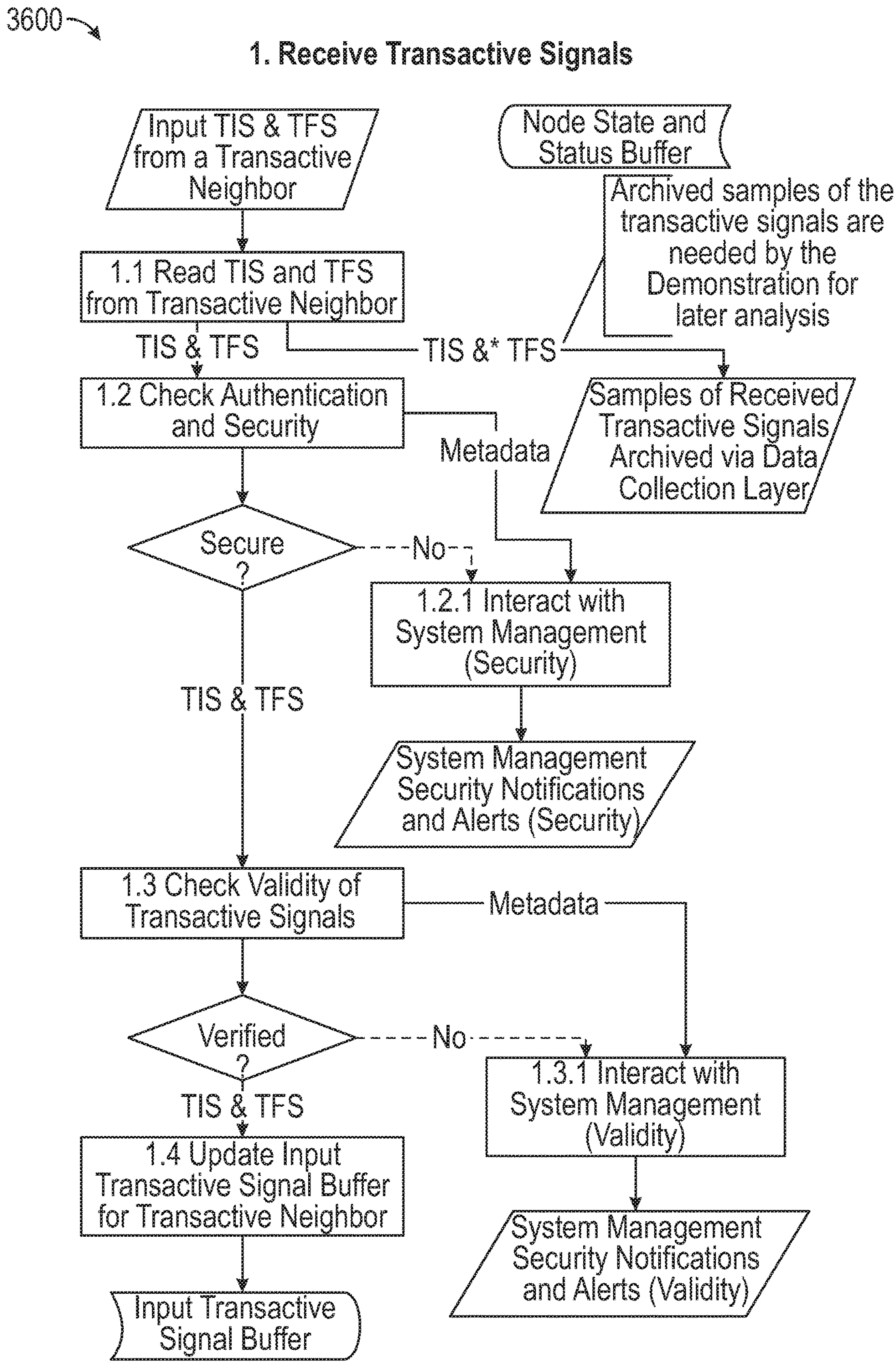
FIG. 36 is a flowchart illustrating an exemplary "receive transactive incentive signal" process.

FIG. 36 is a flowchart 3600 illustrating an exemplary receive transactive incentive signal process.

2. Calculate New Transactive Signal Intervals

Purpose:

Calculate the new interval start time (IST) time series that are attributes of the two transactive signal object types that are to be formulated and conveyed throughout the transactive control and coordination system. See SubAppendix A: Interval Start Time Series Definition for details about an example IST time series and how the series is calculated.

Applicability:

This function should be completed by transactive nodes at the update frequency. In particular implementations, an update frequency of once every 5 minutes is used, though other intervals can be used.

Sub-Functions and Sub-Processes:

The sub-function steps will be described along with this introduction to the sub-functions. Refer to SubAppendix A for additional details and examples.

2.1 Read Present Time—the present time is locally maintained at each transactive node and should be read near the beginning of each iteration. The present time and representations of time are to be maintained using the UTS standard.

2.2 Calculate First Interval Start Time $IST_0$—to calculate $IST_0$, round the present time up to the nearest 5-minute interval.

2.3 Calculate 5-Minute Intervals Start Times—to calculate $IST_2$ through $IST_{11}$, add 5 minutes to the prior IST.

2.4 Calculate 15-Minute Interval Start Times—to calculate $IST_{12}$, add 15 minutes to the prior $IST_{11}$, and round down to a 15-minute interval. To calculate the remaining 15-minute intervals $IST_{13}$ through $IST_{31}$, add 15 minutes to the prior IST.

2.5 Calculate 1-Hour Interval Start Times—to calculate $IST_{32}$, add 1 hour to the prior $IST_{31}$, and round down to a 1-hour interval. To calculate the remaining 1-hour intervals $IST_{33}$ through $IST_{49}$, add 1 hour to the prior IST.

2.6 Calculate 6-Hour Interval Start Times—to calculate $IST_{50}$, add 6 hours to the prior $IST_{49}$, and round down to a 6-hour interval. To calculate the remaining 6-hour intervals $IST_{51}$ through $IST_{53}$, add 6 hours to the prior IST.

2.7 Calculate 1-Day Interval Start Times—to calculate $IST_{54}$, add 1 day to the prior $IST_{53}$, and round down to a 1-day interval. To calculate the remaining 1-day interval $IST_{55}$, add 1 day to the prior $IST_{54}$. In certain embodiments, a final $IST_{56}$ can be appended that will unambiguously define the duration of the final interval. (The final IST does not define a new interval, it simply states the end of the last interval.)

2.8 Calculate Interval Durations from Interval Start Times—the function by which IST interval durations may be discerned from an IST time series is as follows:

2.8.1 Calculate $\Delta t_0$—Subtract $IST_1$—$IST_0$ to learn the duration of interval $\Delta t_0$ that starts at $IST_0$.

2.8.2 Tentatively Assign Remaining $\Delta t_n$—successively subtract $IST_n - IST_{n-1}$ to tentatively assign durations $\Delta t_n$. The duration of $\Delta t_{55}$ has been made unambiguous by appending $IST_{56}$, which is the end of the last interval.

2.8.3 Perform Checks—certain checks may be possible on the structure of the tentative set of IST intervals. In this formulation, both the IST times and interval durations should increase or stay the same as one progresses through the series. The tentative set of intervals should be corrected if it does not pass these local checks. The system management layer may be employed to flag, alert, or announce failed checks, but it is the each local node's responsibility alone to produce and use a correct and accurate set of IST intervals.

Inputs:

Present time (determines the first interval start time $IST_0$ for the new output transactive signals)

Outputs:

IST time series—Series of interval start times $\{IST_0, IST_1, \ldots, IST_N\}$ to be used in output TIS and output TFS stored into and available from the Current IST Series Buffer Series of IST interval durations $\{\Delta t_0, \Delta t_1, \ldots, \Delta t_N\}$ that correspond to the N+1 members of the IST series stored into and available from the Current IST Series Buffer.

Function/Process:

The process steps were described above as the sub-functions were being introduced. Refer to SubAppendix A for further details, pseudo code, and examples.

Dependencies:

The function's output is used by process 3. Formulate TIS

The function's output is used by process 4. Formulate TFS

Notes:

The need for synchronicity is low or does not exist in a transactive control and coordination system. Therefore, local time should be accurate only to within several tens of seconds. This goal should not be particularly challenging to meet. Regardless, the Demonstration has imposed requirements for and means to achieve impressive synchronicity across its system.

The IST series is an attribute of both the TIS and TFS state objects.

While the current interval start time (IST) time and interval series are most relevant to the formulation of transactive signals, many toolkit framework and toolkit library functions use access to the current IST time and interval series. The Current IST Series Buffer construct was created to make this accessibility explicit within the toolkit framework.

Figure 37:
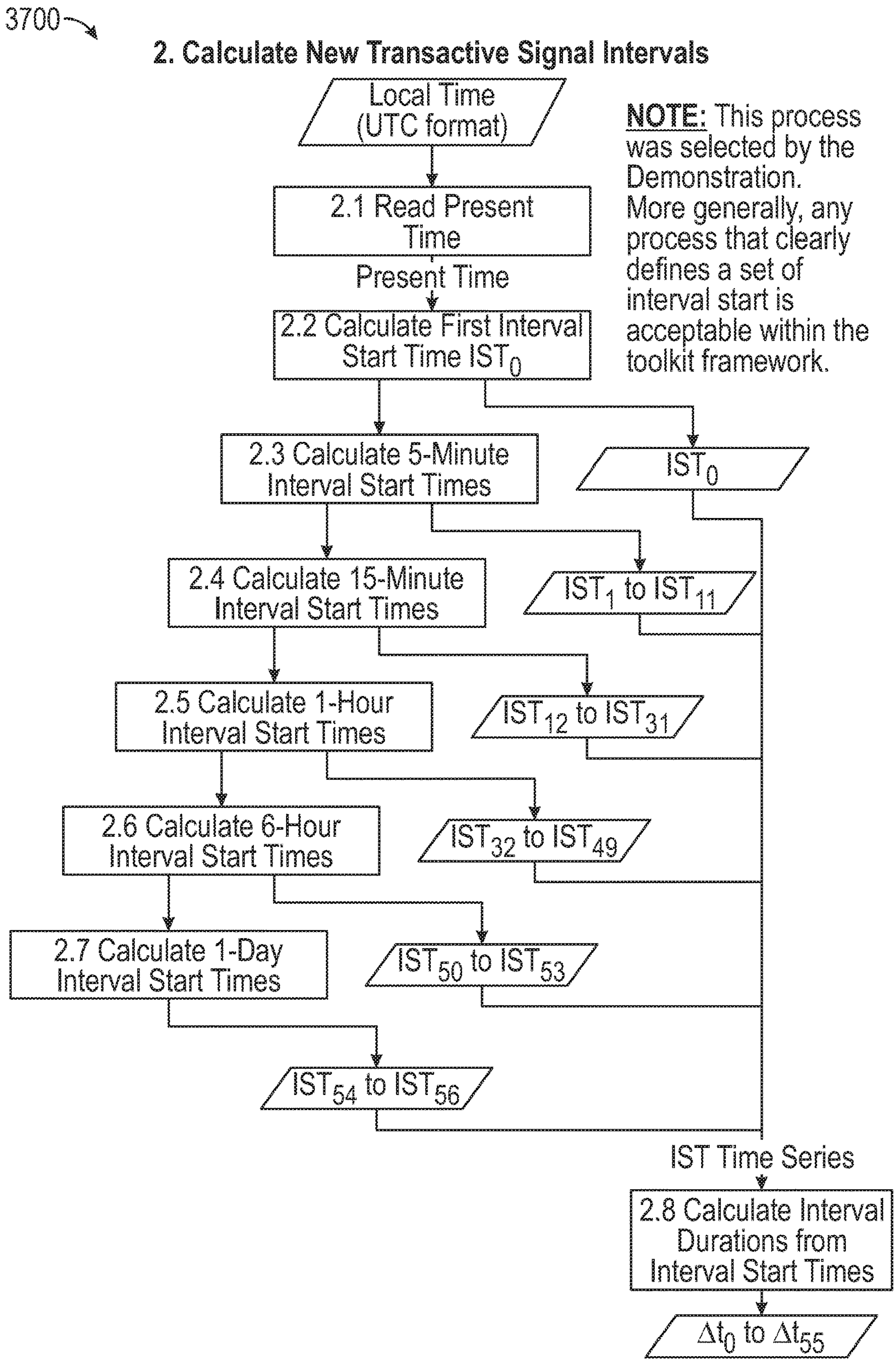
FIG. 37 is a flowchart for an exemplary "calculate new transactive signal intervals" process.

FIG. 37 is a flowchart 3700 for an exemplary calculate new transactive signal intervals process.

3. Formulate TIS

Purpose:

Process by which the TIS, one of the two transactive signals, is to be formulated at a transactive node. From its predecessors, this process receives parametric information that is used to determine how energy, capacity, infrastructure, and other influences are to be valued during formulation of the output TIS at this transactive node.

Applicability:

This process should be completed at the update frequency by transactive nodes. Some of the sub-functions and sub-processes within this process may be trivial or empty at transactive nodes where the sub-functions or sub-processes are not needed.

Sub-Functions and Sub-Processes:

3.1 Refresh Default Output TIS—simply retrieve the most recent output TIS from the Output TIS Buffer at this transactive node and refresh its time intervals by submitting it to function 3.10 Interpolate Intervals Service Functions. The resulting output TIS then returned to the Output TIS Buffer to be used by default if for any reason this transactive node does not compute a more current output TIS by the time it is used. This sub-function should be completed early during each duration. This potentially creates a race condition in software unless the update status of the buffer is maintained. Thus, in some embodiments, this should be used as a default value 3.2 Calculate Total Cost of Non-transactive Energy Generation and Imports—for each IST interval, sum the cost of imported and generated energy from sources that are not transactive neighbors at this transactive node. Examples include the costs of energy that is imported into the region from Canada, California, or other entities that are not participating in transactive control. Another example would be bulk generation from a gas generator that is dispatched in ways that are not affected by the region's transactive control and coordination system. The data that feed into this function will come from resource schedules and Incentive Toolkit Functions that are employed at this transactive node. This function becomes trivial and should not be used at transactive nodes that have neither non-transactive imports nor bulk generation.

The output from this function is the sum of products of pairs of energy costs $C_{E,a,n}$ (units: cost per energy) and average generated or imported power $\hat{P}_{G,a,n}$ (units: average power), weighted by the corresponding IST interval duration $\Delta t_n$ (units: time).

$$\sum_{a=1}^{A} C_{E,a,n} \cdot \hat{P}_{G,a,n} \cdot \Delta t_n \qquad \text{(Sub-Function3.2)}$$

3.3 Calculate Total Cost of Energy Imported from Transactive nodes—for each IST interval, sum the cost of energy that is predicted to be imported from transactive neighbors. At times when energy is to be imported from transactive neighbors, the TIS & TFS from those transactive neighbors should be treated as special cases of imported energy and treated similarly to non-transactive imported energy (e.g., they result in ($C_E$, $P_G$) pairs). The cost of energy from a transactive neighbor is that neighbor's TIS. The predicted energy to be imported from that neighbor is the neighbor's TFS at the boundary between that and this transactive node. Exported energy to transactive neighbors should be disregarded in the calculation of the TIS. (In some embodiments, information about exported energy is found in the Resource Schedules and Cost Buffer. In such embodiments, Functions 3.2 and 3.3 can filter the buffer contents to address only imported energy, in which case the Resource Schedules and Cost Buffer is a complete rich source of information for data collection concerning the outputs of Toolkit Resource and Incentive Functions that are being employed at this transactive node.) It is conceivable that a transactive node could import no energy from its transactive neighbors, but the TFS shared with the neighbors should be checked nonetheless. (The prediction of energy to be exchanged to or from a transactive neighbor can be predicted by both neighbors, by one of the neighbors, or some other combination.)

As for sub-function 3.2, the output from this function will continue the sum of products of pairs of energy costs $C_{E,a,n}$ (TIS) (units: cost per energy) and average generated or imported power $\hat{P}_{G,a,n}$ (TFS) (units: average power), weighted by the corresponding IST interval duration $\Delta t_n$ (units: time).

$$\sum_{a=1}^{A} C_{E,a,n} \cdot \hat{P}_{G,a,n} \cdot \Delta t_n \qquad \text{(Sub-Function3.3)}$$

3.4 Calculate Total Capacity Cost/Incentive—for each IST interval, sum the costs that are functions of a capacity. Constraints and demand charges are examples. These are expected to be very non-linear, but they will nonetheless be represented by a capacity cost and the capacity to which they apply. This function may be trivial or empty at transactive nodes where no capacity costs or incentives are to be included in the output TIS.

The output from this sub-function is the sum of products of pairs of capacity costs $C_{C,b,n}$ (units: cost per power capacity) and average power capacity $\hat{P}_{C,b,n}$ (units: average power) for each respective IST interval n.

$$\sum_{b=1}^{B} C_{C,b,n} \cdot \hat{P}_{C,b,n} \qquad \text{(Sub-Function3.4)}$$

3.5 Calculate Total Infrastructure Cost/Incentive—for each IST interval, sum the infrastructure (e.g., time-based) costs that should be applied during the interval. This function may be trivial or empty at transactive nodes where no infrastructure costs or incentives are to be included in the output TIS.

The output from this sub-function is the sum of products of pairs of infrastructure costs $C_{I,c,n}$ (units: cost per time) and the respective interval duration $\Delta t_n$ (units: time).

$$\sum_{c=1}^{C} C_{I,c,n} \cdot \Delta t_n \qquad \text{(Sub-Function3.5)}$$

3.6 Calculate Total Other Cost/Incentive—for each IST interval, sum those influences that cannot be described by the energy, capacity, and infrastructure functions. (Other Cost/Incentive functions are desirably used infrequently for influences that cannot be described with the other functions. The representation of cost by this function should still be a defensible cost of delivered energy and will be subject to comparison against other cost accountings over relatively long time periods.) This function may be trivial or empty at transactive nodes where no other costs or incentives are to be included in the Output TIS.

The output from this sub-function is the sum of "Other" costs $C_{O,d,n}$ (units: cost).

$$\sum_{d=1}^{D} C_{O,d,n} \qquad \text{(Sub-Function3.6)}$$

3.7 Calculate Output TIS—a simple parametric function that combines outputs from above functions to complete calculation of the Output TIS for this transactive node. The sums completed by five other sub-functions appear in this sub-function. Details about this function are expanded upon in the Section 3.7 Details about the Calculate Output TIS Function.

$$TIS_n = \frac{\sum_{a=1}^{A} C_{E,a,n} \cdot \hat{P}_{G,a,n} \cdot \Delta t_n + \sum_{b=1}^{B} C_{C,b,n} \cdot \hat{P}_{C,b,n} + \sum_{c=1}^{C} C_{I,c,n} \cdot \Delta t_n + \sum_{d=1}^{D} C_{O,d,n}}{\sum_{a=1}^{A} \hat{P}_{G,a,n} \cdot \Delta t_n} \qquad \text{(Sub-Function3.7)}$$

3.8 Calibrate/Normalize TIS—algorithm by which the output TIS are to be compared against and perhaps made to track other cost accounting methods. If the calculation of a TIS is meaningful as the delivered cost of electrical energy, it should track other reasonable accountings of the delivered cost of electrical energy over relatively long periods of time. In some embodiments, this is a general requirement on the TIS. This general requirement may be enforced by a bias input that will force the TIS to track other less dynamic accountings and thereby correct the TIS.

3.9 Interpolate Intervals Service Functions—parse energy and costs from coarse intervals into multiple sub-intervals. This function is necessary because the set of IST intervals to be used by the output TIS will have divided some prior intervals into sub-intervals. This function is a service function that is called as often as it is desired. The objects TIS and TFS may simply be replicated for each sub-interval. (While many complex methods may evolve to interpolate and assign costs and average power to sub-intervals, in certain embodiments of the disclosed technology, the cost and average power from an interval are assigned to its sub-intervals.)

Inputs:

Energy cost, scheduled/committed non-transactive energy pairings for each non-transactive generation or import resource at a time interval $$(\text{IST}^*_n, \Delta t^*_n, (C_{E,1,n}, \hat{P}_{G,1,n}), (C_{E,2,n}, \hat{P}_{G,2,n}), \ldots, (C_{E,a,n}, \hat{P}_{G,a,n}), \ldots, (C_{E,A,n}, \hat{P}_{G,A,n})),$$

where n is a time interval of the TIS numbered from 0 to 55; $\text{IST}_n$ is interval start time n in a series of interval start times; $\Delta t_n$ is the duration of interval n; $C_{E,a,n}$ is the energy cost term (e.g., units \$/kWh, like the TIS) of the scheduled generation or import resource a for IST interval n, and $\hat{P}_{G,a,n}$ is the average generated or imported power from generation or import resource a during time interval n. Its units are the same as for TFS (e.g., average power). (The asterisk indicates that this series of Interval Start Times and durations will likely differ from those that have been calculated to be used with the Output TIS and Output TFS. The function 3.10 Interpolate Intervals Service will sort this out for the inputs into the other sub-functions. See, e.g., Figure C-4.)

Input TIS and input TFS pairings from each transactive node neighbor for each time interval $$(\text{IST}^*_n, \Delta t^*_n, (\text{TIS}_{1,n}, \text{TFS}_{1,n}), (\text{TIS}_{2,n}, \text{TFS}_{2,n}), \ldots, (\text{TIS}_{j,n}, \text{TFS}_{j,n}), \ldots, (\text{TIS}_{J,n}, \text{TFS}_{J,n})),$$

where $\text{TIS}_{j,n}$ and $\text{TFS}_{j,n}$ are the input transactive signals from transactive node neighbor j during time interval n. This input should be considered a special case of the input described in the preceding bullet. (At times that energy is predicted to be imported from a transactive neighbor, the corresponding TIS and TFS are special cases of $C_{E,a,n}$ and $P_{G,a,n}$ and will be treated very much the same.)

Interval start time series $$\{IST_0, IST_1, \ldots, IST_N\}$$

and interval duration series $$\{\Delta t_0, \Delta t_1, \ldots, \Delta t_N\}$$

to be used for Output TIS and Output TFS. (These notations do not have asterisks because they are final intervals to be used in the output transactive signals after this iteration.) In FIG. 4, the Interval Start Time Series is shown as an input to the function 3.10 Interpolate Intervals Service, which have the responsibility to resolve any discrepancies between various representations of intervals.

Energy term(s) $C_E$ from applicable incentive toolkit functions, if any. (Energy terms $C_E$ have the same usage and interpretation regardless of whether they are used inside or outside a Toolkit Incentive Function. This term accounts for costs that are roughly proportional to an amount of energy that is being generated or imported into a transactive node's boundary.) The format should be identical to that stated above for non-transactive energy pairings.

Average Power terms(s) $\hat{P}_G$ from applicable incentive toolkit functions, if any. (The average power terms are used similarly regardless of whether they are used in or outside a Toolkit Incentive Function. These terms are an accounting of the average power that is either generated within our imported into a transactive node boundary.) The format should be identical to that stated above for non-transactive energy pairings.

Capacity term(s) $C_C$ from applicable Incentive toolkit functions, if any, applicable at each IST interval $$(IST^*_n, \Delta t^*_n, (C_{C,1,n}, \hat{P}_{C,1,n}), (C_{C,2,n}, \hat{P}_{C,2,n}), \ldots, (C_{C,b,n}, \hat{P}_{C,b,n}), \ldots, (C_{C,B,n}, \hat{P}_{C,B,n})),$$

where $C_{C,b,n}$ is the cost to be applied to capacity cost item b paired with the capacity $\hat{P}_{C,b,n}$ to which it applies, and $\hat{P}_{C,b,n}$ is the average power capacity for capacity cost item b to be multiplied by capacity cost $C_{C,b,n}$ for IST interval n.

Infrastructure term(s) $C_I$ from applicable incentive toolkit functions, if any $$(IST^*_n, \Delta t^*_n, C_{I,1,n}, C_{I,2,n}, \ldots, C_{I,c,n}, \ldots, C_{I,C,n}),$$

where $C_{I,c,n}$ is the infrastructure term c for the IST interval n.

Other term(s) $C_O$ from applicable Incentive toolkit functions, if any, for each IST interval $$(IST^*_n, \Delta t^*_n, C_{O,1,n}, C_{O,2,n}, \ldots, C_{O,d,n}, \ldots, C_{I,D,n}),$$

where $C_{O,d,n}$ is the "Other" influence term d for IST interval n.

Exemplary alternative cost accounting(s) for use by function 3.9 Calibrate/Normalize TIS. Examples include wholesale energy costs for the same energy or utility expenses.

Interim Calculation Products:

Total Cost of Non-transactive Energy Imports

Total Cost of Non-transactive Energy Generation

Total Cost of Energy Imported from Transactive neighbors

Total Capacity Cost/Incentive

Total Infrastructure Cost/Incentive

Total Other Cost/Incentive

Total Cost

Total Energy Imported or Generated

Additionally, interim calculations may be used to represent prior interval information in terms of the new IST time series and interval durations that are to be used by the Output TIS.

Outputs:

New "Updated" Output TIS at this transactive node.

Function/Process:

Each of the sub-functions/sub-processes should be defined, but sub-function 3.8 Calculate Output TIS defines the parametric calculation of the output TIS from the energy, capacity, infrastructure, and other parameters and how the parameters are to be applied. The implementer who understands sub-function 3.8 Calculate Output TIS will have the insight to formulate toolkit functions and will have considerable flexibility in the way such toolkit functions are formulated.

Dependencies:

Uses input of new IST time series from process 2. Calculate New Transactive Signal Intervals Uses input of TIS and TFS from at least one transactive neighbor via process 1. Receive Transactive Signals Process inputs may come from Calculate Applicable Toolkit Incentive Functions Process inputs may come from Resource Schedules and Cost Buffer.

Output TIS from this process is used by process 7. Send Transactive Signals.

Output TIS from this process may be used by Calculate Applicable Toolkit Response Functions dP(TIS,OLC) if this transactive node owns responsive assets.

Notes:

Each transactive node produces one and only one TIS for itself for each 5-minute update iteration.

The TIS itself is a time series that expresses the delivered cost of energy into the future about 3 days, or so, as is defined by the IST time series.

Figure 38:
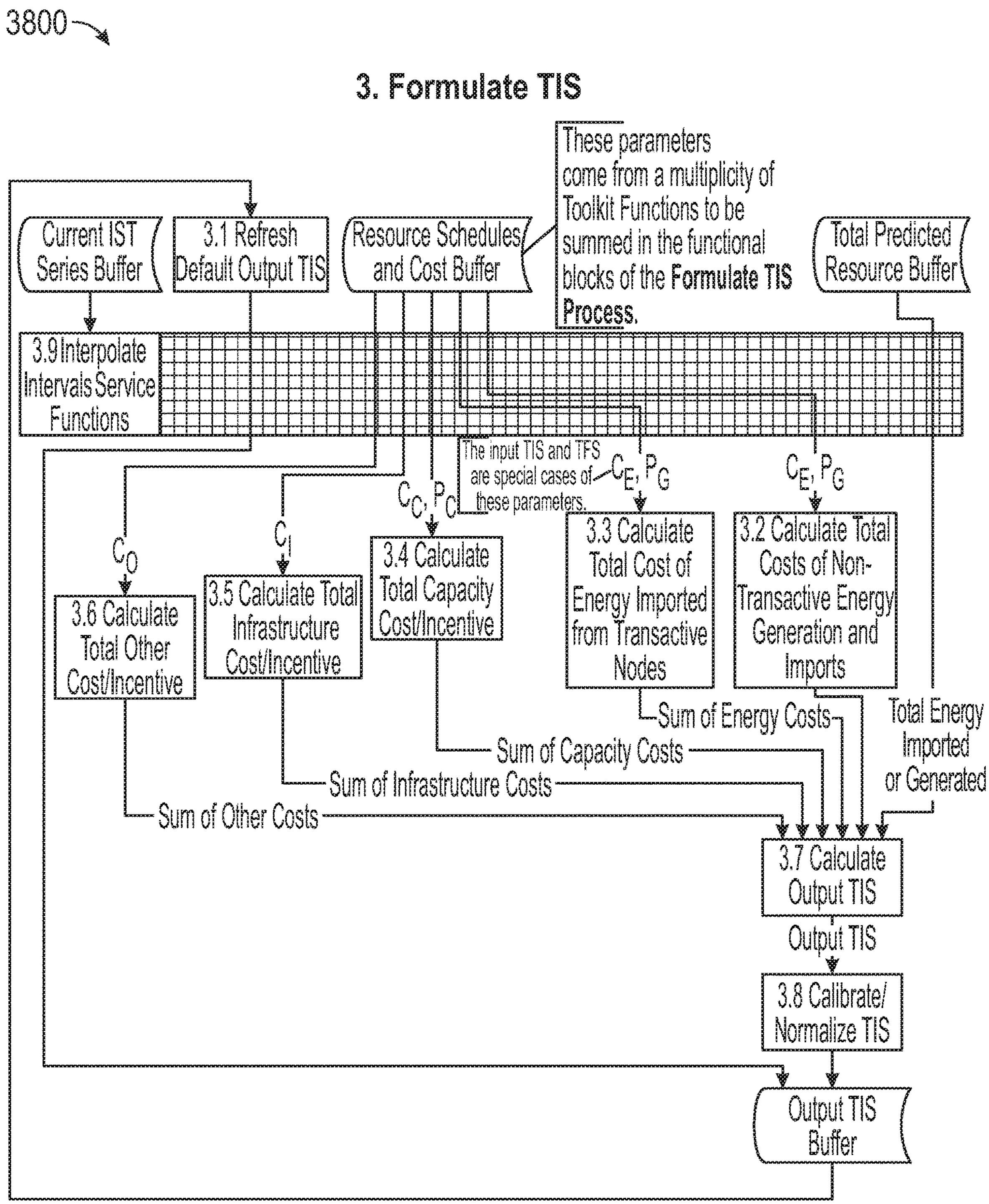
FIG. 38 is a flowchart illustrating an exemplary "formulate TIS" process.

FIG. 38 is a flowchart 3800 illustrating an exemplary formulate TIS process.

Details about the Function 3.7 Calculate Output TIS

Purpose:

Describes the final parametric calculation of the output TIS. This sub-function consists of a simply stated function of the sum products of other sub-functions 3.2 through 3.7. This sub-function creates a level of standardization that will help ensure that the TIS at distributed points in a transactive control and coordination system are defensible representations of the "delivered cost of energy."

Applicability:

A sub-function of 3. Formulate TIS Process that should be calculated at the update frequency at transactive nodes.

Sub-Functions and Sub-Processes:

None. This is a simple arithmetic function of sums that have been calculated by sub-functions 3.2 through 3.7.

Inputs:

Summed cost of energy terms $$\sum_{a=1}^{A} C_{E,a,n} \cdot \hat{P}_{G,a,n} \cdot \Delta t_n \quad \text{(Sub-Function3.2 and3.3)}$$

from sub-functions 3.2 Calculate Total Cost of Non-Transactive Energy Generation and Imports and 3.3 Calculate Total Cost of Energy Imported from Transactive nodes Summed cost of capacity terms $$\sum_{b=1}^{B} C_{C,b,n} \cdot \hat{P}_{C,b,n} \quad \text{(Sub-Function3.4)}$$

from sub-function 3.4 Calculate Total Capacity Cost/Incentive

Summed cost of infrastructure terms $$\sum_{c=1}^{C} C_{I,c,n} \cdot \Delta t_n \quad \text{(Sub-Function3.5)}$$

from sub-function 3.5 Calculate Total Infrastructure Cost/Incentive

Summed other costs $$\sum_{d=1}^{D} C_{O,d,n} \quad \text{(Sub-Function3.6)}$$

from sub-function 3.6 Calculate Total Other Cost/Incentive

Summed energy $$\sum_{a=1}^{A} \hat{P}_{G,a,n} \cdot \Delta t_n \quad \text{(Function10)}$$

that is predicted to be imported and/or generated at this transactive node as has been calculated in function 10. Sum Total Predicted Resource.

Outputs:

One current output TIS time series for this transactive node

Function/Process:

This sub-function simply adds the individual cost summations from sub-functions 3.2, 3.3, 3.4, 3.5, and 3.6 and divides that sum by the total energy that is imported into or generated within the boundaries of this transactive node as was summed by sub-function 3.7:

$$\frac{\sum_{a=1}^{A} C_{E,a,n} \cdot \hat{P}_{G,a,n} \cdot \Delta t_n + \sum_{b=1}^{B} C_{C,b,n} \cdot \hat{P}_{C,b,n} + \sum_{c=1}^{C} C_{I,c,n} \cdot \Delta t_n + \sum_{d=1}^{D} C_{O,d,n}}{\sum_{a=1}^{A} \hat{P}_{G,a,n} \cdot \Delta t_n}, \text{ or} \quad \text{(Sub-Function3.7)}$$

$$TIS = \frac{\text{energy cost} + \text{capacity cost} + \text{infrastructure cost} + \text{other costs}}{\text{Energy}}$$

The function shown above for interval n should be performed for all intervals that are to be used by the Demonstration for its transactive signals.

Dependencies:

Will use sub-function 3.10 Interpolate Intervals Service Functions to convert intervals of inputs into those of the updated IST time series that is to be used by the output TIS.

The output TIS produced by this sub-function is one of the two transactive signals that function 7. Send Transactive Signals will act upon and send.

Notes:

This function assumes that intervals have been aligned and modified to be consistent with the new IST intervals that were determined by process 2. Calculate New Transactive Signal Intervals. If that is not the case, the sub-function 3.10 Interpolate Intervals Service Functions should be applied until inputs to this sub-function have been stated in terms of the IST intervals for which the output TIS will be produced.

If properly formulated, the units of TIS will be cost per energy. Dimensional unit analysis is a candidate component for conformance testing to be performed on any implementation that follows this toolkit framework.

4. Formulate TFS

Purpose:

Formulate one current transactive feedback signal (TFS) for the electrical interface between this transactive node and each of its transactive neighbors.

Applicability:

This process should be completed at the update frequency by transactive nodes.

Sub-Functions and Sub-Processes:

4.1 Interpolate Intervals Service Functions—function, or set of functions, by which the inputs to this process may be restated using the current interval start time (IST) series. If input time series are found to use dated time intervals or any other representation of future intervals other than the current IST series, this function should be called until the dissimilarities are resolved. This function should also be called early during an update interval iteration to create updated, default versions of a recent prior transactive feedback signals (TFS) that may be used if, for any reason, this transactive node fails to formulate a TFS by the time it is used.

4.2 Predict Net Resource Surplus or Shortage—take the difference between total resource from A resources and total load supplied by this transactive node to determine the net surplus or shortage for each future interval n. The net surplus or shortage is the average power over an interval that should be sent to or received from transactive neighbors during that interval—an imbalance anticipated to occur at this transactive node. Therefore, the net surplus or shortage should equal the sum of all changes to the TFS for each interval at this transactive node.

$$\sum TFS_n = \sum_{a=1}^{A} \hat{P}_{G,a,n} - \sum \hat{L}_n \quad \text{(Sub-Function4.2)}$$

Total average load at each interval $\Sigma\hat{L}_n$ is a calculated input that should be retrievable from the Predicted Inelastic and Elastic Load Buffer. The total resource $$\sum_{a=1}^{A} \hat{P}_{G,a,n}$$

is a calculation available from the Total Predicted Resource Buffer, a product of 10. Sum Total Predicted Resource. (Desirably, there is a connection between this calculated imbalance and resource planning.)

4.3 Disaggregate Net Resource Surplus or Shortage—allocate the net resource surplus or shortage among this transactive node's transactive neighbors by formulating or modifying the TFS for each such interface. The newly formatted TFS are then stored into the Output TFS Buffer.

Today, this prediction would rely on centralized power-flow solvers. In a fully distributed system, however, new prediction tools can be used.

This transactive node object should supply to this sub-function the current list of transactive neighbors for which TFS should be calculated. It may also provide simple ratios or detailed topological information that can be used eventually to predict load flow between this transactive node and its transactive neighbors, e.g., TFS series. Current information about the transactive node object is assumed to be available from a Node State and Status Buffer.

4.4 Refresh Default Output TFS—early during each IST update interval, this process should refresh the last calculated versions of TFS found in the Output TFS Buffer and restate them using the current IST series. Thereafter, the restated, refreshed TFS may be returned to the buffer and used as default values if, for any reason, this transactive node should fail to formulate the current TFS by the time they are used.

Inputs:

Predicted total load supplied $\Sigma\hat{L}_n$ at each future interval n of the current IST series from the Predicted Inelastic and Elastic Load Buffer Predicted total resource $$\sum_{a=1}^{A} \hat{P}_{G,a,n}$$

at each future interval n of the current IST series. (This is now calculated by a sub-function of this process, but it can be made available from a common buffer of the toolkit framework.) This input should be available from the Total Predicted Resource Buffer.

Information from this transactive node object concerning its transactive neighbors that should expect to receive a TFS from this transactive node, available from the Node State and Status Buffer.

Information from this transactive node's object that will be used to allocate, or disaggregate, the net surplus or shortage among the TFS that are to be stated form each transactive neighbor, available from the Node State and Status Buffer.

The current IST series available from the Current IST Series Buffer.

Outputs:

One output TFS for each transactive neighbor stored into and available from the Output TFS Buffer.

Function/Process:

Refer to the descriptions of the sub-functions above as the sub-functions were being introduced.

Dependencies:

This process formulates one of two transactive signal types that should be available from the Output TFS Buffer to be conveyed by this transactive node to its transactive neighbors at the update frequency by 7. Send Transactive Signals.

This process expects that the current IST series will have been created by 2. Calculate New Transactive Signal Intervals and available from the Current IST Series Buffer.

This process expects that the current sum total load will have been calculated by function 5. Sum Total Predicted Load and available from the Predicted Inelastic and Elastic Load Buffer.

This process expects that the total predicted resource will have been calculated by function 10. Sum total Predicted Resource.

Notes:

The TFS is indeed a feedback signal, but the transactive control and coordination system is not a closed-loop feedback control system in the classical sense. First, the magnitude of resource from responsive asset systems is too small for us to expect closed-loop control. Second, the TIS is decidedly grounded as a meaningful delivered cost of energy, not free to represent large incentive swings as could a local marginal price. There is weak or no integral control in the system.

The transactive feedback signal (TFS) may not be as dynamic and useful as the transactive incentive signal (TIS) will be. The TFS will be affected by a relatively small fraction of responsive asset systems at places throughout the transactive control and coordination system. Transmission and generation entities are unengaged by the project's scale and are therefore unresponsive to changes that will be observed in the TFS.

Figure 39:
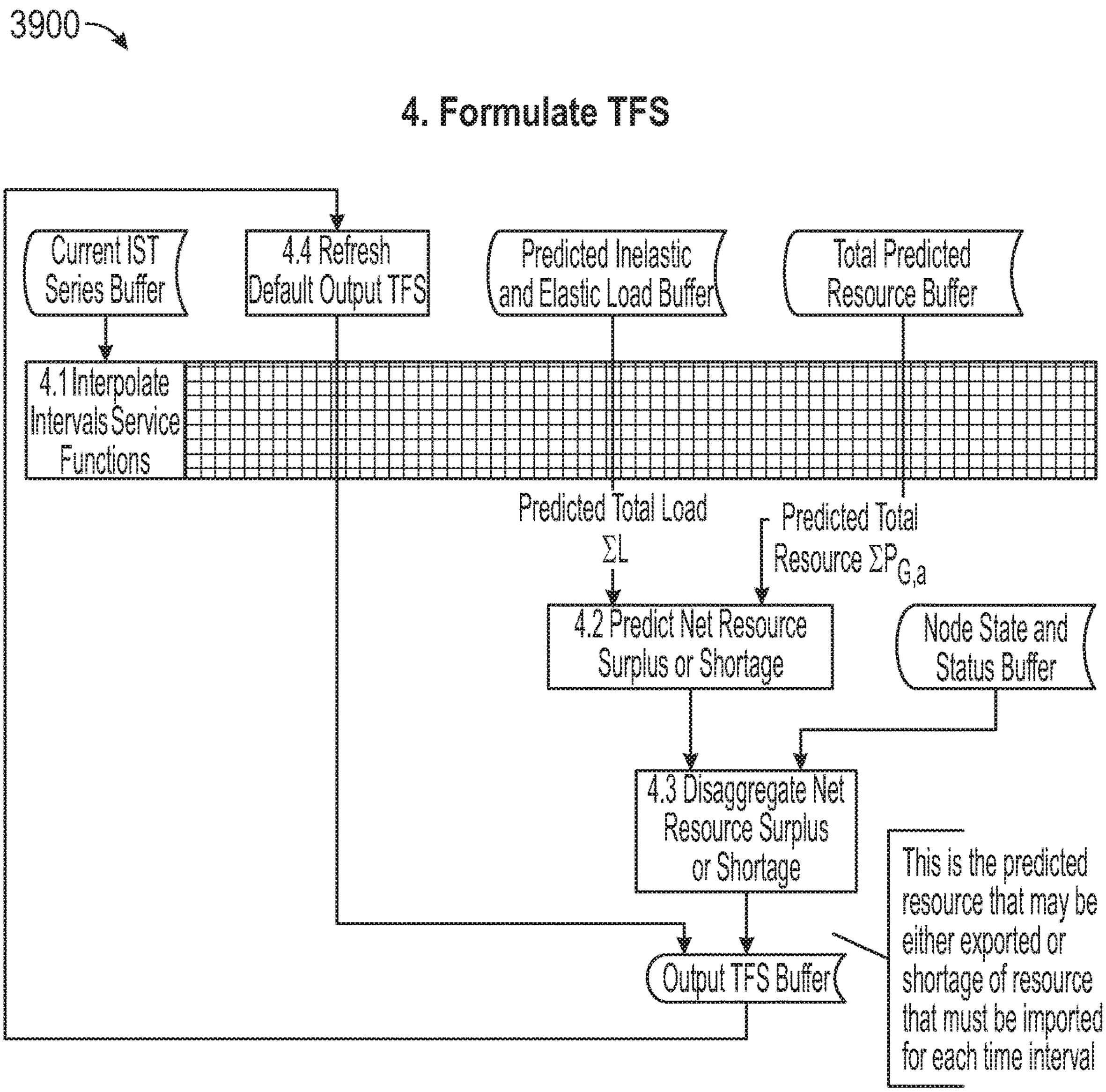
FIG. 39 is a flowchart of an exemplary "formulate TFS" process.

FIG. 39 is a flowchart 3900 of an exemplary formulate TFS process

5. Sum Total Predicted Load

Purpose:

Process to add the total inelastic (non-transactive) and elastic (transactive) electrical load components being supplied within the boundaries of this transactive node. (In the illustrated embodiment, electrical energy that is to be exported outside the boundaries of a transactive node is not part of this sum.)

Applicability:

This function applies to transactive nodes and should be updated at the update frequency; however, this process becomes trivial for transactive nodes that supply no elastic electric load, no inelastic electric load, or neither elastic nor inelastic electric load within the boundaries of the transactive node.

Sub-Functions and Sub-Processes:

5.1 Interpolate Intervals Service Functions—suite of functions that may be called upon should any inputs to this function note yet exist using the current set of interval start times that should be available from the Current IST Series Buffer.

5.2 Sum Inelastic Load—sums the entries in the Inelastic Load Prediction Buffer that are relevant to the current update interval iteration.

The Inelastic Load Prediction Buffer may (or may not) have a multiplicity of relevant entries that should be summed. For example the buffer might possess a bulk load prediction that is simply based on historical trends over the past week, the inelastic prediction for a large water heater responsive asset system, and the inelastic prediction for a voltage-response asset. (In certain embodiments, care should be taken not to double count any of the load as this sum is taken.) For each of this component addends k, the buffer should possess a relatively current entry $L_{inelastic,k}$.

Each entry should state average load (unit: average power) to be consumed (or generated) by it during each of a series of intervals.

If an entry from the buffer is found to have intervals other than those in the current IST series, function 5.1 Interpolate Interval Service Functions should be called upon to resolve the discrepancy and restate the entry contents using the current IST interval set.

Ideally, all current, relevant contents of the buffer will be evident from the entries' interval start time $IST_0$ time. Preferably, the buffer contents that are to found and summed by this sub-function for each iteration should be attributes of this transactive node, knowable from the contents of the Node State and Status Buffer.

The output product of this sub-function is a single time series $\Sigma L_{inelastic,n}$ that has summed components k.

5.3 Sum Change in Elastic Load—sums the entries in the Toolkit Response Function Output Buffer that are relevant to the current update interval iteration. If toolkit functions have been employed for responsive asset systems at this transactive node, one or more entries will be found in the buffer to be summed in this sub-function. Note that only the change in elastic load is to be found in the buffer and summed for each interval start time interval by this sub-function. For each of this component addends j, the buffer should possess a relatively current entry $\Delta L_{elastic,j}$. Each entry should state the change in average load (unit: average power) it predicted to be consumed (or generated) by it during each of a series of intervals.

If an entry from the buffer is found to have intervals other than those in the current IST series, function 5.1 Interpolate Interval Service Functions should be called upon to resolve the discrepancy and restate the entry contents using the current IST interval set.

As was the case for sub-function 5.3 above, the contents of the buffer that are to found and summed by this sub-function for each iteration should be an attribute of this transactive node, knowable from the contents of the Node State and Status Buffer.

The output product from this sub-function is a single time series $\Sigma\Delta L_{elestic,n}$ that has summed components j.

5.4 Sum Total Inelastic and Change in Elastic Load—function by which total inelastic load predictions and predicted changes in elastic load are finally summed to calculate a total to be placed into the Predicted Total Inelastic and Elastic Load Buffer. This function completes the simple arithmetic sum $$\Sigma L_{total,n}=\Sigma L_{inelastic,n}+\Sigma\Delta L_{elestic,n}, \quad \text{(Function 5.)}$$

where $\Sigma L_{total,n}$ is the sum of total inelastic load $\Sigma L_{inelastic,n}$ and total change in elastic load $\Sigma\Delta L_{elastic,n}$ for IST interval n at this transactive node.

5.5 Refresh Predicted Total Inelastic and Elastic Load—succeeding calculations will expect that the predicted total inelastic and elastic load will be available according to current IST intervals. Therefore, early in each update interval interation, the most current representation of that sum should be located within the Predicted Total Inelastic and Elastic Load Buffer and subjected to function 5.1 Interpolate Intervals Service Functions to recast the buffer contents into a default buffer entry that uses the current set of interval start times (IST). If for any reason this transactive node fails to later update its prediction of the sum into the buffer, the default value may be used instead.

Inputs:

Set of predicted inelastic load $\{L_{inelastic,1}, L_{inealstic,2}, \ldots, L_{inelastic,k}, \ldots, L_{inelastic,K}\}$ for each of the K components of total inelastic load, each of which predicts average load (units: average power) for interval start time interval n. This set of entries should be found from within the Inelastic Load Prediction Buffer.

Set of predicted changes to elastic load $\{\Delta L_{elastic,1}, \Delta L_{ealstic,2}, \ldots, \Delta L_{elastic,j}, \ldots, \Delta L_{elastic,J}\}$ for each of the J components of total change in elastic load, each of which predicts change in average load (units: average power) for interval start time interval n. This set of entries should be found from within the Toolkit Response Function Output Buffer.

Current interval start time (IST) series from the Current IST Series Buffer

List of those members of the Inelastic Load Prediction Buffer, if any, which are expected to be found and used by this process, which list should be obtained from attributes of this transactive node found in the Node State and Status Buffer.

List of those members of the Toolkit Response Function Output Buffer, if any, which are expected to be found and used by this process, which list should be obtained from attributes of this transactive node found in the Node State and Status Buffer.

Outputs:

Total predicted load $L_{total,n}$ for each of the current IST intervals to be stored into the Predicted Inelastic and Elastic Load Buffer.

Function/Process:

The steps of this process were stated above with the introductions of sub-functions. Overall, the process completes the simple arithmetic sum $$\Sigma L_{total,n}=\Sigma L_{inelastic,n}+\Sigma\Delta L_{elestic,n}, \quad \text{(Function 5)}$$

where $\Sigma L_{total,n}$ is the sum of total inelastic load $\Sigma L_{inelastic,n}$ and total change in elastic load $\Sigma\Delta L_{elastic,n}$ for IST interval n at this transactive node.

Dependencies:

Should call upon current inelastic load predictions from the Inelastic Load Prediction Buffer having been updated frequently by process 6. Predict Applicable Inelastic Load using Trends/Models.

For those transactive nodes that have responsive asset systems and therefore employ toolkit functions, this function expects that current predictions of changes in elastic load are available from the Toolkit Response Function Output Parameter Buffer having been updated frequently by process Calculate Applicable Toolkit Response Function(s).

The output from this function is an input to process 4. Formulate TFS.

Notes:

If the prediction of current total elastic and inelastic load components cannot be calculated promptly by the time they are used by the transactive node, prior calculations from the Predicted Inelastic and Elastic Load Buffer should be used by process 4. Formulation TFS.

It would be ideal if inputs into and outputs from this function were properly formatted using the current interval start time series (IST) that should exist in the Current IST Series Buffer. Keeping the current outputs of functions and processes aligned with the current IST series will greatly simplify later successive calculations. If that cannot be accomplished, interpolation service functions should be called upon.

Implementers might choose to have this process additionally interact with the system management layer. If, for example, this transactive node fails to update its load predictions and therefore uses default, buffered estimates, such events might be counted and/or flagged to initiate notifications or alerts. Such a capability would be nice to have, but it is probably not an essential part of the toolkit framework. System management for this process would serve business entities that are relevant to the "generic" system implementation.

Figure 40:
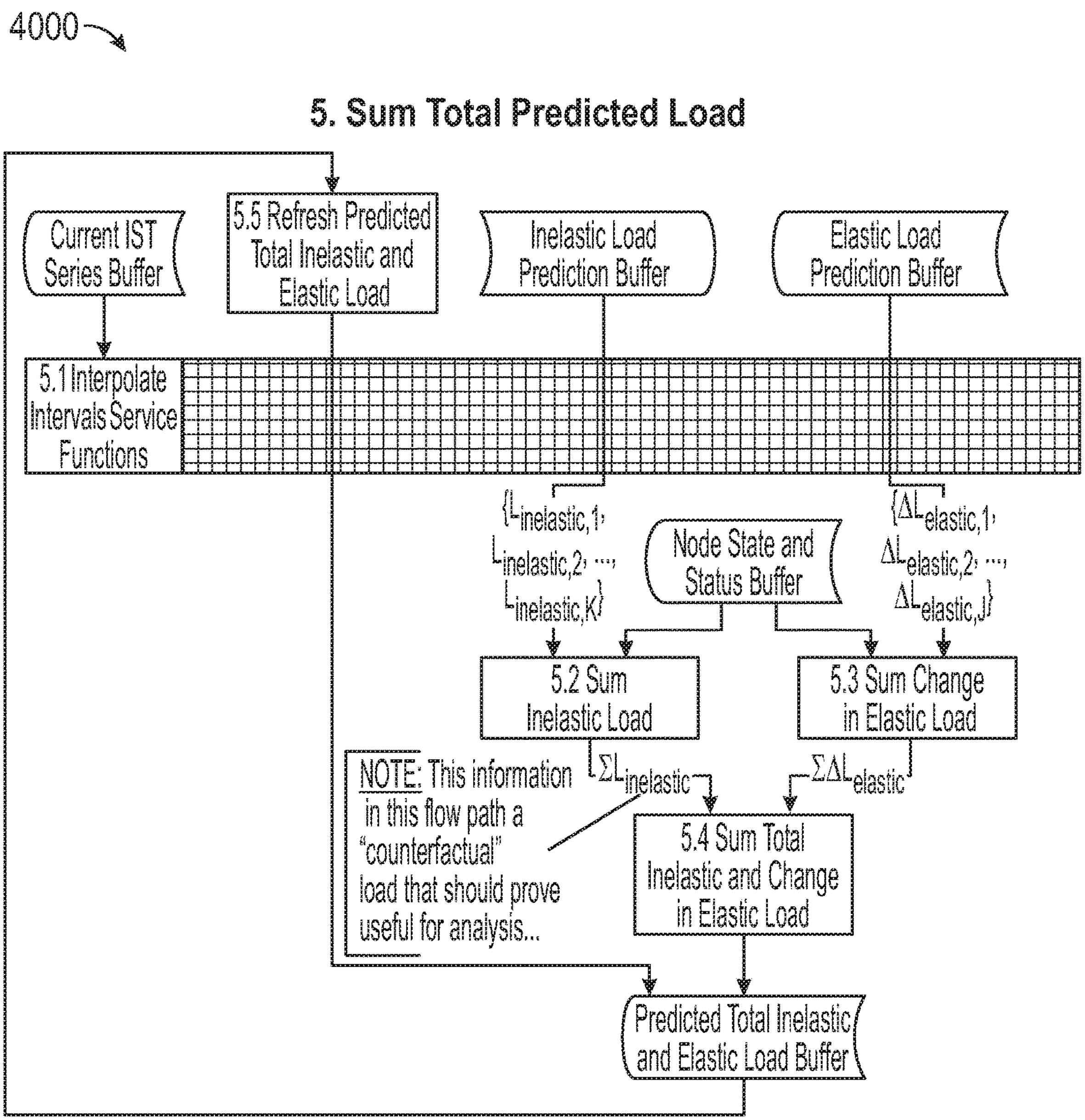
FIG. 40 is a flowchart of an exemplary "sum total predicted load" process.
Figure 41:
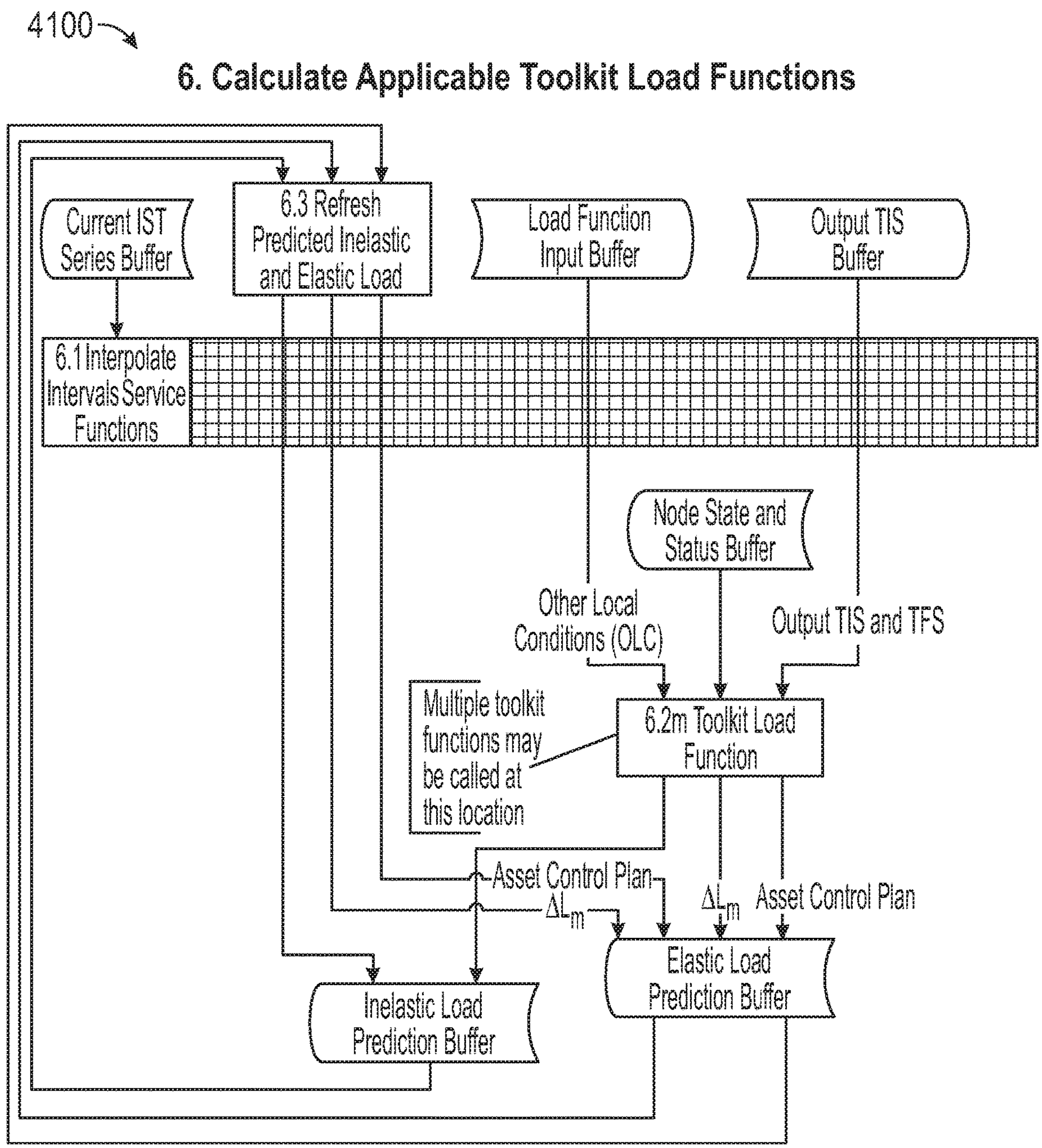
FIG. 41 is a flowchart of an exemplary "calculate applicable toolkit load functions" process
Figure 42:
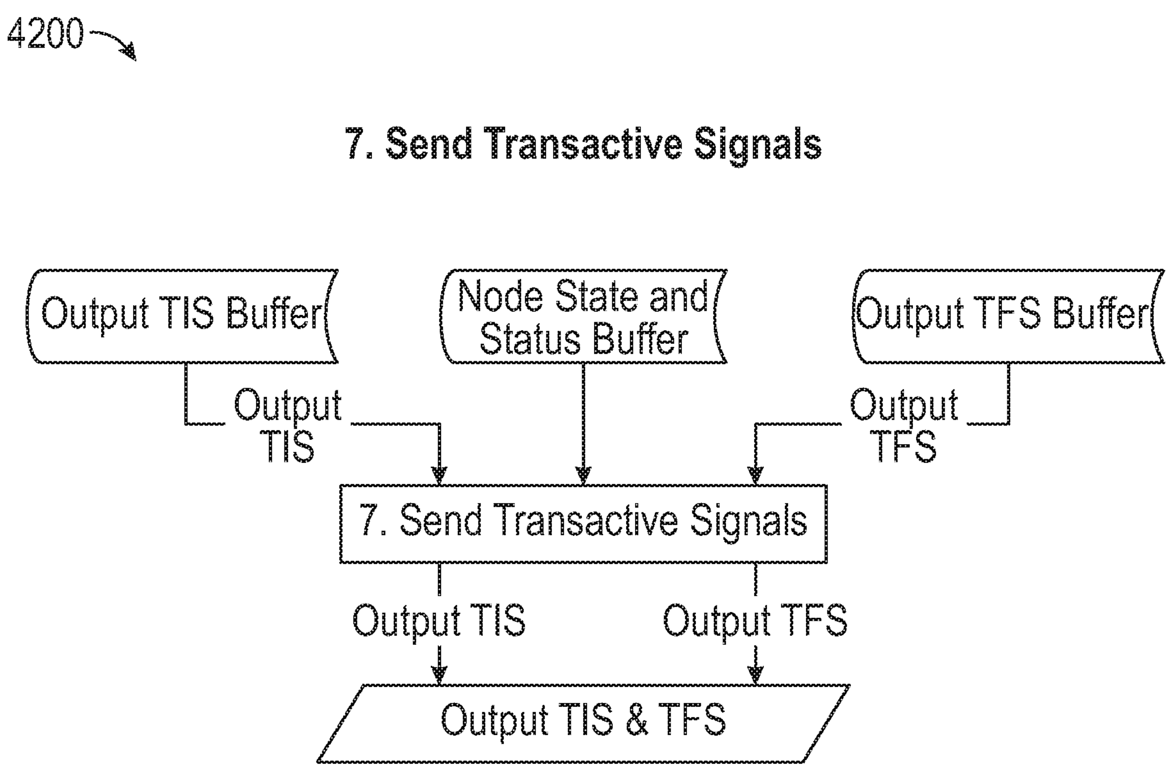
FIG. 42 is a flowchart of an exemplary "send transactive signals" process.

FIG. 40 is a flowchart 4000 of an exemplary sum total predicted load process.

6. Calculate Applicable Toolkit Load Functions

Purpose:

This process block represents from zero to many specific toolkit library functions that may be incorporated into the toolkit framework here. The toolkit functions that become instantiated at this location should represent and predict elastic and inelastic loads and should result in a reasonably complete and accurate prediction of the entire load that is supplied within the boundaries of this transactive node during each IST interval.

Most generally, these toolkit functions may be characterized by their inputs and outputs and by their generalized functional responsibilities within the toolkit framework. A template is developed for the specification of toolkit functions (see SubAppendix B). Owners of transactive nodes, who represent the unique perspective under which this transactive node should be managed, should select and/or help create specific toolkit function(s) that model the responsive asset systems and inelastic loads that they have or plan to implement. See Table 25 for an example list of toolkit load functions.

Modular toolkit functions may be implemented and shared via combinations of their functional descriptions, pseudo code implementations, and reference code, all of which are recommended components of the recommended toolkit function template.

The location of this block within the toolkit framework is intended for toolkit functions that predict the behaviors of two different types of loads:

- responsive asset system—an elastic load m for which its toolkit function predicts both its inelastic load component $L_m$ and a change in elastic load $\Delta L_m$ using the current output TIS and often other local conditions as inputs.
- inelastic load—other inelastic load component for which its toolkit function predicts only its inelastic load component $L_m$.

Of interest are those responsive asset systems that can be applied to the transactive control and coordination system. (In certain embodiments, responsive asset systems have been defined to be applied within reliability or conservation and efficiency test cases as well. Not all responsive asset systems are being used in the transactive control and coordination system test cases.) A toolkit function should be defined for each unique implementation of each major type of responsive asset system. Each toolkit function should first calculate the inelastic load $L_m$, which predicts when and how much energy the responsive asset system would consume if it were not influenced by the output TIS. The prediction of inelastic load component is placed into the Inelastic Load Prediction Buffer. The toolkit function should then predict the change in elastic load $\Delta L_m$ that is caused by the condition of the output TIS. The prediction of elastic load component is placed into the Elastic Load Prediction Buffer. It is acceptable that the elastic load components may be zero during intervals when the responsive asset system is not predicted to be engaged by the output TIS.

Another output from a toolkit function should be a representation of the planned control action by which the responsive asset system will be induced to change its energy consumption in light of the state of the output TIS for each interval. For example, some responsive asset systems may be either active or curtailed (e.g., populations of water heaters), in which case a binary indicator might be used for each interval. Other systems are able to enter any of multiple discrete levels of response (e.g., GE smart appliances), in which case one of several discrete levels should be specified for each interval. Still other systems may provide a continuum of possible responses and use a representation of percentage. (An interesting example of this continuum of responses will occur where customers are provided a means to view the output TIS itself on an in-home display and respond correspondingly with a continuum of behavioral responses.) Eventually, as time marches toward the interval of interest and the interval becomes that of $IST_0$, the responsive asset system should be expected to take the predicted, prescribed action. The implementations of responsive asset systems will be diverse, but it is in the representation of these predicted, planned control actions where standardization may be particularly useful.

An example would probably be useful concerning the portion of predicted load that should be included in this process from elastic loads, including responsive asset systems. Electrical consumption by a set of electric water heaters may be predicted quite well from measured trends and models of the water heaters and their owners' behaviors. The input information or parameters that influence such trends and models might include time of day, day of week, occupancy, outdoor temperature, and average outdoor temperature, for examples. In the toolkit framework, these pieces of information or parameters are referred to as other local conditions that should be available inputs if the transactive node is to accurately predict the load consumed by the water heaters. These predictions are to be completed within this process 6. Predict Applicable Toolkit Load Functions. The predicted load should be recorded for each such system in the Inelastic Load Prediction Buffer. If upon receipt of the current output TIS the water heaters would reduce their load, the change (e.g., only the change) would be predicted in a parallel calculation path and would be stored into the Elastic Load Prediction Buffer.

Toolkit functions can used to describe behaviors of individual devices. But the responsive asset systems of the Demonstration are primarily used for populations of devices. It is the statistical behavior of the populations, not individual devices that should be predicted.

Inelastic load components are similarly incorporated via their toolkit functions; however, no elastic load component should be created by these functions. Candidate inelastic load predictions might include feeders of residential customers, where the load of the population could be predicted from the time of day, average home square footage, average house age, outdoor temperature, and perhaps still other local conditions.

Regardless of whether a given toolkit function describes an elastic or an inelastic load, a load should never appear on both the resource and load sides of the toolkit framework formulation for any single interval n. Responsive asset systems may be either electrical loads or resources. Regardless, the toolkit functions whose influence is to be inserted at this location will affect the formulation of the TFS but will not directly influence the formulation of the output TIS. Responsive asset systems that should affect the delivered cost of energy (e.g., the TIS) at this transactive node should be inserted at location 8. Calculate Applicable Toolkit Resource Functions instead.

Using the above-stated criterion, the average power from a customer's renewable generator should probably be treated as a "negative" load (e.g., its toolkit function should be incorporated here) if it will never result in net metering. But if the utility at any time pays the customer net-metering payments for surplus energy that is produced by the resource, the resource should be included instead among resources, not loads, so that the net-metering charges may influence the formulation of the TIS (e.g., a toolkit function should be included for this system in the process 8. Calculate Applicable Toolkit Resource Functions).

Using the same reasoning, the present process should not predict bulk generation resources that are scheduled at this transactive node because costs should almost certainly be applied to the energy from such bulk resources.

The influences of elastic and inelastic load components should never be double counted. The influence of a load should appear only once if an accurate prediction of total load is to be formulated by this transactive node.

Toolkit functions may include learning algorithms and other means to improve the accuracy of their load predictions over time, but such complexities should be weighed against the Demonstration's desire to create and teach and implement these toolkit functions with its participants and within a tight development schedule.

See Table 25 for a list of example toolkit load functions.

Applicability:

Any toolkit functions to be called upon in this process block should be called at the update frequency. It is conceivable but unlikely that a transactive node may have neither inelastic nor elastic load components that necessitate any toolkit functions be called within this process block.

Sub-Functions and Sub-Processes:

6.1 Interpolate Intervals Service Functions—a suite of service functions that may be called upon as they are desired to restate dated time series in terms of the current IST intervals. (These functions might be defined and used throughout the entire toolkit framework instead of uniquely defined for each process, as has been shown here.)

6.2m Toolkit Load Function—from zero to many individual toolkit functions from a toolkit function library that predict inelastic load and change in elastic load for each interval of the current IST series. Enough such toolkit functions should be incorporated and called upon to predict the entire load at this transactive node. Individual toolkit functions may be created or selected from a toolkit function library predict the behaviors of a responsive asset system; the behaviors of a group of inelastic loads; generation from small distributed generation resources that do not directly influence the formulation of the TIS; or large nebulous groups of ill-defined loads that can only be characterized by their historical trends.

It should be assumed that the list of M relevant toolkit functions are identified and known by this transactive node object and is available from the Node State and Status Buffer. Furthermore, the buffer should identify the sets of other local conditions inputs expected to be available to the M toolkit functions from the Toolkit Load Function Input Buffer.

A toolkit function should output its prediction of inelastic load into the Inelastic Load Prediction Buffer for the load being described and for a current IST interval. (The inputs expected by toolkit functions will be varied and may be dynamic.) If the function models and helps control responsive, elastic loads, the function should also create and output the planned control for the responsive load. A standardized advisory control signal to be sent to the responsive asset systems has been formulated and is available in SubAppendix C.

6.3 Refresh Predicted Inelastic Elastic Loads—early each update interval iteration, the most current contents of the Inelastic Load Prediction Buffer and Elastic Load Prediction Buffer should be retrieved by this sub-function and restated using 6.1 Interpolate Intervals Service Functions in terms of the current IST interval set. These updated buffer contents are then available to be used by default should this transactive node fail for any reason to calculate its load for the current iteration.

Inputs:

- current IST interval series that is available from the Current IST Series Buffer
- current output TIS (units of "value" attribute: cost per energy) from the Output TIS Buffer
- other local conditions (OLC) (units: various) as might be prescribed by specific toolkit functions and available from the Toolkit Load Function Input Buffer
- list of M toolkit functions that should be called at this transactive node and the list of other local conditions data inputs that will be used by the toolkit functions as should be known by this transactive node object and available from the Node State and Status Buffer.

Outputs:

- Inelastic load predictions $L_m$ (units: average power) for each IST interval stored into the Inelastic Load Prediction Buffer
- Elastic load predictions $\Delta L_m$ (units: change in average power) for each IST interval stored into the Elastic Load Prediction Buffer
- Predicted control actions for responsive asset systems for each IST interval stored into the Elastic Load Prediction Buffer. (recommendation for units: {allowed: "0"; curtailed: "−1"}; {generation level L: "L"; . . . , generation level 2: "2"; generation level 1: "1"; off: "0"; load reduction level−1: "−1"; load reduction level−2: "−2"; . . . }; {continuum from full generation: "100"; off: "0"; full load reduction: "−100})

Function/Process:

Sub-functions 6.1 and 6.3 were described as they were being introduced in the text above. This document has stated functional responsibilities and an input/output model for the multiplicity of toolkit functions 6.2m Toolkit Load Function that are to be called upon during this process. Each toolkit function should use the provided template and should describe for itself what it is meant to accomplish within the functional responsibilities, inputs, and outputs that have been generally described here.

Dependencies:

- The current TIS should have been calculated by 3. Formulate TIS and available from the Output TIS Buffer.
- Various current other local conditions should be available from the Toolkit Load Function Input Buffer. The list of relevant other local conditions should be known to the transactive node object and available from the Node State and Status Buffer. Note that the other local conditions might themselves use management of other data collection and maintenance systems and processes.
- A list of functions 6.2m Toolkit Load Functions should be unambiguously named and known to this transactive node object available from the Node State and Status Buffer.

Process 2. Calculate New Transactive Signal Intervals should have run recently to provide to this process current IST intervals available from the Current IST Series Buffer.

This process inserts up to M entries into each the Inelastic Load Prediction Buffer and Elastic Load Prediction Buffer, one for each toolkit function that is called. The contents of these buffers should be current and available to be summed by process 5. Sum Total Predicted Load.

Notes:

No load or resource should appear on both the load and resource sides of the toolkit formulation for any given IST interval.

The sum of the inelastic load stored into the Inelastic Load Prediction Buffer and change in elastic load stored into the Toolkit Response Function Output Buffer for a give toolkit function should closely predict the actual load, providing the TIS and other local conditions (OLC) remain about the same until the corresponding $IST_n$ interval becomes $IST_0$.

It is hoped but not required that model-based predictions of both the inelastic-load and change in elastic-load components may improve over time as more sophisticated toolkit functions use historical feedback to improve their algorithms.

Implementers are encouraged to use this process and its toolkit functions for model-based load predictions, regardless of whether they describe elastic load.

TABLE 25

Example Resource, Incentive and Load Toolkit Functions

| Resource or Incentive | Load |
|---|---|
| 1.0 Imported Electrical Energy | 1.0 Bulk Inelastic Load |
| 1.1 Non-Transactive Imported Energy | 1.1 Bulk Commercial Load |
| 1.2 Transactive Imported Energy | 1.2 Bulk Industrial Load |
| 2.0 Renewable Energy Resource | 1.3 Bulk Residential Load |
| 2.1 Wind Energy | 1.4 Small Wind Generator Negative Load |
| 2.2 Solar Energy | 1.5 Small-Scale Distributed Generator Negative Load |
| 2.3 Hydropower | 1.6 Small-Scale Solar Generator Negative Load |
| 3.0 Fossil Generation | 2.0 General Event-Driven Demand Response |
| 4.0 General Infrastructure Cost | 2.1 Commercial Event-Driven Demand Response |
| 5.0 System Constraints | 2.2 Event Driven Distribution System Voltage Control |
| 5.1 Transmission Flowgate | 2.4 Residential Event-Driven Demand Response |
| 5.2 Equipment and Line Constraints | 2.5 Non-Renewable Distributed Generation Event-Driven Demand Response |
| 6.0 System Energy Losses | 3.0 General Time-of-Use Demand Response |
| 6.1 Transmission Losses | 3.1 Battery Storage--Time-of-Use |
| 6.2. Distribution Losses | 3.2 Commercial Time-of-Use Demand Response |
| 7.0 Demand Charges | 3.4 Residential Time-of-Use Demand Response |
| 7.1 BPA Demand Charges | 3.5 Time-of-Use Distribution System Voltage Control |
| 8.0 Market Impacts | 3.6 Time-of-Use Electric Vehicle Charging |
| 8.1 Spot Market Impacts | 4.0 General Real-Time Continuum Demand Response |
| | 4.1 Battery Storage--Real-Time |
| | 4.2 Commercial Real-Time Demand Response |
| | 4.3 Real-Time Distribution System Voltage Control |
| | 4.5 Residential Real-Time Demand Response |
| | 5.0 General Manual or Behavioral Demand Response |
| | 5.1 Residential Behavioral Response to Portals or In-Home Displays |
| | 5.2 Residential Behavioral Response--No Portals or In-Home Display |
| | 5.3 Manual Commercial Demand Response |
| | 5.4 Manual Non-Renewable Distributed Energy Resources Demand Response |

FIG. 40 is a flowchart 4000 of an exemplary "calculate applicable toolkit load functions" process.

7. Send Transactive Signals

Purpose: Method by which output transactive signals are conveyed from this transactive node to each one of its transactive neighbors. Most generally, there will be no single approach to completing this process because transactive is tied to no single communication technology, medium, or protocol. Transactive neighbor pairs should negotiate and agree upon these details. On the other hand, the Demonstration has elected to convey transactive signals almost exclusively via secure Internet.

Applicability:

An process that should be completed at the update frequency by a transactive node.

Sub-Functions and Sub-Processes:

The following high-level responsibilities should be addressed, regardless of the platforms on which it is designed:

Format transactive signals according to published recommendations, including published XML schema.

Coordinate timing with transactive node object states during each update interval and iteration Compare and coordinate Transactive neighbor list with transactive node object state.

Inputs:

One output TIS series from process 3. Formulate TIS

One output TFS series for each transactive neighbor from process 4. Formulate TFS Outputs:

Paired couples of output TIS and output TFS sent to each transactive neighbor.

Dependencies:

Receives current output TIS from Output TIS Buffer

Notes:

This process or function is trivial from a functional perspective, but it is useful from a system interoperability perspective. Transactive nodes that employ unlike software and computational architectures should still be able to send and receive these signals from their transactive neighbors.

This function or process is also useful from a cyber-security perspective. Both the senders and recipients of transactive signals should be satisfied that their systems will remain safe from attack.

Figure 43:
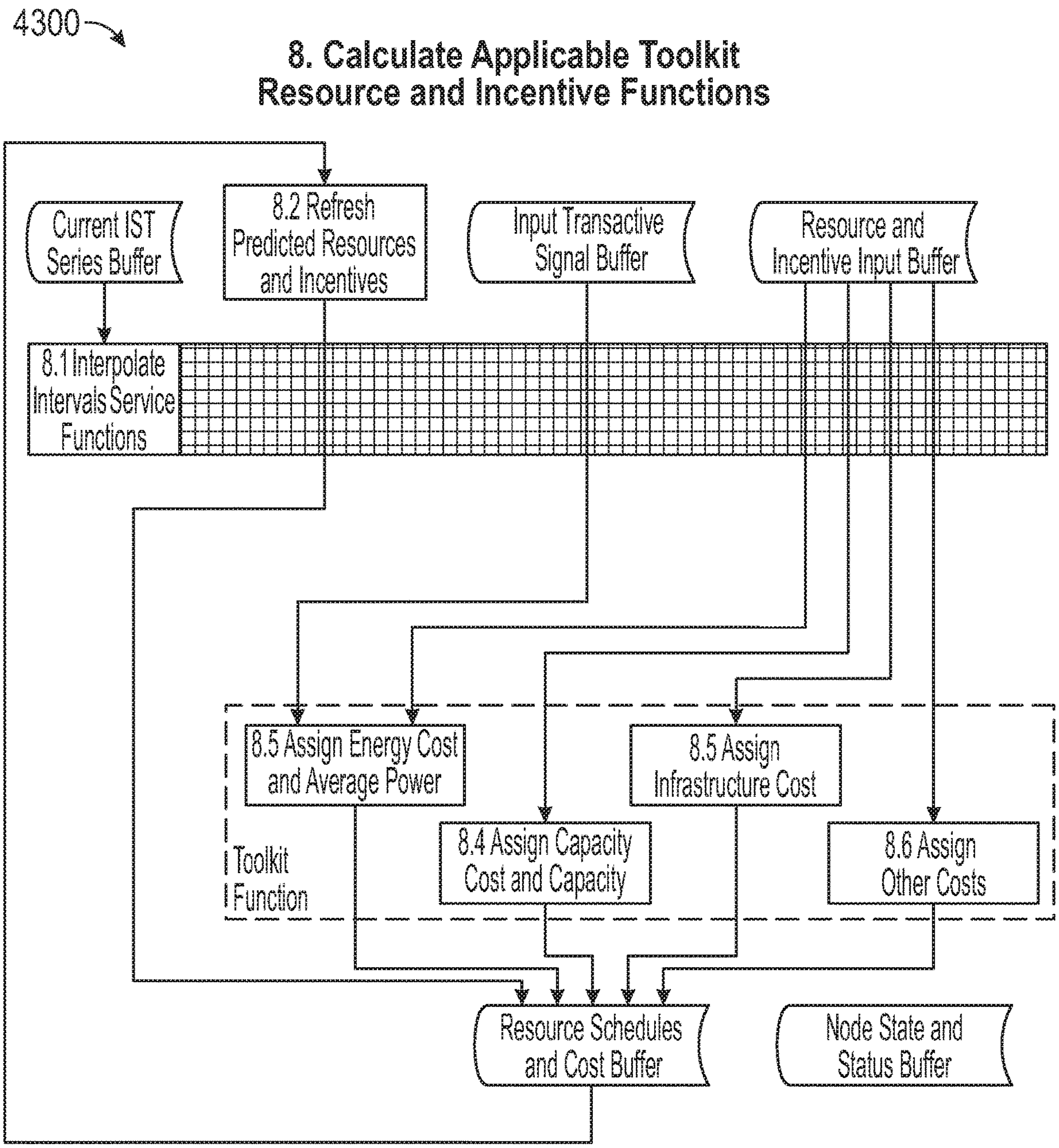
FIG. 43 is a flowchart of an exemplary "calculate applicable toolkit resource and incentive functions" process.

FIG. 43 is a flowchart 4300 of an exemplary "send transactive signals" process.

8. Calculate Applicable Toolkit Resource and Incentive Functions

Purpose:

A multiplicity of toolkit functions may be applied at this location within the toolkit framework to address resources and incentives. Toolkit functions should be created or selected from a toolkit library to represent the energy resources and incentives that are be applied at this transactive node during each IST interval. The costs that are calculated by the toolkit functions in turn may incentivize or disincentivize consumption and generation of electricity through their effects on the transactive incentive signal.

See Table 25 for a list of example toolkit resource and incentive functions. Refer to SubAppendix B for a template that may be used to specify additional toolkit resource and incentive functions as they are developed.

Applicability:

A transactive node should calculate at least one toolkit function at the update frequency.

Sub-Functions and Sub-Processes:

8.1 Interpolate Intervals Service Functions—a suite of service functions that can accept stale, dated data and restate the data in terms of the current IST interval series. (These functions might be defined and used throughout the entire toolkit framework instead of uniquely defined for each process, as has been shown here.)

8.2 Refresh Predicted Resources and Incentives—Early during each update interval, this sub-function retrieves the most recent entries from the Resource Schedules and Cost Buffer and restates the records in terms of the current IST series. If for any reason this transactive node fails to complete the present process by the time its outputs are used, the restated records may be used as default records.

8.3 Assign Energy Cost and Average Power—a sub-function of a toolkit resource and incentive function in which cost $C_{E,a,n}$ (units: cost per energy) is assigned to each component a of energy $\hat{P}_{G,a,n}$ (units: average power) that is either imported into or generated within the boundaries of this transactive node. In particular embodiments, one responsibility of a toolkit resource and incentive function is to calculate and report one of each of these two quantities for each current IST interval n. Either of the calculated quantities may be zero. The calculated values will differ depending on selected toolkit function and the resource or effect that is being modeled by the selected toolkit function.

Example energy costs and energies that that should be captured using this sub-function include The cost of energy from traditional bulk generation The cost of energy from renewable energy resources like wind. (Wind energy is desirably incentivized by applying its costs to its infrastructure and not to the energy that is produced. Thereby, it causes a downward influence on the delivered cost of energy at the time and near where wind blows.)

For non-transactive neighbors, the cost of energy that applies to any energy that is imported into the boundary of this transactive node. (Note that if energy is exported rather than imported during an IST interval n, it is not counted among resources, so either or both the energy terms for this sub-function should be set to zero.)

For transactive neighbors, the cost of delivered energy (e.g., the TIS) that applies to imported energy (e.g., the TFS). (This is a special case where the input TIS and input TFS are read from the Input Transactive Signal Buffer. A simple toolkit function should be created to complete this task.)

The values $C_{E,a,n}$ should be defensible representations of the delivered costs of energy $\hat{P}_{G,a,n}$.

The sum of $\hat{P}_{G,a,n}$ should represent the energy that is generated within or imported into this transactive node during IST interval n.

This sub-function may call upon various defined other local conditions that should be available as inputs from the Resource and incentive Input Buffer. The list of other local conditions that are expected by a give toolkit function should be known by the transactive node object and available from the Node State and Status Buffer.

Refer to sub-function 3.7 Calculate Output TIS to fully understand how the two outputs from the present sub-function will become incorporated into the formulation of TIS within the toolkit framework.

8.4 Assign Capacity Cost and Capacity—a sub-function of a toolkit resource and incentive function in which cost $C_{C,b,n}$ (units: cost per power) is assigned to capacity limitations and costs that are triggered by capacities. The sub-function also captures the capacity $\hat{P}_{C,b,n}$ (units: average power) to which the cost applies. In certain embodiments, one responsibility of a toolkit resource and incentive function is to calculate one of each of these two quantities for each current IST interval n. Either of the calculated quantities may be zero. The calculated values will differ depending on selected toolkit function and the resource or effect that is being modeled by the selected toolkit function.

Example capacity costs that should be included through this sub-function include Costs that should be applied as equipment like power lines become constrained Imposed demand charges that become applied to the owners of this transactive node.

Cost $C_{C,b,n}$ should be defensible as cost that will be incurred upon a corresponding capacity $\hat{P}_{C,b,n}$ that is predicted to occur during IST interval n.

This sub-function may call upon various defined other local conditions that should be available as inputs from the Resource and incentive Input Buffer. The list of other local conditions that are expected by a give toolkit function should be known by the transactive node object and available from the Node State and Status Buffer.

Refer to sub-function 3.7 Calculate Output TIS to fully understand how the two outputs from the present sub-function will become incorporated into the formulation of TIS within the toolkit framework.

8.5 Assign Infrastructure Cost—a sub-function of a toolkit resource and incentive function in which cost $C_{I,c,n}$ (units: cost per time) is assigned to the provision of infrastructure at this transactive node, which costs are usually spread over quite long periods of time. In certain embodiments, one responsibility of toolkit resource and incentive function is to calculate and report one infrastructure cost output for each current IST interval n. Its value may be zero. The calculated value will differ depending on selected toolkit function and the resource or effect that is being modeled by the selected toolkit function.

Example infrastructure costs that may be used through this sub-function include

Initial purchase costs for equipment

Initial installation costs

Maintenance costs.

Refer to sub-function 3.7 Calculate Output TIS to fully understand how the output from the present sub-function will become incorporated into the formulation of TIS within the toolkit framework.

8.6 Assign Other Costs—a sub-function of a toolkit resource and incentive function in which other costs (units: cost) that cannot be represented by the other sub-functions are applied at this transactive node. In certain embodiments, one responsibility of a toolkit resource and incentive function is to calculate and report one such other cost output for each current IST interval n. Its value may be zero. The calculated value will differ depending on selected toolkit function and the resource or effect that is being modeled by the selected toolkit function.

This sub-function should not be used to bypass the other three sub-functions 8.3, 8.4, and 8.5. The other cost that is assigned by this sub-function should be a defensible component of the delivered cost of energy (e.g., the TIS) that will be formulated by process 3. Formulate TIS.

Refer to sub-function 3.7 Calculate Output TIS to fully understand how the output from the present sub-function will become incorporated into the formulation of TIS within the toolkit framework.

Inputs:

Current Input TIS and TFS should have been received in process 1. Receive Transactive Signals and should be available from the Input Transactive Signal Buffer. These inputs will be treated the same as other energy terms.

Current other local conditions data that has been specified for by the set of toolkit functions that are being applied at this transactive node.

The list of toolkit functions that are to be applied in this process, which list should be known to this transactive node object and available from the Node State and Status Buffer.

The list of other local conditions data records that are expected by the set of toolkit functions that are employed in this process block, which list should be known by this transactive node object and available from the Node State and Status Buffer.

Outputs:

One paired energy cost and energy $(C_{E,a}\cdot\hat{P}_{G,a})$ series record placed into and available from the Resource Schedules and Cost Buffer for each of the toolkit functions that is applied within this process. (There are A non-zero of these records used to represent imported and generated energy.)

One paired capacity cost and capacity $(C_{c,b}\cdot\hat{P}_{C,b})$ series record placed into and available from the Resource Schedules and Cost Buffer for each of the toolkit functions that is applied within this process. (There are B non-zero of these records where capacity costs are relevant.)

One infrastructure cost $C_{I,c}$ series record placed into and available from the Resource Schedules and Cost Buffer for each of the toolkit functions that is applied within this process. (There are C non-zero of these records where infrastructure costs are relevant.)

One other cost $C_{O,d}$ series record placed into and available from the Resource Schedules and Cost Buffer for each of the toolkit functions that is applied within this process. (There are D non-zero of these records where other costs are relevant.)

Function/Process:

The sub-functions were described above as they were being introduced. Sub-functions 8.3, 8.4, 8.5, and 8.6 are components of toolkit functions and may not be generically defined except through the characterization of their inputs and outputs.

Dependencies:

This process should find current input transactive signals from process 1. Receive Transactive Signals from within the Input Transactive Signal Buffer.

This process expects current and relevant other local conditions are available from the Resource and Incentive Input Buffer. The list of example other local conditions records is known to this transactive node object and available from the Node State and Status Buffer.

This process expects that the relevant list of toolkit functions will be known to the transactive node object and available from the Node State and Status Buffer. The modular toolkit functions themselves should be available at the transactive node.

This process expects that the current IST series will have been calculated by process 2. Calculate New Transactive Signal Intervals and will be available from the Current IST Series Buffer.

This process outputs to the Resource Schedules and Cost Buffer that are used for processes 10. Sum Total Predicted Resource and by 3. Formulate TIS.

Notes:

A transactive node should instantiate at least one toolkit function that redefines current transactive signals as energy terms and places them into the Resource Schedules and Cost Buffer.

General guidance should be that a transactive control and coordination system can address economic decisions that interact with the system somewhat slower than the update frequency. There will occur an interim period where the Demonstration's system will accept but not influence resource decisions that presently involve markets and ancillary services that are not initially tied into the transactive control and coordination system. However, many such economic decisions may be addressed and perhaps optimized by a transactive control and coordination system as theories are developed to support doing so.

An alternative pathway has been provided for "Scheduled Resources" to become entered into the Resource Schedules and Cost Buffer. It is preferred, however, that even non-transactive resources enter into the toolkit framework via a toolkit function and this process 8. Calculate Applicable Toolkit Resource and Incentive Functions. One of our most basis toolkit functions should be one that represents traditional, bulk generation.

FIG. 43 is a flowchart 5300 of an exemplary "calculate applicable toolkit resource and incentive functions" process.

9. Control Responsive Asset Systems

Purpose:

Advise responsive asset systems of the actions that they should take during the present update interval in accordance with their planned responses for the current interval start time $IST_0$.

Applicability:

This process should be completed at the update frequency by a transactive node that has at least one responsive asset system installed and responsive to the transactive control and coordination system.

Some transactive node owners will impose constraints on the dynamics with which their responsive asset systems may act, in which case this process may be completed less frequently than the update frequency. For example, certain responsive asset systems may be engaged only at the top of an hour and may remain engaged for minimum durations after that. Still others should be scheduled some time prior and are therefore not responsive to the update frequency. (The capabilities of various responsive asset systems are desirably addressed in the selected toolkit library functions 6.2m Toolkit Load Function.)

Sub-Functions and Sub-Processes:

None. This process may be only described at a functional level due to the diversity of the responsive asset system that is to be controlled. Most of the actual control activities take place within the responsive asset systems themselves and according to the preferred practices of this transactive node's owner.

Inputs:

Advisory signal for current interval start time $IST_0$ that is available from the Elastic Load Prediction Buffer. Each of these inputs is expected to have one of three meanings depending upon the capabilities of the targeted responsive asset system—discrete binary, discrete multilevel, or continuous.

Outputs:

The principal output actually occurs outside the transactive control and coordination system and outside this process but in the final control of the assets within the target responsive asset system.

The state or status of the responsive asset system may be updated to the Node State and Status Buffer. For example, this buffer may hold information about the availability of the system or the amount of load that is presently available to be controlled.

Function/Process:

The process by which the advisory output found within the Elastic Load Prediction Buffer is to be converted into control actions for the present update interval will be quite unique to the responsive asset system and will take place within the system according to practices of this transactive node's owner.

Dependencies:

If this transactive node possesses any responsive asset systems, then

This process expects to find a current advisory response for each respective responsive asset system having been predicted (planned) by its respective process 6. Calculate Applicable Toolkit Load Functions and available in the Elastic Load Prediction Buffer. Only the current interval start time $IST_0$ is relevant to the actual, not the planned, control of a responsive asset system.

Notes:

Note that the toolkit function that corresponds to a given responsive asset system should state the information about the system that should be maintained within the Node State and Status Buffer.

Responsive asset systems may be either energy loads or resources.

The transactive control and coordination system advises a responsive asset system via this process, but it never directly controls any responsive asset system. A responsive asset system is not part of the transactive control and coordination system.

Responsive asset systems are very diverse. Even similar asset systems use different approaches, practices, protocols, and standards. One might realize an opportunity for standardization in the three types of signals that will be used to advise control actions for responsive asset systems—discrete binary, discrete multilevel, and continuous.

For the Demonstration, responsive asset systems almost exclusively refer to populations of individual assets. The Demonstration's transactive control and coordination system therefore will provide an advisory "control" signal to the system, not to its individual assets. If use of transactive control and coordination systems continues, it is feasible that they will be extended down to individual assets. In principle, a transactive control and coordination system is very scalable.

Figure 44:
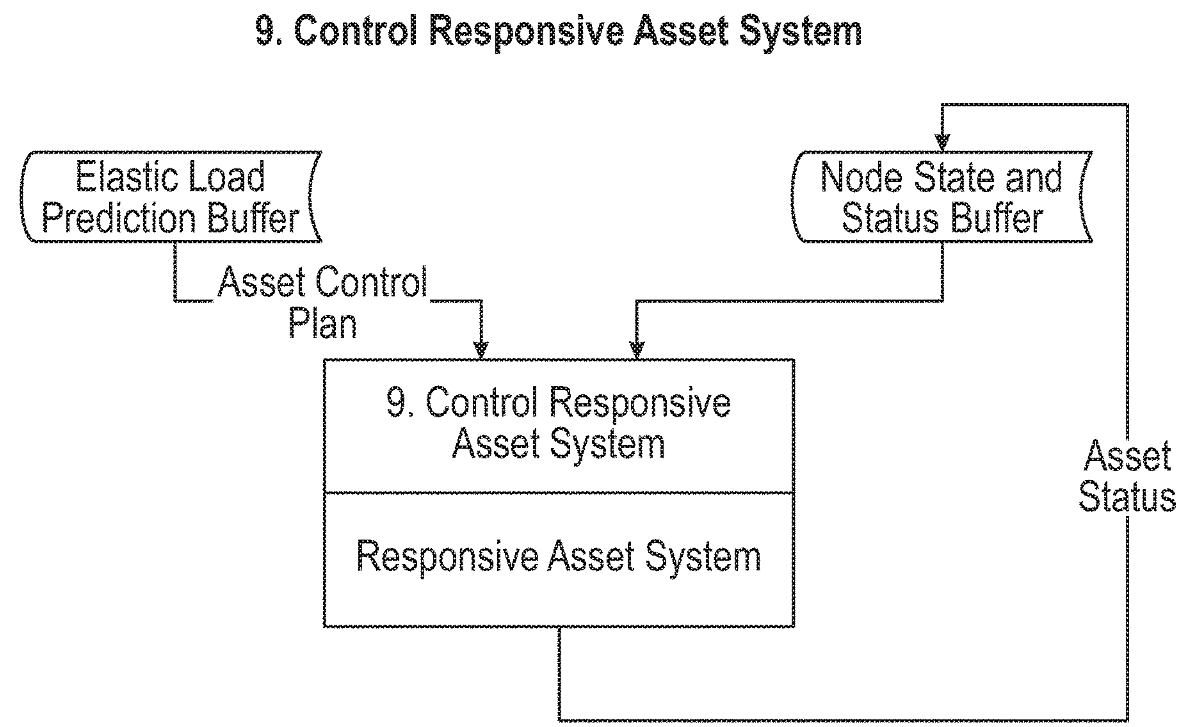
FIG. 44 is a flowchart of an exemplary "control responsive asset systems" process.

FIG. 44 is a flowchart 5400 of an exemplary "control responsive asset systems" process.

10. Sum Total Predicted Resources

Purpose:

Sum the total energy resources entering the boundaries of this transactive node. The transactive node that has A resources The sum produced by this process is used for two purposes in the toolkit framework: First, it is the divisor in process 3. Formulate TIS. Second, during process 4. Formulate TFS it is compared against the total load that is calculated by process 5. Sum Total Predicted Load, resulting in the net surplus or shortage of energy that should be allocated among the TFS of of transactive neighbors.

Applicability:

This process should be completed at the update frequency by a transactive node.

Sub-Functions and Sub-Processes:

10.1 Interpolate Intervals Service Functions—a suite of service functions that may be called upon as they are desired to restate dated time series in terms of the current IST intervals. (These functions might be defined and used throughout the entire toolkit framework instead of uniquely defined for each process, as has been shown here.)

10.2 Sum Total Predicted Resource—sum of the A resources $\hat{P}_{G,a,n}$ (units: average power) for each IST interval n. This sub-function should find a current representation of each summand from within the Resource Schedules and Cost Buffer. The expected set of summands should be known to this transactive node object and available from the Node State and Status Buffer. The sum should include electrical energy that is either generated within or imported into the boundaries of this transactive node during each IST interval n. Each of the summands should be found paired with an energy cost parameter $C_E$ in the Resource Schedules and Cost Buffer.

Summands $\hat{P}_{G,a,n}$ should include and represent

The TFS (units: average power) of each transactive neighbor from which this transactive node will import energy during interval n.

The average energy generated during IST intervals n from any generator within the boundaries of this transactive node which may be expected to influence the formulation of the TIS. That is, its generated energy should be paid for and represented in the transactive control and coordination system. (This will include almost all generation resources. An exception will be generation by end-use customers that displaces their load but never should affect the cost energy in a way that would be evident outside the customer premises.)

Energy imported during IST intervals n from electrically connected neighbors who are not transactive neighbors.

$$\text{Total Predicted Resource} = \sum_{a=1}^{A} \hat{P}_{G,a,n} \qquad \text{Process 10}$$

The output product from this sub-function is a single time series (units: average power) placed into the Total Predicted Resource Buffer each update interval.

10.3 Refresh Predicted Total Resource—early each update interval iteration, the most current contents of the Total Predicted Resource Buffer should be retrieved by this sub-function and restated using 10.1 Interpolate Intervals Service Functions in terms of the current IST interval set. These updated buffer contents are then available to be used by default should this transactive node fail for any reason to calculate total resource for the current iteration.

Inputs:

A multiplicity of resource components $\hat{P}_{G,a,n}$ (units: average energy) to be retrieved from the Resource Schedules and Cost Buffer.

The identifiers of A resource components known by this transactive node object and available from the Node State and Status Buffer.

Current interval start time (IST) series available from the Current IST Series Buffer.

Outputs:

Sum of resources $$\sum_{a=1}^{A} \hat{P}_{G,a,n}$$

(units: average power) stored into the Total Predicted Resource Buffer. This output is a series of values, one for each IST interval.

Function/Process:

The purpose of this process is to perform a mathematical sum, which has been described above as the sub-functions were being introduced.

Dependencies:

This process uses a current IST series to have been calculated by process 2. Calculate New Transactive Signal Intervals and available from the Current IST Series Buffer.

This process expects that current resource components $\hat{P}_{G,a,n}$ will have been placed into the Resource Schedules and Cost Buffer by process 8. Calculate Applicable Toolkit Resource and Incentive Functions. However, the sub-function 8.3 Refresh Predicted Resources and Incentives will have created a default set of inputs that may be used here if current inputs cannot be calculated.

The current output of this process is used by process 3. Formulate TIS and 4. Formulate TFS and is expected to be available from the Total Predicted Resource Buffer. However, some resiliency is provided by sub-function 10.3 Refresh Predicted Total Resource, which calculates a default current process output to be available from the Total Predicted Resource Buffer should this process fail to create a current output by the time it is used.

Notes:

Refer to processes 3. Formulate TIS and 4. Formulate TFS that will give one a better sense of how the output of this process is to be used.

The general term $\hat{P}_{G,a,n}$ has been introduced, in part, to deemphasize that there are multiple types of such terms, including even the TFS at time it describes imported energy. Altogether, these terms should include the energy that is generated or imported within this transactive node's boundary.

This process was originally considered as a sub-function within both processes 3 and 4. Because both processes performed the identical function, the function was elevated to a process at the toolkit-framework level so that the same sum may be used by both processes 3 and 4.

Figure 45:
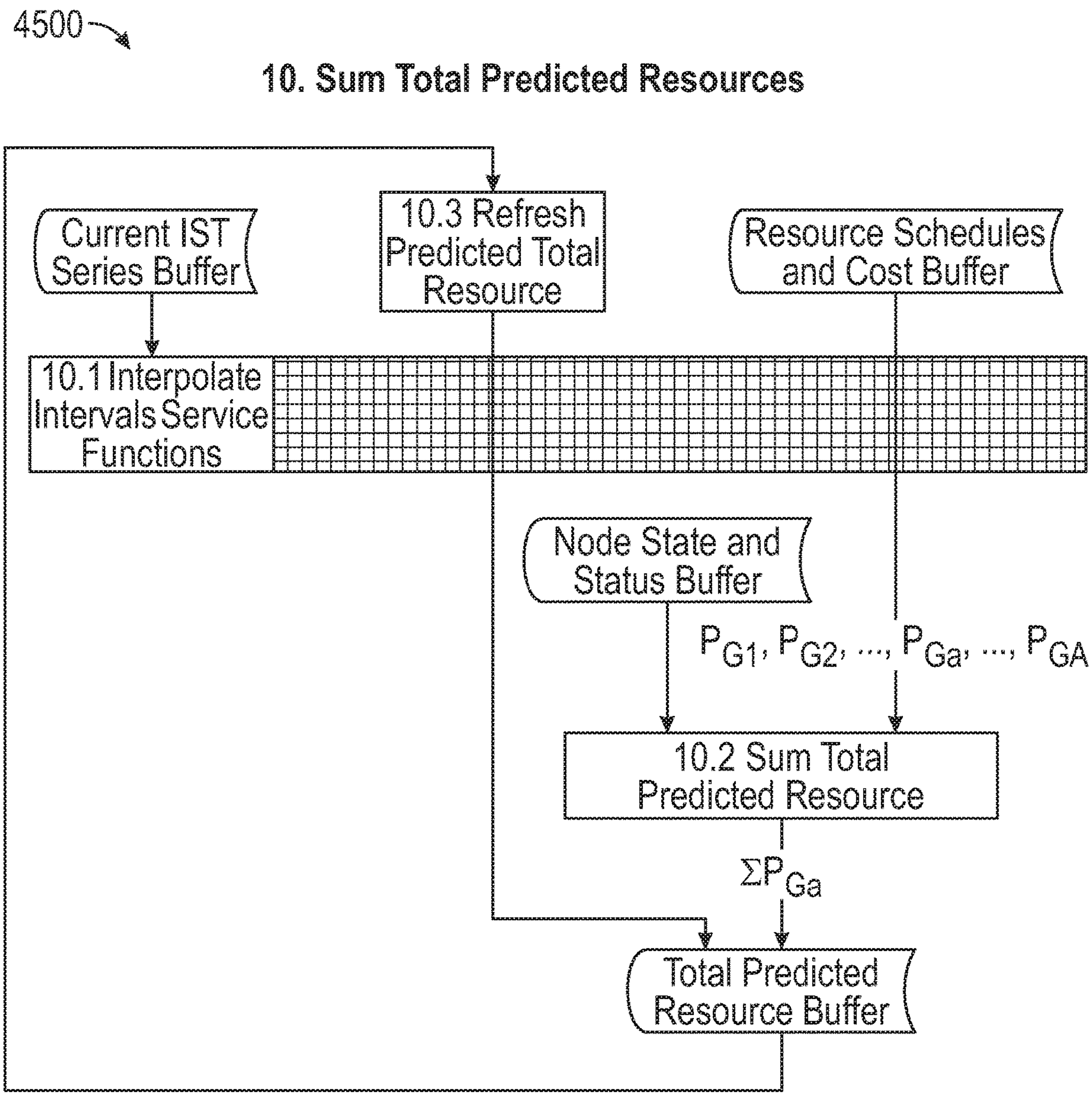
FIG. 45 is a flowchart of an exemplary "sum total predicted resources" process.

FIG. 45 is a flowchart 4500 of an exemplary "sum total predicted resources" process.

11. Control Responsive Resource

Purpose:

Advise responsive resources of the actions that they should take during the present update interval in accordance with their planned responses for the current interval start time $IST_0$.

Applicability:

This process should be completed at the update frequency by a transactive node that has at least one responsive resource. This process will be used infrequently until resources like bulk generators become responsive to a dynamic transactive control and coordination system.

Some resource owners will impose constraints on the dynamics with which their resources may act, in which case this process may be completed less frequently than the update frequency.

Sub-Functions and Sub-Processes:

None. This process may be only described at a functional level due to the diversity of the resources that are to be controlled. Most of the responsibilities to engage resources lie with the resource systems themselves and not with processes of the toolkit framework.

Inputs:

Resource plans as formulated by certain toolkit functions within the process 8. Calculate Applicable Toolkit Resource and Incentive Functions.

Outputs:

The principal output actually occurs outside the resource system and outside this process but in the final control of the resource within the target resource system.

The state or status of the resource may be updated to the Node State and Status Buffer. For example, this buffer may hold information about the availability of the system or the amount of resource that is presently available to be controlled.

Function/Process:

The process by which the advisory output found within the Resource Schedules and Cost Buffer is to be converted into control actions for the present update interval will be quite unique to the responsive resource system and will take place within the system according to practices of the resource and transactive node owners.

Dependencies:

If this transactive node possesses any responsive resource systems, then

This process expects to find a current advisory response for each respective responsive resource system having been predicted (planned) by its respective process 8. Calculate Applicable Toolkit Resource and Incentive Functions and available in the Resource Schedules and Cost Buffer. Only the current interval start time $IST_0$ is relevant to the actual, not the planned, control of a responsive resource system.

Notes:

Note that the toolkit function that corresponds to a given responsive resource system should state the information about the system that should be maintained within the Node State and Status Buffer.

The transactive control and coordination system advises a responsive resource system via this process, but it never directly controls it. A responsive resource system is not part of the transactive control and coordination system.

Responsive resource systems are very diverse. Even similar systems use different approaches, practices, protocols, and standards. One might realize an opportunity for standardization in the three types of signals that will be used to advise control actions for responsive resource systems—discrete binary, discrete multilevel, and continuous.

Figure 46:
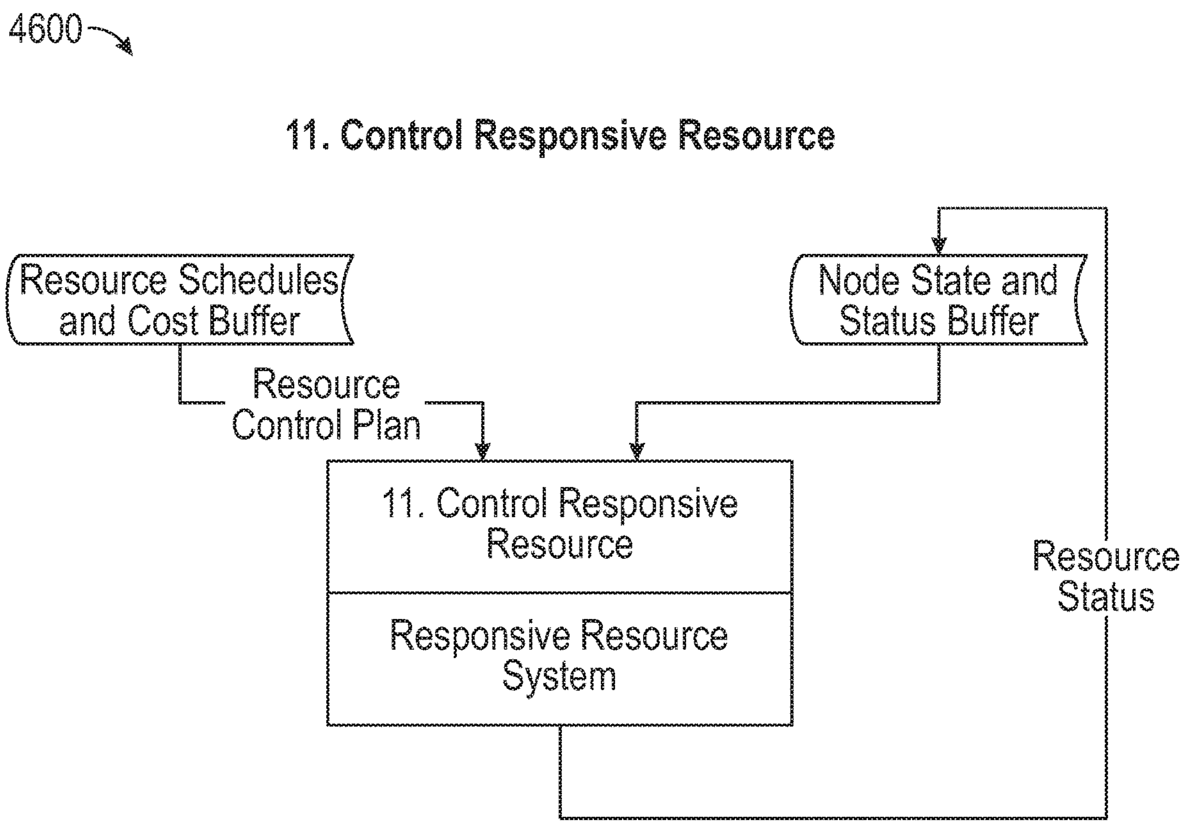
FIG. 46 is a flowchart of an exemplary "control responsive resource" process.

FIG. 46 is a flowchart 4600 for an exemplary "control responsive resource" process.

6.2.4 SubAppendix A: Interval Start Time Series Definition

6.2.4.1 Purpose

This section recommends a specific set of 57 Interval Start Times (IST) for use in example embodiments of the disclosed technology, including the Demonstration. The intervals range in duration from 5 minutes to 1 day. In this embodiment, the 57 ISTs define 56 intervals of varying duration, though other numbers of IST and different durations can be used.

6.2.4.2 Series of 57 Interval Start Times Defined

The first interval in a set of Interval Start Times is $IST_0$. While a transactive signal is being formulated, $IST_0$ is the next future time at which the minute hand of a clock will be at one of the 12 major divisions of an hour (e.g., on the hour, 5 minutes after the hour, 10 minutes after the hour, etc.).

The series of time intervals to be used by transactive signals during the Demonstration are as defined in Table 26. This set of 56 intervals is easily specified, creates the same numbers of intervals, exhibits increasing coarseness into the future, and will align well with dynamic market signals that are up to 1 hour in duration. Note that a $57^{th}$ IST (e.g., $IST_{56}$) has been added to unambiguously define the duration of the final, $56^{th}$ interval.

One variable-length interval resides at the boundary between sets of intervals having different durations. That is, there is a variable-length interval between 5- and 15-minute intervals, between 15-minute and 1-hour intervals, between 1- and 6-hour intervals, and between 6-hour and 1-day intervals. The duration of each variable-length interval varies between the durations of the two bounding intervals, inclusive. No intervals overlap in the resulting representation of the future.

Five-minute intervals are to be used 1 hour into the future; 15-minute intervals, 6 hours into the future; 1-hour intervals, 1 day into the future; 6-hour time intervals, 2 days into the future, and 1-day intervals, 3 to 4 days into the future.

TABLE 26

Example Interval Time Series for use with TIS and TFS

| Duration | No. Intervals | Interval Start Times |
|---|---|---|
| 5 minutes | 12 | $IST_0$, $IST_0$ + 0:05, . . . , $IST_{10}$ + 0:05 |
| 15 minutes | 20 | Round($IST_{11}$ + 0:15)*, $IST_{12}$ + 0:15, . . . , $IST_{30}$ + 0:15 |
| 1 hour | 18 | Round($IST_{31}$ + 1:00)*, $IST_{32}$ + 1:00, . . . , $IST_{48}$ + 1:00 |
| 6 hours | 4 | Round($IST_{49}$ + 6:00)*, $IST_{50}$ + 6:00, . . . , $IST_{52}$ + 6:00 |
| 1 day | 2 | Round($IST_{53}$ + 1:00:00)*, $IST_{54}$ + 1:00:00, $IST_{55}$ + 1:00:00 |
| >3 days | 56 intervals | 57 interval start times (IST) |

*This function "Round" indicates rounding down to the next 15-minute, 1-hour, 6-hour, or 1-day interval start time. Times are indicated as dd:hh:mm, e.g., days, hours, and minutes.

The intervals of several time series that adhere to this recommendation are shown in Table 27 for several example values of $IST_0$.

6.2.4.3 Pseudo Code for Example IST Series

The following formula guides the calculation of the IST series according to the specification in Table 26. The interval start times use the notation $$IST_n[dd_n,hh_n,mm_n], \quad (A1)$$

where "dd" is days, "hh" is hours, and "mm" is minutes. The value n refers to the sequential, ordered number of the IST in its series. The total number of intervals in the series is N=56, where N is the last n.

$$IST \doteq \{IST_0,IST_1,IST_2, \ldots ,IST_n, \ldots ,IST_N\} \quad (A2)$$

The following steps and pseudo code should help standardize calculation of the members of an IST time series. The function "truncate( )" indicates that the decimal parts of the result in the parentheses should be discarded.

(1) Calculate first element $IST_0$:
Read present time t
Set $IST_0$=t+0:05
Set $mm_0$=5*truncate ($mm_0$/5)

(2) Calculate the IST series for remaining 5-minute intervals:
For n=1 to 11
Set $IST_n$=$IST_{n-1}$+0:05
Next n (3) Calculate the IST series for 15-minute intervals:
Set $IST_{12}$=$IST_{11}$+0:15
Set $mm_{12}$=15*truncate($mm_{12}$/15)
For n=13 to 31
Set $IST_n$=$IST_{n-1}$+0:15
Next n (4) Calculate the IST series for 1-hour intervals:
Set $IST_{32}$=$IST_{31}$+1:00
Set $mm_3 2$=0
For n=33 to 49
$IST_n$=$IST_{n-1}$+1:00
Next n (5) Calculate the IST series for 6-hour intervals:

Set $IST_{50}=IST_{45}+6{:}00$

Set $hh_{50}=6*truncate(hh_{50}/6)$

For n=51 to 53

$IST_n=IST_{n-1}+6{:}00$

Next n (6) Calculate the IST series for 1-day intervals:

Set $IST_{54}=IST_{53}+1{:}00{:}00$

Set $hh_{54}=0$

Set $IST_{55}=IST_{54}+1{:}00{:}00$ (7) Append the final IST that indicates the end of the last 1-day interval:

Set $IST_{56}=IST_{55}+1{:}00{:}00$

6.2.4.4 Example IST Series

Table 27 lists the 57 IST time series elements for 13 example values of $IST_0$. The number of intervals (56 for the Demonstration) and total described time duration, listed at the bottom of Table 27 for these examples, have been adopted as additional elements of the XML schema that has been designed for the Demonstration's transactive signals.

TABLE 27

| | | Interval Start Times at Example Next Interval Start Times | | | | | | | | | | | | |
|---|---|---|---|---|---|---|---|---|---|---|---|---|---|---|
| Interval | # | 0:00 | 0:05 | 0:10 | 0:15 | 0:30 | 0:45 | 1:00 | 3:00 | 5:00 | 6:00 | 12:00 | 18:00 | 1:00:00 |
| 5 min. | 0 | 0:00 | 0:05 | 0:10 | 0:15 | 0:30 | 0:45 | 1:00 | 3:00 | 5:00 | 6:00 | 12:00 | 18:00 | 1:00:00 |
| | 1 | 0:05 | 0:10 | 0:15 | 0:20 | 0:35 | 0:50 | 1:05 | 3:05 | 5:05 | 6:05 | 12:05 | 18:05 | 1:00:05 |
| | 2 | 0:10 | 0:15 | 0:20 | 0:25 | 0:40 | 0:55 | 1:10 | 3:10 | 5:10 | 6:10 | 12:10 | 18:10 | 1:00:10 |
| | 3 | 0:15 | 0:20 | 0:25 | 0:30 | 0:45 | 1:00 | 1:15 | 3:15 | 5:15 | 6:15 | 12:15 | 18:15 | 1:00:15 |
| | 4 | 0:20 | 0:25 | 0:30 | 0:35 | 0:50 | 1:05 | 1:20 | 3:20 | 5:20 | 6:20 | 12:20 | 18:20 | 1:00:20 |
| | 5 | 0:25 | 0:30 | 0:35 | 0:40 | 0:55 | 1:10 | 1:25 | 3:25 | 5:25 | 6:25 | 12:25 | 18:25 | 1:00:25 |
| | 6 | 0:30 | 0:35 | 0:40 | 0:45 | 1:00 | 1:15 | 1:30 | 3:30 | 5:30 | 6:30 | 12:30 | 18:30 | 1:00:30 |
| | 7 | 0:35 | 0:40 | 0:45 | 0:50 | 1:05 | 1:20 | 1:35 | 3:35 | 5:35 | 6:35 | 12:35 | 18:35 | 1:00:35 |
| | 8 | 0:40 | 0:45 | 0:50 | 0:55 | 1:10 | 1:25 | 1:40 | 3:40 | 5:40 | 6:40 | 12:40 | 18:40 | 1:00:40 |
| | 9 | 0:45 | 0:50 | 0:55 | 1:00 | 1:15 | 1:30 | 1:45 | 3:45 | 5:45 | 6:45 | 12:45 | 18:45 | 1:00:45 |
| | 10 | 0:50 | 0:55 | 1:00 | 1:05 | 1:20 | 1:35 | 1:50 | 3:50 | 5:50 | 6:50 | 12:50 | 18:50 | 1:00:50 |
| | 11 | 0:55 | 1:00 | 1:05 | 1:10 | 1:25 | 1:40 | 1:55 | 3:55 | 5:55 | 6:55 | 12:55 | 18:55 | 1:00:55 |
| 15-min. | 12 | 1:00 | 1:15 | 1:15 | 1:15 | 1:30 | 1:45 | 2:00 | 4:00 | 6:00 | 7:00 | 13:00 | 19:00 | 1:01:00 |
| | 13 | 1:15 | 1:30 | 1:30 | 1:30 | 1:45 | 2:00 | 2:15 | 4:15 | 6:15 | 7:15 | 13:15 | 19:15 | 1:01:15 |
| | 14 | 1:30 | 1:45 | 1:45 | 1:45 | 2:00 | 2:15 | 2:30 | 4:30 | 6:30 | 7:30 | 13:30 | 19:30 | 1:01:30 |
| | 15 | 1:45 | 2:00 | 2:00 | 2:00 | 2:15 | 2:30 | 2:45 | 4:45 | 6:45 | 7:45 | 13:45 | 19:45 | 1:01:45 |
| | 16 | 2:00 | 2:15 | 2:15 | 2:15 | 2:30 | 2:45 | 3:00 | 5:00 | 7:00 | 8:00 | 14:00 | 20:00 | 1:02:00 |
| | 17 | 2:15 | 2:30 | 2:30 | 2:30 | 2:45 | 3:00 | 3:15 | 5:15 | 7:15 | 8:15 | 14:15 | 20:15 | 1:02:15 |
| | 18 | 2:30 | 2:45 | 2:45 | 2:45 | 3:00 | 3:15 | 3:30 | 5:30 | 7:30 | 8:30 | 14:30 | 20:30 | 1:02:30 |
| | 19 | 2:45 | 3:00 | 3:00 | 3:00 | 3:15 | 3:30 | 3:45 | 5:45 | 7:45 | 8:45 | 14:45 | 20:45 | 1:02:45 |
| | 20 | 3:00 | 3:15 | 3:15 | 3:15 | 3:30 | 3:45 | 4:00 | 6:00 | 8:00 | 9:00 | 15:00 | 21:00 | 1:03:00 |
| | 21 | 3:15 | 3:30 | 3:30 | 3:30 | 3:45 | 4:00 | 4:15 | 6:15 | 8:15 | 9:15 | 15:15 | 21:15 | 1:03:15 |
| | 22 | 3:30 | 3:45 | 3:45 | 3:45 | 4:00 | 4:15 | 4:30 | 6:30 | 8:30 | 9:30 | 15:30 | 21:30 | 1:03:30 |
| | 23 | 3:45 | 4:00 | 4:00 | 4:00 | 4:15 | 4:30 | 4:45 | 6:45 | 8:45 | 9:45 | 15:45 | 21:45 | 1:03:45 |
| | 24 | 4:00 | 4:15 | 4:15 | 4:15 | 4:30 | 4:45 | 5:00 | 7:00 | 9:00 | 10:00 | 16:00 | 22:00 | 1:04:00 |
| | 25 | 4:15 | 4:30 | 4:30 | 4:30 | 4:45 | 5:00 | 5:15 | 7:15 | 9:15 | 10:15 | 16:15 | 22:15 | 1:04:15 |
| | 26 | 4:30 | 4:45 | 4:45 | 4:45 | 5:00 | 5:15 | 5:30 | 7:30 | 9:30 | 10:30 | 16:30 | 22:30 | 1:04:30 |
| | 27 | 4:45 | 5:00 | 5:00 | 5:00 | 5:15 | 5:30 | 5:45 | 7:45 | 9:45 | 10:45 | 16:45 | 22:45 | 1:04:45 |
| | 28 | 5:00 | 5:15 | 5:15 | 5:15 | 5:30 | 5:45 | 6:00 | 8:00 | 10:00 | 11:00 | 17:00 | 23:00 | 1:05:00 |
| | 29 | 5:15 | 5:30 | 5:30 | 5:30 | 5:45 | 6:00 | 6:15 | 8:15 | 10:15 | 11:15 | 17:15 | 23:15 | 1:05:15 |
| | 30 | 5:30 | 5:45 | 5:45 | 5:45 | 6:00 | 6:15 | 6:30 | 8:30 | 10:30 | 11:30 | 17:30 | 23:30 | 1:05:30 |
| | 31 | 5:45 | 6:00 | 6:00 | 6:00 | 6:15 | 6:30 | 6:45 | 8:45 | 10:45 | 11:45 | 17:45 | 23:45 | 1:05:45 |
| 1-hr. | 32 | 6:00 | 7:00 | 7:00 | 7:00 | 7:00 | 7:00 | 7:00 | 9:00 | 11:00 | 12:00 | 18:00 | 1:00:00 | 1:06:00 |
| | 33 | 7:00 | 8:00 | 8:00 | 8:00 | 8:00 | 8:00 | 8:00 | 10:00 | 12:00 | 13:00 | 19:00 | 1:01:00 | 1:07:00 |
| | 34 | 8:00 | 9:00 | 9:00 | 9:00 | 9:00 | 9:00 | 9:00 | 11:00 | 13:00 | 14:00 | 20:00 | 1:02:00 | 1:08:00 |
| | 35 | 9:00 | 10:00 | 10:00 | 10:00 | 10:00 | 10:00 | 10:00 | 12:00 | 14:00 | 15:00 | 21:00 | 1:03:00 | 1:09:00 |
| | 36 | 10:00 | 11:00 | 11:00 | 11:00 | 11:00 | 11:00 | 11:00 | 13:00 | 15:00 | 16:00 | 22:00 | 1:04:00 | 1:10:00 |
| | 37 | 11:00 | 12:00 | 12:00 | 12:00 | 12:00 | 12:00 | 12:00 | 14:00 | 16:00 | 17:00 | 23:00 | 1:05:00 | 1:11:00 |
| | 38 | 12:00 | 13:00 | 13:00 | 13:00 | 13:00 | 13:00 | 13:00 | 15:00 | 17:00 | 18:00 | 1:00:00 | 1:06:00 | 1:12:00 |
| | 39 | 13:00 | 14:00 | 14:00 | 14:00 | 14:00 | 14:00 | 14:00 | 16:00 | 18:00 | 19:00 | 1:01:00 | 1:07:00 | 1:13:00 |
| | 40 | 14:00 | 15:00 | 15:00 | 15:00 | 15:00 | 15:00 | 15:00 | 17:00 | 19:00 | 20:00 | 1:02:00 | 1:08:00 | 1:14:00 |
| | 41 | 15:00 | 16:00 | 16:00 | 16:00 | 16:00 | 16:00 | 16:00 | 18:00 | 20:00 | 21:00 | 1:03:00 | 1:09:00 | 1:15:00 |
| | 42 | 16:00 | 17:00 | 17:00 | 17:00 | 17:00 | 17:00 | 17:00 | 19:00 | 21:00 | 22:00 | 1:04:00 | 1:10:00 | 1:16:00 |
| | 43 | 17:00 | 18:00 | 18:00 | 18:00 | 18:00 | 18:00 | 18:00 | 20:00 | 22:00 | 23:00 | 1:05:00 | 1:11:00 | 1:17:00 |
| | 44 | 18:00 | 19:00 | 19:00 | 19:00 | 19:00 | 19:00 | 19:00 | 21:00 | 23:00 | 1:00:00 | 1:06:00 | 1:12:00 | 1:18:00 |
| | 45 | 19:00 | 20:00 | 20:00 | 20:00 | 20:00 | 20:00 | 20:00 | 22:00 | 1:00:00 | 1:01:00 | 1:07:00 | 1:13:00 | 1:19:00 |
| | 46 | 20:00 | 21:00 | 21:00 | 21:00 | 21:00 | 21:00 | 21:00 | 23:00 | 1:01:00 | 1:02:00 | 1:08:00 | 1:14:00 | 1:20:00 |
| | 47 | 21:00 | 22:00 | 22:00 | 22:00 | 22:00 | 22:00 | 22:00 | 1:00:00 | 1:02:00 | 1:03:00 | 1:09:00 | 1:15:00 | 1:21:00 |
| | 48 | 22:00 | 23:00 | 23:00 | 23:00 | 23:00 | 23:00 | 23:00 | 1:01:00 | 1:03:00 | 1:04:00 | 1:10:00 | 1:16:00 | 1:22:00 |
| | 49 | 23:00 | 1:00:00 | 1:00:00 | 1:00:00 | 1:00:00 | 1:00:00 | 1:00:00 | 1:02:00 | 1:04:00 | 1:05:00 | 1:11:00 | 1:17:00 | 1:23:00 |
| 6-hrs. | 50 | 1:00:00 | 1:06:00 | 1:06:00 | 1:06:00 | 1:06:00 | 1:06:00 | 1:06:00 | 1:06:00 | 1:06:00 | 1:06:00 | 1:12:00 | 1:18:00 | 2:00:00 |
| | 51 | 1:06:00 | 1:12:00 | 1:12:00 | 1:12:00 | 1:12:00 | 1:12:00 | 1:12:00 | 1:12:00 | 1:12:00 | 1:12:00 | 1:18:00 | 2:00:00 | 2:06:00 |
| | 52 | 1:12:00 | 1:18:00 | 1:18:00 | 1:18:00 | 1:18:00 | 1:18:00 | 1:18:00 | 1:18:00 | 1:18:00 | 1:18:00 | 2:00:00 | 2:06:00 | 2:12:00 |
| | 53 | 1:18:00 | 2:00:00 | 2:00:00 | 2:00:00 | 2:00:00 | 2:00:00 | 2:00:00 | 2:00:00 | 2:00:00 | 2:00:00 | 2:06:00 | 2:12:00 | 2:18:00 |

TABLE 27-continued

| Interval | # | 0:00 | 0:05 | 0:10 | 0:15 | 0:30 | 0:45 | 1:00 | 3:00 | 5:00 | 6:00 | 12:00 | 18:00 | 1:00:00 |
|---|---|---|---|---|---|---|---|---|---|---|---|---|---|---|
| | | Interval Start Times at Example Next Interval Start Times | | | | | | | | | | | | |
| 1-day | 54 | 2:00:00 | 3:00:00 | 3:00:00 | 3:00:00 | 3:00:00 | 3:00:00 | 3:00:00 | 3:00:00 | 3:00:00 | 3:00:00 | 3:00:00 | 3:00:00 | 3:00:00 |
| | 55 | 3:00:00 | 4:00:00 | 4:00:00 | 4:00:00 | 4:00:00 | 4:00:00 | 4:00:00 | 4:00:00 | 4:00:00 | 4:00:00 | 4:00:00 | 4:00:00 | 4:00:00 |
| | 56 | 4:00:00 | 5:00:00 | 5:00:00 | 5:00:00 | 5:00:00 | 5:00:00 | 5:00:00 | 5:00:00 | 5:00:00 | 5:00:00 | 5:00:00 | 5:00:00 | 5:00:00 |
| Totals | 56 | 4:00:00 | 4:23:55 | 4:23:50 | 4:23:45 | 4:23:30 | 4:2315 | 4:23:00 | 4:21:00 | 4:19:00 | 4:18:00 | 4:12:00 | 4:06:00 | 4:00:00 |

Note 1:
All times in this table are presented in the format dd:hh:mm, where “dd”, “hh,” and “mm” are days, hours, and minutes after time 00:00:00.
Note 2:
The row “Totals” is (1) the total number of intervals (not IST) being represented and (2) the total amount of time represented within the given time series.

6.2.5 SubAppendix C: Toolkit Function Specification Template

This example template can be completed for each toolkit function and can be posted to a common library. The following template items are used in this template:

Function Name

Function Version and Date

Description—narrative description of what is to be performed or accomplished by the function Block Function Model—input parameters, output parameters, and actors Pseudo Code Implementation—parametric mathematical model or function that explains how function is implemented within the toolkit framework. Reference implementations that instantiate this named toolkit function should accomplish the algorithm that is laid out by this pseudo code. If that is for any reason impossible, another toolkit function should be named and described.

Reference Implementation(s) Available—example implementation code that instantiates this function. The implementations should be referenced here in proper, complete citations.

Future Improvements—recommend any future improvements that have been identified for this function.

6.2.6 SubAppendix C: Standard Advisory Output Control Signal

Each toolkit function that models a system of responsive assets is responsible to advise the system of assets when and to what degree it should respond. Each such toolkit function should therefore calculate a time series that states a degree of response for each current interval start time (IST). The recommendation has been summarized in FIG. 101.

The following advisory signal format can be used as a standard for toolkit functions. This method accommodates advisory responses from binary (curtailed vs. normal) to several discrete levels (e.g., response level #1, response level #2, . . . ) to a continuum of possible responses (e.g., generate at 56% of nameplate capacity for the specified interval).

The advisory signal has been defined as a signed value to allow its application to responsive loads, responsive generation, and energy storage resources. Positive values are used when the recommended control action should increase the availability of energy by either increasing generation or by reducing load; a negative number is used when the recommended control actions should reduce generation or increase load.

The signal is quite intentionally defined in respect to a byte representation. The three most significant bits have been highlighted in FIG. 101 to emphasize that these bits fully represent the eight states of any asset system that has four levels of response available to it (the additional bit represents charge/discharge direction). These bits may therefore be used quite directly by simple assets or asset systems that possess limited computational capability.

1. A signed byte value is assumed (e.g., a signed 8-bit representation [−127, 127]). (For symmetry, the value −128 has not assigned. In gate logic, the use of one’s complement interpretation of negative numbers accomplishes this symmetry and may be advantageous especially for controlling very simple, small assets.)

2. Positive values refer to generation [0, 127]; negative values refer to load [−0, −127].

3. The toolkit function is responsible to state a response level for each future interval, consistent with its modeled influences on transactive signals. If the asset system’s number of available response levels is known with certainty at the time the toolkit function is selected, the toolkit function may prescribe a representation for each response level.

4. The asset system, or alternatively “glue” code between the toolkit function and the asset system, is responsible to interpret the advisory signal. Interpretation of the advisory signal should be made by first dividing the respective generation or load range by the number of response levels that are available from the responsive asset system. Then the asset system may determine into which of its available levels the advisory signal belongs. If a continuum of available responses exists for this asset system, the full range of the continuum should be meaningfully applied to the full nameplate rating or total population, such that the signal range is applied to the entire available resource or load range.

Example #1

Suppose toolkit load function TKLF_1.4 has been selected to model the behavior of a set of wind turbines. The behaviors of these wind turbines are not elastic and would therefore not be expected to change their operations in respect to transactive control. This toolkit function should not calculate and send any advisory control signal to the set of wind turbines. The set of wind turbines should not expect to receive any advisory control signals.

Example #2

A toolkit load function is being designed to model a system of demand responsive water heaters. The system of water heaters should be curtailed as a group. One of the outputs from the toolkit load function is designed to be a time series of advisory signals selected from the domain {0, 127}, which members represent normal and curtailed operation, respectively, for this load. (In certain implementations, and as discussed herein, a series of 56 intervals can be used, where each interval is defined by its interval start time (IST). See, e.g., Subappendix A.) The selection of the extreme advisory signals for a load having only two levels is wise because the signals will prescribe a reasonable binary response regardless of the capabilities of the asset system to which the signal is sent. The curtailable water heater system looks for signals in the ranges [0, 63] (normal operation) or [64, 127] (curtailed operation). The range [−0, −127] should be ignored (e.g., normal operation) by this responsive asset system because it can only curtail its load; it cannot increase its load in response to transactive control signals.

Example #3

A toolkit load function is created for a small residential battery storage system that has only three available response levels—fully charging, resting, and fully discharging. The function should state a time series of advisory signals to the battery system, perhaps specifying from among a set of three outputs in the set {−127, 0, 127}, which represent the three states fully charging, resting, and fully discharging, respectively. The battery system should be configured to expect one of three ranges of advisory signals [−127, −64] (charging), [−63, 63] (resting), or [64, 127] discharging.

Example #4

Another toolkit load function is created to model a battery storage system, but this function expects to be paired with a battery system that can operate through a continuum of responses from fully charging to fully discharging. The function creates advisory signals accordingly at any integer value in the range [−127, 127]. The battery system converts these numbers into percentages of its range of charge and discharge rates, which is done easily by dividing through by the integer 127. For example, the advisory signal value 26 is converted to $26/127$, or 20.5% of its full available discharge rate.

Example #5

The small battery system of Example #3 is paired with the toolkit load function of Example #4. Even though the toolkit function calculates a continuum of responses, the battery system that has only three available response levels may nonetheless respond sensibly to the advisory signal that it receives. However, because the asset's responses do not match the responses that will have been modeled by the toolkit function, the toolkit function will not correctly predict the load (and generation) that will be supplied by this battery system.

6.2.7 SubAppendix D: Toolkit Functions

This subappendix lists and describes example toolkit functions that can be implemented in embodiments of the disclosed technology. Two types of toolkit functions have been defined:

(1) Resource and incentive toolkit functions—used to capture the influences of energy resources and other influences upon the transactive control and coordination system's incentive signal (e.g., the TIS)

(2) Load functions—used to capture the influence of both elastic (e.g., "responsive") and inelastic loads on the transactive control and coordination system's feedback signal (e.g., the TFS).

SubAppendix B provides a template by which the toolkit functions themselves and specific reference implementations of the toolkit functions should be documented. Thereafter, these toolkit functions may be selected from a "library" of such available toolkit functions and applied at any applicable transactive nodes.

The outputs of toolkit functions constitute an interoperability boundary as the project strives to standardize the information that flows from the toolkit functions into the toolkit framework at many levels of an interoperability information stack.

6.2.8 Resource and Incentive Toolkit Functions

The example resource and incentive toolkit functions listed in Table 28 are defined and represent as instantiations of 8. Calculate Applicable Toolkit Resource and Incentive Functions within the toolkit framework. Toolkit functions having the same name and number should share a common purpose and same general approach and should promise the same set of outputs into the toolkit framework. Versioning may be used for variants of these functions that differ slightly in approach, in complexity, or by the nature of expected inputs.

In Table 28, an attempt was made to organize the functions by type and level. Following this enumeration, Function 1.1.1 would be a special implementation of Function 1.1, which is a special implementation of Function 1.0.

Each toolkit function should be defined by appropriate documentation following the template in SubAppendix B.

TABLE 28

List of Resource and Incentive Toolkit Functions

| Name, No. & Version | Purpose | Where Applied | Inputs | Outputs |
|---|---|---|---|---|
| 1.0 Imported Electrical Energy | | | | |
| 1.1 Non-Transactive Imported Energy | Accommodate importation of electrical energy from outside this transactive node from entities that are not themselves | Peripheral transactive nodes that are scheduled to at times receive bulk electrical energy from outside the boundaries of | Current IST time series. Historical index price or cost information about this exchange, which can inform | Time series of energy exchange $P_G$ through this corridor using the current set of IST intervals. Time series of |

TABLE 28-continued

List of Resource and Incentive Toolkit Functions

| Name, No. & Version | Purpose | Where Applied | Inputs | Outputs |
|---|---|---|---|---|
| | transactive nodes-are not participants in this transactive control and coordination system. | this transactive control and coordination system. | simulation of current energy costs for this exchange of energy. Historical energy exchanges for this corridor. Alternatively, seasonally-adjusted daily and weekly exchange schedules from which simulations may be informed and improved. Intertie exchange schedules (may be estimated from an informed simulation). Price index that represents the current delivered cost of electrical energy through this exchange corridor if such current information can be obtained. Day of week and holiday schedules. | predicted cost of energy through this corridor $C_E$. |
| 1.2 Transactive Imported Energy | Converts transactive signals from transactive neighbors into framework parameter outputs that are expected by the toolkit framework. | A transactive node should restate the transactive signals that it receives in terms of toolkit framework parameters. This toolkit function is so basic that it may be treated as part of the toolkit framework. | Current IST time series. Transactive incentive signals (TIS) from each transactive neighbor. Transactive feedback signals (TFS) from each transactive neighbor. | TIS restated as energy terms $C_E$ . TFS restated as energy terms $P_G$ for the intervals during which the TFS represents imported energy. |
| 2.0 Renewable Energy Resource | | | | |
| 2.1 Wind Energy | Encourage use of wind-farm-scale energy when and near where it is generated. The cost of supplying renewable energy is applied as an infrastructure cost, not as an energy cost, in order to | Applicable to energy produced by a wind farm. May be applied to aggregated output from multiple wind farms. Use this function at transactive nodes where owners own or represent one | Current IST time series. Historical wind farm power output time series, which may be used to tune and refine predictions. Actual current wind farm power output, which may be used to tune and refine | Predicted average wind power $P_G$ using intervals of the current IST time series. Infrastructure cost time series $C_I$ using intervals of the current IST time series. (Infrastructure costs are not |

TABLE 28-continued

List of Resource and Incentive Toolkit Functions

| Name, No. & Version | Purpose | Where Applied | Inputs | Outputs |
|---|---|---|---|---|
| | encourage the consumption of wind energy. | or more wind farms. Transactive nodes that have and represent wind farm energy that is produced within their electrical boundaries. | predictions. Predicted wind speed and direction time series. Predicted relative humidity time series. Predicted air density time series. Predicted resource availability (accounts for effects of maintenance and curtailment shedding). Function that predicts wind farm power output from these conditions. Estimated amortized wind farm infrastructure expense, including operational and maintenance expenses, which estimates will be used to state the infrastructure parameter. If the costs of these specific wind farms are unavailable, secondary sources of such estimates may be used. (Infrastructure costs are probably the only costs that will be used by this function, so in some emobdiments, the infrastructure cost can be estimated from the total, long-term expense of supplying wind energy from the resource. By doing so, the effective cost of the wind energy will be incorporated over time using a meaningful cost.) | expected to be especially dynamic, but it is specified as a time series for consistency.) |
| 2.2 Solar Energy | Encourage use of solar energy when and near | Applicable to medium- or large-scale | Current IST time series. Historical solar | Predicted average solar power $P_G$ |

TABLE 28-continued

| List of Resource and Incentive Toolkit Functions | | | | |
|---|---|---|---|---|
| Name, No. & Version | Purpose | Where Applied | Inputs | Outputs |
| | where it is generated. The cost of supplying renewable energy is applied as an infrastructure cost, not as an energy cost, in order to encourage the consumption of solar energy. | solar generation. (Small solar sites may be better addressed as negative load toolkit functions, especially if such energy offsets and reduces load at this location.) Transactive nodes where owners own medium- or large-scale solar generation. Transactive nodes that have and represent the energy from solar sites within their electrical boundaries. | site power output time series, which may be used to tune and refine predictions. Actual current solar site power output, which may be used to tune and refine predictions. Predicted solar insolation time series. Predicted wind speed and direction time series. Predicted air density time series (may or may not be used). Predicted resource availability, which accounts for maintenance outages. Function that predicts solar power from these inputs. Estimated amortized solar site infrastructure expense, including operational and maintenance expenses, which estimates will be used to state the infrastructure parameter. If the costs of these specific solar sites are unavailable, secondary sources of such estimates may be used. Infrastructure costs are probably the only costs that will be used by this function, so in some embodiments, the infrastructure cost should be estimated from the total, long-term expense of supplying solar energy from the resource. By doing so, the effective cost of | using intervals of the current IST time series. Infrastructure cost time series $C_I$ using intervals of the current IST time series. (Infrastructure costs are not expected to be especially dynamic, but it is specified as a time series for consistency.) |

TABLE 28-continued

List of Resource and Incentive Toolkit Functions

| Name, No. & Version | Purpose | Where Applied | Inputs | Outputs |
|---|---|---|---|---|
| | | | the solar energy will be incorporated over time using a meaningful cost. | |
| 2.3 Hydropower | TBD, based on input expected from a hydropower working group that has been asked to formulate this function. Perhaps, encourage use of hydroelectric energy when and near where it is generated. This function should at least represent federal hydropower of the region but should strive to represent all regional hydropower. | Transactive nodes that own or represent hydropower generation. Transactive nodes that have or represent hydropower generation within their electrical boundaries. | Current IST time series. Scheduled hydropower generation production targets Actual hydropower generation, if available. Day of week and holidays. | Predicted average hydropower $P_G$ time series using the intervals of the current IST time series Predicted infrastructure cost time series $C_I$ using intervals of the current interval start time (IST) series. (Infrastructure costs are not expected to be especially dynamic, but it is specified as a time series for consistency.) |
| 3.0 Fossil Generation | Represent effect of fossil-fuel generation on electrical energy cost. | Transactive nodes that own or represent fossil generation. May be used for aggregated sets of fossil generation resources. Should apply to fossil generation within the electrical boundary of a transactive node. | Current IST time series. Predicted cost of fuel, which may be either constant or a dynamic time series, depending on the fuel. Generator dispatch schedule(s). Fuel heating value (probably a constant). Plant efficiency (probably a constant, but may be a function of generated power and other inputs). Outdoor temperature time series. Input feed temperature time series. Representative amortized infrastructure cost. (In some cases, the infrastructure costs will be stated as functions of many variables, including local | Predicted average generated power $P_G$ time series using the intervals of the current IST time series. Corresponding predicted energy costs of generated power $C_E$ using the intervals of the current IST time series. Predicted infrastructure cost $C_I$ time series using the intervals of the current IST time series. (Infrastructure cost is not expected to be especially dynamic, but it is specified as a time series for consistency.) |

TABLE 28-continued

List of Resource and Incentive Toolkit Functions

| Name, No. & Version | Purpose | Where Applied | Inputs | Outputs |
|---|---|---|---|---|
| | | | costs of money, taxes, regulations, etc.) Function by which inputs are used to predict power output. Day of week and holidays. | |
| 4.0 General Infrastructure Cost | Represent bulk influence of infrastructure investments on delivered cost of electrical energy where it might be impracticable to track individual infrastructure components. | Almost every transactive node could use this function. | TBD. Estimate of present infrastructure value amortized over an applicable horizon. Calculation should include effects of local influences like a utility's normal estimate of useful equipment lifetime. Estimates should be calibrated against known ways in which long-term infrastructure costs are addressed. | Infrastructure cost time series $C_I$. |
| 5.0 System Constraints | | | | |
| 5.1 Transmission Flowgate | Discourage consumption downstream from, and encourage consumption upstream from, a flowgate transmission constraint. Costs should be grounded somehow in actual costs that would be incurred if flowgate constraints were to be violated. | Transmission zone transactive nodes on either side of a flowgate. | Predicted flowgate power. Formula by which flowgate power will affect TIS each transactive node. Additional inputs may be considered for future versions, but the initial version should be kept very simple. | Capacity cost $C_C$ and corresponding flowgate capacity $P_C$. |
| 5.2 Equipment and Line Constraints | Discourage consumption of energy downstream from constrained distribution equipment, including distribution lines. | Transactive nodes that are in a position to mitigate their constraints by increasing the delivered cost of energy to downstream transactive nodes. Intended to be used where constraints | Predicted capacity to which this function applies. Function which estimates the cost impacts of exceeding the capacity constraint. | Predicted capacity cost time series $C_C$ and corresponding capacity time series $P_C$. |

TABLE 28-continued

List of Resource and Incentive Toolkit Functions

| Name, No. & Version | Purpose | Where Applied | Inputs | Outputs |
|---|---|---|---|---|
| | | may be correlated to specific equipment. Does not apply to transmission flowgates. | | |
| 6.0 System Energy Losses | | | | |
| 6.1 Transmission Losses | Incorporate the effect of line losses on cost of delivered energy in transmission zones | Presently a low priority. Intended for application in transmission zones. May be defined and applied for major transmission across transmission zone transactive nodes. | Function by which TFS and non-transactive imported and exported power indicate long-distance transmission losses across a transmission zone. Representative fraction of transmitted power to be lost, which may be applied as a representative resistance at a stated transmission voltage. | Lost energy term of type $P_G$. |
| 6.2 Distribution Losses | Incorporate the effect of line losses on cost of delivered energy in distribution and other locations where specific lossy equipment can be identified. Reflects that the value of dissipated energy is lost. | Presently a low priority. Intended for application in the topology at locations other than transmission zones. Applied where losses may be attributed to specific equipment or systems. | Function by which TFS and non-transactive imported and exported power can be used to define energy losses in specific equipment or systems. | Lost energy term of type $P_G$. |
| 7.0 Demand Charges | | | | |
| 7.1 BPA Demand Charges | Utility transactive node takes steps to manage peak loads that may incur demand charges. Help a utility reduce its monthly peak. | Subproject transactive nodes where owners are utilities that are subject to demand charges from BPA. | Predicted capacity to which demand charges may apply. Historical utility load during the current month, including prior peak hour. Function by which cost impact of | Capacity time series $P_C$ that causes the demand charges. Capacity cost time series $C_C$ that corresponds to the capacities. (The capacities may, or may |

TABLE 28-continued

List of Resource and Incentive Toolkit Functions

| Name, No. & Version | Purpose | Where Applied | Inputs | Outputs |
|---|---|---|---|---|
| | | | capacity may be predicted. Day of week and holidays. | not, also be TFS values, depending on the boundaries of a given transactive node.) |
| 7.2 Seattle City Light Demand Charges | This function predicts the impact of demand charges that the Seattle City Light (SCL) will apply to the University of Washington (UW) | UW's transactive node. | SCL peak demand rate [$/kW] SCL off-peak demand rate [$/kW] Transactive Feedback Signal (TFS) [kW] Interval Start Times (ISTs) A scaling factor K by which the effect of the demand charges may be scaled. | Average power capacity P_C as defined by the Transactive Node Framework [kW]. Capacity cost C_C as defined by the Transactive Node Framework [$/kW]. |
| 8.0 Market Impacts | | | | |
| 8.1 Spot Market Impacts | Utility transactive node takes steps to mitigate (optimize) the predicted impacts that it will likely incur on spot markets. | Subproject transactive nodes where owners are utilities that are subject to the impacts of spot market trading. | TBD. Perhaps, predicted capacity to which spot market impacts may apply. | TBD. Perhaps, capacity time series $P_C$ that causes the spot market impacts and capacity cost time series $C_C$ that corresponds to the capacities. This function might use other cost time series $C_O$ if it cannot be stated in terms of energy, capacity, or infrastructure. |

6.2.9 Load Toolkit Functions

Load toolkit functions are instantiated as 6. Calculate Applicable Toolkit Load Functions within the toolkit framework. The load being described by these functions may be either elastic (responsive to the TIS) or inelastic (not responsive to the TIS). These functions should not have direct influence and effect on the calculation of TIS as this transactive node; functions that will affect the formulation of TIS should be stated as resource or incentive toolkit functions.

The Demonstration attempts to define and use a minimum adequate set of load toolkit functions. Therefore, implementers should select and apply the most general function that can describe the expected behaviors. In Table 29, an attempt was made to organize the functions by type and level. Following this enumeration, Function 1.1.1 would be a special implementation of Function 1.1, which is a special implementation of Function 1.0. Function 1.0 is more general that is the Function 1.1 under it.

The most general functions have been stated as

1. Bulk inelastic load—large sets of load that is not affected by the TIS

2. General event-driven demand response (DR)—sets of asset systems that are infrequently affected by the TIS. These asset systems are affected in a binary, on/off way or occasionally provide a limited number of discrete response levels. Specific examples may include distribution voltage control, water heater programs, smart appliance programs, and distributed generation.

3. General time-of-use (TOU) DR—sets of asset system that are affected by the TIS according to a daily cycle. These asset systems are affected in a binary, on/off way or occasionally provide a limited number of discrete response levels. Examples may include distribution voltage control, water heater programs, smart appliance programs, and battery storage.

General real-time (RT) DR—sets of asset systems that are affected by the TIS and employ a continuum of possible responses. Examples may include energy portals and battery storage.

TABLE 29

| List of Load Toolkit Functions | | | | |
|---|---|---|---|---|
| Name, No. & Version | Purpose | Where Applied | Inputs | Outputs |
| 1.0 Bulk Inelastic Load | Predict bulk, undifferentiated inelastic load in the most general sense. | Transactive nodes where it is preferred to predict undifferentiated bulk load. Places where specific models to predict the behaviors of differentiated load components are not possessed. Nearly every subproject could use this function. | Current IST time series. (LI_01) Historical load for this modeled population (LI_02) Present load (average power) for this population of inelastic load (LI_03) Predicted outdoor temperature time series (LI_04) Predicted insolation time series (LI_05) Predicted wind speed and direction time series (LI_06) Weekday, weekend day, and holiday indicator (LI_08) Typical seasonally-adjusted daily load profile (LI_07) Average daily load (a constant for the prediction horizon) | Predicted inelastic load for each current IST interval. |
| 1.1 Bulk Commercial Load | Predict the load of bulk inelastic commercial load. May be used to represent sets of aggregated commercial loads, even ones with diverse membership. Does not model underlying commercial buildings and processes. This model does not include elastic behaviors that would be expected to respond to a TIS. | Transactive nodes that represent inelastic electrical load from aggregated commercial loads. Most subproject transactive nodes will use this function. | Current IST time series. (LI_01) Historical load (LI_02) Actual measured load (LI_03) Predicted outdoor temperature time series (LI_04) Predicted insolation time series (LI_05) Predicted wind speed and direction time series (LI_06) Day of week and holidays (LI_07) Average daily load (constant during the prediction horizon) (LI_08) Typical daily load profile | Predicted inelastic load for each current IST interval. |

TABLE 29-continued

| List of Load Toolkit Functions | | | | |
|---|---|---|---|---|
| Name, No. & Version | Purpose | Where Applied | Inputs | Outputs |
| 1.2 Bulk Industrial Load | Predict the load of bulk industrial load types. Does not model underlying industrial processes. | Transactive nodes that represent electrical load from aggregated industrial loads. This function does not require underlying industrial processes to be understood and modeled. May be applied to multiple aggregated industrial loads. Many subproject transactive nodes that include industrial loads may choose to use this function. | Current IST time series. (LI_01) Historical load (LI_02) Actual measured load (LI_03) Predicted outdoor temperature time series (LI_04) Predicted insolation time series (LI_05) Predicted wind speed and direction time series (LI_06) Day of week and holidays (LI_07) Average daily load (a constant during the prediction horizon) (LI_08) Typical daily load profile (LI_09) Fractional representation of common commercial building types | Predicted inelastic load for each current IST interval. |
| 1.3 Bulk Residential Load | Predict the load of bulk residential load type. Predict load of residential feeders or groups of residential feeders. Does not necessarily model individual residences or the underlying behaviors of homes and their occupants. Models inelastic residential load only. | Transactive nodes that wish to represent electrical load for groups of residences like those on residential feeders. Applied to residential loads that are not responsive to the TIS (e.g., inelastic residential populations). Individual residences and underlying resident behaviors are not modeled. Almost every subproject transactive node is expected to use this function for its residential customers who do not respond elastically. | Current IST time series. (LI_01) Historical load (LI_02) Actual measured load (LI_03) Predicted outdoor temperature time series (LI_04) Predicted insolation time series (LI_05) Predicted wind speed and direction time series (LI_06) Day of week and holidays (LI_10) Number of single- and multiple-family units | Predicted inelastic load for each current IST interval. |

TABLE 29-continued

List of Load Toolkit Functions

| Name, No. & Version | Purpose | Where Applied | Inputs | Outputs |
|---|---|---|---|---|
| 1.4 Small Wind Generator Negative Load | Predict the "negawatts" to be produced by small wind energy resources. This function is preferred where a relatively small amount of wind renewable generation offsets load at a location. If the energy from a wind energy resource should affect TIS at this and electrically downstream locations, the energy from this resource should be incorporated with a resource and incentive toolkit function instead (See Table 28:). | Locations that host relatively small wind generators or wind sites that primarily offset a larger electrical load. | Current IST time series. (LI_11) Historical power production time series (LI_12) Predicted wind speed and direction time series for a representative tower height (LI_13) Historical wind speed and direction at a representative tower height near the wind generation (LI_14) Measured wind speed and direction at a representative tower height near the generation site (LI_15) Historical relative humidity time series (LI_16) Predicted relative humidity time series (LI_17) Historical air density time series (LI_18) Predicted air density time series (LI_X) Effective total cross-sectional area (LI_X) Wind conversion efficiency curve (LI_19) Season, or day of year (LI_20) Total nameplate or "typical" power capacity (LI_X) Predicted resource availability | Time series output power for each IST interval. This is an inelastic load component because it is not a function of the TIS. No control output is sent to renewable generators. Renewable generators are not responsive to the transactive control and coordination system. |
| 1.5 Small-Scale Distributed Generator Negative Load | Predict and represent "negawatts" load from one or more relatively small distributed generators that consume hydrocarbon fuels at this location. These generators are not influenced by | Locations that host relatively small fossil fuel generators that are not influenced in their operation by the TIS. | Current IST time series. (LI_01) Historical power production (IL_X) Resource schedule (LI_20) Nameplate or target power production magnitude. (LI_6) Day of week and holidays (LI_IX) Predicted resource availability | Time series output power for each IST interval. Distributed generators of this toolkit function are not responsive to the transactive control and coordination system, but they may respond to other purposes and objectives |

TABLE 29-continued

List of Load Toolkit Functions

| Name, No. & Version | Purpose | Where Applied | Inputs | Outputs |
|---|---|---|---|---|
| | the TIS. If the influence of a distributed generator should directly affect the TIS at a transactive node, select an appropriate source and incentive toolkit function from Table 28:. | | | of their owners (e, g., periodic maintenance schedules, feedstock availability). No control output is sent to these distributed generators. |
| 1.6 Small-Scale Solar Generator Negative Load | Predict the "negawatts" to be produced by small solar energy resources. This function is preferred where a relatively small amount of solar renewable generation offsets load at a location. If the energy from a solar energy resource should affect TIS at this and electrically downstream locations, the energy from this resource should be incorporated with a resource and incentive toolkit function instead (See Table 29). | Locations that host relatively small solar generators that primarily offset a larger electrical load. | Current IST time series. (LI_01) Historical power production (LI_??) Historical insolation time series (LI_04) Predicted insolation time series (LI_??) Historical wind speed and direction time series (LI_05) Predicted wind speed and direction time series. (LI_15) Historical relative humidity time series (LI_16) Predicted relative humidity time series. (LI_17) Historical air density time series (LI_18) Predicted air density time series (LI_19) Monthly typical energy (LI_20) Total nameplate or "typical" power capacity (LI_??) Predicted resource availability (LI_??) Solar Conversion Efficiency Curve | Time series average output power for each IST interval. No control output is sent to renewable generators. Renewable generators are not responsive to the transactive control and coordination system. |
| 2.0 General Event-Driven Demand Response | Most general function for predicting the behaviors of responsive load assets that only infrequently respond. | Applicable to many responsive asset systems that conduct traditional demand response several times a month. | Current IST time series. Recent history (e.g., 1 day to 1 week) of TIS that may be used if relative TIS is to be tracked in a statistical sense. (LI_01) Historical | Predicted inelastic load at for each IST interval. Predicted change in elastic load for each IST interval. |

TABLE 29-continued

| List of Load Toolkit Functions | | | | |
|---|---|---|---|---|
| Name, No. & Version | Purpose | Where Applied | Inputs | Outputs |
| | When these assets respond they change between a very limited number of available response levels. It is postulated that this function can be designed flexibly to respond to absolute or relative TIS as desired by the application. | Response may additionally define a "critical" response level for extreme conditions. | load time series (LI_02) Actual measured load TIS time series. (LI_??) Device count (LI_06) Day of week and holidays (LI_08) Daily load profile (L1_28) Minimum event duration (LI_29) Promised event count or frequency that has been negotiated with customers. (LI_30) Limitations on event duration that have been promised to customers. | |
| 2.1 Commercial Event-Driven Demand Response | Represent especially the change in elastic response from commercial entities that are performing lighting, space conditioning, or other control of commercial buildings. | Asset systems such as thermostats, water heaters, and HVACs. | Current IST time series. See 1.1 Bulk Commercial Loads. The inputs that have been defined for function 1.1 Bulk Commercial Loads are again used to predict the inelastic load component of the commercial load to be modeled by this function. Additionally, the following inputs may be used to model the change in elastic load: TIS time series. Recent history (e.g., 1 day to 1 week) of TIS that may be used if relative TIS is to be tracked in a statistical sense. (LI_??) Device Count (LI_29) Promised event count or frequency that has been negotiated with customers. (LI_30) Limitations on event duration that have been promised to customers. (LI_31) Representative unit changes in | Predicted inelastic load at for each IST interval. Predicted change in elastic load for each IST interval. Predicted time series of output advisory control signals. See SubAppendix C. (Default expects two load levels specified by the domain {0, 127}). The set of output signals may be parametrically modified based on the number of available response levels, a static input. |

TABLE 29-continued

| List of Load Toolkit Functions | | | | |
|---|---|---|---|---|
| Name, No. & Version | Purpose | Where Applied | Inputs | Outputs |
| | | | power that will occur at prescribed response levels. (LI_??) Number of response levels available from asset system. | |
| 2.2 Event-Driven Distribution System Voltage Control | To be used where subprojects of the Demonstration have offered to modulate distribution system voltage in response to relatively extreme conditions of the TIS. This function should include the option where the degree of voltage change is affected by feedback from measurements of voltage at various feeder locations. Regardless, utilities should keep customer voltage within accepted ranges. | Many subproject locations of the Demonstration that implement conservation voltage regulation (CVR) or voltage optimization and have offered to make system voltage responsive to the TIS. | Current IST time series. (LI_01) Historical load TIS time series. (LI_32) Present actual voltage regulation level Current IST time series (LI_35) Implementer's criteria concerning how often and how long voltage may be affected at each level. Note that this input may probably be adequately represented by input types LI_29 and LI_30. (LI_36) Day-long hourly time series of relative fractions of load that are constant impedance, constant current, and constant power, respectively (LI_??) Number of response levels available from asset system. | Predicted inelastic load at for each IST interval. Predicted change in elastic load for each IST interval. Predicted time series of output advisory control signals. See SubAppendix C. (Default expects two load levels specified by the domain {0, 127}). The set of output signals may be parametrically modified based on the number of available response levels, a static input. |
| 2.4 Residential Event-Driven Demand Response | | Asset systems. | See 1.3 Bulk Residential Load. The inelastic residential load component may use the same inputs as were used for function 1.3 Bulk Residential Load. The following additional inputs may be used to predict changes in the elastic load component: TIS time series Current IST time series (LI_20) Total nameplate or "typical" power capability (of devices to be curtailed) | Predicted inelastic load at for each IST interval. Predicted change in elastic load for each IST interval Predicted time series of output advisory control signals. See SubAppendix C. (Default expects two load levels specified by the domain {0, 127}). The set of output signals may be parametrically modified based on the number of available |

TABLE 29-continued

| List of Load Toolkit Functions | | | | |
|---|---|---|---|---|
| Name, No. & Version | Purpose | Where Applied | Inputs | Outputs |
| | | | (LI_??) Hourly curtailable power (LI_??) Device count (LI_28) Minimum Event Duration (LI_29) Promised Event Count or Frequency (LI_30) Limitations on Curtailment Event Duration (LI_31) Representative Changes in Power at Prescribed Response Levels (LI_??) Actual Number of Times that Actuation has Already Occurred in each Relevant Time Period (LI_??) Actual duration that actuation has already occurred in each relevant time period (LI_??) Number of response levels available from asset system. | response levels, a static input. |
| 2.5 Non-Renewable Distributed Generation Event-Driven Demand Response | | Asset systems. | (LI_01) Historical Load or Generation (LI_02) Actual Measured Load or Generation (LI_06) Day of Week and Holiday (LI_07) Average Daily Load or Generation (LI_08) Daily Load or Generation Profile (LI_19) Monthly Typical Energy (LI_??) Resource Schedule TIS time series (LI_??) Device Count (LI_20) Total nameplate or "typical" power capability (of devices to be curtailed) (LI_??) Hourly curtailable power (LI_??) Device count | Predicted inelastic load at for each IST interval. Predicted change in elastic load for each IST interval Predicted time series of output advisory control signals. See SubAppendix C. (Default expects two load levels specified by the domain {0, 127}). The set of output signals may be parametrically modified based on the number of available response levels, a static input. |

TABLE 29-continued

| List of Load Toolkit Functions | | | | |
|---|---|---|---|---|
| Name, No. & Version | Purpose | Where Applied | Inputs | Outputs |
| | | | (LI_28) Minimum Event Duration (LI_29) Promised Event Count or Frequency (LI_30) Limitations on Curtailment Event Duration (LI_31) Representative Changes in Power at Prescribed Response Levels (LI_??) Actual Number of Times that Actuation has Already Occurred in each Relevant Time Period (LI_??) Actual duration that actuation has already occurred in each relevant time period (LI_??) Number of response levels available from asset system. | |
| 3.0 General Time-of-Use Demand Response | Most general function for predicting responsive load behaviors of groups of devices that respond to diurnal variability in the TIS (e.g., respond to one or more daily intervals) | Applicable at locations that host simple DR systems that should respond daily. | See function 1.0 Bulk Inelastic Load. The inputs from 1.0 Bulk Inelastic Load are also useful by this function for predicting the inelastic load component. Additionally, the following inputs will be useful for the prediction of changes in elastic load component: TIS time series (LI_??) Device Count (LI_28) Minimum Event Duration (LI_29) Promised Event Count or Frequency (LI_30) Limitations on Curtailment Event Duration (LI_31) Representative Changes in Power at Prescribed Response Levels (LI_??) Actual | Predicted inelastic load at for each IST interval. Predicted change in elastic load for each IST interval. Predicted time series of output advisory control signals. See SubAppendix C. (Default expects two load levels specified by the domain {0, 127}). The set of output signals may be parametrically modified based on the number of available response levels, a static input. |

TABLE 29-continued

List of Load Toolkit Functions

| Name, No. & Version | Purpose | Where Applied | Inputs | Outputs |
|---|---|---|---|---|
| | | | Number of Times that Actuation has Already Occurred in each Relevant Time Period (LI_??) Actual duration that actuation has already occurred in each relevant time period (LI_??) Hourly Unit Expected Change in Power at Event Levels (LI_??) Number of response levels available from asset system. | |
| 3.1 Battery Storage-Time-of-Use | Represent behaviors of battery storage systems that are engaged with a daily pattern, usually to mitigate daily peak. Battery is fully charging, fully discharging, or resting. | Locations that host usually small battery systems controlled simply on a diurnal pattern. Presently, no transactive nodes claim to be applying battery systems in this way. | (LI_01) Historical Load or Generation (LI_02) Actual Measured Load or Generation (LI_20) Total Nameplate or "Typical" Power Capacity (LI_??) Device Count (LI_28) Minimum Event Duration (LI_29) Promised Maximum Event Count or Frequency (LI_30) Limitations on Maximum Event Duration (LI_31) Representative Changes in Power at Prescribed Response Levels (LI_??) Actual Number of Times that Actuation has Already Occurred in each Relevant Time Period (LI_??) Actual duration that actuation has already occurred in each relevant time period (LI_41) Predicted Resource Fractional Availability Current IST time series. TIS time series. | Predicted inelastic load at for each IST interval. This will normally be zero, assuming that the battery charges and discharges only for economic reasons and according to the condition of the TIS signal. Predicted change in elastic load for each IST interval. Predicted time series of output advisory control signals. See SubAppendix C. (Default expects three load levels specified by the domain {−127, 0, 127}). The set of output signals may be parametrically modified based on the number of available response levels, a static input. |

TABLE 29-continued

| List of Load Toolkit Functions | | | | |
|---|---|---|---|---|
| Name, No. & Version | Purpose | Where Applied | Inputs | Outputs |
| | | | (LI_??) Battery state of charge. (LI_??) Useful Energy Storage Capacity (LI_??) Number of response levels available from asset system. | |
| 3.2 Commercial Time-of-Use Demand Response | Represent effects of predominantly commercial lighting and space conditioning programs that respond to one or several daily peak periods. | Transactive nodes that offer commercial system responses for addressing daily peak. | See 1.1 Bulk Commercial Loads. This function may use the same inputs as function 1.1. Bulk Commercial Loads as it predicts the inelastic component of its load. These additional inputs may be used to calculate the change in the elastic component of this function's load: TIS time series. (LI_??) Device Count (LI_28) Minimum Event Duration (LI_29) Promised Event Count or Frequency (LI_30) Limitations on Curtailment Event Duration (LI_31) Representative Changes in Power at Prescribed Response Levels (LI_??) Actual Number of Times that Actuation has Already Occurred in each Relevant Time Period (LI_??) Actual duration that actuation has already occurred in each relevant time period (LI_??) Hourly Unit Expected Change in Power at Event Levels (LI_??) Number of response levels available from asset system. | Predicted inelastic load at for each IST interval. Predicted change in elastic load for each IST interval. Predicted time series of output advisory control signals. See SubAppendix C. (Default expects two load levels specified by the domain {0, 127}). The set of output signals may be parametrically modified based on the number of available response levels, a static input. |

TABLE 29-continued

List of Load Toolkit Functions

| Name, No. & Version | Purpose | Where Applied | Inputs | Outputs |
|---|---|---|---|---|
| 3.4 Residential Time-of-Use Demand Response | Predict and represent response from automated residential demand-response systems of many types that will respond approximately daily to help mitigate peak conditions. This function applied to automated responses and may accommodate customer opt-out. | Applied where programmable, communicating thermostats; smart appliances, demand-response switch units, or other assets are installed in residences and where programs are designed to have these systems respond to daily peak periods. Asset systems such as water heater control, thermostat load control. | See 1.3 Bulk Residential Load. This function may use the same inputs as for 1.3 Bulk Residential Load to predict the inelastic component of its load. The following additional inputs may be used to predict the change in elastic load: TIS time series. (LI_??) Device Count (LI_28) Minimum Event Duration (LI_29) Promised Event Count or Frequency (LI_30) Limitations on Curtailment Event Duration (LI_31) Representative Changes in Power at Prescribed Response Levels (LI_??) Actual Number of Times that Actuation has Already Occurred in each Relevant Time Period (LI_??) Actual duration that actuation has already occurred in each relevant time period (LI_??) Hourly Unit Expected Change in Power at Event Levels (LI_??) Number of response levels available from asset system. | Predicted inelastic load at for each IST interval. Predicted change in elastic load for each IST interval. Predicted time series of output advisory control signals. See SubAppendix C. (Default expects two load levels specified by the domain {0, 127}). The set of output signals may be parametrically modified based on the number of available response levels, a static input. |
| 3.5 Time-of-Use Distribution System Voltage Control | Similar to toolkit function 2.2, except voltage may be controlled according to daily on- and off-peak periods. | Applicable where voltage is controlled at two or more levels according to the value of the TIS and other inputs and where responses of the asset have been designed to | Current IST time series. Historical power consumption TIS time series. TIS threshold(s), which may further be parametrically affected. (LI_??) Number of response levels available from asset | Predicted inelastic load at for each IST interval. Predicted change in elastic load for each IST interval. Predicted time series of output advisory control signals. See |

TABLE 29-continued

| List of Load Toolkit Functions | | | | |
|---|---|---|---|---|
| Name, No. & Version | Purpose | Where Applied | Inputs | Outputs |
| | | occur according to daily on-and off-peak periods. | system. | SubAppendix C. (Default expects two load levels specified by the domain {0, 127}). The set of output signals may be parametrically modified based on the number of available response levels, a static input. |
| 3.6 Time-of-Use Electric Vehicle Charging | | Asset systems such as vehicle charging. | See 3.1 Battery Storage-Time-of-Use. This function is expected to use the same inputs as does 3.1 Battery Storage-Time-of-Use. Additionally, these inputs may be used because of the special characteristics of electric vehicles: (LI_??) Time at Which Energy Storage Should be Fully Charged (LI_??) Number of response levels available from asset system. | Predicted inelastic load at for each IST interval. Predicted change in elastic load for each IST interval Predicted time series of output advisory control signals. See SubAppendix C. (Default expects two load levels specified by the domain {0, 127}). The set of output signals may be parametrically modified based on the number of available response levels, a static input. |
| 3.7 Non-Renewable Distributed Generation Time-of-Use Demand Response | This function predicts the response from a non-renewable distributed generator demand-response system that will respond approximately daily to help mitigate peak conditions that are evident in an incentive signal. | Asset systems. | Maximum allowed rate of change in generated power Number of response levels to be prescribed for this asset system Typical fraction of time that each response level/ should be active during a day Minimum time duration for which an event level/should remain in force for this day type after it has become initiated Maximum total event duration permitted per day type and per event allowed for each event level/ | Predicted inelastic load (generation) from this asset system Predicted average change in elastic load for each IST interval Predicted time series of output advisory control signals. See SubAppendix C. (Default expects two load levels specified by the domain {0, 127}). The set of output signals may be parametrically modified based on the number of available |

TABLE 29-continued

| List of Load Toolkit Functions | | | | |
|---|---|---|---|---|
| Name, No. & Version | Purpose | Where Applied | Inputs | Outputs |
| | | | Limitations on the minimum number of TOU events that may be called during the three major day types for each response level/ Limitations on the maximum number of TOU events that may be called during the three major day types for each response level/ Recent history of TIS Current TIS for future IST intervals Typical baseline power that is generated during UTC hour h of a weekday day type by this distributed generation resource Typical baseline power that is generated during hour h of a weekend day by this distributed generation resource Change in generation that may be anticipated at each of the L response levels | response levels, a static input. |
| 4.0 General Real-time Continuum Demand Response | Most general function for predicting responsive load behaviors of groups of devices that respond according to a continuum of possible responses. | Applicable at locations that host simple RT systems. | Current IST time series. Historical power consumption TIS time series. Parametric algorithm by which change in elastic load may be predicted. | Predicted inelastic load at for each IST interval. Predicted change in elastic load for each IST interval. Predicted time series of output advisory control signals. See SubAppendix C. (Default expects a continuum of advisory levels [0, 127]). |

TABLE 29-continued

| List of Load Toolkit Functions | | | | |
|---|---|---|---|---|
| Name, No. & Version | Purpose | Where Applied | Inputs | Outputs |
| 4.1 Battery Storage-Real-Time | Predict and represent the response and condition of a battery system is highly responsive to the dynamic changes in the TIS and that responds using a continuum of charge and discharge levels. | Applicable to battery storage systems that respond very dynamically to the TIS and other local conditions and provide also a continuum of charge and discharge levels. Asset systems such as Demand Shifters and distribution batteries. | Current IST time series. Historical power consumption, generation patterns TIS time series. Parametric algorithm by which change in elastic load may be predicted. State of charge. Limitations on maximum charge and discharge levels. | Predicted inelastic load at for each IST interval. Predicted change in elastic load for each IST interval. Predicted time series of output advisory control signals. See SubAppendix C. (Default expects a continuum of advisory levels [−127, 127]). |
| 4.2 Commercial Real-Time Demand Response | Predict and represent dynamic commercial demand-response systems that observe the full dynamics of the TIS (and other information) and dynamically respond using a continuum of possible control outcomes. | Mostly applicable to commercial space heating but may be applicable to other commercial devices that observe the full dynamics of the TIS (and other information) and respond with a continuum of possible control outcomes (e.g., temperature settings). | Current IST time series. Historical power consumption TIS time series Parametric algorithm by which change in elastic load may be predicted | Predicted inelastic load at for each IST interval. Predicted change in elastic load for each IST interval. Predicted time series of output advisory control signals. See SubAppendix C. (Default expects a continuum of advisory levels [0, 127]). |
| 4.3 Real-Time Distribution System Voltage Control | | Asset systems. | | Predicted inelastic load at for each IST interval. Predicted change in elastic load for each IST interval Predicted time series of output advisory control signals. See SubAppendix C. (Default expects a continuum of advisory levels [0, 127]). |
| 4.5 Residential Real-Time Demand Response | Predict and represent responses from the most dynamic of residential demand-response system that observe the | Applicable where residential customers possess space conditioning systems that observe the dynamics of the TIS and | Current IST time series. Historical power consumption TIS time series Parametric algorithm by which change in elastic load may be predicted Day and time of | Predicted inelastic load at for each IST interval. Predicted change in elastic load for each IST interval. Predicted time series of |

TABLE 29-continued

List of Load Toolkit Functions

| Name, No. & Version | Purpose | Where Applied | Inputs | Outputs |
|---|---|---|---|---|
| | dynamics of the TIS (and other information) and automatically respond with any of a continuum of possible responses. | provide a continuum of responses. Asset systems. | day | output advisory control signals. See SubAppendix C. (Default expects a continuum of advisory levels [0, 127]). |
| 5.0 General Manual or Behavioral Demand Response | | | (LI_??) Number of response levels available from asset system. | Predicted inelastic load at for each IST interval. Predicted change in elastic load for each IST interval. Predicted time series of output advisory control signals. See SubAppendix C. (Default expects a continuum of advisory levels [0, 127]). |
| 5.1 Residential Behavioral Response to Portals or In-Home Displays | Special case of toolkit load function 5.0 where the means of conveying demand-response information or requests to residents is either an in-home display or energy portal. An energy portal or in-home-display is a dedicated piece of equipment for the conveyance of demand-response information or advice. The actuation of energy responses is not automated by this function, but the means by which the customer is informed or advised should be automated. | Applicable where residential customers have been provided in-home displays or portals that display the TIS. Asset systems. | Current IST time series. Prediction of the inelastic load output may use the same inputs as were described for function 1.0 Bulk Inelastic Load. Refer to that function. Where the load is predominantly residential, commercial, or industrial, the designer should refer to the respective functions 1.1, 1.2 or 1.3. The following additional inputs are used to predict the change in elastic load: TIS time series. (LI_??) Number of response levels available from asset system. | Predicted inelastic load at for each IST interval. Predicted change in elastic load for each IST interval. Variant #1-continuum: Current TIS signal is relayed to the portal or in-home display. Variant #2-discrete levels: Predicted time series of output advisory control signals are sent to in-home display or portal that convey discrete response levels for events or time of use periods. See SubAppendix C. (Default expects two load levels specified by the domain {0, 127}). The set of output signals may be parametrically modified based on the number |

TABLE 29-continued

List of Load Toolkit Functions

| Name, No. & Version | Purpose | Where Applied | Inputs | Outputs |
|---|---|---|---|---|
| | | | | of available response levels, a static input. |
| 5.2 Residential Behavioral Response - No Portals or In-Home Displays | Predict and represent elastic response from assets that both use human decisions and action but do not use energy portals or in-home displays to convey demand-response information or requests. | Locations where humans are informed about extreme power grid events and are invited to take actions that would mitigate the events. | Current IST time series. (LI_??) Number of response levels available from asset system. | Predicted inelastic load at for each IST interval. Predicted change in elastic load for each IST interval. Variant #1-continuum: Current TIS signal is relayed to the portal or in-home display. Variant #2-discrete levels: Predicted time series of output advisory control signals are sent to in-home display or portal that convey discrete response levels for events or time of use periods. See SubAppendix C. (Default expects two load levels specified by the domain {0, 127}). The set of output signals may be parametrically modified based on the number of available response levels, a static input. |
| 5.3 Manual Commercial Demand Response | | Asset Systems. | (LI_??) Number of response levels available from asset system. | Predicted inelastic load at for each IST interval. Predicted change in elastic load for each IST interval. Predicted time series of output advisory control signals. See SubAppendix C. (Default expects two load levels specified by the domain {0, 127}). The set of output signals may be |

TABLE 29-continued

List of Load Toolkit Functions

| Name, No. & Version | Purpose | Where Applied | Inputs | Outputs |
|---|---|---|---|---|
| | | | | parametrically modified based on the number of available response levels, a static input. |
| 5.4 Manual Non-Renewable Distributed Energy Resources Demand Response | Predictive advisory signals should be formulated and conveyed to operations personnel at Lower Valley and University of Washington. The operations people will then manually schedule and/or control their distributed generation Resources correspondingly. | Asset systems. | Current IST time series. TIS time series. (LI_37) Frequency or number of times that the DER may be actuated. Note: this input should be replaced by more general LI_29. (LI_29) Promised event count or frequency that have been negotiated with customer (LI_??) Number of times that actuation has already occurred in each relevant time period. (LI_??) Actual duration that actuation has already occurred in each relevant time period. Note: Should replace this input with more general LI_30. (LI_30) Limitations on curtailment event duration that have been promised to customer Note: this input should be replaced by the more general LI_30. Note: This should be replaced by LI_20, which shares the same meaning. (LI_20) Total Nameplate or "Typical" Power Capacity. (LI_41) | Predicted inelastic load (generation) at for each IST interval. Predicted change in elastic load (generation) for each IST interval. Variant #1-continuum: Current TIS signal is relayed to the portal or in-home display. Variant #2-discrete levels: Predicted time series of output advisory control signals are sent to in-home display or portal that convey discrete response levels for events or time-of-use periods. See SubAppendix C. (Default expects two load levels specified by the domain {0, 127}). The set of output signals may be parametrically modified based on the number of available response levels, a static input. |

TABLE 29-continued

| List of Load Toolkit Functions | | | | |
|---|---|---|---|---|
| Name, No. & Version | Purpose | Where Applied | Inputs | Outputs |
| | | | Limitations on operator ability to receive and schedule responses. (LI_??) Number of response levels available from asset system. | |

6.3 Appendix C—Collected Set of Example Toolkit Functions

This section introduces a variety of exemplary load and incentive functions, any one or more of which can be used in embodiments of the disclosed technology (e.g., in a toolkit library).

The functions described below should not be construed as limiting in any way, and are example implementations of functions that can be used in a transactive control and coordination system. Further, the equations, tables, and subappendices in the function descriptions below will have their own independent numbering and labeling conventions. Still further, in some instances, some information may be omitted from certain functions but could be implemented by those skilled in the art.

6.3.1 Bulk Inelastic Load—N-Day Moving Window (Function 1.01)

Description:

The following is the foundation of an alternative toolkit function to 1.0 Bulk Inelastic Load. However, this functional specification can be implemented with initial measurements over only two prior days, expects less mathematical knowledge by implementers, is easily documented down to requisite steps, and, for these reasons, may be more amenable to implementation by some utility implementers.

The basic approach is as follows: For a given circuit location, pairs of electrical load and ambient temperature are measured each hour. Data from the same hour-of-day and from a comparable day type, for a window of a chosen number of days, are used to compute the coefficients of a linear model. This model is then used to predict electrical load at this location for the same future day type and hour-of-day based on the forecasted ambient temperature for the future hour.

Block Input/Output Function Model:

Inputs:

$\{P_{d,h}, T_{d,h}\}$—[kW, ° C.]—paired measurements of actual electrical power (load) and ambient temperature for a given day d of a given type (weekday or weekend/holiday) and hour h of the day at a circuit location. h=0, 1, . . . , 23. These measurements taken each hour allow the recursive model to become updated for the respective day type and hour-of-day.

N—[dimensionless]—number of days in the moving window that will be used in the model formulation. Default: 10 (e.g., about two weeks of weekdays or about a month of weekend/holiday days).

$T_{f\_d,h}$—[° C.]—forecasted temperature for a given future hour-of-day h for a least the next four days (e.g., the predicted time horizon of the transactive signals). This forecasted temperature is the input to the model by which electrical power load may be predicted for a given hour-of-day and day type.

Interim Calculation Products:

$a_{0\_h}$, $a_{1\_h}$—[kW, kW/° C.]—a set of coefficients that model a best-fit prediction of electrical power from a forecasted ambient temperature for a given hour-of-day on a given type of day.

$A_{00\_h}$, $A_{01\_h}$, $A_{11\_h}$, $b_{0\_h}$, $b_{1\_h}$—set of five unique vector and matrix elements that should be stored for each hour-of-day for each day type. These elements are updated each time a new pair of load and temperature measurements become available for the respective hour-of-day and day type.

$\hat{P}_{d,h}$—[kW]—predicted load for each future hour for the next four days. These are the outputs from the linear model for the respective future hour-of-day and day type, given the forecasted ambient temperature for that future hour.

Outputs:

$L_{inelastic\_n}$—[kW]—predicted load corresponding to the $n^{th}$ interval. This is the hourly predicted load $\hat{P}_{d,h}$ allocated accordingly to each $n^{th}$ interval.

Pseudo Code Implementation:

1. For d available measurements, calculate $A_{00\_h}$, $A_{01\_h}$, $A_{11\_h}$, $b_{0\_h}$, and $b_{1\_h}$. At startup, two measurements (e.g., d=2) may be adequate. More prior measurements are preferred and may be used. It should be pointed out that singularity is unavoidable when d=1; the determinant of matrix A, as derived in Appendix A, is zero.

$$\forall h,\quad \begin{aligned} A_{00\_h} &= \min(d, N) \\ A_{01\_h} &= \sum_{i=\max(1,d-N+1)}^{d} T_{i,h} \\ A_{11\_h} &= \sum_{i=\max(1,d-N+1)}^{d} T_{i,h}^2, \quad d \geq 2 \\ b_{0\_h} &= \sum_{i=\max(1,d-N+1)}^{d} P_{i,h} \\ b_{1\_h} &= \sum_{i=\max(1,d-N+1)}^{d} (P_{i,h} \cdot T_{i,h}) \end{aligned} \tag{1}$$

Note that singularity will still occur for d>1 if $T_{i,h}$ are identical for a given h.

This example method uses at most N×24×2 data points, which are stored for each day type.

At the implementer's discretion, equation 2 may be employed instead of equation 1. Equation 2 modestly reduces computations. However, equation 2 uses additional data that is stored (e.g., N×24×7 compared to N×24×2).

$$\forall h,\quad \begin{aligned} A_{00\_h} &= \min(d, N) \\ A_{01\_h} &= \begin{cases} A^*_{01\_h} + T_{d,h}, & \text{if } d \le N \\ A^*_{01\_h} - T_{d-N,h} + T_{d,h}, & \text{otherwise} \end{cases} \\ A_{11\_h} &= \begin{cases} A^*_{01\_h} + T_{d,h}, & \text{if } d \le N \\ A^*_{11\_h} - T^2_{d-N,h} + T^2_{d,h}, & \text{otherwise} \end{cases} \\ b_{0\_h} &= \begin{cases} b^*_{0\_h} + P_{d,h}, & \text{if } d \le N \\ b^*_{0\_h} - P_{d-N,h} + P_{d,h}, & \text{otherwise} \end{cases} \\ b_{1\_h} &= \begin{cases} b^*_{1\_h} + P_{d,h} \cdot T_{d,h}, & \text{if } d \le N \\ b^*_{1\_h} - P_{d-N,h} + P_{d,h} \cdot T_{d,h}, & \text{otherwise} \end{cases} \end{aligned} \tag{2}$$

$A^*_{01}$, $A^*_{11}$, $b^*_0$, and $b^*_1$ are $A_{01}$, $A_{11}$, $b_0$, and $b_1$ from the preceding iteration, respectively.

2. After matrix and vector elements have been calculated by either equation 1 or equation 2, calculate the coefficients for the linear model using equation 3.

$$\forall h,\quad \begin{aligned} a_{0\_h} &= \frac{A_{11\_h} b_{0\_h} - A_{01\_h} b_{1\_h}}{A_{00\_h} A_{11\_h} - A^2_{01\_h}} \\ a_{1\_h} &= \frac{A_{00\_h} b_{1\_h} - A_{01\_h} b_{0\_h}}{A_{00\_h} A_{11\_h} - A^2_{01\_h}} \end{aligned} \tag{3}$$

3. Generate $\hat{P}$ for the upcoming four days using the linear model in equation 4:

$$\text{for } D=\{d+1,d+2,d+3,d+4\},\ \text{and } \forall h, \hat{P}_{D,h}=a_{0\_h}+a_{1\_h}\cdot T_{f\_D,h} \tag{4}$$

The hourly standard deviation $\sigma_h$, which is potentially a useful indicator of the accuracy of and one's confidence in the hourly prediction $\hat{P}_{D,h}$, may be computed as follows:

$$\forall h, \sigma_h = \sqrt{\frac{1}{\min(d, N)} \sum_{i=\max(1,d-N+1)}^{d} \left(P_{i,h} - \hat{P}_{i,h}\right)^2} = \sqrt{\frac{1}{\min(d, N)} \sum_{i=\max(1,d-N+1)}^{d} (P_{i,h} - (a_{0\_h} + a_{1\_h} \cdot T_{i,h}))^2} \tag{5}$$

4. Generate $L_{inelastic\_n}$ by allocating $\hat{P}_{D,h}$ to each $n^{th}$ interval:

$$\forall n, L_{inelastic\_n} = \begin{cases} \overline{\hat{P}_{D,h}}, & \text{if } n \subseteq h \\ \hat{P}_{D,h}, & \text{if } n \subseteq h \end{cases} \tag{6}$$

$\overline{\hat{P}_{D,h}}$ is the average of all $\hat{P}_{D,h}$ corresponding to all hours h lying within n.

Make this $L_{inelastic\_n}$ prediction available as an output of this function into the transactive node's algorithmic toolkit framework.

5. Each time a successive measurement pair becomes available, repeat starting from step 1 above.

Subappendix A: Additional Details about the Formulation

This formulation is based on a first-order polynomial (linear) model of power $\hat{P}$ as a function of temperature T, as shown in equation A1. This model's coefficients $a_0$, and $a_1$ are determined via a least-squares error fit to pairs of measured power and temperature. The coefficients may be used thereafter to predict power given forecasted temperatures.

$$\hat{P}=a_0+a_1\cdot T \tag{A1}$$

The optimal coefficients are determined by minimization of the cost function J shown in equation A2. This wisely chosen cost function happens to be the statistical variance of the difference between actual measured electrical load and load that is modeled by the linear model during N days of a given type (weekdays, or weekends/holidays). The standard deviation is the square root of the variance. The variance and standard deviation are potentially useful indicators of the accuracy of and one's confidence in the predictions that result from this function.

$$J = \frac{1}{N}\sum_{i=1}^{N} \left(P_i - \hat{P}_i\right)^2 \tag{A2}$$

The optimal coefficients are found by setting the partial derivatives of the cost function with respect to the two coefficients to zero, as shown in equation A3.

$$\begin{bmatrix} \frac{\partial J}{\partial a_0} \\ \frac{\partial J}{\partial a_1} \end{bmatrix} = \begin{bmatrix} -\frac{2}{N}\sum_{i=1}^{N} (P_i - a_0 - a_1 \cdot T_i) \\ -\frac{2}{N}\sum_{i=1}^{N} (P_i \cdot T_i - a_0 \cdot T_i - a_1 \cdot T_i^2) \end{bmatrix} = 0 \tag{A3}$$

Equation A3 can be written in matrix form, as in equation A4.

$$\begin{bmatrix} N & \sum_{i=1}^{N} T_i \\ \sum_{i=1}^{N} T_i & \sum_{i=1}^{N} T_i^2 \end{bmatrix} \begin{bmatrix} a_0 \\ a_1 \end{bmatrix} = \begin{bmatrix} \sum_{i=1}^{N} P_i \\ \sum_{i=1}^{N} (P_i \cdot T_i) \end{bmatrix} \tag{A4}$$

The matrix is seen to be identical to its transpose. The simplified representation given in equation A5 will prove useful in referring to the various vector and matrix elements of equation A4.

$$\begin{bmatrix} A_{00} & A_{01} \\ A_{01} & A_{11} \end{bmatrix} \begin{bmatrix} a_0 \\ a_1 \end{bmatrix} = \begin{bmatrix} b_0 \\ b_1 \end{bmatrix} \tag{A5}$$

This is in the form Ax=b, the solution of which can be found by $x=A^{-1}b$, as long as matrix A is invertible or nonsingular. Formulas exist for the inversion of a 2×2 matrix, so each coefficient may be explicitly solved for as in equation A6. This explicit representation is advantageous because it alleviates any expectation that the computational infrastructure being relied upon to conduct this function necessarily possesses any matrix solvers.

$$a_0 = \frac{A_{11}b_0 - A_{01}b_1}{A_{00}A_{11} - A_{01}^2} \quad \text{(A6)}$$

$$a_1 = \frac{A_{00}b_1 - A_{01}b_0}{A_{00}A_{11} - A_{01}^2}$$

This method should not require a large set of training data, but some startup issues may be encountered. There is no reasonable way to predict electrical load before any comparable measurement has been made. The coefficients cannot be uniquely determined until at least two non-identical temperature measurements have been taken for a given hour of the day.

Subappendix B: Example

Figure 47:
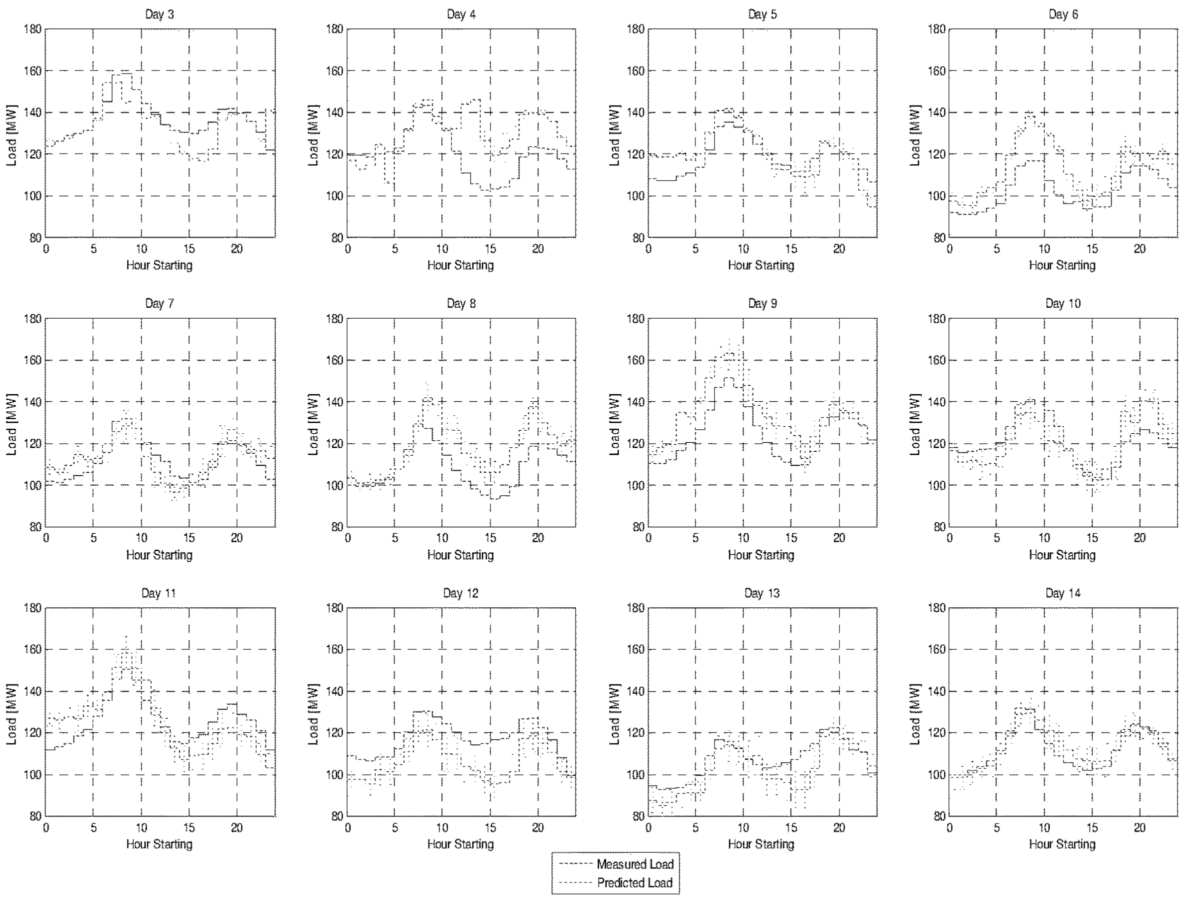
FIG. 47 is a set of graphs showing predicted load $\hat{P}$ compared to measured load P for an example function.
Figure 48:
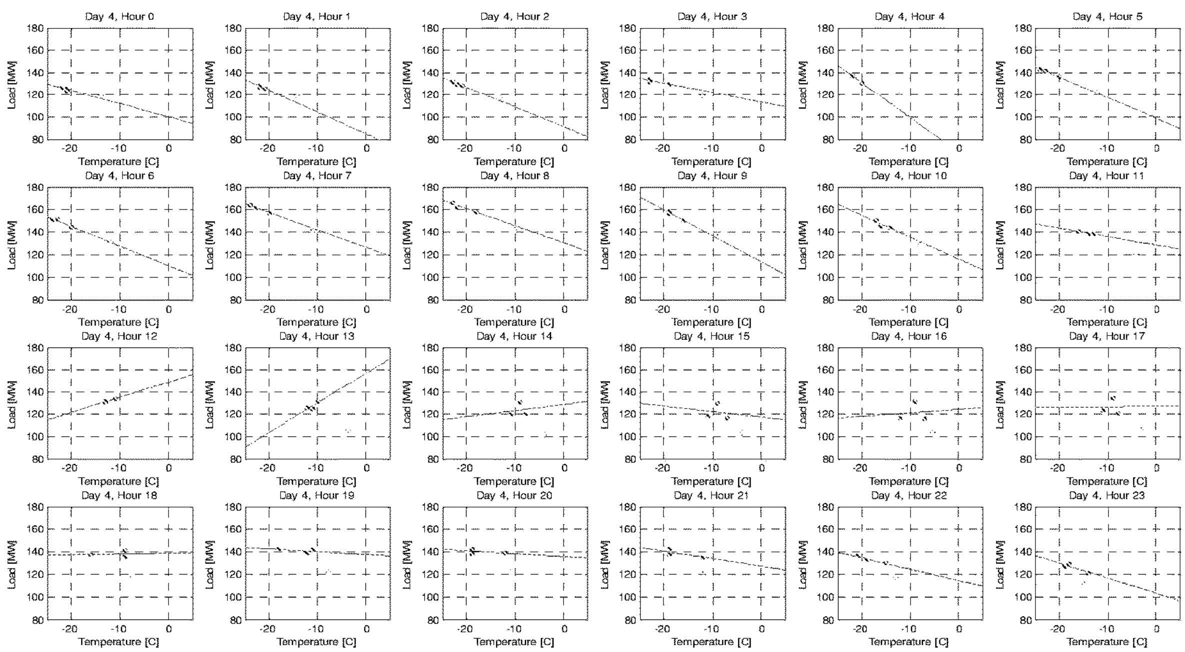
FIG. 48 is a set of graphs that show the linear least-squares error fit for each hour of the day, for day 4 given the measured data for an example function.
Figure 49:
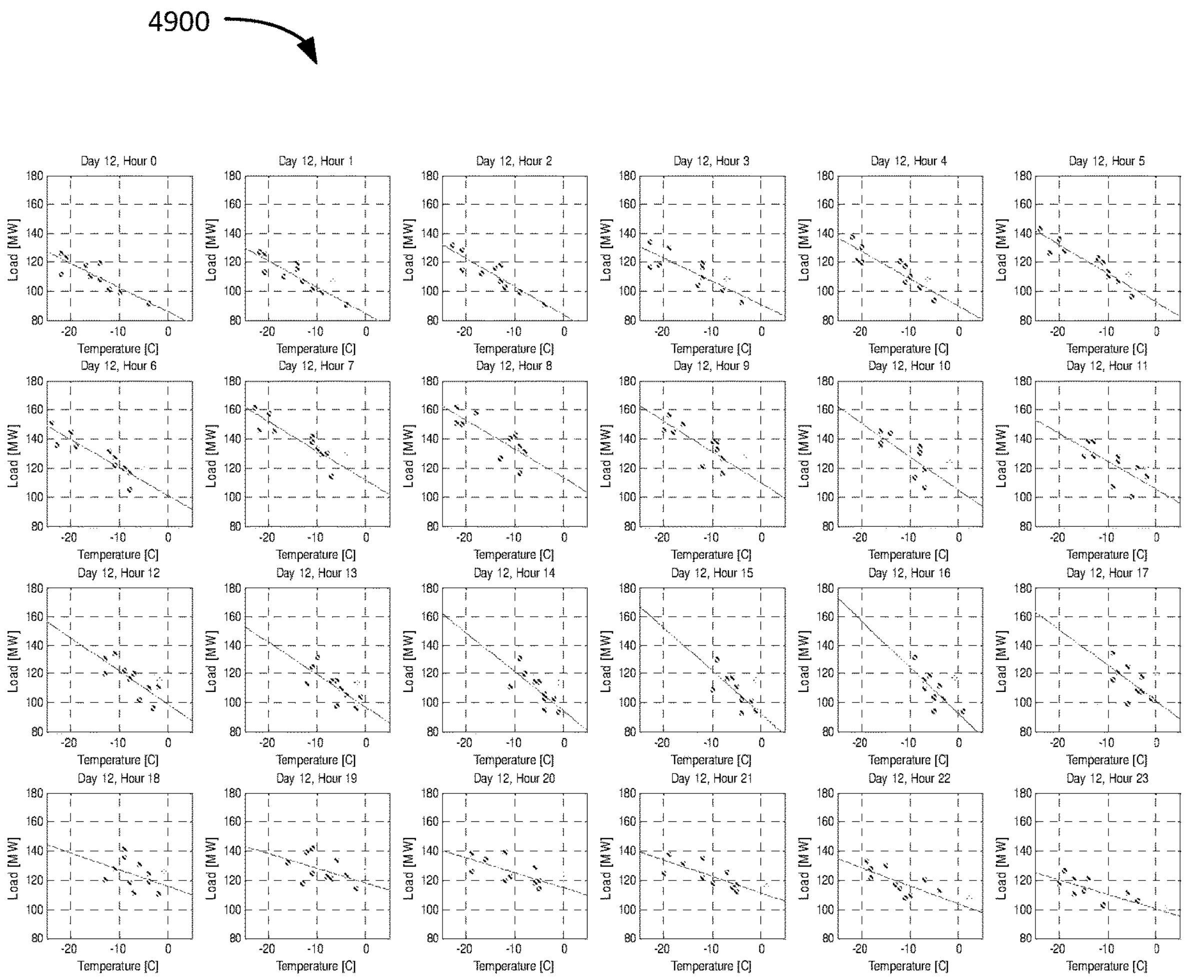
FIG. 49 is a set of graphs that show the linear least-squares error fit for each hour of the day, for day 12 given the measured data for an example function.
Figure 50:
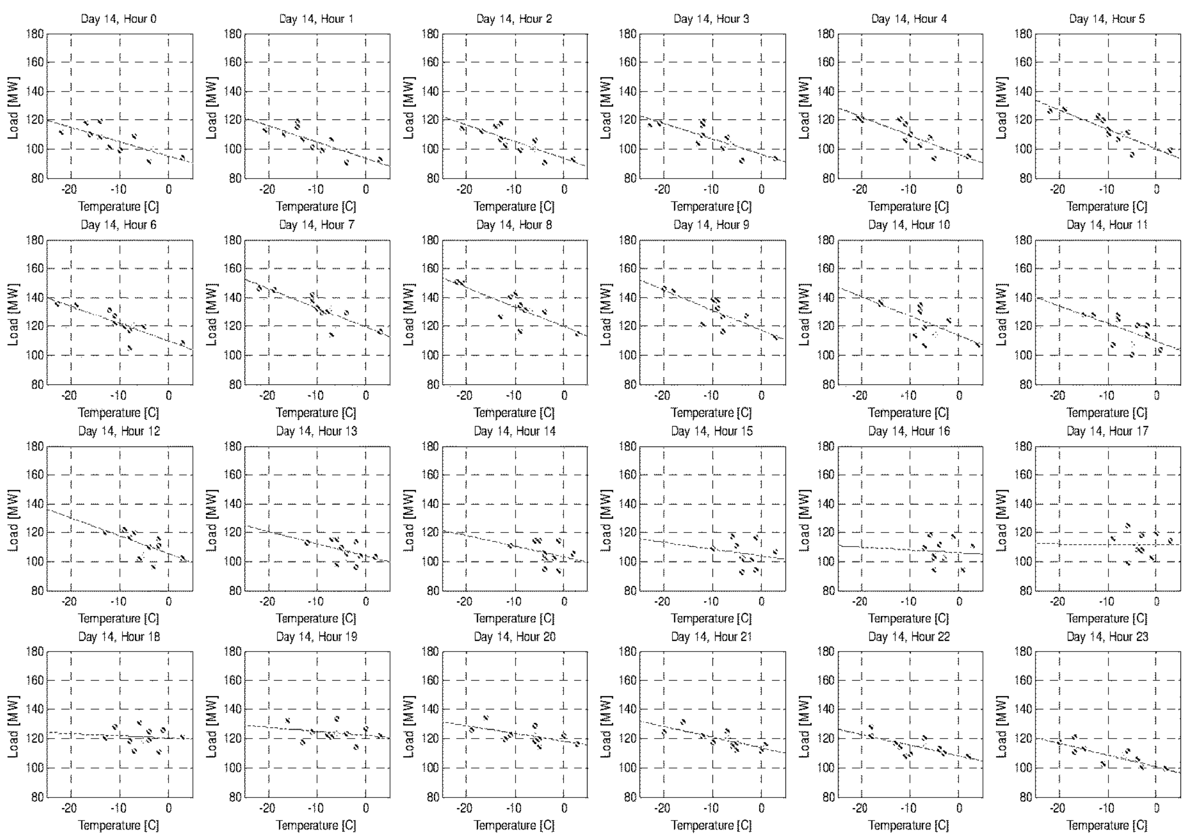
FIG. 50 is a set of graphs that show the linear least-squares error fit for each hour of the day, for day 14 given the measured data for an example function.

In this example, real power (load) P and temperature T measurements during fourteen weekdays—given in Table 30 and Table 31, respectively—are used to compute $\hat{P}$, following the procedure outlined in the Pseudo Code Implementation section. N=10. The resulting $\hat{P}$ is given in Table 32, and plotted along with ±1 standard deviation (e.g. $\pm\sqrt{J}$) and P in the set 4700 of graphs shown in FIG. 47. Notice that the "NaN" (not a number) entries on day 3 are due to the singularity of matrix A caused by the identical temperature points at the corresponding hours on days 1 and 2. FIG. 48 through FIG. 50 comprise sets 4800, 4900, 5000 of graphs that show the linear least-squares error fit for each hour of the day, for days 4, 12, and 14, respectively, given the measured data.

TABLE 30

| Power P Measurements in kW | | | | | | | | | | | | | | | |
|---|---|---|---|---|---|---|---|---|---|---|---|---|---|---|---|
| | | d | | | | | | | | | | | | | |
| | | 1 | 2 | 3 | 4 | 5 | 6 | 7 | 8 | 9 | 10 | 11 | 12 | 13 | 14 |
| h | 0 | 126630 | 126380 | 123750 | 119310 | 108010 | 91850 | 101540 | 99580 | 110370 | 118090 | 111810 | 108690 | 94420 | 99760 |
| | 1 | 128540 | 127530 | 126080 | 119370 | 106720 | 90490 | 101250 | 99270 | 110440 | 115540 | 112920 | 107110 | 92590 | 99970 |
| | 2 | 130030 | 132390 | 128840 | 118230 | 107120 | 90680 | 102500 | 99460 | 112350 | 115970 | 114350 | 106530 | 92940 | 101600 |
| | 3 | 132300 | 134530 | 129970 | 119680 | 109430 | 92310 | 104400 | 100900 | 116400 | 117040 | 118210 | 108160 | 93430 | 103750 |
| | 4 | 136720 | 137780 | 131020 | 120650 | 110730 | 93910 | 105960 | 102830 | 120110 | 117440 | 121380 | 108240 | 95000 | 106250 |
| | 5 | 141660 | 143280 | 135970 | 122840 | 113740 | 96180 | 110190 | 107220 | 126350 | 120040 | 127690 | 112090 | 99450 | 111410 |
| | 6 | 151840 | 151040 | 144810 | 131840 | 121820 | 105230 | 119760 | 117030 | 135810 | 127720 | 135390 | 120230 | 108640 | 120590 |
| | 7 | 164120 | 161680 | 157710 | 142160 | 132860 | 114240 | 130250 | 129380 | 146520 | 138180 | 145470 | 129690 | 116230 | 131540 |
| | 8 | 166680 | 162390 | 158210 | 142940 | 134880 | 116610 | 131660 | 126770 | 151070 | 140760 | 150230 | 130020 | 115310 | 131170 |
| | 9 | 158610 | 156650 | 150760 | 137720 | 132790 | 116310 | 126940 | 121170 | 146550 | 138550 | 145140 | 127470 | 112020 | 121080 |
| | 10 | 150280 | 145960 | 144010 | 131050 | 130430 | 107040 | 119110 | 113870 | 137590 | 135270 | 135700 | 123850 | 107310 | 114660 |
| | 11 | 140770 | 138850 | 138650 | 120960 | 124670 | 100140 | 114120 | 107110 | 128370 | 128050 | 128430 | 120340 | 104290 | 108770 |
| | 12 | 132130 | 130430 | 134000 | 110740 | 120430 | 96160 | 111270 | 101900 | 120040 | 116560 | 122470 | 115930 | 103010 | 105390 |
| | 13 | 125840 | 125450 | 131130 | 105590 | 115060 | 96720 | 103900 | 97780 | 113440 | 109900 | 115470 | 114020 | 103600 | 103400 |
| | 14 | 120530 | 119940 | 130460 | 102400 | 114400 | 93370 | 102900 | 94950 | 110830 | 106170 | 114590 | 114710 | 105380 | 101570 |
| | 15 | 118960 | 117000 | 129940 | 102900 | 111120 | 94600 | 101420 | 92960 | 109080 | 102160 | 117490 | 116450 | 106720 | 102620 |
| | 16 | 116740 | 116360 | 131310 | 103930 | 111810 | 94570 | 102470 | 94420 | 109880 | 102600 | 118930 | 117110 | 110980 | 103650 |
| | 17 | 123890 | 121190 | 135200 | 107620 | 117810 | 102710 | 108120 | 99210 | 115810 | 108130 | 125210 | 119550 | 114430 | 111170 |
| | 18 | 137920 | 135820 | 141200 | 118540 | 125000 | 110720 | 119310 | 111320 | 128410 | 120590 | 131300 | 126230 | 121330 | 118390 |
| | 19 | 142510 | 139340 | 141880 | 122890 | 123340 | 114190 | 121300 | 118170 | 132660 | 124750 | 133520 | 126760 | 121940 | 123540 |
| | 20 | 142980 | 138900 | 139110 | 122620 | 119860 | 114130 | 118760 | 119720 | 134420 | 126250 | 128930 | 122130 | 116690 | 122810 |
| | 21 | 142550 | 137650 | 135470 | 122060 | 117290 | 111990 | 115170 | 117520 | 131880 | 124860 | 125790 | 116520 | 111650 | 120670 |
| | 22 | 136270 | 133130 | 130030 | 117390 | 112710 | 107870 | 109270 | 114110 | 128100 | 121910 | 120550 | 107950 | 110480 | 114810 |
| | 23 | 129740 | 126930 | 121660 | 112760 | 106290 | 103520 | 102800 | 111150 | 121650 | 117880 | 111880 | 99490 | 100620 | 107230 |

TABLE 31

| Temperature T Measurements in ° C. | | | | | | | | | | | | | | | |
|---|---|---|---|---|---|---|---|---|---|---|---|---|---|---|---|
| | | d | | | | | | | | | | | | | |
| | | 1 | 2 | 3 | 4 | 5 | 6 | 7 | 8 | 9 | 10 | 11 | 12 | 13 | 14 |
| h | 0 | −21.00 | −22.00 | −21.00 | −14.00 | −14.00 | −4.00 | −12.00 | −10.00 | −16.00 | −17.00 | −22.00 | −7.00 | 3.00 | −3.00 |
| | 1 | −22.00 | −22.00 | −21.00 | −14.00 | −13.00 | −4.00 | −11.00 | −9.00 | −17.00 | −14.00 | −21.00 | −7.00 | 3.00 | −4.00 |
| | 2 | −22.00 | −23.00 | −21.00 | −13.00 | −13.00 | −4.00 | −12.00 | −9.00 | −17.00 | −14.00 | −21.00 | −6.00 | 2.00 | −6.00 |
| | 3 | −23.00 | −23.00 | −19.00 | −12.00 | −12.00 | −4.00 | −13.00 | −8.00 | −23.00 | −12.00 | −21.00 | −7.00 | 3.00 | −6.00 |
| | 4 | −22.00 | −22.00 | −20.00 | −12.00 | −10.00 | −5.00 | −11.00 | −8.00 | −20.00 | −11.00 | −21.00 | −6.00 | 2.00 | −6.00 |
| | 5 | −23.00 | −24.00 | −20.00 | −12.00 | −10.00 | −5.00 | −10.00 | −8.00 | −22.00 | −11.00 | −19.00 | −6.00 | 3.00 | −7.00 |
| | 6 | −23.00 | −24.00 | −20.00 | −12.00 | −11.00 | −8.00 | −9.00 | −8.00 | −23.00 | −11.00 | −19.00 | −5.00 | 3.00 | −7.00 |
| | 7 | −24.00 | −23.00 | −20.00 | −11.00 | −10.00 | −7.00 | −8.00 | −9.00 | −22.00 | −11.00 | −19.00 | −4.00 | 3.00 | −7.00 |
| | 8 | −23.00 | −22.00 | −18.00 | −10.00 | −9.00 | −9.00 | −8.00 | −13.00 | −22.00 | −11.00 | −21.00 | −4.00 | 3.00 | −7.00 |
| | 9 | −19.00 | −19.00 | −16.00 | −9.00 | −9.00 | −8.00 | −8.00 | −12.00 | −20.00 | −10.00 | −18.00 | −3.00 | 3.00 | −6.00 |

TABLE 31-continued

| Temperature T Measurements in ° C. | | | | | | | | | | | | | | |
|---|---|---|---|---|---|---|---|---|---|---|---|---|---|---|
| | d | | | | | | | | | | | | | |
| | 1 | 2 | 3 | 4 | 5 | 6 | 7 | 8 | 9 | 10 | 11 | 12 | 13 | 14 |
| 10 | −17.00 | −16.00 | −14.00 | −8.00 | −8.00 | −7.00 | −7.00 | −9.00 | −16.00 | −8.00 | −16.00 | −2.00 | 4.00 | −5.00 |
| 11 | −16.00 | −14.00 | −13.00 | −4.00 | −8.00 | −5.00 | −2.00 | −9.00 | −15.00 | −8.00 | −13.00 | −2.00 | 1.00 | −5.00 |
| 12 | −13.00 | −13.00 | −11.00 | −4.00 | −7.00 | −3.00 | −2.00 | −6.00 | −13.00 | −8.00 | −9.00 | −2.00 | 3.00 | −5.00 |
| 13 | −12.00 | −11.00 | −10.00 | −4.00 | −6.00 | −2.00 | −1.00 | −6.00 | −12.00 | −5.00 | −7.00 | −2.00 | 2.00 | −4.00 |
| 14 | −11.00 | −8.00 | −9.00 | −4.00 | −6.00 | −1.00 | −2.00 | −4.00 | −11.00 | −4.00 | −5.00 | −1.00 | 2.00 | −4.00 |
| 15 | −11.00 | −7.00 | −9.00 | −4.00 | −5.00 | −1.00 | −2.00 | −4.00 | −10.00 | −4.00 | −6.00 | −1.00 | 3.00 | −4.00 |
| 16 | −12.00 | −7.00 | −9.00 | −5.00 | −4.00 | 1.00 | −3.00 | −5.00 | −7.00 | −5.00 | −6.00 | −1.00 | 3.00 | −3.00 |
| 17 | −11.00 | −8.00 | −9.00 | −3.00 | −3.00 | −1.00 | −3.00 | −6.00 | −9.00 | −4.00 | −6.00 | 0.00 | 3.00 | −4.00 |
| 18 | −16.00 | −9.00 | −9.00 | −8.00 | −4.00 | −2.00 | −4.00 | −7.00 | −11.00 | −13.00 | −6.00 | −1.00 | 3.00 | −5.00 |
| 19 | −18.00 | −12.00 | −11.00 | −8.00 | −4.00 | −2.00 | −7.00 | −13.00 | −16.00 | −11.00 | −6.00 | 0.00 | 3.00 | −6.00 |
| 20 | −19.00 | −19.00 | −12.00 | −11.00 | −5.00 | −5.00 | −6.00 | −12.00 | −16.00 | −19.00 | −6.00 | 0.00 | 3.00 | −6.00 |
| 21 | −19.00 | −19.00 | −12.00 | −12.00 | −5.00 | −5.00 | −6.00 | −10.00 | −16.00 | −20.00 | −7.00 | 1.00 | 0.00 | −7.00 |
| 22 | −21.00 | −19.00 | −15.00 | −13.00 | −4.00 | −11.00 | −10.00 | −12.00 | −18.00 | −18.00 | −7.00 | 2.00 | −3.00 | −7.00 |
| 23 | −18.00 | −19.00 | −14.00 | −15.00 | −4.00 | −11.00 | −11.00 | −17.00 | −17.00 | −20.00 | −6.00 | 2.00 | −3.00 | −7.00 |

TABLE 32

| Predicted Load $\hat{P}$ in kW | | | | | | | | | | | | | | | |
|---|---|---|---|---|---|---|---|---|---|---|---|---|---|---|---|
| | | d | | | | | | | | | | | | | |
| | | 1 | 2 | 3 | 4 | 5 | 6 | 7 | 8 | 9 | 10 | 11 | 12 | 13 | 14 |
| h | 0 | — | — | 126630 | 116860 | 119280 | 97461 | 108369 | 103079 | 114703 | 116243 | 126716 | 97364 | 87557 | 98185 |
| | 1 | — | — | NaN | 112395 | 118233 | 95376 | 106179 | 100882 | 117808 | 110548 | 125738 | 97212 | 84840 | 98109 |
| | 2 | — | — | 127670 | 114445 | 118140 | 94987 | 109251 | 101292 | 119049 | 111531 | 127500 | 95262 | 86552 | 100584 |
| | 3 | — | — | NaN | 123941 | 120102 | 101061 | 114440 | 101943 | 134691 | 109605 | 126623 | 101920 | 90763 | 102800 |
| | 4 | — | — | NaN | 106100 | 116988 | 103511 | 112066 | 103657 | 132651 | 110065 | 132656 | 101073 | 90988 | 104233 |
| | 5 | — | — | 136800 | 121254 | 119314 | 106297 | 112426 | 107226 | 140265 | 113660 | 131096 | 104291 | 91067 | 109562 |
| | 6 | — | — | 154240 | 131262 | 130109 | 119518 | 115470 | 114200 | 151411 | 121797 | 139185 | 110797 | 101535 | 118367 |
| | 7 | — | — | 154360 | 143738 | 140592 | 130533 | 125652 | 129383 | 161018 | 133619 | 151356 | 119835 | 111943 | 128784 |
| | 8 | — | — | 145230 | 145832 | 141494 | 138080 | 128147 | 141862 | 163310 | 134415 | 157896 | 121255 | 114016 | 129418 |
| | 9 | — | — | NaN | 134730 | 137518 | 133002 | 126763 | 138324 | 159603 | 130209 | 150645 | 116328 | 112387 | 125733 |
| | 10 | — | — | 137320 | 131948 | 131114 | 128706 | 120439 | 126313 | 147527 | 121093 | 145033 | 109665 | 106991 | 120504 |
| | 11 | — | — | 137890 | 131747 | 128323 | 121719 | 105742 | 125792 | 137670 | 120420 | 131670 | 109383 | 108827 | 115807 |
| | 12 | — | — | NaN | 143520 | 119083 | 110190 | 100484 | 115130 | 132834 | 117456 | 119772 | 103365 | 97644 | 111728 |
| | 13 | — | — | 125060 | 145988 | 112810 | 102765 | 96465 | 113238 | 128199 | 107849 | 112711 | 101571 | 97728 | 107297 |
| | 14 | — | — | 120137 | 126527 | 111990 | 97488 | 98285 | 106113 | 128043 | 104100 | 106987 | 97088 | 95781 | 106263 |
| | 15 | — | — | 117980 | 119517 | 109447 | 99199 | 99613 | 106146 | 123478 | 103701 | 108810 | 95299 | 92736 | 105769 |
| | 16 | — | — | 116512 | 122828 | 108659 | 101560 | 105818 | 109718 | 112495 | 107500 | 109352 | 95750 | 92437 | 106631 |
| | 17 | — | — | 122090 | 126991 | 109571 | 109435 | 111212 | 118081 | 122865 | 110506 | 114634 | 101191 | 102691 | 111875 |
| | 18 | — | — | 135820 | 138594 | 125970 | 123013 | 120876 | 126128 | 131917 | 134944 | 121585 | 117003 | 117667 | 121233 |
| | 19 | — | — | 138812 | 139867 | 123367 | 120126 | 126652 | 137312 | 138238 | 129727 | 122264 | 118178 | 120110 | 123841 |
| | 20 | — | — | NaN | 138849 | 120765 | 120152 | 119458 | 129805 | 135371 | 140289 | 118805 | 114907 | 116592 | 121461 |
| | 21 | — | — | NaN | 135470 | 117430 | 117330 | 116924 | 123902 | 134394 | 141283 | 117843 | 110225 | 114585 | 118739 |
| | 22 | — | — | 126850 | 127799 | 102646 | 120991 | 116588 | 118679 | 128845 | 128699 | 109237 | 101337 | 110449 | 113300 |
| | 23 | — | — | 140980 | 123450 | 94357 | 115177 | 112747 | 121624 | 119604 | 124703 | 103275 | 98270 | 104107 | 106232 |

6.3.2 Bulk Inelastic Load—Recursive—Recursive Algorithm (Function 1.01a)

Description:

The following is the foundation of an alternative to the Bulk Inelastic Load toolkit functions 1.0 and 1.01. However, this functional specification can be implemented with measurements over only two prior days, expects less mathematical knowledge by implementers, is easily documented down to requisite steps, and for, these reasons, may be more amenable to implementation by some utility implementers. Furthermore, unlike toolkit function 1.01 that uses a moving window of a chosen number of days, this function 1.01a is formulated as a purely recursive algorithm.

The basic approach is as follows: For a given circuit location, pairs of electrical load and ambient temperature are measured each hour. Data from the same hour-of-day and from a comparable day type are used to recursively update the coefficients of a linear model. This model is then used to predict electrical load at this location for the same future day type and hour-of-day based on the forecasted ambient temperature for the future hour.

Block Input/Output Function Model:

Inputs:

$\{P_{d,h}, T_{d,h}\}$—[kW, ° C.]—paired measurements of actual electrical power (load) and ambient temperature for a given day d of a given type (weekday or weekend/holiday) and hour h of the day at a circuit location. h=0, 1, . . . , 23. These measurements taken each hour allow the recursive model to become updated for the respective day type and hour-of-day.

N—[dimensionless]—number used in the recursive algorithm. The selected value of N should be greater than 2. Default: 10 (e.g., about two weeks of weekdays or about a month of weekend/holiday days).

$T_{f\_d,h}$—[° C.]—forecasted temperature for a given future hour-of-day h for a least the next four days (e.g., the predicted time horizon of the transactive signals). This forecasted temperature is the input to the model by which electrical power load may be predicted for a given hour-of-day and day type.

Interim Calculation Products:

$a_{0\_h}$, $a_{1\_h}$—[kW, kW/° C.]—a set of coefficients that model a best-fit prediction of electrical power from a forecasted ambient temperature for a given hour-of-day on a given type of day.

$A_{01\_h}$, $A_{11\_h}$, $b_{0\_h}$, $b_{1\_h}$—set of four unique vector and matrix elements that should be stored for each hour-of-day for each day type. These elements are updated each time a new pair of load and temperature measurements become available for the respective hour-of-day and day type.

$\hat{P}_{d,h}$—[kW]—predicted load for each future hour for the next four days. These are the outputs from the linear model for the respective future hour-of-day and day type, given the forecasted ambient temperature for that future hour.

Outputs:

$L_{inelastic\_n}$—[kW]—predicted load corresponding to the $n^{th}$ interval. This is the hourly predicted load $P_{d\ h}$ allocated accordingly to each $n^{th}$ interval.

Pseudo Code Implementation:

1. For the number m of available startup measurements, calculate the initial $A_{01\_h}$, $A_{11\_h}$, $b_{0\_h}$, and $b_{1\_h}$. At startup, two unique measurements (e.g., m=2) may be adequate. More prior measurements are preferred and may be used. It should be pointed out that singularity is unavoidable when m=1; the determinant of matrix A, as derived in Appendix A, is zero.

$$\forall h,\ \begin{cases} A_{01\_h} = \frac{1}{m}\sum_{i=1}^{m} T_{i,h} \\ A_{11\_h} = \frac{1}{m}\sum_{i=1}^{m} T_{i,h}^2 \\ b_{0\_h} = \frac{1}{m}\sum_{i=1}^{m} P_{i,h} \\ b_{1\_h} = \frac{1}{m}\sum_{i=1}^{m} (P_{i,h}\cdot T_{i,h}) \end{cases},\ m \geq 2 \tag{1}$$

2. Each time a successive measurement pair becomes available for day d, $A_{01\_h}$, $A_{11\_h}$, $b_{0\_h}$, and $b_{1\_h}$ should be recursively updated as in equation 2.

$$\forall h,\ \begin{cases} A_{01\_h} = \frac{(N-1)\cdot A^*_{01\_h} + T_{d,h}}{N} \\ A_{11\_h} = \frac{(N-1)\cdot A^*_{11\_h} + T_{d,h}^2}{N} \\ b_{0\_h} = \frac{(N-1)\cdot b^*_{0\_h} + P_{d,h}}{N} \\ b_{1\_h} = \frac{(N-1)\cdot b^*_{1\_h} + P_{d,h}\cdot T_{d,h}}{N} \end{cases} \tag{2}$$

$A^*_{01}$, $A^*_{11}$, $b^*_0$, and $b^*_1$ are $A_{01}$, $A_{11}$, $b_0$, and $b_1$ from the preceding iteration, respectively.

3. Calculate the coefficients for the linear model using the equation 3.

$$\forall h,\ \begin{cases} a_{0\_h} = \frac{A_{11\_h}b_{0\_h} - A_{01\_h}b_{1\_h}}{A_{11\_h} - A_{01\_h}^2} \\ a_{1\_h} = \frac{b_{1\_h} - A_{01\_h}b_{0\_h}}{A_{11\_h} - A_{01\_h}^2} \end{cases} \tag{3}$$

4. Generate $\hat{P}$ for the upcoming four days using the linear model in equation 4:

$$\text{for } D=\{d+1,d+2,d+3,d+4\}, \text{ and } \forall h, \hat{P}_{D,h}=a_{0\_h}+a_{1\_h}\cdot T_{f\_D,h} \tag{4}$$

If the d measurement pairs are stored and accessible, the hourly standard deviation $\sigma_h$, which is potentially a useful indicator of the accuracy of and one's confidence in the hourly prediction $\hat{P}_{D,h}$, may be computed as follows:

$$\forall h,\ \sigma_h = \sqrt{\frac{1}{d}\sum_{i=1}^{d}\left(P_{i,h} - \hat{P}_{i,h}\right)^2} = \sqrt{\frac{1}{d}\sum_{i=1}^{d}(P_{i,h} - (a_{0\_h} + a_{1\_h}\cdot T_{i,h}))^2} \tag{5}$$

5. Generate $L_{inelastic\_n}$ by allocating $\hat{P}_{D,h}$ to each $n^{th}$ interval:

$$\forall n,\ L_{inelastic\_n} = \begin{cases} \hat{P}_{D,h}, & \text{if } n \subseteq h \\ \overline{\hat{P}_{D,h}}, & \text{if } h \subseteq n \end{cases} \tag{6}$$

$\overline{P_{D,h}}$ is the average of all $\hat{P}_{D,h}$ corresponding to all hours h lying within n.

Make this $L_{inelastic\_n}$ prediction available as an output of this function into the transactive node's algorithmic toolkit framework.

6. Repeat starting from step 2 above.

Subappendix A: Additional Details about the Formulation

This formulation is based on a first-order polynomial (linear) model of power $\hat{P}$ as a function of temperature T, as shown in equation A1. This model's coefficients $a_0$, and $a_1$ are determined via a least-squares error fit to pairs of measured power and temperature. The coefficients may be used thereafter to predict power given forecasted temperatures.

$$\hat{P}=a_0+a_1\cdot T \tag{A1}$$

The optimal coefficients are determined by minimization of the cost function J shown in equation A2. This wisely chosen cost function happens to be the statistical variance of the difference between actual measured electrical load and load that is modeled by the linear model during N days of a given type (weekdays, or weekends/holidays). The standard deviation is the square root of the variance. The variance and standard deviation are potentially useful indicators of the accuracy of and one's confidence in the predictions that result from this function.

$$J = \frac{1}{N}\sum_{i=1}^{N}\left(P_i - \hat{P}_i\right)^2 \tag{A2}$$

The optimal coefficients are found by setting the partial derivatives of the cost function with respect to the two coefficients to zero, as shown in equation A3.

$$\begin{bmatrix} \frac{\partial J}{\partial a_0} \\ \frac{\partial J}{\partial a_1} \end{bmatrix} = \begin{bmatrix} -\frac{2}{N}\sum_{i=1}^{N}(P_i - a_0 - a_1 \cdot T_i) \\ -\frac{2}{N}\sum_{i=1}^{N}(P_i \cdot T_i - a_0 \cdot T_i - a_1 \cdot T_i^2) \end{bmatrix} = 0 \quad \text{(A3)}$$

Equation A3 can be written in matrix form, as in equation A4.

$$\begin{bmatrix} 1 & \frac{1}{N}\sum_{i=1}^{N} T_i \\ \frac{1}{N}\sum_{i=1}^{N} T_i & \frac{1}{N}\sum_{i=1}^{N} T_i^2 \end{bmatrix} \begin{bmatrix} a_0 \\ a_1 \end{bmatrix} = \begin{bmatrix} \frac{1}{N}\sum_{i=1}^{N} P_i \\ \frac{1}{N}\sum_{i=1}^{N} (P_i \cdot T_i) \end{bmatrix} \quad \text{(A4)}$$

The matrix is seen to be identical to its transpose. The simplified representation given in equation A5 will prove useful in referring to the various vector and matrix elements of equation A4.

$$\begin{bmatrix} 1 & A_{01} \\ A_{01} & A_{11} \end{bmatrix} \begin{bmatrix} a_0 \\ a_1 \end{bmatrix} = \begin{bmatrix} b_0 \\ b_1 \end{bmatrix} \quad \text{(A5)}$$

This is in the form Ax=b, the solution of which can be found by $x=A^{-1}b$, as long as matrix A is invertible or nonsingular. Formulas exist for the inversion of a 2×2 matrix, so each coefficient may be explicitly solved for as in equation A6. This explicit representation is advantageous because it alleviates any expectation that the computational infrastructure being relied upon to conduct this function necessarily possesses any matrix solvers.

$$a_0 = \frac{A_{11}b_0 - A_{01}b_1}{A_{11} - A_{01}^2} \quad \text{(A6)}$$

$$a_1 = \frac{b_1 - A_{01}b_0}{A_{11} - A_{01}^2}$$

This method should not require a large set of training data, but some startup issues may be encountered. There is no reasonable way to predict electrical load before any comparable measurement has been made. If used non-recursively according to the formulation so far, the coefficients cannot be uniquely determined until at least two non-identical measurement pairs have been taken. Exceptions would be used to apply the method until N>2.

After two non-identical measurements, the problem becomes over-determined, and the power of least-squares error fit comes into play. The question then becomes how many samples N to maintain and use. If a moving window is used, then one should store a cache of N data pairs. Furthermore, the cache should be maintained for all of the more than 24×2 sets of hours and day types that are to be modeled. The moving window approach may not be especially efficient from a computational and storage standpoint and should be avoided. A recursive approach is preferred.

In a recursive formulation, one can keep a cache of only the four most recently calculated unique vector and matrix elements ($A_{01}$, $A_{11}$, $b_1$, and $b_1$) for each day type and its hours. Each of these elements is presumed to have already been influenced by at least N prior measurements. When a new measurement pair ($P_{N+1}$, $T_{N+1}$) becomes available for this hour and hour type, one may recursively update elements as exemplified in A7 for vector element $b_1$. The effect of this recursive formula is that the old vector element is replaced by a new term that is a weighted sum of the old element and a new term that uses the new measurements. If N is large, the new measurements have less impact than they would if N were small.

$$b_1 = \frac{(N-1)\cdot\frac{1}{N}\sum_{i=1}^{N}(P_i \cdot T_i) + P_{N+1} \cdot T_{N+1}}{N} \quad \text{(A7)}$$

Equation A8 more simply and generally shows how the old vector element $b^*_1$ becomes replaced by the new one $b_1$. The two weighting factors are (N−1)/N and 1/N, which sums to unity.

$$b_1 = \frac{(N-1)\cdot b_1^* + P_{N+1} \cdot T_{N+1}}{N} \quad \text{(A8)}$$

Nothing prevents the application of recursive formulas of the type exemplified by A7 and A8 after the elements have been initialized. The first predictions may be wild and unreliable until more measurements can become incorporated into the model.

Subappendix B: Example

Figure 51:
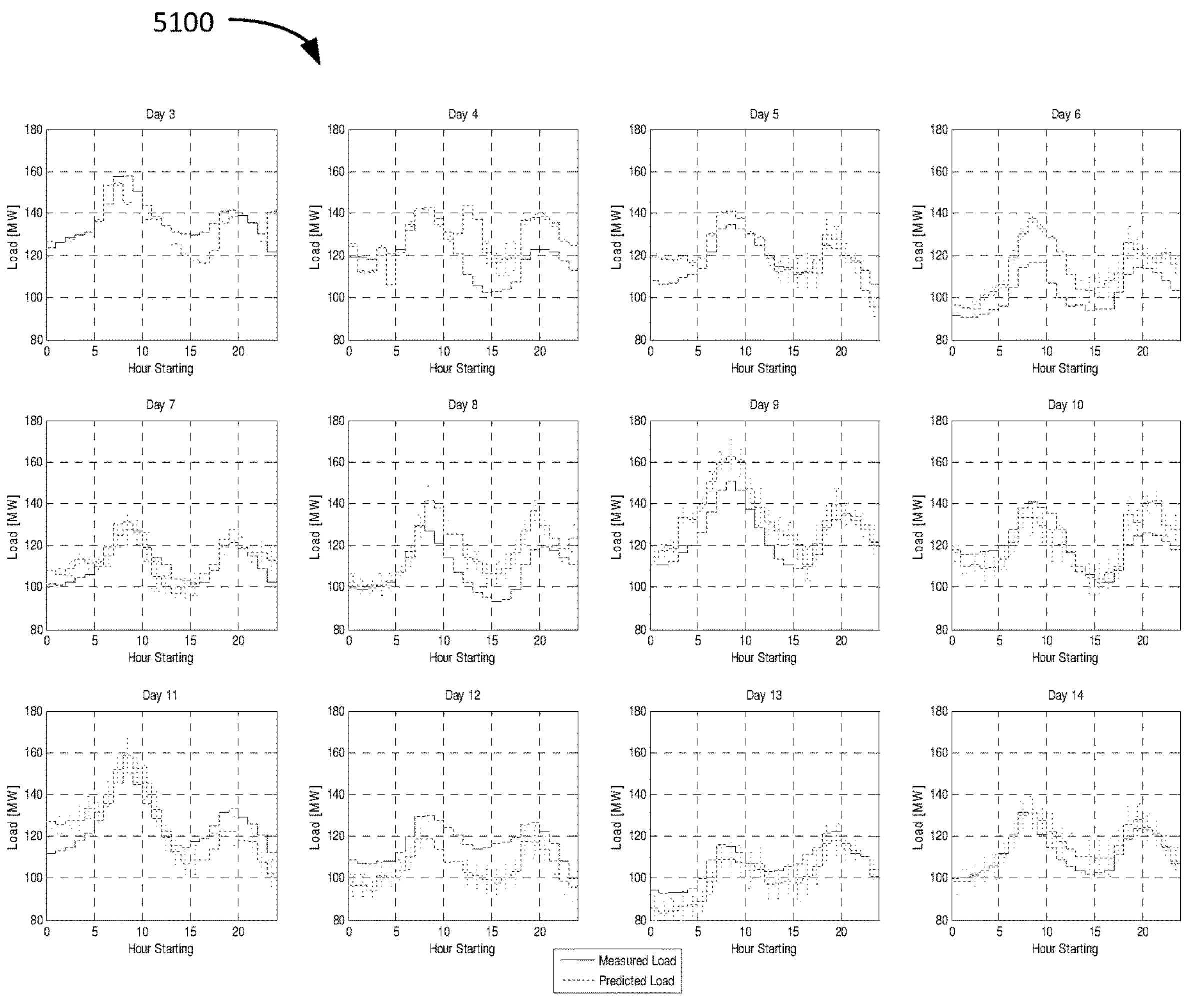
FIG. 51 is a set of graphs showing predicted load $\hat{P}$ compared to measured load P for an example function.
Figure 52:
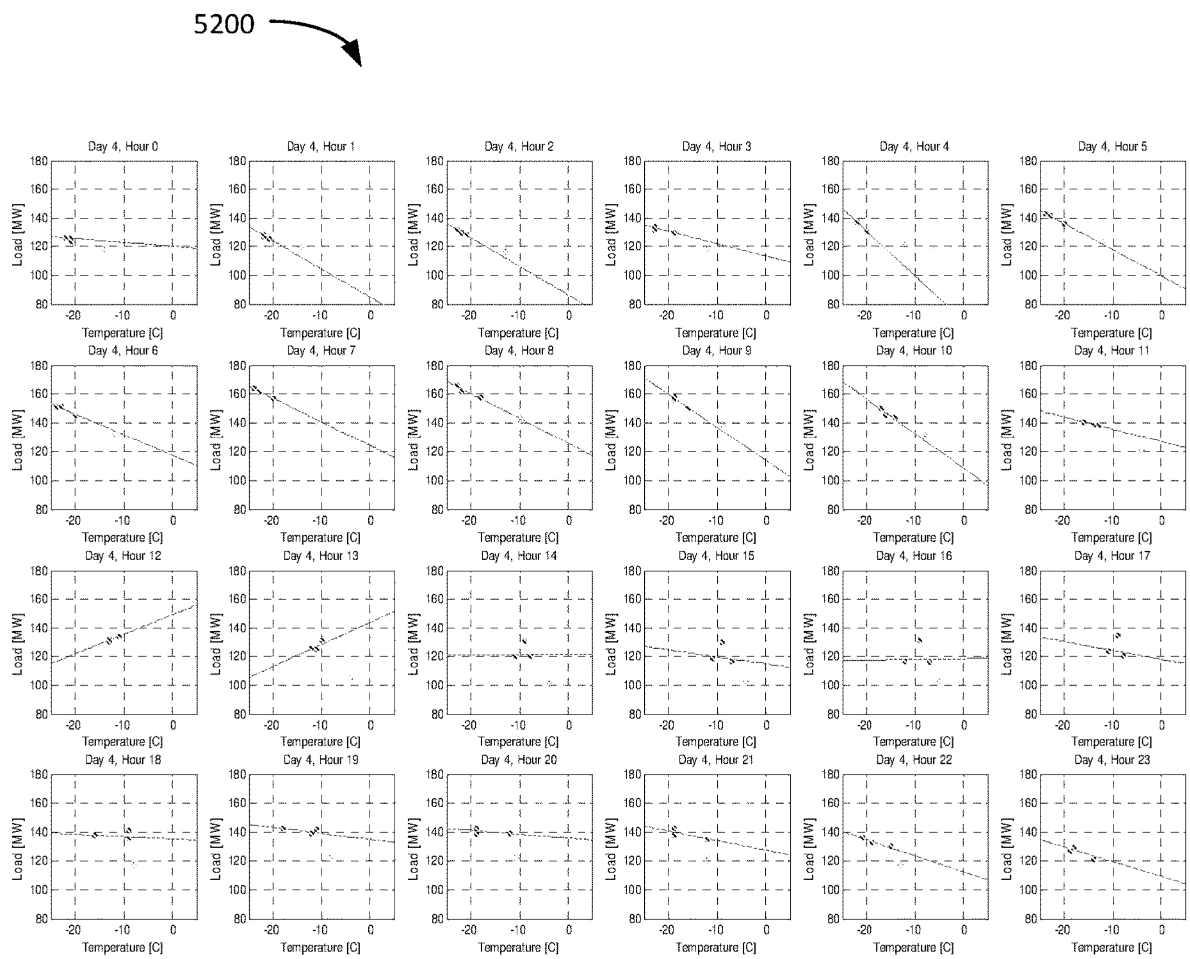
FIG. 52 is a set of graphs that show the linear least-squares error fit for each hour of the day, for day 4 given the measured data for an example function.
Figure 53:
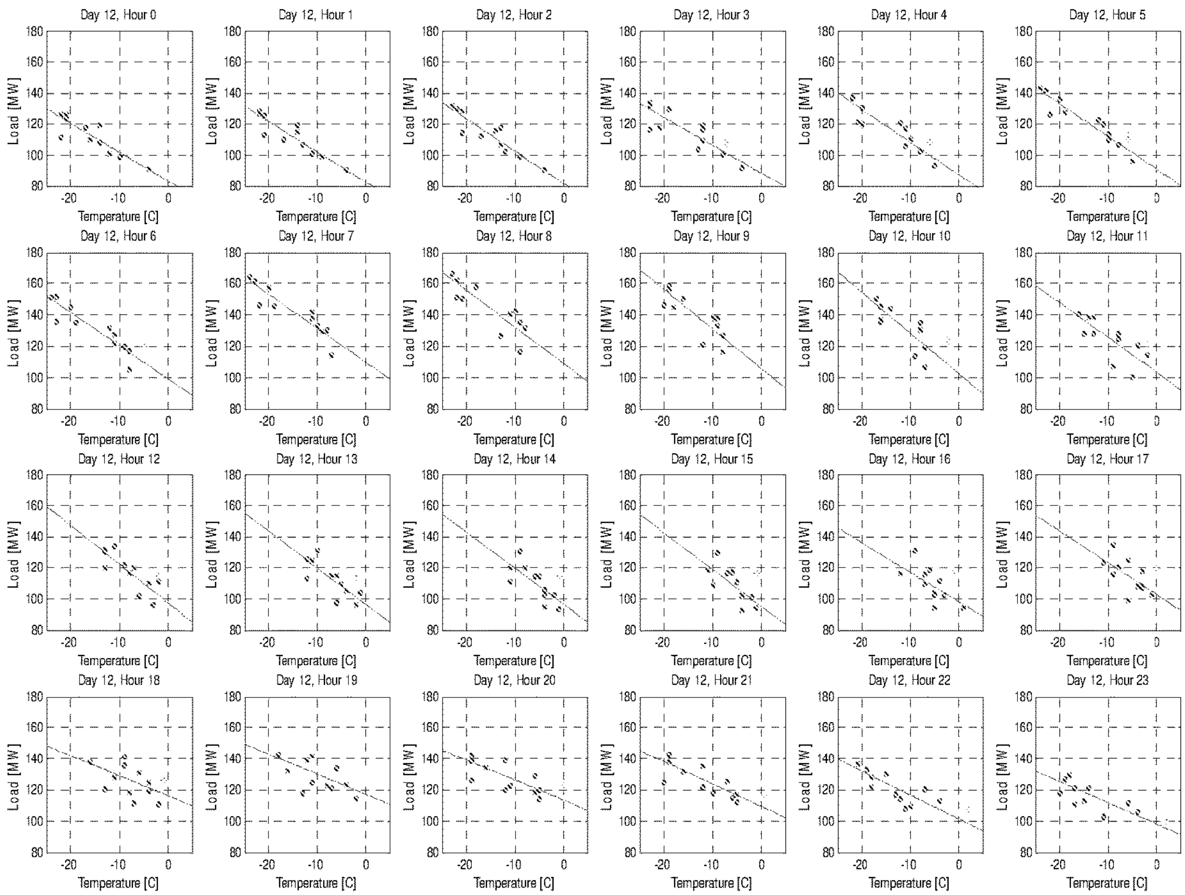
FIG. 53 is a set of graphs that show the linear least-squares error fit for each hour of the day, for day 12 given the measured data for an example function.
Figure 54:
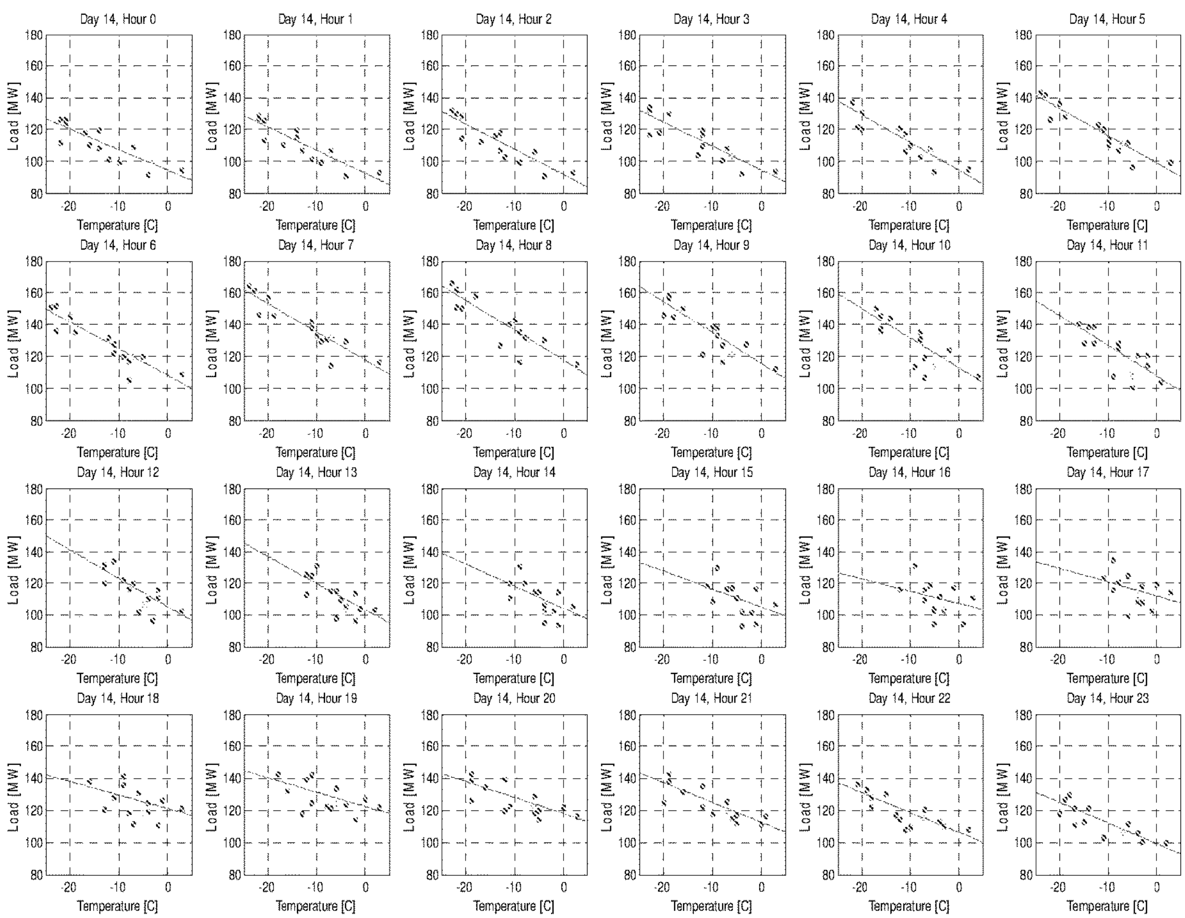
FIG. 54 is a set of graphs that show the linear least-squares error fit for each hour of the day, for day 14 given the measured data for an example function.

In this example, real power (load) P and temperature T measurements during fourteen weekdays—given in Table 33 and Table 34, respectively—are used to compute $\hat{P}$, following the procedure outlined in the Pseudo Code Implementation section. The resulting $\hat{P}$ is given in Table 35, and plotted along with ±1 standard deviation (e.g. $\pm\sqrt{J}$) and Pin the set 5100 of graphs in FIG. 51. Notice that the "NaN" (not a number) entries on day 3 are due to the singularity of matrix A caused by the identical temperature points at the corresponding hours on days 1 and 2. FIG. 52 through FIG. 54 are sets 5200, 5300, 5400 of graphs that show the linear least-squares error fit for each hour of the day, for days 4, 12, and 14, respectively, given the measured data.

TABLE 33

| Power P Measurements in kW | | | | | | | | | | | | | | | |
|---|---|---|---|---|---|---|---|---|---|---|---|---|---|---|---|
| | | D | | | | | | | | | | | | | |
| | | 1 | 2 | 3 | 4 | 5 | 6 | 7 | 8 | 9 | 10 | 11 | 12 | 13 | 14 |
| h | 0 | 126630 | 126380 | 123750 | 119310 | 108010 | 91850 | 101540 | 99580 | 110370 | 118090 | 111810 | 108690 | 94420 | 99760 |
| | 1 | 128540 | 127530 | 126080 | 119370 | 106720 | 90490 | 101250 | 99270 | 110440 | 115540 | 112920 | 107110 | 92590 | 99970 |
| | 2 | 130030 | 132390 | 128840 | 118230 | 107120 | 90680 | 102500 | 99460 | 112350 | 115970 | 114350 | 106530 | 92940 | 101600 |
| | 3 | 132300 | 134530 | 129970 | 119680 | 109430 | 92310 | 104400 | 100900 | 116400 | 117040 | 118210 | 108160 | 93430 | 103750 |
| | 4 | 136720 | 137780 | 131020 | 120650 | 110730 | 93910 | 105960 | 102830 | 120110 | 117440 | 121380 | 108240 | 95000 | 106250 |
| | 5 | 141660 | 143280 | 135970 | 122840 | 113740 | 96180 | 110190 | 107220 | 126350 | 120040 | 127690 | 112090 | 99450 | 111410 |
| | 6 | 151840 | 151040 | 144810 | 131840 | 121820 | 105230 | 119760 | 117030 | 135810 | 127720 | 135390 | 120230 | 108640 | 120590 |
| | 7 | 164120 | 161680 | 157710 | 142160 | 132860 | 114240 | 130250 | 129380 | 146520 | 138180 | 145470 | 129690 | 116230 | 131540 |
| | 8 | 166680 | 162390 | 158210 | 142940 | 134880 | 116610 | 131660 | 126770 | 151070 | 140760 | 150230 | 130020 | 115310 | 131170 |
| | 9 | 158610 | 156650 | 150760 | 137720 | 132790 | 116310 | 126940 | 121170 | 146550 | 138550 | 145140 | 127470 | 112020 | 121080 |
| | 10 | 150280 | 145960 | 144010 | 131050 | 130430 | 107040 | 119110 | 113870 | 137590 | 135270 | 135700 | 123850 | 107310 | 114660 |
| | 11 | 140770 | 138850 | 138650 | 120960 | 124670 | 100140 | 114120 | 107110 | 128370 | 128050 | 128430 | 120340 | 104290 | 108770 |
| | 12 | 132130 | 130430 | 134000 | 110740 | 120430 | 96160 | 111270 | 101900 | 120040 | 116560 | 122470 | 115930 | 103010 | 105390 |
| | 13 | 125840 | 125450 | 131130 | 105590 | 115060 | 96720 | 103900 | 97780 | 113440 | 109900 | 115470 | 114020 | 103600 | 103400 |
| | 14 | 120530 | 119940 | 130460 | 102400 | 114400 | 93370 | 102900 | 94950 | 110830 | 106170 | 114590 | 114710 | 105380 | 101570 |
| | 15 | 118960 | 117000 | 129940 | 102900 | 111120 | 94600 | 101420 | 92960 | 109080 | 102160 | 117490 | 116450 | 106720 | 102620 |
| | 16 | 116740 | 116360 | 131310 | 103930 | 111810 | 94570 | 102470 | 94420 | 109880 | 102600 | 118930 | 117110 | 110980 | 103650 |
| | 17 | 123890 | 121190 | 135200 | 107620 | 117810 | 102710 | 108120 | 99210 | 115810 | 108130 | 125210 | 119550 | 114430 | 111170 |
| | 18 | 137920 | 135820 | 141200 | 118540 | 125000 | 110720 | 119310 | 111320 | 128410 | 120590 | 131300 | 126230 | 121330 | 118390 |
| | 19 | 142510 | 139340 | 141880 | 122890 | 123340 | 114190 | 121300 | 118170 | 132660 | 124750 | 133520 | 126760 | 121940 | 123540 |
| | 20 | 142980 | 138900 | 139110 | 122620 | 119860 | 114130 | 118760 | 119720 | 134420 | 126250 | 128930 | 122130 | 116690 | 122810 |
| | 21 | 142550 | 137650 | 135470 | 122060 | 117290 | 111990 | 115170 | 117520 | 131880 | 124860 | 125790 | 116520 | 111650 | 120670 |
| | 22 | 136270 | 133130 | 130030 | 117390 | 112710 | 107870 | 109270 | 114110 | 128100 | 121910 | 120550 | 107950 | 110480 | 114810 |
| | 23 | 129740 | 126930 | 121660 | 112760 | 106290 | 103520 | 102800 | 111150 | 121650 | 117880 | 111880 | 99490 | 100620 | 107230 |

TABLE 34

| Temperature T Measurements in ° C. | | | | | | | | | | | | | | | |
|---|---|---|---|---|---|---|---|---|---|---|---|---|---|---|---|
| | | d | | | | | | | | | | | | | |
| | | 1 | 2 | 3 | 4 | 5 | 6 | 7 | 8 | 9 | 10 | 11 | 12 | 13 | 14 |
| h | 0 | −21.00 | −22.00 | −21.00 | −14.00 | −14.00 | −4.00 | −12.00 | −10.00 | −16.00 | −17.00 | −22.00 | −7.00 | 3.00 | −3.00 |
| | 1 | −22.00 | −22.00 | −21.00 | −14.00 | −13.00 | −4.00 | −11.00 | −9.00 | −17.00 | −14.00 | −21.00 | −7.00 | 3.00 | −4.00 |
| | 2 | −22.00 | −23.00 | −21.00 | −13.00 | −13.00 | −4.00 | −12.00 | −9.00 | −17.00 | −14.00 | −21.00 | −6.00 | 2.00 | −6.00 |
| | 3 | −23.00 | −23.00 | −19.00 | −12.00 | −12.00 | −4.00 | −13.00 | −8.00 | −23.00 | −12.00 | −21.00 | −7.00 | 3.00 | −6.00 |
| | 4 | −22.00 | −22.00 | −20.00 | −12.00 | −10.00 | −5.00 | −11.00 | −8.00 | −20.00 | −11.00 | −21.00 | −6.00 | 2.00 | −6.00 |
| | 5 | −23.00 | −24.00 | −20.00 | −12.00 | −10.00 | −5.00 | −10.00 | −8.00 | −22.00 | −11.00 | −19.00 | −6.00 | 3.00 | −7.00 |
| | 6 | −23.00 | −24.00 | −20.00 | −12.00 | −11.00 | −8.00 | −9.00 | −8.00 | −23.00 | −11.00 | −19.00 | −5.00 | 3.00 | −7.00 |
| | 7 | −24.00 | −23.00 | −20.00 | −11.00 | −10.00 | −7.00 | −8.00 | −9.00 | −22.00 | −11.00 | −19.00 | −4.00 | 3.00 | −7.00 |
| | 8 | −23.00 | −22.00 | −18.00 | −10.00 | −9.00 | −9.00 | −8.00 | −13.00 | −22.00 | −11.00 | −21.00 | −4.00 | 3.00 | −7.00 |
| | 9 | −19.00 | −19.00 | −16.00 | −9.00 | −9.00 | −8.00 | −8.00 | −12.00 | −20.00 | −10.00 | −18.00 | −3.00 | 3.00 | −6.00 |
| | 10 | −17.00 | −16.00 | −14.00 | −8.00 | −8.00 | −7.00 | −7.00 | −9.00 | −16.00 | −8.00 | −16.00 | −2.00 | 4.00 | −5.00 |
| | 11 | −16.00 | −14.00 | −13.00 | −4.00 | −8.00 | −5.00 | −2.00 | −9.00 | −15.00 | −8.00 | −13.00 | −2.00 | 1.00 | −5.00 |
| | 12 | −13.00 | −13.00 | −11.00 | −4.00 | −7.00 | −3.00 | −2.00 | −6.00 | −13.00 | −8.00 | −9.00 | −2.00 | 3.00 | −5.00 |
| | 13 | −12.00 | −11.00 | −10.00 | −4.00 | −6.00 | −2.00 | −1.00 | −6.00 | −12.00 | −5.00 | −7.00 | −2.00 | 2.00 | −4.00 |
| | 14 | −11.00 | −8.00 | −9.00 | −4.00 | −6.00 | −1.00 | −2.00 | −4.00 | −11.00 | −4.00 | −5.00 | −1.00 | 2.00 | −4.00 |
| | 15 | −11.00 | −7.00 | −9.00 | −4.00 | −5.00 | −1.00 | −2.00 | −4.00 | −10.00 | −4.00 | −6.00 | −1.00 | 3.00 | −4.00 |
| | 16 | −12.00 | −7.00 | −9.00 | −5.00 | −4.00 | 1.00 | −3.00 | −5.00 | −7.00 | −5.00 | −6.00 | −1.00 | 3.00 | −3.00 |
| | 17 | −11.00 | −8.00 | −9.00 | −3.00 | −3.00 | −1.00 | −3.00 | −6.00 | −9.00 | −4.00 | −6.00 | 0.00 | 3.00 | −4.00 |
| | 18 | −16.00 | −9.00 | −9.00 | −8.00 | −4.00 | −2.00 | −4.00 | −7.00 | −11.00 | −13.00 | −6.00 | −1.00 | 3.00 | −5.00 |
| | 19 | −18.00 | −12.00 | −11.00 | −8.00 | −4.00 | −2.00 | −7.00 | −13.00 | −16.00 | −11.00 | −6.00 | 0.00 | 3.00 | −6.00 |
| | 20 | −19.00 | −19.00 | −12.00 | −11.00 | −5.00 | −5.00 | −6.00 | −12.00 | −16.00 | −19.00 | −6.00 | 0.00 | 3.00 | −6.00 |
| | 21 | −19.00 | −19.00 | −12.00 | −12.00 | −5.00 | −5.00 | −6.00 | −10.00 | −16.00 | −20.00 | −7.00 | 1.00 | 0.00 | −7.00 |
| | 22 | −21.00 | −19.00 | −15.00 | −13.00 | −4.00 | −11.00 | −10.00 | −12.00 | −18.00 | −18.00 | −7.00 | 2.00 | −3.00 | −7.00 |
| | 23 | −18.00 | −19.00 | −14.00 | −15.00 | −4.00 | −11.00 | −11.00 | −17.00 | −17.00 | −20.00 | −6.00 | 2.00 | −3.00 | −7.00 |

TABLE 35

| Predicted Load $\hat{P}$ in kW | | | | | | | | | | | | | | | |
|---|---|---|---|---|---|---|---|---|---|---|---|---|---|---|---|
| | | d | | | | | | | | | | | | | |
| | | 1 | 2 | 3 | 4 | 5 | 6 | 7 | 8 | 9 | 10 | 11 | 12 | 13 | 14 |
| h | 0 | — | — | 126630 | 124191 | 119498 | 96626 | 108269 | 102805 | 114650 | 116329 | 127101 | 96474 | 85579 | 98352 |
| | 1 | — | — | NaN | 112395 | 118196 | 94929 | 105910 | 100573 | 117443 | 110287 | 125689 | 96505 | 83045 | 98352 |
| | 2 | — | — | 127670 | 112362 | 117984 | 94487 | 108956 | 100904 | 118733 | 111250 | 127527 | 94263 | 84303 | 101254 |
| | 3 | — | — | NaN | 123941 | 120116 | 101062 | 113747 | 101384 | 133700 | 109346 | 127434 | 101173 | 86802 | 103607 |
| | 4 | — | — | NaN | 106100 | 116809 | 103093 | 111749 | 103192 | 132447 | 109778 | 133525 | 100222 | 87433 | 104971 |
| | 5 | — | — | 136800 | 121561 | 119302 | 106235 | 112052 | 106958 | 139419 | 113423 | 131534 | 103789 | 88863 | 110968 |
| | 6 | — | — | 154240 | 134747 | 130419 | 119543 | 115100 | 114163 | 150572 | 121766 | 139918 | 109873 | 98412 | 119912 |
| | 7 | — | — | 154360 | 142393 | 140515 | 130391 | 125117 | 129120 | 159899 | 133373 | 151689 | 118670 | 109277 | 130146 |
| | 8 | — | — | 145230 | 143146 | 141225 | 137822 | 127300 | 141211 | 163014 | 133587 | 158918 | 118595 | 109151 | 130867 |
| | 9 | — | — | NaN | 134730 | 137507 | 132860 | 126121 | 137835 | 160160 | 129541 | 152236 | 113491 | 107649 | 127317 |
| | 10 | — | — | 137320 | 127838 | 130750 | 128511 | 119661 | 125622 | 146717 | 120059 | 145536 | 107769 | 103493 | 122319 |
| | 11 | — | — | 137890 | 130499 | 128391 | 121910 | 105218 | 125576 | 138497 | 120412 | 132764 | 107940 | 107169 | 117351 |
| | 12 | — | — | NaN | 143520 | 118649 | 110789 | 100537 | 114747 | 131530 | 117284 | 119690 | 102612 | 97249 | 114317 |
| | 13 | — | — | 125060 | 137416 | 112662 | 104182 | 97282 | 112642 | 126957 | 107679 | 112801 | 101343 | 97428 | 110096 |
| | 14 | — | — | 120137 | 121422 | 113458 | 103761 | 100347 | 106438 | 124786 | 104472 | 107208 | 98929 | 98885 | 109909 |
| | 15 | — | — | 117980 | 116726 | 111867 | 105021 | 102011 | 106541 | 120376 | 104146 | 108635 | 97775 | 97505 | 109736 |
| | 16 | — | — | 116512 | 118213 | 112656 | 108185 | 106796 | 109286 | 111196 | 107311 | 108670 | 100318 | 100467 | 109828 |
| | 17 | — | — | 122090 | 119859 | 111253 | 111212 | 111197 | 116548 | 121170 | 110107 | 114007 | 102980 | 105753 | 115742 |
| | 18 | — | — | 135820 | 136638 | 129992 | 126212 | 123068 | 126902 | 131885 | 134883 | 122509 | 117508 | 116577 | 125388 |
| | 19 | — | — | 138812 | 138298 | 127833 | 122911 | 127317 | 136713 | 139585 | 130864 | 122535 | 117216 | 118237 | 127802 |
| | 20 | — | — | NaN | 138849 | 120367 | 120023 | 119184 | 129288 | 135266 | 140450 | 118000 | 113418 | 114014 | 124063 |
| | 21 | — | — | NaN | 135470 | 116724 | 117127 | 116668 | 123607 | 134221 | 141567 | 117392 | 107961 | 113130 | 121303 |
| | 22 | — | — | 126850 | 126981 | 103428 | 121141 | 116431 | 118619 | 129812 | 129610 | 107833 | 98446 | 109999 | 115050 |
| | 23 | — | — | 140980 | 124582 | 95629 | 115900 | 113221 | 123598 | 122204 | 128027 | 101939 | 95493 | 103983 | 108230 |

6.3.3 Transactive Imported Energy (Function 1.2)

Description:

Converts transactive signals from transactive neighbors into framework parameter outputs that are expected by the toolkit framework.

Application: A transactive node typically should restate the transactive signals that it receives in terms of toolkit framework parameters.

This toolkit function is so basic that it may be treated as part of the toolkit framework.

Block Input/Output Function Model:

Inputs:

Current IST time series.

Transactive incentive signals (TIS) from each transactive neighbor.

Transactive feedback signals (TFS) from each transactive neighbor.

Outputs:

TIS restated as energy terms $C_E$.

TFS restated as energy terms $P_G$ for the intervals during which the TFS represents imported energy.

6.3.4 Small Wind Generator Negative Load (Function 1.4)

Description:

This function is to predict the power to be produced by small wind energy resources. This function is preferred where a relatively small amount of wind renewable generation offsets load at a location.

If the energy from a wind energy resource should directly affect the transactive incentive signal (TIS) at this location and electrically downstream locations, the energy from this resource should be incorporated with the Wind Energy resource and incentive toolkit function instead.

This function applies to locations that host relatively small wind generators or wind sites that primarily offset a larger electrical load.

Block Input/Output Function Model:

Inputs:

$\{u_k\}$—[m/s]—Time series of predicted wind speed for a future interval k, for the upcoming four days (time horizon of transactive signals), based on wind speed data recorded at a height h, at or close to the location under consideration. Although granular data is desired, this function is formulated to work with any available data interval.

h—[m]—Height at which wind speed is predicted.

ψ—[unitless]—Wind turbine manufacturer and model information to be chosen from this preliminary text enumeration:

- Honeywell WT6500
- Windspire 1.2
- Home Energy Americas V200
- Skystream
- Bergey Excel 10
- Urban Green Energy UGE-4K
- Tangarie Gale 10
- WePower Falcon 5.5
- Wing-Power Prototype This enumeration should be augmented whenever a new wind turbine is to be considered.

m—[count]—Number of wind turbines.

$h_{hub}$—[m]—wind turbines' representative hub height.

$K_n$—[unitless]—Time series availability fraction, e.g. fraction of turbines or wind site that is predicted to be online during each $n^{th}$ IST interval, where n=0, 1, . . . , 55. Wind generation may be limited or entirely unavailable due to maintenance schedules and other reasons.

Interim Calculation Products:

$\{U_{hub,k}\}$—[m/s]—Time series of predicted wind speed for a future interval k at the wind turbines' representative hub height $h_{hub}$.

Output:

$\{L_n\}$—[kW]—Time series of average power to be produced by wind turbine(s) for each future $n^{th}$ IST interval.

Pseudo Code Implementation:

1. Restate inputs in the units specified in previous section, if necessary.
2. Compute $\{u_{hub,k}\}$:
   Based on the wind profile power law relationship (Elliot 1986):

$$\forall k, u_{hub,k} = \left(\frac{h_{hub}}{h}\right)^{\alpha} \cdot u_k \tag{1}$$

α—[unitless]—An empirically derived constant for the location of the wind turbine(s). If empirical derivation is not possible, 1/7 may be used as an approximation.

The implementer may choose to use a different approach/relationship, if deemed more appropriate/accurate.
3. Generate $\{L_n\}$:
   For the given ψ input, generate $\{L_k\}$ by looking up, from Table 36, an $L_k$ corresponding to each $u_{hub,k}$: output data between 20 and 30 m/s is missing in its datasheet. This data has been extrapolated here, but should be replaced if more accurate data is available. No cut-out speed information is given in the datasheet of this wind turbine. It is assumed that there is no cut-out speed and the power output has been extrapolated beyond 14 m/s. This data has been extrapolated here, but should be replaced if more accurate data is available. There is no datasheet for this prototype wind turbine. Given its similarities with the WePower Falcon 5.5, its power versus wind speed data is assumed to be a scaled version of the Falcon 5.5. However, this data should be replaced by either empirical data or such data from a different source.

Allocate $\{L_k\}$ to each $n^{th}$ interval, scale by m, and multiply by K to generate $\{L_n\}$:

$$\forall n, L_n = \begin{cases} m \cdot K_n \cdot L_k, & \text{if } n \subseteq k \\ m \cdot K_n \cdot \overline{L_k}, & \text{if } k \subseteq n \end{cases} \tag{2}$$

$\overline{L_k}$—[kW]—weighted-average of all $L_k$ within n.

Make this $\{L_n\}$ prediction available as an output of this function into the transactive node's algorithmic toolkit framework.

TABLE 36

Lookup table for wind turbine power output at a given wind speed

| | L [kW] | | | | | | | | |
|---|---|---|---|---|---|---|---|---|---|
| u [m/s] | Honeywell WT6500 | Windspire 1.2 | ome Energy Americas V200 | Skystream 3.7 | Bergey Excel 10 | Urban Green Energy UGE-4K | Tangarie Gale 10 | WePower Falcon 5.5 | Wing-Power Prototype |
| 1.0 | 0.009 | 0 | 0 | 0 | 0.020 | 0 | 0 | 0 | 0 |
| 1.5 | 0.015 | 0 | 0 | 0 | 0.030 | 0 | 0 | 0 | 0 |
| 2.0 | 0.025 | 0 | 0 | 0 | 0.080 | 0 | 0.333 | 0 | 0 |
| 2.5 | 0.038 | 0 | 0 | 0 | 0.105 | 0.041 | 0.617 | 0 | 0 |
| 3.0 | 0.048 | 0 | 0.005 | 0 | 0.159 | 0.082 | 0.833 | 0.066 | 0.029 |
| 3.5 | 0.074 | 0 | 0.014 | 0.024 | 0.254 | 0.123 | 1.167 | 0.166 | 0.072 |
| 4.0 | 0.103 | 0.030 | 0.025 | 0.072 | 0.382 | 0.185 | 1.417 | 0.298 | 0.130 |
| 4.5 | 0.128 | 0.065 | 0.040 | 0.144 | 0.636 | 0.247 | 1.667 | 0.464 | 0.202 |
| 5.0 | 0.171 | 0.115 | 0.059 | 0.220 | 0.891 | 0.309 | 2.167 | 0.633 | 0.276 |
| 5.5 | 0.209 | 0.160 | 0.082 | 0.336 | 1.209 | 0.391 | 2.667 | 0.895 | 0.391 |
| 6.0 | 0.251 | 0.220 | 0.100 | 0.456 | 1.527 | 0.514 | 3.083 | 1.127 | 0.492 |
| 6.5 | 0.285 | 0.283 | 0.122 | 0.600 | 2.036 | 0.658 | 3.583 | 1.358 | 0.593 |
| 7.0 | 0.333 | 0.350 | 0.145 | 0.744 | 2.482 | 0.823 | 4.167 | 1.590 | 0.694 |
| 7.5 | 0.392 | 0.425 | 0.178 | 0.936 | 2.991 | 0.988 | 4.833 | 1.855 | 0.809 |
| 8.0 | 0.457 | 0.525 | 0.225 | 1.104 | 3.627 | 1.193 | 5.500 | 2.087 | 0.911 |
| 8.5 | 0.500 | 0.610 | 0.285 | 1.320 | 4.391 | 1.440 | 6.167 | 2.319 | 1.012 |
| 9.0 | 0.583 | 0.750 | 0.372 | 1.542 | 5.218 | 1.708 | 6.833 | 2.584 | 1.128 |
| 9.5 | 0.651 | 0.880 | 0.460 | 1.780 | 6.109 | 2.058 | 7.667 | 2.916 | 1.272 |
| 10.0 | 0.714 | 1.025 | 0.552 | 2.000 | 6.936 | 2.366 | 8.417 | 3.346 | 1.460 |
| 10.5 | 0.793 | 1.138 | 0.642 | 2.136 | 7.891 | 2.675 | 9.250 | 3.877 | 1.692 |
| 11.0 | 0.888 | 1.188 | 0.733 | 2.254 | 8.909 | 3.086 | 10.000 | 4.340 | 1.894 |
| 11.5 | 0.981 | 1.200 | 0.822 | 2.325 | 10.055 | 3.601 | 11.000 | 4.771 | 2.082 |
| 12.0 | 1.069 | 1.200 | 0.900 | 2.372 | 10.945 | 4.012 | 12.000 | 5.102 | 2.226 |
| 12.5 | 1.172 | 1.175 | 1.005 | 2.396 | 11.709 | 4.074 | 13.083 | 5.300 | 2.313 |
| 13.0 | 1.250 | 1.138 | 1.100 | 2.410 | 12.091 | 4.000 | 14.167 | 5.400 | 2.356 |
| 13.5 | 1.357 | 1.000 | 1.214 | 2.410 | 12.345 | 4.000 | 15.167 | 5.500 | 2.400 |
| 14.0 | 1.466 | 0.300 | 1.325 | 2.396 | 12.473 | 4.000 | 16.417 | 5.500 | 2.400 |

Figure 55:
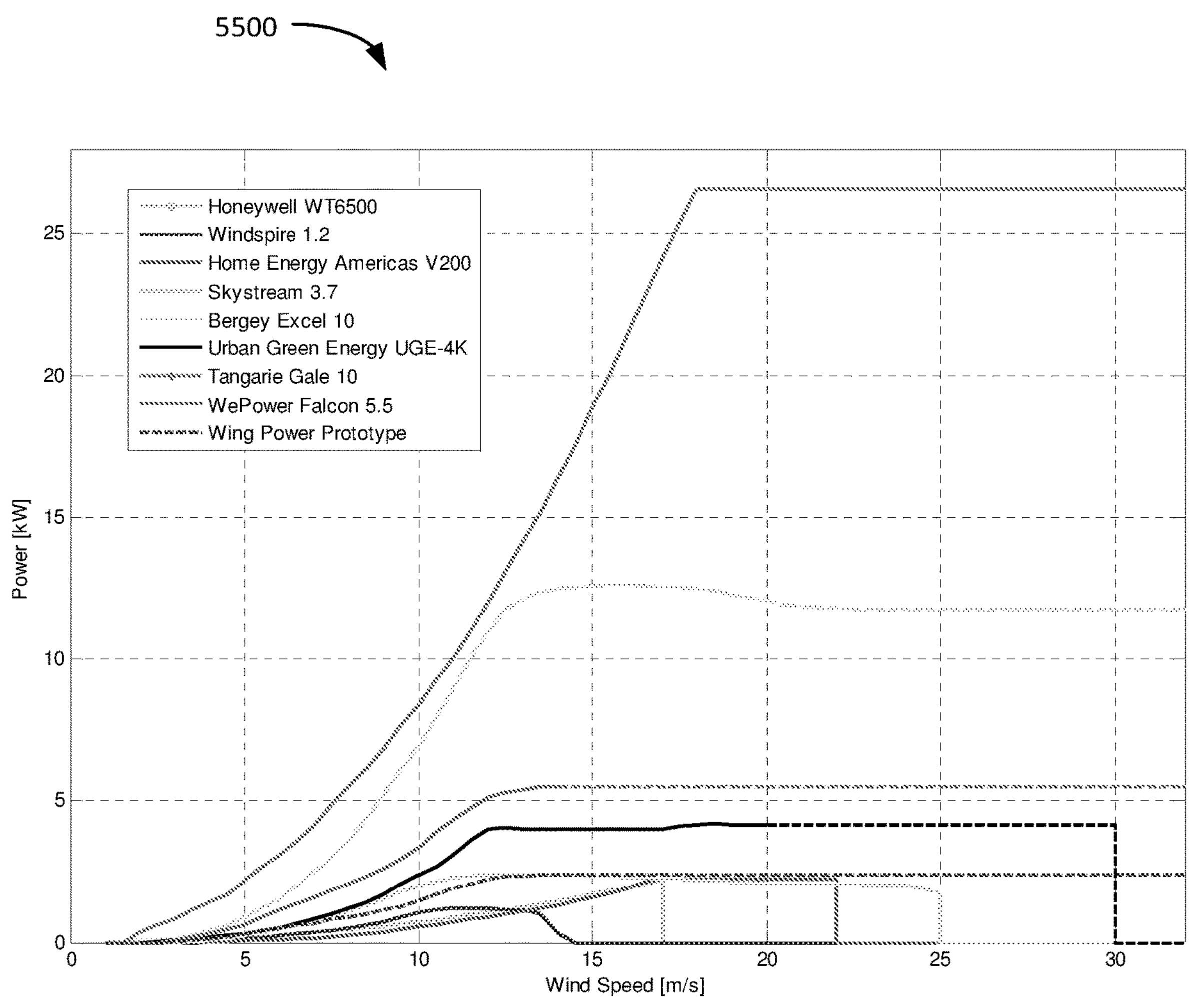
FIG. 55 is a graph of power vs. wind speed for wind turbines for an example function.

The information in Table 36 is plotted in graph 5500 of FIG. 55. Table 36 is based on information available in the datasheets or brochures of these wind turbines. The powers given for 32 m/s are to be used for speeds beyond 32 m/s. The datasheet of this wind turbine claims that it does not have a cut-out wind speed. Therefore, the power output has been extrapolated beyond 20 m/s. However, the extrapolated data should be replaced if more accurate data is available. This wind turbine has a cut-out speed of 30 m/s, but power

6.3.5 Small-Scale Solar Generator Negative Load (Function 1.6)

Description:

This function is to predict the power to be produced by small solar energy resources. This function is preferred where a relatively small amount of solar renewable generation offsets load at a location.

If the energy from a solar energy resource should directly affect the transactive incentive signal (TIS) at this location and electrically downstream locations, the energy from this resource should be incorporated with the Solar Energy resource and incentive toolkit function instead.

This function applies to locations that host relatively small solar generators or solar sites that primarily offset a larger electrical load.

Block Input/Output Function Model:

Inputs:

$\{GTI_k\}$—[kW/m$^2$]—Time series of predicted Global Tilted Irradiance (GTI) for a future interval k, for the upcoming four days (time horizon of transactive signals), based on solar irradiance data recorded at or close to the location under consideration. ($GTI=DNI\cdot\cos(\theta_i)+DIF\cdot(1-\beta/180°)$, where DNI is the Direct Normal Irradiance, DIF the Diffuse Horizontal Irradiance, A the inclination angle of the tilted plate, and $\theta_i$ the angle between DNI and the normal of the tilted plate. DNI and DIF are the actual data measured at the location under consideration. Furthermore, $\cos(\theta_i)=\cos\beta\cdot\cos Z+\sin\beta\cdot\sin Z\cdot\cos(\theta-\psi)$, where θ and Z are the sun's azimuth and zenith, respectively. Note that there are known equations to compute θ and Z throughout the day, every day, at a given latitude.) Although granular data is desired, this function is formulated to work with any available data interval. The GTI represents the effective irradiance normal to a tilted surface. For a fixed flat-plate photovoltaic (PV) collector, the computation of GTI is, therefore, dependent on its inclination angle β and azimuth ψ, as defined below. Note also that GTI may not be shared amongst solar generators unless they have the same inclination and azimuth. For a solar-tracking collector or concentrating collector, the computation of GTI should assume that the normal of the solar collector is in line with the Direct Normal Irradiance (DNI).

β—[°]—Inclination angle of the fixed flat-plate PV collector. This is 0° for systems laying horizontal to the ground. This is not required for solar-tracking collectors, including concentrating collectors.

ψ—[°]—Azimuth of the fixed flat-plate PV collector. This is 180° for systems facing due south. This is not required for solar-tracking collectors, including concentrating collectors.

A—[m$^2$]—Effective surface area of the solar collector.

η—[%]—Overall conversion efficiency of the solar energy resource, e.g. from the incident solar power (e.g., GTI·A) to the usable alternating current (AC) power. This should be the product of the efficiencies of the solar collector and its power converter, and, if possible, should include conduction losses. The implementer may choose to model this overall efficiency as a function of power. While the efficiency of the solar collector may be constant at different power levels, the efficiency of the power converter varies. The efficiency versus power curve of the converter is sometimes published in its datasheet. Conduction losses also vary with power, but may be harder to quantify and model.

m—[count]—Number of such solar energy resources that is being modeled by this function.

$K_n$—[unitless]—Time series availability fraction, e.g. fraction of solar energy resources or solar site that is predicted to be online during each $n^{th}$ IST interval, where n=0, 1, . . . , 55. Solar generation may be limited or entirely unavailable due to maintenance schedules and other reasons.

Interim Calculation Product:

$\{L_k\}$—[kW]—Time series of average power to be produced by one solar energy resource for each future interval k.

Output:

$\{L_n\}$—[kW]—Time series of average power to be produced by the solar energy resource(s) for each future $n^{th}$ interval.

Pseudo Code Implementation:

1. Restate inputs in the units specified in previous section, if necessary.
2. Generate $\{L_k\}$:
   For each future interval k, compute the average power $\{L_k\}$ to be produced by one solar energy resource:

$$\forall k, L_k = GTI_k \cdot A \cdot \eta \tag{2}$$

3. Generate $\{L_n\}$:
   Allocate $\{L_k\}$ to each $n^{th}$ interval, scale by m, and multiply by $K_n$ to generate $\{L_n\}$:

$$\forall\, n,\, L_n = \begin{cases} m \cdot K_n \cdot L_k, & \text{if } n \subseteq k \\ m \cdot K_n \cdot \overline{L_k}, & \text{if } k \subseteq n \end{cases} \tag{3}$$

$\overline{L_k}$—[kW]—weighted-average of all $L_k$ within n.

Make this $\{L_n\}$ prediction available as an output of this function into the transactive node's algorithmic toolkit framework.

6.3.6 General Event-Driven Demand (Function 2.0)

Description:

This is a very general function for predicting the behaviors of responsive load assets that only infrequently respond to events that may be identified from an incentive signal. When these assets respond, they transition to a limited number of available response levels. This general function may serve as a template for functions that are more narrowly targeted to specific responsive asset systems. This function has been written at such a high level that it will not likely be referenced and used for any asset system. But this function description will be valuable guidance to those who design more specific functions for more specific asset systems.

This function can respond to absolute or relative TIS as desired by an application.

This function applies to many responsive asset systems that conduct traditional demand response several times a month. Response may additionally define a "critical" response level for extreme conditions.

Block Input/Output Function Model:

Inputs:

Current IST time series.

TIS time series. Recent history (e.g., 1 day to 1 week) of TIS that may be used if relative TIS is to be tracked in a statistical sense.

Numbers of assets in this asset system population that may be used to scale this function.

Typical daily or weekly inelastic load profile for the asset systems that are being predicted by this function. This profile is a starting point for predicting the inelastic load component.

Outputs:

Predicted inelastic load at for each IST interval.

Predicted change in elastic load for each IST interval.

Predicted advisory control signal for this asset system.

Pseudo Code Implementation:

Inelastic load component.

This algorithm will not predict an inelastic load component. Inelastic load components are better addressed by inelastic load functions that have been defined.

Elastic Load Component.

This algorithm will calculate (1) predicted change in electrical load in response to the incentive signal (e.g., the asset's elasticity), (2) "events" during which an asset is predicted to respond, and (3) the predicted advisory control signal that will be sent to this elastic asset system.

Predicted Change in Electrical Load in Response to the Incentive Signal.

To predict a change in energy that can result from this asset system during events, this function should model the consumption (or generation) of energy by this asset system. At least two approaches can be accommodated: (1) An explicit time-series load shape may be used to represent the responsive load (or generation) from this asset system. Alternatively, (2) A dynamic model of this asset system may be simulated to predict the effect that an event will have on the asset system. These approaches will be compared by discussing how each one could be used to predict the change in electrical load that could be had from a set of residential tank water heaters.

Explicit Time-Series Load Shape.

The average electrical load consumed during each hour of a day by a residential 40-gallon tank electric water heater may be obtained. In some cases, regional and seasonal variations may be found. See (Hammerstrom 2007, FIG. 4.18) for example. The load curves represent the average power that is expected to be consumed by an electric water heater at any time of the day. In many cases, splines will allow such load curves to be very efficiently stored and reproduced. The number of water heaters in the asset system population is a scaling factor that may be used to predict the entire consumption by this population of water heaters. If an event were to occur and cause this population of water heaters to become curtailed, the change in energy consumption by these water heaters would be predicted well by knowing the number of water heaters, the representative load curve for a single water heater, and the time and duration of the event.

Dynamic Asset System Model.

The same population of electric water heaters may be more rigorously modeled using a physics-based model of a water heater. In this case, one could input typical residential hot water consumption instead of an electrical load curve. As water is consumed, hot water leaves the water tank, cold water enters the water tank, and the temperature of the water in the tank decreases. The modeled thermostat turns on the electrical heating element and heats the water at a rate that is determined by the power rating of a heating element. If the model being used is accurate, the resulting electrical load curve would also be accurate on a "typical" day.

However, if a curtailment is predicted, the response of the dynamic water heater model can predict secondary effects that could not have been modeled otherwise. After a period of electrical curtailment, the water in the tank will have become relatively cold. When the curtailment period ends, additional energy is then used to reheat the cool, stored water to the desired temperature. A rebound effect is thereby predicted at the conclusion of the curtailment event.

Events During which this Asset is Predicted to Respond.

The capabilities and availability of the modeled asset system determine a set of incentive thresholds that should be managed by this function. A threshold may be a function of time. An asset system that has only two modes of operation (e.g., normal and curtailed) will define only one threshold. Generally, an asset system that has m modes of operation should define m−1 thresholds. The resulting thresholds, in turn, define m−1 levels of response for an asset system. (The "Normal" mode of operation is indeed a mode of operation, but it is usually not considered a response level.) "Events" occur any time that the predicted incentive signal exceeds a defined threshold to invoke one of the levels of response that is a feature of this asset system.

The availability of asset systems that are responsive either on an event-based or time-of-use basis may be predicted if limitations on the numbers and durations of events are stated. For example, a utility might have contracted with its customers that a responsive asset will not become curtailed by the utility more often than four times per calendar month and that none of these curtailments will not endure for more than 2 hours.

Over time, statistical distributions and correlations emerge from the dynamic behaviors of the incentive signal. This function may incorporate the behaviors of past historical incentive signals and the predicted incentive signals as these statistics are being compiled. This function may thereafter refer to such statistics to evaluate and predict where a threshold should be placed to initiate just fewer than the allowed number of events and just less than the allowed duration of events. Automated event-driven demand response will be attempting to identify events within month-long durations, so these functions should use the actual incentive signal (not its statistical average), or it should track the statistical average of the incentive signal quite slowly in comparison with that duration.

Predicted Advisory Control Signal.

Once events have been predicted, the predicted advisory control signal may be stated, aligned in time with the predicted events, according to the standardized method described in the appendix entitled "Standard Advisory Output Control Signal". In the referenced method, the capabilities of this asset system and, in some cases, the severity of an event determine which integer member of a signed byte signal will be sent to the asset system. (The domain of relevant advisory control signals will be relatively small for functions that are formulated for specific asset systems.)

6.3.7 Incentive Function—Wind Energy (Function 2.1)

Description:

This function addresses wind power generation and is to be applied at transactive nodes which have and represent wind farm energy that is produced within or near their electrical boundaries to encourage the use of wind energy when and near where it is generated. This function is applicable to energy produced by a wind farm or may be applied to aggregated output from multiple wind farms.

The cost of supplying the wind energy generated is applied as an infrastructure cost, in units of cost per time, consistent with the Transactive Node Framework. For simplicity, the infrastructure cost will use the $2155/kW capacity-weighted average installed cost for a wind farm. The infrastructure cost of a wind farm can thus be estimated if its capacity is known. This cost shall then be spread over the lifetime T of the wind farm.

Note that this calculation typically yields an infrastructure cost near $0.010/kW/h ($10/MW/h) if a 25-year lifetime is assumed. It is permissible for the implementer of this function to assume that $T=2.19\times10^5$ hours (25 years) if better estimates are unavailable for the lifetime of the wind farm installation.

After a wind farm exceeds its planned lifetime, a decision should be made. Thereafter, the infrastructure cost may be (a) zeroed out, (b) replaced by ongoing maintenance costs, or (c) continued as before as an ongoing replacement cost. This function should be revisited and refined when this situation will be encountered.

This function should also predict the electrical power that will be produced by the wind resource during each future interval. An explicit algorithm could be created to convert predicted weather conditions (like wind speed and direction) into electrical power output. This function will assume that experts satisfy this goal by predicting electrical power output from meteorological data that is available to them.

Block Input/Output Function Model:

Inputs:

P—Wind farm capacity/power rating.

T—Lifetime of wind farm.

$IST_n$—Present time series interval start times used by an example toolkit framework, where n=0, 1, . . . , 56. (There is no prediction to correspond with $IST_n$ for n=56. This last IST is simply used to make it clear when the final interval concludes.)

Meteorological data—Predicted wind speed, wind direction, relative humidity and perhaps other weather data that experts may use to predict electrical power production for wind farms.

Outputs:

$C_{I,n}$—Time series of infrastructure cost terms expected by the Transactive Node Framework (unit: \$/h); series members correspond to $IST_n$. Infrastructure costs are not expected to be dynamic, but it is specified as a time series for consistency with the Transactive Node Framework.

$P_{G,n}$—Time series of predicted electrical power generated by wind farm (unit: average kW); series members correspond to $IST_n$.

$C_{E,n}$—Time series of energy cost terms (unit: cost per energy). Since the cost of supplying the wind energy generated is applied purely as an infrastructure cost, these energy cost terms should simply be set to zero. Note that these terms go in pair with the $P_{G,n}$ terms and are used by the Transactive Node Framework.

Pseudo Code Implementation:

1. If necessary, restate P in kW and T in h (hour).
2. Compute the infrastructure cost $C_{I,n}$ corresponding to $IST_n$ for n, as in equation (1).

$$C_{I,n} = \frac{(\$2155/\text{kW})\times P}{T}, \text{ for } n = 0, 1, \ldots, 55 \tag{1}$$

3. Predict the average wind electrical power output $P_{G,n}$ that will be generated during each future interval corresponding to $IST_n$ for n.
4. Output $C_{E,n}=0$, for n=0, 1, . . . , 55.

6.3.8 Incentive Function—Solar Energy (Function 2.2)

Description:

This function addresses solar power generation and is to be applied at transactive nodes which have and represent solar farm energy that is produced within or near their electrical boundaries to encourage the use of solar energy when and near where it is generated. This function is applicable to energy produced by a solar farm or may be applied to aggregated output from multiple solar farms.

The cost of supplying the solar energy generated is applied as an infrastructure cost, in units of cost per time, consistent with the Transactive Node Framework. For simplicity, the infrastructure cost will use the \$7.5/W capacity-weighted average installed cost for a solar farm. The infrastructure cost of a solar farm can thus be estimated if its capacity is known. This cost shall then be spread over the lifetime T of the solar farm.

Note that this calculation typically yields an infrastructure cost near \$0.034/kW/h (\$34/MW/h) if a 25-year lifetime is assumed. It is permissible for the implementer of this function to assume that $T=2.19\times10^5$ hours (25 years) if better estimates are unavailable for the lifetime of the solar farm installation.

After a solar farm exceeds its planned lifetime, a decision should be made. Thereafter, the infrastructure cost may be (a) zeroed out, (b) replaced by ongoing maintenance costs, or (c) continued as before as an ongoing replacement cost. This function should be revisited and refined when this situation will be encountered.

This function should also predict the electrical power that will be produced by the solar resource during each future interval. An explicit algorithm could be created to convert predicted weather conditions (like solar irradiance and temperature) into electrical power output. This function will assume that experts satisfy this goal by predicting electrical power output from meteorological data that is available to them.

Block Input/Output Function Model:

Inputs:

P—Solar farm capacity/power rating.

T—Lifetime of solar farm.

$IST_n$—Present time series interval start times used by the toolkit framework, where n=0, 1, . . . , 56. (There is no prediction to correspond with $IST_n$ for n=56. This last IST is simply used to make it clear when the final interval concludes.)

Meteorological data—Solar irradiance, temperature, and perhaps other weather data that experts may use to predict electrical power production for solar farms.

Outputs:

$C_{I,n}$—Time series of infrastructure cost terms expected by the Transactive Node Framework (unit: \$/h); series members correspond to $IST_n$. Infrastructure costs are not expected to be dynamic, but it is specified as a time series for consistency with the Transactive Node Framework.

$P_{G,n}$—Time series of predicted electrical power generated by solar site (unit: average kW); series members correspond to $IST_n$.

$C_{E,n}$—Time series of energy cost terms (unit: cost per energy). Since the cost of supplying the solar energy generated is applied purely as an infrastructure cost, these energy cost terms should simply be set to zero. Note that these terms go in pair with the $P_{G,n}$ terms and are used by the Transactive Node Framework.

Pseudo Code Implementation:

1. If necessary, restate P in W and T in h (hour).
2. Compute the infrastructure cost $C_{I,n}$ (units: \$/h) corresponding to $IST_n$ for n, as in equation (1).

$$C_{I,n} = \frac{(\$7.5/W)\times P}{T}, \text{ for } n = 0, 1, \ldots, 55 \tag{1}$$

3. Predict the average solar electrical power output $P_{G,n}$ that will be generated during each future interval corresponding to $IST_n$ for n.
4. Output $C_{E,n}$=0, for n=0, 1, . . . , 55.

6.3.9 Incentive Function—Hydropower (Function 2.3)

Description:

This function is to predict the amount and cost of hydroelectric energy when and near where it is generated. It should at least represent federal hydropower of the region, but should strive to represent all regional hydropower. This function applies to transactive nodes that own or represent hydropower generation within their electrical boundaries. At least transmission zones 4, 5, 6, 7, 8, 10, 11, 12, and 14 are within the Columbia River Basin and would be expected to host federal hydropower. Based on the predicted generated powers of non-hydro sources at a transactive node and their associated costs of energy, and historical electricity market prices, this function predicts the weighted-average cost of energy of hydropower generation.

Block Input/Output Function Model:

Inputs:

$\{P_{s,t}\}$, t=$t_0$, $t_0$+1 hour, . . . , $t_0$+i, . . . , $t_0$+I, . . . —[kW]—Aggregated hourly scheduled hydropower generation (both must-run and flexible), at the transactive node at which this function is being implemented, for each hour of at least the next four days (e.g., the predicted time horizon of the transactive signals). Where this input cannot be known, trends may be used.

$\{C_{m,h,d}\}$, h=00:00, 01:00, . . . , 23:00; d=−1, −2, . . . , −7—[\$/kWh]—Historical electricity market price trading for every hour starting at h of the day d, for the past 7 days. (A trend based on the electricity market price for the past 7 days is more likely to represent the expected market price for the next four days.) The Dow Jones Mid-Columbia Electricity Price Indexes is an example of a source for such information.

$\{K_{h,s}\}$, h=00:00, 01:00, . . . , 23:00, s=four seasons of the year—[unitless]—fraction/percentage of total scheduled hydropower generation, representing an estimate for flexible hydropower generation during every hour starting at h of a given season s.

$C_{mustrun}$—[\$/kWh]—cost of energy for must-run hydropower generation. This cost may have to be updated yearly, seasonally, or at some shorter interval. (This cost of energy for must-run hydropower generation is an estimate obtained from a hypothetical supply stack provided by BPA and included in Subappendix A.)

Interim Calculation Products:

$\{C_{trend,h}\}$, h=00:00, 01:00, . . . , 23:00—[\$/kWh]—Trended electricity market price by hour starting at h of the day.

$\{C_{flexible,n}\}$, n=0, 1, . . . , 55—[\$/kWh]—cost of energy for flexible hydropower generation, corresponding to the $n^{th}$ interval.

Outputs:

$\{P_{G,n}\}$—[kW]—Total hydropower generation, corresponding to the $n^{th}$ interval $\{C_{E,n}\}$—[\$/kWh]—Weighted-average cost of energy for hydropower, corresponding to the $n^{th}$ interval.

Pseudo Code Implementation:

1. Restate inputs in the units specified in previous section, if necessary.
2. Generate $P_{G,n}$:

Allocate of the scheduled hydropower generation to each $n^{th}$ interval.

$$\forall\, n,\ P_{G,n} = \begin{cases} P_{s,t_0+i}, & \text{if } n \subseteq [(t_0+i+1)-(t_0+i)] \\ \dfrac{1}{(t_0+I)-(t_0+i)}\displaystyle\sum_{t=t_0+i}^{t_0+I-1} P_{s,t}, & \text{if } [(t_0+I)-(t_0+i)] \subseteq n \end{cases} \quad (1)$$

Make this $P_{G,n}$ prediction available as an output of this function into the transactive node's algorithmic toolkit framework.

3. Calculate or update the trend for hour-by-hour electricity market price that may be used to predict $C_{flexible}$ if better predictions are not known. For each hour starting at h of the day, calculate the average electricity market price for the past 7 days. If an implementer possesses better means to make these predictions, then such predictions should replace this trend information as it becomes available.

$$\forall\, h,\ C_{trend,h} = \frac{1}{7}\sum_{d=-7}^{-1} C_{m,h,d} \quad (2)$$

Successive daily updates may be accomplished as follows:

$$\forall h, C_{trend,h} = 1/7(7 \cdot C_{trendh,h,old} - C_{m,h,-8} + C_{m,h,-1}) \quad (3)$$

$C_{trend,h,old}$—[\$/kWh]—Prior value of $C_{trend,h}$ that will become displaced by this update.

4. $C_{flexible}$ usually hovers around the electricity market price. Therefore, it can be predicted by allocating the electricity market price trend to each $n^{th}$ interval:

$$\forall\, n,\ C_{flexible,n} = \begin{cases} \overline{C_{trend,h_i}}, & \text{if } n \subseteq (h_{i+1}-h_i) \\ C_{trend,h}, & \text{if } [(t_0+I)-(t_0+i)] \subseteq n \end{cases} \quad (4)$$

$\overline{C_{trend,h}}$—[\$/kWh]—Average of all $C_{trend,h}$ between $t_0$+i and $t_0$+I (exclusive).

5. Generate $C_{E,n}$:

Allocate $K_{h,s}$ to each $n^{th}$ interval. Table 37 below is a lookup table from which $K_{h,s}$ is picked for a given hour h in a season s.

$$\forall\, n,\ K_n = \begin{cases} \overline{K_{h_i,s}}, & \text{if } n \subseteq (h_{i+1}-h_i) \\ K_{h,s}, & \text{if } [(t_0+I)-(t_0+i)] \subseteq n \end{cases} \quad (5)$$

$\overline{K_{h,s}}$—[unitless]—Average of all $K_{h,s}$ between $t_0$+i and $t_0$+I (exclusive).

TABLE 37

Lookup table for $K_{h,s}$

| h | Mar. 21 to Jun. 20 (Spring) | Jun. 21 to Sep. 20 (Summer) | Sep. 21 to Dec. 20 (Fall) | Dec. 21 to Mar. 20 (Winter) |
|---|---|---|---|---|
| | S | | | |
| 00:00 | 10% | 10% | 10% | 10% |
| 01:00 | 0% | 0% | 0% | 0% |
| 02:00 | 0% | 0% | 0% | 0% |
| 03:00 | 0% | 0% | 0% | 0% |
| 04:00 | 0% | 0% | 0% | 0% |
| 05:00 | 5% | 10% | 20% | 5% |
| 06:00 | 10% | 20% | 20% | 5% |
| 07:00 | 15% | 20% | 30% | 5% |
| 08:00 | 15% | 25% | 30% | 10% |
| 09:00 | 15% | 25% | 40% | 15% |
| 10:00 | 15% | 25% | 40% | 20% |
| 11:00 | 15% | 25% | 40% | 25% |
| 12:00 | 15% | 25% | 40% | 30% |
| 13:00 | 15% | 25% | 40% | 35% |
| 14:00 | 15% | 20% | 40% | 35% |
| 15:00 | 15% | 10% | 40% | 35% |
| 16:00 | 15% | 5% | 40% | 30% |
| 17:00 | 15% | 5% | 40% | 20% |
| 18:00 | 15% | 5% | 40% | 20% |
| 19:00 | 15% | 10% | 40% | 20% |
| 20:00 | 15% | 15% | 30% | 20% |
| 21:00 | 15% | 20% | 20% | 20% |
| 22:00 | 10% | 20% | 20% | 10% |
| 23:00 | 5% | 10% | 10% | 10% |

Flexible hydropower is traded hourly on the electricity market by BPA and non-BPA stakeholders. The cost of flexible hydropower varies not only hourly, but also seasonally and during short-term events like a heat wave during winter. The cost of flexible hydropower usually hovers around the current electricity market price. Further, the values for $K_{h,s}$ given in the above table are based on the expert opinion of BPA's hydropower subject matter expert, and not actual historical hydropower data.

Compute $C_{E,n}$ as follows:

$$\forall n, C_{E,n}=(1-K_n)\cdot C_{mustrun}+K_n\cdot C_{flexible,n} \tag{6}$$

Make this $C_{E,n}$ prediction available as an output of this function into the transactive node's algorithmic toolkit framework.

Subappendix A: Hypothetical Supply Stack

Figure 56:
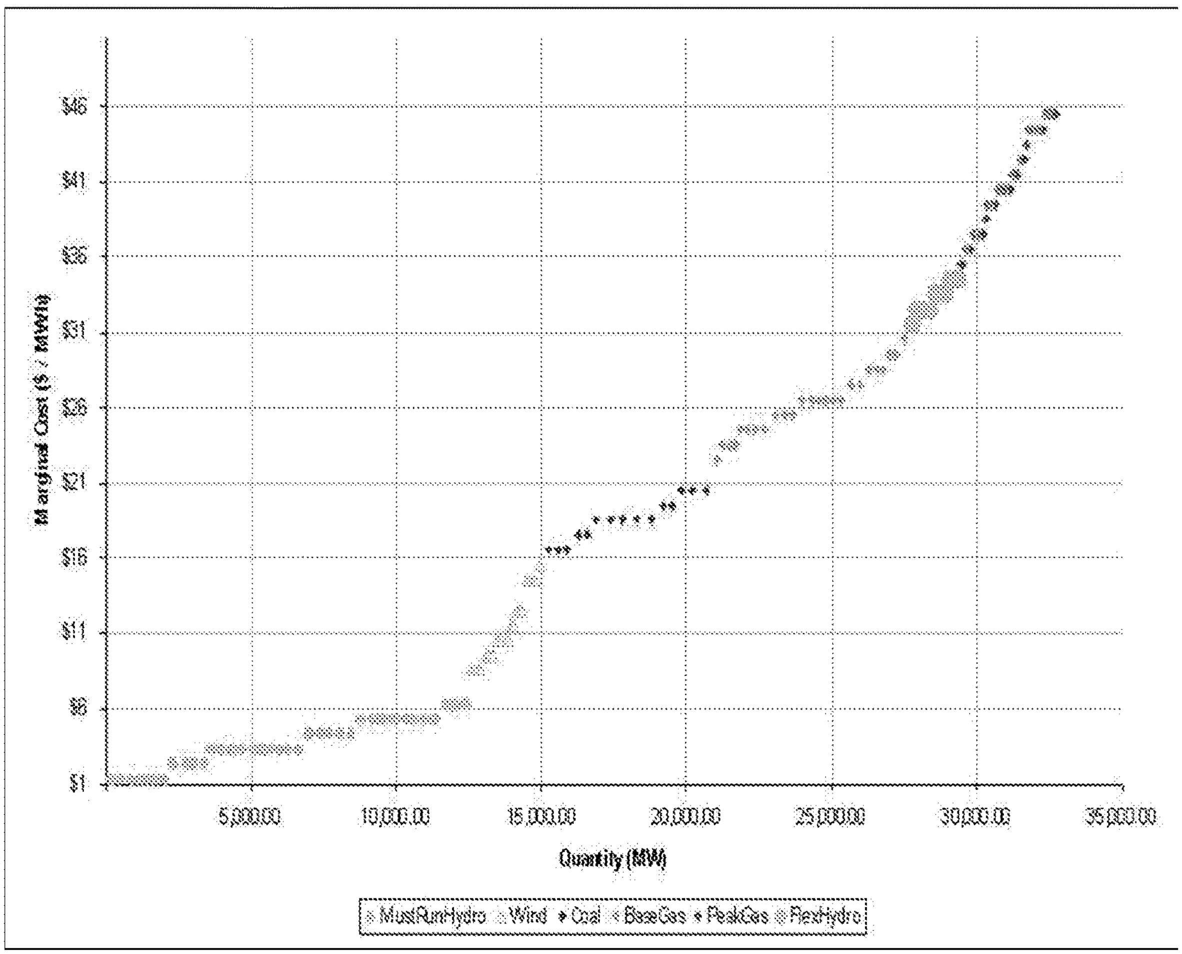
FIG. 56 is a graph of a hypothetical supply stack.

FIG. 56 is a graph 5600 of a hypothetical supply stack.

Subappendix B: Derivation of $C_{E,n}$ $$TIS_n=\frac{C_{mustrun,n}\cdot P_{mustrun,n}\cdot\Delta t_n+C_{flexible,n}\cdot P_{flexible,n}\cdot\Delta t_n+\text{all other costs}}{P_{mustrun,n}\cdot\Delta t_n+P_{flexible,n}\cdot\Delta t_n+\text{all other energies}} \tag{B.1}$$

-continued $$\Rightarrow TIS_n=\frac{C_{mustrun,n}\cdot(1-K_n)\cdot P_{G,n}\cdot\Delta t_n+C_{flexible,n}\cdot K_n\cdot P_{G,n}\cdot\Delta t_n+\text{all other costs}}{(1-K_n)\cdot P_{G,n}\cdot\Delta t_n+K_n\cdot P_{G,n}\cdot\Delta t_n+\text{all other energies}} \tag{B.2}$$

$$\Rightarrow TIS_n=\frac{((1-K_n)\cdot C_{mustrun,n}+K_n\cdot C_{flexible,n})\cdot P_{G,n}\cdot\Delta t_n+\text{all other costs}}{P_{G,n}\cdot\Delta t_n+\text{all other energies}} \tag{B.3}$$

$$\Rightarrow TIS_n=\frac{C_{E,n}\cdot P_{G,n}\cdot\Delta t_n+\text{all other costs}}{P_{G,n}\cdot\Delta t_n+\text{all other energies}} \tag{B.4}$$

$$\therefore C_{E,n}=(1-K_n)\cdot C_{mustrun,n}+K_n\cdot C_{flexible,n} \tag{B.5}$$

Subappendix C: Examples of $C_{E,n}$

Let $C_{mustrun}$=$0.0035/kWh as shown in Appendix A.

Figure 57:
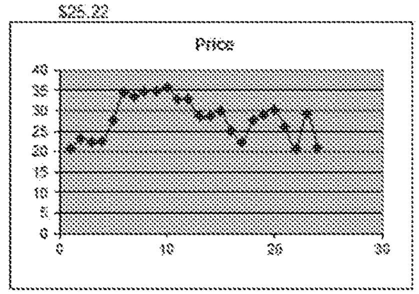
FIG. 57 is a diagram showing a sample daily DowJones Mid-C hourly index.
Figure 57:
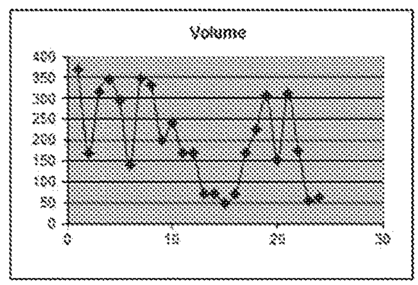

In these examples, the sample shown in diagram 5700 of FIG. 57, which shows Dow Jones Mid-C Hourly Index is used for $C_{trend,h}$:

Note that, although not explicitly written in FIG. C1, the price is in terms of $/MWh.

TABLE 38

Trended electricity market price by the hour

| h | $C_{trend,h}$ [$/kWh] |
|---|---|
| 0:00 | 0.02083 |
| 1:00 | 0.02330 |
| 2:00 | 0.02231 |
| 3:00 | 0.02272 |
| 4:00 | 0.02773 |
| 5:00 | 0.03443 |
| 6:00 | 0.03356 |
| 7:00 | 0.03489 |
| 8:00 | 0.03493 |
| 9:00 | 0.03583 |
| 10:00 | 0.03276 |
| 11:00 | 0.03276 |
| 12:00 | 0.02859 |
| 13:00 | 0.02859 |
| 14:00 | 0.03010 |
| 15:00 | 0.02507 |
| 16:00 | 0.02228 |
| 17:00 | 0.02762 |
| 18:00 | 0.02898 |
| 19:00 | 0.03047 |
| 20:00 | 0.02603 |
| 21:00 | 0.02071 |
| 22:00 | 0.02945 |
| 23:00 | 0.02097 |

Allocate the $C_{trend,h}$ values in Table 38 to each $n^{th}$ interval to obtain $C_{flexible,n}$, and the $K_{h,s}$ values to obtain $K_n$ for each season. Then compute $C_{E,n}$ for each season using equation (6). The outcome is given below in Table 39 and plotted in FIG. 58.

TABLE 39

Examples of the overall cost of energy for hydropower for each season

| n | $\Delta t_n$ [h] | $C_{flexible,n}$ [$/kWh] | $K_n$ Spring | Summer | Fall | Winter | $C_{E,n}$ [$/kWh] Spring | Summer | Fall | Winter |
|---|---|---|---|---|---|---|---|---|---|---|
| 0 | 1/12 | 0.0208 | 10% | 10% | 10% | 10% | 0.0052 | 0.0052 | 0.0052 | 0.0052 |
| 1 | 1/12 | 0.0208 | 10% | 10% | 10% | 10% | 0.0052 | 0.0052 | 0.0052 | 0.0052 |
| 2 | 1/12 | 0.0208 | 10% | 10% | 10% | 10% | 0.0052 | 0.0052 | 0.0052 | 0.0052 |

TABLE 39-continued

Examples of the overall cost of energy for hydropower for each season

| n | $\Delta t_n$ [h] | $C_{flexible,n}$ [$/kWh] | $K_n$ Spring | $K_n$ Summer | $K_n$ Fall | $K_n$ Winter | $C_{E,n}$ [$/kWh] Spring | $C_{E,n}$ [$/kWh] Summer | $C_{E,n}$ [$/kWh] Fall | $C_{E,n}$ [$/kWh] Winter |
|---|---|---|---|---|---|---|---|---|---|---|
| 3 | 1/12 | 0.0208 | 10% | 10% | 10% | 10% | 0.0052 | 0.0052 | 0.0052 | 0.0052 |
| 4 | 1/12 | 0.0208 | 10% | 10% | 10% | 10% | 0.0052 | 0.0052 | 0.0052 | 0.0052 |
| 5 | 1/12 | 0.0208 | 10% | 10% | 10% | 10% | 0.0052 | 0.0052 | 0.0052 | 0.0052 |
| 6 | 1/12 | 0.0208 | 10% | 10% | 10% | 10% | 0.0052 | 0.0052 | 0.0052 | 0.0052 |
| 7 | 1/12 | 0.0208 | 10% | 10% | 10% | 10% | 0.0052 | 0.0052 | 0.0052 | 0.0052 |
| 8 | 1/12 | 0.0208 | 10% | 10% | 10% | 10% | 0.0052 | 0.0052 | 0.0052 | 0.0052 |
| 9 | 1/12 | 0.0208 | 10% | 10% | 10% | 10% | 0.0052 | 0.0052 | 0.0052 | 0.0052 |
| 10 | 1/12 | 0.0208 | 10% | 10% | 10% | 10% | 0.0052 | 0.0052 | 0.0052 | 0.0052 |
| 11 | 1/12 | 0.0208 | 10% | 10% | 10% | 10% | 0.0052 | 0.0052 | 0.0052 | 0.0052 |
| 12 | 1/4 | 0.0233 | 0% | 0% | 0% | 0% | 0.0035 | 0.0035 | 0.0035 | 0.0035 |
| 13 | 1/4 | 0.0233 | 0% | 0% | 0% | 0% | 0.0035 | 0.0035 | 0.0035 | 0.0035 |
| 14 | 1/4 | 0.0233 | 0% | 0% | 0% | 0% | 0.0035 | 0.0035 | 0.0035 | 0.0035 |
| 15 | 1/4 | 0.0233 | 0% | 0% | 0% | 0% | 0.0035 | 0.0035 | 0.0035 | 0.0035 |
| 16 | 1/4 | 0.0223 | 0% | 0% | 0% | 0% | 0.0035 | 0.0035 | 0.0035 | 0.0035 |
| 17 | 1/4 | 0.0223 | 0% | 0% | 0% | 0% | 0.0035 | 0.0035 | 0.0035 | 0.0035 |
| 18 | 1/4 | 0.0223 | 0% | 0% | 0% | 0% | 0.0035 | 0.0035 | 0.0035 | 0.0035 |
| 19 | 1/4 | 0.0223 | 0% | 0% | 0% | 0% | 0.0035 | 0.0035 | 0.0035 | 0.0035 |
| 20 | 1/4 | 0.0227 | 0% | 0% | 0% | 0% | 0.0035 | 0.0035 | 0.0035 | 0.0035 |
| 21 | 1/4 | 0.0227 | 0% | 0% | 0% | 0% | 0.0035 | 0.0035 | 0.0035 | 0.0035 |
| 22 | 1/4 | 0.0227 | 0% | 0% | 0% | 0% | 0.0035 | 0.0035 | 0.0035 | 0.0035 |
| 23 | 1/4 | 0.0227 | 0% | 0% | 0% | 0% | 0.0035 | 0.0035 | 0.0035 | 0.0035 |
| 24 | 1/4 | 0.0277 | 0% | 0% | 0% | 0% | 0.0035 | 0.0035 | 0.0035 | 0.0035 |
| 25 | 1/4 | 0.0277 | 0% | 0% | 0% | 0% | 0.0035 | 0.0035 | 0.0035 | 0.0035 |
| 26 | 1/4 | 0.0277 | 0% | 0% | 0% | 0% | 0.0035 | 0.0035 | 0.0035 | 0.0035 |
| 27 | 1/4 | 0.0277 | 0% | 0% | 0% | 0% | 0.0035 | 0.0035 | 0.0035 | 0.0035 |
| 28 | 1/4 | 0.0344 | 5% | 10% | 20% | 5% | 0.0050 | 0.0066 | 0.0097 | 0.0050 |
| 29 | 1/4 | 0.0344 | 5% | 10% | 20% | 5% | 0.0050 | 0.0066 | 0.0097 | 0.0050 |
| 30 | 1/4 | 0.0344 | 5% | 10% | 20% | 5% | 0.0050 | 0.0066 | 0.0097 | 0.0050 |
| 31 | 1/4 | 0.0344 | 5% | 10% | 20% | 5% | 0.0050 | 0.0066 | 0.0097 | 0.0050 |
| 32 | 1 | 0.0336 | 10% | 20% | 20% | 5% | 0.0065 | 0.0095 | 0.0095 | 0.0050 |
| 33 | 1 | 0.0349 | 15% | 20% | 30% | 5% | 0.0082 | 0.0098 | 0.0129 | 0.0051 |
| 34 | 1 | 0.0349 | 15% | 25% | 30% | 10% | 0.0082 | 0.0114 | 0.0129 | 0.0066 |
| 35 | 1 | 0.0358 | 15% | 25% | 40% | 15% | 0.0083 | 0.0116 | 0.0164 | 0.0083 |
| 36 | 1 | 0.0328 | 15% | 25% | 40% | 20% | 0.0079 | 0.0108 | 0.0152 | 0.0094 |
| 37 | 1 | 0.0328 | 15% | 25% | 40% | 25% | 0.0079 | 0.0108 | 0.0152 | 0.0108 |
| 38 | 1 | 0.0286 | 15% | 25% | 40% | 30% | 0.0073 | 0.0098 | 0.0135 | 0.0110 |
| 39 | 1 | 0.0286 | 15% | 25% | 40% | 35% | 0.0073 | 0.0098 | 0.0135 | 0.0123 |
| 40 | 1 | 0.0301 | 15% | 20% | 40% | 35% | 0.0075 | 0.0088 | 0.0141 | 0.0128 |
| 41 | 1 | 0.0251 | 15% | 10% | 40% | 35% | 0.0067 | 0.0057 | 0.0121 | 0.0110 |
| 42 | 1 | 0.0223 | 15% | 5% | 40% | 30% | 0.0063 | 0.0044 | 0.0110 | 0.0091 |
| 43 | 1 | 0.0276 | 15% | 5% | 40% | 20% | 0.0071 | 0.0047 | 0.0131 | 0.0083 |
| 44 | 1 | 0.0290 | 15% | 5% | 40% | 20% | 0.0073 | 0.0048 | 0.0137 | 0.0086 |
| 45 | 1 | 0.0305 | 15% | 10% | 40% | 20% | 0.0075 | 0.0062 | 0.0143 | 0.0089 |
| 46 | 1 | 0.0260 | 15% | 15% | 30% | 20% | 0.0069 | 0.0069 | 0.0103 | 0.0080 |
| 47 | 1 | 0.0207 | 15% | 20% | 20% | 20% | 0.0061 | 0.0069 | 0.0069 | 0.0069 |
| 48 | 1 | 0.0295 | 10% | 20% | 20% | 10% | 0.0061 | 0.0087 | 0.0087 | 0.0061 |
| 49 | 1 | 0.0210 | 5% | 10% | 10% | 10% | 0.0044 | 0.0052 | 0.0052 | 0.0052 |
| 50 | 6 | 0.0252 | 3% | 3% | 5% | 3% | 0.0040 | 0.0042 | 0.0046 | 0.0040 |
| 51 | 6 | 0.0341 | 14% | 23% | 33% | 13% | 0.0078 | 0.0106 | 0.0137 | 0.0076 |
| 52 | 6 | 0.0270 | 15% | 15% | 40% | 31% | 0.0070 | 0.0070 | 0.0129 | 0.0108 |
| 53 | 6 | 0.0261 | 13% | 13% | 27% | 17% | 0.0063 | 0.0065 | 0.0095 | 0.0073 |
| 54 | 24 | 0.0281 | 11% | 14% | 26% | 16% | 0.0062 | 0.0069 | 0.0100 | 0.0074 |
| 55 | 24 | 0.0281 | 11% | 14% | 26% | 16% | 0.0062 | 0.0069 | 0.0100 | 0.0074 |

Figure 58:
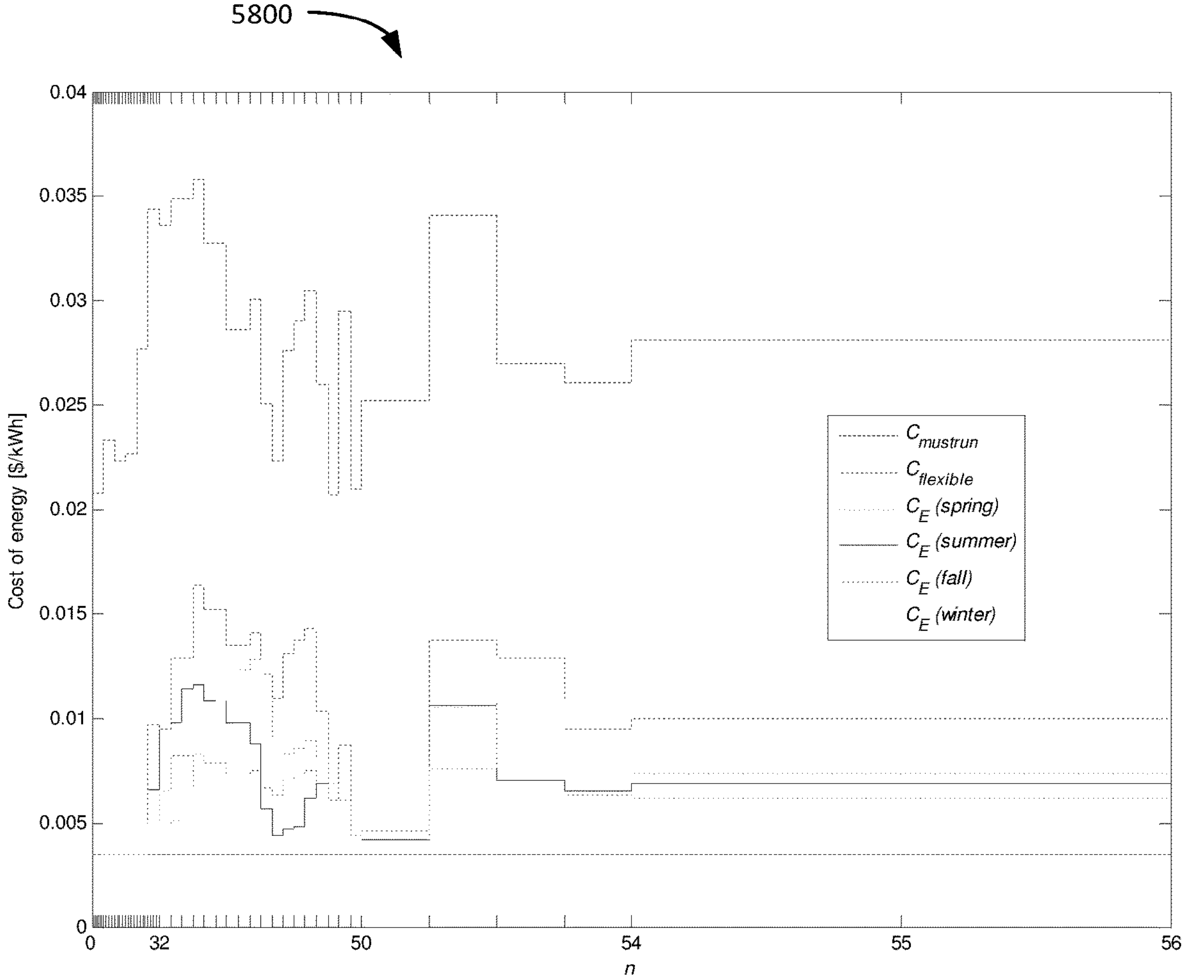
FIG. 58 is a plot of exemplary overall cost of energy for hydropower for each season for an example function.

FIG. 58 is a plot 5800 of exemplary overall cost of energy for hydropower for each season.

6.3.10 Load Function—Residential Event-Driven Demand Response (Function 2.4)

Description:

This toolkit function addresses systems of residential demand-response equipment that will be expected to respond relatively infrequently (e.g., perhaps several times per month) to events that will be indicated via the transactive control and coordination system's incentive signal (TIS).

This toolkit function addresses systems that control any combination of (1) residential space heating, (2) residential electric tank water heaters, or (3) smart appliances. Two or more different types of equipment from this list may be grouped into a single asset system and may consequently be described by a single instantiation of this toolkit function. This function allows for multiple response levels. A single asset system uses one single set of thresholds and response levels. If different sets of thresholds (e.g., different demand-response events) should be defined for different types or populations of equipment, then additional functions should be instantiated for each such type or population.

Refer to toolkit load function 2.0 General Event-Driven Demand Response for general guidance and principles that were used during the formulation of this function. The section Pseudo Code Implementation below (and the detailed pseudo code in Subappendix F) lays out the specific calculation strategy and steps of this function.

Block Input/Output Function Model

Inputs:

$K_L$—[dimensionless count]—number of response levels to be prescribed for this asset system. For example, an asset system that simply curtails its loads has one response level (e.g., "curtailed").

$D_{min,L}$—[time: minutes]—minimum time duration for which an event level L should remain in force after it has become initiated. This duration is also the width of a time window that will be used for evaluating the magnitude of an event at level L. Note that if a $D_{min,L}$ is specified, it is recommended that some $D_{x,L}$ limitation (see two bullets below) is also specified. This is dictated by equation 8 in the Pseudo Code Implementation section. If no $D_x$ limitation is specified, there is the risk of an event lasting for undesirable lengths of time.

$\{N_{this\ year,\ L}, N_{year,\ L}, N_{this\ month,\ L}, N_{month,\ L}, N_{this\ week,\ L}, N_{week,\ L}, N_{this\ day,\ L}, N_{day,\ L}, N_{this\ hour,\ L}, N_{hour,\ L}\}$—[dimensionless count]—local static input LI_29—limitations on event count or frequency—constraints that have been placed on the maximum number of events that may occur for this system of assets during a given time interval. For example, the set of inputs $\{N_{this\ year,\ L}=36, N_{this\ month,\ L}=6, N_{month,\ L}=6, N_{this\ day,\ L}=1\}$ specifies that this asset system is permitted to conduct no more than 36 events over a calendar year, not more than six being conducted during any calendar month or past 30-day-long period, and not more often than once over a given calendar day (e.g., period from midnight until midnight) for a given response level L. Note that if any limitation $N_{x,L}$ is specified, the corresponding $D_{x,L}$ limitation (see next bullet) should also be specified. (This is dictated by equation 8 in the Pseudo Code Implementation section. If no $D_x$ limitation is specified, there is the risk of an event lasting for undesirable lengths of time.)

$\{D_{this\ year,\ L}, D_{year,\ L}, D_{this\ month,\ L}, D_{month,\ L}, D_{this\ week,\ L}, D_{week,\ L}, D_{this\ day,\ L}, D_{day,\ L}, D_{this\ hour,\ L}, D_{hour,\ L}, D_{this\ event,\ L}\}$—[time duration: minutes]—local static input LI_30—limitations on curtailment event duration—constraints that have been placed on the maximum total duration of events that may endure during a given time interval.

$\{TIS_0(t), TIS_0(t-5), \ldots, TIS_0(t-5k)\}$—[\$/kWh]—recent history of transactive incentive signals (TIS) by which the statistical likelihood of various incentive levels will be assessed and updated. The $TIS_0$ values from the TIS time series (e.g., the TIS values that correspond to $IST_0$) from the last k five-minute updates are used.

$\{TIS_0, TIS_1, \ldots, TIS_{K-1}\}$—[\$/kWh]—current transactive incentive signal TIS for K future intervals.

$P_{wh}(t)$—[average kW]—typical electrical power consumption by residential tank water heaters in this region as a function of time of day. This function may be available as a function or as a look-up table. See appendix material for an example.

OPTIONAL INPUT: $\{Level, EventStartTime_L, EventDuration_L\}$—[Integer, UTC Time, UTC Duration]—records of events and their durations for events that actually have occurred at each level L. If this input is unavailable, the function should infer that events will have occurred every time that an event response is advised by this function. If this input is explicitly provided, then the toolkit function can more accurately know how many events and their durations remain to be applied into the future.

Interim Calculation Products:

$\{DIST_L(TIS_{0,min}), DIST_L(TIS_{0,min}+\Delta\$), \ldots, DIST_L(TIS_{0,max}-\Delta\$)\}$—[dimensionless]—distributions of absolute $TIS_0$ values based on historic TIS incentive signals and filtered by simple windows of width $D_{min,\ L}$.

$\{N'_{this\ year,\ L}, N'_{year,\ L}, N'_{this\ month,\ L}, N'_{month,\ L}, N'_{this\ week,\ L}, N'_{week,\ L}, N'_{this\ day,\ L}, N'_{day,\ L}, N'_{this\ hour,\ L}, N'_{hour,\ L}\}$—[dimensionless count]—cumulative count of actual events L that have occurred during each of the intervals for which limitations have been prescribed. Events L may be called only when the numbers of actual events are fewer than the numbers of allowed events for relevant intervals in LI_29. (This set need not be an an explicit input. The function implementation accepts the responsibility to know how many events have occurred of each type and how many remain to use in the future.)

$\{D'_{this\ year,\ L}, D'_{year,\ L}, D'_{this\ month,\ L}, D'_{month,\ L}, D'_{this\ week,\ L}, D'_{week,\ L}, D'_{this\ day,\ L}, D'_{day,\ L}, D'_{this\ hour,\ L}, D'_{hour,\ L}, D'_{this\ event,\ L}\}$—[time duration: minutes]—actual cumulative duration of events of level L at a given point in time. An event L may be called provided that the event will not cause any total allowed event duration to exceed the limits established by input LI_30. (This set need not be an explicit input. The function implementation accepts the responsibility to know the accumulated durations of events of each type have occurred and how much event time remains to use in the future.)

Outputs:

$\{ACS_0, ACS_1, \ldots, ACS_{K-1}\}$—[dimensionless]—advisory control signal for each K future predicted interval. A standardized approach has been specified by which planned response levels may be indicated by integer values [−127,127].

$\{\Delta L_0, \Delta L_1, \ldots, \Delta L_{K-1}\}$—[kW]—average change in power caused by the elastic behavior of this asset system for the K future predicted intervals. The elements of this series will be non-negative during each future interval for which a response event has been planned, corresponding to non-zero elements of the asset control plan.

Pseudo Code Implementation:

1. Establish/update the statistical distribution sof historical TIS values. (This process does not require or infer that the distribution of TIS incentive signals is normal.)
   a. For each unique $D_{min,\ L}$, tally the number of times that the average $TIS_0$ over interval $D_{min,\ L}$ falls within each of a set of bins b, where Δ\$ is the size of the bin and is fixed at \$0.001/kWh.

$$TIS_{0,k,mean}=\text{mean}(TIS_0(IST_{0,k}-D_{min,L}<IST_0\leq IST_{0,k}))$$

$$\text{IF } TIS_{0,b}\leq TIS_{0,k,mean}<TIS_{0,b}+\Delta\$,\text{THEN } DIST_L(TIS_{0,b})=DIST_L(TIS_{0,b})+1 \quad (1)$$

$TIS_{0,b}$—[\$/kWh]—lower boundary of distribution interval $DIST_L(TIS_{0,b})$, bin b $TIS_{0,b}+\Delta\$$—[\$/kWh]—upper boundary of distribution interval $DIST_L(TIS_{0,b})$, bin b $DIST_L(TIS_{0,b})$—[dimensionless]—a tally count of the number of times that the average value of $TIS_0$ falls into the interval bin b over time. (Because the distribution will be normalized, it is equally valid to sum the durations of the intervals, resulting in a tally count of minutes.)

b. Using the distribution for each unique $D_{min,\ L}$, create a normalized cumulative distribution $\phi_L(TIS_0)$ as shown in equation 2. The interpretation of $\phi_L(TIS_0)$ is the fraction of filtered $TIS_0$ that will be expected to fall in any of the bins below bin b, inclusive. By subtracting $\phi_L(TIS_{0,b})$ from 1.0, one estimates the fraction of filtered $TIS_0$ values that would be greater than $TIS_{0,b}+\Delta\$$.

$$\Phi_L(TIS_{0,b}) = \frac{\sum_{i=TIS_{0,min}}^{TIS_{0,b}} DIST_L(i)}{\sum_{i=TIS_{0,min}}^{TIS_{0,max}-\Delta\$} DIST_L(i)} \tag{2}$$

$\phi_L(TIS_0)$—[dimensionless]—normalized cumulative distribution of historical averaged $TIS_0$ values at level L.

$TIS_{0,min}$=−\$3/kWh and $TIS_{0,max}$=+\$3/kWh

TABLE 40

Useful distribution organization for tracking the distribution of averaged $TIS_0$ values

| | $DIST(TIS_0)$ | $\phi(TIS_{0,b})$ |
|---|---|---|
| $TIS_{0,max} - \Delta\$$ | | |
| . . . | | |
| $TIS_{0,b}$ | | |
| . . . | | |
| $TIS_{0,min} + \Delta\$$ | | |
| $TIS_{0,min}$ | | |

Figure 59:
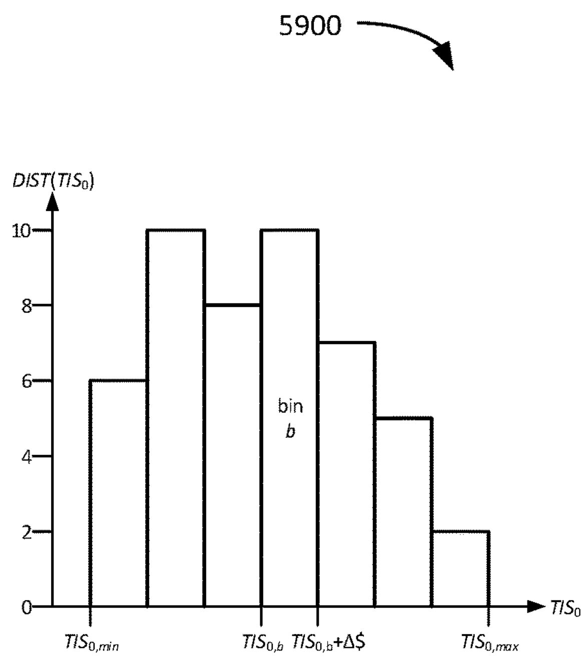
FIG. 59 shows example graphs for $DIST(TIS_0)$ and $\phi(TIS_0)$.

A skilled implementer may choose to fit the normalized cumulative distribution $\phi(TIS_0)$ column of Table 40 to a monotonic function that could be used hereafter instead of this lookup table. FIG. 59 shows example graphs 5900 for $DIST(TIS_0)$ and $\phi(TIS_0)$.

c. For each unique $D_{min,L}$, $DIST_L(TIS_{0,b})$ and $\phi_L(TIS_{0,b})$ may be updated whenever a new series of TIS becomes available. (One may choose to update $DIST(TIS_{0,b})$ and $\phi(TIS_{0,b})$ at a time interval of his choice.)

2. Update incentive thresholds for this system of assets. The overall process by which allowed numbers and durations of event levels will establish thresholds against which future $TIS_0$ values may be compared is as follows:

The TIS threshold at which response level L should be initiated is the TIS value at which no more than the allowed event counts $N_L$ or allowed total event durations $D_L$ will transpire.

This condition is satisfied by the minimum value of $TIS_{0,b}$ that satisfies all the conditions represented by equations 3 through 6.

For a calendar interval (e.g., those that state "this interval," meaning that they are relevant to a given calendar year, month, week, day, hour), the normalized cumulative distribution $\phi_L(TIS_0)$ should meet all conditions for any defined interval of equations 3 and 4.

$$\Phi_L(TIS_0) > 1 - \frac{D_{this\,x,L}(1 - N'_{this\,x,L}/N_{this\,x,L})}{t'_{this\,x}} \tag{3}$$

$$\Phi_L(TIS_0) > 1 - \frac{D_{min,L}}{t'_{this\,x}} \cdot \text{floor}\left(\frac{D_{this\,x,L} - D'_{this\,x,L}}{D_{min,L}}\right) \tag{4}$$

x={year, month, week, day, hour}

$t'_{this\,x}$—[time: minutes]—time remaining in calendar interval x. For example, at 45 minutes past an hour, there are 15 minutes remaining prior to the end of this hour interval.

floor( )—function that rounds the operand down to the next smaller integer.

Constraints that state the maximum number of events and total duration of events that are permitted during continuous "trailing" intervals (e.g., within interval durations that are not aligned with "calendar" months, days, etc.) create multiple conditions of the types shown in equations 5 and 6, all of which should be met by a valid threshold TIS.

$$\Phi_L(TIS_0) > 1 - \frac{D_{x,L}(N_{x,L}/N'_{x,L})}{t_x} \tag{5}$$

$$\Phi_L(TIS_0) > 1 - \frac{D_{min,L}}{t_x} \cdot \text{floor}\left(\frac{D_{x,L} - D'_{x,L}}{D_{min,L}}\right) \tag{6}$$

$t_x$—[time: minutes]—length of the interval over which criterion is being addressed (e.g., one year, one month, one week, one day, one hour).

The minimum $TIS_0$ that satisfies equation 3 through 6 for a response level L is designated as $TIS_{threshold,L}$.

3. Update the advisory control signal time series for this system of assets. The $TIS_{threshold,L}$ values assessed in the previous step are now compared to the filtered average current TIS, which are computed as in equation 7 for each IST interval. In short, equation 7 says that those TIS intervals that are shorter than $D_{min}$ are averaged, and those TIS intervals that are longer than $D_{min}$ are used directly. While this function's approach is workable without this filtering, the filtering of equation 7 may help the implementer avoid responding to certain spurious, short-lived events.

$$TIS_{filtered,n,L}=\text{mean}(TIS_{\{all\ n\}}(IST_n \le IST_{\{all\ n\}} < IST_n + D_{min,L})) \tag{7}$$

If any $TIS_{filtered,n,L}$ exceeds the threshold that was established in the prior step, an ongoing event has not lasted $D_{min,L}$, and the allowed event counts $N_L$ or allowed total event durations $D_L$ are not exceeded, an event should be planned for the affected IST intervals, the event counters and event durations should be updated accordingly, and an advisory control signal and change in average power should be planned or predicted for a future interval n as in equation (8).

$$\text{IF}(TIS_{filtered,n,L} > TIS_{threshold,n,L}\ \text{OR}(D_{event,n,L} \neq 0\ \text{AND}\ D_{event,n,L} < D_{min,L}))$$

$$\text{AND}(D'_{this\,x,n,L} + D_{min,L} - D_{event,n,L} \le D_{this\,x,L})$$

$$\text{AND}(D'_{x,n,L} + D_{min,L} - D_{event,n,L} \le D_{x,L})$$

$$\text{AND}(N'_{this\,x,n,L} < N_{this\,x,L})$$

$$\text{AND}(N'_{x,n,L} < N_{x,L})$$

$$\text{AND}(D'_{this\,x,n,L} + (IST_{n+1} - IST_n) \le D_{this\,x,L})$$

$AND(D'_{x,n,L}+(IST_{n+1}-IST_n)\leq D_{x,L})$

THEN $ACS_n = ACS_L$

ELSE $ACS_n$=unchanged (8)

Refer to Table 41 that lists the advisory control signals candidates that may be planned for curtailable loads and distributed generation according to the numbers of response levels available from these assets. The algorithm is complete for this update iteration.

TABLE 41

Example assignable advisory control signals for curtailable load and "dispatchable" distributed generation

| Number of Response Levels, $K_L$ | Advisory Control Signals $ACS_L$ |
|---|---|
| 1 | 0 (normal) |
| | 127 (curtailed) |
| 2 | 0 (normal) |
| | 64 (level 1) |
| | 127 (level 2) |
| 3 | 0 (normal) |
| | 42 (level 1) |
| | 84 (level 2) |
| | 127 (level 3) |
| 4 | Etc. |

Figure 60:
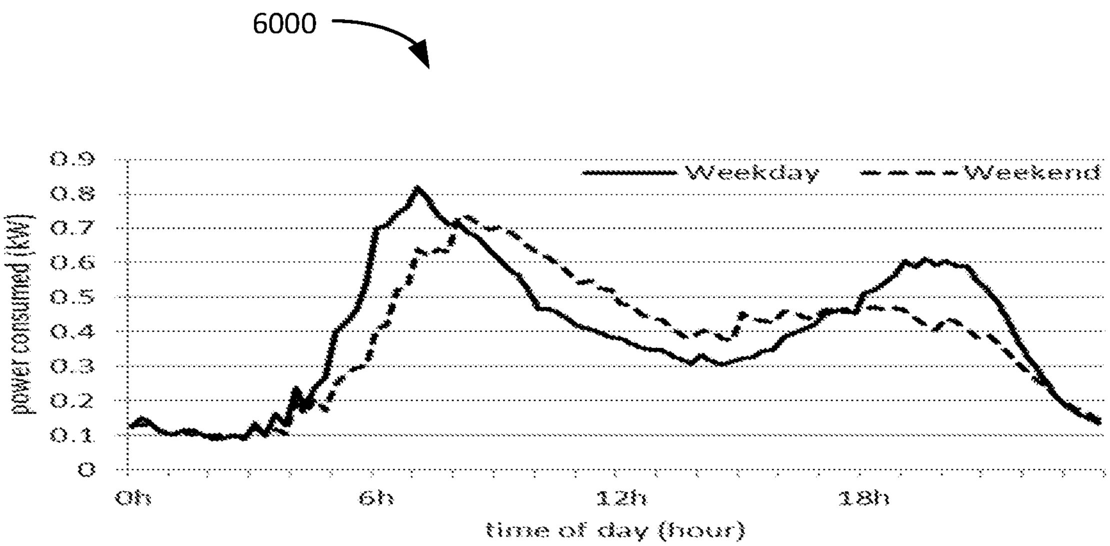
FIG. 60 is a graph showing a typical water heater power consumption during week and weekend days.

4. Predict Change in Average Power that Will Result from Predicted Demand-Response Control Actions.
   a. Tank Water Heaters. The typical daily pattern of electrical energy consumption by residential tank water heaters may be represented by look-up table or by function of time of day. A look-up table has been appended. See Appendix A. The total energy consumption represented in this table should be represented as inelastic load; when curtailments are planned, then all or part of the represented load should be shown as elastic load by this toolkit function. The magnitudes in the look-up table scale with the number of tank water heaters represented and controlled.
b. FIG. 60 is a graph 6000 showing a typical water heater power consumption during week and weekend days.
c. Example: A full curtailment of 100 water heaters is presently planned to occur from 13:50 until 14:30 this afternoon. Suppose the IST intervals are 5-minutes long until 14:00 and 15-minutes thereafter. Today is a Tuesday. First, if the inelastic load from these water heaters has not already been addressed by another function, the loads in the weekday columns for the hours of the current IST time series may be multiplied by 100 and allocated to the IST intervals that include them. (One may interpolate the values of 5-minute intervals within the larger 15-minute intervals found in Subappendix A, but the computational cost of this incremental improved accuracy may not be worthwhile.) The water heater control system should be assigned ACS=127 for these four predicted IST intervals indicating a full curtailment is planned. Other ACS values will be assigned as zero. Using Subappendix A, assign ΔL(13:50)=30.8 kW, ΔL(13:55)=30.8 kW, ΔL(14:00)=33.2 kW, and ΔL(14:15)=31.3 kW.
d. Thermostatic Space Conditioning.
   Input parameters: $C, K_P, U, T_{OSP}(T_{center}, K_1, t_1, K_2, t_2), K_S, \eta_h, \eta_c$
   Other inputs that should be automated by function: $K_{DRP}, \Delta T_{DRSP}, T_o, P_S(I_{ave}, t_{sr}, t_{ss})$ A simple dynamic model can be used to predict the energy that will be consumed by a population of residences controlled by demand-responsive thermostats or space conditioning equipment. (This strategy will be so generic that it should be applicable also to commercial thermostatic space conditioning loads.) The dynamic model should (1) predict the inelastic load from the building population relatively well using few readily available predicted weather effects like outdoor temperature and solar insolation, (2) model the first-order dynamics of thermal energy storage of the building population, (3) approximate the effects of daily thermostatic occupancy settings and cycles, (4) accommodate the planning of various demand-response temperature setbacks and/or power cycling, and (5) predict with reasonable accuracy any changes in electrical energy consumption for periods when demand-response events occur (e.g., the change in elastic load).

This function uses a first-order dynamic model (see equation 9) for the electrical energy used to heat or cool a population of buildings. The electrical power is estimated as the power used to make a representative indoor temperature track a set point temperature that may be affected by a pattern of occupancy settings and changes in the set point that may be caused by demand response. A single mass is cooled or heated and gains or loses energy through a representative insulation.

The following formulation maintains meanings of many parameters that will be recognized by buildings experts. Some, but not all, of the parameters should be scaled to represent the population of multiple buildings.

$$\frac{dT_i}{dt} = -\frac{1}{C}\cdot(K_{DRP}\cdot K_P + U)\cdot T_i + \frac{1}{C}\cdot(K_{DRP}\cdot K_P\cdot(T_{OSP}+\Delta T_{DRSP}) + U\cdot T_o + K_S\cdot P_S) \tag{9}$$

$\frac{dT_i}{dt}$—[° C./hour]—rate of change of the representative interior temperature $T_i$ $T_i$—[° C.]—representative interior temperature C—[kWh/° C.]—effective thermal mass (heat capacity) of the building population.

Parameter C may be initially estimated based on a rule of thumb for wood stick construction and furniture contents: 2.0 Btu/° F.-ft$^2$ ($1.1\times10^{-3}$ kWh/° C.-m$^2$) normalized to floor space area. If a typical home has 150 m$^2$ floor area, then the thermal mass of this building would be about 0.17 kWh/° C. One thousand such homes would have an effective thermal mass of 170 kWh/° C. An initial estimate may be improved after data becomes available for the given modeled building population. See Appendix D.

U—[kW/° C.]—representative rate of thermal leakage from the population of modeled buildings as a function of difference between representative interior temperature $T_i$ and outside temperature $T_o$.

This number is physically based on insulation R-values and total building surface areas. An effective estimate might be obtained recognizing that virtually all heating and cooling energy is eventually lost, in which case this parameter is approximately the total energy of space conditioning and solar insolation divided by total heating and cooling degree-day-hours.

Numbers near 0.021 kW/° C. per residential building and 0.21 kW/° C. per commercial building should be expected, so these estimates may be multiplied by the numbers of buildings of each type in the modeled population as an initial estimate of parameter U. See appendix D.

$K_P$—[kW/° C.]—feedback parameter that represents the magnitude of heating and cooling equipment power P that will be active based on the difference between interior temperature $T_i$ and its target set point $T_{OSP}+\Delta T_{DRSP}$. See equation 10. Electrical power will be stated in this formulation as a function of heating and cooling equipment power P.

Until this parameter can be learned from and fit to an actual building population, it may be estimated by multiplying the number of residential buildings using a default value of 0.25 kW/° C. for a residential building and perhaps 10 times as much for a commercial building. See Appendix D.

$$P \equiv K_{DRP} \cdot K_P \cdot ((T_{OSP}+\Delta T_{DRSP})-T_i) \quad (10)$$

$K_{DRP}$—[dimensionless]—fraction that represents effects of demand responses that result in cycling of the space conditioning equipment. For example, if a response level causes air conditioners to cycle at 50% duty cycle, a factor equal to, or more than, 0.5 should be used for $K_{DRP}$ while the demand response is active. In practice, the effect is less due to oversized equipment, and the value of $K_{DRP}$ will be found to be considerably larger than the duty cycle. $K_{DRP}$ is unity 1.0 at times that no demand response cycling is active. This parameter is specific to the thermostat program and selected thermostat capabilities. (The duty cycle is the fraction of time that the equipment is permitted to operate. (That is, unity minus the fraction of time the equipment is curtailed.) The parameter $K_{DRP}$ is similar to the duty cycle, but it is not linearly or functionally related. If a relationship is to be stated, declare $K_{DRP}$ as the positive square root of the fractional duty cycle D. This relation maps D=0 to $K_{DRP}$=0, and it maps D=1 to $K_{DRP}$=1. In the range D=[0,1], it maps D to a $K_{DRP}$ that is larger than D.

| D | $K_{DRP}$ |
|---|---|
| 0.0 | 0.0 |
| 0.25 | 0.50 |
| 0.50 | 0.71 |
| 0.75 | 0.87 |
| 1.0 | 1.0 |

$T_{OSP}$—[° C.]—effective interior temperature setpoint that includes the daily effects of occupancy set points. This should be set as the representative interior temperature that the populations of buildings would track as its members move between sleep, away, home, and other occupancy settings. See Appendix C for an example occupancy temperature setting time series that may be used as a starting point for this time series.

$\Delta T_{DRSP}$—[° C.]—effective change in interior set point temperature for a population of buildings given a planned response level. The setback temperature change may be identical to an actual temperature setback, but it is not necessarily identical to an actual setback. This setback temperature is a feature unique to the utility program and the capabilities of the vendors' products and should be determined for a period during which a response level is planned. Temperature changes are expected to be plus or minus 1-5° C.

$T_o$—[° C.]—representative outdoor temperature that has been obtained from the National Weather Data Service or similar source. This is an input that should be forecasted. It is preferable that this toolkit function automate the retrieval of forecasted temperature, using coordinates or nearest town or airport as an input.

$K_S \cdot P_S$—[kW/° C.]—effective total incident solar power on the building population, where $P_S$ is the predicted solar power density [kW/m$^2$], and $K_S$ is a factor that accounts for the physical characteristics and total areas of glazing and other building surfaces. See Appendix B for an approach by which this product may be predicted for any minute of a day.

The electrical power may then be related to the heating and cooling power P, taking into account the efficiency η of the space-conditioning equipment, as shown in equation 11. Heating and cooling power P was defined in equation 10. See Appendix E for example scenarios under which electrical power has been simulated by this model with its default values.

$$P_e = \frac{1}{\eta_h}|P|, \quad \text{if } T_i < T_{OSP} + \Delta T_{DRSP} \qquad P_e = \frac{1}{\eta_c}|P|, \quad \text{if } T_i > T_{OSP} + \Delta T_{DRSP} \quad (11)$$

$\eta_h$—[dimensionless]—effective electrical conversion efficiency that relates heating power to expended electrical power (default value=1.0).

$\eta_c$—[dimensionless]—effective electrical conversion efficiency that relates cooling power to expended electrical power (default value=1.3).

This formulation has treated state variables and inputs as continuous time variables, but one may solve for the predicted electrical power for discrete time intervals n, provided that the time intervals are short with respect to the buildings' thermal response time. (For example, discrete time intervals Δt from 1 to 5 minutes can be used. Several iterations might be used for IST intervals that are longer than 5 minutes. Where an IST interval duration is longer than the solution interval Δt, the electrical power solutions $P_e$ within an IST interval should be averaged to obtain the respective average inelastic load or elastic change in electrical load.) Equation 12 is a discretized version of equation 9 that may be used to predict the state variable $T_i$ after each interval n of length Δt.

$$\Delta T_i(n) = \left[1 - \frac{1}{C}\cdot(K_{DRP}(n)\cdot K_P + U)\cdot T_i(n) + \frac{1}{C}\cdot(K_{DRP}(n)\cdot K_P\cdot(T_{OSP}(n) + \Delta T_{DRSP}(n)) + U\cdot T_o(n) + K_S\cdot P_S(n))\right]\cdot\Delta t(n) \quad (12)$$

State variable $T_I$—the representative interior temperature—may be updated after each discrete time interval using equation 13.

$$T_i(n+1)=T_i(n)+\Delta T_i(n) \quad (13)$$

The solution should be completed twice: In the first case, no demand response is modeled. Both $K_{DRP}$ and $\Delta T_{DRSP}$ should be set to zero for intervals of case 1. The resulting electrical power $P_e$ is the inelastic load predicted where the space conditioning equipment is not responsive to an incentive signal and no demand response occurs. In the second case, either or both $K_{DRP}$ and $\Delta T_{DRSP}$ are assigned for intervals during which demand responses have been planned. If demand responses have been planned, the solutions for electrical power $P_e$ will differ by the change in elastic load, which is an output of this function expected by the toolkit framework.

$$\Delta L_{elastic}(n)=P_{e,case\ \#1}(n)-P_{e,case\ \#2}(n) \quad (14)$$

e. Smart Appliances and other Loads. The list of appliances and devices that could become controlled is diverse. Simplifications is necessary until proper models of these loads can be completed. The daily patterns for plug loads and other devices may be learned over time if adequate measurements are being made. Until then, hourly load profiles for most of the other residential loads are provided in Subappendix H.

Further Alternatives:

1. The extreme parts of TIS distribution curves should be fitted to a smooth monotonic function. There is some concern that event-driven demand response may be allowed so infrequently that it will be difficult to assign accurate thresholds on TIS.
2. While this function has been targeted toward events that happen at relatively high TIS values, this general approach is equally valid for infrequent events that occur at very low TIS values when energy appears to be a great bargain. Today, few commercially available demand-responsive assets are able to provide this valuable response.
3. The lookup table of Subappendix A is simple to use, but it does not correctly predict rebound effects that might be important for peak load management. When water heaters are released from their curtailed operation, they consume heavily to reheat the cooled water volume. In some cases, this rebound will create a new, undesirable peak. Implementers can also use physics-based models of water heaters that include effects of thermal energy storage and customer water consumption.

An approach similar to the space conditioning model yields the difference equations 15 and 16 for a population of water heaters. The parameters of the difference equations may, in principle, be determined by fitting the modeled representative water heater power $P_{WH}(n)$ during each interval n to the observed average power shown in Subappendix A.

$$T_{WH}(n+1) = \left(1 + \frac{W(n)\cdot\Delta t(n)}{V_{WH}} - \frac{K_{DR}(n)\cdot K_P\cdot\Delta t_n}{V_{WH}\cdot C_W}\right)\cdot T_{WH}(n) + \frac{K_{DR}(n)\cdot K_P\cdot\Delta t(n)}{V_{WH}\cdot C_W}\cdot T_{SP} - \frac{W(n)\cdot\Delta t(n)}{V_W}\cdot T_i \quad (15)$$

$$P_{WH}(n) \equiv K_P(T_{SP} - T_{WH}(n)) \quad (16)$$

$T_{WH}(n)$—[° C.]—representative temperature of water stored in this population of water heaters at the beginning of interval n.

W(n)—[m$^3$/h]—rate of water consumed by the water heaters during interval n.

$K_{DR}(n)$—[dimensionless]—representative impact of a demand-response cycling program on the representative water heater power $P_{WH}$. At most times, this variable is equal to 1.0. During full curtailment of water heaters, this variable is equal to 0.0. If the water heaters are randomly cycled with an available duty cycle of 50%, the this variable would be a number between 0.5 and 1.0, which number should be determined and fit by theory or observation.

$K_P$—[kW/° C.]—representative ratio of water heater power to the difference between the water heaters' representative temperature set point, as is shown in equation 16.

Δt(n)—[h]—duration of interval n.

$V_{WH}$—[m$^3$]—representative volume of water in the water heaters.

$C_W$—[kWh/(m$^3$·° C.)]—heat capacity of water.

$T_{SP}$—[° C.]—representative thermostat setpoint for the modeled population of water heaters.

$T_I$—[° C.]—typical temperature of cold water entering the water heaters.

4. The approach to predicting thermostatic space conditioning loads may be improved in many ways:
   a. Curve fitting and adaptive algorithms may be developed or employed to improve the parameters and more accurately model the given population of buildings. Specifically, the historical errors between actual and predicted electrical energy consumption by the population of space conditioning loads may be used to estimate parameters via least squares. The parameters to be estimated include constants $K_p$, U, C, and $K_S$. Parameter $T_{OSP}(t)$ should be treated as a function of time-of-day. $K_S(t)$ may also be treated as a function of time-of-day, in which case it might represent the effects of incident angle of solar power on various building surfaces.
   b. Additional inputs may be employed to improve the accuracy of the model. For example, wind and humidity predictions may be useful to improve the model's accuracy.
   c. Higher-order state models may be employed to address observed dynamic inaccuracies. However, remember that the states that are meaningful for modeling individual buildings may not be so useful in an aggregated building model.
   d. As drafted, the building model is equally applicable to both heating and cooling. Care should be taken where methods of heating and cooling are asymmetrical in the modeled buildings. Different electrical efficiencies $\eta_h$ and $\eta_c$ have been recommended, but there may also be cause to distinguish $P_h$ and $P_c$ if the effective powers of heating and cooling are different.

SUBAPPENDIX A

Daily Water Heater Consumption Patterns for Week and Weekend Days in the Pacific Northwest

| Time (hh:mm) | Weekday (kW) | Weekend (kW) |
|---|---|---|
| 0:00 | 0.122 | 0.128 |
| 0:15 | 0.151 | 0.128 |
| 0:30 | 0.130 | 0.130 |
| 0:45 | 0.107 | 0.108 |
| 1:00 | 0.103 | 0.106 |
| 1:15 | 0.113 | 0.111 |
| 1:30 | 0.113 | 0.099 |
| 1:45 | 0.098 | 0.097 |
| 2:00 | 0.089 | 0.098 |
| 2:15 | 0.093 | 0.105 |
| 2:30 | 0.099 | 0.100 |
| 2:45 | 0.089 | 0.097 |
| 3:00 | 0.135 | 0.120 |
| 3:15 | 0.098 | 0.104 |
| 3:30 | 0.164 | 0.117 |
| 3:45 | 0.129 | 0.106 |
| 4:00 | 0.239 | 0.209 |
| 4:15 | 0.183 | 0.161 |
| 4:30 | 0.240 | 0.205 |
| 4:45 | 0.266 | 0.170 |
| 5:00 | 0.401 | 0.247 |
| 5:15 | 0.427 | 0.277 |
| 5:30 | 0.460 | 0.295 |
| 5:45 | 0.542 | 0.302 |
| 6:00 | 0.700 | 0.410 |
| 6:15 | 0.708 | 0.420 |
| 6:30 | 0.743 | 0.522 |
| 6:45 | 0.764 | 0.530 |
| 7:00 | 0.817 | 0.640 |
| 7:15 | 0.785 | 0.622 |
| 7:30 | 0.738 | 0.640 |
| 7:45 | 0.713 | 0.634 |
| 8:00 | 0.716 | 0.736 |
| 8:15 | 0.687 | 0.734 |
| 8:30 | 0.672 | 0.710 |
| 8:45 | 0.636 | 0.696 |
| 9:00 | 0.615 | 0.704 |
| 9:15 | 0.584 | 0.695 |
| 9:30 | 0.563 | 0.670 |
| 9:45 | 0.518 | 0.647 |
| 10:00 | 0.467 | 0.624 |
| 10:15 | 0.466 | 0.616 |
| 10:30 | 0.454 | 0.595 |
| 10:45 | 0.431 | 0.567 |
| 11:00 | 0.415 | 0.543 |
| 11:15 | 0.409 | 0.549 |
| 11:30 | 0.395 | 0.527 |
| 11:45 | 0.385 | 0.521 |
| 12:00 | 0.380 | 0.481 |
| 12:15 | 0.365 | 0.475 |
| 12:30 | 0.355 | 0.450 |
| 12:45 | 0.349 | 0.438 |
| 13:00 | 0.347 | 0.435 |
| 13:15 | 0.328 | 0.411 |
| 13:30 | 0.319 | 0.389 |
| 13:45 | 0.308 | 0.380 |
| 14:00 | 0.332 | 0.403 |
| 14:15 | 0.313 | 0.401 |
| 14:30 | 0.304 | 0.380 |
| 14:45 | 0.314 | 0.374 |
| 15:00 | 0.324 | 0.455 |
| 15:15 | 0.325 | 0.434 |
| 15:30 | 0.345 | 0.432 |
| 15:45 | 0.349 | 0.426 |
| 16:00 | 0.385 | 0.459 |
| 16:15 | 0.396 | 0.458 |
| 16:30 | 0.407 | 0.443 |
| 16:45 | 0.420 | 0.440 |
| 17:00 | 0.452 | 0.462 |

SUBAPPENDIX A-continued

Daily Water Heater Consumption Patterns for Week and Weekend Days in the Pacific Northwest

| Time (hh:mm) | Weekday (kW) | Weekend (kW) |
|---|---|---|
| 17:15 | 0.461 | 0.463 |
| 17:30 | 0.467 | 0.457 |
| 17:45 | 0.454 | 0.458 |
| 18:00 | 0.513 | 0.467 |
| 18:15 | 0.521 | 0.472 |
| 18:30 | 0.543 | 0.465 |
| 18:45 | 0.564 | 0.470 |
| 19:00 | 0.606 | 0.462 |
| 19:15 | 0.588 | 0.440 |
| 19:30 | 0.613 | 0.422 |
| 19:45 | 0.594 | 0.407 |
| 20:00 | 0.606 | 0.439 |
| 20:15 | 0.590 | 0.430 |
| 20:30 | 0.592 | 0.407 |
| 20:45 | 0.551 | 0.384 |
| 21:00 | 0.525 | 0.393 |
| 21:15 | 0.486 | 0.370 |
| 21:30 | 0.436 | 0.342 |
| 21:45 | 0.375 | 0.307 |
| 22:00 | 0.326 | 0.285 |
| 22:15 | 0.288 | 0.257 |
| 22:30 | 0.244 | 0.235 |
| 22:45 | 0.207 | 0.209 |
| 23:00 | 0.183 | 0.191 |
| 23:15 | 0.163 | 0.174 |
| 23:30 | 0.149 | 0.165 |
| 23:45 | 0.136 | 0.145 |

Subappendix B: Example Approximation of Effective Incident Solar Power $K_S \cdot P_S$ Input parameters: $B_{res}$, $B_{com}$ Inputs that should be obtained automatically by function (e.g., by internet): $I_{ave}$, $t_{sr}$, $t_{ss}$ The following approach will produce reasonable dynamics to represent the effect of solar insolation on building populations, but it does not rely on actual predicted insolation nor on actual building data and building construction properties. As time permits, this approach may be improved to better predict building performance.

For the day to be modeled at this location, look up sunrise ($t_{sr}$), sunset ($t_{ss}$), and average insolation ($I_{ave}$). This input information may be found at http://aom.giss.nasa.gov/srlocat.html, for example, if one enters the month, latitude, and longitude.

Estimate $K_S$. First estimate the total square meters of building floor space being modeled. This can be roughly estimated by multiplying the number of modeled residences by 175, and the number of commercial buildings by 2000. The floor space will be multiplied by 7% to represent the effects of glazing and imperfectly reflecting wall and roof surfaces. The product of floor space and 0.07 estimates $K_S$ as shown in equation B1.

$$K_S = 0.07 \cdot (175 \cdot B_{res} + 2000 \cdot B_{com}) \quad \text{(B1)}$$

$K_S$—[m$^2$]—estimated effective building surface area that is exposed to insolation. This parameter accounts for overall reflectivity, glazing surfaces, and orientation. It is assumed that this parameter is not a function of time.

$B_{res}$—[count]—number of residential buildings in modeled population. This is a very gross attempt to scale the impact of insolation based on the number of buildings and based on a typical floorspace of represented buildings. The factor 175 may be improved if better information is known about typical residential buildings that are in this population of residential buildings.

$B_{com}$—[count]—number of commercial buildings in modeled population. This is a very gross attempt to scale the impact of solar insolation based on the number of buildings and based on a typical floorspace of represented buildings. The factor 2000 may be improved if better information is known about typical residential buildings that are in this population of commercial buildings.

Estimate $P_S(t)$. A sinusoidal pattern is assumed for the insolation through a day between sunrise and sunset.

$$P_S(t) = \begin{cases} \frac{1440 \cdot I_{ave}}{t_{ss} - t_{sr}} \cdot \left(1 - \cos\left(\frac{(t - t_{sr}) \cdot 2\pi}{t_{ss} - t_{sr}}\right)\right) & t_{sr} \le t \le t_{ss} \\ 0 & \text{otherwise} \end{cases} \quad \text{(B2)}$$

$P_S(t)$—[W/m$^2$]—insolation as a function of time of day.

$I_{ave}$—[W/m$^2$]—average insolation for this day (over 24 hours/1440 minutes) at this location from http://aom.giss.nasa.gov/sriocat.html, or similar source of information. This number is multiplied by the number of minutes in a day in equation B2 to state the total insolation expected to be received this day.

t—[minutes]—time-of-day represented in minutes. For example, the time 7:06 should be represented in this function by 426 minutes=7*60+6.

$t_{sr}$—[minutes]—minute of this day on which sunrise occurs. Care should be taken to address UTC time and daylight savings properly.

$t_{ss}$—[minutes]—minute of this day on which sunset occurs. Care should be taken to address UTC time and daylight savings properly.

Figure 61:
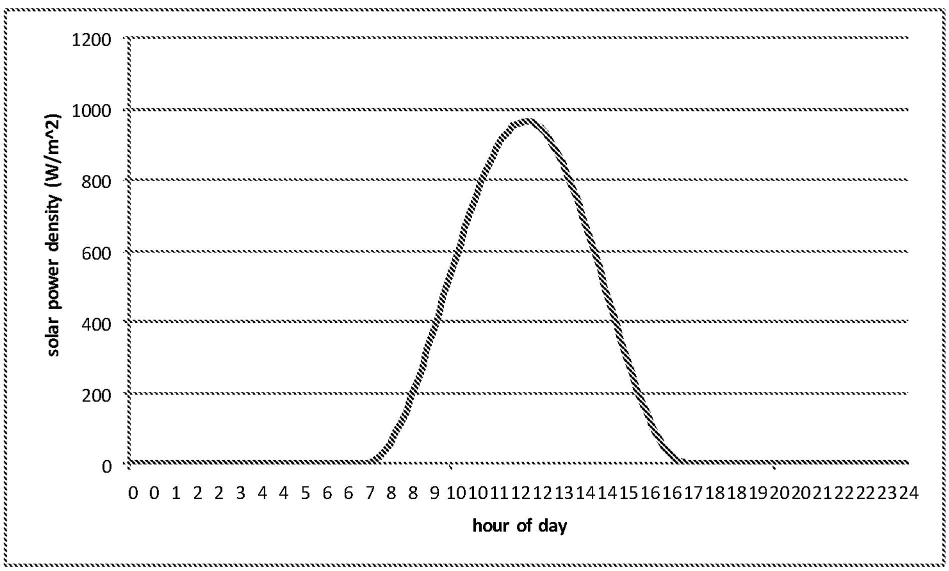
FIG. 61 is an example profile of $P_S(t)$.

An example profile 6100 of $P_S(t)$ is shown in FIG. 61 for a day on which $t_{sr}$=7:06 (426 minutes into the day), $t_{ss}$=17:13 (1033 minutes into the day), and $I_{ave}$=201 W/m$^2$.

Subappendix C: Example Approach for Smooth Approximation of Occupancy Set Point Temperature TOSP(t)

Input parameters: $T_{center}$, $K_1$, $t_1$, $K_2$, $t_2$

Input variable: t

The occupancy set point temperature $T_{OSP}$ reflects a representative change in the target interior temperature set point that is induced by building occupants as they schedule or manually change their thermostatic set points for periods of the day. The following approach produces a smooth function of time-of-day while using only a few supplied input parameters.

$$T_{OSP}(t) = T_{center} + K_1 \cdot \sin\left(\frac{2\pi \cdot (t + t_1)}{1440}\right) + K_2 \cdot \sin\left(\frac{4\pi \cdot (t + t_2)}{1440}\right) \quad \text{(C1)}$$

$T_{OSP}(t)$—[° C.]—occupancy set point temperature as a function of time of day t.

$T_{center}$—[° C.]—input temperature to this function that represents the center of a sinusoidal function. See Table 42 for example default values.

$K_1$—[° C.]—input parameter that represents a diurnal magnitude of temperature variation. See Table 42 for example default values.

t—[time: minutes]—time of day represented as minutes since the previous midnight. The number 1440 represents a full day cycle period of minutes t.

$t_1$—[time: minutes]—input parameter that represents a phase offset of the diurnal magnitude of temperature variation. See Table 42 for example default values.

$K_2$—[° C.]—input parameter that represents a magnitude of temperature variation that occurs at twice the diurnal frequency (e.g., two full periods per day). See Table 42 for example default values.

$t_2$—[time: minutes]—input parameter that represents a phase offset of the diurnal magnitude of temperature variation. See Table 42 for example default values.

The example input parameters of Table 42 are based on expert opinion and should suffice until data is found to refine these parameters. (It is also acceptable to simply use a constant value $T_{center}$, similar to what has been recommended in Table 42 for summer and fall periods.)

TABLE 42

Five input parameters that may be used to specify the occupancy set point temperature $T_{OSP}(t)$ by season of year

| | $T_{center}$ (° C.) | $K_1$ (° C.) | $t_1$ (minutes) | $K_2$ (° C.) | $t_2$ (minutes) |
|---|---|---|---|---|---|
| winter | 20.0 | 0.5 | −450 | 0.8 | 360 |
| spring | 21.5 | 0.0 | — | 0.0 | — |
| summer | 23.0 | 0.2 | 270 | 0.5 | 180 |
| fall | 21.5 | 0.0 | — | 0.0 | — |

Figure 62:
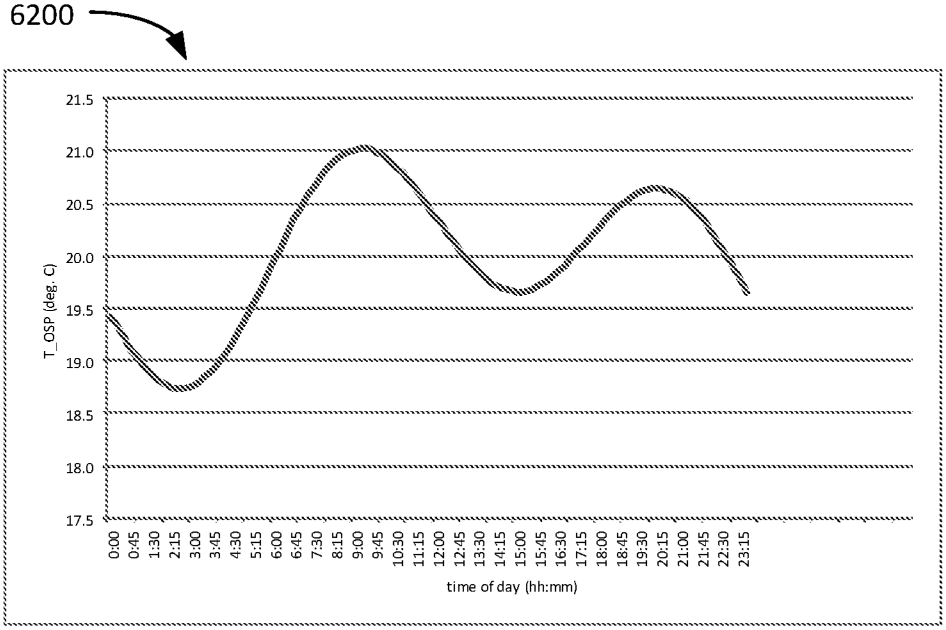
FIG. 62 is a plot of a winter profile of $T_{OSP}(t)$ that uses the winter parameters.
Figure 63:
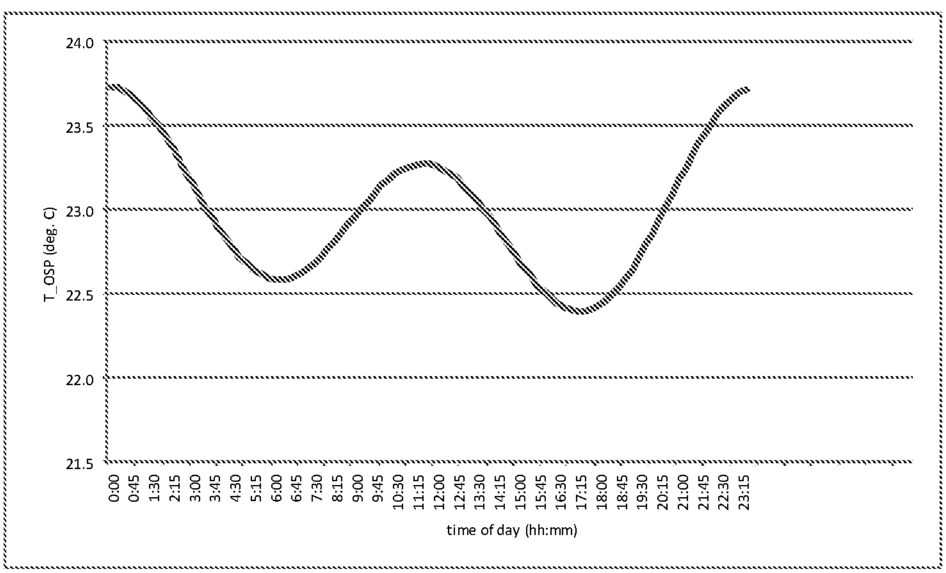
FIG. 63 is a plot of a summer profile of $T_{OSP}(t)$ that uses the summer parameters.

FIG. 62 is a plot 6200 of a winter profile of $T_{OSP}(t)$ that uses the winter parameters of Table 42. FIG. 63 is a plot 6300 of a summer profile of $T_{OSP}(t)$ that uses the summer parameters of Table 42.

Subappendix D: Additional Insights Concerning the Parameters Used to Model Thermostatic Control of Buildings There are several terms of equation (9) that are useful toward the understanding of relationships between the model parameters.

Thermal Losses

If the effects of space conditioning and solar insolation were eliminated, the relationship of equation D1 would remain and would describe the asymptotic migration of the representative temperature $T_i$ toward the ambient outdoor temperature $T_o$ that is characterized by the relationship between thermal losses U and thermal mass C.

$$\frac{dT_i}{dt} = \frac{U}{C} \cdot (T_o - T_i) \quad \text{(D1)}$$

An insight available from equation D1 is that it defines a relaxation time constant as the ratio C/U. The time constant is the time that it would take for the two temperatures to come within about 37% of the starting difference between the two temperatures. For example, if the interior temperature begins at 20° C. and the outside temperature remains constant at 0° C., the time constant would be the time it takes for the interior temperature to drop to 7.4° C. If that amount of time is estimated to be 8 hours, then the magnitude of parameter C should be 8 times as great as the magnitude of U. Therefore, if the value of C is estimated to be 0.17 kWh/° C. for a residential building, then the value of U should be approximately 0.021 kW/° C., which is the recommended default value for this parameter.

Space Conditioner Size and Responsiveness

If the effects of solar insolation and thermal losses may be temporarily ignored, equation D2 may be derived from equation 9 to represent the rate at which the representative heating or cooling equipment would correct the representative interior temperature $T_i$ toward its set point, which is the sum $T_{OSP}+\Delta T_{DRSP}$.

$$\frac{dT_i}{dt} = \frac{K_{DRP}\cdot K_P}{C}(T_{OSP}+\Delta T_{DRSP}-T_i) \tag{D2}$$

In the normal case, $K_{DRP}$ is unity.

Equation D2 is characterized by a time constant as the ratio $C/K_P$. Space conditioning equipment is usually sized to correct the interior temperature in a relatively short time. If, for example, buildings heaters were to heat a residential building and its contents from 10° C. to 20° C., it might take about 40 minutes to heat those contents fully to 16.3° C. Therefore, the magnitude of C should be about 0.67 that of $K_P$. If C is 0. 17 kWh/° C. for a residential building, then the representative magnitude of $K_P$ should be about 0.25 kW/° C., which is the recommended default value for this parameter.

Average Electrical Power for Space Conditioning

Another insight may be obtained if one calculated the final, constant condition of how much power it would take to maintain a thermostatic set point for a given outdoor temperature $T_o$. One may calculate a final interior temperature $T_i$ using equation 9. Then this interior temperature may be used in equations 10 and 11 to predict that resulting electrical power $P_e$ that would be consumed.

Ignoring the effects of solar insolation and setting $K_{DRP}$ to unity, the steady-state electrical power is given by equation D3.

$$P_e = \frac{1}{\eta}\cdot\left(\frac{U\cdot(T_{OSP}+\Delta T_{DRSP}-T_o)}{1+\frac{U}{K_P}}\right) \tag{D3}$$

For present purposes, equation D3 should be used to test the reasonableness of the set of parameters. Given the sets of default parameters recommended so far for a residential building, and assuming efficiency η of the electrical conversion and $\Delta T_{DRSP}$ are unity, it would take about 190 average watts to maintain a constant 10° C. difference between the set point and ambient outdoor temperatures in this structure.

Figure 64:
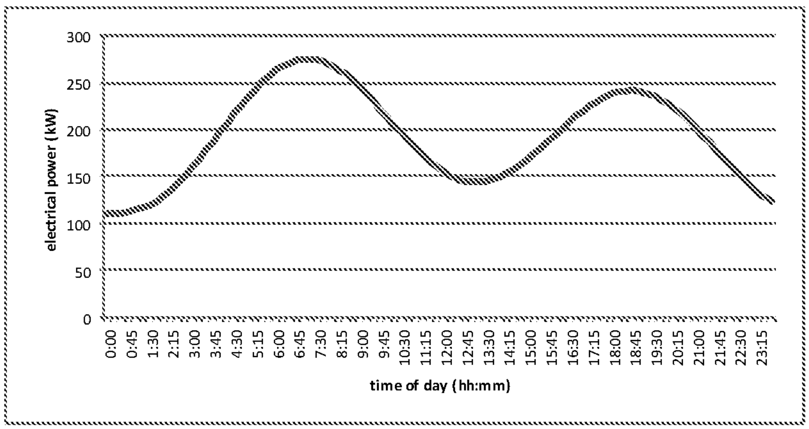
FIG. 64 is a graph of the predicted electrical power consumption for 1000 thermostatically controlled residential buildings where $T_o$=10° C.
Figure 65:
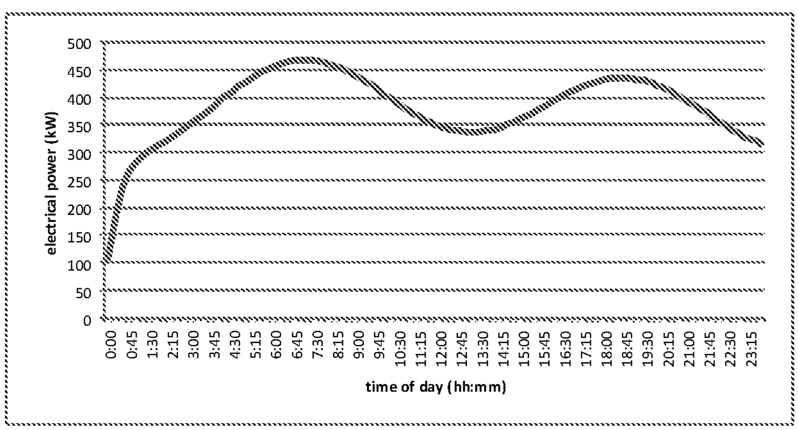
FIG. 65 is a graph of the predicted electrical power consumption for 1000 thermostatically controlled residential buildings where $T_o$=0° C.
Figure 66:
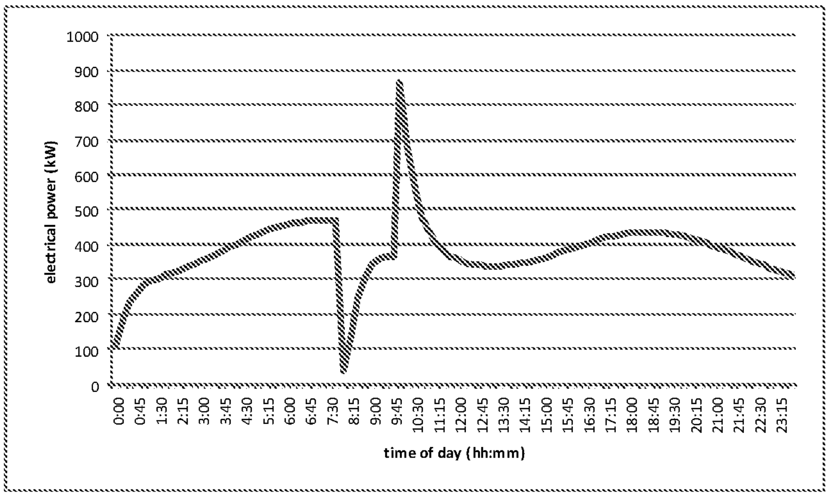
FIG. 66 is a graph of the predicted electrical power consumption for 1000 thermostatically controlled residential buildings where $T_o$=0° C.; $\Delta T_{DRSP}$=−2° C. from 8:00 to 10:00 am.
Figure 67:
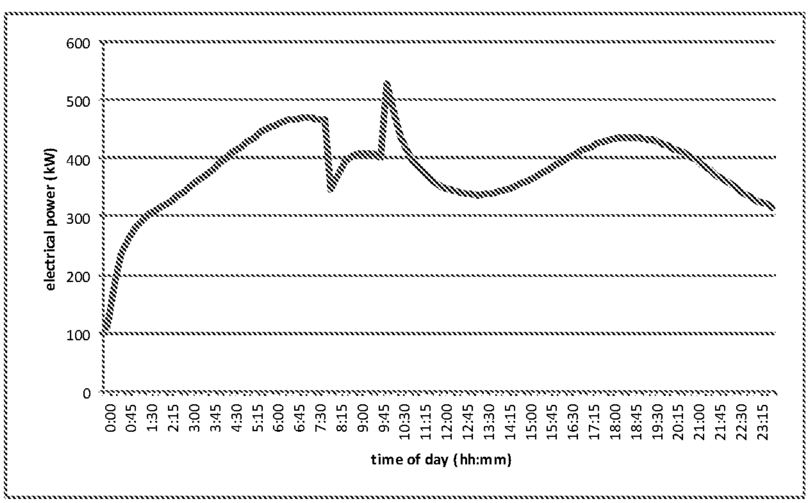
FIG. 67 is a graph of the predicted electrical power consumption for 1000 thermostatically controlled residential buildings where $T_o$=0° C.; $K_{DRP}$=0.75 from 8:00 to 10:00 am.
Figure 68:
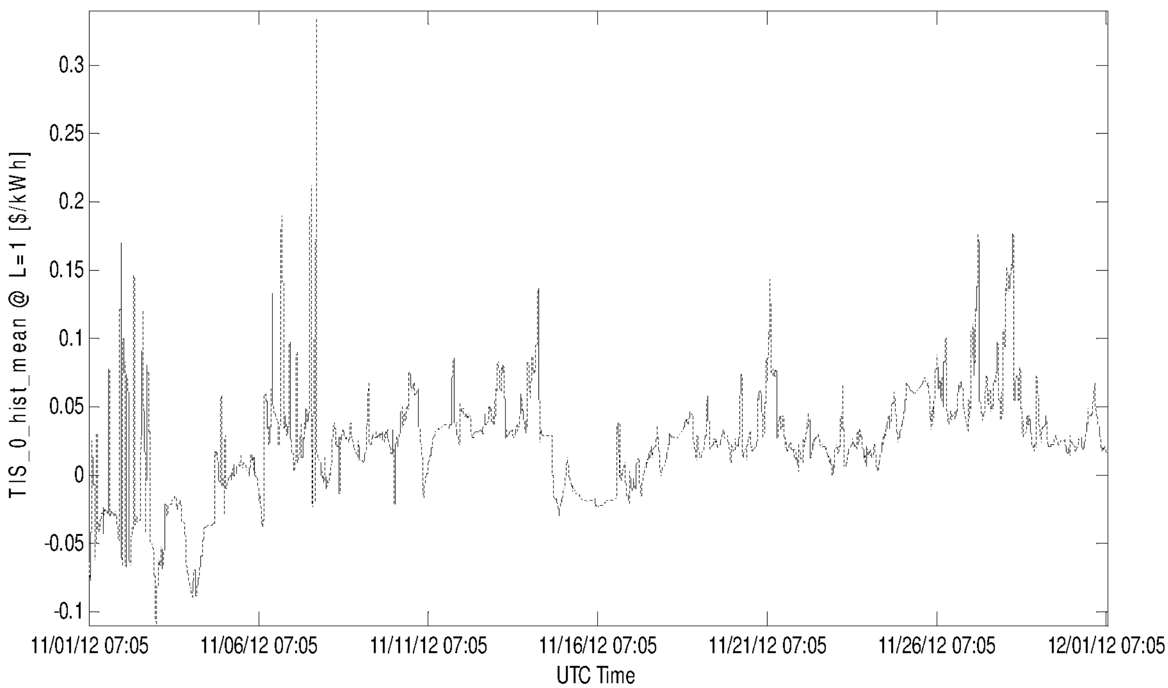
FIG. 68 is a plot showing results of simulating MATLAB code with one response level.
Figure 69:
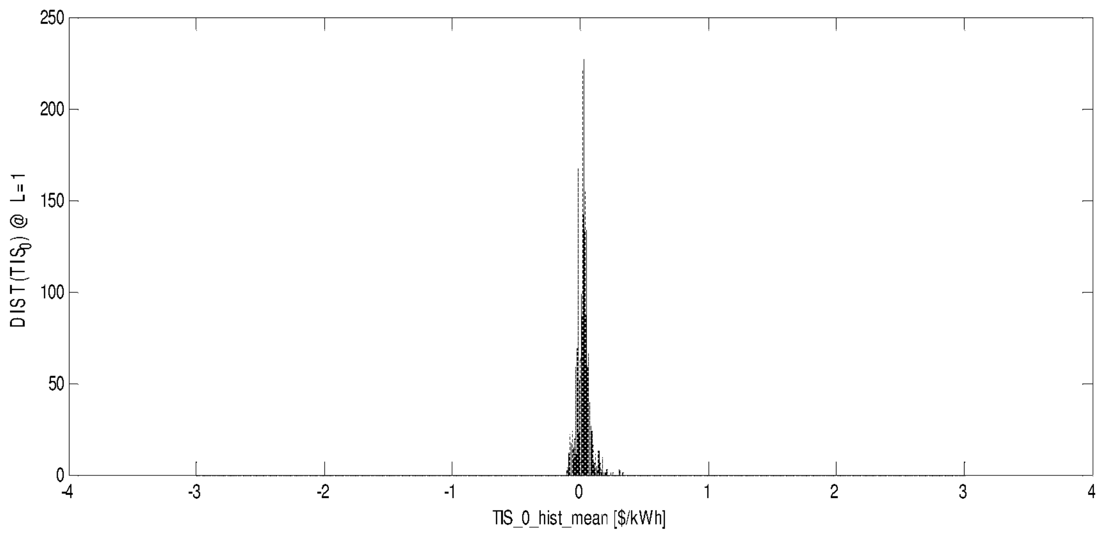
FIG. 69 is another plot showing results of simulating MATLAB code with one response level.
Figure 70:
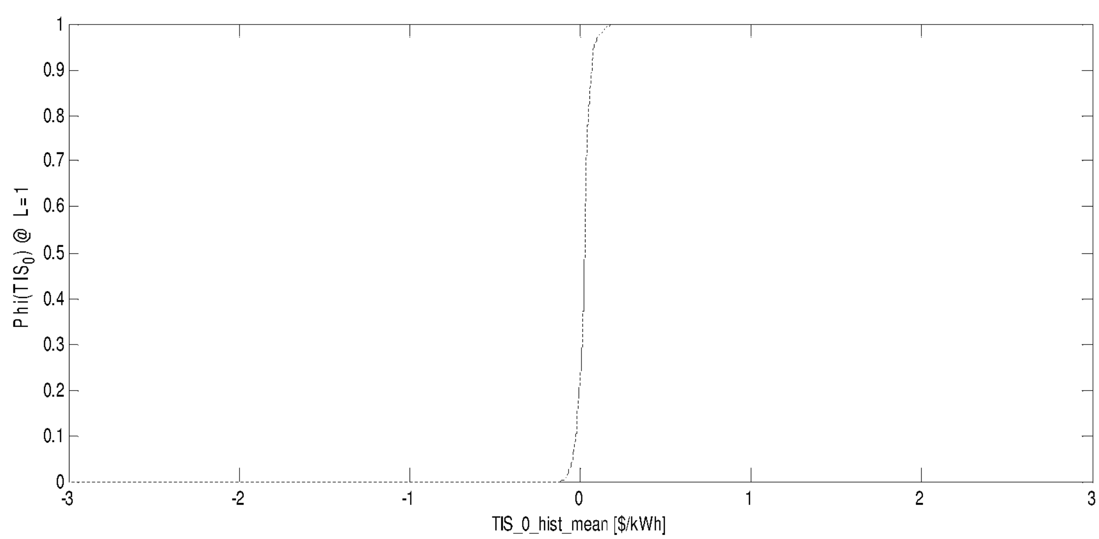
FIG. 70 is another plot showing results of simulating MATLAB code with one response level.
Figure 71:
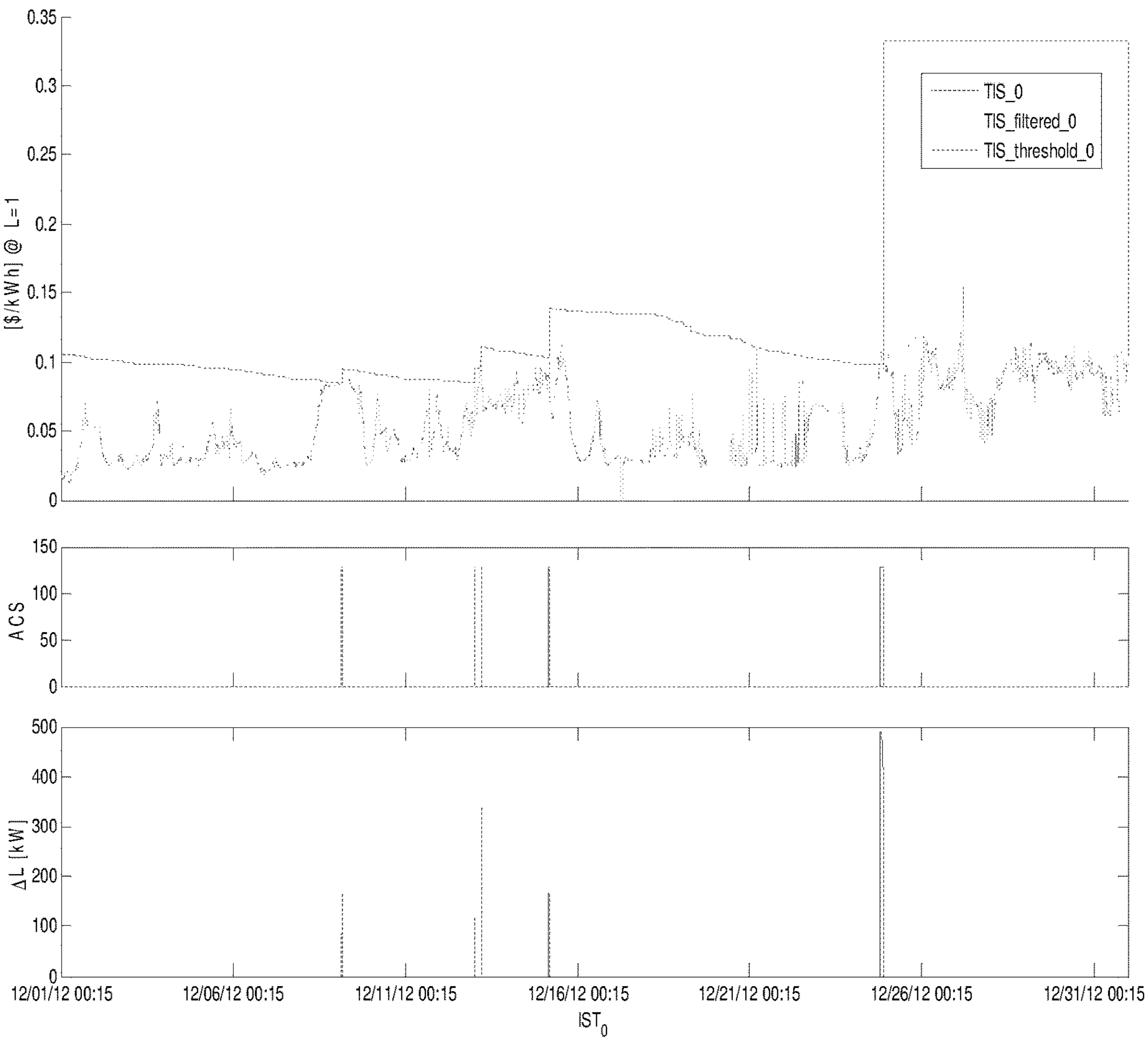
FIG. 71 is another plot showing results of simulating MATLAB code with one response level.
Figure 72:
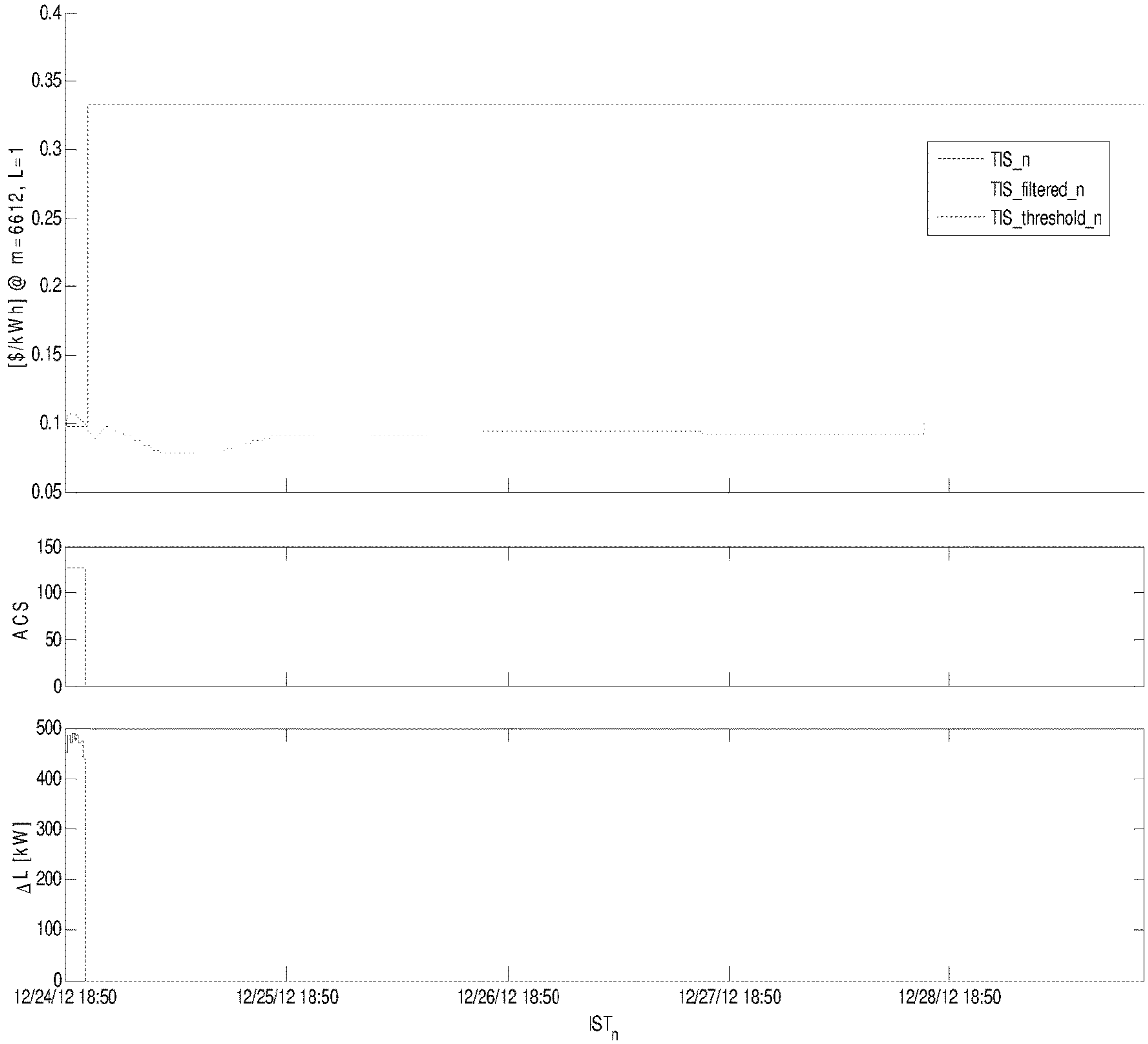
FIG. 72 is another plot showing results of simulating MATLAB code with one response level.
Figure 73:
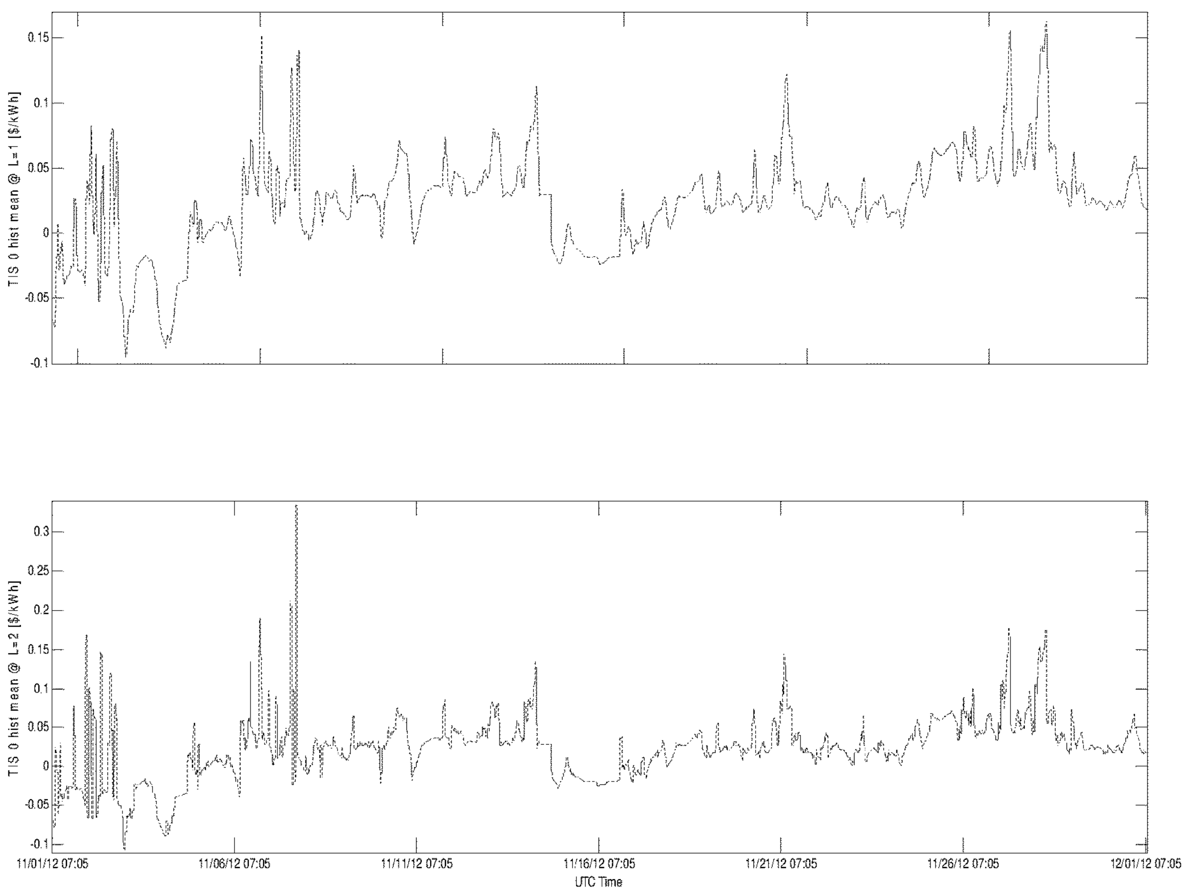
FIG. 73 is a plot showing results of simulating MATLAB code with two response levels.
Figure 74:
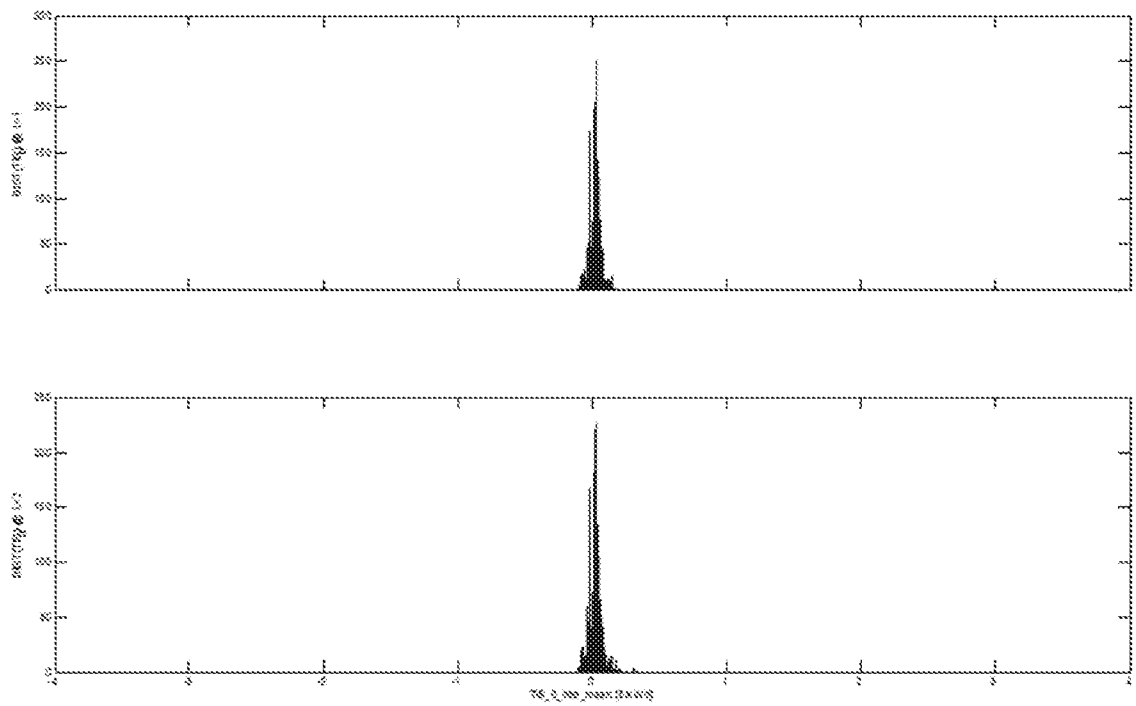
FIG. 74 is another plot showing results of simulating MATLAB code with two response levels.
Figure 75:
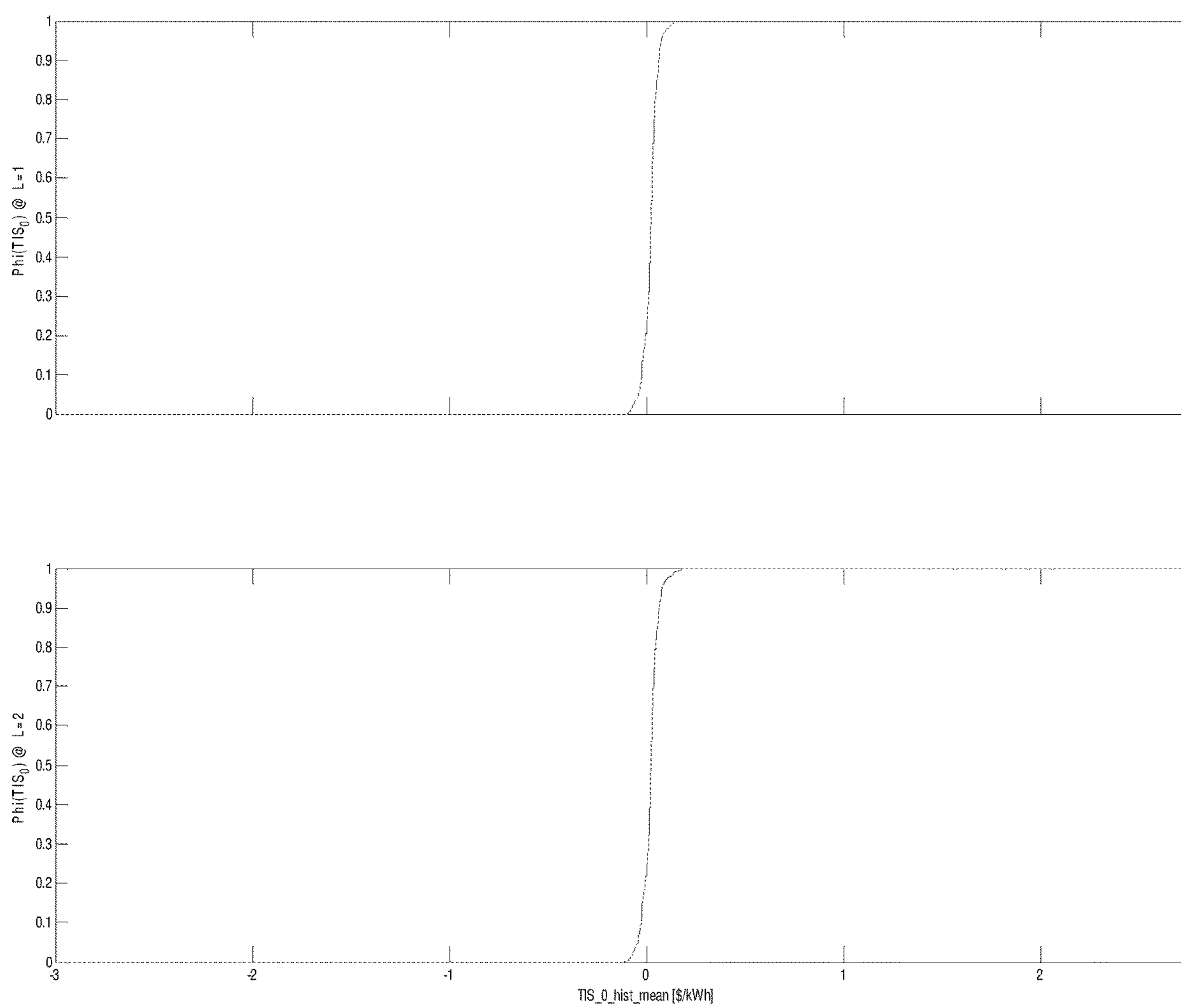
FIG. 75 is another plot showing results of simulating MATLAB code with two response levels.
Figure 76:
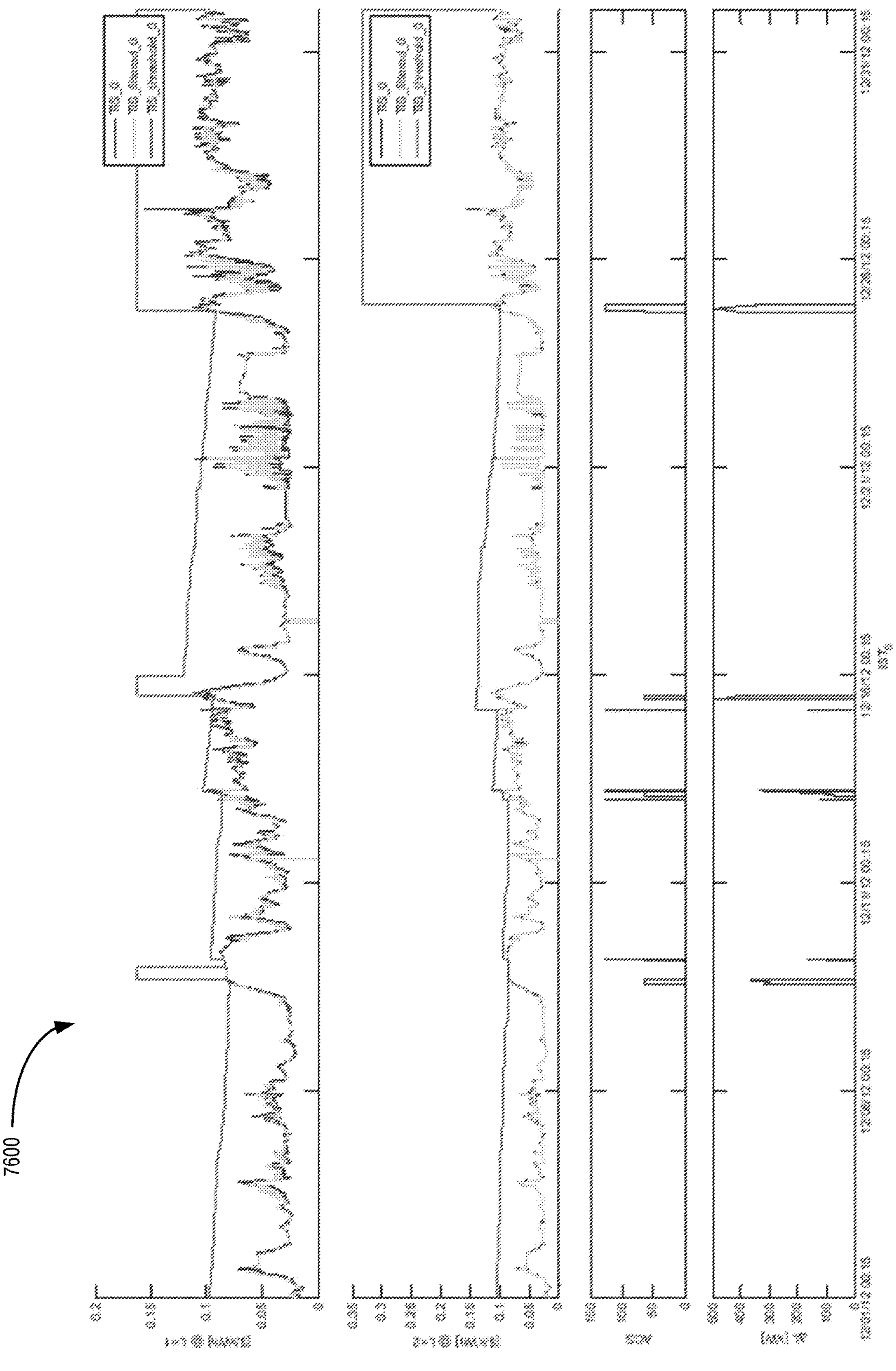
FIG. 76 is another plot showing results of simulating MATLAB code with two response levels.
Figure 77:
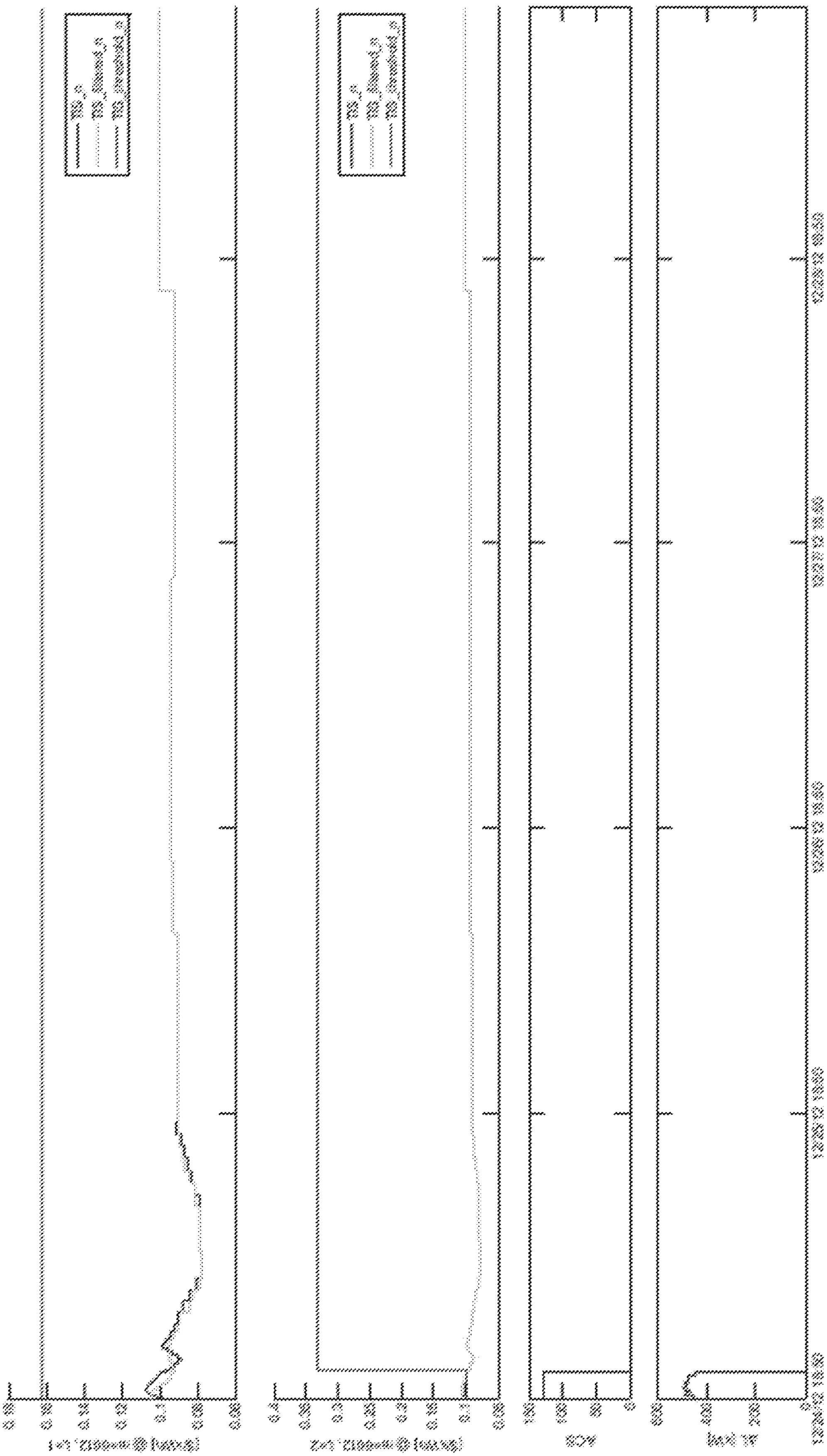
FIG. 77 is another plot showing results of simulating MATLAB code with two response levels.

Subappendix E: Example Electrical Power Profile Cases from Thermostatic Model with Default Winter Parameter FIG. 64 is a graph 6400 of the predicted electrical power consumption for 1000 thermostatically controlled residential buildings where $T_o$=10° C. FIG. 65 is a graph 6500 of the predicted electrical power consumption for 1000 thermostatically controlled residential buildings where $T_o$=0° C. FIG. 66 is a graph 6600 of the predicted electrical power consumption for 1000 thermostatically controlled residential buildings where $T_o$=0° C.; $\Delta T_{DRSP}$=−2° C. from 8:00 to 10:00 am. FIG. 67 is a graph 6700 of the predicted electrical power consumption for 1000 thermostatically controlled residential buildings where $T_o$=0° C.; $K_{DRP}$=0.75 from 8:00 to 10:00 am.

Subappendix F: Pseudo Code (for caldendar events only)

FOR every response level L (excluding L = 0)
  [Establish statistical distribution of $TIS_0$]
  $\Delta\$ = \$0.001/kWh$
  $TIS_{0,min} = -\$3/kWh$
  $TIS_{0,max} = +\$3/kWh$
  $\Psi = \{TIS_{0,min}, TIS_{0,min}+\Delta\$, TIS_{0,min}+2\cdot\Delta\$, \ldots, TIS_{0,max}-\Delta\$\}$
  FOR all k historical $\{IST_0, TIS_0\}$ pairs
    $TIS_{0,k,mean} = mean(TIS_0(IST_{0,k} - D_{min,L} < IST_0 \le IST_{0,k}))$
      WHERE $D_{min,L}$ is the minimum duration for any event at response level L
  END FOR
  FOR all k
    IF $TIS_{0,b} \le TIS_{0,k,mean} < TIS_{0,b} + \Delta\$$, WHERE $TIS_{0,b} \in \Psi$ THEN
      $DIST_L(TIS_{0,b}) = DIST_L(TIS_{0,b})+1$
    END IF
  END FOR $$\Phi_L(TIS_{0,b}) = \frac{\sum_{i=TIS_{0,min}}^{TIS_{0,b}} DIST_L(i)}{\sum_{i=TIS_{0,min}}^{TIS_{0,max}-\Delta\$} DIST_L(i)}$$

END FOR
[Initialize iteration index m]
m = 0
FOR every new {IST,TIS} series (including relaxation instances):
  IF new update interval THEN
    m = m + 1
  ELSE [IF relaxation instance]
    m = m
  END IF
  $IST_{\{all\ n\},m} = IST_{\{all\ n\},new\ series}$
  $TIS_{\{all\ n\},m} = TIS_{\{all\ n\},\ new\ series}$
  [Initialize ACS]
  $ACS_{\{all\ n\},m} = 0$
  FOR every response level L, in ascending order (excluding L = 0)
    [Update $DIST_L(TIS_0)$ and $\Phi_L(TIS_0)$]
    $TIS_{0,mean} = mean(TIS_0(IST_{0,m} - D_{min,L} < IST_0 \le IST_{0,m}))$
    IF $TIS_{0,b} \le TIS_{0,mean} < TIS_{0,b} + \Delta\$$, WHERE $TIS_{0,b} \in \Psi$ THEN
      $DIST_L(TIS_{0,b}) = DIST_L(TIS_{0,b})+1$
    END IF $$\Phi_L(TIS_{0,b}) = \frac{\sum_{i=TIS_{0,min}}^{TIS_{0,b}} DIST_L(i)}{\sum_{i=TIS_{0,min}}^{TIS_{0,max}-\Delta\$} DIST_L(i)}$$

FOR intervals n = 0 to 55
  [Filter TIS]
  $TIS_{filtered,n,m,L} = mean(TIS_{\{all\ n\}}(IST_{n,m} \le IST_{\{all\ n\},m} < IST_{n,m} + D_{min,L}))$
  IF n = 0 THEN [time space]
    If relaxation instance THEN
      $D_{event,0,m,L} = D_{event,0,m,L}$
      $D'_{this\ x,0,m,L} = D'_{this\ x,0,m,L}$
      $N'_{this\ x,0,m,L} = N'_{this\ x,0,m,L}$
        WHERE x = {year, month, week, day, hour} and "this" refers to calendar periods
    ELSE [IF new update interval]
      [Update event duration in time space]
      IF $ACS_{0,m-1} = ACS_L$ THEN
        $D_{event,0,m,L} = D_{event,0,m-1,L} + (IST_{0,m} - IST_{0,m-1})$ -continued Subappendix F: Pseudo Code (for caldendar events only)

```
      ELSE
        D_{event,0,m,L} = 0
      END IF
      [Update calendar x cumulative event duration(s) and count(s) in
      time space]
      IF change(x, IST_{0,m-1}, IST_{0,m}) THEN
        D'_{this x,0,m,L} = 0
        N'_{this x,0,m,L} = 0
      ELSE IF ACS_{0,m-1} = ACS_L THEN
        D'_{this x,0,m,L} = D'_{this x,0,m-1,L} + (IST_{0,m} - IST_{0,m-1})
        N'_{this x,0,m,L} = N'_{this x,0,m-1,L}
      ELSE IF ACS_{0,m-1} ≠ ACS_L AND ACS_{0,m-2} = ACS_L THEN
        D'_{this x,0,m,L} = D'_{this x,0,m-1,L}
        N'_{this x,0,m,L} = N'_{this x,0,m-1,L} + 1
    ELSE
        D'_{this x,0,m,L} = D'_{this x,0,m-1,L}
        N'_{this x,0,m,L} = N'_{this x,0,m-1,L}
      END IF
    END IF
  ELSE [IF n = 1 to 55] [future space]
    [Update event duration in future space]
    IF ACS_{n-1,m} = ACS_L THEN
      D_{event,n,m,L} = D_{event,n-1,m,L} + (IST_{n,m} - IST_{n-1,m})
    ELSE
      D_{event,n,m,L} = 0
    END IF
    [Update calendar × cumulative event duration(s) and count(s) in
    future space]
    IF change(x,IST_{n-1,m}, IST_{n,m}) THEN
      D'_{this x,n,m,L} = 0
      N'_{this x,n,m,L} = 0
    ELSE IF ACS_{n-1,m} = ACS_L THEN
      D'_{this x,n,m,L} = D'_{this x,n-1,m,L} + (IST_{n,m} - IST_{n-1,m})
      N'_{this x,n,m,L} = N'_{this x,n-1,m,L}
    ELSE IF n ≠ 1 AND ACS_{n-1,m} ≠ ACS_L AND ACS_{n-2,m} = ACS_L
    THEN
      D'_{this x,n,m,L} = D'_{this x,n-1,m,L}
      N'_{this x,n,m,L} = N'_{this x,n-1,m,L} + 1
    ELSE
          D'_{this x,n,m,L} = D'_{this x,n-1,m,L}
          N'_{this x,n,m,L} = N'_{this x,n-1,m,L}
        END IF
      END IF
      [Determine threshold(s)]
```

$$\Phi_{\alpha,this\ x,L} = 1 - \frac{D_{this\ x,L}(1 - N'_{this\ x,n,m,L}/N_{this\ x,L})}{t'_{this\ x,n}},$$

WHERE $t'_{this\ x,n}$ = time remaining in this x at every $IST_{n,m}$ $$\Phi_{\beta,this\ x,L} = 1 - \frac{D_{min,L}}{t'_{this\ x,n}} \cdot \text{floor}\left(\frac{D_{this\ x,L} - D'_{this\ x,n,m,L}}{D_{min,L}}\right)$$

```
    TIS_{threshold,n,m,L} = min(TIS_0) such that Φ_L (TIS_0) >
    max(Φ_{α,this x,L}, Φ_{β,this x,L})|_0^1 for all x
    [Determine ACS]
    IF (TIS_{filtered,n,m,L} > TIS_{threshold,n,m,L} OR (D_{event,n,m,L} ≠ 0 AND
    D_{event,n,m,L} < D_{min,L}))
        AND (D'_{this x,n,m,L} + D_{min,L} - D_{event,n,m,L} ≤ D_{this x,L})
        AND (N'_{this x,n,m,L} < N_{this x,L})
        AND (D'_{this x,n,m,L} + (IST_{n+1,m} - IST_{n,m}) ≤ D_{this x,L}) THEN
        ACS_{n,m} = ACS_L
      ELSE
        ACS_{n,m} = ACS_{n,m}
      END IF
    END FOR [every n]
  END FOR [every L]
END FOR [every new {IST, TIS} series]
```

In the pseudocode, a set of lower boundaries of bins used to build up $TIS_0$ distribution.

It is acceptable to use a standard averaging window during initialization. This may be helpful if the initial $TIS_0$ distribution is to be shared among several load toolkit function implementations at the same transactive node and/or used for response levels L within the same implementation. Note that m is used as an iteration index, so that m−1 refers to the previous update interval. During a relaxation instance, $IST_0$ remains unchanged. Averaging $TIS_0$ may have little effect on updating the $TIS_0$ distribution. If that is the case, the implementer may choose not to do the averaging. This may then allow the update of $TIS_0$ distribution to be done outside of any single toolkit function implementation to be shared among several toolkit function implementations at the same transactive node and/or used for response levels L within the same implementation. $D_{event}$ is a new variable introduced to keep track of the duration of an event. change(x, $t_1$, $t_2$)" represents a function to determine whether calendar period x has changed between $t_1$ and $t_2$, inclusive.

Subappendix G: MATLAB Simulation Code and Results (for Calendar Events Only)

%% TKLD_2.4 MATLAB Simulation—Version E (matches pseudo code above)

% This script is to simulate the performance of load toolkit function TKLD_2.4 using actual TIS data queried from the Netezza database

```
%
%% Clear everything to start new simulation:
clear all; close all; clc; tic
%% Subproject Configuration:
timezone='Pacific'; % 'Pacific' or 'Mountain'
N_WH=800; % number of water heaters
K_L=1; % number of control levels
% K_L=2; % FOR TESTING (comment out above line)
subplot(2+K_L,1,K_L+2); stairs(IST_num(m,:), [Delta_Load(m,:) Delta_Load(m,56)]);
ylabel("\DeltaL [kW]");
x_tick_label=datestr(x_tick,'mm/dd/yy HH:MM');
set(gca,'XTick',x_tick,'XTickLabel',x_tick_label)
xlabel('IST_n')
%% Simulation time in minutes:
sim_time=toc/60;
```

Example 1—One Response Level

Running the above MATLAB code, with $K_L$=1, $D_{min,1}$=15 min, $D_{this\ day,1}$=240 min, $N_{this\ month,1}$=5, $D_{this\ month,1}$=5×240 min=1200 min, results in the plots 6800, 6900, 7000, 7100, 7200 of FIG. 68 FIG. 69, FIG. 70, FIG. 71 and FIG. 72 FIG. 73, respectively. Plot 7100 is in time space whereas plot 7200 is in future space.

Example 2—Two Response Levels

Running the above MATLAB code, with $K_L$=2, $D_{min,1}$=120 min, $D_{this\ day,1}$=240 min, $N_{this\ month,1}$=5, $D_{this\ month,1}$=5×240 min=1200 min, $D_{min,2}$=15 min, $D_{this\ day,2}$=240 min, $N_{this\ month,2}$=5, $D_{this\ month,2}$=5×240 min=1200 min, results in the plots 7300, 7400, 7500, 7600, 7700 of FIG. 73, FIG. 74, FIG. 75, FIG. 76, and FIG. 77, respectively. Plot 7600 is in time space whereas plot 7700 is in future space.

Subappendix H: Typical Hourly Residential Load Profiles

The load profiles in Table 43 are derived from normalized profiles in single-family detached house models found at [H1] and yearly energy consumed by each load computed from equations given in [H2]. Note that 2400 $ft^2$ and 4 bedrooms were used to represent a "typical" single-family detached house. In Table 43, MEL refers to miscellaneous electric loads.

[H1] U.S. Department of Energy, Building Energy Codes Program, Residential Prototype Building Models: http://www.energycodes.gov/development/residential/iecc_models

[H2] U.S. Department of Energy, Building Technologies Program, Building America House Simulation Protocols, by R. Hendrom and C. Engbrecht (National Renewable Energy Laboratory), Available at http://www.nrel.gov/docs/fy11osti/49246.pdf.

TABLE 43

Typical Hourly Residential Load Profiles [kW]

| | | | Cooking | Dishwasher | | Clothes Washer | | Clothes Dryer | | |
|---|---|---|---|---|---|---|---|---|---|---|
| Hour | Lighting | Refrigerator | Range | Weekday | Weekend | Weekday | Weekend | Weekday | Weekend | MELs |
| 1 | 0.029 | 0.0473 | 0.011 | 0.0084 | 0.0090 | 0.0022 | 0.0027 | 0.032 | 0.039 | 0.396 |
| 2 | 0.029 | 0.0463 | 0.011 | 0.0037 | 0.0040 | 0.0017 | 0.0021 | 0.019 | 0.024 | 0.365 |
| 3 | 0.029 | 0.0452 | 0.006 | 0.0028 | 0.0030 | 0.0009 | 0.0011 | 0.013 | 0.016 | 0.360 |
| 4 | 0.029 | 0.0439 | 0.006 | 0.0019 | 0.0020 | 0.0009 | 0.0011 | 0.006 | 0.008 | 0.355 |
| 5 | 0.086 | 0.0432 | 0.011 | 0.0019 | 0.0020 | 0.0017 | 0.0021 | 0.013 | 0.016 | 0.342 |
| 6 | 0.179 | 0.0432 | 0.017 | 0.0056 | 0.0060 | 0.0026 | 0.0032 | 0.019 | 0.024 | 0.381 |
| 7 | 0.201 | 0.0449 | 0.039 | 0.0112 | 0.0120 | 0.0052 | 0.0064 | 0.051 | 0.063 | 0.441 |
| 8 | 0.179 | 0.0473 | 0.068 | 0.0169 | 0.0181 | 0.0113 | 0.0138 | 0.102 | 0.125 | 0.468 |
| 9 | 0.079 | 0.0483 | 0.073 | 0.0318 | 0.0341 | 0.0170 | 0.0208 | 0.156 | 0.191 | 0.396 |
| 10 | 0.054 | 0.0490 | 0.077 | 0.0356 | 0.0381 | 0.0200 | 0.0245 | 0.220 | 0.270 | 0.337 |
| 11 | 0.054 | 0.0473 | 0.068 | 0.0309 | 0.0331 | 0.0196 | 0.0240 | 0.252 | 0.309 | 0.345 |
| 12 | 0.054 | 0.0473 | 0.079 | 0.0262 | 0.0281 | 0.0174 | 0.0213 | 0.263 | 0.321 | 0.345 |
| 13 | 0.054 | 0.0496 | 0.090 | 0.0225 | 0.0241 | 0.0157 | 0.0192 | 0.240 | 0.293 | 0.339 |
| 14 | 0.054 | 0.0496 | 0.073 | 0.0253 | 0.0271 | 0.0139 | 0.0170 | 0.218 | 0.266 | 0.351 |
| 15 | 0.054 | 0.0490 | 0.070 | 0.0206 | 0.0221 | 0.0122 | 0.0149 | 0.196 | 0.240 | 0.371 |
| 16 | 0.093 | 0.0496 | 0.090 | 0.0197 | 0.0211 | 0.0113 | 0.0138 | 0.186 | 0.227 | 0.391 |
| 17 | 0.201 | 0.0523 | 0.147 | 0.0206 | 0.0221 | 0.0118 | 0.0144 | 0.179 | 0.219 | 0.463 |
| 18 | 0.279 | 0.0574 | 0.239 | 0.0272 | 0.0291 | 0.0113 | 0.0138 | 0.175 | 0.215 | 0.562 |
| 19 | 0.376 | 0.0591 | 0.186 | 0.0478 | 0.0512 | 0.0113 | 0.0138 | 0.167 | 0.204 | 0.610 |
| 20 | 0.451 | 0.0574 | 0.096 | 0.0609 | 0.0652 | 0.0113 | 0.0138 | 0.164 | 0.201 | 0.630 |
| 21 | 0.459 | 0.0557 | 0.056 | 0.0496 | 0.0532 | 0.0113 | 0.0138 | 0.169 | 0.207 | 0.652 |
| 22 | 0.315 | 0.0547 | 0.039 | 0.0365 | 0.0391 | 0.0109 | 0.0133 | 0.175 | 0.215 | 0.636 |
| 23 | 0.176 | 0.0523 | 0.025 | 0.0243 | 0.0261 | 0.0074 | 0.0091 | 0.141 | 0.172 | 0.551 |
| 24 | 0.072 | 0.0490 | 0.017 | 0.0169 | 0.0181 | 0.0039 | 0.0048 | 0.077 | 0.094 | 0.479 |

Figure 78:
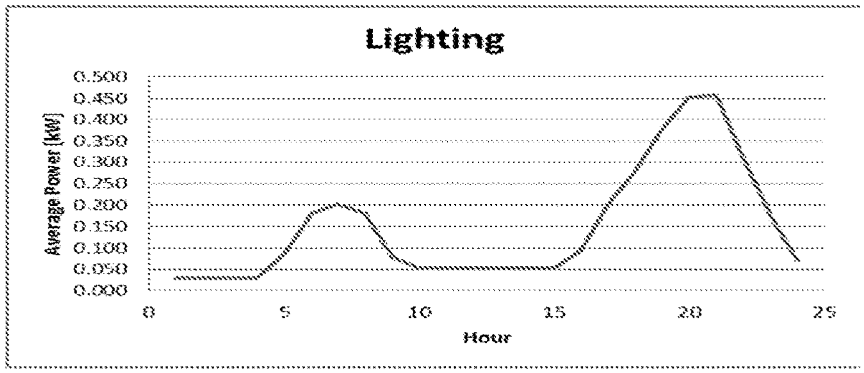
FIG. 78 is an example plot of a lighting load.
Figure 79:
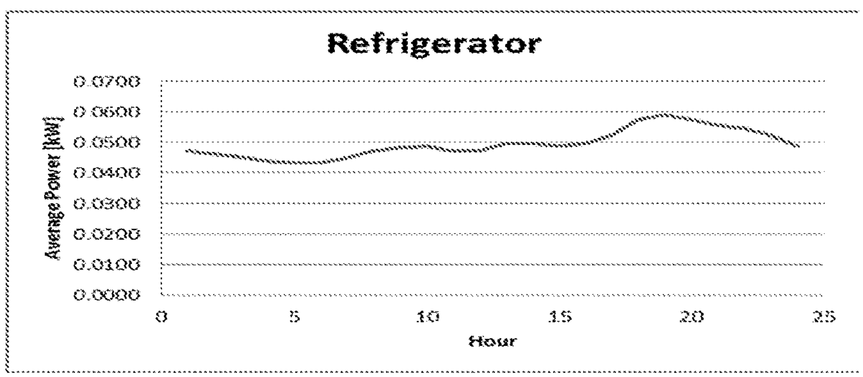
FIG. 79 is an example plot of a refrigerator load.
Figure 80:
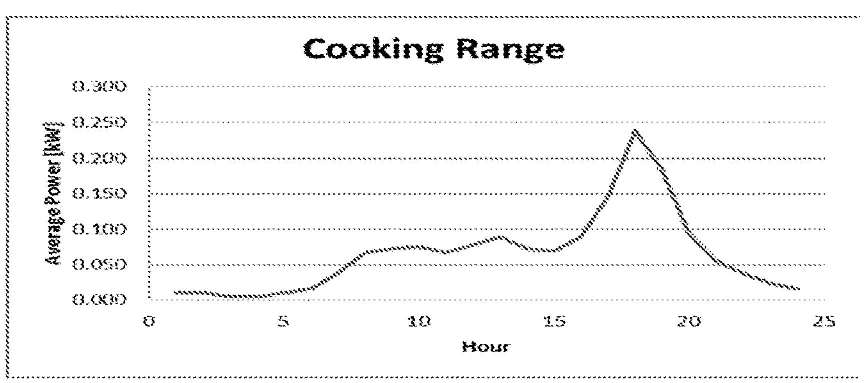
FIG. 80 is an example plot of a cooking range load.
Figure 81:
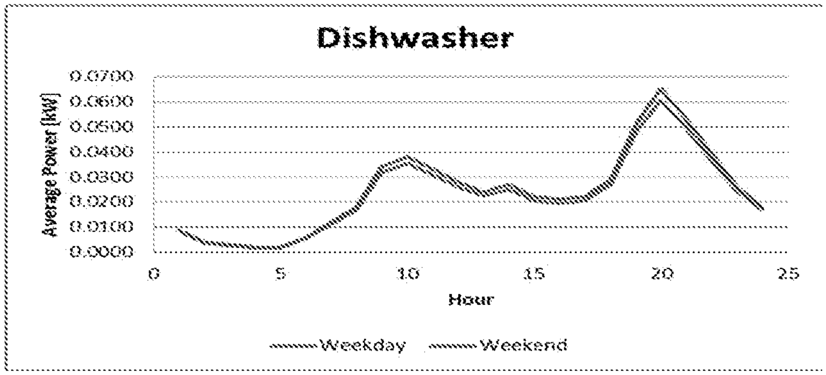
FIG. 81 is an example plot of a dishwasher load.
Figure 82:
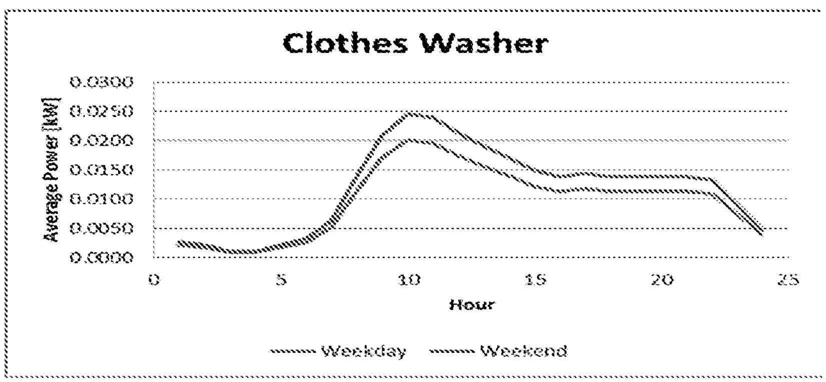
FIG. 82 is an example plot of a clothes washer load.
Figure 83:
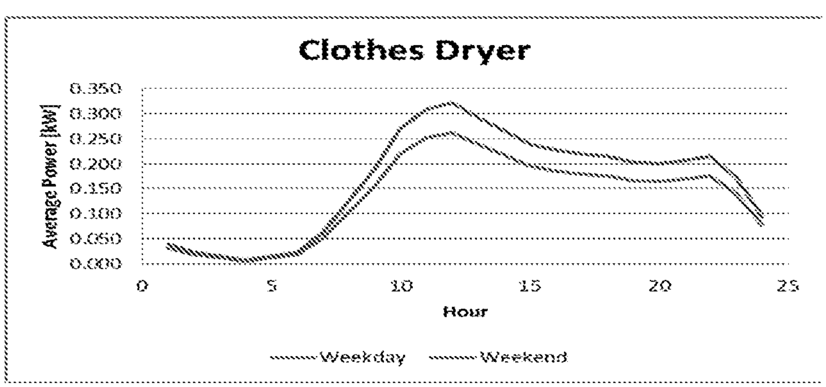
FIG. 83 is an example plot of a clothes dryer load.
Figure 84:
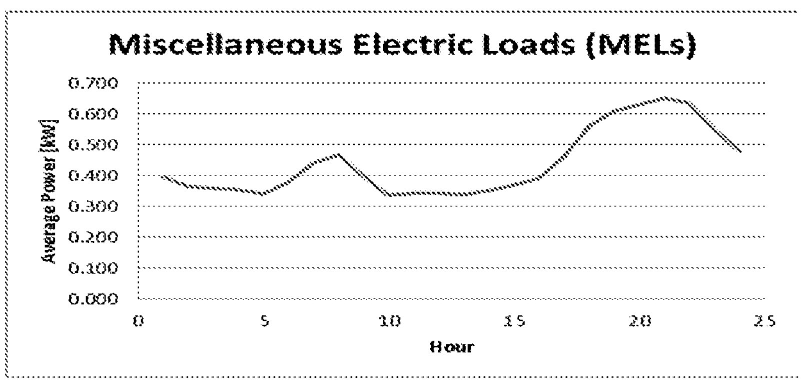
FIG. 84 is an example plot of a miscellaneous electric load.

Plots of load profiles given in Table 43 are shown in FIG. 78 through FIG. 84. In particular, FIG. 78 is a plot 7800 of a lighting load. FIG. 79 is a plot 7900 of a refrigerator load. FIG. 80 is a plot 8000 of a cooking range load. FIG. 81 is a plot 8100 of a dishwasher load. FIG. 82 is a plot 8200 of a clothes washer load. FIG. 83 is a plot 8300 of a clothes dryer load. FIG. 84 is a plot 8400 of a miscellaneous electric load.

6.3.11 Load Function—Non-Renewable Distributed Generation Event-Driven Demand Response (Function 2.5)

Description:

This is a function for predicting the responses of distributed generators that only infrequently respond to events that may be identified from an incentive signal. When these assets respond, they transition to a limited number of available response levels, which in this case are limited to two levels—standing idle or generating. This function was adapted quite directly from function 2.4 Residential Event-Driven Demand Response), which includes certain details not repeated here. Also refer to function 2.0 General Event-Driven Demand Response for general guidance about event-driven toolkit functions.

It is assumed that the distributed generator is normally idle, so its inelastic load prediction is zero. If this is not the case, or if the generator is used for objectives other than transactive control, then this toolkit function should be augmented to keep track of its inelastic load as a baseline to its generation under transactive control. Implementers may elect to also keep track of generator availability and scheduled testing periods, which conditions are not being tracked in this function.

This function can respond to absolute or relative TIS as desired by an application. In Version 0.4, a new parameter is recommended to state the effective cost of generation by this distributed generation resource. Because the TIS represents an economic signal, distributed generators that are more expensive than the TIS should not be operated, regardless of how the event periods have been determined.

This function was originally drafted for distributed diesel generators that are operated by UW under the control of operators who (we hope) are responsive to this function's advisory control signal. Having a human in the control loop will affect the reliability of and confidence in the generators' responses, but having a human in the control loop in no other way affected the way that this function was designed. The human operator will introduce uncertainty in the likelihood that advised control actions will be heeded, and this uncertainty may be addressed in future drafts of this function. This function should be useable for most event-driven distributed generators responses.

Block Input/Output Function Model:

Inputs:

Inputs for this function are identical to those defined in 2.4 Residential Event-Driven Demand Response with several exceptions listed below. The baseline, inelastic generation is assumed to be the idle state with no power being produced. Therefore, no generation pattern is tracked by this function. If the generator is found to be scheduled for other objectives, the times at which the generators are to be activated should be tracked as a baseline and subtracted from predicted event behaviors.

$P_{DG,L}$—[kW]—Power that is expected to be generated at each response level L. Many generator resources will offer one response level and will be operated at a single power level—perhaps the nameplate full power rating of the generator or generators. Default: 0.0 kW (for each response level).

$K_{DG}$—[cost/energy: $/kWh]—unit cost of generated electrical energy at which this distributed generation resource is able to produce electrical energy.

$K_L$—[dimensionless count]

$D_{min,L}$—[time: minutes]

$\{N_{this\ year,\ L}, N_{year,\ L}, N_{this\ month,\ L}, N_{month,\ L}, N_{this\ week,\ L}, N_{week,\ L}, N_{this\ day,\ L}, N_{day,\ L}, N_{this\ hour,\ L}, N_{hour,\ L}\}$—[dimensionless count].

$\{D_{this\ year,\ L}, D_{year,\ L}, D_{this\ month,\ L}, D_{month,\ L}, D_{this\ week,\ L}, D_{week,\ L}, D_{this\ day,\ L}, D_{day,\ L}, D_{this\ hour,\ L}, D_{hour,\ L}, D_{this\ event,\ L}\}$—[time duration: minutes].

$\{TIS_0(t), TIS_0(t-5), \ldots, TIS_0(t-5k)\}$—[$/kWh].

$\{TIS_0, TIS_1, \ldots, TIS_{K-1}\}$—[$/kWh].

OPTIONAL INPUT: {Level, $EventStartTime_L$, $EventDuration_L$}—[Integer, UTC Time, UTC Duration].

Interim Calculation Products:

$\{DIST(TIS_{0,min}), DIST(TIS_{0,min}+\Delta\$), DIST(TIS_{0,b}), \ldots\}$—[dimensionless].

$\{N'_{this\ year,\ L}, N'_{year,\ L}, N'_{this\ month,\ L}, N'_{month,\ L}, N'_{this\ week,\ L}, N'_{week,\ L}, N'_{this\ day,\ L}, N'_{day,\ L}, N'_{this\ hour,\ L}, N'_{hour,\ L}\}$—[dimensionless count].

$\{D'_{this\ year,\ L}, D'_{year,\ L}, D'_{this\ month,\ L}, D'_{month,\ L}, D'_{this\ week,\ L}, D'_{week,\ L}, D'_{this\ day,\ L}, D'_{day,\ L}, D'_{this\ hour,\ L}, D'_{hour,\ L}, D'_{this\ event,\ L}\}$—[time duration: minutes].

Outputs:

$\{ACS_0, ACS_1, \ldots, ACS_{K-1}\}$—[dimensionless].

$\{\Delta L_0, \Delta L_1, \ldots, \Delta L_{K-1}\}$—[kW]. (In this case, the sign convention should indicate that these are generation resources, not electrical load.)

Pseudo Code Implementation: The algorithm by which infrequent events are to be determined from the incentive signal are identical to what was described elsewhere in this application.

5. Establish/update the statistical distribution of historical TIS values.
6. Update incentive thresholds for this system of assets.
7. Determine demand-response event periods for this system of assets by comparing the transactive control incentive signal against updated incentive thresholds.
8. Update the advisory control signal time series for this system of assets.
9. Predict change in average power that will result from predicted demand-response control actions. A series of power generation predicted for each IST interval should be calculated corresponding to the set of advisory control signals that were created in the previous step #4.

Where no effects of ramp periods or inelastic load patterns should be modeled, then for each $IST_n$ and each response level L, $$\Delta L_L = 0, \quad \text{if } ACS_n = 0 \text{(no event) or } TIS_n \le K_{DG} \tag{1}$$

$\max(P_{DG,L})$, if both $ACS_n \ge ACS_L$ and $TIS_n > K_{DG}$.

In simple terms, Equation 1 says that the distributed generators should not operate and their elastic load is zero if either there is no event for time interval n ($ACS_n=0$) or if the TIS for the interval is less than the cost at which the generators can generate (e.g., $TIS_n \le K_{DG}$). If however, the TIS exceeds the cost at which the generators can generate and an event has been determined to invoke one or more response levels (e.g., $ACS_n \ge ACS_L$), then the amount of power predicted to become generated is the maximum $P_{DG,L}$ for the response levels L that have been invoked.

Further Alternatives

1. Address effects of resource unavailability that may affect the accuracy of predicted generation during events.
2. Address scheduled testing as (potentially) an inelastic impact as generators are typically tested about an hour or so each month, regardless of transactive control signals.
3. Address the uncertainty of elastic load series elements that is introduced by human operators.
4. If in the future distributed generators are to be modeled that have ramp-up and ramp-down periods that are comparable to, or longer than, the update interval of the transactive control and coordination system, then this function should be extended accordingly. (The update interval being used in some embodiments is 5 minutes. If a generator can generate full power within 30 seconds or so, the additional complexity of modeling the ramps may not be worthwhile.) The effect of the ramp periods is that the energy produced during the first event intervals, during which the ramp-up occurs, will produce less energy than $P_{DG,L}\times\Delta t$ for that interval. Energy may also be produced after the final event interval while the generators ramp down. See Appendix A for some calculations that anticipate these ramp-up and ramp-down periods.

Subappendix A: Planning for Ramp-Up and Ramp-Down Periods

This appendix offers some insights about additional considerations, steps, and calculations that should be conducted if a distributed generation resource is found to use ramp-up and/or ramp-down periods that are comparable to, or longer than, the duration of the update interval.

One additional set of inputs is used to indicate whether ramp-up and ramp-down periods are being modeled and their durations:

$\{ramp_{on}, tr_{on}, ramp_{off}, tr_{off}\}$—[Boolean T/F, minutes, Boolean T/F, minutes]—Input Boolean indicators that indicate whether the distributed generation resource should be ramped into service ($ramp_{on}$="true") or ramped out of service ($ramp_{off}$="true"). If either or both type of ramping is necessary, this function will linearly ramp the predicted power on over $tr_{on}$ minutes and off over $tr_{off}$ minutes. Default: {"false", 0.0, "false", 0.0}.

The formulation uses additional sub-steps given the various possible relationships between $tr_{on}$, $tr_{off}$, and the $IST_n$ times. In certain embodiments, $IST_{n*}$ is defined as the $IST_n$ at which an event and $tr_{on}$ are initiated. In some embodiments, $IST_{n}$ is defined as the $IST_n$ that immediately follows the event. If it were not for $tr_{off}$, no power would be generated in the interval that starts at $IST_{n}$.

Figure 85:
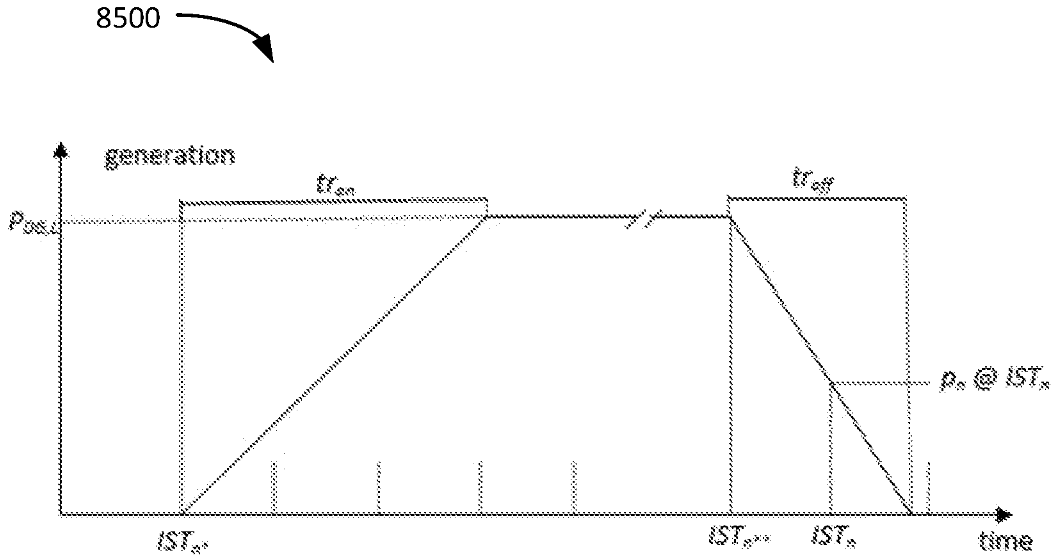
FIG. 85 is a block diagram showing an example model of ramp up and ramp down periods.

The approach will be to define generation power $p_n$ at each time $IST_n$. Then, the average power may be determined from these points and knowledge of the ramp rates. FIG. 85 is a block diagram 9500 showing an example model of ramp up and ramp down periods.

First, if $$IST_n \le IST_{n*}, \text{ or if } IST_n \ge IST_{n**} + tr_{off}, \quad (A1)$$

then $p_n=0$.

However, if $IST_n$ falls within the interval $$IST_{n*} \le IST_n \le IST_{n**} + tr_{off}, \quad (A2)$$

then assign $p_n$ as shown in equation A3.

$$p_n = \min\left(\frac{(IST_n - IST_{n*}) \cdot P_{DG,L}}{ramp_{on} \cdot tr_{on} + \varepsilon}, P_{DG,L}, \left(1 - \frac{(IST_n - IST_{n**})}{ramp_{on} \cdot tr_{on} + \varepsilon}\right) \cdot P_{DG,L}\right) \quad (A3)$$

The small positive value epsilon has been used in the denominators to avoid division by zero, which could otherwise have occurred if either the Boolean operators $ramp_{on}$ or $ramp_{off}$ were false (e.g., "0") or if either of the ramp durations $tr_{on}$ or $tr_{off}$ were zero.

Now that generation power has been determined at each time $IST_n$, the average power over each IST interval should be estimated, where ramping may at times reduce the estimate.

For any interval prior to $IST_{n*}$ or after $IST_{n**}+tr_{off}$, $\Delta L_n=0$. No power is produced by the distributed generators during these intervals.

For any interval $IST_n$ that coincides with or follows $IST_{n*}$ and also starts before $IST_{n**}+tr_{off}$, then $$\Delta L_n = \begin{cases} 0, & p_n = 0,\ p_{n+1} = 0 \\ 0.5*(p_n + p_{n+1}), & p_n < P_{DG,L},\ p_{n+1} < P_{DG,L} \\ \dfrac{p_{n+1}\cdot\left(IST_{n+1} - IST_n - \frac{tr_{on}}{2}\cdot\left(1 - \frac{p_n}{p_{n+1}}\right)\right) + p_n \cdot \frac{tr_{on}}{2}\cdot\left(1 - \frac{p_n}{p_{n+1}}\right)}{IST_{n+1} - IST_n}, & p_n < P_{DG,L},\ p_{n+1} = P_{DG,L} \\ \dfrac{p_n\cdot\left(IST_{n+1} - IST_n - \frac{tr_{off}}{2}\cdot\left(1 - \frac{p_{n+1}}{p_n}\right)\right) + p_{n+1} \cdot \frac{tr_{off}}{2}\cdot\left(1 - \frac{p_{n+1}}{p_n}\right)}{IST_{n+1} - IST_n}, & p_n = P_{DG,L},\ p_{n+1} < P_{DG,L} \\ P_{DG,L}, & p_n = P_{DG,L},\ p_{n+1} = P_{DG,L} \end{cases} \quad (A4)$$

6.3.12 Incentive Function—Fossil Generation (Function 3.0)

Description:

This function provides the predict fossil generation and its cost aggregated for each transmission zone.

The cost for generating fossil energy includes a fixed infrastructure cost and a variable production cost. The infrastructure cost will be based on estimated amortized fossil generation plant infrastructure expense; while the variable production cost is mainly based on fuel cost.

Fossil generators include the following types:

Nuclear

Coal

Geothermal

Natural Gas Combined Cycle

For simplicity, the infrastructure cost will be calculated for each of the above categories of generation based on the average capital cost provided in Subappendix B in (kaplan 2008).

Coal: 2519 $/kw

Nuclear: 3930 $/kw

Geothermal: 3170 $/kw

Natural Gas Combined Cycle: 1165 $/kw

The infrastructure cost of a fossil generating unit can thus be estimated if its capacity is known. This cost shall then be spread over the lifetime T of the generating unit.

It is permissible for the implementer of this function to assume that T=8760 (h/year)*40 (years)*0.9 (utilization factor)=315360 (hours) if better estimates are unavailable for the lifetime of fossil generating unit.

It is unlikely that any of the fossil units will surpass their stated lifetime in the short-time. However, after a generating unit exceeds its planned lifetime, a decision should be made. Thereafter, the infrastructure cost may be (a) zeroed out, (b) replaced by ongoing maintenance costs, or (c) continued as before as an ongoing replacement cost. This function should be revisited and refined when this situation will be encountered.

The generating units available to meet system load are "dispatched" (put on-line) in order of lowest variable cost. This is referred to as the "economic dispatch" of a power system's plants. For a plant that uses combustible fuels (such as coal or natural gas) a key driver of variable costs is the efficiency with which the plant converts fuel to electricity, as measured by the plant's "heat rate." This is the fuel input in British Thermal Units (btus) used to produce one kilowatt-hour of electricity output. A lower heat rate equates with greater efficiency and lower variable costs.

A Unit Commitment and Dispatch Engine is used to produce generation MW, that can meet BPA load forecast. Generation cost is calculated based on the heat rate curves and fuel prices.

Figure 86:
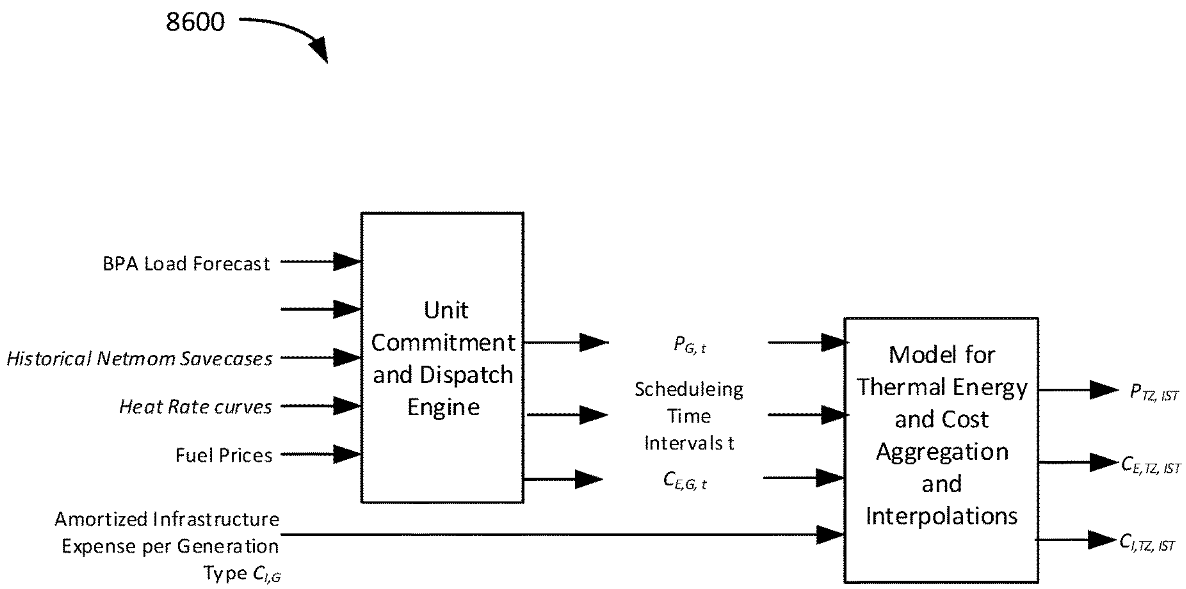
FIG. 86 is a block diagram of an example block input/output function model.

FIG. 86 is a block diagram 8600 of a block input/output function model, which is discussed below.

Inputs:

Predicted price of fuel, which may be either constant or a dynamic time series, depending on the fuel.

Representative amortized infrastructure cost. (In some cases, the infrastructure costs will be stated as functions of many variables, including local costs of money, taxes, regulations, etc.)

Planned generator schedule(s), such as Federal hydro schedules.

Constant heat rate curves of fossil generators.

BPA Load Forecast.

Historical BPA Netmom savecases, which are used to produce generation and load profiles for any given hour of a day in a week of a specific season.

Amortized Infrastructure cost $C_{I,G}$

Outputs:

Predicted average generated fossil power $P_{TZ,IST}$ For a Transmission Zone TZ for time series using the intervals of the current IST time series.

Corresponding predicted energy costs of generated power in each transmission zone $C_{E,TZ,IST}$ using the intervals of the current IST time series.

Predicted infrastructure cost in each transmission zone $C_{I,TZ,IST}$ time series using the intervals of the current IST time series. (Infrastructure cost is not expected to be especially dynamic, but it is specified as a time series for consistency.)

Pseudo Code Implementation:

1. Process inputs from BPA;
2. Complement input data with the model data from historical Netmom savecases and WECC heat rate curves;
3. Solve a multi-interval economic dispatch problem which produces dispatch MW for each generator $P_{G,t}$
4. Calculate $P_{TZ,IST}$ for transmission Zone TZ and interval IST;

$$P_{TZ,IST} = \sum_{\substack{G \in TZ \\ G is Fossil}} P_{G,t},$$

where t is covers the majority portion of an IST interval

5. Compute the infrastructure cost $C_{I,TZ,IST}$ corresponding to each transmission zone TZ and each IST;

$$C_{I,TZ,IST} = \sum_{G \in TZ} \left( \sum_{G is Gas} C_{I,Gas} * T_{IST} + \sum_{G is Geo} C_{I,Geo} * T_{IST} + \sum_{G is Coal} C_{I,Coal} * T_{IST} + \sum_{G is Nuke} C_{I,Nuke} * T_{IST} \right)$$

6. Compute the energy product cost $C_{E,TZ,IST}$ for each transmission zone TZ and each IST;

$$C_{TZ,IST} = \sum_{\substack{G \in TZ \\ G is Fossil}} C_{G,t} / T_t * T_{IST},$$

where t is covers the majority portion of an IST interval

6.3.13 Load Function—Residential Time-of-Use Demand Response (Function 3.4)

Description:

This function predicts the response from an automated residential demand-response system that will respond approximately daily to help mitigate peak conditions that are evident in an incentive signal. The peak period will be based on response constraints and the TIS incentive signal. (Note that this approach is more dynamic than typical time-of-use (TOU) demand response, in which daily peak and off-peak intervals remain immutable. The peak and off-peak periods recommended by this function may be assigned differently each day according to events that will have affected the predicted TIS incentive signals.) It may be applied where programmable, communicating thermostats; smart appliances, demand-response switch units, or other assets are installed in residences and where programs are designed to have these systems respond to daily peak periods.

In some cases, this function will be used by the asset systems IF-04 (water heater control), IF-08 (thermostat load control), and LV-02 (water heater demand-response units). (This document may be useful for the determination of appropriate daily intervals, but a unique function may be used to predict the changes in elastic load from such a diverse and changing population of responsive assets.)

A first objective of this function is to establish the time periods during which the response level(s) should be called, based upon the numbers and durations and preferred durations of these periods that are permitted for each response level. The daily events and their durations are positioned to best align with the levels of the TIS incentive signal that has been predicted for the day.

The function should then predict the change in load that will result from these events having been planned. This toolkit function addresses systems that control any combination of (1) residential space heating, (2) residential electric tank water heaters, or (3) smart appliances. Relatively simple models of populations of these devices are used to predict the changed load that they will consume as they respond to these various peak periods.

Block Input/Output Function Model:

Inputs:

L—[dimensionless count]—number of response levels to be prescribed for this asset system. For example, an asset system that simply curtails its loads has one response level (e.g., "curtailed"), so L=1.

{$Threshold_1$, $Threshold_2$, . . . , $Threshold_l$, . . . , $Threshold_L$}—[dimensionless fraction]—typical fraction of time that each response level l should be active during a day. For example, if a system with two response levels has its highest level designed to respond during the two worst peak hours of a day, then $Threshold_2$=2/24=0.083. If the first level may include an additional 2 hours in its peak period, then Threshold, =4/24=0.17. In this example, the system would be in its normal, non-responding condition for 1—$Threshold_1$—$Threshold_2$=0.75. (Through this formulation, it will be assumed that the thresholds are ordered in increasing order, from least to greatest.) (Default={1/(L+1), 2/(L+1), . . . , l/(L+1), . . . , L/(L+1)})

{$D_{min,week\ day,l}$, $D_{min,weekend\ day,l}$, $D_{min,holiday,l}$}—[time: minutes]—for each response level l, minimum time duration for which an event level l should remain in force for this day type after it has become initiated. (In some cases, this can be stated in multiples of 5, 15, 60, or 360 minutes to align with the IST interval durations.) (Default={15 minutes, 15 minutes, 15 minutes})

{$N_{min,week\ day,l}$, $N_{min,weekend\ day,l}$, $N_{min,holiday,l}$}—[dimension less count]—local static input LI_29—limitations on the minimum number of TOU events that may be called during the three major day types for each response level l. (Default={0, 0, 0})

{$N_{max,week\ day,l}$, $N_{max,weekend\ day,l}$, $N_{max,holiday,l}$}—[dimension less count]—local static input LI_29—limitations on the maximum number of TOU events that may be called during the three major day types for each response level l. (Default={1, 0, 0})

{$D_{max,week\ day,l}$, $D_{max,weekend\ day,l}$, $D_{max,holiday,l}$, $D_{max\_event,l}$—[time duration: minutes}—local static input LI_30—maximum total event duration permitted per day type and per event allowed for each event level l—constraints that have been placed on the maximum total duration of events that may endure during a day type or during an event. (In some cases, this can be stated in multiples of 5, 15, 60, or 360 minutes to align with the IST interval durations.) (Default={1440 minutes, 1440 minutes, 1440 minutes} (e.g., no limit))

{$TIS_0(t)$, $TIS_0(t-5)$, . . . , $TIS_0(t-5k)$}—[$/kWh]—recent history of transactive incentive signals (TIS) by which the statistical likelihood of various incentive levels will be assessed and updated. The $TIS_0$ values from the TIS time series (e.g., the TIS values that correspond to $IST_0$) from the last k five-minute updates are used. (It should be allowed that a recursive method be initiated, in which case historical $TIS_0$ data may not be needed.

If historical $TIS_0$ is not used, system responses should initially be canceled or more conservatively applied until the recursive method has learned a meaningful statistical distribution of the TIS signals.)

$\{TIS_0, TIS_1, \ldots, TIS_{K-1}\}$—[$/kWh]—current transactive incentive signal TIS for future IST intervals.

$P_{wh}(t)$—[average kW]—typical electrical power consumption by residential tank water heaters in this region as a function of time of day. This function may be available as a function or as a look-up table. See appendix material for an example.

Interim Calculation Products:

$\{DIST(TIS_{0,min}), DIST(TIS_{0,min}+\Delta\$), \ldots, DIST(TIS_{0,b}), \ldots\}$—[dimensionless]—distributions of absolute $TIS_0$ values based on historic or monitored TIS incentive signals.

$\{\phi(TIS_{0,1}), \phi(TIS_{0,2}), \ldots, \phi(TIS_{0,b}), \ldots, \phi(TIS_{0,B})\}$—[dimensionless fraction]—cumulative distribution of historical $TIS_0$ values. (This will sometimes be abbreviated as $\phi(b)$, where b is the bin that is lower bounded by $TIS_{0,b}$.)

Outputs:

$\{ACP_0, ACP_1, \ldots ACP_{K-1}\}$—[dimensionless]—asset control plan for each future predicted interval. A standardized approach has been specified by which planned response levels may be indicated by integer values [−127,127].

$\{\Delta L_0, \Delta L_1, \ldots, \Delta L_{K-1}\}$—[kW]—average change in power caused by the elastic behavior of this asset system for future predicted intervals. The non-zero elements of this series corresponding to non-zero elements of the asset control plan. (Positive values are used here to refer to additional power that is made available to the system by curtailed loads.)

Pseudo Code Implementation:

1. Establish/update the statistical distribution of historical $TIS_0$ values. (This general process does not require that the distribution of TIS incentive signals is a normal distribution.)
   a. Using available historical information and the TIS time series that becomes available to the transactive node at an update interval, create a distribution of bins b that are $\Delta\$$-wide for the available $TIS_0$ values. (Bins of size $\Delta\$=\$0.001$ are probably small enough for this function.) For each available $TIS_0$, $$\text{If } TIS_{0,b} \le TIS_0 < TIS_{0,b}+\Delta\$, \text{then set } DIST(TIS_{0,b})=DIST(TIS_{0,b})+1 \quad (1)$$

Figure 87:
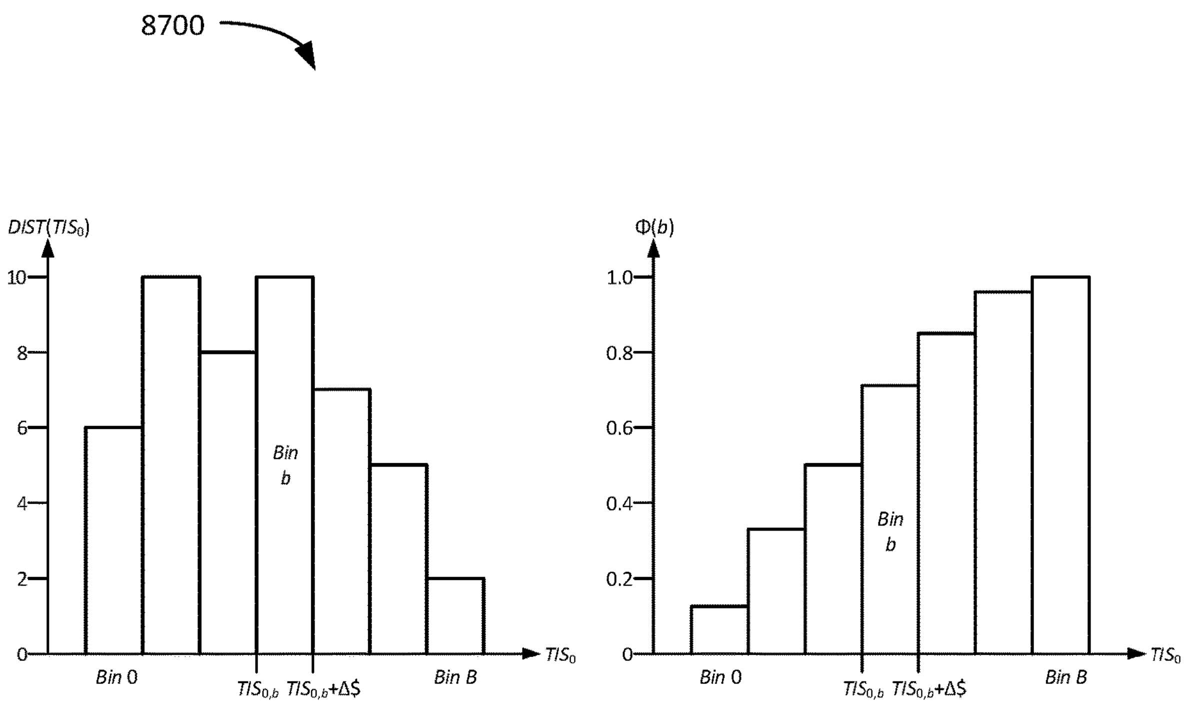
FIG. 87 is a set of plots for $DIST(TIS_0)$ and $\phi(b)$.

$TIS_{0,b}$—[$/kWh]—lower boundary of distribution interval $DIST(TIS_{0,b})$, bin b $TIS_{0,b}+\Delta\$$—[$/kWh]—upper boundary of distribution interval $DIST(TIS_{0,b})$, bin b $DIST(TIS_{0,b})$—[dimensionless]—a tally count of the number of times that $TIS_0$ have fallen into the interval bin b over time. (Because the distribution will be normalized, it is equally valid to sum the durations of the intervals, resulting in a tally count of minutes.)

c. Using $DIST(TIS_0)$, create a normalized cumulative distribution $\phi(b)$ as shown in equation 2. The interpretation of $\phi(b)$ is the fraction of $TIS_0$ that will be expected to fall in any of the bins below bin b, inclusive. By subtracting $\phi(b)$ from 1.0, one estimates the fraction of $TIS_0$ values that would be expected to be greater than $TIS_{0,b}+\Delta\$$. Refer to Table 44 and FIG. 87, which is a set 8700 of plots for $DIST(TIS_0)$ and $\phi(b)$.

$$\Phi(b) = \frac{\sum_{bin\,0}^{bin\,b} DIST(TIS_0)}{\sum_{bin\,0}^{bin\,b} DIST(TIS_0)} \quad (2)$$

$\phi(b)$—[dimensionless fraction in the range [0,1]]—normalized cumulative distribution of historical $TIS_0$ values in bins 0 through b, inclusive.

Bin 0—[$/kWh]—bin that possesses the smallest $TIS_0$ value that can be found in $DIST(TIS_0)$.

Bin B—[$/kWh]—bin that possesses the largest $TIS_0$ value that can be found in $DIST(TIS_0)$.

TABLE 44

Useful table for tracking the distribution of historical $TIS_0$ values

| | $DIST(TIS_0)$ | $\phi(b)$ |
|---|---|---|
| Bin B | | |
| . . . | | |
| Bin b | | |
| . . . | | |
| Bin 1 | | |
| Bin 0 | | |

A skilled implementer may choose to fit the normalized cumulative distribution $\phi(b)$ column of Table 45 to a monotonic function that could be used hereafter instead of this lookup table.

$DIST(TIS_0)$ and $\phi(b)$ may be updated whenever a new $TIS_0$ becomes available. (One may choose to update $DIST(TIS_0)$ and $\phi(b)$ at a time interval of his choice. Some seasonal variation in the distribution should be anticipated. Therefore, it is advised the distribution be established representative of this month or this season.)

2. Update incentive thresholds for this system of assets. This step refers to the set $\{Threshold_l\}$ to establish the typical fraction of a day and TIS values for which a TOU event should be active for a given response level l.

The value $TIS_{0,b}$ in equation 3 is an acceptable threshold $TIS_{thresh,l}$ for future TIS values and response level l if the condition of equation 3 is true. (One may interpolate to find a better threshold value.) Determine an acceptable threshold for each response level l using equation 3.

$$\phi(b) \le 1 - Threshold_l < \Phi(b+1) \quad (3)$$

3. Calculate averaged TIS values from the thresholds and statistical information. The raw threshold values are not as useful as averaged TIS values for given response levels. For each response level l, calculate the average of the TIS values that are expected to fall greater than the level's threshold.

$$\overline{TIS}_{thresh,l} \equiv \frac{\sum (TIS^*_{0,b} + 0.5 \cdot \Delta\$) \cdot DIST(TIS^*_{0,b})}{\sum DIST(TIS^*_{0,b})} \quad (4)$$

$\overline{TIS}_{thresh,l}$—[$/kWh]—average of TIS values expected to be greater than $TIS_{thresh,l}$.

$TIS_{0,b}{}^*+0.5\cdot\Delta\$$—[$/kWh]—the center of any DIST $(TIS_{0,b})$ bin b that holds values greater than or equal to $TIS_{thresh,l}$.

$DIST(TIS_{0,b}^*)$—[dimensionless count]—the count of members in $DIST(TIS_{0,b})$ bin b that hold values greater than or equal to $TIS_{thresh,l}$.

4. Determine TOU event periods for this system of assets.
   a. An initial calculation of candidate TOU periods is completed to find periods of time during which the average predicted $TIS_n$ will be greater than or equal to $\overline{TIS}_{thresh,l}$. In general, candidate TOU response periods for response level l are the sets of IST intervals from $IST_n$ to $IST_{n+m}$ (whole numbers m=0, 1, . . . ) that simultaneously maximize the left-hand side of inequality 5 while also satisfying inequality 6.

$$\frac{\sum_{n^*}^{n^*+m^*} TIS_n \cdot (IST_{n+1} - IST_n)}{\sum_{n^*}^{n^*+m^*} (IST_{n+1} - IST_n)} \geq \overline{TIS}_{thresh,l}, \tag{5}$$

where $$IST_{n^*+m^*+1} - IST_{n^*} \leq D_{max,1} \tag{6}$$

$n^*$—[dimensionless]—specific index n of the current $IST_n$ intervals that both maximizes the left-hand side of inequality 5 and satisfies inequality 6 to define a TOU period for response level l.

$m^*$—[dimensionless index]—whole number index that combined with n* maximizes the left-hand side of inequality 5 and satisfies inequality 6 to define a TOU period for response level l.

$IST_{n^*+m^*+1}$—[time in UTC]—ending time of the newly defined TOU period.

$IST_{n^*}$—[time in UTC]—beginning time of the newly defined TOU period.

$D_{max,l}$—[time: minutes]—relevant maximum period duration or durations for this day or event selected from the defined input set $\{D_{max,weekday,l}, D_{max,weekend\ day,l}, D_{max,holiday,l}, D_{max\ event,l}\}$.

If more than one response level is being used (e.g., L>1), then this step will likely have defined nested response periods where the periods of response level 1 are nested within periods of response level 2, and so on. Normally, the hierarchy or priority of these nested response periods will be trivial, such that the response periods with smaller response level l trump those of greater l.

There are L+1 total levels. The remaining level L+1 will most often, but not necessarily, be assigned to normal operation, unmodified by the TIS.

Because the IST intervals gradually change from granular to coarse into the future, the function might see response levels over or under prescribed far into the future when coarse 6-hour or daylong IST intervals have been specified. These conditions should disappear as representations become finer and may be mitigated, to a degree, by the input assignments of maximum allowed TOU period durations.

b. Special case: The number of defined events is more than the maximum number allowed for a given day. If for any response level l and day type there have been defined a number of TOU periods and their respective n* indices within a day that exceeds the relevant limit from the defined input set $\{N_{max,week\ day,l}, N_{max,weekend\ day,l}, N_{max,holiday,l}\}$, then those periods within the day having the least (lesser) of the magnitudes on the left-hand side of inequality 5 should be discarded.

c. Special case: The number of defined events is less than the minimum number allowed for a given day and its day type. If for any response level l and day type there has been defined a number of TOU periods and their respective n* indices within the day fewer than the minimum number of response periods allowed by the input set $\{N_{min,week\ day,l}, N_{min,weekend\ day,l}, N_{min,holiday,l}\}$, then inequality 6 and inequality 7 should be relaxed somewhat as shown in inequalities 7 and 8. The corrected indices n* and m* will yield an acceptable number of event periods for this response level l and day type. The corrected indices n* and m* are those that solve inequalities 7 for the smallest positive real number δ for which the minimum allowed TOU period duration of inequality 8 is achieved.

$$\frac{\sum_{n^*}^{n^*+m^*} TIS_n \cdot (IST_{n+1} - IST_n)}{\sum_{n^*}^{n^*+m^*} (IST_{n+1} - IST_n)} \geq \overline{TIS}_{thresh,l} - \delta, \tag{7}$$

where $$D_{min,1} \leq IST_{n^*+m^*+1} - IST_{n^*} \leq D_{max,1} \tag{8}$$

δ—[$/kWh]—smallest positive real value for which satisfactory indices n* and m* exist.

$D_{min,l}$—[time: minutes]—minimum TOU period duration allowed for this day type and response level as selected from defined inputs $\{D_{min,l}, D_{min,2}, \ldots, D_{min,l}, \ldots, D_{min,L}\}$.

One may revisit inequalities 7 and 8 until the minimum allowed numbers of events have been defined.

5. Specify the prioritization of response levels. Because the TOU periods will have been assigned nested one inside another, the designer should specify the prioritization or hierarchy of the assigned response levels.
   a. Example 1: Curtailment using one response level. One can start with one of the simplest cases. Suppose that a controlled electrical load will be curtailed during response level 1 and behave normally otherwise. The prioritization of the response levels here is trivial as shown in Table 46. (The advisory control signal column "ACS" in this table will be discussed in the next section.)

TABLE 45

Response-Level Prioritization for Curtailment Example

| Response Levels Assigned to $IST_n$ | Priority Assignment | Action/Outcome | ACS |
|---|---|---|---|
| 1 | 1 | Curtailed system operation | 127 |
| none | none | Normal operation | 0 |

b. Example 2: Five-level TOU battery system. As the number of response levels and complexity of the controlled asset system increases, the challenge of prioritizing the response levels increases, too. Refer to Table 47, which defines the priority of assignments to be made for a battery system that has four response levels available to it. (Those who are familiar with battery storage will correctly recognize that a battery system will have additional constraints that may be managed either implicitly or explicitly.) This example has the additional complexity from a storage system that can either increase the available power (ACS>0) or decrease the available power (ACS<0) at its transactive node.

TABLE 46

Response-Level Prioritization for a Battery System with Five Available Response Levels

| Response Levels Assigned to $IST_n$ | Priority Assignment | Action/Outcome | ACS |
|---|---|---|---|
| 1, 2, 3, and 4 | 1 | Maximum Charge Bias Strategy | −127 |
| 2, 3 and 4 | 2 | Moderate Charge Bias Strategy | −64 |
| 3 and 4 | 3 | Inactive Dead Zone | 0 |
| 4 | 4 | Moderate Discharge Bias Strategy | 64 |
| none | remaining level | Maximum Discharge Bias Strategy | 127 |

6. Update the advisory control signal time series for this system of assets. Advisory control signals are discussed elsewhere in this application. In short, an advisory control signal should be stated for an IST interval n and will be non-zero for any interval during which a response other than normal operation is planned. Refer to Table 48 that lists the advisory control signals candidates that will typically be sent for curtailable loads and distributed generation according to the numbers of response levels available from these assets.

TABLE 47

Recommended assignable advisory control signals for curtailable load and "dispatchable" distributed generation

| Number of Response Levels | Advisory Control Signals $ACS_n$ |
|---|---|
| 1 | 0 (normal) |
| | 127 (curtailed) |
| 2 | 0 (normal) |
| | 64 (level 1) |
| | 127 (level 2) |
| 3 | 0 (normal) |
| | 42 (level 1) |
| | 84 (level 2) |
| | 127 (level 3) |
| 4 | Etc. |

7. Model and predict the change in elastic load that should be expected from the controlled, responsive asset system. The output from this toolkit function into the overall algorithmic responsibilities of the transactive node (e.g., the "toolkit framework") expects to receive a series of predicted changes in electrical load $\Delta L_n$ for each IST interval n. The process or model by which this prediction is made is somewhat unique for the given asset system and its capabilities. The prediction will be affected by the planned response level (as indicated by the corresponding advisory control signal) and other information used by the model as it makes its prediction.

The following models are expected to be relevant to this toolkit function and are included by reference:

a. Electric tank water heater model. Toolkit function 2.4_Residential Event-Driven Demand Response includes details about trends for electricity consumption by residential electric tank water heaters in the Northwest. There, one will find a lookup file that may be used to predict the average power that may be curtailed by time of day for week days and weekend days. The use of the lookup table should be identical for this function as for the referenced function. Please refer to b. Thermostatic space conditioning dynamic model. Toolkit function 2.4_Residential Event-Driven Demand Response also documents a dynamic state model that may be used to predict the change in energy consumed by buildings based on predicted outdoor temperature, solar insolation, and parameters through which numbers and sizes of buildings, insulation levels, and other building qualities may be represented. The thermostat model tracks a representative building interior temperature that may, in turn, be affected by modeled occupancy set points and by demand-response levels.

Further Alternatives:

There might exist a preferable way to organize toolkit load functions according to (1) the way events are related to the TIS time series and (2) the asset system models. The present organization, in which these two elements have been combined into each toolkit function, is inefficient and uses multiple cross references and duplications.

The means by which TOU periods are specified from the TIS proved, while conceptually easy, to be relatively difficult to describe and specify. This function should be further refined as implementers learn ways to mathematically represent the process that has been described herein.

Subappendix A—Revised High-Level Pseudo Code

While the pseudo code in the function's specification remains largely correct, the interpretation of selecting the event interval having the "maximum average TIS" was open to interpretation. If strictly followed, the algorithm would select only the events having minimum duration. The following general strategy proved useful.

The following general steps were

1. Parse future intervals into their local (not UTC) days. (This cannot be strictly performed because long intervals, which were aligned with UTC time, do not correctly align with midnight local time.)
2. Review the history of the first day using TIS_0 values within the day. Use only the last of the historical relaxation calculations within any 5-minute update interval and discard other relaxation intervals that were overridden. Update the numbers of time-of-use events, ongoing event duration, and total event duration for the day.
3. Calculate average TIS for permutations of contiguous intervals within the first and each remaining day that have an allowed duration.
4. Select the permutation that gives the maximum average TIS.
5. Tentatively state that the new selected interval(s), plus any prior-approved intervals, are part of the day's event(s).
6. Test the set of tentatively engaged intervals. If
   a. Total event duration is not more than the maximum allowed for day,
   b. AND the number of events does not exceed the number allowed for the day, c. AND (the event duration is less than or equal to the minimum OR the selected intervals' average TIS value is greater than or equal to a threshold), d. AND (the number of events fewer than or equal to the minimum count OR the selected intervals' average TIS value is greater than or equal to a threshold), Then include tentative intervals among prior-selected intervals.

7. Select the permutation that gives the next maximum average TIS and go to repeat step 4.

6.3.14 Load Function—Time-of-Use Distribution System Voltage Control (Function 3.5)

Description:

This toolkit load function is similar to Toolkit Function 2.2 Event-Driven Distribution System Voltage Control, except voltage is controlled in this function according to daily on- and off-peak time-of-use periods. ("Time-of-use," as used here is more dynamic than time-of-use demand response is currently practiced. This function dynamically determines appropriate peak and off-peak periods based on the condition of a relatively dynamic incentive signal.) This toolkit function is applicable where voltage is to be controlled at two or more levels according to the value of the TIS and constraints input by utilities and where responses of the asset have been designed to occur according to daily on- and off-peak periods.

During the strategic design of toolkit load functions, it has been observed that the functions that share time-of-use objectives are very similar, and functions that control the same type of asset system are also similar. This present function makes efficient use of this observation and incorporates similar toolkit load function objectives and text by reference.

Block Input/Output Function Model:

Inputs:

Include by reference the list of inputs in Toolkit Load Function 3.4 Residential Time-of-Use Demand Response.

CVRf—[dimensionless fraction]—ratio of relative percentage change in energy that will accompany a relative percentage change in voltage for a circuit or set of circuits. (Default value=0.7) (The CRV factor depends on circuit type and circuit characteristics, but it will often be unknown. A typical default value has been provided based on readily available reports, but a utility may use different and better numbers if they possess better information about their circuits.) In principle, this factor could be different for each feeder, but this formulation will assume that only one factor has been defined for the region. If multiple factors will be employed, the extension of this toolkit function will be straightforward.

$\{\Delta V_1, \Delta V_2, \ldots, \Delta V_l, \ldots \Delta V_L\}$—[dimensionless fraction]—fractional change in nominal system voltage enacted under each response level l. These changes in voltage will normally be negative, meaning the voltage will have been decreased below its nominal set point.

$\{P_0, P_1, \ldots, P_n, \ldots, P_{N-1}\}$—[kW]—predicted average nominal load during each $IST_n$ interval for the entire region in which the distribution voltage is being controlled. The prediction is for the nominal condition $No_{minal}$, which may be, but is not necessarily, when ΔV is equal to zero. (What is desirable here is to capture the percentage changes in voltage that will occur during various transactive-control response levels. It does not especially matter whether the nominal voltage is already lowered at all times ("nominal") for conservation purposes.) It will be presumed that Toolkit Load Function 1.0 Bulk Inelastic Load has been employed at this transactive node to predict the load for this region that is affected by distribution load control. Electrical load is normally formulated with a negative sign.

Interim Calculation Products:

Same.

Outputs:

Same.

Pseudo Code Implementation:

1. Establish/update the statistical distribution of historical $TIS_0$ values.
2. Update incentive thresholds for this system of assets.
3. Calculate averaged TIS values from the thresholds and statistical information.
4. Determine TOU event periods for this system of assets.
5. Specify the prioritization of response levels.
6. Update the advisory control signal time series for this system of assets.
7. Model and predict the change in elastic load that should be expected from the controlled, responsive asset system. The output from this toolkit function into the overall algorithmic responsibilities of the transactive node (e.g., the "toolkit framework") expects to receive a series of predicted changes in electrical load $\Delta L_n$ for each IST interval n.

The predicted change in electrical load $\Delta L_n$ for this toolkit load function is strongly influenced by the conservation voltage reduction factor CVRf. This factor is usually known imprecisely, so one may rely upon a default value.

The change in elastic load is zero until a TOU event occurs. During IST intervals n*, during which a TOU response period is planned for level l, the change in elastic load is predicted by equation 1. (CRVf is normally calculated from energy savings. Some might debate the way it has been applied in equation 1 to individual intervals. The factor is not perfectly applicable to short intervals, where immediate changes in load might not be representative of long-term changes in energy consumption. For this reason, the prediction from equation 1 might be somewhat conservatively made for very short intervals. The effect is probably small.)

$$\Delta L_{n*,l} = \mathrm{CVRf} \cdot \Delta V_l \cdot P_{n*} \quad (1)$$

n*—[dimensionless index]—index of those $IST_n$ intervals during which a TOU period is active at response level l.

$\Delta L_{n*,l}$—[kW]—change in elastic load that has been induced by operating at response level l during IST interval n. $\Delta L_{n,l}$ is equal to zero for n≠n*. The sign of $\Delta L_{n*,l}$ should be positive where voltage has been reduced, thus reducing energy consumption and making more energy available to the region.

$\Delta V_l$—[dimensionless fraction]—fractional change in system voltage enacted by the utility under response level l.

$P_{n*}$[kW]—predicted average power that would have been consumed during this IST interval n* if no TOU event were planned in this region of the distribution circuit.

6.3.15 Load Function—Time-of-Use Distribution System Voltage Control with Load Shedding Effect (Function 3.51)

Description:

This toolkit load function is based on Load Toolkit Function 3.5 Time-of-Use Distribution System Voltage Control, but includes the effect of concurrent shedding of customer loads (e.g. water heaters, thermostatic space conditioning, etc.) that use augmented conservation regulation. For example, this function should be used by Milton-Freewater's test case MF-02-1.2, in which time-of-use voltage reduction both earns conservation from circuit loads and triggers Grid Friendly™ water heaters to turn off.

This function relies on the approach that was formulated in toolkit functions 3.4 Residential Time-of-Use Demand Response and 3.5 Time-of-Use Distribution System Voltage Control.

Block Input/Output Function Model:

Inputs:

Include by reference the list of inputs in Load Toolkit Function 3.4 Residential Time-of-Use Demand Response.

CVRf—[dimensionless number].

$\{\Delta V_1, \Delta V_2, \ldots, \Delta V_l, \ldots, \Delta V_L\}$—[dimensionless number].

$\{P_0, P_1, \ldots, P_n, \ldots, P_{N-1}\}$—[kW].

Interim Calculation Products:

Same.

Outputs:

Same.

Pseudo Code Implementation:

1. Establish/update the statistical distribution of historical $TIS_0$ values.
2. Update incentive thresholds for this system of assets.
3. Calculate averaged TIS values from the thresholds and statistical information.
4. Determine TOU event periods for this system of assets.
5. Specify the prioritization of response levels.
6. Update the advisory control signal time series for this Time-of-Use Distribution System Voltage Control asset system.
7. Model and predict the change in elastic load that should be expected from the Time-of-Use Distribution System Voltage Control asset system. The overall algorithmic framework of the transactive node (the "toolkit framework") expects to receive a series of predicted changes in electrical load $\Delta L_n$ for each IST interval n.

The predicted change in electrical load $\Delta L_n$ for this toolkit load function is strongly influenced by the conservation voltage reduction factor CVRf, which in turn is dependent on the electrical characteristics of the system and varies with the system load. This factor is usually known imprecisely, so one rely upon a default value.

The change in elastic load is zero until a TOU event occurs. During IST intervals n*, during which a TOU response period is planned for level l, the change in elastic load is predicted by equation 1. (CRVf is normally calculated from energy savings. Some might debate the way it has been applied in equation 1 to individual intervals. The factor is not perfectly applicable to short intervals, where immediate changes in load might not be representative of long-term changes in energy consumption. For this reason, the prediction from equation 1 might be somewhat conservatively made for very short intervals. The effect is probably small.) (Subtracting $\Delta L_{load\_n*}$ from $P_{n*}$ changes the load-dependent CVRf factor. Given the limitation of the project participants to precisely determine CVRf, the interdependency between $P_n$ and CVRf is disregarded in equation 1.)

$$\Delta L_{n*,l}=\text{CVRf}\cdot\Delta V_l\cdot(P_{n*}-\Delta L_{load\_n*})+\Delta L_{load\_n*} \quad (1)$$

n*—[dimensionless index]—index of those $IST_n$ intervals during which a TOU period is active at response level l.

$\Delta L_{n*,l}$—[kW]—change in elastic load that has been induced by reducing voltage at response level l during IST interval n. $\Delta L_{n,l}$ is equal to zero for n≠n*. The sign of $\Delta L_{n*,l}$ should be positive where voltage has been reduced, thus reducing energy consumption and making more energy available to the region.

$\Delta V_l$—[dimensionless fraction]—fractional change in system voltage enacted by the utility under response level l.

$P_{n*}$—[kW]—predicted average power that would have been consumed during this IST interval n* if no voltage control or load shedding event were planned in this region of the distribution circuit.

$\Delta L_{load\_n*}$—[kW]—average change in power caused by the elastic behavior of customer loads in the region, where TOU voltage control is being applied, during IST interval n. $\Delta L_{load\_n}$ is equal to zero for n≠n*. The sign of $\Delta L_{load\_n*}$ should be positive where voltage has been reduced, and is computed as shown elsewhere in this application.

Example

CVRf=1 on average for a given utility feeder.

L=1 and $\Delta V_1$=3%=0.03.

$IST_0$=midnight; TOU event scheduled to start at 7 a.m. ($IST_{33}$) and end at 10 a.m. ($IST_{36}$).

$P_n$ is known as shown in FIG. 1 below. $P_{33}$=9118 kW, $P_34$=9260 kW, and $P_{35}$=8812 kW.

During TOU event, 1000 water heaters will be triggered to turn off. For example, $\Delta L_{load\_33}$=1000×mean(0.817, 0.785, 0.738, 0.713) kW=763 kW, $\Delta L_{load\_34}$=1000×mean(0.716, 0.687, 0.672, 0.636) kW=678 kW, and $\Delta L_{load\_35}$=1000×mean(0.615, 0.584, 0.563, 0.518) kW=570 kW.

Applying equation (1) above, $\Delta L_{33}$=1×0.03×(9118−763)+763 kW=1014 kW, $\Delta L_34$=1×0.03×(9260-678)+678 kW=935 kW, and $\Delta L_{35}$=1×0.03×(8812−570)+570 kW=817 kW.

Figure 88:
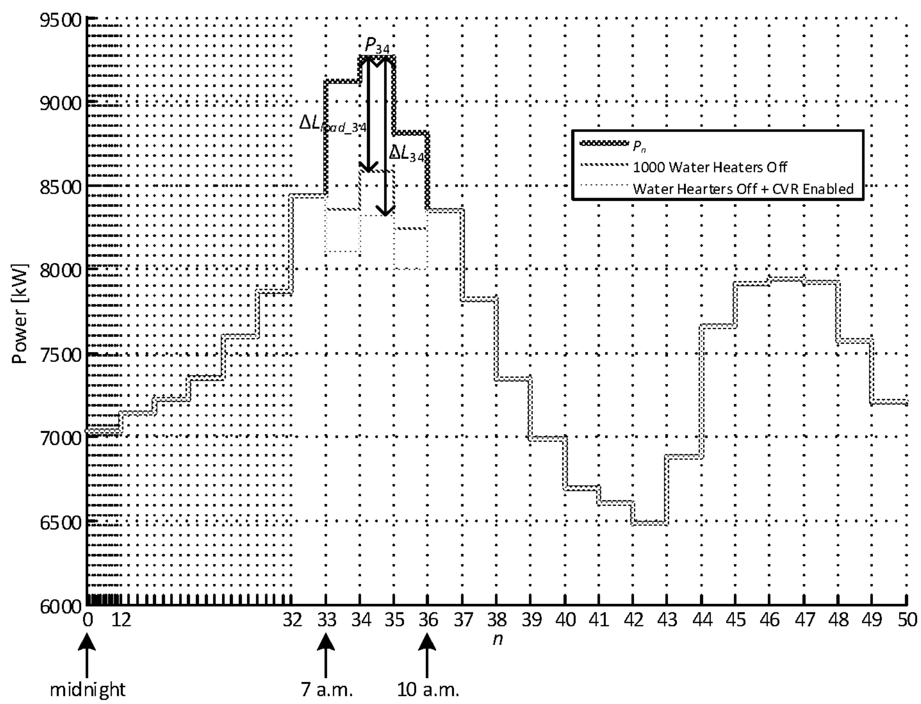
FIG. 88 is an illustration of TOU voltage control concurrent with shedding water heaters.

FIG. 88 is an illustration 8800 of TOU voltage control concurrent with shedding water heaters.

6.3.16 Load Function—Non-Renewal Generation Time-of-Use Demand Response (Function 3.7)

Description:

This function predicts the response from a non-renewable distributed generator demand-response system that will respond approximately daily to help mitigate peak conditions that are evident in an incentive signal. The peak period will be based on response constraints and the TIS incentive signal. (Note that this approach is more dynamic than typical time-of-use (TOU) demand response, in which daily peak and off-peak intervals remain immutable. The peak and off-peak periods recommended by this function may be assigned differently each day according to events that will have affected the predicted TIS incentive signals.) This function relies on the approach that was formulated in toolkit function 3.4 Residential Time-of-Use Demand Response.

A first objective of this function is to establish the time periods during which the response level(s) should occur, based upon the numbers and durations and preferred durations of these periods that are permitted for each response level. The daily events and their durations are positioned to best align with the levels of the TIS incentive signal that has been predicted for the day.

The function should then predict the change in load that will result from these events. Specifically, what additional energy will be generated at each prescribed response level.

Block Input/Output Function Model:

Inputs:

m—[power per time: kW/minute]—maximum allowed linear rate of change in generated power. This value may at times limit the rate at which control changes are permitted and may thereby modify the generation power predictions. This is a strictly positive number. Default: 100 MW/minute (e.g., an essentially infinite rate of change is allowed by default).

L—[dimensionless count]—Default: 1.

$\{Threshold_1, Threshold_2, \ldots, Threshold_l, \ldots, Threshold_L\}$—[dimensionless fraction]. (Default=$\{1/(L+1), 2/(L+1), \ldots, l/(L+1), \ldots, L/(L+1)\}$)

$\{D_{min,week\ day,l}, D_{min,weekend\ day,l}, D_{min,holiday,l}\}$—[time: minutes].

$\{N_{min,week\ day,l}, N_{min,weekend\ day,l}, N_{min,holiday,l}\}$—[dimensionless count].

$\{N_{max,week\ day,l}, N_{max,weekend\ day,l}, N_{max,holiday,l}\}$—[dimensionless count].

$\{D_{max,week\ day,l}, D_{max,weekend\ day,l}, D_{max,holiday,l}, D_{max\ event,l}\}$—[time duration: minutes].

$\{TIS_0(t), TIS_0(t-5), \ldots, TIS_0(t-5k)\}$—[\$/kWh].

$\{TIS_0, TIS_1, \ldots, TIS_{K-1}\}$—[\$/kWh].

$\{P_{weekday}(0), P_{weekday}(1), \ldots, P_{weekday}(h), P_{weekday}(23)\}$—[power: kW]—typical baseline power that is generated during UTC hour h of a weekday day type by this distributed generation resource. Additional inputs may be used in implementations that anticipate more day types other than weekdays and weekend days. Default: {0, 0, . . . }.

$\{P_{weekend}(0), P_{weekend}(1), \ldots, P_{weekend}(h), P_{weekend}(23)\}$—[kW]—typical baseline power that is generated during hour h of a weekend day by this distributed generation resource. Default: {0, 0, . . . }.

$\{\Delta P_1, \Delta P_2, \ldots, \Delta P_L\}$—[power: kW]—Change in generation that may be anticipated at each of the L response levels, with respect to inelastic load. It is presumed that the opportunity to generate at each level may be assigned as a constant regardless of hour of day. This list may be updated seasonally for cogeneration plants that may be affected by changes in seasonal thermal heating loads.

Interim Calculation Products:

$\{DIST(TIS_{0,min}), DIST(TIS_{0,min}+\Delta\$), \ldots, DIST(TIS_{0,b}), \ldots\}$—[dimensionless].

$\{\phi(TIS_{0,1}), \phi(TIS_{0,2}), \ldots, \phi(TIS_{0,b}), \ldots, \phi(TIS_{0,B})\}$—[dimensionless fraction].

Outputs:

$\{L_0, L_1, \ldots, L_{K-1}\}$—[kW]—inelastic load (generation) from these generators. The generated power that is predicted to occur at response level 0 (e.g., no response) during each of the K IST intervals. (This baseline series will normally become reported as inelastic load. Caution should be used that its impact is not double-counted. Also, it should be assumed that none of the transitions during typical operations will be permitted to exceed the allowed rate of change.)

$\{ACS_0, ACS_1, \ldots, ACS_{K-1}\}$—[dimensionless].

$\{\Delta L_0, \Delta L_1, \ldots, \Delta L_{K-1}\}$—[kW].

Pseudo Code Implementation:

1. Establish/update the statistical distribution of historical $TIS_0$ values.
2. Update incentive thresholds for this system of assets.
3. Calculate averaged TIS values from the thresholds and statistical information.
4. Determine TOU event periods for this system of assets.
5. Specify the prioritization of response levels.
6. Update the advisory control signal time series for this system of assets.
7. Model and predict the inelastic load and the change in elastic load that should be expected from the controlled, responsive asset system.
   a. Inelastic Load—Case where no limit is imposed on rate of change (essentially infinite rate of change)
   The inelastic load (generation) from the distributed generator assets is the generated power that is expected to occur if the generators were unaffected by transactive control and operated normally, not in any response level. If there is no limit imposed on the rate that generation can occur, then the inelastic load is predicted simply from the hourly generation profiles for each day type, which are inputs to this toolkit function. Two day types—weekday and weekend (including holidays)—are defined, but the rule of equation 1 should be formulated for each day type that is being modeled for the given IST interval k.

$$L_k = \begin{cases} P_{weekday}(h) \text{ or } P_{weekend}(h), & \text{if } [IST_k, IST_{k+1}) \subseteq [h:00, h+1:00) \\ \text{mean}(P_{weekday}(h^*), P_{weekend}(h^*)), & \text{if } [h^*:00, h^*+1:00) \subset [IST_k, IST_{k+1}) \end{cases} \quad (1)$$

$L_k$—[average power: kW]—inelastic load (generation) during interval $[IST_k, IST_{k+1})$. Default; 0.00 kW.

$P_{weekday}(h)$—[average power: kW]—typical weekday power generated by this resource during hour h.

h—[hour]—UTC clock hour at which an hour-long interval starts. The notation h* has been used to refer to a set of hours that initiate hour-long intervals that are a subset of an IST interval. The hour-long interval starting at h has been shown as [h:00,h+1:00).

b. Elastic Load—Case where no limit is imposed on rate of change
   Elastic load is the predicted change in generation when compared to the unaffected inelastic load prediction. In the case where no limit has been imposed on the rate of change in generation, the magnitudes of these changes are found by simply allocating the $\Delta P_l$ input values to the IST intervals having the corresponding response level l as shown in equation 2.

$$\Delta L_k = \begin{cases} \Delta P_l, & \text{if } ACS_k = ACS_l \\ 0, & \text{otherwise} \end{cases} \quad (2)$$

$\Delta L_k$—[average power: kW]—change in power (generation)—the elastic load expected during the interval that begins at $IST_k$.

$\Delta P_l$—[average power: kW]—the change in power (generation) expected at times that the modeled distributed generator resource is in its response level l.

$ACS_k$—Advisory control signal that has been assigned by this function during the interval that starts at $IST_k$.

$ACS_l$—Advisory control signal that has been assigned if the modeled generator is to be at its response level l.

c. Inelastic and Elastic Load where a limit has been imposed on the rate of change of generated power. In the case where the rate of change of generated electric power is to be constrained, this function should keep track of the power generated at the beginning of each interval. This attainable power for the interval boundaries are at times modified by the allowed rate of change m as shown in equation 3 and FIG. 1. These are additional steps to be taken after equations 1 and 2. The power at $IST_{k+1}$ is predicted from the power at $IST_k$ and the allowed rate of change in generated power m. (This formulation and equation 3 have a minor challenge for the determination of $p_0$, the power at time $IST_0$. This value should either be determined by current measurement, or it should be inferred from the prior calculation that was conducted during a prior update interval. This implies a desire for the parameter to be stored from one iteration to the next (e.g., the value $p_1$ from five minutes ago is now the best estimate of $p_0$; each of these values refer to the same IST time value).)

$$p_{k+1} = \begin{cases} \min(p_k + m\cdot(IST_{k+1} - IST_k), L_k + \Delta L'_k), & \text{if } L_k + \Delta L'_k \geq p_k \\ \max(p_k - m\cdot(IST_{k+1} - IST_k), L_k + \Delta L'_k), & \text{if } L_k + \Delta L'_k < p_k \end{cases} \quad (3)$$

$p_k$—[power: kW]—generated power at beginning of interval $IST_k$.

m—[power per time: kW/minute]—allowed rate of change in generated power. This formulation assumes the same restrictions apply for both ramping up and down.

$L_k$—[average interval power: kW]—inelastic load during interval $IST_k$ as was calculated in equation 1 above.

$\Delta L'_k$—[average interval power: kW]—elastic load during interval $IST_k$ as was first calculated in equation 2 above.

Figure 89:
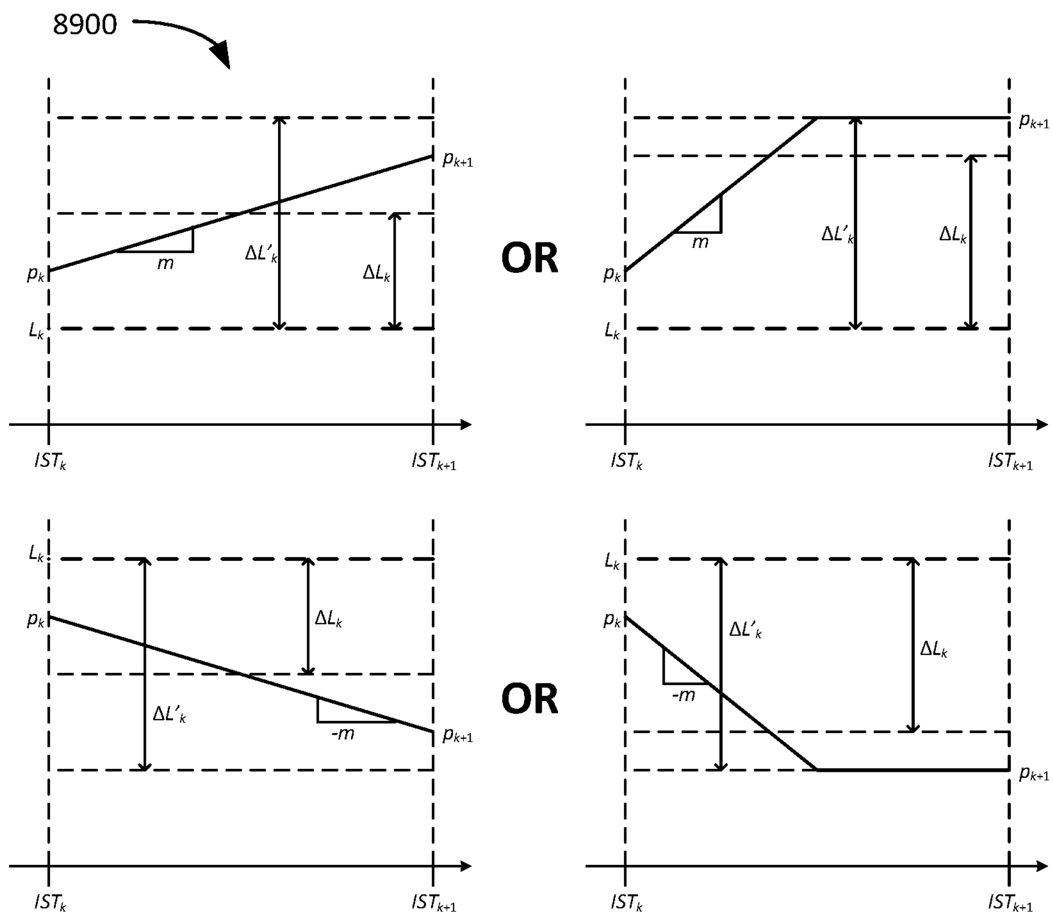
FIG. 89 is a series of plots that show possible scenarios for changes in generation during one interval.

FIG. 89 is a series 8900 of plots that show possible scenarios for changes in generation during one interval. The average elastic load $\Delta L_k$ for the interval that starts at $IST_k$ is then recalculated using the powers $p_k$ and $p_{k+1}$ at the intervals boundaries as shown in equation 4.

$$\Delta L_k = \quad (4)$$

$$\begin{cases} \dfrac{p_{k+1}\cdot\left(IST_{k+1} - IST_k - \dfrac{p_{k+1} - p_k}{m}\right) + \dfrac{p_{k+1}^2 - p_k^2}{2\cdot m}}{IST_{k+1} - IST_k} - L_k, & \text{if } p_{k+1} \geq p_k \text{ and } p_{k+1} = L_k + \Delta L'_k \\ \dfrac{p_{k+1}\cdot\left(IST_{k+1} - IST_k - \dfrac{p_k - p_{k+1}}{m}\right) + \dfrac{p_k^2 - p_{k+1}^2}{2\cdot m}}{IST_{k+1} - IST_k} - L_k, & \text{if } p_k \geq p_k \text{ and } p_{k+1} = L_k + \Delta L'_k \\ \dfrac{p_k + p_{k+1}}{2} - L_k, & \text{otherwise} \end{cases}$$

Steps 2-7 (and perhaps 1, too) should be iterated each update interval.

Further Alternatives:

1. This function has its event times invoked by relative TIS values. For some future DG systems, there costs of operation will be more completely modeled, and the boundaries between time-of-use events will be based on absolute thresholds of the TIS signal. Additional operational inputs like actual steam load and price of fuel would be used by these future improvements to this function.

6.3.17 Incentive Function—General Infrastructure Cost (Function 4.0)

Description:

Where transactive control is applied at the device level, each device would have the opportunity to inject the impact of hardware costs (e.g., its infrastructure costs). However, where transactive control has been applied to large aggregate regions, the owner of the large aggregate transactive node may be unable or unwilling to accurately represent the impact of infrastructure costs on the delivered cost of energy. The purpose of this function, therefore, is to represent the influence of bulk infrastructure costs on the delivered cost of electrical energy where it might be impracticable to track the costs of individual infrastructure components.

The effect of this function should be to apply an offset to the calculation of the delivered cost of energy (e.g., the transactive incentive signal (TIS)). It is assumed by this function that the difference between the sum of existing resource costs and incentives, which are otherwise already represented in the TIS, and an accepted delivered cost of energy is attributable to infrastructure costs. (This assumption may be somewhat imperfect due to profit, labor costs, taxes and other impacts.)

This toolkit function may be applied at any of the transactive nodes, but it is desirable that transmission zone transactive nodes use this function to represent the bulk impact of generation and transmission infrastructure costs that might not have otherwise been included.

Negative $C_I$ parameter outputs are to be disallowed in order to halt most occurrences of negative calculated TIS in the system.

Block Input/Output Function Model:

Inputs:

$TIS_0(n)$—[cost/energy: default: \$/kWh]—(series of real floating)—time series of the transactive control signal (TIS) at interval start time zero ($IST_0$) at each of a series of update intervals n. (The update interval may be 5 minutes. In certain embodiments, a TIS is calculated and transmitted at least once by this transactive node at each update interval. Of the interval values within each TIS, only the first, $TIS_0$, that refers to the nearest 5-minute interval is to be used by this function.)

$TIS_{avg}$—[cost/energy: default: $/kWh]—(real floating scalar)—typical, or long-term average, value of $TIS_0(n)$. This value should be observed from or analyzed from calculated TIS values at this transactive node. This value is used only during initialization of the infrastructure cost parameter $C_I$. The default value $0.04/kWh may be used, but doing so may introduce an initialization error that can take months to fully eliminate.

$TIS_{target}$—[cost/energy: default: $/kWh]—(real floating scalar)—accepted reference baseline for what the long-term delivered average cost of energy (e.g., the TIS) should be at this transactive node. In some cases, acceptable target TIS values have been found among energy supply costs in utilities' annual reports. Alternatively, the lowest customer costs that a utility passes along to its customers, too, might be an acceptable surrogate for the target TIS. Default: $0.05/kWh.

$\Sigma P_G$—[power: default: kW]—(real floating scalar)—long-term average of the sum of power imported into and generated within the boundaries of this transactive node. This parameter is a long-term average of the denominator of the Update TIS framework function. This parameter is mostly static, but it may be updated quarterly or yearly by the owner of the transactive node. This parameter affects that rate at which the function's proportional controller tracks the infrastructure cost parameter $C_I$. The accuracy of this parameter is not critical. The default value 1 GW should be used only as a last resort for this parameter. This default value will virtually disable this function for most transactive nodes so that the infrastructure cost will not be tracked.

$\alpha$—[dimensionless]—(real floating scalar)—factor used in the proportional controller to affect the rate at which the infrastructure cost parameter should track the TIS. Default value: 0.0001, assuming that updates occur every 5 minutes.

Outputs:

$C_I$—[cost/time: default units: $/h]—Parameter defined and used in Transactive Node and Toolkit Functions and Transactive Control System Data Collection. Time series of cost per time duration to be applied at defined future time intervals. In this function, this output is a correction that approximates the amortized costs of infrastructure over time. A remedial action was initiated to disallow this output parameter from becoming negative.

Pseudo Code Implementation:

(1) Initialize the infrastructure cost parameter $C_I$ for this transactive node. Because this function relies on an extremely slow, low-pass feedback loop, it is strongly recommended that the function's infrastructure cost parameter $C_I$ be initialized to a reasonable value. If this step is not performed, the function will eventually identify an acceptable offset that represents infrastructure costs, but it will slowly and asymptotically approach the offset over multiple months. The formulation and details of this initialization may be found in SubAppendix A.

Assign the initial value to the infrastructure cost parameter as shown in Equation 1.

$$C_I=(TIS_{target}-TIS_{avg})\cdot\Sigma P_G \tag{1}$$

(2) Replicate the initialized or updated infrastructure cost parameter into the elements of the series of values expected by the toolkit framework and publish the new series to the toolkit framework.

For k=0 to K, where K=56 for certain embodiments.

Set $C_I(k)=C_I$

Next k

Publish $\{C_I(0), C_I(1), \ldots, C_I(K)\}$ to this transactive node's toolkit framework for this function.

(3) After an update interval (e.g. every 5 minutes), update the calculated infrastructure cost based on the target TIS, actual recent $TIS_0$, typical sum of imported and generated power, and parameter $\alpha$. Equation (2) can be modified to disallow negative $C_I$ output parameters.

$$C_{I,n}=\text{maximum}(0,C_{I,n-1}+\alpha\neq(TIS_{target}-TIS_{0,n-1})\cdot\Sigma P_G) \tag{2}$$

(4) Loop back to step (2).

Subappendix A: Details about Initializing and Updating Infrastructure Cost Parameter $C_I$ This appendix takes one through formulations on which the initialization and updating of the infrastructure cost parameter $C_I$ output of this function is based.

Refer to the framework function by which the TIS for an interval is calculated at a transactive node, copied here as Equation A1. The numerator is a total cost, and the denominator is the sum of electrical energy that is imported into or generated within this transactive node during interval n. The resulting division yields a unit cost of energy, the TIS, which represents the delivered cost of energy at this location in the system.

$$TIS_n=\frac{\sum_{a=1}^{A}C_{E,a,n}\cdot\hat{P}_{G,a,n}\cdot\Delta t_n+\sum_{b=1}^{B}C_{C,b,n}\cdot\hat{P}_{C,b,n}+\sum_{c=1}^{C}C_{I,c,n}\cdot\Delta t_n+\sum_{d=1}^{D}C_{O,d,n}}{\sum_{a=1}^{A}\hat{P}_{G,a,n}\cdot\Delta t_n} \tag{A1}$$

We assume that the costs in the numerator prior to applying this function can be lumped together as shown in Equation A2. These costs will neither affect nor be affected by this formulation.

$$TIS_n^{old}=\frac{Cost_n^{old}}{\sum_{a=1}^{A}\hat{P}_{G,a,n}\cdot\Delta t_n} \tag{A2}$$

A term is added to both sides of Equation A2 to represent an infrastructure cost offset that had not been represented in the prior formulation. See Equation A3. The new $TIS_{target}$ may be thought of a corrected version of the TIS and may be independently assigned based on long-term-average energy supply costs or other representations of the delivered cost of energy at this system location. An infrastructure term $C_I$ was selected for this function because the new infrastructure costs will be modeled as being amortized evenly over time.

$$TIS_{target} = TIS_n^{old} + \text{Infrastructure Cost Offset} = \frac{Cost_n^{old} + C_I \cdot \Delta t}{\sum_{a=1}^{A} \hat{P}_{G,a,n} \cdot \Delta t_n} \quad (A3)$$

Equation A4 is found by subtracting Equation A2 from Equation A3. Equation A4 states a relationship between the independent reference $TIS_{target}$, calculated TIS values, the new infrastructure cost parameter $C_I$, and the sum of imported and generated power at this transactive node.

$$TIS_{target} - TIS_n^{old} = \text{Infrastructure Cost Offset} = \frac{C_I}{\sum_{a=1}^{A} \hat{P}_{G,a,n}} \quad (A4)$$

We rearrange Equation A4 to solve for the new infrastructure cost parameter, as shown in Equation A5.

$$C_I = (TIS_{target} - TIS_n^{old}) \cdot \sum_{a=1}^{A} \hat{P}_{G,a,n} \quad (A5)$$

Equation A5 gives us insights about how to initialize the infrastructure cost parameter: Because the infrastructure cost parameter and target TIS are relatively constant, they should be compared to long-term averaged representations of the old TIS and sum of imported and generated power. Ideally, this node would be allowed to operate for months before this function is implemented so that these "typical" values could be learned. Realistically, one may have little or no prior TIS and power values to average. Some off-line analysis can be performed. Regardless, any errors during initialization will eventually be erased by the operation of the function's proportional controller.

$$C_I = (TIS_{target} - TIS_n^{old}) \cdot \sum_{a=1}^{A} \hat{P}_{G,a,avg} \quad (A6)$$

Equation A5 is also the basis for the formulation of a proportional controller by which the estimated value of $C_I$ may be gradually improved. Equation A7 suggests how $C_I$ may be updated from a prior version of itself and an approximation of the value from Equation A5. This is also illustrated in diagram 9000 of FIG. 90. The new parameter α determines the weight of the proportional controller and, therefore, the rate of convergence. If the time between update intervals n−1 and n is 5 minutes, then setting α=0.0001 will ensure a response time near a month, which is about right for the tracking of infrastructure costs. Because $C_I$ varies extremely slowly, even longer update intervals (and correspondingly revised α) may be selected by implementers of this function.

Equation A7 can be modified to disallow negative $C_I$ output parameter.

$$C_{I,n} = \text{maximum}\left(0,\ C_{I,n-1} + \alpha \cdot (TIS_{target} - TIS_{n-1}^{old}) \cdot \sum_{a=1}^{A} \hat{P}_{G,a,avg}\right) \quad (A7)$$

It is presumed that recent calculations of the TIS (e.g., $TIS_{n-1}$) will be available to this function at this node. However, it is recommended that the constant, "typical," value for the sum of imported and generated power should be used because access to this sum may not be readily available and is not warranted by the precision used by this function.

Figure 90:
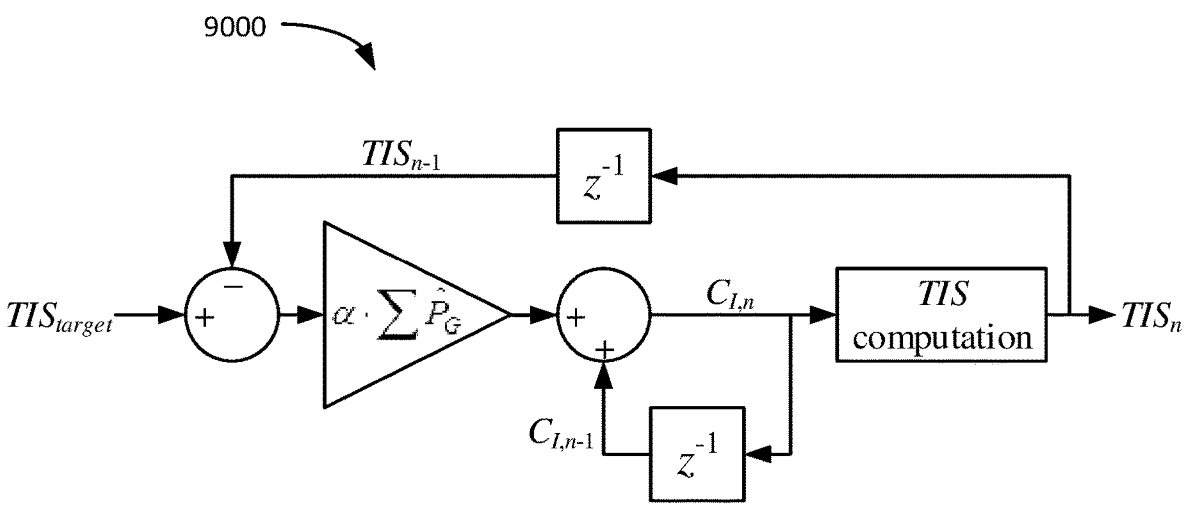
FIG. 90 is an infrastructure cost control diagram.
Figure 91:
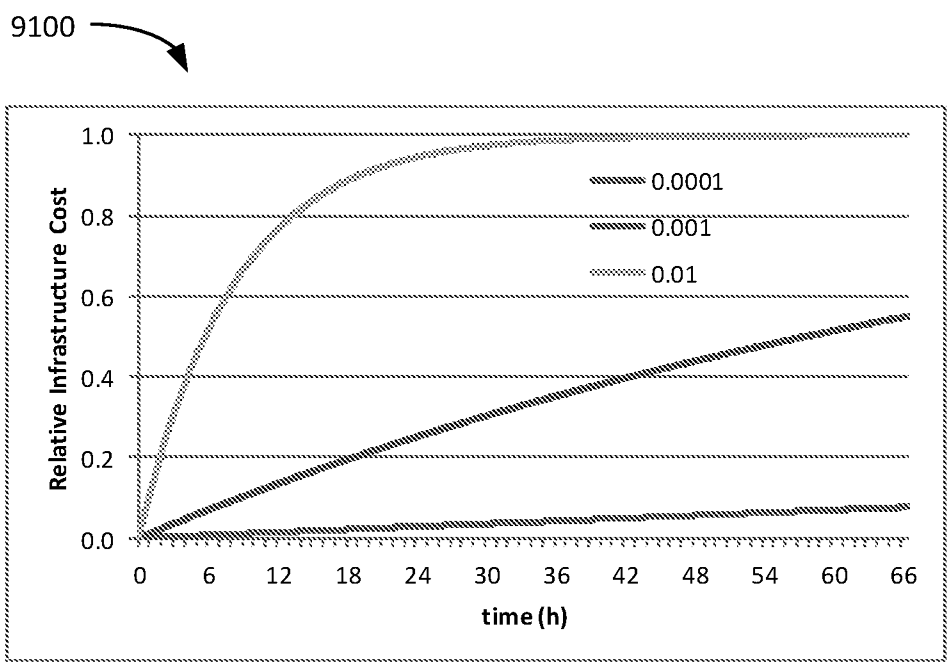
FIG. 91 shows a graph illustrating the improvement of uninitialized infrastructure cost estimate for different $\alpha$ parameter selections assuming 5-minute update intervals.
Figure 92:
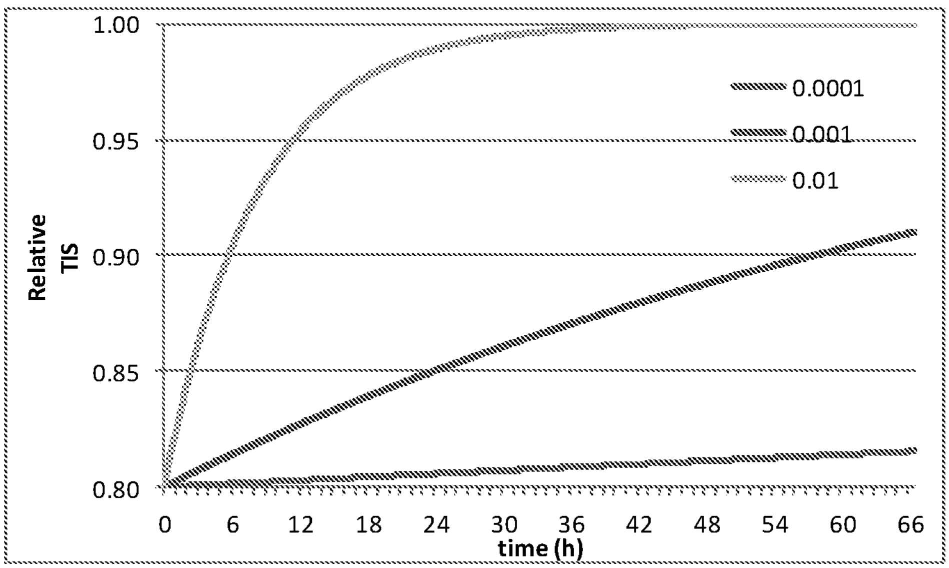
FIG. 92 shows a graph illustrating the uninitialized correction of TIS over time for different $\alpha$ parameter selections assuming 5-minute update intervals.

FIG. 90 is a diagram 9000 illustrating an infrastructure cost control diagram FIG. 91 and FIG. 92 show examples of how the infrastructure cost estimate and TIS improve over time for different α parameter values using the iterative approach of Equation A7 at 5-minute intervals. In particular, FIG. 91 shows a graph 9110 illustrating the improvement of uninitialized infrastructure cost estimate for different α parameter selections assuming 5-minute update intervals. FIG. 92 shows a graph 9120 illustrating the uninitialized correction of TIS over time for different α parameter selections assuming 5-minute update intervals. In this instance, the TIS was 80% of the Target TIS at the time this function is activated.

6.3.18 Load Function—Battery Storage—Real-Time (Function 4.1)

Description:

This function is applicable to battery storage systems that respond very dynamically to the TIS and other local conditions and provide also a continuum of charge and discharge levels. (If the battery system has only a few levels of response available to it (e.g. full charge, full discharge, and inactive) then the implementer should select a time-of-use function to model the battery system's behavior.) The function will recommend the appropriate charge and discharge rate based on the system's power capacity, state-of-charge, and historical and predicted incentive signals. The implementer is able to limit the responsiveness of his system using additional preferences.

All of the load or generation by a battery system is considered elastic; none is inelastic.

An assumption is made in this present formulation that battery system inefficiency (e.g., losses and auxiliary loads) may be ignored.

Block Input/Output Function Model:

Inputs:

- $\{IST_0, IST_1, \ldots, IST_n, \ldots, IST_N\}$—[UTC time]—current interval start time (IST) time series.
- $\{TIS_0, TIS_1, \ldots, TIS_n, \ldots, TIS_{N-1}\}$—[\$/kWh]—transactive incentive signal (TIS) time series. Time series of predicted incentives.
- $SOC_{-1}$—[kWh]—present state of battery charge just prior to the prediction intervals of the current IST time series. This is the known starting point from which battery charge should be managed.
- $SOC_{max}$—[kWh]—maximum state of charge that will be allowed for this battery. This function will assume this constraint is constant over time.
- $SOC_{min}$—[kWh]—minimum state of charge that will be allowed for this battery. This function will assume this constraint is constant over time.
- E—[kWh]—total battery energy capacity.
- $P_c$—[kW]—nameplate rating for the rate at which the battery system may be charged. This function will assume this constraint is constant over time.
- $P_d$—[kW]—nameplate rating for the rate at which the battery system may be discharged. This function will assume this constraint is constant over time.

Interim Calculation Products:

$\{\Delta t_0, \Delta t_1, \ldots, \Delta t_n, \ldots, \Delta t_{N-1}\}$—[time: minutes]—duration of each IST interval in the current IST time series.

$\{SOC_0, SOC_1, \ldots SOC_n, \ldots, SOC_{N-1}\}$—[%]—predicted state of battery charge at the end of each IST interval using the predicted charge and discharge profile.

Outputs:

$\{\Delta L_1, \Delta L_2, \ldots, \Delta L_n, \ldots, \Delta L_{N-1}\}$—[kW]—predicted change in elastic load for each IST interval.

$\{S_1, S_2, \ldots, S_n, \ldots, S_{N-1}\}$—[dimensionless]—advisory output signal to the battery system.

Pseudo Code Implementation:

1. Predict the power to be consumed or generated during each current IST interval (e.g., its elastic load prediction).

Define state relationships for the battery system as in equations 1 through 5. The batteries' state of charge at the end of intervals n are its states x.

$$x = \begin{bmatrix} x_0 \\ x_1 \\ \ldots \\ x_{N-1} \end{bmatrix} \equiv \begin{bmatrix} SOC_0 \\ SOC_1 \\ \ldots \\ SOC_{N-1} \end{bmatrix} \quad (1)$$

The change in state Δx is equivalent to the rate of battery charge or discharge during the corresponding interval, which incidentally is also the change in elastic load ΔL for the interval. (If the change in state of charge Δx is negative, this means that the battery system should have discharged some of its energy during the interval. The corresponding change in load ΔL should reduce the apparent load at this location much as would happen if load were curtailed. Ultimately, the correctness of the sign convention will depend on how the outputs of this function are to be used. If load is a generally a positive quantity, then charging of a battery is a positive load, and discharging is a negative load. This discussion contradicts the sign convention shown in Equation 2, in which a negative load sign convention is used.) The change in elastic load ΔL is an important output from this function that is expected by the Toolkit Framework.

$$\Delta x = \begin{bmatrix} \Delta x_0 \\ \Delta x_1 \\ \ldots \\ \Delta x_{N-1} \end{bmatrix} \equiv \begin{bmatrix} -\Delta L_0 \\ -\Delta L_1 \\ \ldots \\ -\Delta L_{N-1} \end{bmatrix} \quad (2)$$

Difference equation 3 is the state relationship to which this physical system should adhere.

$$\Delta x = A \cdot x + b \quad (3)$$

where $$A \equiv \begin{bmatrix} \frac{1}{\Delta t_0} & 0 & \ldots & 0 \\ \frac{-1}{\Delta t_1} & \frac{1}{\Delta t_1} & \ldots & 0 \\ \ldots & \ldots & \ldots & \ldots \\ 0 & \ldots & \frac{-1}{\Delta t_{N-1}} & \frac{1}{\Delta t_{N-1}} \end{bmatrix} \quad (4)$$

and $$b \equiv \begin{bmatrix} \frac{-SOC_{-1}}{\Delta t_0} \\ 0 \\ \ldots \\ 0 \end{bmatrix}. \quad (5)$$

One important constraint is that the rate of charge or discharge in each interval n should be bounded by the physical capabilities of the conversion equipment. The bounds are the physical nameplate ratings of the conversion equipment.

$$P_c \le \Delta x_n \le P_d \quad (6)$$

The state of charge itself is often constrained at each interval to lie within prescribed boundaries. Only a fraction of a battery system's total energy capacity may be available to use.

$$SOC_{min} \le x_n \le SOC_{max} \quad (7)$$

The augmented cost function is the sum of incentive costs received (and paid) at times that the battery system is being charged or discharged. One strives to maximize this cost function. Doing so would mean that the battery system is doing its best to charge while incentives are low and discharge while incentives are high in a way that will maximize its overall incentive.

$$J = f_0(x, \Delta t, \mathrm{TIS}) + f_1(x) + f_2(x), \quad (8)$$

where $f_0$ is the main economic incentive to be maximized over the duration that a TIS signal has been defined.

$$f_0 = -\sum_{n=0}^{N-1} \Delta x_n \cdot TIS_n \cdot \Delta t_n = -\sum_{n=0}^{N-1} \sum_{m=0}^{M-1} (a_{n,m} \cdot x_m + b_n) \cdot TIS_n \cdot \Delta t_n. \quad (9)$$

The constraints on state of charge may be incorporated via penalty function $f_1$, thus avoiding the use of additional Lagrangian terms and allowing a more direct solution approach. This penalty function creates more accurate solutions for successive integers k=1, 2, . . . .

$$f_1 = -\sum_{n=0}^{N-1} \left( \frac{(x_n - SOC_{max}) + (x_n - SOC_{min})}{SOC_{max} - SOC_{min}} \right)^{2k} \quad (10)$$

Similarly, the constraints on the rates of charge or discharge may be imposed by penalty function $f_2$ as is shown in equation 11. Again, this penalty function will enforce a more accurate solution for successive integers k=1, 2, . . . .

$$f_2 = -\sum_{n=0}^{N-1}\left(\frac{(\Delta x_n - P_c) + (\Delta x_n - P_d)}{P_c - P_d}\right)^{2k} = -\sum_{n=0}^{N-1}\sum_{m=0}^{M-1}\left(\frac{2\cdot(a_{n,m}\cdot x_m + b_n) - P_c - P_d}{P_c - P_d}\right)^{2k} \tag{11}$$

Now that the augmented cost function J has been entirely stated in respect to the states x, one may use the necessary condition of equation 12 to solve for state of charge $x_n$ at the end of each interval n.

$$\frac{\partial J}{\partial x_n} = 0, \text{ for } n = 0, 1, 2, \ldots, N-1 \tag{12}$$

In turn, predicted charge rate may also be calculated from equation 3 resulting in the important predicted elastic change in load at each interval $\Delta L_n$.

Using constraint integer k=1, equation 12 give us N equations which may be solved for $x_n$ in respect to $x_{n-1}$ and $x_{n+1}$ as shown in equation 13. (The terms of b vector have been omitted from this formulation. This general equation 13 is set up for solution by either relaxation or by matrix inversion, where starting and ending states are assumed to be known. Hammerstrom has solved these equations in MS Excel using relaxation and iterations. The solution is somewhat soft, allowing minor violations of the stated constraints to persist. These constraint violations could be reduced by using larger k values or by using altogether other, sharper penalty functions. It is easiest to assert the final value $x_N$ in this formulation. A proper optimization would set the final state at $SOC_{min}$, however, which is unrealistic and undesirable. A preferred method is to set $SOC_N$ equal to starting initial value $SOC_{-1}$, in which case the relaxation solution is fully specified.)

$$0 = \frac{\partial J}{\partial x_n} = -(a_{n,n}\cdot TIS_n\cdot\Delta t_n + a_{n+1,n}\cdot TIS_{n+1}\cdot\Delta t_{n+1}) - \frac{8}{(SOC_{max} - SOC_{min})^2}\cdot x_n + \frac{4\cdot(SOC_{max} + SOC_{min})}{(SOC_{max} - SOC_{min})^2} - \frac{8\cdot(a_{n,n}^2 + a_{n+1,n}^2)}{(P_c - P_d)^2}\cdot x_n - \frac{8\cdot a_{n,n-1}\cdot a_{n,n}}{(P_c - P_d)^2}\cdot x_{n-1} - \frac{8\cdot a_{n+1,n+1}\cdot a_{n+1,n}}{(P_c - P_d)^2}\cdot x_{n+1} + \frac{4\cdot(P_d + P_c)(a_{n,n} + a_{n+1,n})}{(P_c - P_d)^2} \tag{13}$$

2. Generate the advisory signal time series prediction for the battery system. After the desired charge rate Δx vector has been solved, the charge rates should be stated as changes in elastic load $\Delta L_n$ at each interval n using the relationship of equation 2. One should also state an advisory control signal S that will be sent to the battery system. The advisory control signal has been specified as an integer and may be calculated as the closest integer in the assignment shown in equation 14.

$$S_n \equiv \begin{cases} -127\cdot\dfrac{\Delta x_n}{P_c}, & \Delta x_n \geq 0 \\ -127\cdot\dfrac{\Delta x_n}{P_d}, & \Delta x_n < 0 \end{cases} \tag{14}$$

Further Alternatives:

1. Additional steps could probably be taken to make the application of this strategy more formulaic for a specific implementer.
2. A completed example would probably be useful in an appendix to this toolkit function.
3. Sharper penalty functions may be used to make the solution more accurate and which would permit fewer soft constraint violations.
4. The formulation should probably be normalized. The weights of the functions $f_0$, $f_1$, and $f_2$ do not enforce a true economic optimization when the impact of $f_0$ may be less at times than that of the constraint functions.
5. While the constraints on state of charge and charge rate have been stated as constants, these constraints may, in fact, be functions of time and should be thought of as an allowed operational envelope. Letting these envelopes be more dynamic does not break this formulation, but it does lead to the formulation being tweaked to state constraints as functions of time intervals n.
6. Implementation may wish to specify a dead zone which has not yet been accommodated in this formulation.

6.3.19 Incentive Function—Transmission Flowgate (Function 5.1)

Description:

This function is to predict the MW flow and the cost of a transmission flowgate for each interval start times $\{IST_n\}$ (e.g., n=0, 1, . . . , 56) used by the toolkit framework. A transmission flowgate is potentially congested transmission corridor defined between two transmission zones. A flowgate may consists of one of more than more transmission devices, such as high voltage AC/DC overhead lines and/or transformers.

With a given network topology, generation shift factors (SF) to a specific flowgate can be calculated by a network analysis application. Flowgates are modeled as linear inequality constraints using these shift factors in the Economic Dispatch (ED) Linear Programming problem. When a flowgate constraint is binding at its reliability flow limit, generators can be be redispatched “out-of-merit” according to their shift factors to the flowgate, in order to relieve the congestion. Such redispatch will lead to non-zero operational cost to a binding flowgate (aka shadow price of a constraint in Linear Programming). The physical meaning of the cost of a flowgate is the cost saving with one addition MW added to the limit of flowgate, which will increase one MW generation (cheaper) from the sending end of the flowgate and decrease one MW generation (more expensive) from the receiving end of the flowgate.

Figure 93:
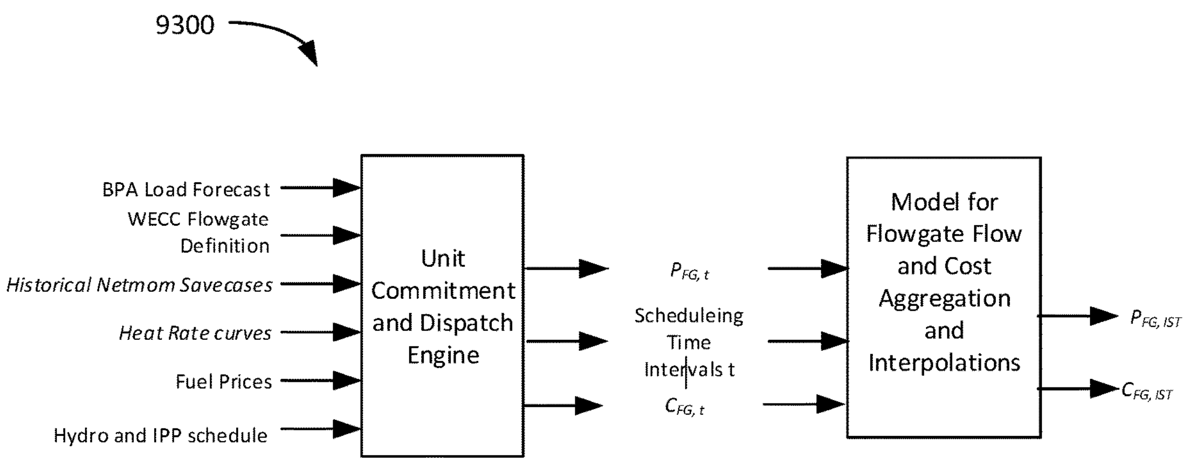
FIG. 93 is a diagram of an exemplary block input/output function model.

FIG. 93 is a diagram 9330 of an exemplary block input/output function model, which is discussed below.

Inputs:

Predicted price of fuel, which may be either constant or a dynamic time series, depending on the fuel.

Representative amortized infrastructure cost. (In some cases, the infrastructure costs will be stated as functions of many variables, including local costs of money, taxes, regulations, etc.)

Planned generator schedule(s), such as Federal hydro schedules.

Constant heat rate curves of fossil generators.

BPA Load Forecast.

Historical BPA Netmom savecases, which are used to produce generation and load profiles for any given hour of a day in a week of a specific season.

WECC Flowgate definition

Outputs:

Predicted flowgate flow $P_{FG,IST}$ For a Transmission Flowgate FG for time series using the intervals of the current IST time series.

Corresponding predicted costs of each binding Flowgate $C_{FG,IST}$ using the intervals of the current IST time series. If a flowgate is not congested (non-binding) in a particular interval, its cost will be zero.

Pseudo Code Implementation:

1. Process inputs from BPA;
2. Complement input data with the model data from historical Netmom savecases and WECC heat rate curves;
3. Solve a multi-interval economic dispatch problem which produces MW flow $P_{FG,t}$ and shadow price based cost $C_{FG,t}$ for each flowgate FG at each scheduling interval t
4. Calculate $P_{FG,IST}$ for transmission Flowgate FG and interval IST;

$P_{FG,IST}=P_{FG,t}$, where t is covers the majority portion of an IST interval
5. Compute the operational cost $C_{FG,IST}$ for each transmission flowgate FG and each IST interval;

$C_{FG,IST}=C_{FG,t}/T_t*T_{IST}$, where t is covers the majority portion of an IST interval

6.3.20 Incentive Function—Equipment and Line Constraints (Function 5.2)

Description:

Discourage consumption of energy downstream from constrained distribution equipment, including distribution lines.

Applies to transactive nodes that are in a position to mitigate their constraints by increasing the delivered cost of energy to downstream transactive nodes.

Intended to be used where constraints may be correlated to specific equipment. Does not apply to transmission flowgates.

Block Input/Output Function Model:

Inputs:

Predicted capacity to which this function applies.

Function which estimates the cost impacts of exceeding the capacity constraint.

Outputs:

Predicted capacity cost time series $C_C$ and corresponding capacity time series $P_C$.

6.3.21 Incentive Function—BPA Demand Charges (Function 7.1)

Description:

This function predicts the impact of demand charges that the Bonneville Power Administration (BPA) will apply to its customer utilities according to interpretation of its intricate Tiered Rate Methodology (TRM). The TRM explains how BPA's demand charges are to be allocated to its customer utilities at the conclusion of each month. However, since the transactive control and coordination system is predictive, the demand charge impacts of the methodology should be predicted instead. This function can, at best, estimate the demand charge impacts from the TRM.

Many components of the TRM duplicate energy costs that will already be represented in the transactive incentive signal (TIS) by electrically upstream locations. Generally, transactive control applies energy costs at the points where electrical energy is generated and fed into the electrical power grid. These influences should not be duplicated or double-counted. Therefore, this function should only insert the unique demand charge impacts from the TRM that apply specifically to the utilities. This may be achieved by applying upward pressure to the TIS—by adding, to the TIS computation, the product of the pair of capacity cost $C_C$ and average power capacity $P_C$—during and around a time interval when the transactive feedback signal (TFS) predicts the occurrence of a peak that exceeds the highest peak that has already been recorded during the time elapsed for the calendar month prior to the start time (e.g., $IST_0$) of the TFS. If the increased TIS, in turn, applies enough downward pressure on the TFS, the predicted peak may be lowered enough to prevent any additional demand charge.

Normally, an electric utility would be the entity to apply this function. This function applies to a "utility" transactive node or to the transactive node that represents the perspective of an electric utility.

Block Input/Output Function Model:

Inputs:

HLH—[number of hours]—Heavy Load Hour for every month of the year. The daily HLH periods are defined by the North American Electric Reliability Corporation (NERC), but should be updated yearly or whenever there is a change.

$C_{demand}$—[$/kW]—BPA demand rate for every month for two years, as approved by Federal Energy Regulatory Commission (FERC) and published by BPA at the beginning of every other fiscal year (starting in October). This is to be updated every other year in this function or whenever there is a change.

CDQ—[kW]—Contract Demand Quantity for every month of the year, as computed yearly by BPA for each of the customer/utility. This is to be updated yearly in this function or whenever there is a change.

$W_{T1\text{-}HLH,m0}$—[kWh]—planned Tier 1 HLH energy for the present month m when this function is employed for the very first time; this is an initial condition.

$W_{T1\text{-}HLH,m+1}$—[kWh]—planned Tier 1 HLH energy for the upcoming month m+1. Since the transactive control and coordination system provides predictions for a 4-day horizon, this should be made available to this function at least 4 days prior to the start of an upcoming month.

$P_{nonFed\_fix}$ (optional)—[kW]—monthly fixed non-Federal power capacity that is planned by or contracted to a customer. This may include Tier 2 power capacity, Secondary Credit Service, Super Peak Credit, and any other energy resources that qualify as fixed non-Federal. This is to be updated whenever there is a change in the planned or contracted power capacity.

$P_{nonFed\_var}$ (optional)—[kW]— monthly variable non-Federal power capacity that is available to a customer. An example is small-scale renewables resources, which may be considered as negative loads. Due to the variability of such resources, their power outputs will have to be predicted, for each of IST intervals, to be used in this function. $P_{nonFed\_var}$ may be set to zero if it is small 5%) compared to $P_{nonFed\_fix}$.

$TFS_n$—[kW]—Transactive Feedback Signal, which is available within the transactive node framework, where, for example, n=0, 1, . . . , 55. The TFS is only to be used when it represents the total load for the customer's service territory. If that is not the case, the customer should use a secondary source for the prediction of its total utility load.

$IST_n$—Present time series interval start times used by the toolkit framework, where, for example, n=0, 1, . . . , 56. (In some embodiments, there is no prediction to correspond with $IST_n$ for n=56. This last IST is simply used to make it clear when the final interval concludes.)

K—dimensionless—scaling factor (a constant) by which the effect of the demand charge on the TIS may be scaled. This is to be set to 1.0 until it becomes clear that it will be used.

Interim Calculation Products:

aHLH—[kW]—average monthly Tier 1 load served during the HLH of the month.

$P_{SCS\text{-}HLH}$ (optional)—[kW]—average monthly SCS load served during the HLH of the month.

$P_{th}$—[kW]—threshold power capacity above which demand charge may be incurred.

$P'_{demand}$—[kW]—Demand amount/capacity at a given point in a month. This is updated every time a higher demand capacity is recorded. At the end of the month, this should be the same as the usual demand amount—also defined as the Demand Charge Billing Determinant—which is used to compute the customer's demand charge for the month.

A—[kWh]—average energy above $P_{th}$ during an interval where and surrounding where $P_C$ (defined below) exceeds CSP'.

Outputs:

$P_{C,n}$—[kW]—average power capacity, corresponding to $IST_n$.

$C_{C,n}$—[\$/kW]—capacity costs, corresponding to $IST_n$.

Pseudo Code Implementation:

1. Convert power capacities in units kW, if necessary.
2. Convert energy values in units kWh, if necessary.
3. Convert demand rates in units \$/kW, if necessary. Denote present month by m and upcoming month by m+1.
4. Initializations:

$$P'_{demand,m}=0 \quad (1)$$

$$P'_{demand,m+1}=0 \quad (2)$$

$$W_{T1\text{-}HLH,m}=W_{T1\text{-}HLH,m0} \quad (3)$$

5. Computations:

$$aHLH_m = \frac{W_{T1-HLH,m}}{HLH_m} \quad (4)$$

$$aHLH_{m+1} = \frac{W_{T1-HLH,m+1}}{HLH_{m+1}} \quad (5)$$

$$P_{th,m,n} = aHLH_m + CDQ_m + P_{nonFed\_fix,m} + P_{nonFed\_var,n} \quad (6)$$

$$P_{th,m+1,n} = aHLH_{m+1} + CDQ_{m+1} + P_{nonFed\_fix,m+1} + P_{nonFed\_var,m+1,n} \quad (7)$$

$$\text{for } n = 0, 1, \ldots, 55: P_{C,n} = \begin{cases} \max(0, TFS_n - P_{th,m,n}), & \text{if } n \in m \\ \max(0, TFS_n - P_{th,m+1,n}), & \text{if } n \in m+1 \end{cases} \quad (8)$$

-continued $$\text{for } n \in m: n_{demand,m} = \begin{cases} n, & \text{if } \max(P_{C,n}) > P_{demand,m} \\ \emptyset, & \text{otherwise} \end{cases}, \quad (9)$$

where Ø represents the null set.

$$\text{for } n \in m+1: n_{demand,m} = \begin{cases} n, & \text{if } \max(P_{C,n}) > P_{demand,m+1} \\ \emptyset, & \text{otherwise} \end{cases} \quad (10)$$

$$\text{if } n_{demand,m} \neq \emptyset: \ell_m = \{n \text{ surrounding and including } n_{demand,m} \text{ s.t. } P_{C,n} > 0\} \quad (11)$$

$$\text{if } n_{demand,m+1} \neq \emptyset: \ell_{m+1} = \{n \text{ surrounding and including } n_{demand,m+1} \text{ s.t. } P_{C,n} > 0\}$$

$$\text{for } n \in \{\ell_m \cup \ell_{m+1}\}: A_n = P_{C,n} \times (IST_{n+1} - IST_n) \quad (12)$$

$$\text{for } n = 0, 1, \ldots, \quad (13)$$

$$55: C_{C,n} = \begin{cases} C_{demand,m} \times \left(\frac{A_n}{\sum_{i \in \ell_m} A_i}\right) \times K, & \text{if } n \in \ell_m \\ C_{demand,m+1} \times \left(\frac{A_n}{\sum_{i \in \ell_{m+1}} A_i}\right) \times K, & \text{if } n \in \ell_{m+1} \\ 0, & \text{otherwise} \end{cases}$$

For the next iteration:

$$\text{if } P_{C,0} > P_{demand,m}: P_{demand,m} = P_{C,0} \quad (14)$$

$$P_{demand,m+1} = P_{C,n_{demand,m+1}} \quad (15)$$

6. At the start of a month:

$$P_{demand,m}=0 \quad (16)$$

$$P_{demand,m+1}=0 \quad (17)$$

$$W_{T1\text{-}HLH,m}=W_{T1\text{-}HLH,m+1} \quad (18)$$

7. Repeat computations under point 5.

Figure 94:
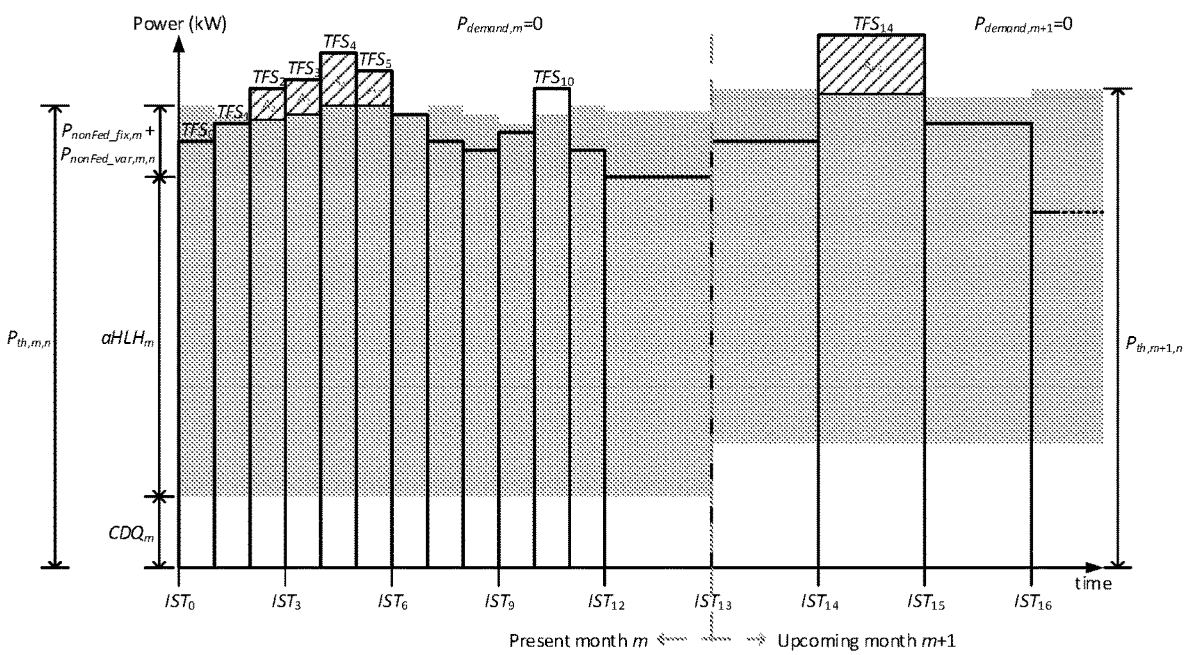
FIG. 94 is a graph illustrating an example for one iteration at a given time.

Exaggerated Example for One Iteration at a Given Time:

FIG. 94 is a graph 9400 illustratiing an example for one iteration at a given time.

$n_{demand,m}=4$ and $n_{demand,m+1}=14$ (assuming $P_{C,14}=\max(P_{C,n})$ for n∈m+1)

$\ell_m=\{2,3,4,5\}$ and $\ell_{m+1}=\{14\}$ $$P_{C,2}=TFS_2-P_{th,m,2}$$

$$C_{C,2}=C_{demand,m}\times[A_2/(A_2+A_3+A_4+A_5)]\times K$$

$$P_{C,3}=TFS_3-P_{th,m,3}$$

$$C_{C,3}=C_{demand,m}\times[A_3/(A_2+A_3+A_4+A_5)]\times K$$

$$P_{C,4}=TFS_4-P_{th,m,4}$$

$$C_{C,4}=C_{demand,m}\times[A_4/(A_2+A_3+A_4+A_5)]\times K$$

$$P_{C,5}=TFS_5-P_{th,m,5}$$

$$C_{C,5}=C_{demand,m}\times[A_5/(A_2+A_3+A_4+A_5)]\times K$$

$$P_{C,10}=TFS_{10}-P_{th,m,10}$$

$$C_{C,10}=0$$

$$P_{C,14}=TFS_{14}-P_{th,m+1,14}$$

$$C_{C,14}=C_{demand,m+1}\times[A_{14}/A_{14}]\times K=C_{demand,m+1}\times K$$

For the next iteration, $P_{demand,m}=0$ and $P_{demand,m+1}=P_{C,14}$.

6.3.22 Incentive Function—BPA Demand Charges (Function 7.1.1)

Description:

An evaluation of prior function 7.1 BPA Demand Charges was carried out. This evaluation determined that the function was not recognizing meaningful events in the presence of real load data (precisely, transactive feedback signals (TFS) data). While the inputs specified for this present function 7.1.1 have not changed from those in function 7.1, the pseudo code algorithm has been significantly simplified and has been shown through simulation to properly identify new demand peaks and their cost impacts.

This function predicts the impact of demand charges that the Bonneville Power Administration (BPA) will apply to its customer utilities according to interpretation of its intricate Tiered Rate Methodology (TRM). The TRM explains how BPA's demand charges are to be allocated to its customer utilities at the conclusion of each month. However, since the transactive control and coordination system is predictive, the demand charge impacts of the methodology should be predicted instead. This function can, at best, estimate the demand charge impacts from the TRM.

Many components of the TRM duplicate energy costs that will already be represented in the transactive incentive signal (TIS) by electrically upstream locations. Generally, transactive control applies energy costs at the points where electrical energy is generated and fed into the electrical power grid. These influences should not be duplicated or double-counted. Therefore, this function should only insert the unique demand charge impacts from the TRM that apply specifically to the utilities. This may be achieved by applying upward pressure to the TIS—by adding, to the TIS computation, the product of the pair of capacity cost $C_C$ and incremental demand $P_C$—as the transactive feedback signal (TFS) predicts the occurrence of a peak that exceeds the highest peak that has already been recorded during the present calendar month prior to the start time (e.g., $IST_0$) of the TFS. If the increased TIS, in turn, induces responsive assets to curtail load, the predicted peak may be lowered enough to prevent any additional demand charge.

Normally, an electric utility would be the entity to apply this function. This function applies to a "utility" transactive node or to the transactive node that represents the perspective of an electric utility.

Block Input/Output Function Model:

Inputs:

- HLH—[number of hours]—Heavy Load Hour for every month of the year. The daily HLH periods are defined by the North American Electric Reliability Corporation (NERC), but should be updated yearly or whenever there is a change. Presently, HLH hours are defined between 6:00 am and 10:00 pm (prevailing Pacific Time) on days excluding Sundays and recognized holidays.
- $C_{demand}$—[$/kW]—BPA demand rate for every month for two years, as approved by Federal Energy Regulatory Commission (FERC) and published by BPA at the beginning of every other fiscal year (starting in October). This is to be updated every other year in this function or whenever there is a change.
- CDQ—[kW]—Contract Demand Quantity for every month of the year, as computed yearly by BPA for each of the customer/utility. This is to be updated yearly in this function or whenever there is a change.
- $W_{T1\text{-}HLH,m0}$—[kWh]—planned Tier 1 HLH energy for the present month m when this function is employed for the very first time; this is an initial condition.
- $W_{T1\text{-}HLH,m+1}$—[kWh]—planned Tier 1 HLH energy for the upcoming month m+1. Since the transactive control and coordination system provides predictions for a 4-day horizon, this should be made available to this function at least 4 days prior to the start of an upcoming month.
- $P_{nonFed\_fix}$ (optional)—[kW]—monthly fixed non-Federal power capacity that is planned by or contracted to a customer. This may include Tier 2 power capacity, Secondary Credit Service, Super Peak Credit, and any other energy resources that qualify as fixed non-Federal. This is to be updated whenever there is a change in the planned or contracted power capacity.
- $P_{nonFed\_var}$ (optional)—[kW]—monthly variable non-Federal power capacity that is available to a customer. An example is small-scale renewables resources, which may be considered as negative loads. Due to the variability of such resources, their power outputs will have to be predicted, for each of IST intervals, to be used in this function. $P_{nonFed\_var}$ may be set to zero if it is small (≤5%) compared to $P_{nonFed\_fix}$.
- $TFS_n$—[kW]—Transactive Feedback Signal, which is available within the transactive node framework, where, for example, n=0, 1, . . . , 55. The TFS is only to be used when it represents the total load for the customer's service territory. If that is not the case, the customer should use a secondary source for the prediction of its total utility load.
- $IST_n$—Present time series interval start times used by the toolkit framework, where, for example, n=0, 1, . . . , 56. (There is no prediction to correspond with $IST_n$ for n=56. This last IST is simply used to make it clear when the final interval concludes.)
- K—dimensionless—scaling factor (a constant) by which the effect of the demand charge on the TIS may be scaled. This is to be set to 1.0 until it becomes clear that it will be used.

Interim Calculation Products:

- aHLH—[kW]—average monthly Tier 1 load served during the HLH of the month. This value is determined by dividing a month's HLH energy by the number of HLH hours that month.
- $P_{th}$—[kW]—threshold power capacity above which demand charge may be incurred. This value is determined as a sum of other stated BPA threshold values.
- $P_{demand}$—[kW]—Demand amount/capacity at a given point in a month. This is updated every time a higher demand capacity is recorded. At the end of the month, this should be the same as the usual demand amount—also defined as the Demand Charge Billing Determinant—which is used to compute the customer's demand charge for the month.
- $P'_{demand}$—[kW]—Like $P_{demand}$, but refers to the predicted future.

Outputs:

- $P_{C,n}$—[kW]—average power capacity, corresponding to $IST_n$. This output parameter increases each time a new monthly peak demand occurs or is predicted to occur. By the end of a month, the sum of $P_{C,1}$ parameters should be very close to the determinant upon which BPA demand charges are calculated.

$C_{C,n}$—[\$/kW]—capacity costs, corresponding to $IST_n$. This parameter is defined nonzero at times $P_{C,n}$ is nonzero. The magnitude of $C_{C,n}$ is constant during a month, equal to the rate that is to be charged by BPA that month for utility demand.

Pseudo Code Implementation:

a. Beginning of New Month:
  Set m=0
  Initialize $P_{th}$(ThisMonth), $C_{demand}$(ThisMonth), $P_{th}$(NextMonth), $C_{demand}$(NextMonth) based on tabular contract information from the energy supplier for the present and next month
  Set $P_{demand}$(m)=$P_{th}$(ThisMonth)

b. Beginning of Update Interval:
  Set m=m+1 c. Beginning of Relaxation Update:
  Set $P'_{demand}$(ThisMonth)=$O_{demand}$(m−1)
  Set $P'_{demand}$(NextMonth)=$P_{th}$(NextMonth)
  Calculate $TFS_n$(m) for n={0, 2, . . . 55}
  For n=0 to 55

```
If TFS_n(m) > P'_demand(ThisMonth)
   AND IST_n(m) is in ThisMonth
   AND IST_n(m) is within HLH hours, then
      Set P_c_n(m) = TFS_n(m) − P'_demand(ThisMonth)
      Set C_c_n(m) = C_demand(ThisMonth)
      Set P'_demand(ThisMonth) = TFS_n(m)
Elseif TFS_n(m) > P'_demand (NextMonth)
   AND IST_n(m) is in NextMonth
   AND IST_n(m) is within HLH hours, then
      Set P_c_n(m) = TFS_n(m) − P'_demand(NextMonth)
      Set C_c_n(m) = C_demand(NextMonth)
      Set P'_demand(NextMonth) = TFS_n(m)
Else
      Set P_c_n(m) = 0
      Set C_c_n(m) = 0
Next n
```

d. On next relaxation update (e.g., $IST_0$=$IST_1$(m,0) does not change, but a new calculation ID is in effect)
  Go to (c)

e. On next update interval (e.g., $IST_0$=$IST_0$(m+1) will advance 5 minutes and a new calculation ID is in effect),
  If $IST_0$(m) is in HLH hours, then

```
      Set P_demand(m) = maximum(P_demand(m−1), TFS_0(m))
   Else
      Set P_demand(m) = P_demand(m−1)
   End
```

Go to (b)

f. On next month (e.g., $IST_0$ is in NextMonth and a new calculation ID is in effect)
  Go to (a)

APPENDIX A

Mat lab code that implements the stated pseudo code for TKRS_7.1.1

```
% Note that function lnHLH(a) has been created. It returns a Boolean true
% if time a is within HLH hours and is not a Sunday. The format of
% variable "a" is presumed to be 'yyyy-mm-ddTHH:MM:SS'.
NextMonth = ThisMonth+1;
% (a) Beginning of New Month
PeakMonthDemand(1) = DemandThreshold(ThisMonth);
```

APPENDIX A-continued

Mat lab code that implements the stated pseudo code for TKRS_7.1.1

```
P_c(1,1:56) = zeros(1,56);
C_c(1,1:56) = zeros(1,56);
for m = 2:length(TFS(:,1))
  % (b) Beginning of Update Interval
  if ~strcmp(IST(m,1),IST(m−1,1)) && lnHLH(IST(m−1,1)) % An
  update interval
    PeakMonthDemand(m) = max(PeakMonthDemand(m−1),
  TFS(m−1,1));
  else % A relaxation update
    PeakMonthDemand(m) = PeakMonthDemand(m−1);
  end
  % (c) Beginning of Relaxation Update:
  PeakFutureDemand(ThisMonth) = PeakMonthDemand(m−1);
  PeakFutureDemand(NextMonth) = DemandThreshold(NextMonth);
  % TFS was already read from project data
  for n = 1:56 % NOTE: No distinction made yet for month
      if TFS(m,n) > PeakFutureDemand(ThisMonth) ...
            && datenum(IST(m,n),DF) >=
            datenum([num2str(DemandRateYear(ThisMonth)),'-
            ',num2str(DemandRateMonth(ThisMonth)),'−01']) ...
            && datenum(IST(m,n),DF) <
            datenum([num2str(DemandRateYear(NextMonth)),'-
            ',num2str(DemandRateMonth(NextMonth)),'−01']) ...
        && lnHLH(IST(m,n));
        P_c(m,n) = TFS(m,n) − PeakFutureDemand(ThisMonth);
        C_c(m,n) = DemandCharge(ThisMonth);
        PeakFutureDemand(ThisMonth) = TFS(m,n);
      elseif TFS(m,n) > PeakFutureDemand(NextMonth) ...
            && datenum(IST(m,n),DF) >=
            datenum([num2str(DemandRateYear(NextMonth)),'-
            ',num2str(DemandRateMonth(NextMonth)),'−01']) ...
        && lnHLH(IST(m,n));
        P_c(m,n) = TFS(m,n) − PeakFutureDemand(NextMonth);
        C_c(m,n) = DemandCharge(NextMonth);
        PeakFutureDemand(NextMonth) = TFS(m,n);
      else
        P_c(m,n) = 0;
        C_c(m,n) = 0;
      end
  end
end;
****************************************************************
**************************************
function [YorN] = lnHLH(T)
% lnHLH--Logic check true if in HLH hours
DT = 'yyyy-mm-ddTHH:MM:SS';
T = datenum(T,DT) − (7 + (datenum(T,DT) > datenum(2012,11,4,10,0,
0)))/24;
YorN = weekday(T) ~= 1 ...
  && datevec(T)*[0 0 0 1 0 0]' >= 6 && datevec(T)*[0 0 0 1 0 0]' < 22;
```

Figure 95:
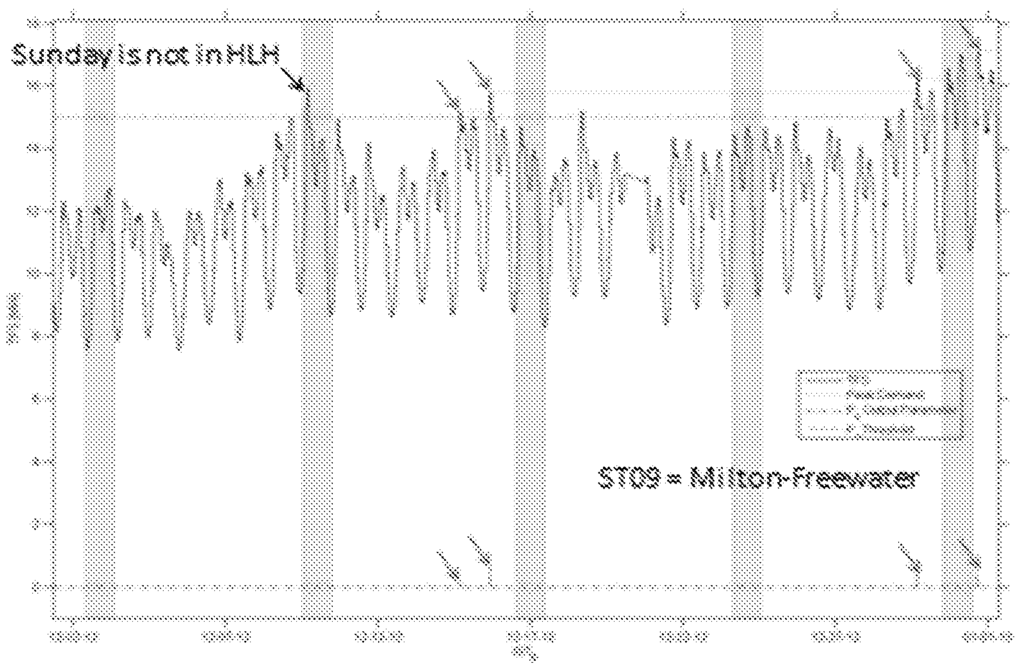
FIG. 95 is a diagram that shows the specified strategy during a month.

FIG. 95 is a diagram 9500 that shows the specified strategy during a month.

6.3.23 Incentive Function—Seattle City Light Demand Charges (Function 7.2)

Description:

This function predicts the impacts of energy and demand charges that the Seattle City Light (SCL) will apply to the University of Washington (UW). SCL supplies the UW with most of its electricity.

This function applies the impact of its energy charges to the weighted cost for the total energy imported into UW's energy territory from the TZ02 (West Washington) transmission zone transactive node. This is achieved through the addition of an "other" cost component $C_O$ to the numerator of the TIS computation at UW's transactive node.

Although the SCL's demand charges are to be allocated at the conclusion of each month, since the transactive control and coordination system is predictive, the demand charge impacts should be predicted instead. This function can, at best, estimate the demand charge impacts. UW expects to minimize its monthly SCL demand changes by using this function to apply upward pressure to its TIS when its transactive feedback signal (TFS) predicts the occurrence of a peak in its load. This is achieved by adding the product of the pair of capacity cost $C_C$ and average power capacity $P_C$ to the numerator of its TIS computation whenever its TFS exceeds the highest peak that has already been recorded during the time elapsed for the calendar month prior to the start time (e.g., $IST_0$). The product $C_C \cdot P_C$ thus represents the incremental demand charge that UW would incur if a new peak were to happen. If the increased TIS, in turn, applies enough downward pressure on the TFS (e.g. through load curtailment), the predicted peak may be lowered enough to prevent any additional demand charge. It should be noted that, because the SCL demand charges apply to the maximum demand during the month, the charges can only be minimized and not completely eliminated. This function is to be applied at UW's transactive node.

Block Input/Output Function Model:

Inputs:

$C_{energy\_peak}$—[\$/kWh]—SCL peak energy rate. This peak energy rate is to be updated whenever there is a change. This rate applies to energy used between six (6:00) a.m. and ten (10:00) p.m., Monday through Saturday, excluding major holidays. (Major holidays excluded from the peak period are New Year's Day, Memorial Day, Independence Day, Thanksgiving Day, and Christmas Day.) Note that Sunday is considered as part of the off-peak period. This rate is \$0.0638/kWh in one example.

$C_{energy\_offpeak}$—[\$/kWh]—SCL off-peak energy rate. This off-peak energy rate is to be updated whenever there is a change. This rate applies to energy used during times other than the peak period. This rate is \$0.0432/kWh in one example.

$C_{demand\_peak}$—[\$/kW]—SCL peak demand rate. This peak demand rate is to be updated whenever there is a change. This rate applies to kW of maximum demand $P_{max\_peak}$ during the peak period. This rate is \$0.98/kW in one example.

$C_{demand\_offpeak}$—[\$/kW]—SCL off-peak demand rate. This off-peak demand rate is to be updated whenever there is a change. This rate applies to kW of maximum demand $P_{max\_offpeak}$ in excess of $P_{max\_peak}$ during times other than the peak period. In other words, this off-peak demand rate applies only if $P_{max\_offpeak} > P_{max\_peak}$ and applies only to the difference $P_{max\_offpeak} - P_{max\_peak}$. This rate is \$0.26/kW in one example.

$\{P_{peak1}, P_{peak2}, \ldots, P_{peak12}\}$—[kW]—monthly peak load for every month of the most recent elapsed year. This is to be updated at the beginning of a year if more recent data become available.

K—dimensionless—scaling factor (a constant) by which the effect of the demand charge on the TIS may be scaled. This is to be set to 1.0 until it becomes clear that it will be used.

$TFS_n$—[kW]—Transactive Feedback Signal, which is available within the transactive node framework, corresponding to the $n^{th}$ interval, where, for example, n=0, 1, . . . , 55. The TFS is only to be used if it represents the total UW's demand from SCL.

$IST_n$—Present time series interval start times used by the toolkit framework. (There is no prediction to correspond with $IST_{56}$. This last IST is simply used to make it clear when the final interval concludes.)

$TFS_{TZ02,n}$—[kW]—Transactive Feedback Signal from transmission zone transactive node TZ02, representing the average power imported into UW's service territory during the $n^{th}$ interval.

Interim Calculation Products:

$P_{max\_peak}$—[kW]—Maximum demand during the peak period.

$P_{max\_offpeak}$—[kW]—Maximum demand during the off-peak period.

$h_{peak}$—[number of hours]—Number of hours in one continuous peak period.

$h_{offpeak}$—[number of hours]—Number of hours in one continuous off-peak period.

$\delta_{peak}$—[\$/kWh]—Adjustment to the weighted cost of imported energy, due to the impact of SCL energy charges, during peak period.

$\delta_{offpeak}$—[\$/kWh]—Adjustment to the weighted cost of imported energy, due to the impact of SCL energy charges, during off-peak period.

Outputs:

$C_{O,n}$—[\$]—Other cost representing SCL's energy charge impact, corresponding to the $n^{th}$ interval.

$C_{C,n}$—[\$/kW]—Capacity cost corresponding to the $n^{th}$ interval.

$P_{C,n}$—[kW]—Average power capacity corresponding to the $n^{th}$ interval.

Pseudo Code Implementation:

$$\forall n, C_{O,n} = (x \cdot \delta_{peak} + y \cdot \delta_{offpeak}) \cdot TFS_{TZ02,n} \cdot \Delta t_n \tag{4}$$

where $$x = \text{portion/fraction of } n \text{ lying within } \ell_{peak}$$

$$y = \text{portion/fraction of } n \text{ lying within } \ell_{offpeak}, \tag{5}$$

and $$\Delta t_n = IST_{n+1} - IST_n \tag{6}$$

1. Compute $P_{c,n}$:

$$\forall n, P_{C,n} = \max(0, TFS_n - P_{max\_peak}) \tag{7}$$

2. Compute $C_{C,n}$:

$$\forall n,\ C_{C,n} = \begin{cases} K \cdot (x \cdot C_{demand\_peak} + y \cdot C_{demand\_offpeak}), & \text{if } TFS_n > P_{max\_offpeak} > P_{max\_peak} \\ K \cdot x \cdot C_{demand\_peak}, & \text{if } TFS_n > P_{max\_peak} \geq P_{max\_offpeak} \\ 0, & \text{otherwise} \end{cases} \tag{8}$$

where x and y are as defined in equation (5) above.

3. For the next iteration:

$$P_{max\_peak} = \begin{cases} TFS_0, & \text{if } (TFS_0 > P_{max\_peak}) \cap (n = 0 \in \ell_{peak}) \\ P_{max\_peak}, & \text{otherwise} \end{cases} \tag{9}$$

$$P_{max\_offpeak} = \begin{cases} TFS_0, & \text{if } (TFS_0 > P_{max\_offpeak}) \cap (n = 0 \in \ell_{offpeak}) \\ P_{max\_offpeak}, & \text{otherwise} \end{cases} \tag{10}$$

4. Repeat, starting from point 6.

Example $h_{peak}=16$ $h_{offpeak}=8$
$C_{energy\_peak}=\$0.0638/kWh$ $C_{energy\_offpeak}=\$0.0432/kWh$ $\delta_{peak}=\$0.0069/kWh$ $\delta_{offpeak}=-\$0.0137/kWh$
$\delta_{demand\_peak}=\$0.98/kW$ $C_{demand\_offpeak}=\$0.26/kW$
$K=1.0$ $P_{max\_peak}=P_{max\_offpeak}=\min(P_{peak1}, P_{peak2}, \ldots, P_{peak12})\times 90\%=40000\ kW\times 90\%=36000\ kW$

| n | $IST_n$ | $\Delta t_n$ [h] | x [%] | y [%] | $TFS_n$ [kW] | $TFS_{TZ02,n}$ [kW] | $TIS_{TZ02,n}$ [\$/kWh] | $C_{O,n}$ [\$] | $P_{C,n}$ [kW] | $C_{C,n}$ [\$/kW] | $TIS_n$ [\$/kWh] |
|---|---|---|---|---|---|---|---|---|---|---|---|
| 0 | 9/1/10 0:00 | 1/12 | 0 | 100 | 31225 | 31225 | 0.0569 | −35.74 | 0 | 0.00 | 0.0432 |
| 1 | 9/1/10 0:05 | 1/12 | 0 | 100 | 31200 | 31200 | 0.0569 | −35.71 | 0 | 0.00 | 0.0432 |
| 2 | 9/1/10 0:10 | 1/12 | 0 | 100 | 31199 | 31199 | 0.0569 | −35.71 | 0 | 0.00 | 0.0432 |
| 3 | 9/1/10 0:15 | 1/12 | 0 | 100 | 31192 | 31192 | 0.0569 | −35.70 | 0 | 0.00 | 0.0432 |
| 4 | 9/1/10 0:20 | 1/12 | 0 | 100 | 31199 | 31199 | 0.0569 | −35.71 | 0 | 0.00 | 0.0432 |
| 5 | 9/1/10 0:25 | 1/12 | 0 | 100 | 31195 | 31195 | 0.0569 | −35.70 | 0 | 0.00 | 0.0432 |
| 6 | 9/1/10 0:30 | 1/12 | 0 | 100 | 31192 | 31192 | 0.0569 | −35.70 | 0 | 0.00 | 0.0432 |
| 7 | 9/1/10 0:35 | 1/12 | 0 | 100 | 31090 | 31090 | 0.0569 | −35.58 | 0 | 0.00 | 0.0432 |
| 8 | 9/1/10 0:40 | 1/12 | 0 | 100 | 31100 | 31100 | 0.0569 | −35.59 | 0 | 0.00 | 0.0432 |
| 9 | 9/1/10 0:45 | 1/12 | 0 | 100 | 31112 | 31112 | 0.0569 | −35.61 | 0 | 0.00 | 0.0432 |
| 10 | 9/1/10 0:50 | 1/12 | 0 | 100 | 31090 | 31090 | 0.0569 | −35.58 | 0 | 0.00 | 0.0432 |
| 11 | 9/1/10 0:55 | 1/12 | 0 | 100 | 31000 | 31000 | 0.0569 | −35.48 | 0 | 0.00 | 0.0432 |
| 12 | 9/1/10 1:00 | 1/4 | 0 | 100 | 30960 | 30960 | 0.0569 | −106.30 | 0 | 0.00 | 0.0432 |
| 13 | 9/1/10 1:15 | 1/4 | 0 | 100 | 31000 | 31000 | 0.0569 | −106.43 | 0 | 0.00 | 0.0432 |
| 14 | 9/1/10 1:30 | 1/4 | 0 | 100 | 30936 | 30936 | 0.0569 | −106.21 | 0 | 0.00 | 0.0432 |
| 15 | 9/1/10 1:45 | 1/4 | 0 | 100 | 30904 | 30904 | 0.0569 | −106.10 | 0 | 0.00 | 0.0432 |
| 16 | 9/1/10 2:00 | 1/4 | 0 | 100 | 30880 | 30880 | 0.0569 | −106.02 | 0 | 0.00 | 0.0432 |
| 17 | 9/1/10 2:15 | 1/4 | 0 | 100 | 30784 | 30784 | 0.0569 | −105.69 | 0 | 0.00 | 0.0432 |
| 18 | 9/1/10 2:30 | 1/4 | 0 | 100 | 30880 | 30880 | 0.0569 | −106.02 | 0 | 0.00 | 0.0432 |
| 19 | 9/1/10 2:45 | 1/4 | 0 | 100 | 30848 | 30848 | 0.0569 | −105.91 | 0 | 0.00 | 0.0432 |
| 20 | 9/1/10 3:00 | 1/4 | 0 | 100 | 30816 | 30816 | 0.0569 | −105.80 | 0 | 0.00 | 0.0432 |
| 21 | 9/1/10 3:15 | 1/4 | 0 | 100 | 30776 | 30776 | 0.0569 | −105.66 | 0 | 0.00 | 0.0432 |
| 22 | 9/1/10 3:30 | 1/4 | 0 | 100 | 30760 | 30760 | 0.0569 | −105.61 | 0 | 0.00 | 0.0432 |
| 23 | 9/1/10 3:45 | 1/4 | 0 | 100 | 30672 | 30672 | 0.0569 | −105.31 | 0 | 0.00 | 0.0432 |
| 24 | 9/1/10 4:00 | 1/4 | 0 | 100 | 30672 | 30672 | 0.0569 | −105.31 | 0 | 0.00 | 0.0432 |
| 25 | 9/1/10 4:15 | 1/4 | 0 | 100 | 30768 | 30768 | 0.0569 | −105.64 | 0 | 0.00 | 0.0432 |
| 26 | 9/1/10 4:30 | 1/4 | 0 | 100 | 30760 | 30760 | 0.0569 | −105.61 | 0 | 0.00 | 0.0432 |
| 27 | 9/1/10 4:45 | 1/4 | 0 | 100 | 30872 | 30872 | 0.0569 | −105.99 | 0 | 0.00 | 0.0432 |
| 28 | 9/1/10 5:00 | 1/4 | 0 | 100 | 31016 | 31016 | 0.0569 | −106.49 | 0 | 0.00 | 0.0432 |
| 29 | 9/1/10 5:15 | 1/4 | 0 | 100 | 31584 | 31584 | 0.0569 | −108.44 | 0 | 0.00 | 0.0432 |
| 30 | 9/1/10 5:30 | 1/4 | 0 | 100 | 31848 | 31848 | 0.0569 | −109.34 | 0 | 0.00 | 0.0432 |
| 31 | 9/1/10 5:45 | 1/4 | 0 | 100 | 32072 | 32072 | 0.0569 | −110.11 | 0 | 0.00 | 0.0432 |
| 32 | 9/1/10 6:00 | 1 | 100 | 0 | 32986 | 32986 | 0.0569 | 226.50 | 0 | 0.00 | 0.0638 |
| 33 | 9/1/10 7:00 | 1 | 100 | 0 | 34300 | 34300 | 0.0569 | 235.53 | 0 | 0.00 | 0.0638 |
| 34 | 9/1/10 8:00 | 1 | 100 | 0 | 35476 | 35476 | 0.0569 | 243.60 | 0 | 0.00 | 0.0638 |

-continued

| n | $IST_n$ | $\Delta t_n$ [h] | x [%] | y [%] | $TFS_n$ [kW] | $TFS_{TZ02,n}$ [kW] | $TIS_{TZ02,n}$ [$/kWh] | $C_{O,n}$ [$] | $P_{C,n}$ [kW] | $C_{C,n}$ [$/kW] | $TIS_n$ [$/kWh] |
|---|---|---|---|---|---|---|---|---|---|---|---|
| 35 | 9/1/10 9:00 | 1 | 100 | 0 | 36876 | 36876 | 0.0569 | 253.22 | 876 | 0.98 | 0.0870 |
| 36 | 9/1/10 10:00 | 1 | 100 | 0 | 38084 | 38084 | 0.0569 | 261.51 | 2084 | 0.98 | 0.1174 |
| 37 | 9/1/10 11:00 | 1 | 100 | 0 | 38750 | 38750 | 0.0569 | 266.08 | 2750 | 0.98 | 0.1333 |
| 38 | 9/1/10 12:00 | 1 | 100 | 0 | 39536 | 39536 | 0.0569 | 271.48 | 3536 | 0.98 | 0.1514 |
| 39 | 9/1/10 13:00 | 1 | 100 | 0 | 39618 | 39618 | 0.0569 | 272.04 | 3618 | 0.98 | 0.1533 |
| 40 | 9/1/10 14:00 | 1 | 100 | 0 | 39962 | 39962 | 0.0569 | 274.41 | 3962 | 0.98 | 0.1609 |
| 41 | 9/1/10 15:00 | 1 | 100 | 0 | 40140 | 40140 | 0.0569 | 275.63 | 4140 | 0.98 | 0.1648 |
| 42 | 9/1/10 16:00 | 1 | 100 | 0 | 39682 | 39682 | 0.0569 | 272.48 | 3682 | 0.98 | 0.1547 |
| 43 | 9/1/10 17:00 | 1 | 100 | 0 | 38194 | 38194 | 0.0569 | 262.27 | 2194 | 0.98 | 0.1201 |
| 44 | 9/1/10 18:00 | 1 | 100 | 0 | 36804 | 36804 | 0.0569 | 252.72 | 804 | 0.98 | 0.0852 |
| 45 | 9/1/10 19:00 | 1 | 100 | 0 | 35284 | 35284 | 0.0569 | 242.28 | 0 | 0.00 | 0.0638 |
| 46 | 9/1/10 20:00 | 1 | 100 | 0 | 34742 | 34742 | 0.0569 | 238.56 | 0 | 0.00 | 0.0638 |
| 47 | 9/1/10 21:00 | 1 | 100 | 0 | 33852 | 33852 | 0.0569 | 232.45 | 0 | 0.00 | 0.0638 |
| 48 | 9/1/10 22:00 | 1 | 0 | 100 | 32612 | 32612 | 0.0569 | −447.87 | 0 | 0.00 | 0.0432 |
| 49 | 9/1/10 23:00 | 1 | 0 | 100 | 31578 | 31578 | 0.0569 | −433.67 | 0 | 0.00 | 0.0432 |
| 50 | 9/2/10 0:00 | 6 | 0 | 100 | 30497 | 30497 | 0.0569 | −2512.98 | 0 | 0.00 | 0.0432 |
| 51 | 9/2/10 6:00 | 6 | 100 | 0 | 35836 | 35836 | 0.0569 | 1476.46 | 0 | 0.00 | 0.0638 |
| 52 | 9/2/10 12:00 | 6 | 100 | 0 | 40813 | 40813 | 0.0569 | 1681.51 | 4813 | 0.98 | 0.0830 |
| 53 | 9/2/10 18:00 | 6 | 67 | 33 | 34919 | 34919 | 0.0569 | 0.00 | 0 | 0.00 | 0.0569 |
| 54 | 9/3/10 0:00 | 24 | 67 | 33 | 36143 | 36143 | 0.0569 | 0.00 | 143 | 0.65 | 0.0570 |
| 5 | 9/4/10 0:00 | 24 | 67 | 33 | 31816 | 31816 | 0.0569 | 0.00 | 0 | 0.00 | 0.0569 |

For the next iteration, $P_{max\_peak}$=36000 kW and $P_{max\_offpeak}$=36000 kW.

In the above table, $TFS_{TZ02}$=TFS, but some mismatch should be expected in reality. $TIS_{TZ02}$ is not required as an input to this function. It is simply being used in this example for the computation of TIS. It is shown as constant here, but is more like to have some variation in reality. TIS is neither an output of or input to this function, but is given in this example to show the impacts of both SCL energy and demand charges. In certain embodiments, TIS can be computed as follows:

$$TIS_n = \frac{TIS_{TZ02,n} \cdot TFS_{TZ02,n} \cdot \Delta t_n + C_{C,n} \cdot P_{C,n} + C_{O,n}}{TFS_{TZ02,n} \cdot \Delta t_n}$$

6.3.24 Incentive Function—Spot Market Impacts (Function 8.1)

Description:

This function is to be used by a utility that wishes to mitigate the impacts that it will likely incur in spot markets. This function modifies the transactive incentive signal so that the utility's resources may help the utility respond to its participation in the spot market.

Figure 96:
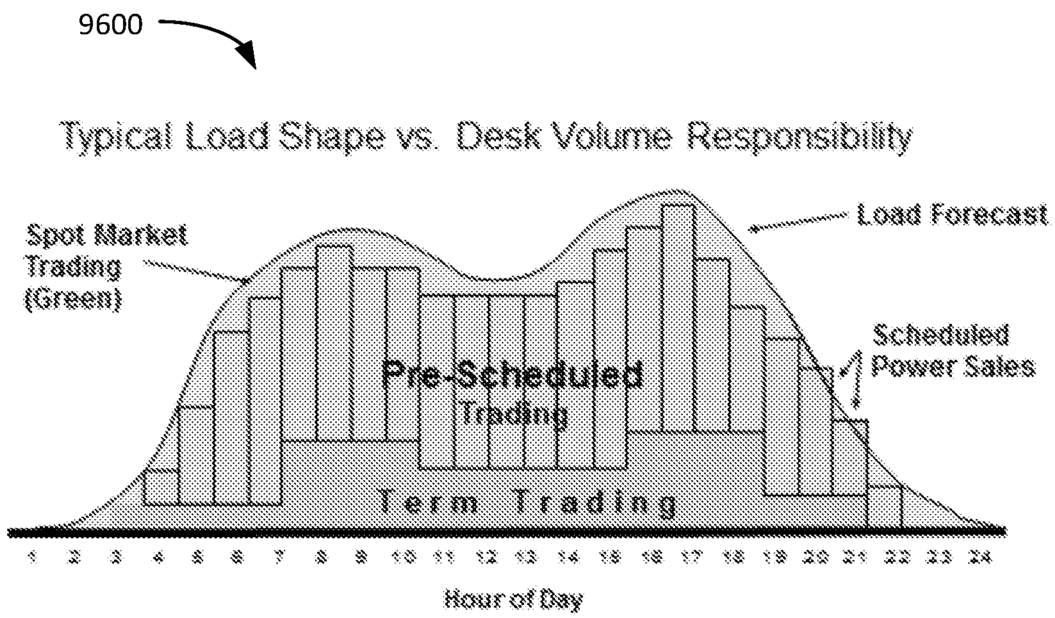
FIG. 96 is a graph illustrating power operations concepts.

Refer to FIG. 96 is a graph 9600 illustrating power operations concepts. that will be useful as some basic components of a utilities' power mix are addressed. For utilities that trade on the spot market, the cost of procured energy is the sum of costs from these following components:

Base load—large blocks of constant capacity that will have been procured far in advance of the day on which it will be used.

Term trading—procurement of coarsely shaped energy supply far in advance of the day on which it will be used.

Pre-scheduled trading—procurement of well-shaped energy supply that should be settled no later than the morning before the day on which the energy will be used.

Spot market trading—procurement of "real-time" energy needs that should be settled just shortly before the beginning of the hour in which the energy will be used. The purpose of this trading is to obtain an accurate, final balance between forecasted load and energy resources. The energy traded on a spot market is among the most expensive energy resources in a utility's resource mix. Surplus energy may be sold in the spot market. A spot market usually addresses hourly periods, but a trend has begun to shorten the intervals to 30 minutes or even shorter.

The transactive signals calculated at a transactive node will have incorporated the costs and energy from base load, term, and some of pre-scheduled energy resources that will be known from published schedules. However, the resources procured from "real-time" spot market trading may not be predictable far in advance. Furthermore, the strategies and trades may not be revealed by traders due to regulations and the business sensitivity of this information.

This function specifies two mechanisms by which the impacts of spot market trading should influence the transactive incentive signal:

1. Cost of energy procured on the spot market. As for any energy resource, the cost of energy procured on the spot market will have an impact on the delivered cost of energy commensurate with the fraction of total load that this energy represents. A transactive node should predict the energy that it will procure on the spot market and the cost of that energy. Normally, this prediction will become more accurate as an affected hour draws near. This effect produces energy terms $C_E$ and $P_G$ into the algorithmic framework at a transactive node. Because only a small fraction of a transactive node's forecasted load is supplied by spot market trading, the influence of the cost of energy procured on the spot market will also be relatively small. (For example, if the average unit cost of other resources is $10/MWh and the spot market unit cost is $50/MWh for 5% of the total forecasted load, the resulting weighted unit cost is $12/MWh.)

The calculation of a TIS is performed presently by summing the costs and quantities of imported or generated energy, not of exported or consumed energy. Therefore, the cost of any energy that is sold (e.g., that will be exported) in a spot market has no impact on the TIS.

2. An additional incentive from the utility to incentivize responsive assets to respond to the relative cost of energy on the spot market. From a utility's perspective, its customers should defer energy consumption from times at which spot market energy is expensive to times at which it is inexpensive. This statement is true both at times that energy should be purchase and sold on the spot market. Therefore, another incentive component can be used to induce a utility's customers to respond to the relative cost of energy on the spot market.

This incentive should create no net change in the delivered cost of energy over long periods of time; for each hour that it disincentivizes consumption it should create an hour during which it incentivizes consumption to a similar degree. Because the outcome of this incentive should be a benefit (or cost) for an hourly block of time, this function will assert that the infrastructure cost term $C_I$ (units: $/h) should be used to represent this incentive.

Block Input/Output Function Model:

Inputs:

$\{P(h_0-1), P(h_0-2), \ldots, P(h_0-i), P(h_0-l)\}$—[kW]—historical time series of traded capacity for recent spot market trading hours $h_0-i$ $\{C(h_0-1), C(h_0-2), \ldots, C(h_0-i), \ldots, C(h_0-l)\}$—[$/kWh]—historical time series of unit energy cost from prior recent prior spot market trading at hours h−1, h−2, etc.

$\{P(h_0), P(h_0+1), \ldots P(h_0+1), \ldots, P(h_0+l)\}$—[kW]—predicted hourly capacity shortfall or surplus for each hour of the next four days (e.g., the predicted time horizon of the transactive signals), to the degree that such shortfalls and surpluses may be known. Where this input cannot be known, trends will be used. Where this input is known, it may be used to improve the trending predictions.

$\{C(h_0), C(h_0+1), \ldots, C(h_0+i), \ldots, C(h_0+l)\}$—[$/kWh]—predicted hourly unit cost of energy that may be purchased in the spot market for each hour of the next four days (e.g., the predicted time horizon of the transactive signals), to the degree that such shortfalls and surpluses may be known. Where this input cannot be known, trends will be used. Where this input is known, it may be used to improve the trending predictions.

K—dimensionless—scaling parameter (a constant) by which effect of utility incentive on $C_I$ may be scaled.

Interim Calculation Products:

$C_{trend,all}$—[$/kWh]—average historical spot market unit energy cost $|P|_{ave}$—[kW]—average magnitude of historical procured (or sold) spot market capacity $\{C_{trend,1}, C_{trend,2}, \ldots, C_{trend,h}, \ldots, C_{trend,24}\}$—[$/KWh]—trended spot market unit energy cost by hour of day $\{P_{trend,1}, P_{trend,2}, \ldots, P_{trend,h}, \ldots, P_{trend,24}\}$—[kW]—trended procured (or sold) spot market capacity by hour of day Outputs:

$\{P_{G,0}, P_{G,1}, \ldots, P_{G,n}, \ldots, P_{G,N}\}$—[kW]—predicted average power that is predicted to be purchased or sold during each $IST_n$ interval of the current IST series. (The sign convention should apply a positive number to sold capacity and negative number to purchased capacity.) (In certain embodiments, there will be 56 IST intervals.)

$\{C_{E,0}, C_{E,1}, \ldots, C_{E,n}, \ldots, C_{E,N}\}$—[$/kWh]—predicted unit energy cost of energy that is predicted to be purchased or sold on the spot market during each $IST_n$ interval of the current IST series $\{C_{I,0}, C_{I,1}, \ldots, C_{I,n}, \ldots, C_{E,N}\}$—[$/h]—predicted hourly incentive applied to induce customers to track relative spot market pricing for each interval n.

Pseudo Code Implementation:

1. Convert available historical and predicted power capacities into the units kW.
2. Convert available historical and predicted unit energy costs into the units $/kWh.
3. Calculate or update the average historical spot market unit energy cost (e.g., its trend)

$$C_{trend,all} = \frac{1}{H}\sum_{i=1}^{H} C(h_0 - i) \tag{1}$$

$C_{trend,all}$—[$/kWh]—average historical spot market unit energy cost for all hours of the day H—dimensionless—total number of historic hours used in this calculation $C(h_0-i)$—[$/kWh]—spot market unit price of energy observed from historic hour $h_0-i$.

In subsequent updates, this value may be updated each hour by applying the following filter to the prior calculation result: (The number 168 is the number of hours in a week. This number sets the dynamics with which the average spot market price will be tracked.)

$$C_{trend,all} = \frac{167 \cdot C_{trend,all,old} + C(h_0)}{168} \tag{2}$$

$C_{trend,all,old}$—[\$/kWh]—the representation of the average spot market price that has incorporated spot market prices prior to $C(h_0)$. This is the prior value $C_{trend,all}$ that existed before this update.

4. Calculate or update the average magnitude of historical spot market capacity (e.g., its trend)

$$|P|_{ave} = \frac{1}{H}\sum_{i=1}^{H} |P(h_o - i)| \tag{3}$$

$|P|_{ave}$—[kW]—average magnitude of historical spot market capacity for energy that has been procured or sold for all hours of the day H—dimensionless—total number of historic hours used in this calculation $|P(h_o-i)/$—[kW]—magnitude of spot market capacity procured or sold in historic hour $h_o-i$.

In subsequent updates, this value may be updated each hour by applying the following filter to the prior calculation result. (The number 168 is the number of hours in a week. This number sets the dynamics with which the average spot market capacity purchased or sold will be tracked.):

$$|P|_{ave} = \frac{167 \cdot C_{ave,old} + |P(h_0)|}{168}, \tag{4}$$

$|P(h_0)|$—[kW]—the magnitude of the next spot market capacity to become known $|P|_{ave,old}$—[kW]—the average spot market capacity that has incorporated spot market capacities procured or sold prior to $|P(h_0)|$.

5. Calculate or update trends for hour-by-hour spot market unit energy cost that may be used if better predictions are not known. For each hour of the day h, estimate the recent average spot market unit cost of energy. If a utility possesses better means to make these predictions, then such predictions should replace trend information as it becomes available.

$$C_{trend,h} = \frac{1}{D}\sum_{d=1}^{D} C_h(d_0 - d) \tag{5}$$

$C_{trend,h}$—[\$/kWh]—average spot market unit cost of energy for the last D recent days. At least seven days should be used.

D—[dimensionless]—number of days included in the average trend $C_h(d_0-d)$—[\$/kWh]—the spot market unit energy price for hour of day h recorded d days prior to the present index day $d_0$.

Successive updates may be accomplished using the following filter that has a response time of about 1 week.

$$C_{trend,h} = \frac{6 \cdot C_{trend,h,old} + C_h(d_0)}{7} \tag{6}$$

$C_{trend,h,old}$—[\$/kWh]—prior value of $C_{trend,h}$ that will become displaced by this update.

6. Calculate or update trends for hour-by-hour spot market capacity purchased or sold that may be used if better predictions are not known. If a utility possesses better means to make these predictions, then such predictions should replace trend information as it becomes available.

$$P_{trend,h} = \frac{1}{D}\sum_{d=1}^{D} P_h(d_0 - d) \tag{7}$$

$P_{trend,h}$—[kW]—average spot market capacity that is procured or sold during hour of day h in the recent history of this transactive node.

D—[dimensionless]—number of days included in the average trend $P_h(d_0-d)$—[kW]— the spot market capacity procured or sold for hour of day h recorded d days prior to the present index day $d_0$.

Successive updates may be accomplished using the following filter that has a response time of about 1 week.

$$P_{trend,h} = \frac{6 \cdot P_{trend,h,old} + P_h(h_0)}{7} \tag{8}$$

$P_{trend,h,old}$—[kW]—prior value of $P_{trend,h}$ that will become displaced by this update.

7. Update the allocation of predicted spot market capacity to the IST intervals and make this prediction available as an output of this function into the transactive node's algorithmic toolkit framework.

$$P_{G,n} = P_{trend,h}, \quad \text{when } IST_n \subseteq h \qquad \frac{1}{b-a}\sum_{h=a}^{b} P_{trend,h}, \quad \text{when } h \subset IST_n \tag{9}$$

$P_{G,n}$—[kW]—Energy term parameter output to toolkit algorithmic framework for the interval corresponding to interval $IST_n$.

8. Update the allocation of predicted spot market unit cost of energy to the IST intervals and make this prediction available as an output of this function into the transactive node's algorithmic toolkit framework.

$$C_{E,n} = C_{trend,h}, \quad \text{when } IST_n \subseteq h \qquad \frac{1}{b-a}\sum_{h=a}^{b} C_{trend,h}, \quad \text{when } h \subset IST_n \tag{10}$$

$C_{E,n}$—[\$/kWh]—energy cost parameter output to toolkit algorithm is framework for the interval corresponding to $IST_n$.

9. Calculate or update the additional incentive.

$$C_{I,h}=K\cdot|P_{trend,all}|\cdot(C(h)-C_{trend,all}) \tag{11}$$

$C_{I,h}$—[$/h]—an incentive for future hour h. The future time horizon should be at least as long as that of the current IST interval set (about 4 days)

K—dimensionless—scaling parameter. Set this parameter to 1.0 until it becomes clear that it will be used.

$|P_{ave,all}|$—[kW]—the absolute value of the average capacity that is traded by this utility in the spot market based on prior history C(h)—[$/kWh]—the best present prediction of the spot market unit energy cost during future hour h. This will often have been estimated from the trended value for this hour of the day, but it may be replaced by better predictions, if such prediction are available.

$C_{ave,all}$—[$/kWh]—the average spot market unit cost of energy based on prior history.

10. Allocate the incentive to IST intervals. Now that the incentive has been predicted on an hour-by-hour basis, this incentive should be allocated to the set of IST intervals. Two cases should be considered. Where hour an interval $IST_n$ lies inside hour h, the incentive is simply assigned to the interval $IST_n$. However, if the interval $IST_n$ is longer than an hour and hour h lies within $IST_n$, then the incentive for interval $IST_n$ should be stated as the average of the incentives for the hours h that lie within $IST_n$.

$$C_{I,n} = \begin{cases} C_{I,h}, & \text{when } IST_n \subseteq h \\ \frac{1\text{ hour}}{b-a}\sum_{h=a}^{b} C_{I,h}, & \text{when } h \subset IST_n \end{cases} \tag{12}$$

$C_{I,n}$—[$/h]—incentive to be applied during future interval $IST_n$ $C_{I,h}$—[$/h]—hourly incentive for hour h that was calculated in equation (X) above (b−a)—[h]—number of hours included in interval $IST_n$ starting from hour a and ending hour b.

FIG. 96 is a graph 9600 illustrating power operations concepts.

6.3.25 Incentive Function—Non-Transactive Imported Energy (Function 1.1)

Description:

This function addresses the importation of electrical energy from outside a transactive node from entities that are not themselves transactive nodes—are not participants in this transactive control and coordination system. This function should be applied at transactive nodes that are scheduled to receive bulk electrical energy from outside the boundaries of the transactive control and coordination system. The California-Oregon Intertie is an example of such a connection that could potentially import energy into a transactive control and coordination system.

It is challenging to generalize this function because the non-transactive sources of imported energy are diverse. However, the energy predicted to flow to or from sources will typically have been scheduled by balancing authorities and other entities that are responsible to negotiate the flow of electrical power to and from the sources. Usually, wholesale market forces determine the cost of the scheduled energy, although such costs may not be promptly known from indices or other records and should therefore be predicted from past trends. Therefore, this function is simply represented as a translation of the scheduled energy and its corresponding predicted energy costs into the parameters of the toolkit framework.

Figure 97:
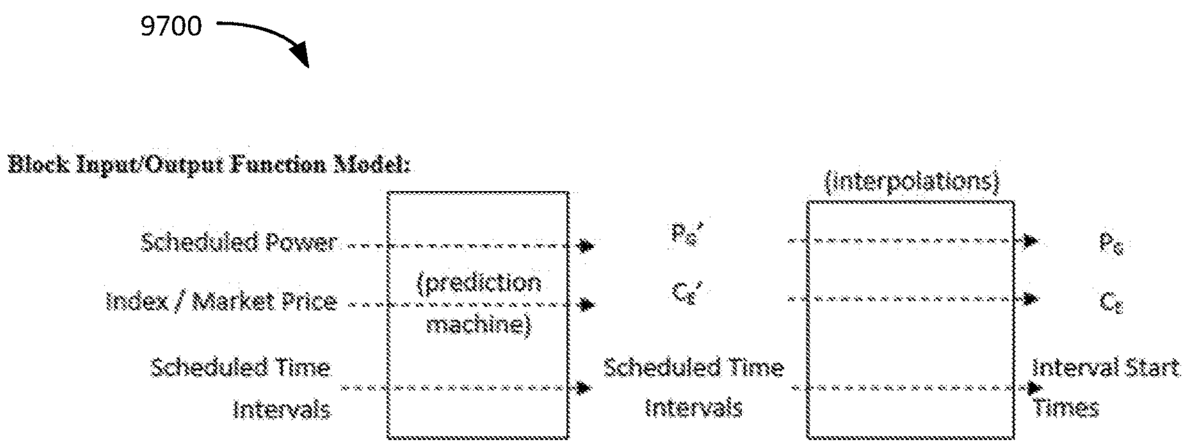
FIG. 97 is a diagram of an exemplary block input/output function model.
Figure 98:
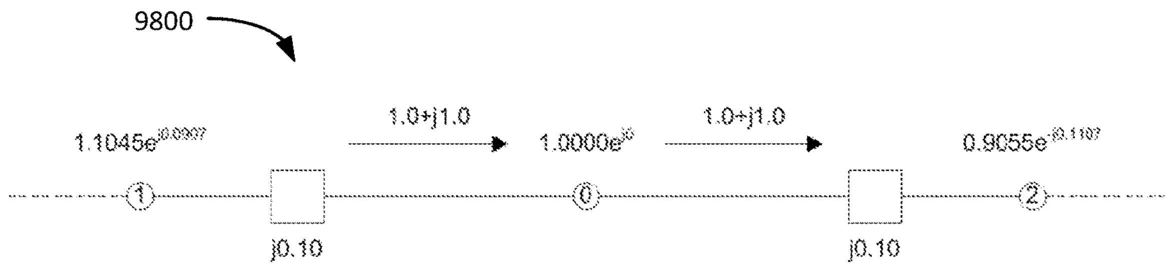
FIG. 98 is a first diagram illustrating an example power flow computation.

FIG. 97 is a diagram 10700 of an exemplary block input/output function model.

Pseudo Code Implementation:

1. Procure a current power exchange schedule for the exchange that is being modeled. This schedule should predict the energy to be exchanged for at least the next three days if it is to be useful for the entire predicted future of transactive signals. Some of these schedules will be found to be published daily or even less frequently.
2. Procure the corresponding index or other documentation of market price (cost) for the exchanged energy. For much of the power exchanged in the Northwest, the price (cost) may only be known a day later from published indices. The energy price (cost) should therefore be predicted from trends or from an informed simulation.
3. If necessary, restate the scheduled power from step #1 in units of average power, as will be used for parameter $P_G$ (default units: average kW) in the toolkit framework.
4. If necessary, restate the price (cost) from step #2 in units of unit energy cost, as will be used for parameter $C_E$ (default units; $/kWh) in the toolkit framework. (At this point in the algorithm, the product will be useful, but it will be stated still using the intervals from the original exchange schedule.)
5. Interpolate the values $C_E'$ and $P_G'$ to recast their intervals according to the current set of interval start times (IST) that should have been calculated by the transactive node. A library of interpolation functions may evolve to perform such interpolations, but the basic approach should be to interpolate the average power $P_G$ and cost of energy included in each IST interval $C_E$ as is shown in these equations below. "Included duration" is the part of a scheduled interval that resides within a given IST interval.

$$P_G = \frac{\text{total energy}}{IST\text{ duration}} = \frac{\sum_{IST\ duration}(\text{included duration})(\text{scheduled power})}{IST\text{ duraation}} \tag{1.1a}$$

$$C_E = \frac{(\text{total energy cost})}{\text{total energy}} = \frac{\sum_{IST\ duration}(\text{scheduled cost})\cdot(\text{included duration})\cdot P_{scheduled}}{\sum_{IST\ duration}(\text{included duration})\cdot P_{scheduled}} \tag{1.1b}$$

$P_G$—Series of average power energy terms expected by the toolkit framework (example units: average kW). Series members correspond to IST intervals.

$C_E$—Series of energy cost terms expected by the toolkit framework (example units: $/kWh). Series members correspond to IST intervals.

Total energy—Interim calculation of total energy that is exchanged over the duration of a given IST interval (example units: kWh).

Included duration—The fractional part of a schedule interval that also lies within a given IST interval (example units: seconds).

IST duration—The duration of a given IST interval (example units: seconds). In some embodiments, IST intervals are 5 minutes, 15 minutes, 1 hour, 6 hours, or 1 day long.

Scheduled cost—The index or market price that corresponds to the energy exchanged during a given scheduled interval (example units: $/kWh). This cost may be obtained through an informed simulation based on historical data and trends.

Scheduled power—The average power scheduled to be exchanged during a given schedule interval (example units: kW).

6.4 Appendix D—Example Formulation of Distributed Relative Power Flow

Introduction

Distributed control typically uses tools to assess effects of actions by distributed calculation. The challenge has been to predict power flow to and from neighbor nodes. When generation or loads change at the present node, it may be impossible to allocate such change among the power flow to and from neighbors without global knowledge.

Additionally, embodiments discussed herein might have ramifications for even centralized solvers as possible solution accelerator. Further, parallel calculations are enabled and global management of power angle becomes unnecessary.

Further, some embodiments exhibit iterative improvement of the solution occurs over time.

Discussion

The example method introduced below is formulated for distributed transactive control, where decisions are made independently at distributed locations to respond to an incentive signal. The impacts of these decisions on power flow are desirably predicted, which is presently challenging to do with conventional power flow formulations.

The example method is "relative" in that the objective of a node is to locate itself among neighbor nodes while assuming that the vector positions of those nodes do not change during an iteration. In this example, each node considers its own vector state location to be its system reference.

A node does not necessarily have to know its neighbor's state. In fact, there is not necessarily any system reference by which a node could make such an assessment. The relative vector state of a neighbor may be adequately inferred by receiving from that neighbor its anticipated complex power flow between it and the present node. It is not necessary even that the neighbors perfectly agree on the impedance of the transmission corridor between them.

A node's performance using this example method may be configured to improve over time with learning. Eventually, a node is able to test its prediction as the predicted time (or interval) occurs and passes.

The method is an embodiment of a Newton-Raphson relaxation method. The number of iterations of this method versus conventional power flow approaches will vary from implementation to implementation. Overrelaxation and other acceleration methods may be applicable. The power error can be used to assess status of the solution, or can assess ongoing dynamic system flux where the process is allowed to track updates to predicted states in "real time."

Example Embodiment

1. Receive neighbors' predicted real and reactive flow estimates for iteration k. Power $P_{0,n}$ is to be exported to neighboring node n; reactive power $Q_{0,n}$ is to be exported to neighboring node n. The basic node equations that will be used in the formulation are:

$$P_0 = P_{0,Gen} - P_{0,Load} = \sum_{n=1}^{N} P_{0,n} \quad \text{Eq. 1}$$

$$Q_0 = Q_{0,Gen} - Q_{0,Load} = \sum_{n=1}^{N} Q_{0,n} \quad \text{Eq. 2}$$

2. Calculate the real and reactive power errors based on neighbors' estimated real and reactive power exchange that they have provided and any updated estimates of generation and load at this node:

$$\Delta P_0 \doteq P_{0,Gen} - P_{0,Load} = \sum_{n=1}^{N} P_{0,n} \quad \text{Eq. 3}$$

$$\Delta Q_0 \doteq Q_{0,Gen} - Q_{0,Load} = \sum_{n=1}^{N} Q_{0,n} \quad \text{Eq. 4}$$

3. Use real and reactive flow and knowledge of corridor impedance to solve for and update the voltages and relative angles of each neighbor. Use the best present estimate of this node's voltage $V_0$ for this iteration k and the power $P_{0,n}$ and reactive power $Q_{0,n}$ reported by interacting neighbor nodes. Note that the voltages and power angles of neighboring nodes are inferred from their reports of how much real and reactive power they intend to import or export. Neighbors need not perfectly agree on their relative voltages and angles in order for this approach to work. As derived in the appendix:

$$V_n = \frac{\left(V_0 - \frac{Q_{0,n} X_{0,n}}{V_0}\right)}{\cos\left(\tan^{-1}\left(\frac{P_{0,n} X_{0,n}}{V_0^2 - Q_{0,n} X_{0,n}}\right)\right)} \quad \text{Eq. 5}$$

$$\delta_0 - \delta_n = \tan^{-1}\left(\frac{P_{0,n} X_{0,n}}{V_0^2 - Q_{0,n} X_{0,n}}\right) \quad \text{Eq. 6}$$

4. Update Jacobian elements for this node's voltage and angle using the updated state variables from this iteration k. The state variables are the relative angles between this node and its neighbors, the voltages of neighbor nodes, and the voltage of this node. For this formulation, one can assume values of $\delta_n$ and $V_n$ are held constant during the iteration. Such differentials can be calculated that will allow expansion of the power errors in terms of the voltage and angle of this node only, as will be accomplished in the next steps.

$$\frac{dP}{dV_0}=\sum_{n=1}^{N}\frac{V_n}{X_{0,n}}\sin(\delta_0-\delta_n) \quad \text{Eq. 7}$$

$$\frac{dP}{d\delta_0}=\sum_{n=1}^{N}\frac{V_0V_n}{X_{0,n}}\cos(\delta_0-\delta_n) \quad \text{Eq. 8}$$

$$\frac{dQ}{dV_0}=\sum_{n=1}^{N}\frac{1}{X_{0,n}}[2V_0-V_n\cos(\delta_0-\delta_n)] \quad \text{Eq. 9}$$

$$\frac{dQ}{d\delta_0}=\sum_{n=1}^{N}\frac{V_0V_n}{X_{0,n}}\sin(\delta_0-\delta_n) \quad \text{Eq. 10}$$

Derivations of Eqs. 7-8 can be found in the appendix. Note that the values calculated for Eq. 8 and Eq. 9 are much larger and more influential than those calculated in Eq. 7 and Eq. 10. Consequently, the calculation can be accelerated by using only these two components, thus decoupling the real and reactive components of power flow. Alternatively, the system can be established to manage only real power or only reactive power (separate control mechanisms).

5. Calculate voltage change and angle change of this node only. These two unknowns are solvable from power and reactive power equations and a first linear expansion with respect to changes in the voltage $\Delta V_0$ and angle $\Delta\delta_0$. Because this is a relative formulation, a solution is found for the new conditions of this node that will solve the real and reactive power errors. The result will be an updated voltage for this node. The angle will later be discarded and is not a state (the angle of this node is defined as the reference), but the resulting angle help us allocate changes in power flow among the powers being exchanged with neighbors.

$$\Delta P=\sum_{n=1}^{N}\frac{dP_{0,n}}{d\delta_0}-\Delta\delta_0+\frac{dP_{0,n}}{dV_0}-\Delta V_0 \quad \text{Eq. 11}$$

By substitution:

$$\Delta P=\sum_{n=1}^{N}\frac{V_0V_n}{X_{0,n}}\cos(\delta_0-\delta_n)\cdot\Delta\delta_0+\sum_{n=1}^{N}\frac{V_n}{X_{0,n}}\sin(\delta_0-\delta_n)\cdot\Delta V_0 \quad \text{Eq. 12}$$

$$\Delta Q=\sum_{n=1}^{N}\frac{dQ_{0,n}}{d\delta_0}\cdot\Delta\delta_0+\sum_{n=1}^{N}\frac{dQ_{0,n}}{dV_0}\cdot\Delta V_0 \quad \text{Eq. 13}$$

By substitution:

$$\Delta Q=\sum_{n=1}^{N}\frac{V_0V_n}{X_{0,n}}\sin(\delta_0-\delta_n)\cdot\Delta\delta_0+\sum_{n=1}^{N}\frac{1}{X_{0,n}}[2V_0-V_n\cos(\delta_0-\delta_n)]\cdot\Delta V_0 \quad \text{Eq. 14}$$

Finish updating the state variables at this node using the changes that were calculated using Eq. 12 and Eq. 14.

$$\delta_0(k+1)=\delta_0(k)+\Delta\delta_0 \quad \text{Eq. 15}$$

$$V_0(k+1)=V_0(k)+\Delta V_0 \quad \text{Eq. 16}$$

6. Use the updated voltage state and temporary angle for this node to calculate refine the estimate of real and reactive power to be exchanged with neighbors. (The change in angle may be used to modify the relative angle states, but doing so is not necessary.)

$$P_{0,n}(k+1)=\frac{V_0(k+1)V_n(k)}{X_{0,n}}\sin(\delta_0(k+1)-\delta_n(k)) \quad \text{Eq. 17}$$

$$Q_{o,n}(k+1)=\frac{V_0(k+1)}{X_{0,n}}[V_0(k+1)-V_n(k)cos\delta_0(k+1)-\delta_n(k)] \quad \text{Eq. 18}$$

7. Provide these updated estimates of real and reactive power to be exchanged with neighbors to those neighbors for their use with iteration k+1, (the values calculated in step 6 are those that will be shared with neighbors during iteration k+l.)

8. Reset this node's angle to zero.

$$\delta_0=0 \quad \text{Eq. 19}$$

9. Calculate the real and reactive power errors given the updated state. This power error may be used for confidence assessments and convergence criteria. (See steps 4 and 5.)

$$\Delta P_0=P_{0,Gen}(k+1)-P_{0,Load}(k+1)-\sum_{n=1}^{N}P_{0,n}(k+1) \quad \text{Eq. 20}$$

$$\Delta Q_0=Q_{0,Gen}(k+1)-Q_{0,Load}(k+1)-\sum_{n=1}^{N}Q_{0,n}(k+1) \quad \text{Eq. 21}$$

10. Repeat. If the process is repeated using the same neighbors' estimates of real and reactive power, this node's voltage may be further resolved. If the process is repeated using newly updated neighbors' estimates of real and reactive power for iteration k+1, the entire system power flow solution becomes refined by iteration.

Examples

Figure 99:
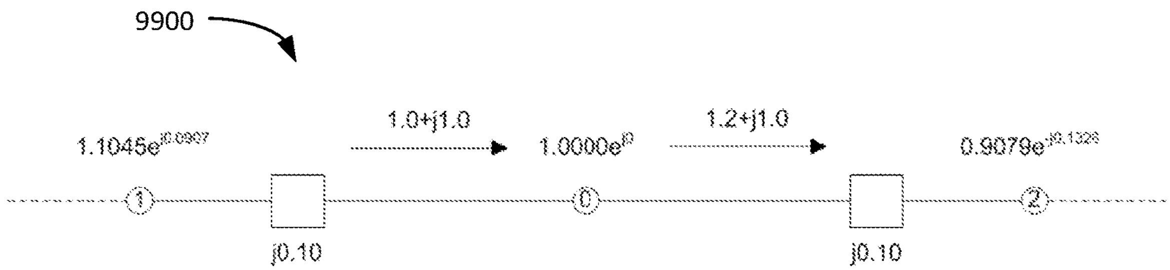
FIG. 99 is a second diagram illustrating an example power flow computation.

The approach can be demonstrated using a simple example where a node interacts with only two neighbors and must assess its relative power flow state from information reported by these two neighbors. Let this node have no real or reactive generation or load. One possible flow state having small power error is shown in diagram 9800 of FIG. 99.

In step 1, assume that a perturbation has occurred at node 2 and it reports 1.2+j1.0 should now be leaving the center node. Node 1 reports an unchanged complex power flow of 1.0+j1.0.

In step 2, the new power error is calculated to be −0.2 because there now appears to be 0.2 more real power leaving this node than entering it.

In step 3, the voltage and angle of node 2 is corrected to match the complex power that is reported to the present node by node 2. This is illustrated in diagram 9900 of FIG. 99.

In step 4, the present variability of power is assessed based on the state determined in step 3.

$$\frac{dP}{d\delta_0}=19.9994 \quad \frac{dP}{dV_0}=0.1999$$

-continued $$\frac{dQ}{d\delta_0} = 0.1999 \quad \frac{dQ}{dV_0} = 20.0006$$

In step 5, solve for the corresponding changes of this node's voltage and angle that will help resolve the power error. The voltage and angle of this node are updated accordingly.

$$\Delta\delta_0 = -0.0100 \text{ radians} = 0.573° \ \Delta V_0 = 0.001$$

Figure 100:
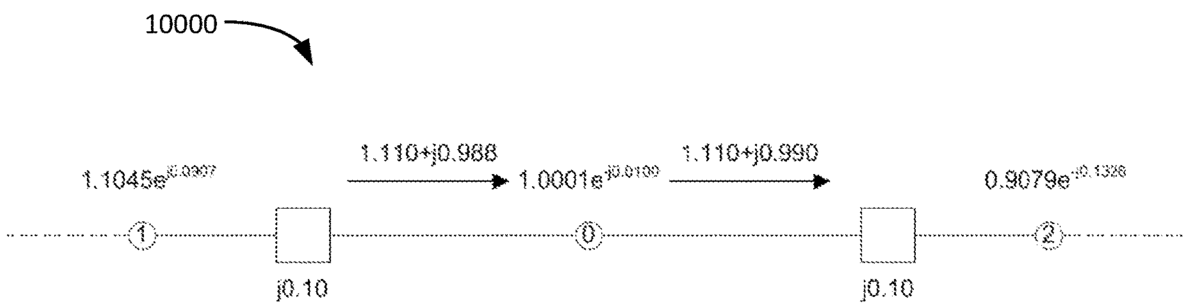
FIG. 100 is a third diagram illustrating an example power flow computation.

In step 6, real and reactive power to be exchanged with neighbor nodes is recalculated using the new voltage and angle for the present node. The implications of this calculation are shown in diagram 10000 of FIG. 100. The voltage and angle of the present node have been altered, which has changed also the real and reactive power that would be exchanged by this node with nodes 1 and 2. The resulting power is balanced partway between the powers that had been reported by nodes 1 and 2 at the beginning of the iteration. The reactive power is unfortunately decreased by about 1%, an outcome of the nonlinearity of the calculation.

Interestingly, the result of fast decoupled calculations at this node would have been resulted in about the same result.

APPENDIX

1. Real and reactive power flow between this and neighbor node:

Apparent power:

$$\overline{S} = \overline{V}\overline{I}^* \quad \text{Eq. A1}$$

Voltage at this node is defined as $V_0 \cdot e^{j\delta_0}$. Current leaving this node is defined as $$\frac{V_0 \cdot e^{j\delta_0} - V_n \cdot e^{j\delta_n}}{jX_{0,n}},$$

where a common practice has been adopted of representing the impedance between the nodes by the reactance component only.

By substitution of these values into Eq. AI., $$\overline{S} = j\frac{V_0}{X_{0,n}}[V_0 - V_n \cdot e^{j(\delta_0 - \delta_n)}]. \quad \text{Eq. A2}$$

Real power leaving this node to node n is the real part of the apparent power:

$$P_{0,n} \equiv \text{Re}\{\overline{S}\} = \frac{V_0 V_n}{X_{0,n}}\sin(\delta_0 - \delta_n) \quad \text{Eq. A3}$$

Reactive power leaving this node to node n is the imaginary component of the apparent power:

$$Q_{0,n} \equiv \text{Im}\{\overline{S}\} = \frac{V_0}{X_{0,n}}[V_0 - V_n\cos(\delta_0 - \delta_n)] \quad \text{Eq. A4}$$

2. Given power and reactive power, calculate neighbor's voltage and relative angle.

The reactive power equation can be used to solve for neighbor's voltage and relative angle. First solve Eq. A4 for $V_n$ with respect to the relative angle.

$$V_n = \frac{\left(V_0 - \frac{Q_{0,n}X_{0,n}}{V_0}\right)}{\cos(\delta_0 - \delta_n)} \quad \text{Eq. A5}$$

By substitution of $V_n$ into Eq. A3, the relative angle may be calculated in terms of known variables.

$$\delta_0 - \delta_n = \tan^{-1}\left(\frac{P_{0,n}X_{0,n}}{V_0^2 - Q_{0,n}X_{0,n}}\right) \quad \text{Eq. A6}$$

And by substitution of the relative angle of Eq. A6 into Eq. A5,one can solve for $V_n$ also in terms of known variables:

$$V_n = \frac{\left(V_0 - \frac{Q_{0,n}X_{0,n}}{V_0}\right)}{\cos\left(\tan^{-1}\left(\frac{P_{0,n}X_{0,n}}{V_0^2 - Q_{0,n}X_{0,n}}\right)\right)} \quad \text{Eq. A7}$$

3. Jacobian sensitivities of power at this node to changes in this node's voltage and relative angles:

Differentiate Eq. A3 for every neighbor node n with respect to $V_0$ and with respect to the relative power angle $\delta_0 - \delta_n$ to get Eq. A8 and Eq. A9:

$$\frac{dP_{0,n}}{dV_0} = \sum_{n=1}^{N}\frac{V_n}{X_{0,n}}\sin(\delta_0 - \delta_n) \quad \text{Eq. A8}$$

$$\frac{dP_{0,n}}{d(\delta_0 - \delta_n)} = \sum_{n=1}^{N}\frac{V_0 V_n}{X_{0,n}}\cos(\delta_0 - \delta_n) \quad \text{Eq. A9}$$

This formulation will assume that $\delta_n$ remains constant through this iteration. Solving with respect to this node's angle, $$\frac{dP_{0,n}}{d\delta_0} = \sum_{n=1}^{N}\frac{V_0 V_n}{X_{0,n}}\cos(\delta_0 - \delta_n). \quad \text{Eq. A10}$$

4. Jacobian sensitivities of reactive power at this node to changes in this node's voltage and relative angles:

Similar to what was done above, differentiate Eq. A4 for every neighbor node n with respect to $V_0$ and with respect to the relative power angle $\delta_0 - \delta_n$ to get Eq. A11 and Eq. A12:

$$\frac{dQ_{0,n}}{dV_0} = \sum_{n=1}^{N}\frac{1}{X_{0,n}}[2V_0 - V_n\cos(\delta_0 - \delta_n)] \quad \text{Eq. A11}$$

$$\frac{dQ_{0,n}}{d(\delta_0 - \delta_n)} = \sum_{n=1}^{N}\frac{V_0 V_n}{X_{0,n}}\sin(\delta_0 - \delta_n) \quad \text{Eq. A12}$$

Remembering that $\delta_n$ remains constant through this iteration and solving with respect to this node's angle, $$\frac{dQ_{0,n}}{d\delta_0} = \sum_{n=1}^{N} \frac{V_0 V_n}{X_{0,n}} \sin(\delta_0 - \delta_n). \quad \text{Eq. A13}$$

5. Power and reactive power error definitions:

$$\Delta P = P_{Gen} - P_{Load} - \sum_{n=1}^{N} P_{0,n} \quad \text{Eq. A14}$$

$$\Delta Q = Q_{Gen} - Q_{Load} - \sum_{n=1}^{N} Q_{0,n} \quad \text{Eq. A15}$$

6. Calculate voltage and angle of this node.

In a traditional power flow calculation, linear expansion would be completed about all power angle and voltage states. For example, $$\Delta P = \sum_{n=1}^{N} \frac{dP_{0,n}}{d(\delta_0 - \delta n)} \cdot \Delta(\delta_n - \delta_0) + \sum_{n=1}^{N} \frac{dP_{0,n}}{dV_0} \cdot \Delta V_0 + \sum_{n=1}^{N} \frac{dP_{0,n}}{dV_n} \cdot \Delta V_n. \quad \text{Eq. A16}$$

In the present, relative formulation, assume $\delta_n$ and $V_n$ are constant through each iteration at this node. Eq. A16 can be simplified to $$\Delta P = \sum_{n=1}^{N} \frac{dP_{0,n}}{d\delta_0} \cdot \Delta\delta_0 + \sum_{n=1}^{N} \frac{dP_{0,n}}{dV_0} \cdot \Delta V_0. \quad \text{Eq. A17}$$

Remembering Eq. A8 and Eq. A1D, by substitution, $$\Delta P = \sum_{n=1}^{N} \frac{V_0 V_n}{X_{0,n}} \cos(\delta_0 - \delta_n) \cdot \Delta\delta_0 + \sum_{n=1}^{N} \frac{V_n}{X_{0,n}} \sin(\delta_0 - \delta_n) \cdot \Delta V_0. \quad \text{Eq. A18}$$

Similarly, for Q, a traditional linearization might result in $$\Delta Q = \sum_{n=1}^{N} \frac{dQ_{0,n}}{d(\delta_0 - \delta_n)} \cdot \Delta(\delta_0 - \delta_n) + \sum_{n=1}^{N} \frac{dQ_{0,n}}{dV_0} \cdot \Delta V_0 + \sum_{n=1}^{N} \frac{dQ_{0,n}}{dV_n} \cdot \Delta V_n. \quad \text{Eq. A19}$$

In the present, relative formulation, assume $\delta_n$ and $V_n$ are constant through each iteration at this node. Eq. A19 can be simplified to $$\Delta Q = \sum_{n=1}^{N} \frac{dQ_{0,n}}{d\delta_0} \cdot \Delta\delta_0 + \sum_{n=1}^{N} \frac{dQ_{0,n}}{dV_0} \cdot \Delta V_0, \quad \text{Eq. A20}$$

Remembering Eq. A11 and Eq. A13, by substitution, $$\Delta Q = \sum_{n=1}^{N} \frac{V_0 V_n}{X_{0,n}} \sin(\delta_0 - \delta_n) \cdot \Delta\delta_0 + \sum_{n=1}^{N} \frac{1}{X_{0,n}} [2V_0 - V_n \cos(\delta_0 - \delta_n)] \cdot \Delta V_0. \quad \text{Eq. A21}$$

7 CONCLUDING REMARKS

Having illustrated and described the principles of the disclosed technology, it will be apparent to those skilled in the art that the disclosed embodiments can be modified in arrangement and detail without departing from such principles. For example, any one or more aspects of the disclosed technology can be applied in other embodiments. In view of the many possible embodiments to which the principles of the disclosed technologies can be applied, it should be recognized that the illustrated embodiments are only preferred examples of the technologies and should not be taken as limiting the scope of the invention.

What is claimed is:

1. A system for distributing electricity, comprising:

a plurality of transactive nodes, each transactive node being associated with one or more electric resources, one or more electric loads, or a combination of one or more electric resources and one or more electric loads; and a network connected to the transactive nodes to facilitate communication between the transactive nodes, the transactive nodes being configured to exchange incentive and feedback signals with one another in order to determine an electrical demand in the system for a current time interval and to provide an electrical supply sufficient to meet the electrical demand for the current time interval;

wherein the transactive nodes are further configured to exchange incentive and feedback signals for two or more future time intervals in addition to the incentive and feedback signals for the current time interval; and wherein the two or more future time intervals have increasingly coarser granularity.

2. The system of claim 1), wherein the current time interval is the time interval that is next to occur and be coordinated by the system.

3. The system of claim 1), wherein at least one of the transactive nodes modifies one or both of its incentive or feedback signals in response to previously received incentive and feedback signals.

4. The system of claim 3), wherein the at least one of the transactive nodes is associated with an elastic load, and wherein the modified incentive or feedback signals corresponds to a predicted change in the elastic load.

5. The system of claim 3), wherein the at least one of the transactive nodes is associated with an electrical resource, and wherein the modified incentive or feedback signals corresponds to a change in the electrical resource.

6. The system of claim 3), wherein the at least one of the transactive nodes is associated with an electrical resource, and wherein the modified incentive signals correspond to a change in local conditions.

7. The system of claim 1), wherein one or more of the transactive nodes compute their respective incentive and feedback signals using functions selected from a library of functions.

8. The system of claim 1), wherein the incentive and feedback signals further include confidence level data indicating a respective reliability of the incentive and feedback signals.

9. A system for distributing electricity, comprising:

a plurality of transactive nodes, each transactive node being associated with one or more electric resources, one or more electric loads, or a combination of one or more electric resources and one or more electric loads; and a network connected to the transactive nodes and facilitating communication between the transactive nodes, the transactive nodes being configured to exchange sets of signals with one another in order to determine an electrical demand in the system for a current time interval and to provide an electrical supply sufficient to meet the electrical demand for the current time interval, each set of signals including signals for determining the electric loads and supplies for the current time interval as well as signals for determining the electric loads and supplies for two or more future time intervals;

wherein the future time intervals have increasingly longer durations as the time intervals are farther into the future relative to the current time interval.

10. The system of claim 9), wherein the current time interval corresponds to an imminent time interval that is next to occur in the system.

11. The system of claim 9), wherein the transactive nodes are configured to update the values of the sets of signals at an update frequency, the update frequency corresponding to a duration of the current time interval.

12. The system of claim 9), wherein the transactive nodes are configured to exchange the set of signals with one another iteratively over time such that the signals for a respective time interval stabilize as the respective time interval approaches the current time interval.

13. The system of claim 9), wherein the transactive nodes are configured to exchange the set of signals with one another on an asynchronous event-driven basis or a clock-driven basis.

14. The system of claim 9), wherein a respective set of the transactive nodes are configured to iteratively exchange a set of signals with one another until the exchanged set of signals converges to within an acceptable degree of tolerance.

15. The system of claim 9), wherein a transactive node in the respective set of the transactive nodes is further configured to transmit an updated set of signals when local conditions at the transactive node cause the updated set of signals to deviate from a previously transmitted set of signals beyond a relaxation criterion.

16. The system of claim 9), wherein the sets of signals further include confidence level data indicating a respective reliability of the exchanged signals.

17. A system for distributing electricity, comprising:

a plurality of transactive nodes, each transactive node being associated with one or more electric supplies, one or more electric loads, or a combination of one or more electric supplies and one or more electric loads; and a network connected to the transactive nodes and facilitating communication between the transactive nodes, the transactive nodes being configured to exchange sets of signals with one another in order to determine an electrical demand in the system for a current time interval and to provide an electrical supply sufficient to meet the electrical demand for the current time interval, a respective one of the transactive nodes being configured to compute its incentive and feedback signals using one or more functions selected from a library of functions;

wherein, through the use of the one or more functions, the respective one of the transactive nodes computes a control signal selected from a set of signed whole numbers and communicates the computed control signal to one or more loads, resources, or loads and resources associated with the respective one of the transactive nodes.

18. The system of claim 17), wherein the one or more functions selected from the library of functions are selected based on the type and number of electrical supplies and electrical loads with which the respective transactive node is associated.

19. The system of claim 17), wherein the one or more functions include one or more load functions, one or more resource functions, or a combination of one or more load functions and resource functions.

20. The system of claim 17), wherein the one or more functions are selected from a group of resource functions comprising one or more of:

(a) a resource function adapted to account for imported electrical energy, (b) a resource function adapted to account for a renewable energy resource, (c) a resource function adapted to account for fossil fuel generation;

(d) a resource function adapted to account for general infrastructure cost;

(e) a resource function adapted to account for system constraints;

(f) a resource function adapted to account for system energy losses;

(g) a resource function adapted to account for demand charges;

(h) a resource function adapted to account for market impacts.

21. The system of claim 17), wherein the one or more functions are selected from a group of load functions comprising one or more of:

(a) a load function adapted to account for a bulk inelastic load, (b) a load function adapted to account for an event-driven demand response;

(c) a load function adapted to account for a time-of-use demand response;

(d) a load function adapted to account for a real-time continuum demand response.

22. The system of claim 17), wherein the respective one of the transactive nodes controls one or more elastic loads and adjusts the one or more elastic loads in response to the feedback and incentive signals received at the respective one of the transactive nodes.

23. The system of claim 17), wherein the one or more functions are implemented by individual software modules that can be combined with one another to implement a desired transactor behavior for the respective one of the transactive nodes.

24. The system of claim 17), wherein the computed control signal is interpreted by an electrical generator or set of electrical generators as a fraction of the generator's or generators' rated generation capacity.

25. The system of claim 17), wherein the computed control signal is interpreted by an electrical load or set of electrical loads as a fraction of the load's or loads' rated power.

26. A system for distributing electricity, comprising:

a plurality of transactive nodes, each transactive node being associated with one or more electric resources, one or more electric loads, or a combination of one or more electric resources and one or more electric loads; and a network connected to the transactive nodes and facilitating communication between the transactive nodes;

the transactive nodes being configured to exchange sets of signals with one another in order to determine an electrical demand in the system for a current time interval and to provide an electrical supply sufficient to meet the electrical demand for the current time interval;

each set of signals including signals for determining the electric loads and supplies for the current time interval as well as signals for determining the electric loads and supplies for two or more future time intervals;

wherein a transactive node in the respective set of the transactive nodes is further configured to transmit an updated set of signals when local conditions at the transactive node cause the updated set of signals to deviate from a previously transmitted set of signals beyond a relaxation criterion.

27. The system of claim 26), wherein the current time interval corresponds to an imminent time interval that is next to occur in the system.

28. The system of claim 26), wherein the transactive nodes are configured to update the values of the sets of signals at an update frequency, the update frequency corresponding to a duration of the current time interval.

29. The system of claim 26), wherein the transactive nodes are configured to exchange the set of signals with one another iteratively over time such that the signals for a respective time interval stabilize as the respective time interval approaches the current time interval.

30. The system of claim 26), wherein the transactive nodes are configured to exchange the set of signals with one another on an asynchronous event-driven basis or a clock-driven basis.

31. The system of claim 26), wherein a respective set of the transactive nodes are configured to iteratively exchange a set of signals with one another until the exchanged set of signals converges to within an acceptable degree of tolerance.

32. The system of claim 26), wherein the sets of signals further include confidence level data indicating a respective reliability of the exchanged signals.

* * * * *